US012066129B2

(12) United States Patent
Laduca

(10) Patent No.: US 12,066,129 B2
(45) Date of Patent: Aug. 20, 2024

(54) TUBES AND METHODS OF EXPANDING AND/OR CONTRACTING TUBES

(71) Applicant: QMAX, LLC, Santa Cruz, CA (US)

(72) Inventor: Robert C. Laduca, Santa Cruz, CA (US)

(73) Assignee: QMAX, LLC, Santa Cruz, CA (US)

( * ) Notice: Subject to any disclaimer, the term of this patent is extended or adjusted under 35 U.S.C. 154(b) by 0 days.

(21) Appl. No.: 18/491,697

(22) Filed: Oct. 20, 2023

(65) Prior Publication Data

US 2024/0133492 A1 Apr. 25, 2024
US 2024/0229982 A9 Jul. 11, 2024

Related U.S. Application Data

(60) Provisional application No. 63/380,331, filed on Oct. 20, 2022.

(51) Int. Cl.
*F16L 11/08* (2006.01)
*F16L 11/12* (2006.01)

(52) U.S. Cl.
CPC ............. *F16L 11/088* (2013.01); *F16L 11/12* (2013.01)

(58) Field of Classification Search
CPC .......... F16L 11/085; F16L 11/02; F16L 11/12; F16L 11/08; F16L 11/081
USPC .................................. 138/118, 119, 123–126
See application file for complete search history.

(56) References Cited

U.S. PATENT DOCUMENTS

| | | | | |
|---|---|---|---|---|
| 3,581,778 A * | 6/1971 | Korejwa | F16L 11/085 | 138/119 |
| 4,228,824 A * | 10/1980 | Evans | A01G 25/00 | 138/119 |
| 4,838,859 A | 6/1989 | Strassmann | | |
| 5,192,286 A | 3/1993 | Phan et al. | | |
| 5,226,888 A | 7/1993 | Arney | | |
| 5,383,852 A | 1/1995 | Stevens-Wright | | |
| 5,388,568 A | 2/1995 | Van Der Heide | | |
| 5,441,483 A | 8/1995 | Avitall | | |
| 5,538,510 A | 7/1996 | Fontirroche et al. | | |
| 5,545,133 A | 8/1996 | Burns et al. | | |
| 5,882,333 A | 3/1999 | Schaer | | |
| 5,961,499 A | 10/1999 | Bonutti et al. | | |
| 6,033,378 A | 3/2000 | Lundquist et al. | | |
| 6,181,978 B1 | 1/2001 | Hinds | | |
| 6,186,978 B1 | 2/2001 | Samson et al. | | |
| 6,352,238 B1 | 3/2002 | Roman | | |
| 6,358,238 B1 | 3/2002 | Sherry | | |
| 6,585,717 B1 | 7/2003 | Wittenberger et al. | | |
| 9,498,249 B2 | 11/2016 | Bonutti et al. | | |
| 9,956,376 B2 | 5/2018 | Anderson et al. | | |
| 11,022,238 B2 * | 6/2021 | Block | F16L 11/082 | |

(Continued)

FOREIGN PATENT DOCUMENTS

| | | |
|---|---|---|
| CN | 102573709 | 7/2012 |
| CN | 203736693 | 7/2014 |

(Continued)

*Primary Examiner* — Patrick F Brinson
(74) *Attorney, Agent, or Firm* — Levine Bagade Han LLP

(57) ABSTRACT

Passively expandable and contractable tubes, dynamically expandable and contractable tubes, and non-expandable tubes and methods of using the same are disclosed. Tubes having one or multiple layers are disclosed. Tubes having one or multiple reinforcements are disclosed. Tubes comprising radial ePTFE and/or axial ePTFE are disclosed.

44 Claims, 116 Drawing Sheets

(56) References Cited

U.S. PATENT DOCUMENTS

| | | | |
|---|---|---|---|
| 11,123,517 | B2 | 9/2021 | LaDuca |
| 11,896,777 | B2 | 2/2024 | LaDuca |
| 2003/0130712 | A1 | 7/2003 | Smits et al. |
| 2004/0044350 | A1 | 3/2004 | Martin et al. |
| 2007/0088319 | A1 | 4/2007 | Martone |
| 2009/0105641 | A1 | 4/2009 | Nissl |
| 2009/0209969 | A1 | 8/2009 | Wolfe |
| 2009/0240202 | A1 | 9/2009 | Drasler et al. |
| 2010/0094392 | A1 | 4/2010 | Nguyen et al. |
| 2010/0228191 | A1 | 9/2010 | Alvarez et al. |
| 2011/0065990 | A1 | 3/2011 | Verbeek |
| 2011/0144690 | A1 | 6/2011 | Bishop et al. |
| 2011/0206878 | A1 | 8/2011 | Sullivan et al. |
| 2011/0264133 | A1 | 10/2011 | Hanlon et al. |
| 2011/0282156 | A1 | 11/2011 | Lenker et al. |
| 2012/0283633 | A1 | 11/2012 | Von Hoffmann |
| 2013/0197306 | A1 | 8/2013 | Armand et al. |
| 2014/0121629 | A1 | 5/2014 | Macaulay et al. |
| 2014/0142509 | A1 | 5/2014 | Bonutti et al. |
| 2014/0148759 | A1 | 5/2014 | Macnamara et al. |
| 2014/0236122 | A1 | 8/2014 | Anderson et al. |
| 2015/0152984 | A1* | 6/2015 | Disbrow ................ F16L 11/12 138/119 |
| 2016/0074625 | A1 | 3/2016 | Furnish |
| 2018/0169378 | A1 | 6/2018 | LaDuca |
| 2018/0344981 | A1 | 12/2018 | LaDuca et al. |
| 2019/0145553 | A1* | 5/2019 | Mezzalira .............. F16L 11/12 138/118 |
| 2021/0379330 | A1 | 12/2021 | LaDuca |
| 2024/0131300 | A1 | 4/2024 | LaDuca |

FOREIGN PATENT DOCUMENTS

| | | |
|---|---|---|
| DE | 102005034529 | 1/2007 |
| JP | 2003-508132 | 3/2003 |
| JP | 2004-515255 | 5/2004 |
| JP | 2008-538709 | 11/2008 |
| JP | 2010-227137 | 10/2010 |
| JP | 2012-513294 | 6/2012 |
| JP | 2013-542006 | 11/2013 |
| JP | 2014-511202 | 5/2014 |
| WO | WO 2001/015763 | 3/2001 |
| WO | WO 2016/196511 | 12/2016 |
| WO | WO 2024/086833 | 4/2024 |

* cited by examiner

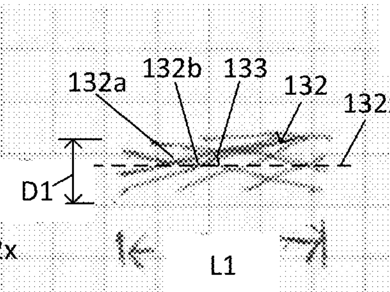
Fig. 55A1
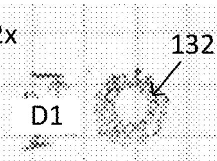
Fig. 55A2
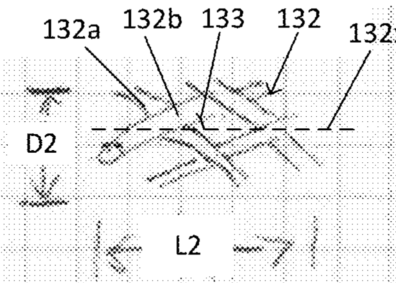
Fig. 55B1
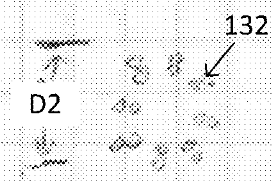
Fig. 55B2
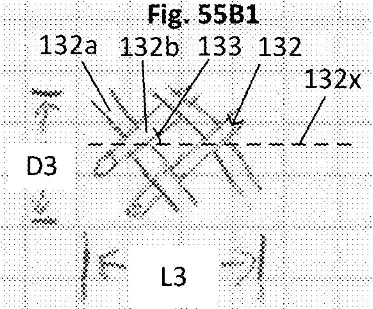
Fig. 55C1
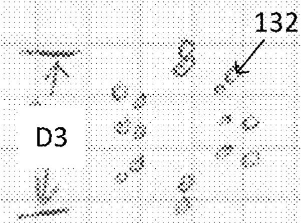
Fig. 55C2
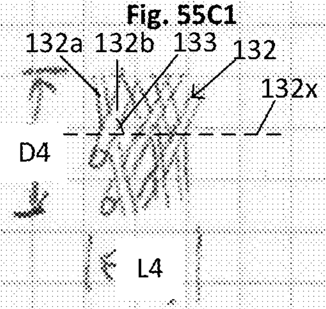
Fig. 55D1
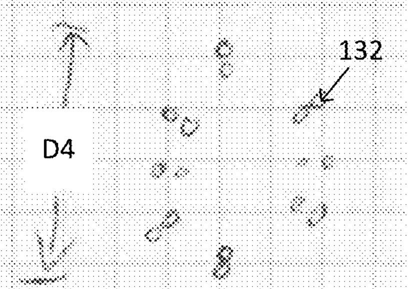
Fig. 55D2
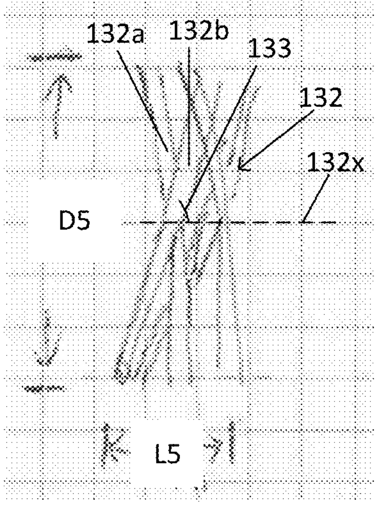
Fig. 55E1
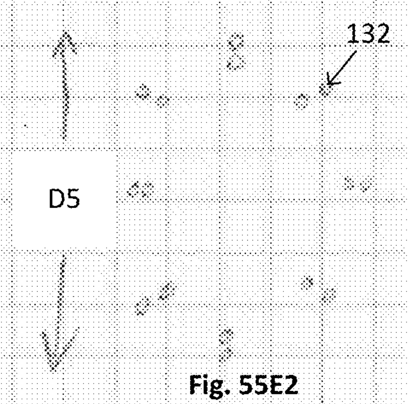
Fig. 55E2

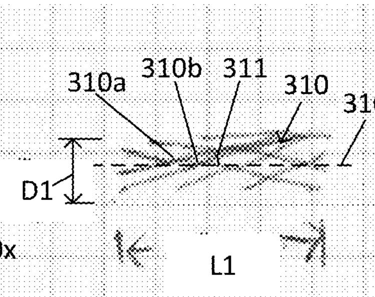
Fig. 57A1
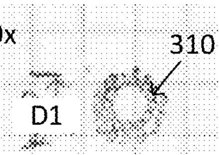
Fig. 57A2
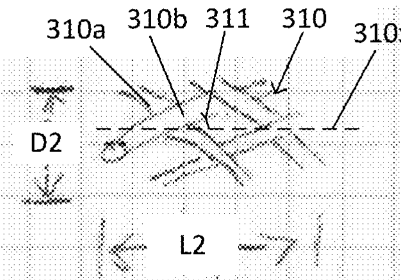
Fig. 57B1
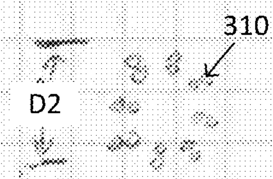
Fig. 57B2
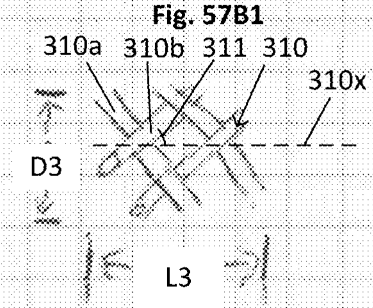
Fig. 57C1
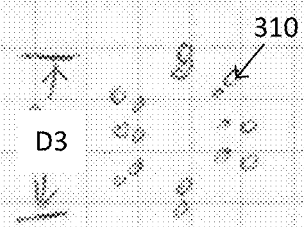
Fig. 57C2
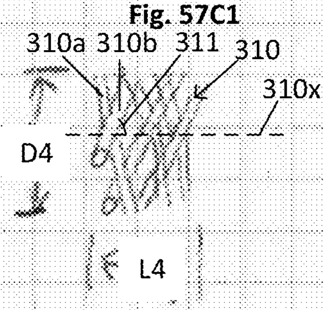
Fig. 57D1
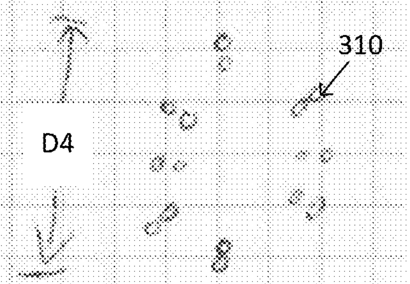
Fig. 57D2
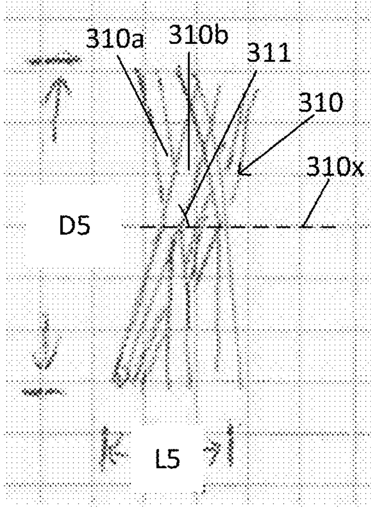
Fig. 57E1
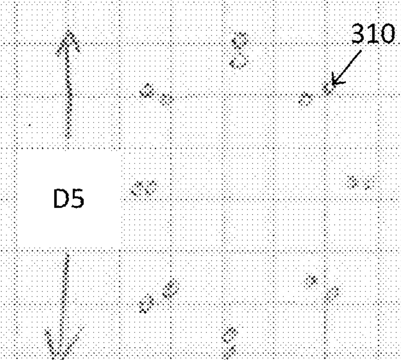
Fig. 57E2

TUBES AND METHODS OF EXPANDING AND/OR CONTRACTING TUBES

CROSS-REFERENCE TO RELATED APPLICATIONS

This application claims the benefit of priority to U.S. Provisional Application No. 63/380,331 filed Oct. 20, 2022, which is incorporated herein by reference in its entirety for all purposes.

BACKGROUND

1. Technical Field

This disclosure relates generally to tubes, for example, passively and/or actively expandable tubes.

2. Background

There remains a need for improved medical devices having tubing useful for such applications as access devices, catheters, introducers, or other such devices intended to provide access to regions within the body. For example, such devices can include dynamic wall structures that readily expand to allow passage of other medical devices, components, and/or implants where the dynamic wall returns to its normal diameter after passage of the secondary medical device, component and/or implant. Such dynamic wall structures can include active dynamic wall tubing where the expansion of the tubing requires activation. Alternatively, such dynamic wall structures can be passive where the tubing expands and contracts to accommodate passage of devices through the structure.

SUMMARY

This disclosure relates generally to tubes, for example, passively expandable tubes and/or actively expandable tubes.

Tubes are disclosed herein. For example, an expandable tubing is disclosed having a tube body and a reinforcement positioned on and/or within a wall of the tube body. The reinforcement and the tube body can be expandable from a neutral state to an expanded state. The reinforcement can be configured to inhibit or prevent the tube body from kinking.

Tubes are disclosed herein. For example, an expandable tubing having a tube body and a reinforcement positioned on and/or within a wall of the tube body is disclosed. The reinforcement and the tube body can be expandable from a neutral state to an expanded state. The reinforcement can be configured to transmit a compressive force along a length of the tube body and/or can be configured to transmit a torque along the tube body.

Tubes are disclosed. For example, an expandable tubing having a tube body that can be radially expandable from a neutral state to an expanded state such that a diameter of the tube body can be larger when the tube body is in the expanded state than when the tube body is in the neutral state is disclosed. Axial expansion of the tube body can be inhibited or prevented.

Tubes are disclosed. For example, an expandable tubing having a tube body comprising radial ePTFE having nodes and fibrils is disclosed. The radial ePTFE can be configured to allow radial expansion but prevent axial expansion of the tube body.

Tubes are disclosed. For example, an actively expandable tubing having a tube body and an actuator positioned on and/or within a wall of the tube body is disclosed. The actuator can be configured to axially expand to radially expand the tube body. Axial expansion of the tube body can be inhibited or prevented.

Tubes are disclosed. For example, an actively expandable tubing having a tube body comprising radial ePTFE and an actuator comprising axial ePTFE is disclosed. The radial ePTFE can be configured to allow radial expansion but prevent axial expansion of the tube body. The axial ePTFE can be configured to allow axial expansion but prevent radial expansion of the actuator.

Tubes are disclosed. For example, a non-expandable tubing having a tube body having a reinforcement wrapped helically around a lumen of the tube body is disclosed. Kinking of the tube body can be preventable via the reinforcement.

BRIEF DESCRIPTION OF THE DRAWINGS

The drawings shown and described are exemplary variations and non-limiting. Like reference numerals indicate identical or functionally equivalent features throughout.

FIG. 6D illustrates the side view of the tube of FIG. 6B when the tube is in an expanded configuration.

FIG. 7A illustrates the tube with a reinforcement (e.g., a reinforcement 308 having a nested configuration).

FIG. 7B illustrates the section of the tube in FIG. 7A in an expanded configuration.

FIG. 8A illustrates the tube with a reinforcement (e.g., a reinforcement 308 having a separated configuration).

FIG. 8B illustrates the section of the tube in FIG. 8A in an expanded configuration.

FIG. 9A illustrates the tube with a reinforcement (e.g., a reinforcement 308 having a peak-to-peak variation).

FIG. 9B illustrates the section of the tube in FIG. 9A in an expanded configuration.

FIG. 9E illustrates that the compressed side of the tube of FIG. 6B at section S3 can be, for example, a bottom view of the tube.

FIG. 9F illustrates that the tensioned side of the tube of FIG. 6B at section S3 can be, for example, a top view of the tube. FIG. 9F illustrates that the tensioned side of the tube at section S3 can be opposite the compressed side of the tube at section S3.

FIG. 9G illustrates that the compressed side of the tube of FIG. 6D at section S4 can be, for example, a bottom view of the tube.

FIG. 9H illustrates that the tensioned side of the tube of FIG. 6D at section S4 can be, for example, a top view of the tube. FIG. 9H illustrates that the tensioned side of the tube at section S4 can be opposite the compressed side of the tube at section S4.

FIG. 10A illustrates the tube with a first reinforcement (e.g., a reinforcement 308 having a nested configuration) and a second reinforcement (e.g., a reinforcement 310).

FIG. 10B illustrates the section of the tube in FIG. 10A in an expanded configuration.

FIG. 11A illustrates the tube with a first reinforcement (e.g., a reinforcement 308 having a separated configuration) and a second reinforcement (e.g., a reinforcement 310).

FIG. 11B illustrates the section of the tube in FIG. 11A in an expanded configuration.

FIG. 12A illustrates the tube with a first reinforcement (e.g., a reinforcement 308 having a peak-to-peak configuration) and a second reinforcement (e.g., a reinforcement 310).

FIG. 12B illustrates the section of the tube in FIG. 12A in an expanded configuration.

FIG. 12E illustrates that the compressed side of the tube of FIG. 6B at section S3 can be, for example, a bottom view of the tube.

FIG. 12F illustrates that the tensioned side of the tube of FIG. 6B at section S3 can be, for example, a top view of the tube. FIG. 12F illustrates that the tensioned side of the tube at section S3 can be opposite the compressed side of the tube at section S3.

FIG. 12G illustrates that the compressed side of the tube of FIG. 6D at section S4 can be, for example, a bottom view of the tube.

FIG. 12H illustrates that the tensioned side of the tube of FIG. 6D at section S4 can be, for example, a top view of the tube. FIG. 12H illustrates that the tensioned side of the tube at section S4 can be opposite the compressed side of the tube at section S4.

FIG. 13A illustrates the tube with a first reinforcement (e.g., a reinforcement 308 having a nested configuration) and a second reinforcement (e.g., a reinforcement 310).

FIG. 13B illustrates the section of the tube in FIG. 13A in an expanded configuration.

FIG. 14A illustrates the tube with a first reinforcement (e.g., a reinforcement 308 having a separated configuration) and a second reinforcement (e.g., a reinforcement 310).

FIG. 14B illustrates the section of the tube in FIG. 14A in an expanded configuration.

FIG. 15A illustrates the tube with a first reinforcement (e.g., a reinforcement 308 having a peak-to-peak configuration) and a second reinforcement (e.g., a reinforcement 310).

FIG. 15B illustrates the section of the tube in FIG. 15A in an expanded configuration.

FIG. 15E illustrates that the compressed side of the tube of FIG. 6B at section S3 can be, for example, a bottom view of the tube.

FIG. 15F illustrates that the tensioned side of the tube of FIG. 6B at section S3 can be, for example, a top view of the tube. FIG. 15F illustrates that the tensioned side of the tube at section S3 can be opposite the compressed side of the tube at section S3.

FIG. 15G illustrates that the compressed side of the tube of FIG. 6D at section S4 can be, for example, a bottom view of the tube.

FIG. 15H illustrates that the tensioned side of the tube of FIG. 6D at section S4 can be, for example, a top view of the tube. FIG. 15H illustrates that the tensioned side of the tube at section S4 can be opposite the compressed side of the tube at section S4.

FIG. 16A illustrates the tube with a first reinforcement (e.g., a reinforcement 308 having a separated configuration) and a second reinforcement (e.g., a reinforcement 310).

FIG. 16B illustrates the section of the tube in FIG. 16A in an expanded configuration.

FIG. 17A illustrates the tube with a first reinforcement (e.g., a reinforcement 308 having a separated configuration) and a second reinforcement (e.g., a reinforcement 310).

FIG. 17B illustrates the section of the tube in FIG. 17A in an expanded configuration.

FIG. 18A illustrates the tube with a first reinforcement (e.g., a reinforcement 308 having a peak-to-peak configuration) and a second reinforcement (e.g., a reinforcement 310).

FIG. 18B illustrates the section of the tube in FIG. 18A in an expanded configuration.

FIG. 18E illustrates that the compressed side of the tube of FIG. 6B at section S3 can be, for example, a bottom view of the tube.

FIG. 18F illustrates that the tensioned side of the tube of FIG. 6B at section S3 can be, for example, a top view of the tube. FIG. 18F illustrates that the tensioned side of the tube at section S3 can be opposite the compressed side of the tube at section S3.

FIG. 18G illustrates that the compressed side of the tube of FIG. 6D at section S4 can be, for example, a bottom view of the tube.

FIG. 18H illustrates that the tensioned side of the tube of FIG. 6D at section S4 can be, for example, a top view of the tube. FIG. 18H illustrates that the tensioned side of the tube at section S4 can be opposite the compressed side of the tube at section S4.

FIG. 19A illustrates the tube with a reinforcement (e.g., a reinforcement 308 having a nested configuration).

FIG. 19B illustrates the section of the tube in FIG. 19A in an expanded configuration.

FIG. 20A illustrates the tube with a reinforcement (e.g., a reinforcement 308 having a separated configuration).

FIG. 20B illustrates the section of the tube in FIG. 20A in an expanded configuration.

FIG. 21A illustrates the tube with a reinforcement (e.g., a reinforcement 308 having a peak-to-peak variation).

FIG. 21B illustrates the section of the tube in FIG. 21A in an expanded configuration.

FIG. 21E illustrates that the compressed side of the tube of FIG. 6B at section S3 can be, for example, a bottom view of the tube.

FIG. 21F illustrates that the tensioned side of the tube of FIG. 6B at section S3 can be, for example, a top view of the tube. FIG. 21F illustrates that the tensioned side of the tube at section S3 can be opposite the compressed side of the tube at section S3.

FIG. 21G illustrates that the compressed side of the tube of FIG. 6D at section S4 can be, for example, a bottom view of the tube.

FIG. 21H illustrates that the tensioned side of the tube of FIG. 6D at section S4 can be, for example, a top view of the tube. FIG. 21H illustrates that the tensioned side of the tube at section S4 can be opposite the compressed side of the tube at section S4.

FIG. 22A illustrates the tube with a reinforcement (e.g., a reinforcement 308 having a nested configuration).

FIG. 22B illustrates the section of the tube in FIG. 22A in an expanded configuration.

FIG. 23A illustrates the tube with a reinforcement (e.g., a reinforcement 308 having a separated configuration).

FIG. 23B illustrates the section of the tube in FIG. 23A in an expanded configuration.

FIG. 24A illustrates the tube with a reinforcement (e.g., a reinforcement 308 having a peak-to-peak variation).

FIG. 24B illustrates the section of the tube in FIG. 24A in an expanded configuration.

FIG. 24E illustrates that the compressed side of the tube of FIG. 6B at section S3 can be, for example, a bottom view of the tube.

FIG. 24F illustrates that the tensioned side of the tube of FIG. 6B at section S3 can be, for example, a top view of the tube. FIG. 24F illustrates that the tensioned side of the tube at section S3 can be opposite the compressed side of the tube at section S3.

FIG. 24G illustrates that the compressed side of the tube of FIG. 6D at section S4 can be, for example, a bottom view of the tube.

FIG. 24H illustrates that the tensioned side of the tube of FIG. 6D at section S4 can be, for example, a top view of the tube. FIG. 24H illustrates that the tensioned side of the tube at section S4 can be opposite the compressed side of the tube at section S4.

FIG. 25A illustrates the tube with a first reinforcement (e.g., a reinforcement 308 having a nested configuration) and a second reinforcement (e.g., a reinforcement 310).

FIG. 25B illustrates the section of the tube in FIG. 25A in an expanded configuration.

FIG. 25C illustrates a cross-sectional view of the tube of FIG. 25A taken along line 25C-25C.

FIG. 25D illustrates a cross-sectional view of the tube of FIG. 25B taken along line 25D-25D.

FIG. 26A is a closeup side view of the tube of FIG. 6A at section S1, for example, when the tube is in a non-expanded configuration. FIG. 26A illustrates the tube with an actuator (e.g., an actuator 120) and a reinforcement (e.g., a reinforcement 308 having a nested configuration).

FIG. 26B is a closeup side view of the tube of FIG. 6C at section S2 after the tube is expanded, for example, when the tube is in an expanded configuration. FIG. 26B illustrates the section of the tube in FIG. 26A in an expanded configuration.

FIG. 26C illustrates a cross-sectional view of the tube of FIG. 26A taken along line 26C-26C.

FIG. 26D illustrates a cross-sectional view of the tube of FIG. 26B taken along line 26D-26D.

FIG. 27A is a closeup side view of the tube of FIG. 6A at section S5, for example, when the tube is in a non-expanded configuration. FIG. 27A illustrates the tube with an actuator (e.g., an actuator 120) and a reinforcement (e.g., a reinforcement 308 having a separated configuration).

FIG. 27B is a closeup side view of the tube of FIG. 6C at section S6 after the tube is expanded, for example, when the tube is in an expanded configuration. FIG. 27B illustrates the section of the tube in FIG. 27A in an expanded configuration.

FIG. 27C illustrates a cross-sectional view of the tube of FIG. 27A taken along line 27C-27C.

FIG. 27D illustrates a cross-sectional view of the tube of FIG. 27B taken along line 27D-27D.

FIG. 28A is a closeup side view of the tube of FIG. 6A at section S1, for example, when the tube is in a non-expanded configuration. FIG. 28A illustrates the tube with an actuator (e.g., an actuator 120) and a reinforcement (e.g., a reinforcement 308 having a peak-to-peak configuration).

FIG. 28B is a closeup side view of the tube of FIG. 6C at section S2 after the tube is expanded, for example, when the tube is in an expanded configuration. FIG. 28B illustrates the section of the tube in FIG. 28A in an expanded configuration.

Figure 28A:
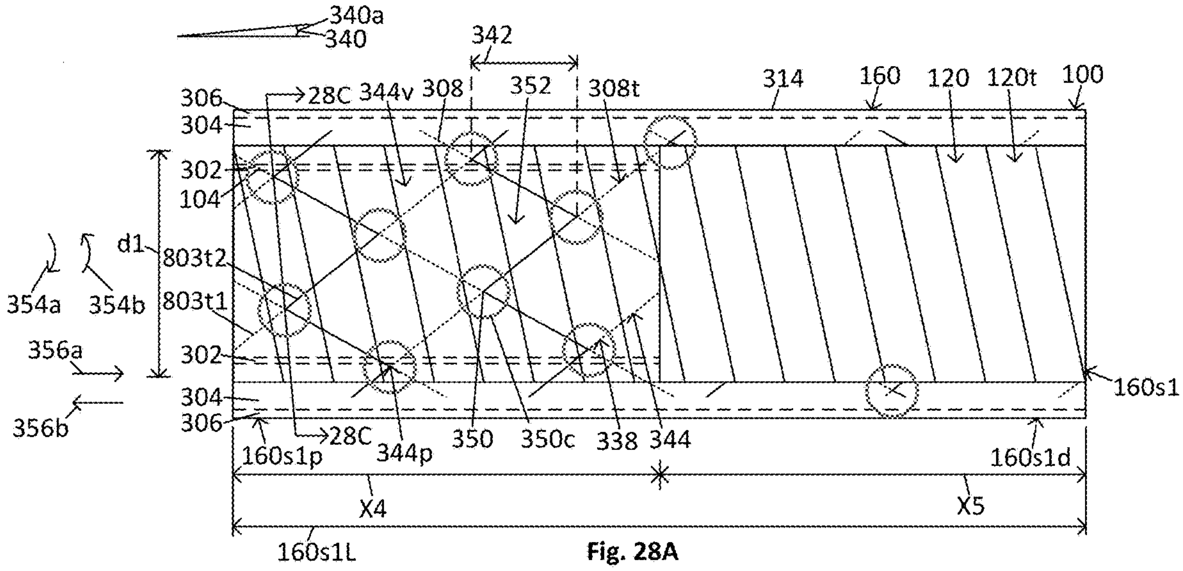
Figure 28B:
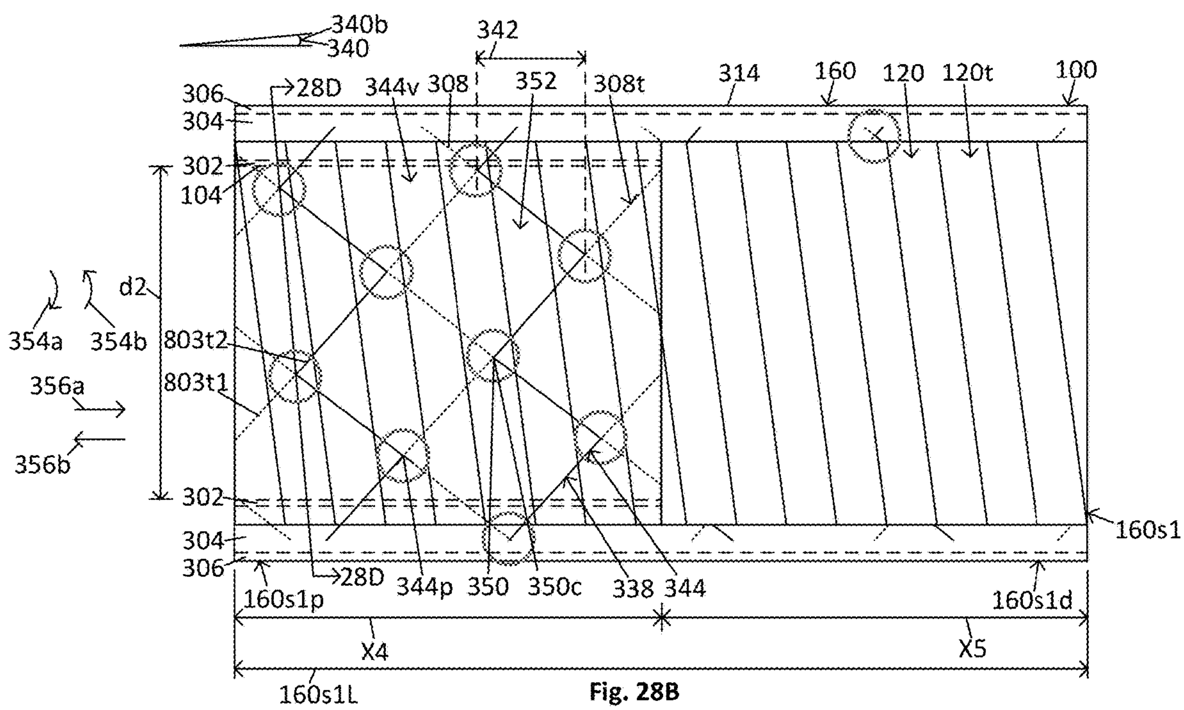
Figure 28C:
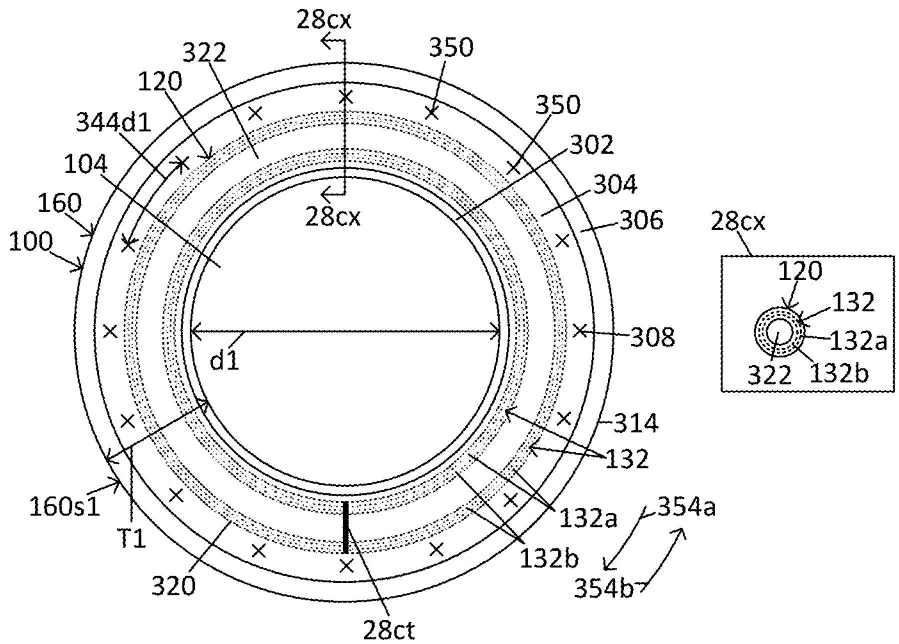

FIG. 28C illustrates a cross-sectional view of the tube of FIG. 28A taken along line 28C-28C.

Figure 28D:
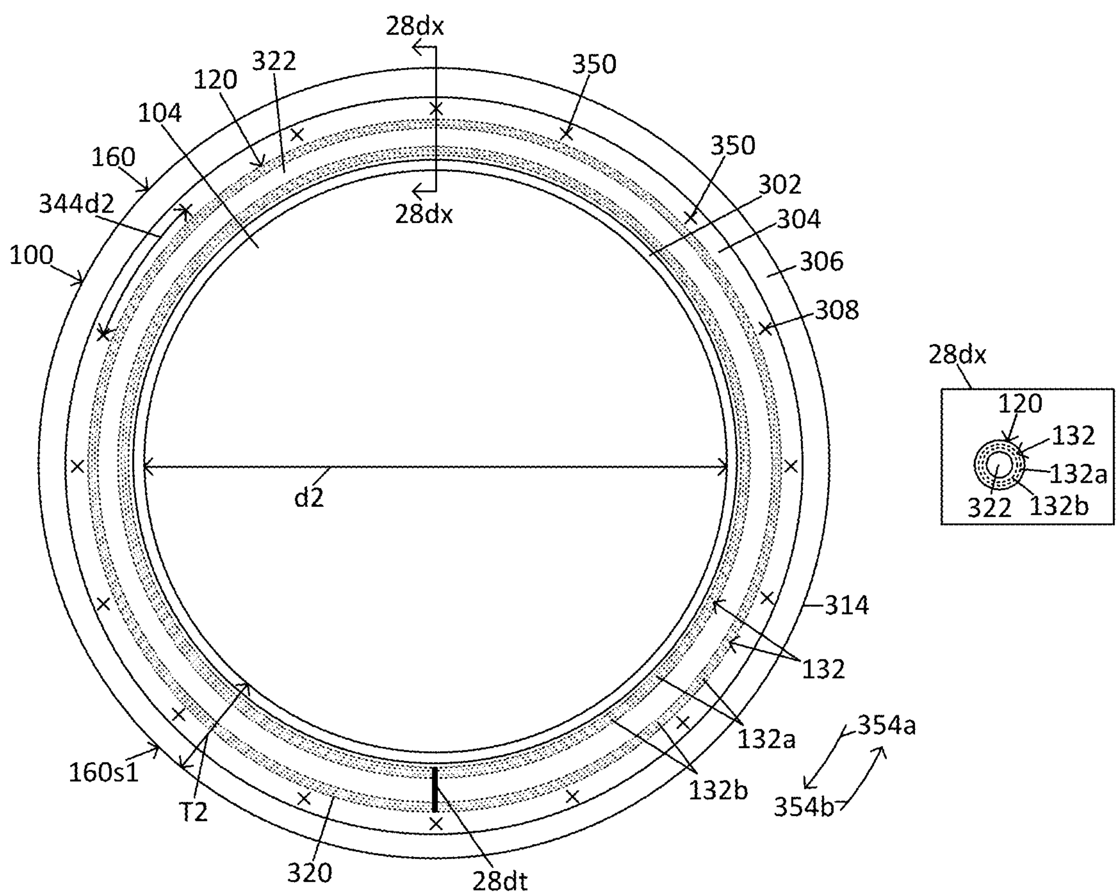

FIG. 28D illustrates a cross-sectional view of the tube of FIG. 28B taken along line 28D-28D.

Figure 6A:
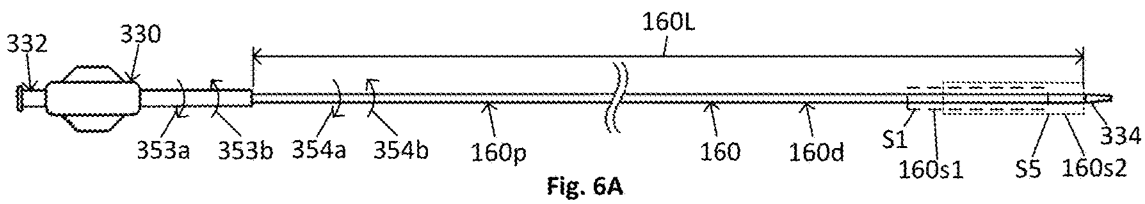
FIG. 6A illustrates a side view of variation of a tube in a straight, non-expanded configuration.
Figure 29A:
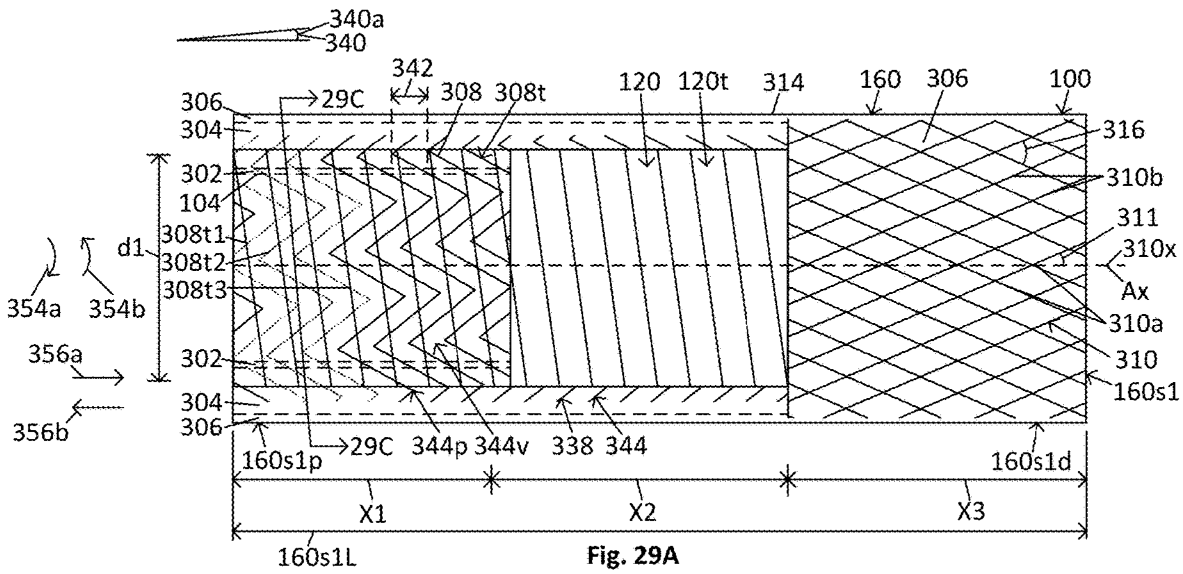

FIG. 29A is a closeup side view of the tube of FIG. 6A at section S1, for example, when the tube is in a non-expanded configuration. FIG. 29A illustrates the tube with an actuator (e.g., an actuator 120), a first reinforcement (e.g., a reinforcement 308 having a nested configuration), and a second reinforcement (e.g., a reinforcement 310).

Figure 6B:
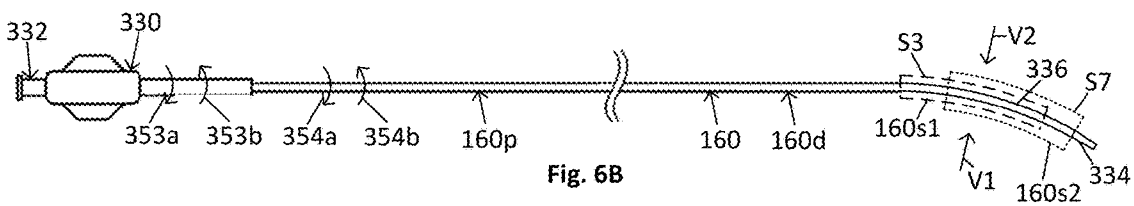
FIG. 6B illustrates the side view of the tube of FIG. 6A when the tube is in a curved, non-expanded configuration.
Figure 6C:
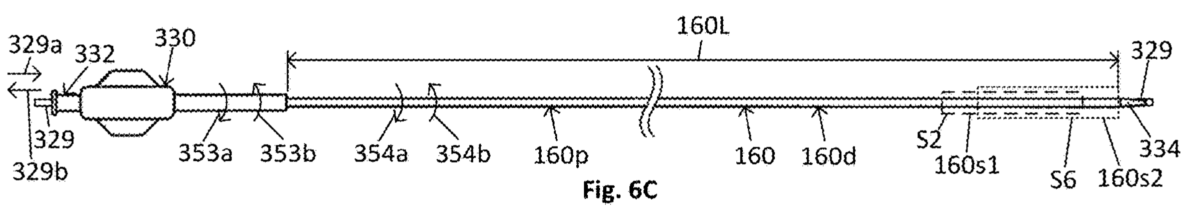
FIG. 6C illustrates the side view of the tube of FIG. 6A when the tube is in an expanded configuration.
Figure 29B:
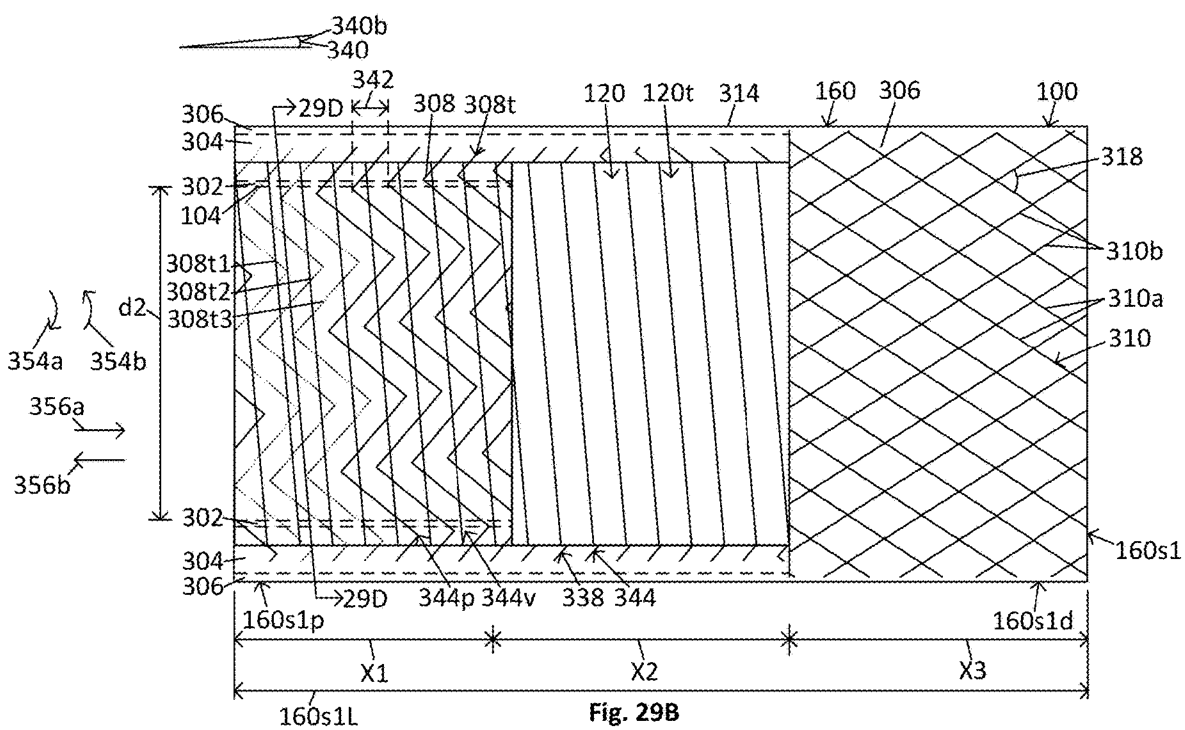

FIG. 29B is a closeup side view of the tube of FIG. 6C at section S2 after the tube is expanded, for example, when the tube is in an expanded configuration. FIG. 29B illustrates the section of the tube in FIG. 29A in an expanded configuration.

Figure 29C:
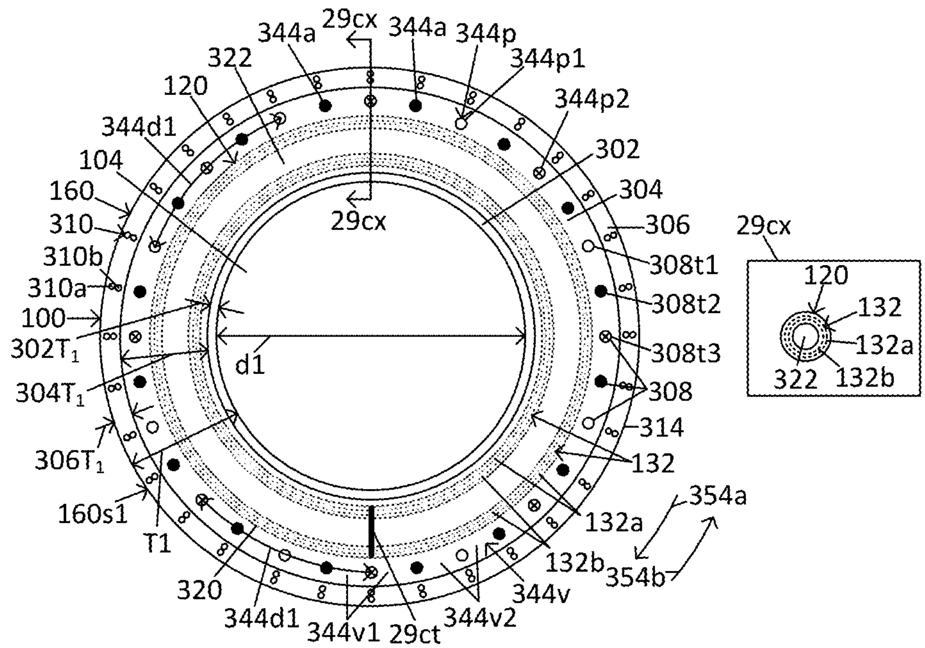

FIG. 29C illustrates a cross-sectional view of the tube of FIG. 29A taken along line 29C-29C.

Figure 29D:
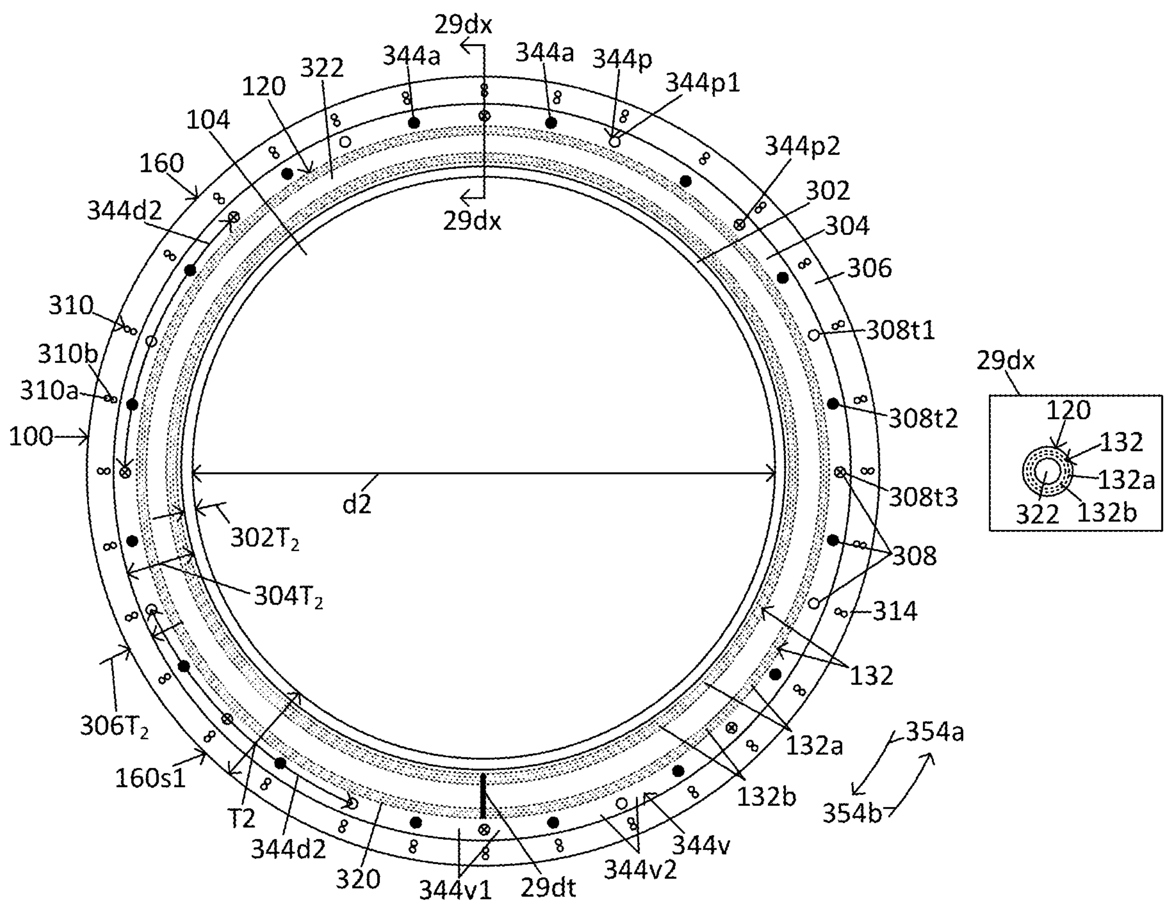

FIG. 29D illustrates a cross-sectional view of the tube of FIG. 29B taken along line 29D-29D.

Figure 30A:
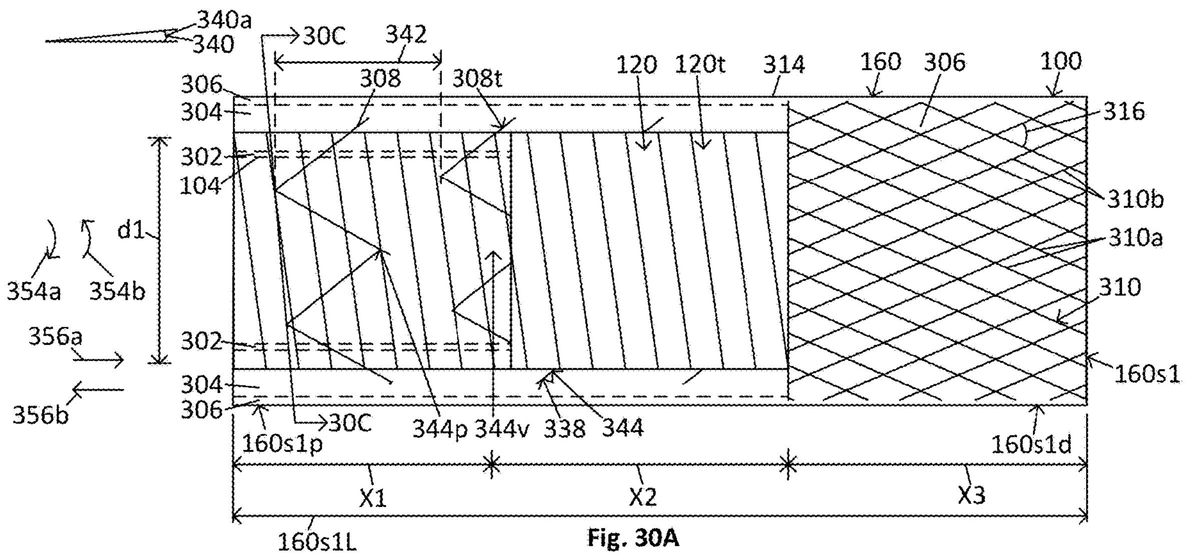

FIG. 30A is a closeup side view of the tube of FIG. 6A at section S1, for example, when the tube is in a non-expanded configuration. FIG. 30A illustrates the tube with an actuator (e.g., an actuator 120), a first reinforcement (e.g., a reinforcement 308 having a separated configuration), and a second reinforcement (e.g., a reinforcement 310).

Figure 30B:
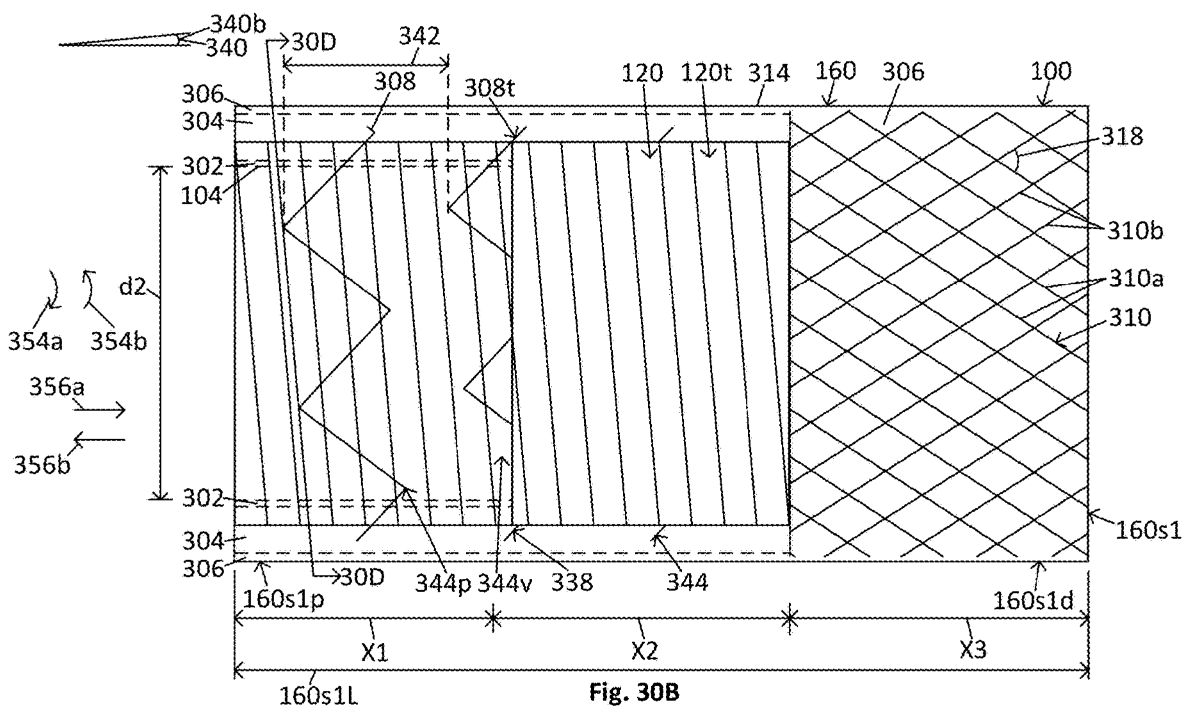

FIG. 30B is a closeup side view of the tube of FIG. 6C at section S2 after the tube is expanded, for example, when the tube is in an expanded configuration. FIG. 30B illustrates the section of the tube in FIG. 30A in an expanded configuration.

Figure 30C:
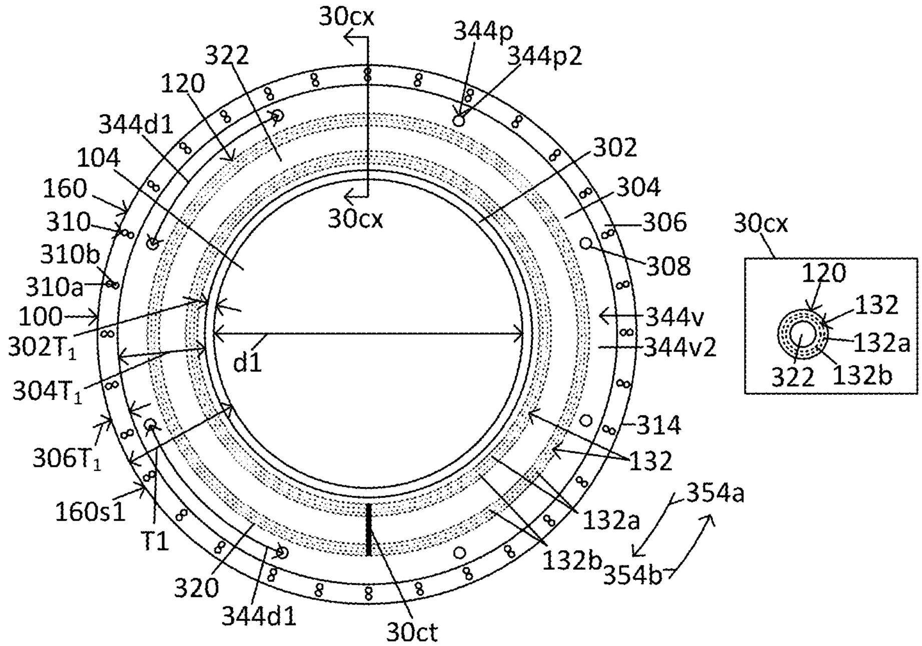

FIG. 30C illustrates a cross-sectional view of the tube of FIG. 30A taken along line 30C-30C.

Figure 30D:
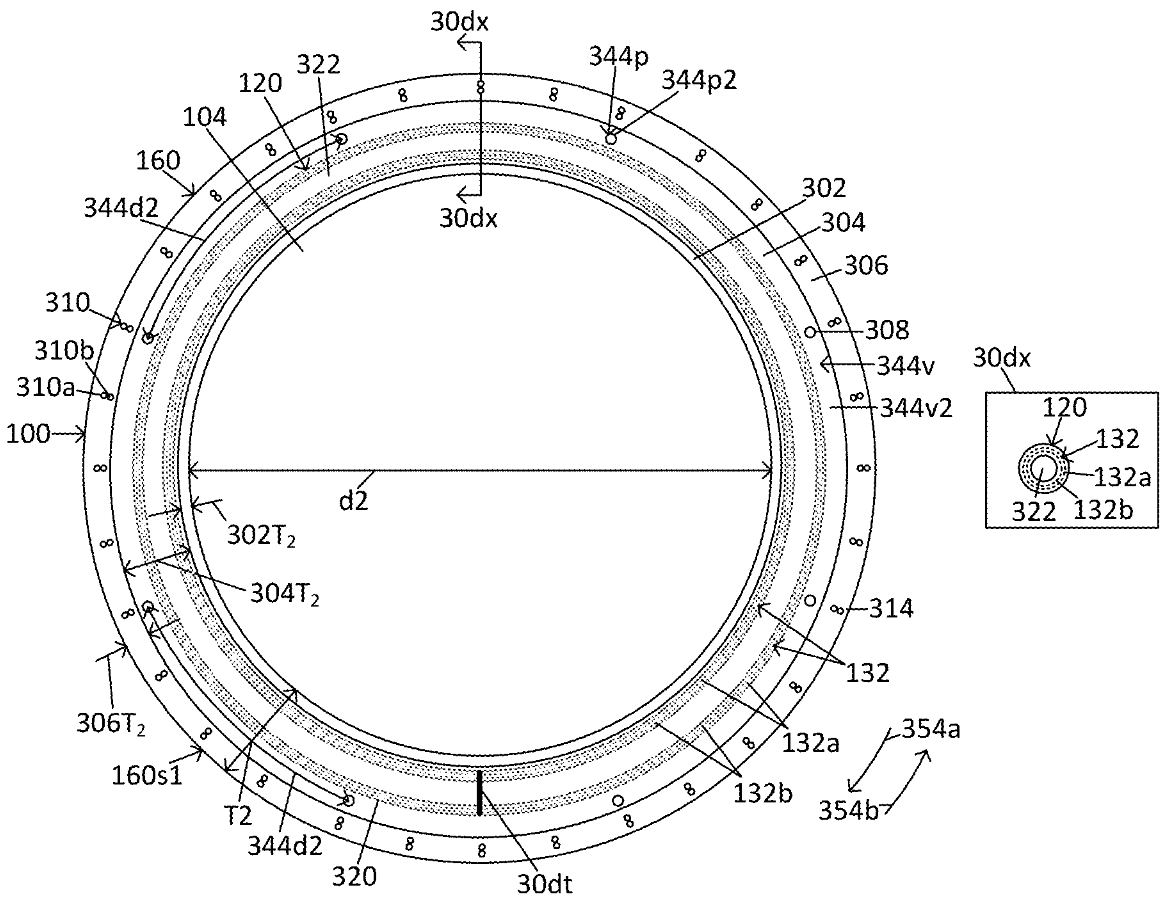

FIG. 30D illustrates a cross-sectional view of the tube of FIG. 30B taken along line 30D-30D.

Figure 31A:
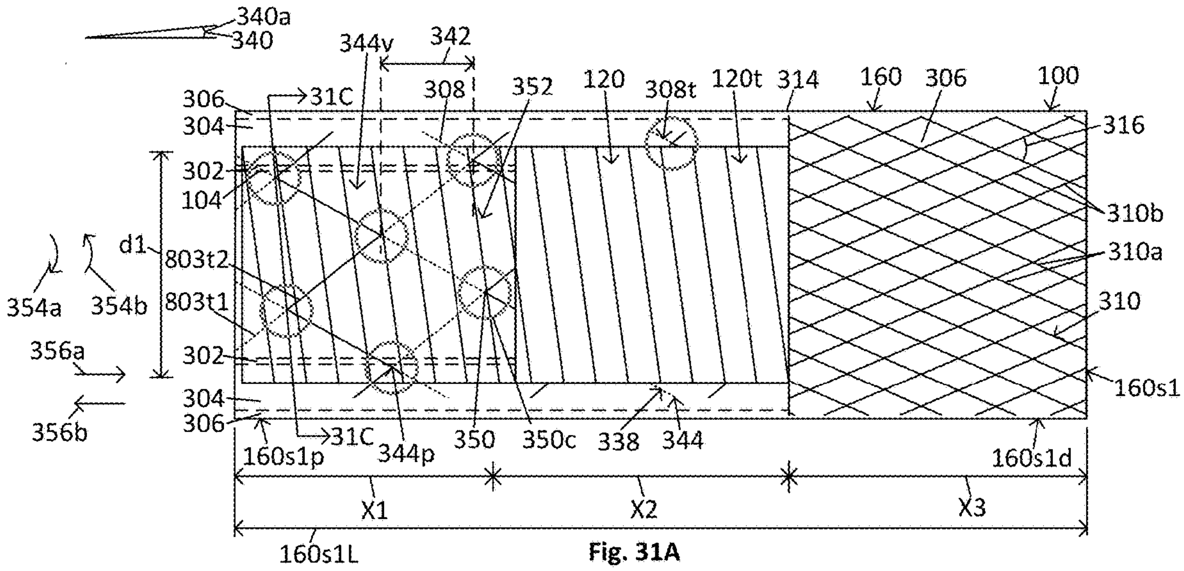

FIG. 31A is a closeup side view of the tube of FIG. 6A at section S1, for example, when the tube is in a non-expanded configuration. FIG. 31A illustrates the tube with an actuator (e.g., an actuator 120), a first reinforcement (e.g., a reinforcement 308 having a peak-to-peak configuration), and a second reinforcement (e.g., a reinforcement 310).

FIG. 31B is a closeup side view of the tube of FIG. 6C at section S2 after the tube is expanded, for example, when the tube is in an expanded configuration. FIG. 31B illustrates the section of the tube in FIG. 31A in an expanded configuration.

Figure 31D:
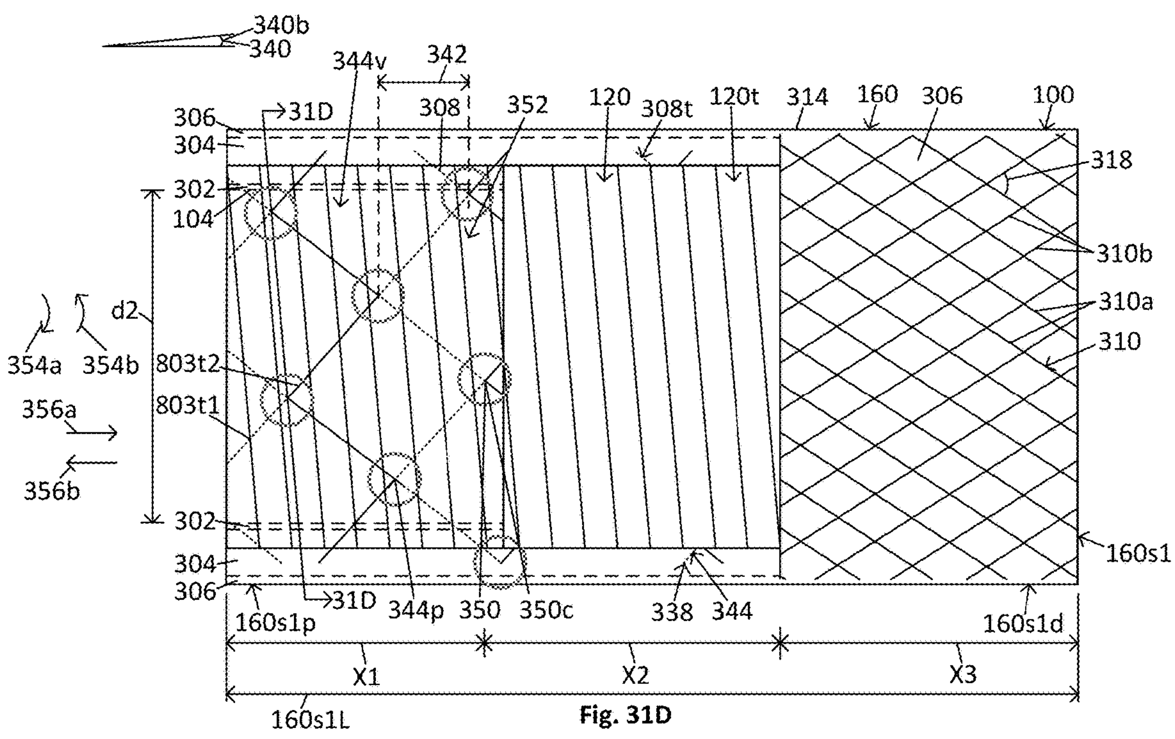
Figure 31C:
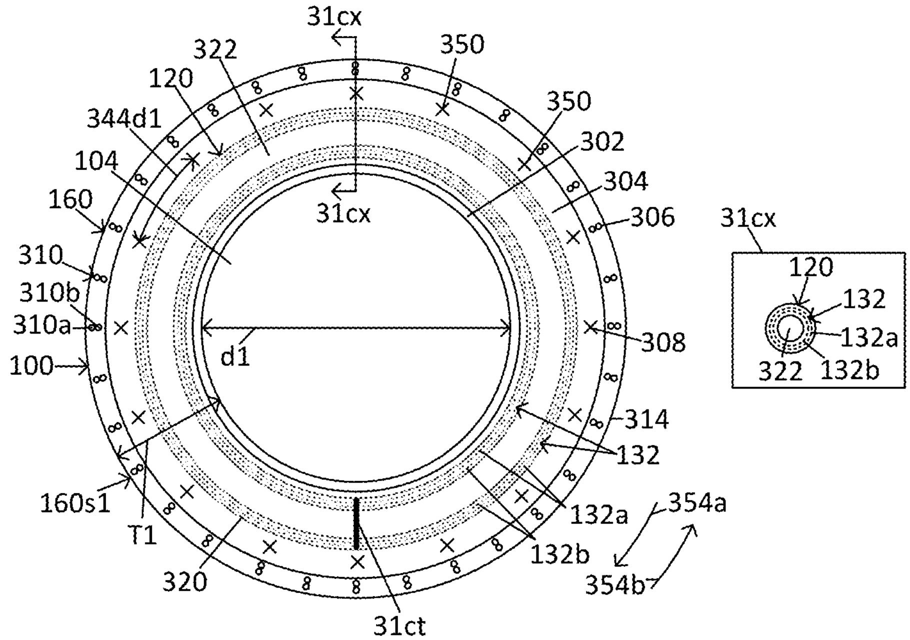
Figure 31D:
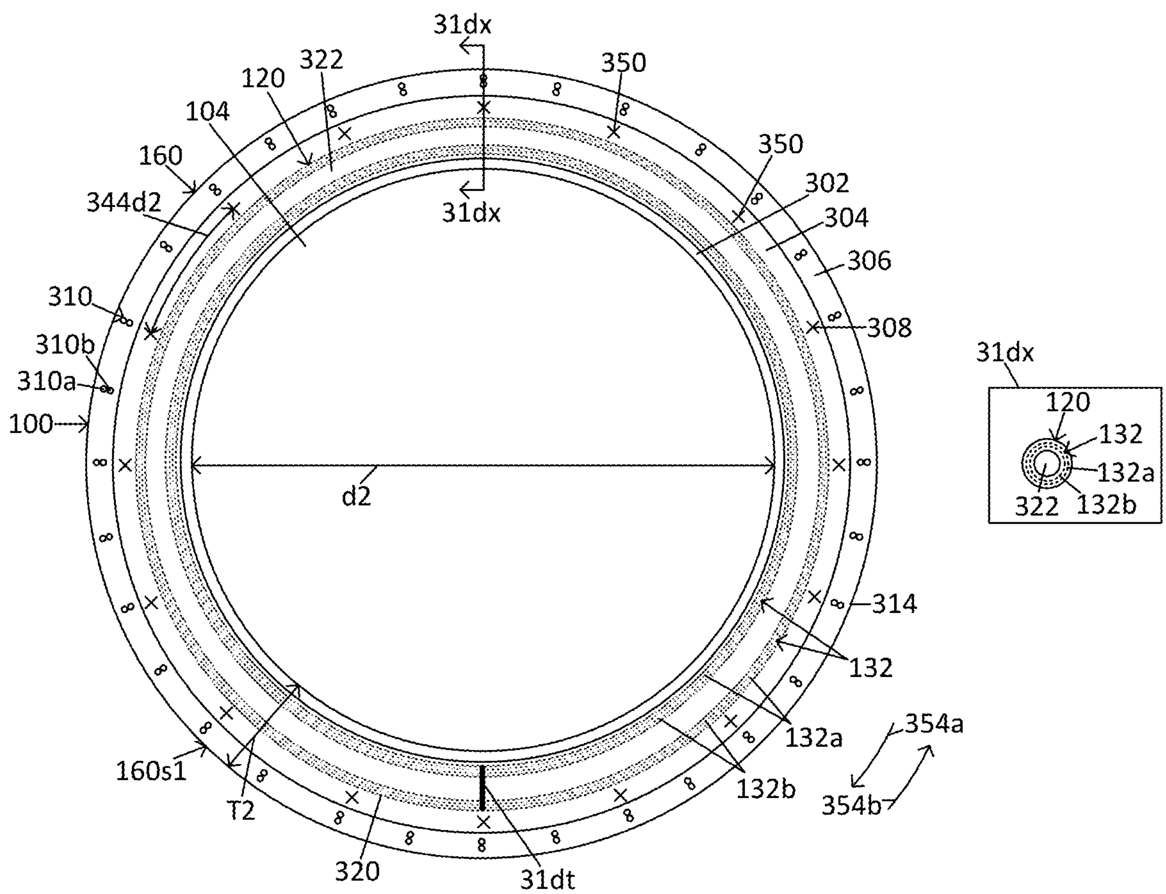

FIG. 31C illustrates a cross-sectional view of the tube of FIG. 31A taken along line 31C-31C.

FIG. 31D illustrates a cross-sectional view of the tube of FIG. 31B taken along line 31D-31D.

Figure 32A:
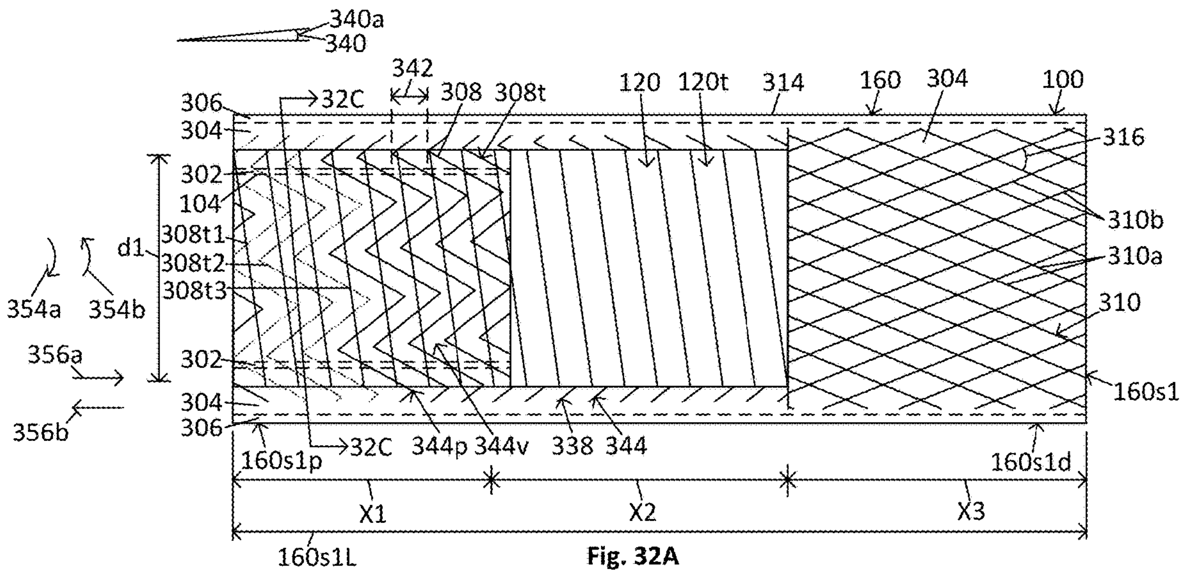

FIG. 32A is a closeup side view of the tube of FIG. 6A at section S1, for example, when the tube is in a non-expanded configuration. FIG. 32A illustrates the tube with an actuator (e.g., an actuator 120), a first reinforcement (e.g., a reinforcement 308 having a nested configuration), and a second reinforcement (e.g., a reinforcement 310).

Figure 32B:
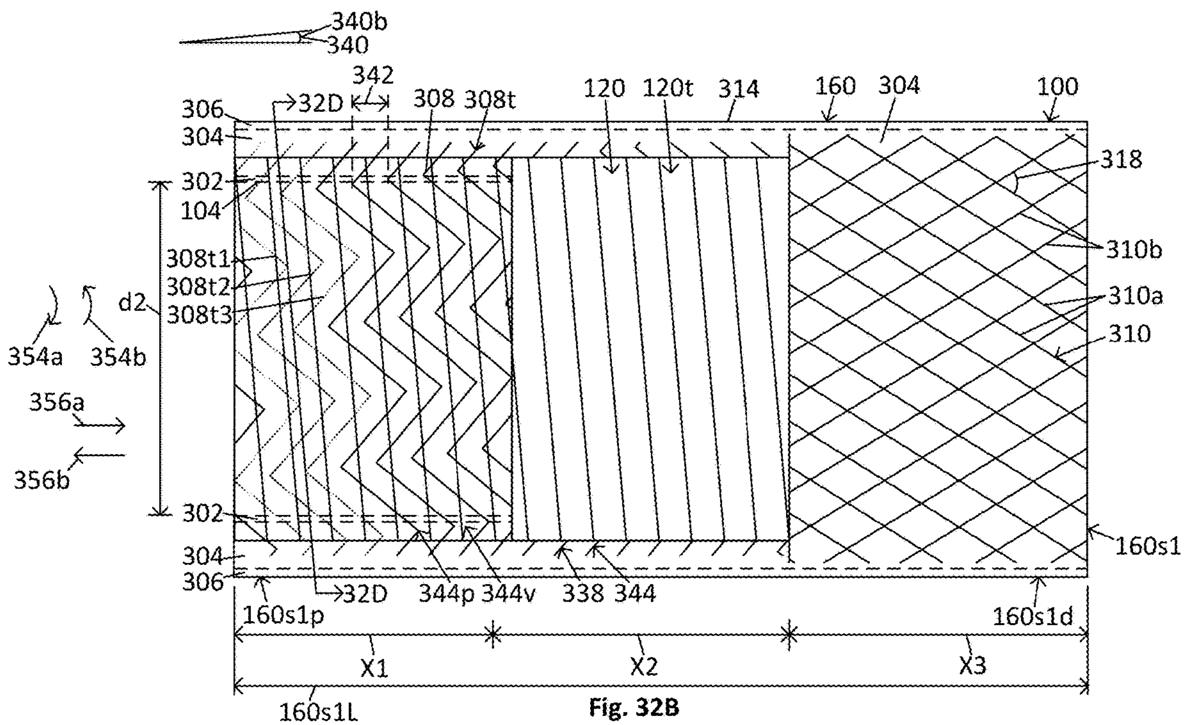

FIG. 32B is a closeup side view of the tube of FIG. 6C at section S2 after the tube is expanded, for example, when the tube is in an expanded configuration. FIG. 32B illustrates the section of the tube in FIG. 32A in an expanded configuration.

Figure 32C:
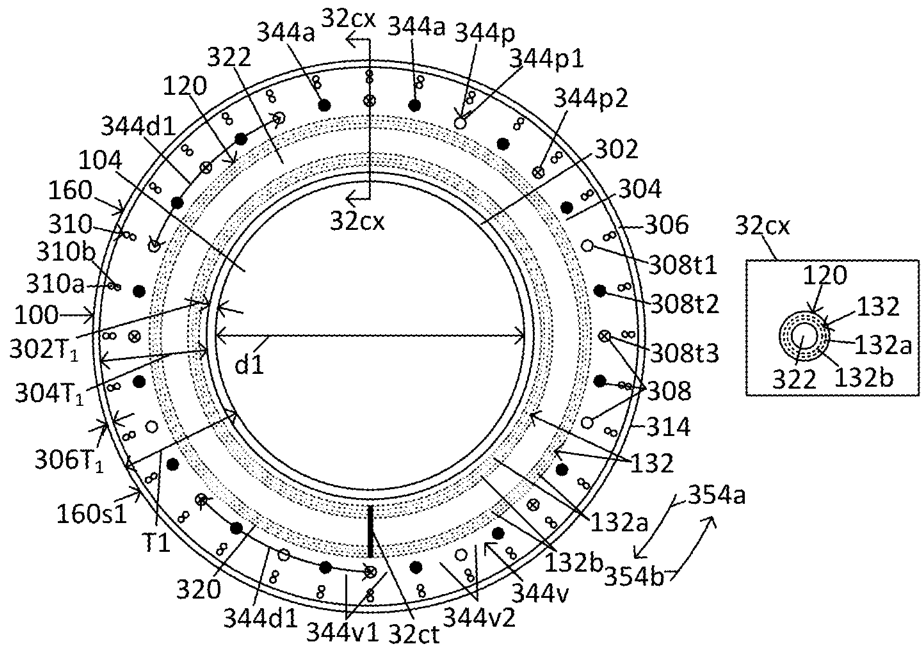

FIG. 32C illustrates a cross-sectional view of the tube of FIG. 32A taken along line 32C-32C.

Figure 32D:
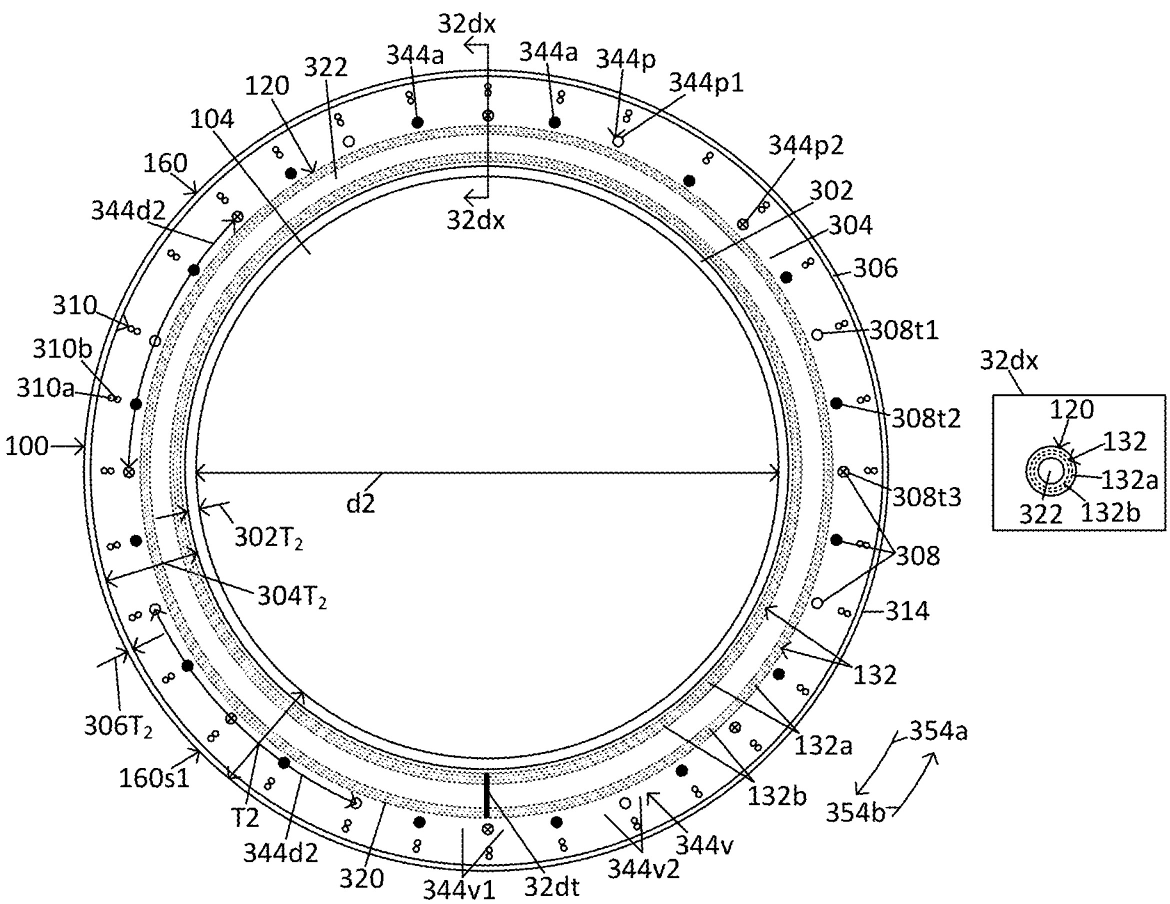

FIG. 32D illustrates a cross-sectional view of the tube of FIG. 32B taken along line 32D-32D.

Figure 33A:
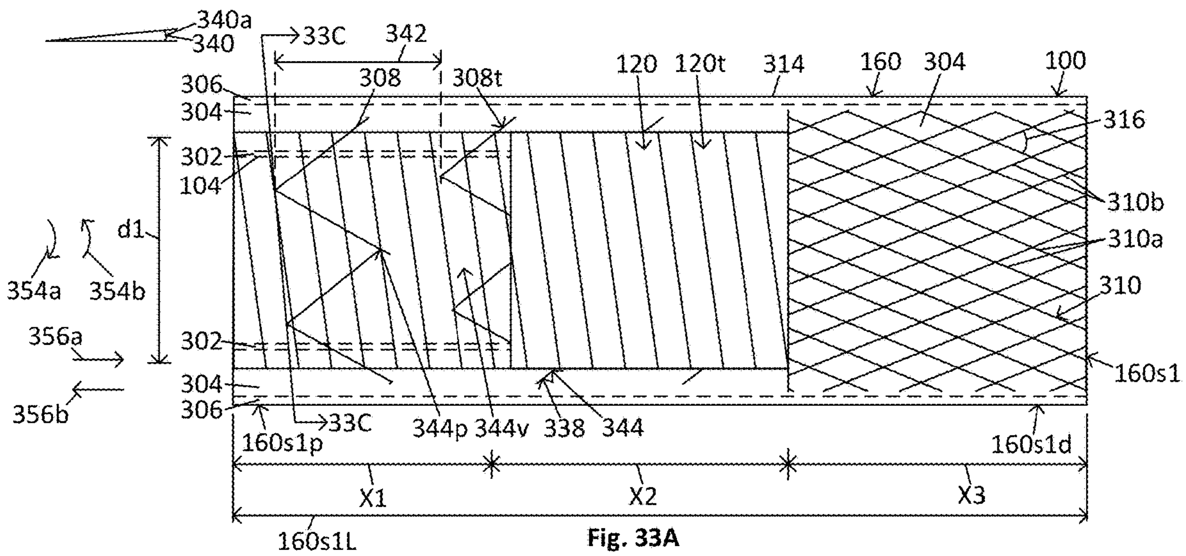

FIG. 33A is a closeup side view of the tube of FIG. 6A at section S1, for example, when the tube is in a non-expanded configuration. FIG. 33A illustrates the tube with an actuator (e.g., an actuator 120), a first reinforcement (e.g., a reinforcement 308 having a separated configuration), and a second reinforcement (e.g., a reinforcement 310).

Figure 33B:
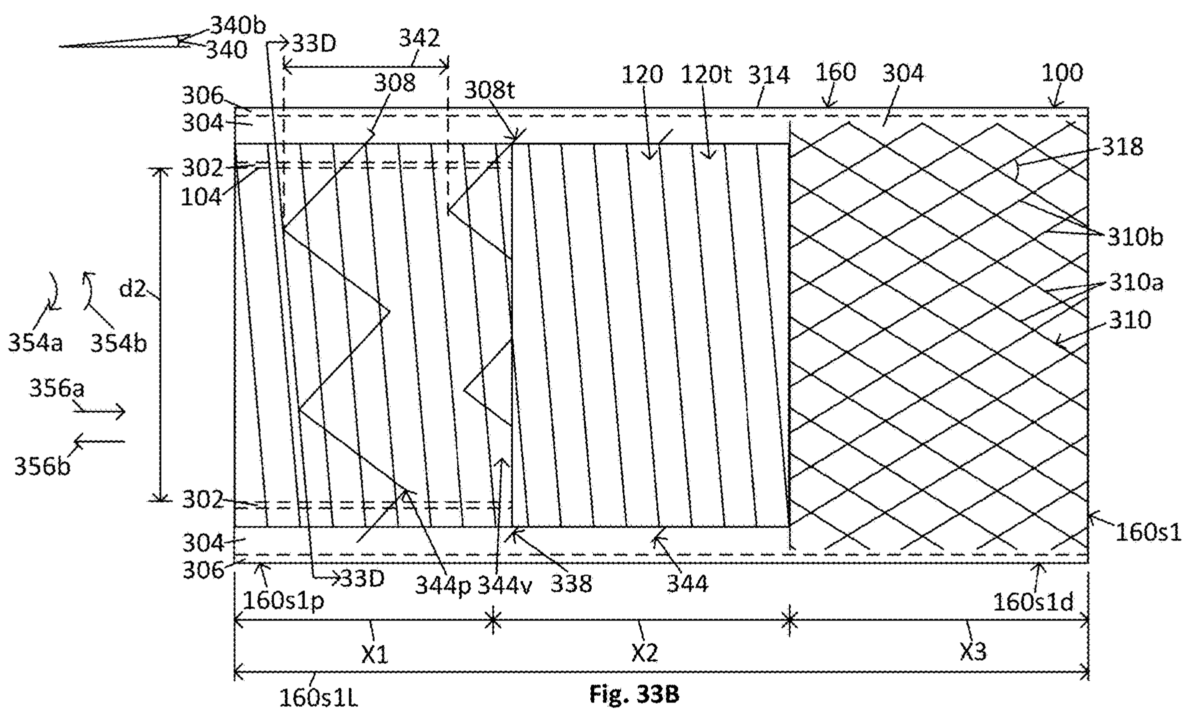

FIG. 33B is a closeup side view of the tube of FIG. 6C at section S2 after the tube is expanded, for example, when the tube is in an expanded configuration. FIG. 33B illustrates the section of the tube in FIG. 33A in an expanded configuration.

Figure 33C:
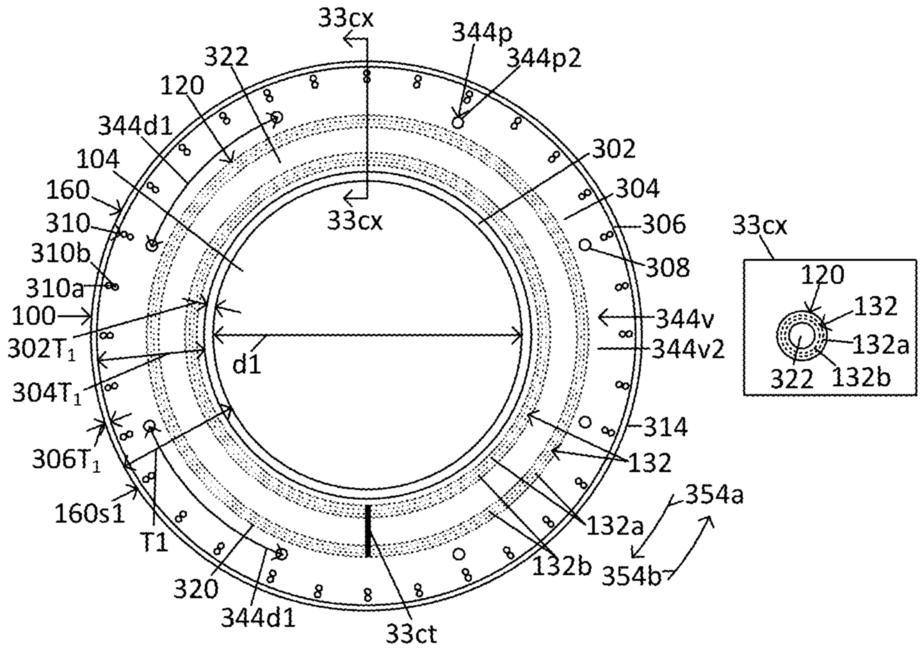

FIG. 33C illustrates a cross-sectional view of the tube of FIG. 33A taken along line 33C-33C.

Figure 33D:
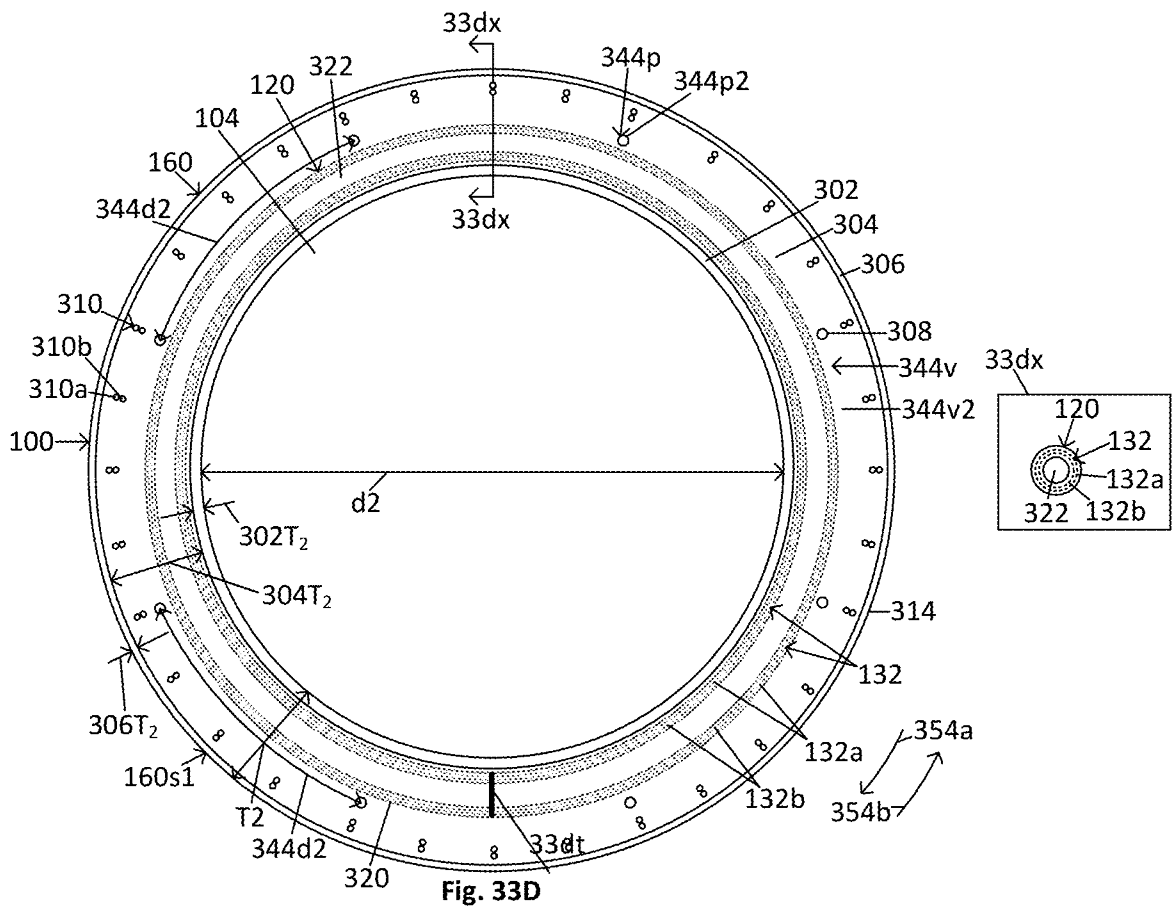

FIG. 33D illustrates a cross-sectional view of the tube of FIG. 33B taken along line 33D-33D.

Figure 34A:
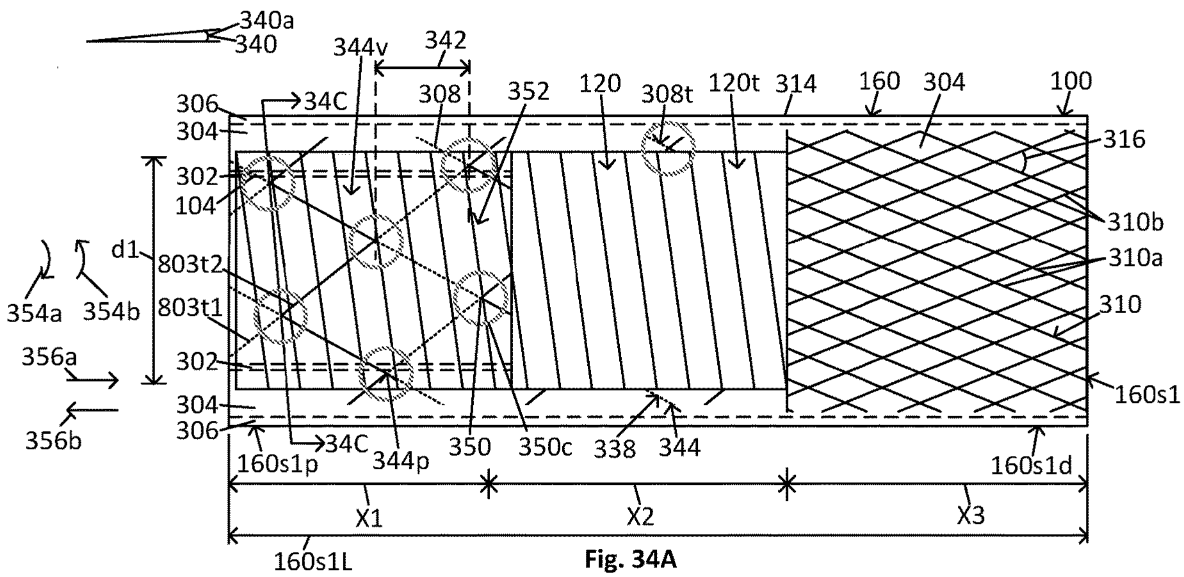

FIG. 34A is a closeup side view of the tube of FIG. 6A at section S1, for example, when the tube is in a non-expanded configuration. FIG. 34A illustrates the tube with an actuator (e.g., an actuator 120), a first reinforcement (e.g., a reinforcement 308 having a peak-to-peak configuration), and a second reinforcement (e.g., a reinforcement 310).

Figure 34B:
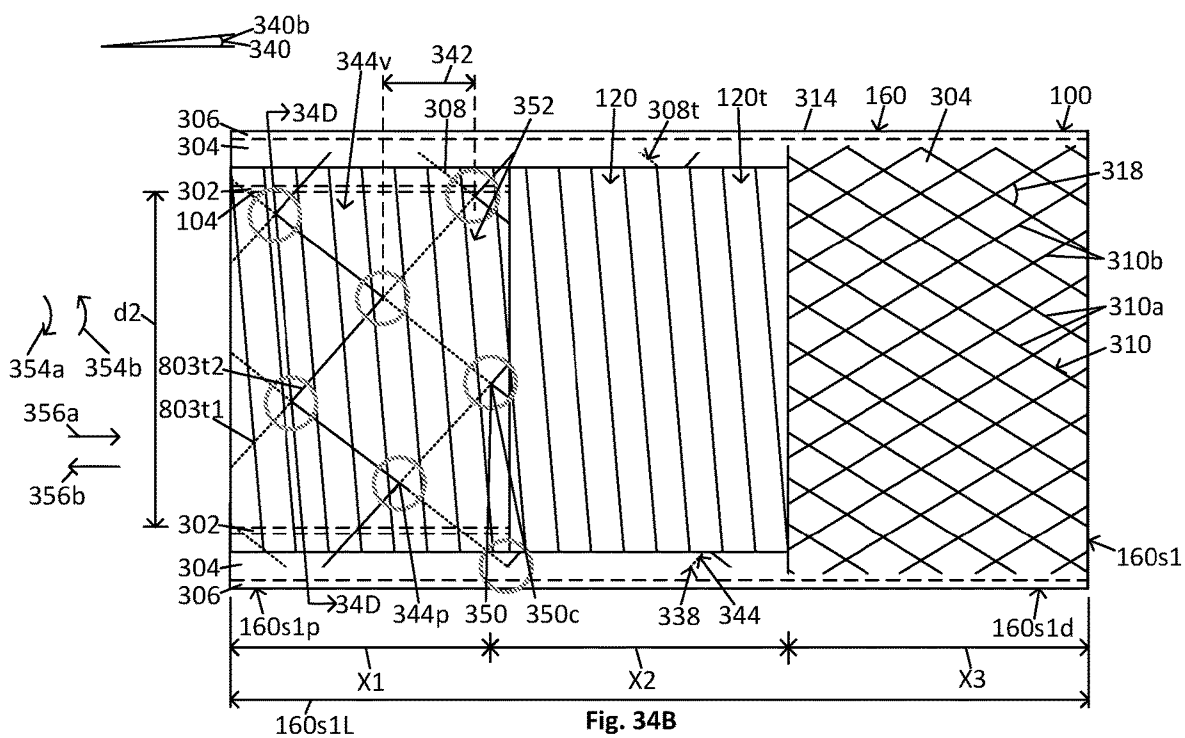

FIG. 34B is a closeup side view of the tube of FIG. 6C at section S2 after the tube is expanded, for example, when the tube is in an expanded configuration. FIG. 34B illustrates the section of the tube in FIG. 34A in an expanded configuration.

Figure 34C:
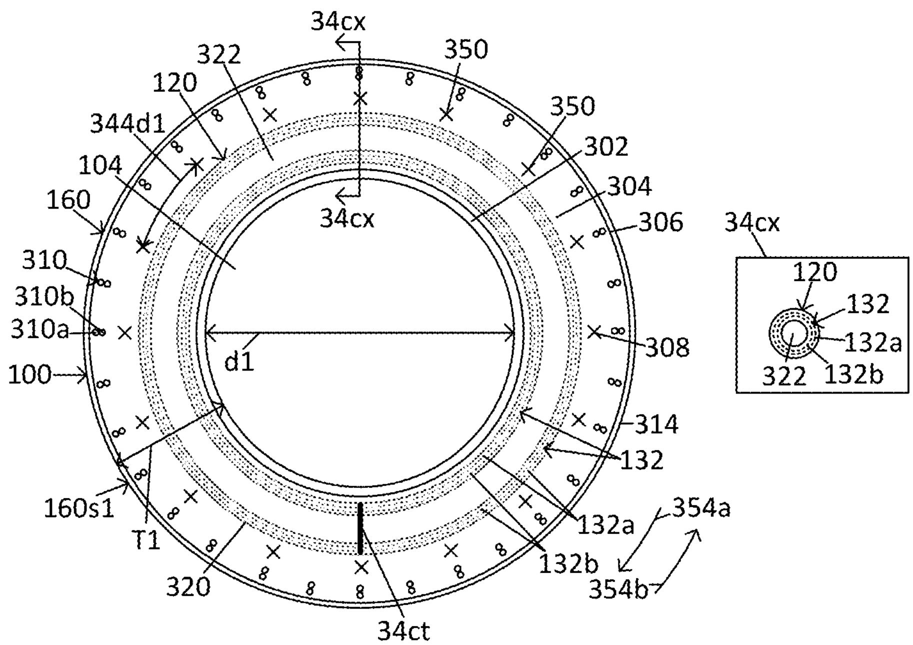

FIG. 34C illustrates a cross-sectional view of the tube of FIG. 34A taken along line 34C-34C.

Figure 34D:
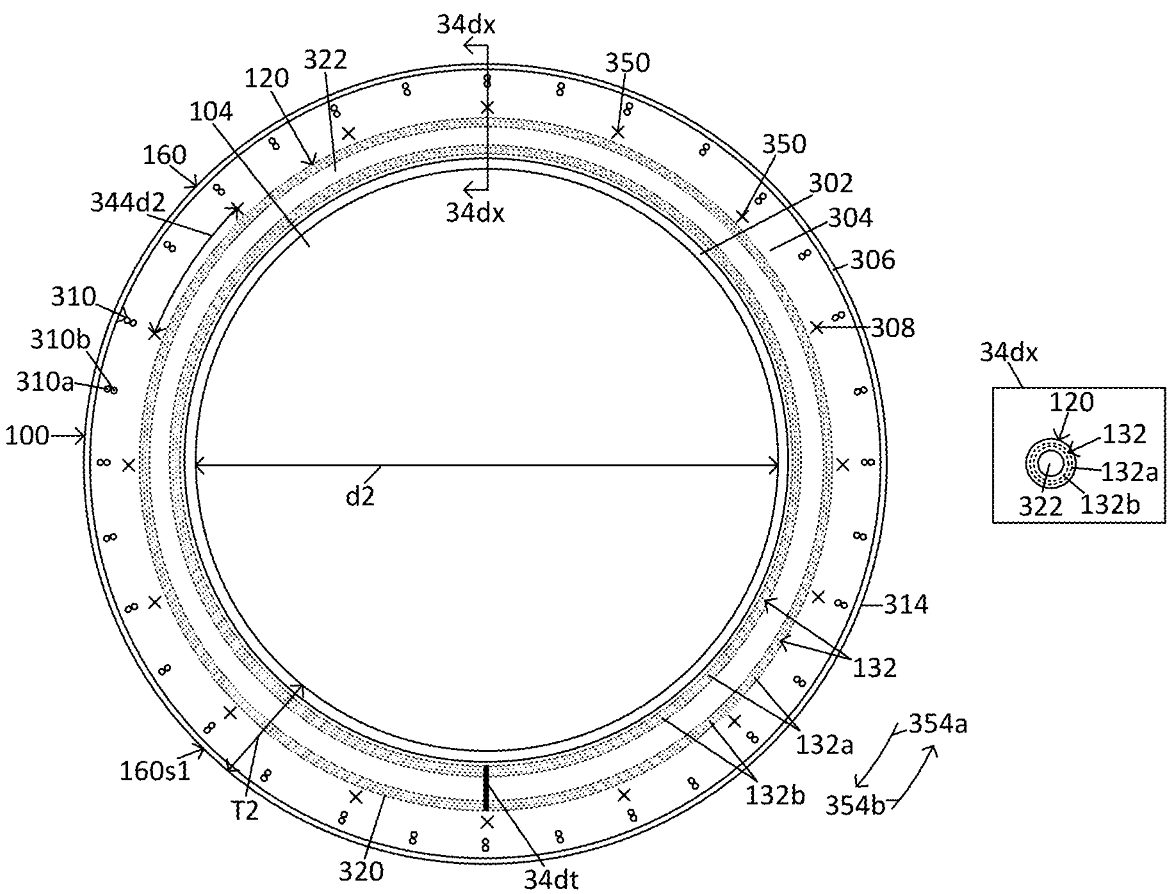

FIG. 34D illustrates a cross-sectional view of the tube of FIG. 34B taken along line 34D-34D.

Figure 35A:
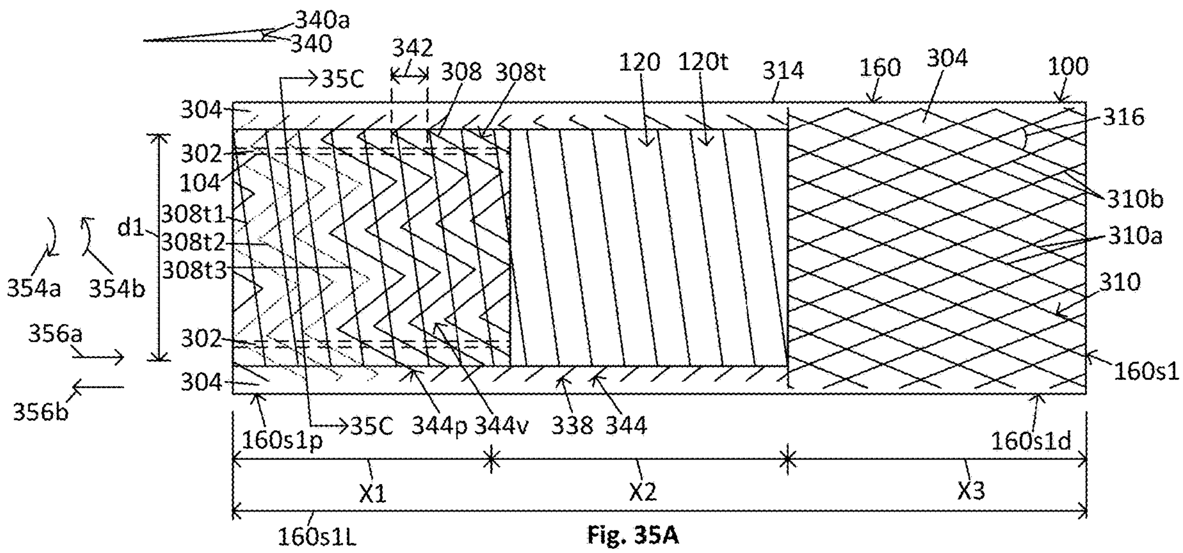

FIG. 35A is a closeup side view of the tube of FIG. 6A at section S1, for example, when the tube is in a non-expanded configuration. FIG. 35A illustrates the tube with an actuator (e.g., an actuator 120), a first reinforcement (e.g., a reinforcement 308 having a nested configuration), and a second reinforcement (e.g., a reinforcement 310).

Figure 35B:
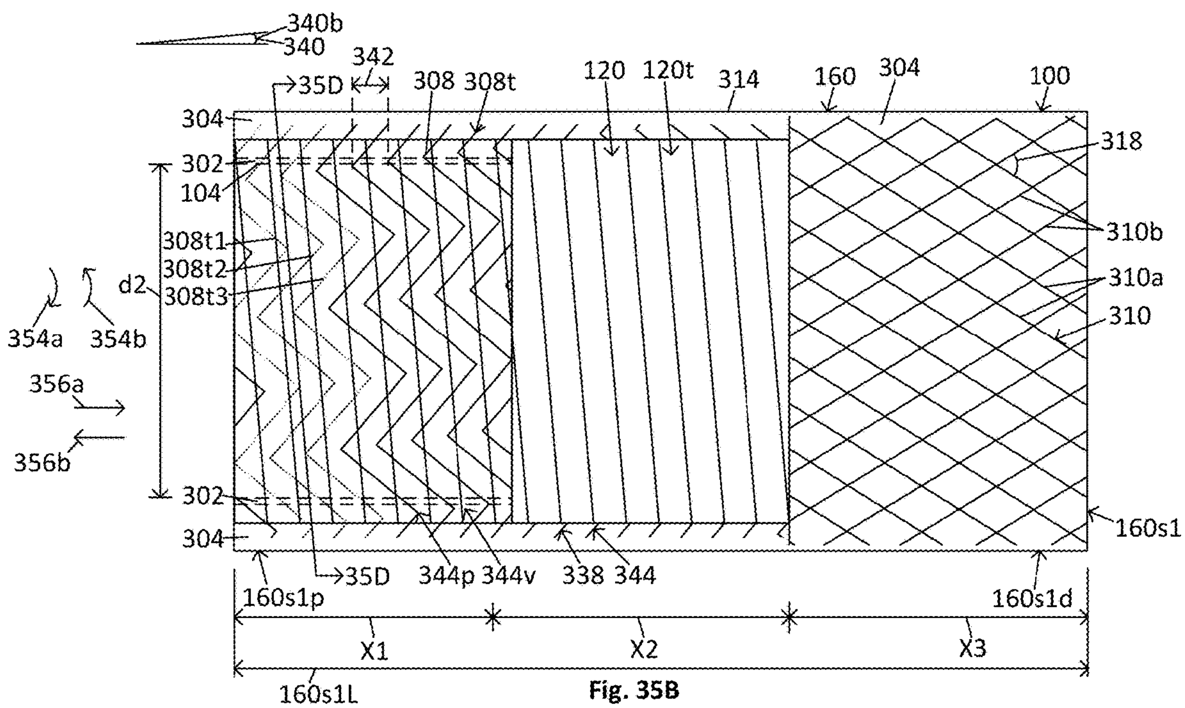

FIG. 35B is a closeup side view of the tube of FIG. 6C at section S2 after the tube is expanded, for example, when the tube is in an expanded configuration. FIG. 35B illustrates the section of the tube in FIG. 35A in an expanded configuration.

Figure 35C:
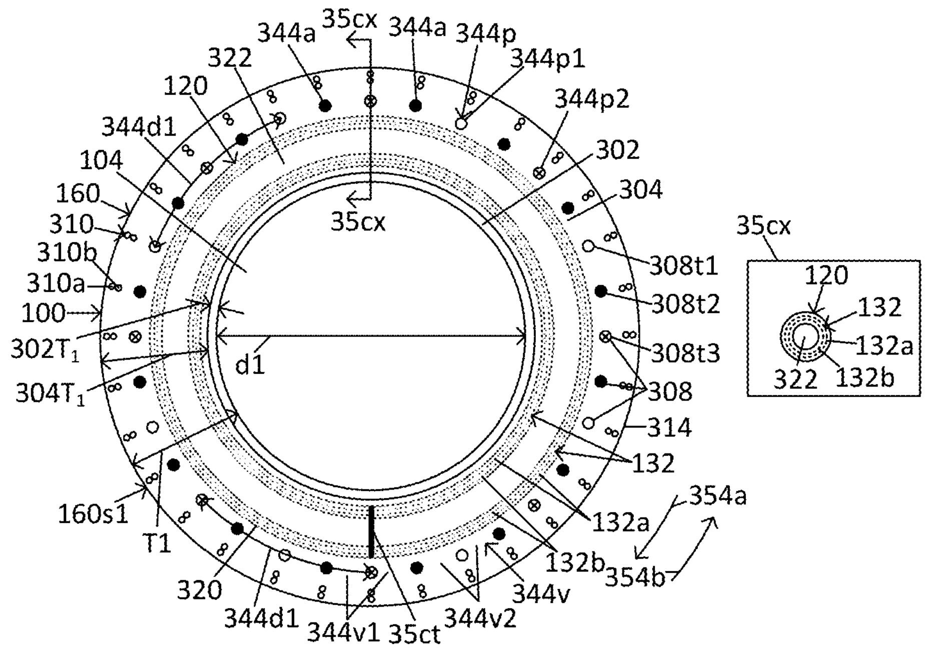

FIG. 35C illustrates a cross-sectional view of the tube of FIG. 35A taken along line 35C-35C.

Figure 35D:
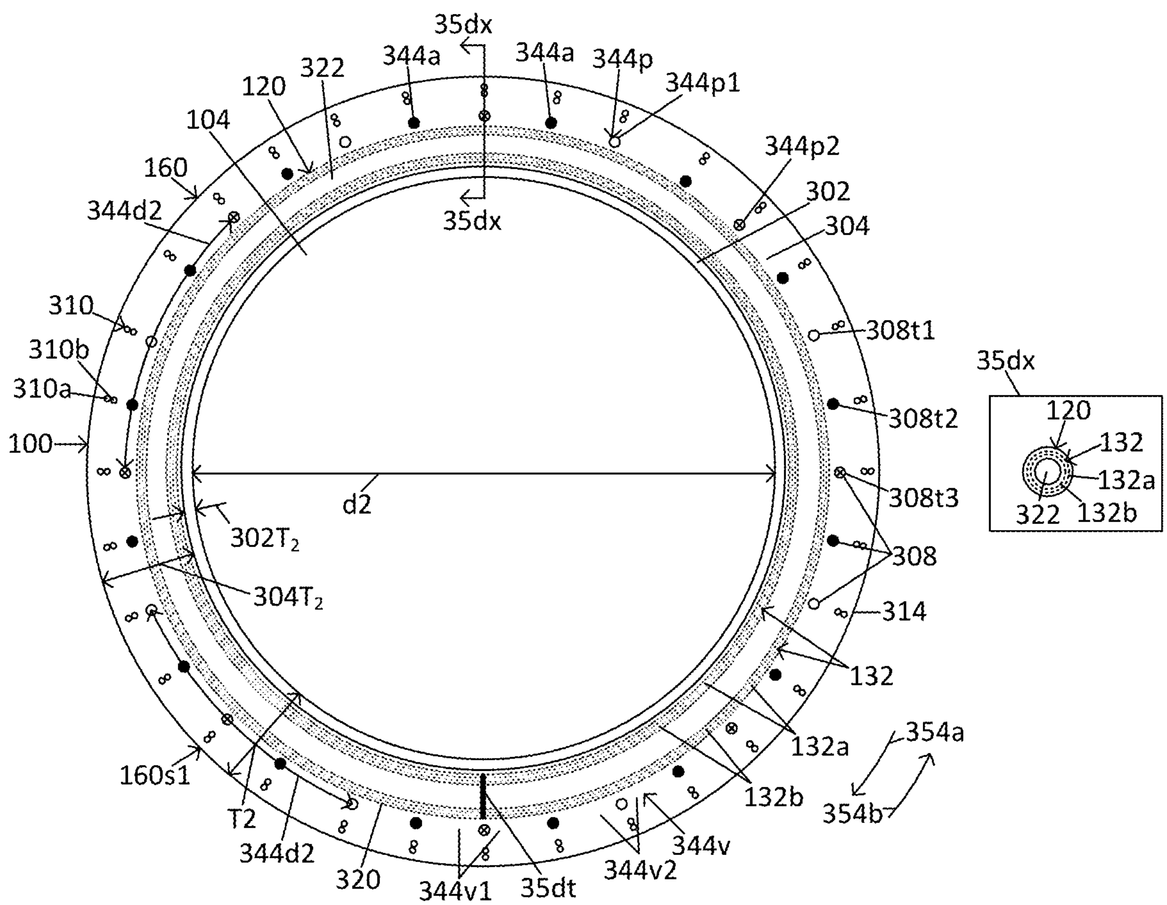

FIG. 35D illustrates a cross-sectional view of the tube of FIG. 35B taken along line 35D-35D.

Figure 36A:
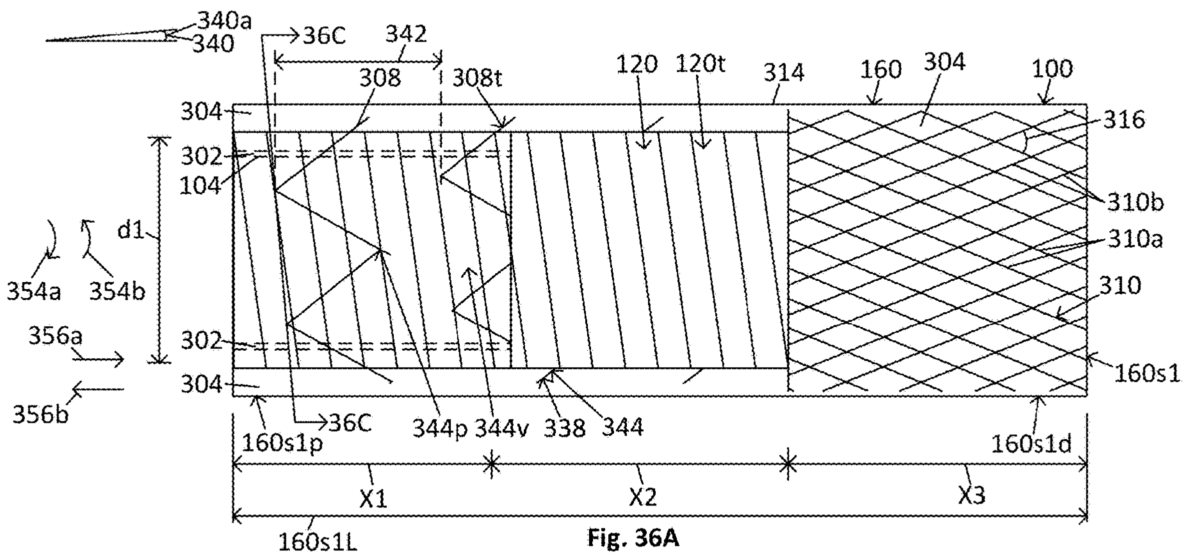

FIG. 36A is a closeup side view of the tube of FIG. 6A at section S1, for example, when the tube is in a non-expanded configuration. FIG. 36A illustrates the tube with an actuator (e.g., an actuator 120), a first reinforcement (e.g., a reinforcement 308 having a separated configuration), and a second reinforcement (e.g., a reinforcement 310).

Figure 36B:
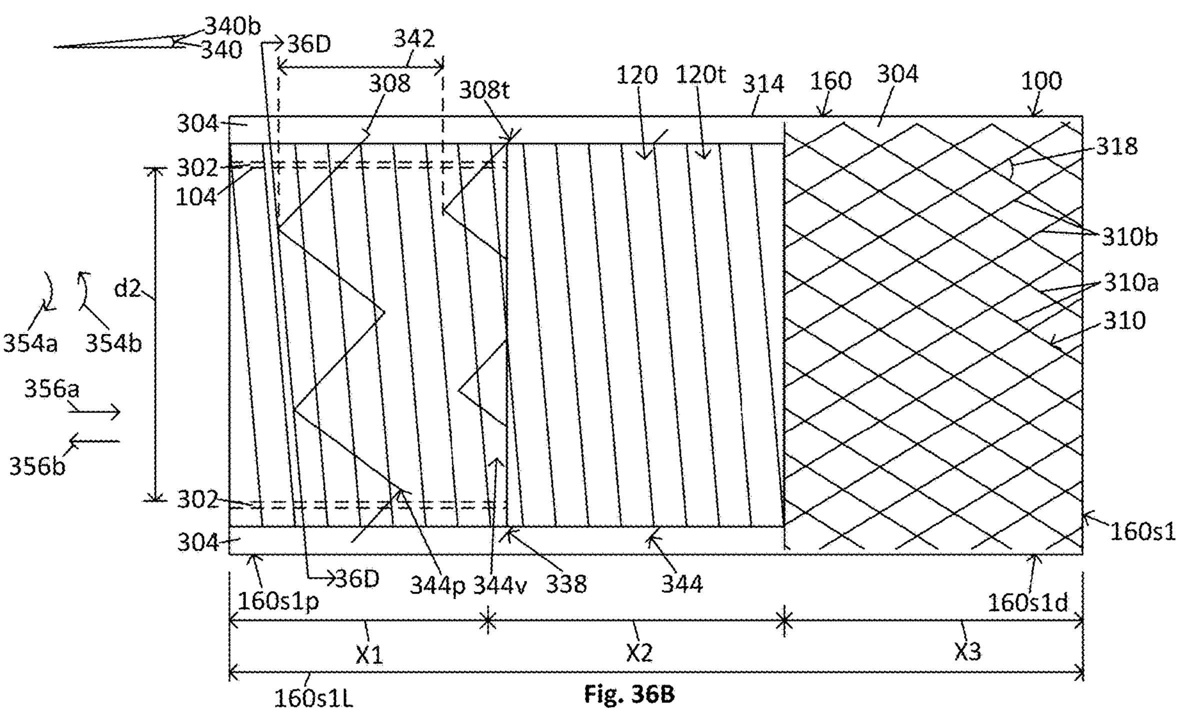

FIG. 36B is a closeup side view of the tube of FIG. 6C at section S2 after the tube is expanded, for example, when the tube is in an expanded configuration. FIG. 36B illustrates the section of the tube in FIG. 36A in an expanded configuration.

Figure 36C:
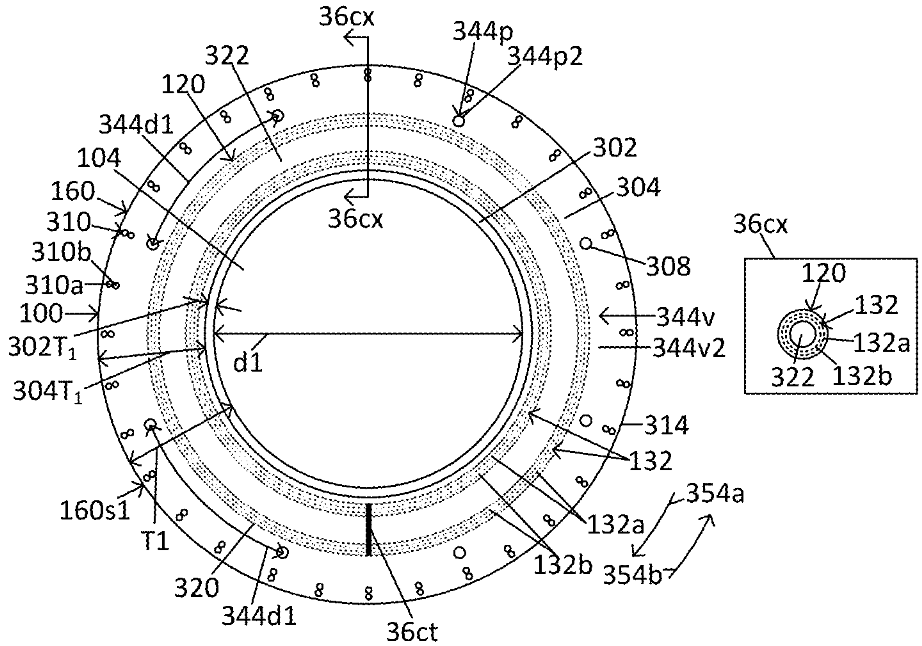

FIG. 36C illustrates a cross-sectional view of the tube of FIG. 36A taken along line 36C-36C.

Figure 36D:
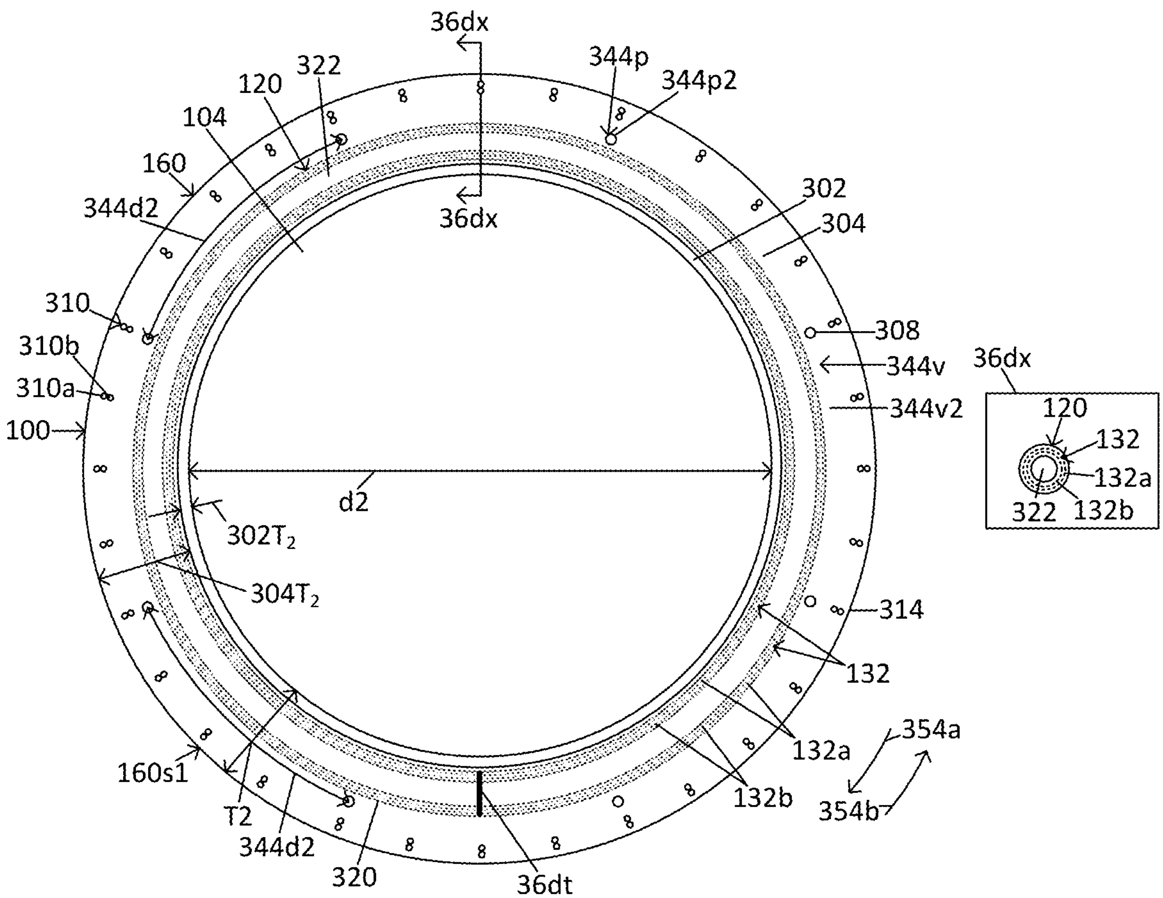

FIG. 36D illustrates a cross-sectional view of the tube of FIG. 36B taken along line 36D-36D.

Figure 37A:
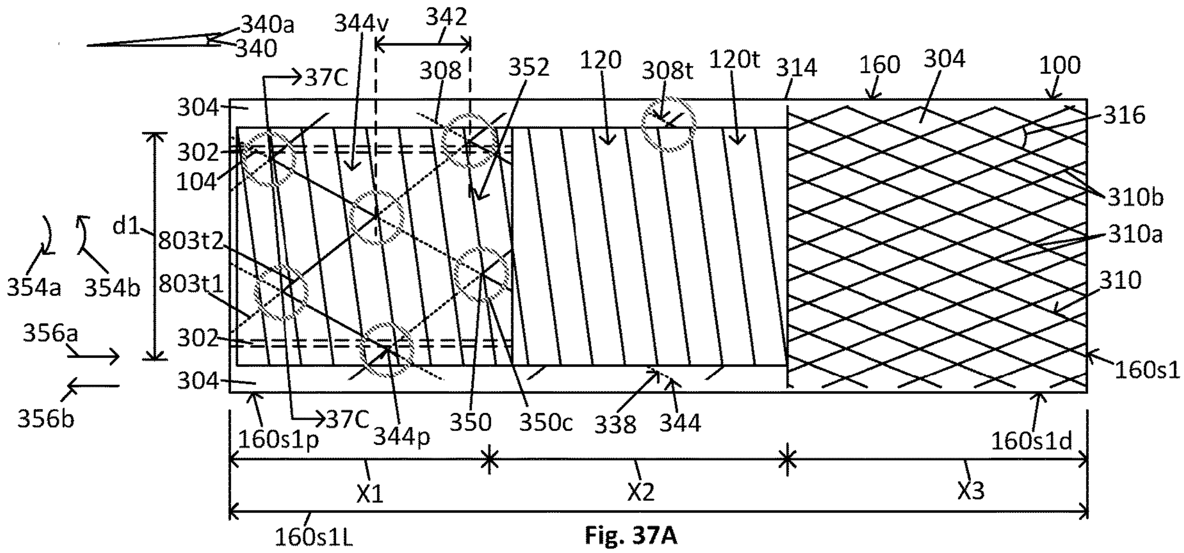

FIG. 37A is a closeup side view of the tube of FIG. 6A at section S1, for example, when the tube is in a non-expanded configuration. FIG. 37A illustrates the tube with an actuator (e.g., an actuator 120), a first reinforcement (e.g., a reinforcement 308 having a peak-to-peak configuration), and a second reinforcement (e.g., a reinforcement 310).

Figure 37B:
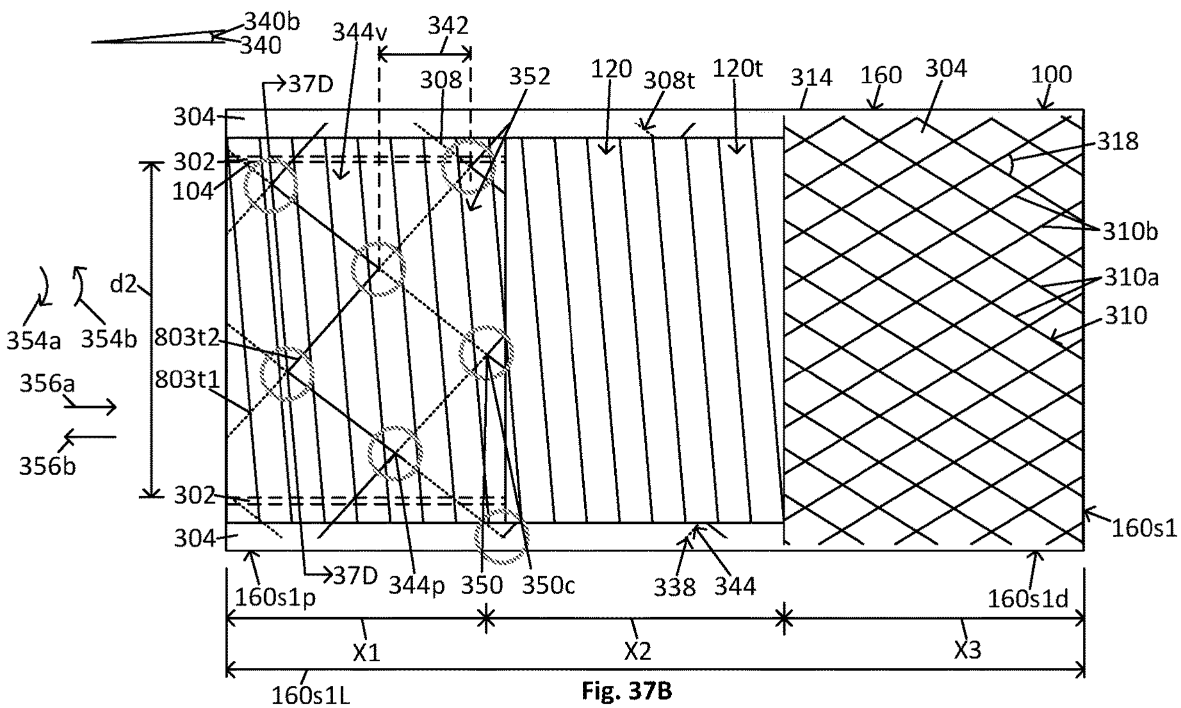

FIG. 37B is a closeup side view of the tube of FIG. 6C at section S2 after the tube is expanded, for example, when the tube is in an expanded configuration. FIG. 37B illustrates the section of the tube in FIG. 37A in an expanded configuration.

Figure 37C:
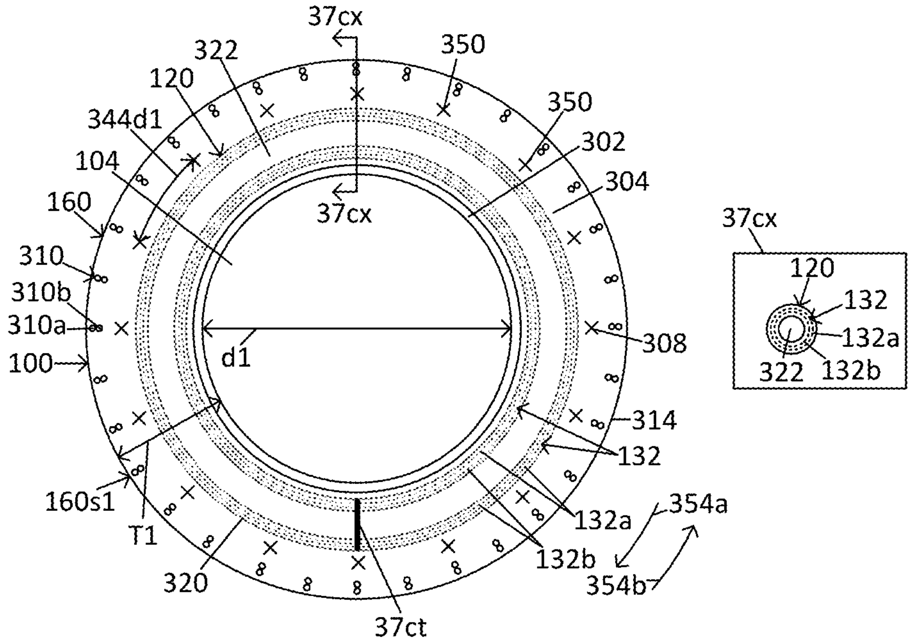

FIG. 37C illustrates a cross-sectional view of the tube of FIG. 37A taken along line 37C-37C.

Figure 37D:
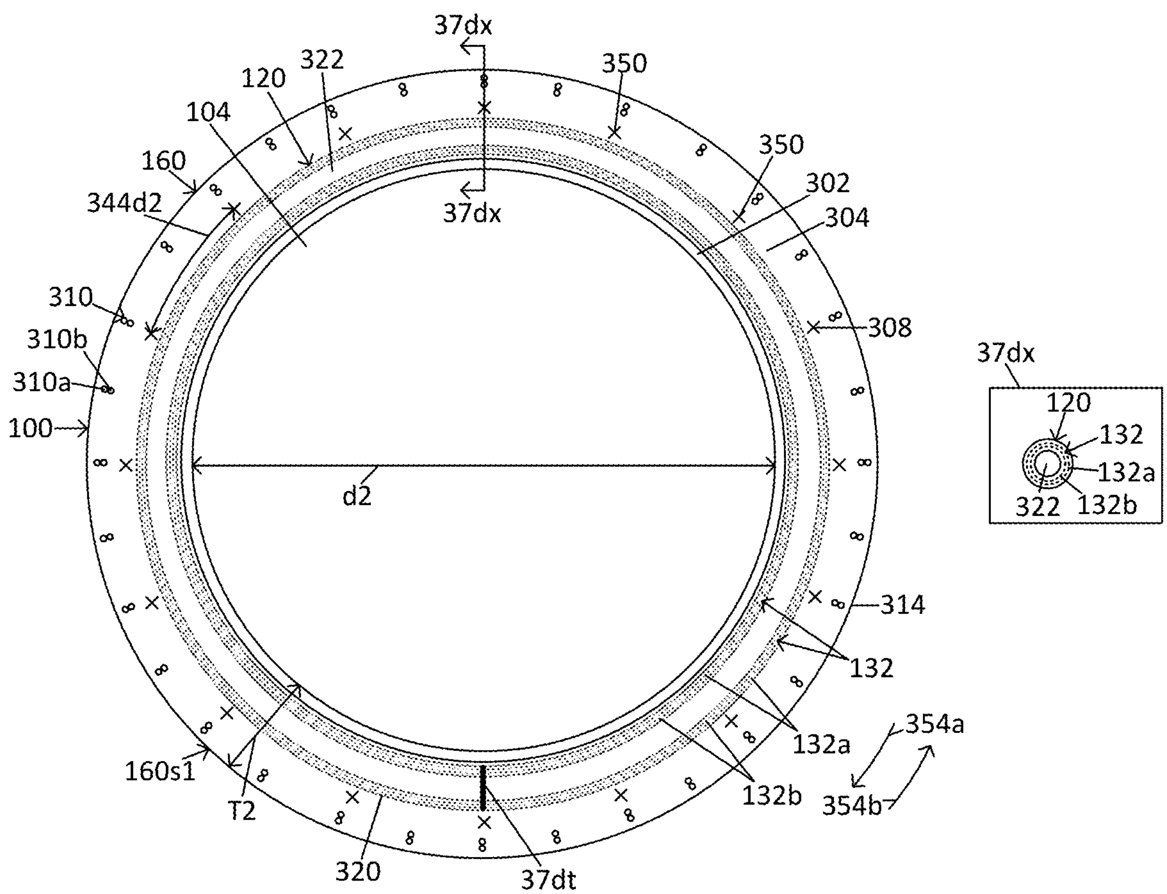

FIG. 37D illustrates a cross-sectional view of the tube of FIG. 37B taken along line 37D-37D.

Figure 38A:
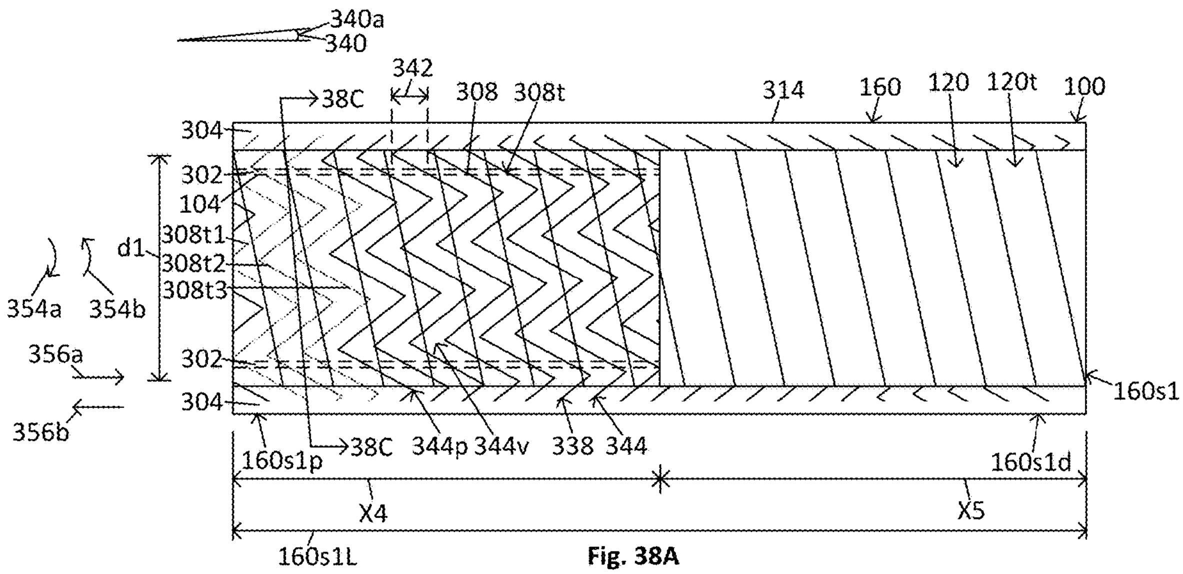

FIG. 38A is a closeup side view of the tube of FIG. 6A at section S1, for example, when the tube is in a non-expanded configuration. FIG. 38A illustrates the tube with an actuator (e.g., an actuator 120) and a reinforcement (e.g., a reinforcement 308 having a nested configuration).

Figure 38B:
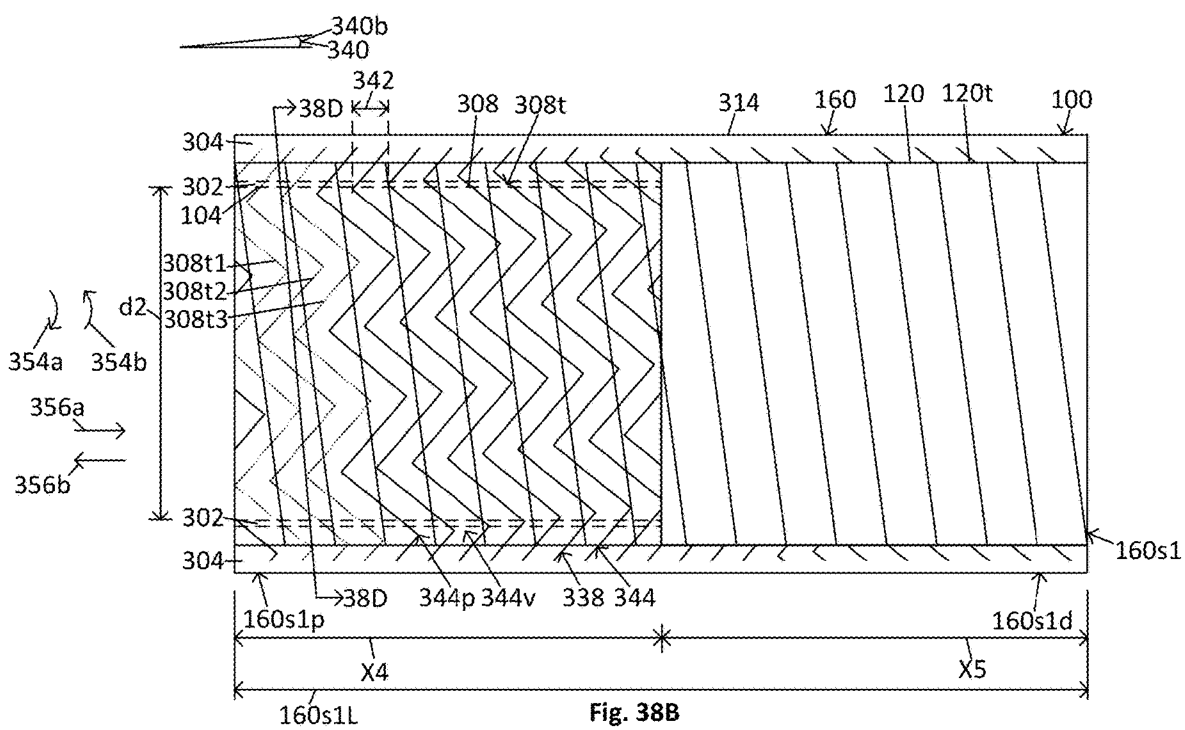

FIG. 38B is a closeup side view of the tube of FIG. 6C at section S2 after the tube is expanded, for example, when the tube is in an expanded configuration. FIG. 38B illustrates the section of the tube in FIG. 38A in an expanded configuration.

Figure 38C:
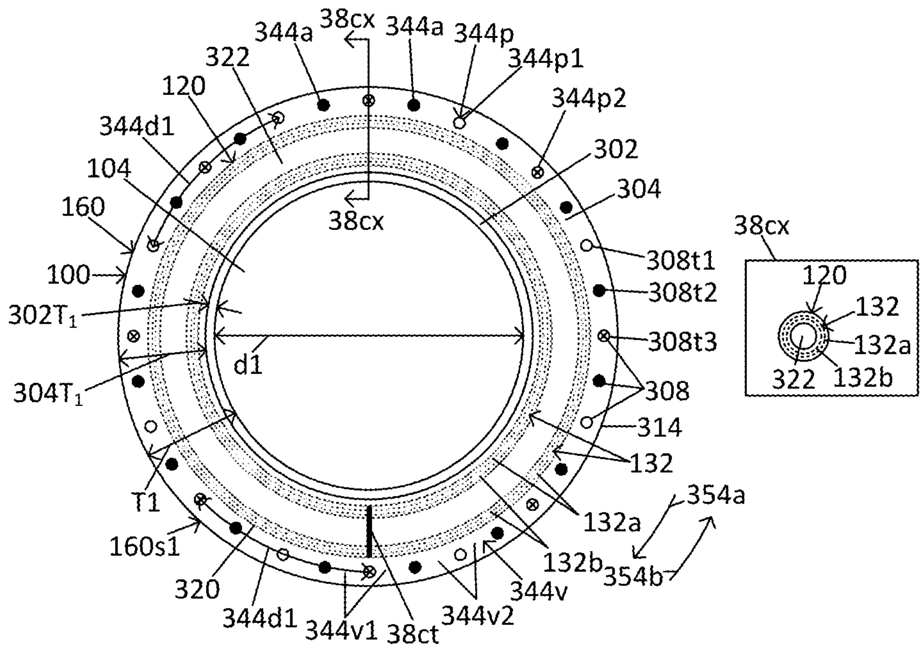

FIG. 38C illustrates a cross-sectional view of the tube of FIG. 38A taken along line 38C-38C.

Figure 38D:
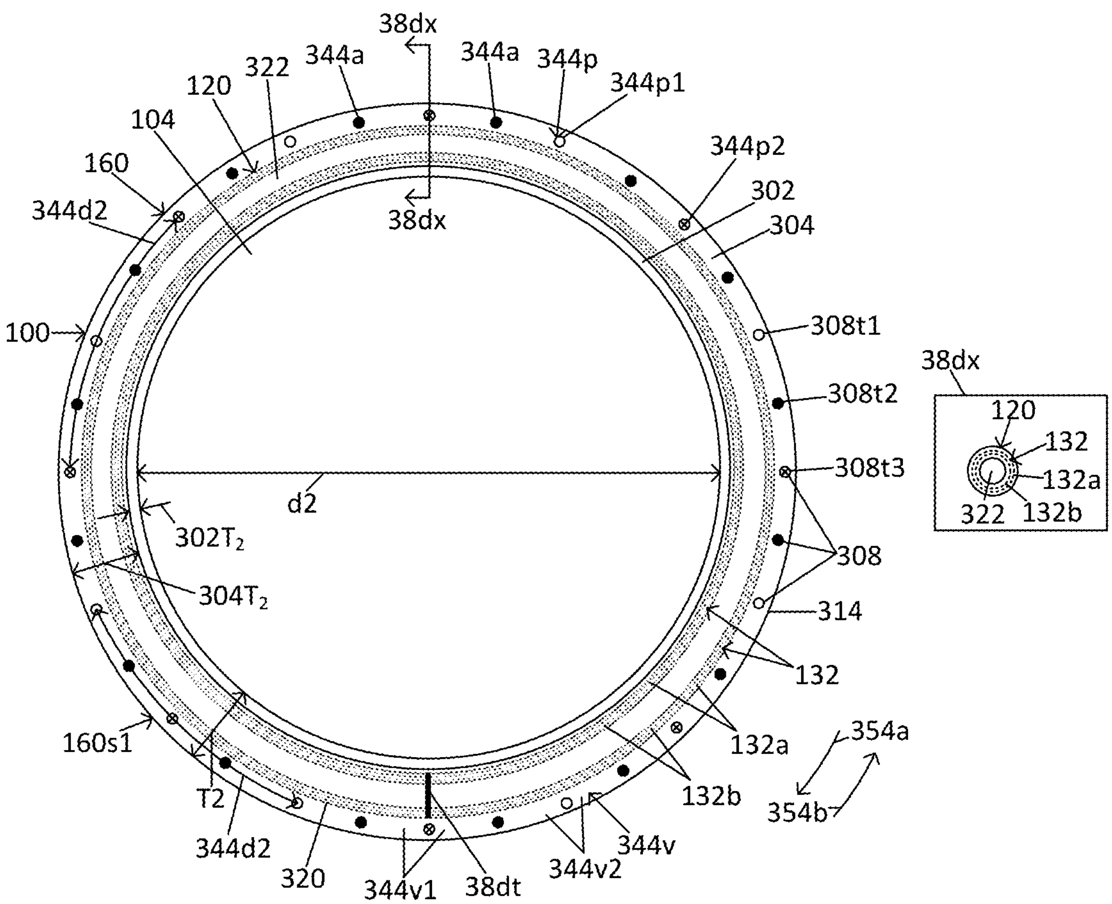

FIG. 38D illustrates a cross-sectional view of the tube of FIG. 38B taken along line 38D-38D.

Figure 39A:
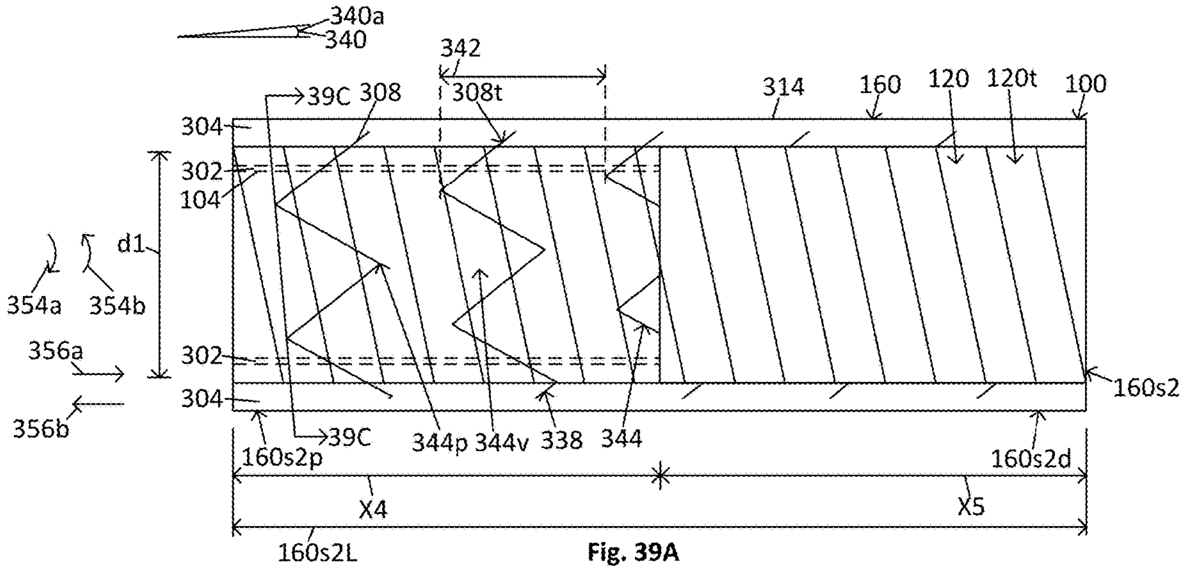

FIG. 39A is a closeup side view of the tube of FIG. 6A at section S5, for example, when the tube is in a non-expanded configuration. FIG. 39A illustrates the tube with an actuator (e.g., an actuator 120) and a reinforcement (e.g., a reinforcement 308 having a separated configuration).

Figure 39B:
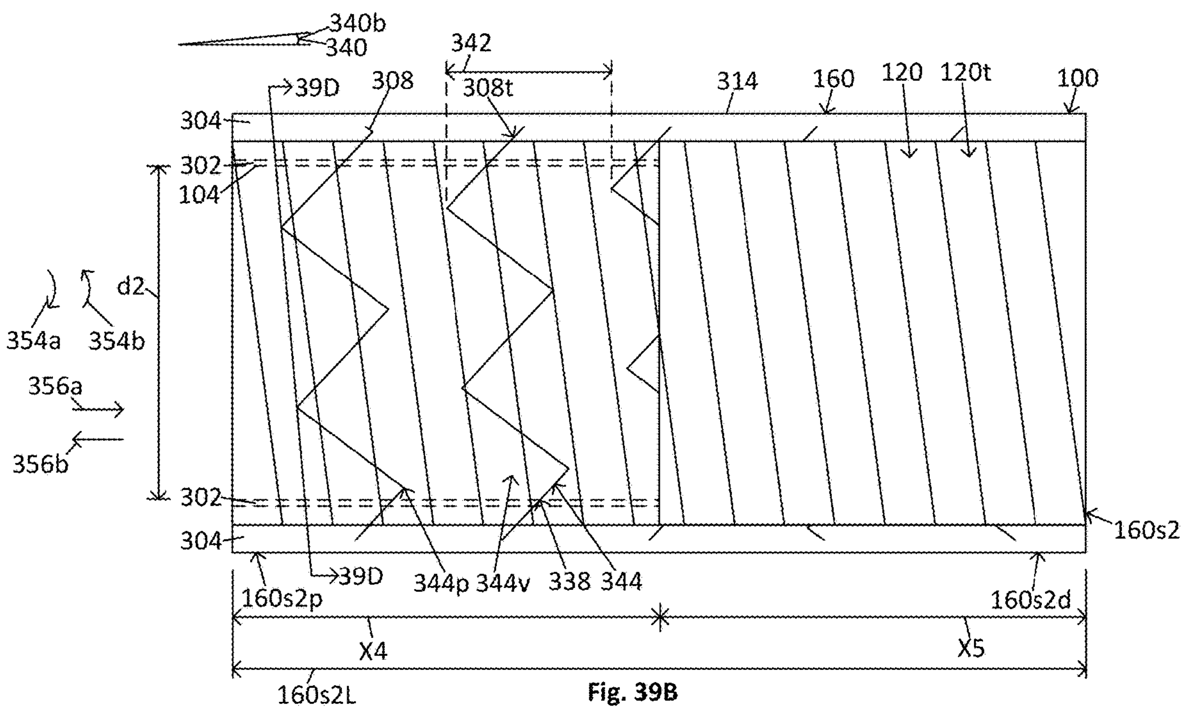

FIG. 39B is a closeup side view of the tube of FIG. 6C at section S6 after the tube is expanded, for example, when the tube is in an expanded configuration. FIG. 39B illustrates the section of the tube in FIG. 39A in an expanded configuration.

Figure 39C:
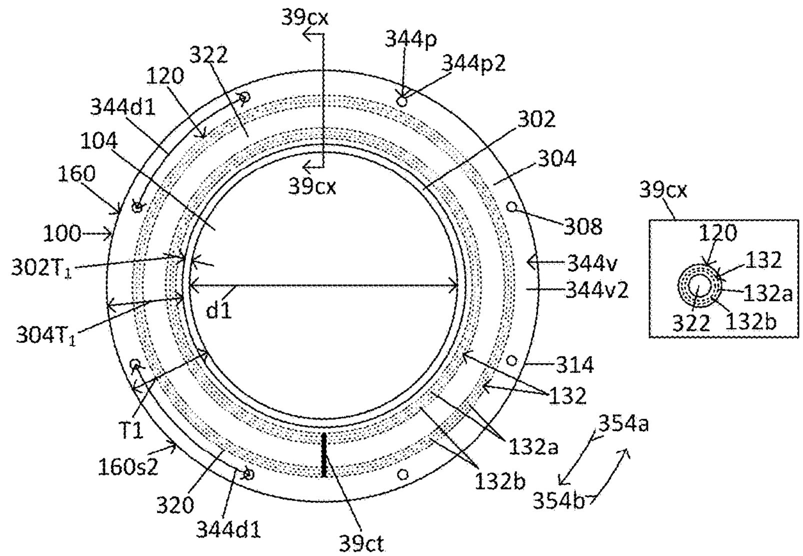

FIG. 39C illustrates a cross-sectional view of the tube of FIG. 39A taken along line 39C-39C.

Figure 39D:
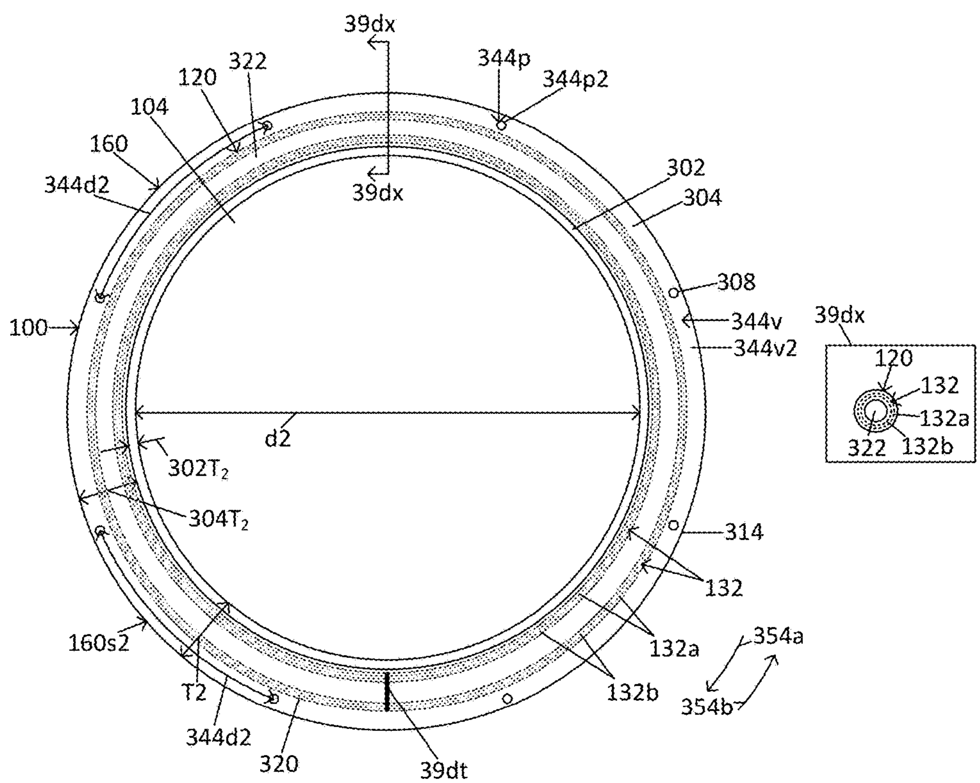

FIG. 39D illustrates a cross-sectional view of the tube of FIG. 39B taken along line 39D-39D.

Figure 40A:
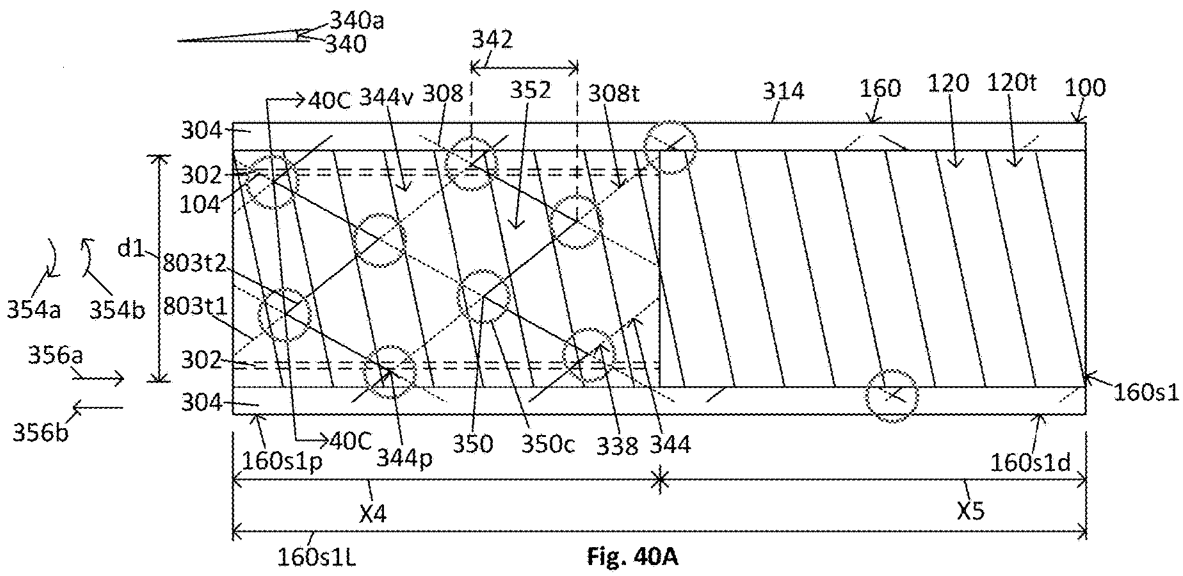

FIG. 40A is a closeup side view of the tube of FIG. 6A at section S1, for example, when the tube is in a non-expanded configuration. FIG. 40A illustrates the tube with an actuator (e.g., an actuator 120) and a reinforcement (e.g., a reinforcement 308 having a peak-to-peak configuration).

Figure 40B:
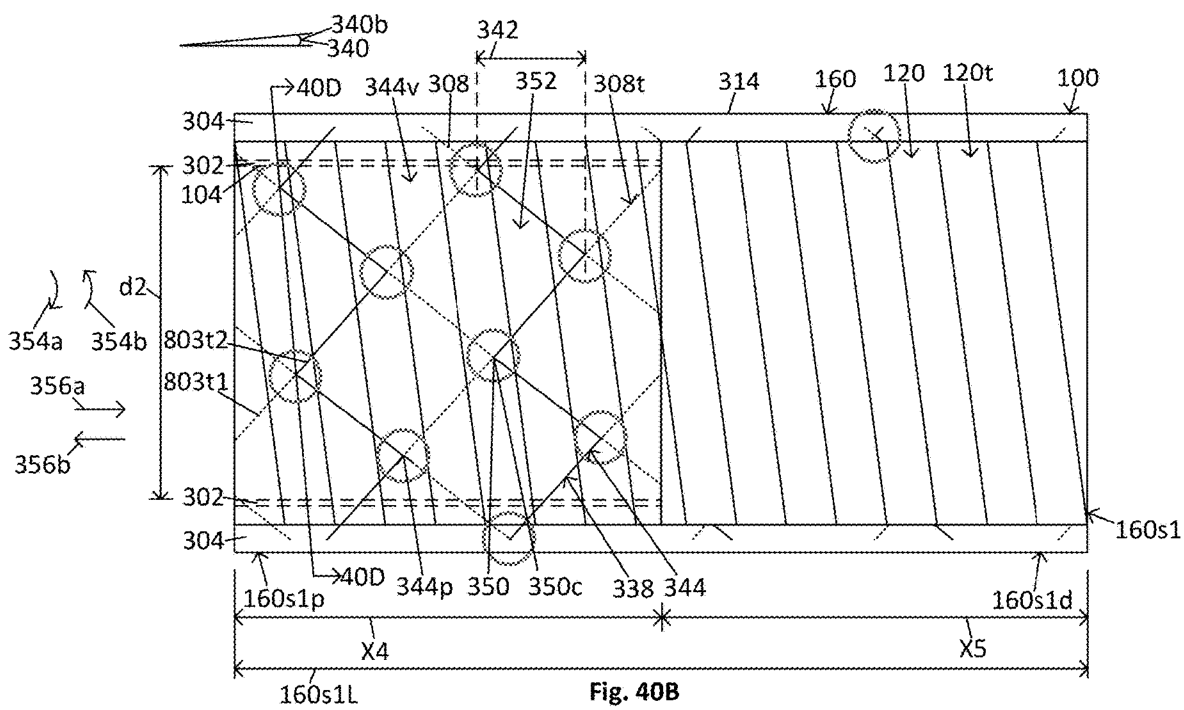

FIG. 40B is a closeup side view of the tube of FIG. 6C at section S2 after the tube is expanded, for example, when the tube is in an expanded configuration. FIG. 40B illustrates the section of the tube in FIG. 40A in an expanded configuration.

Figure 40C:
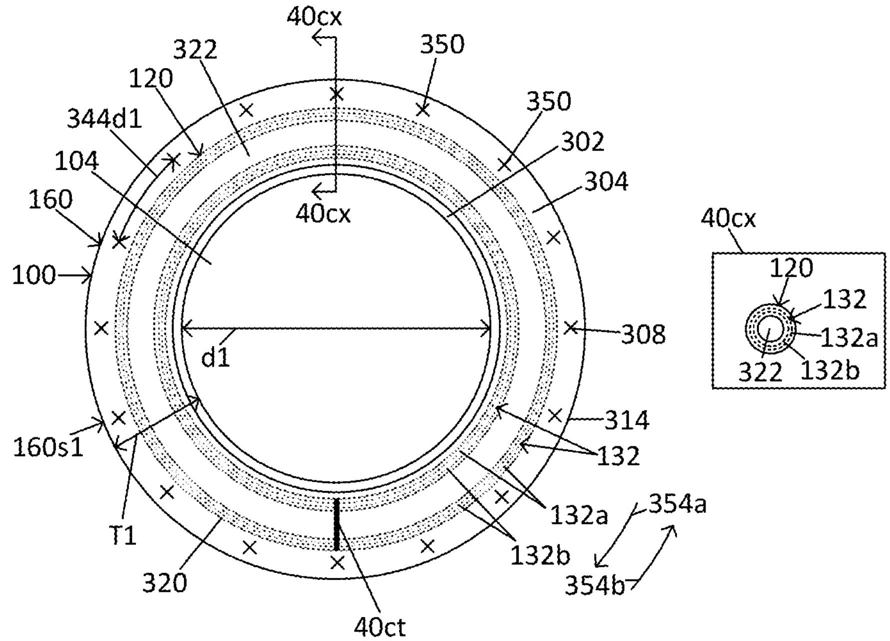

FIG. 40C illustrates a cross-sectional view of the tube of FIG. 40A taken along line 40C-40C.

Figure 40D:
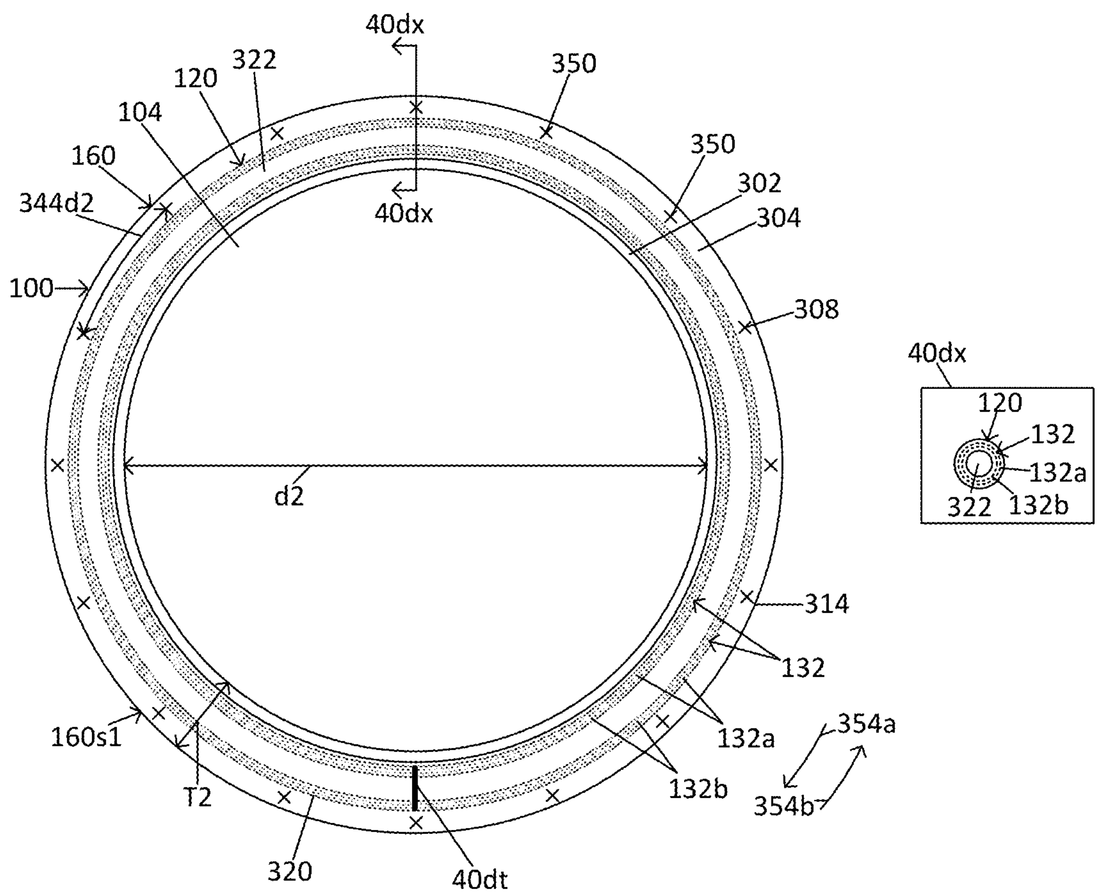

FIG. 40D illustrates a cross-sectional view of the tube of FIG. 40B taken along line 40D-40D.

Figure 41A:
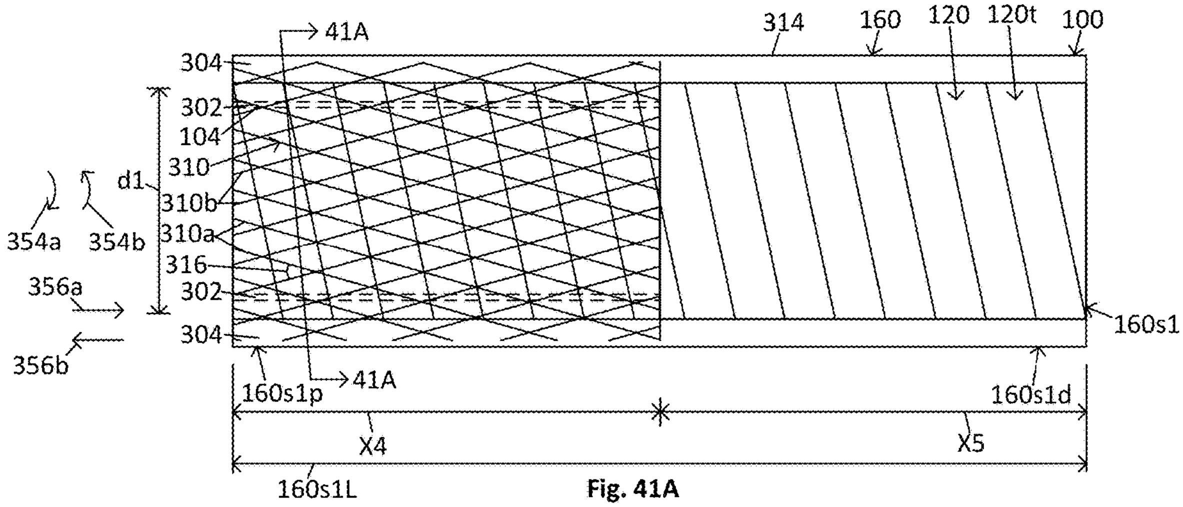

FIG. 41A is a closeup side view of the tube of FIG. 6A at section S1, for example, when the tube is in a non-expanded configuration. FIG. 41A illustrates the tube with an actuator (e.g., an actuator 120) and a reinforcement (e.g., a reinforcement 310.

Figure 41B:
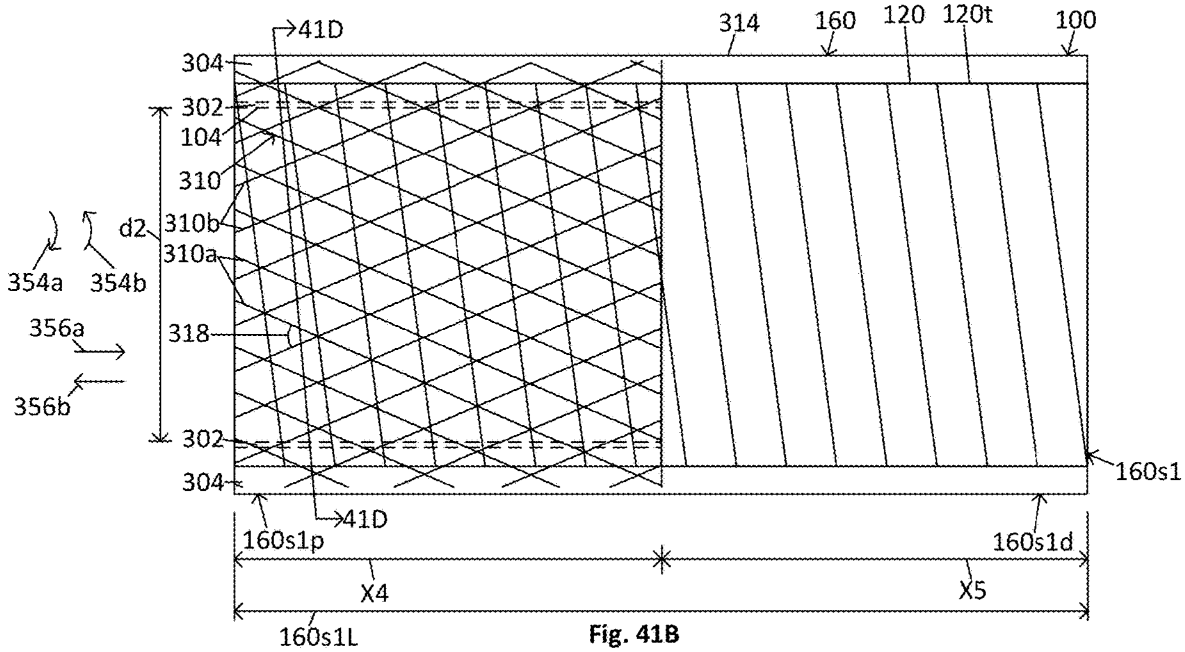

FIG. 41B is a closeup side view of the tube of FIG. 6C at section S2 after the tube is expanded, for example, when the tube is in an expanded configuration. FIG. 41B illustrates the section of the tube in FIG. 41A in an expanded configuration.

Figure 41C:
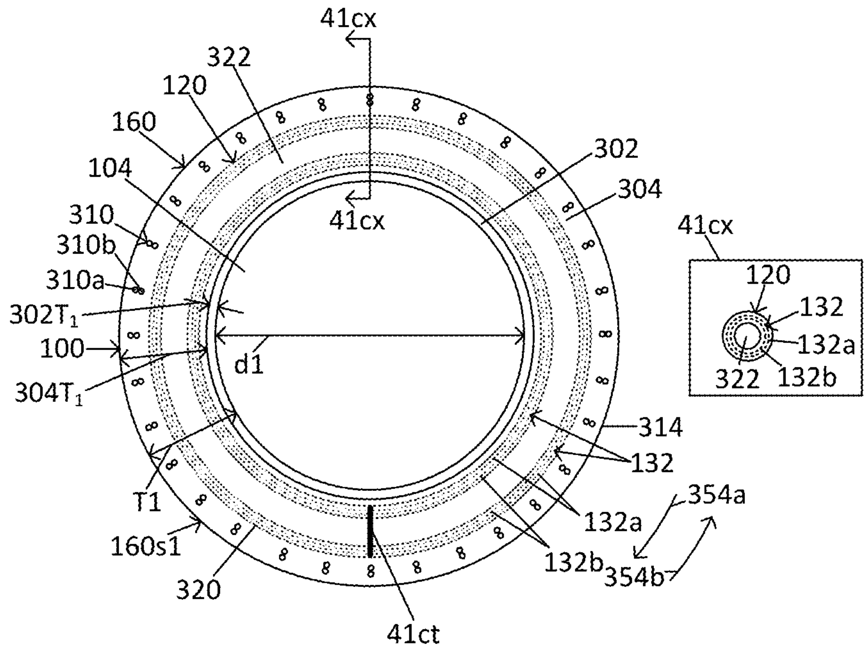

FIG. 41C illustrates a cross-sectional view of the tube of FIG. 41A taken along line 41C-41C.

Figure 41D:
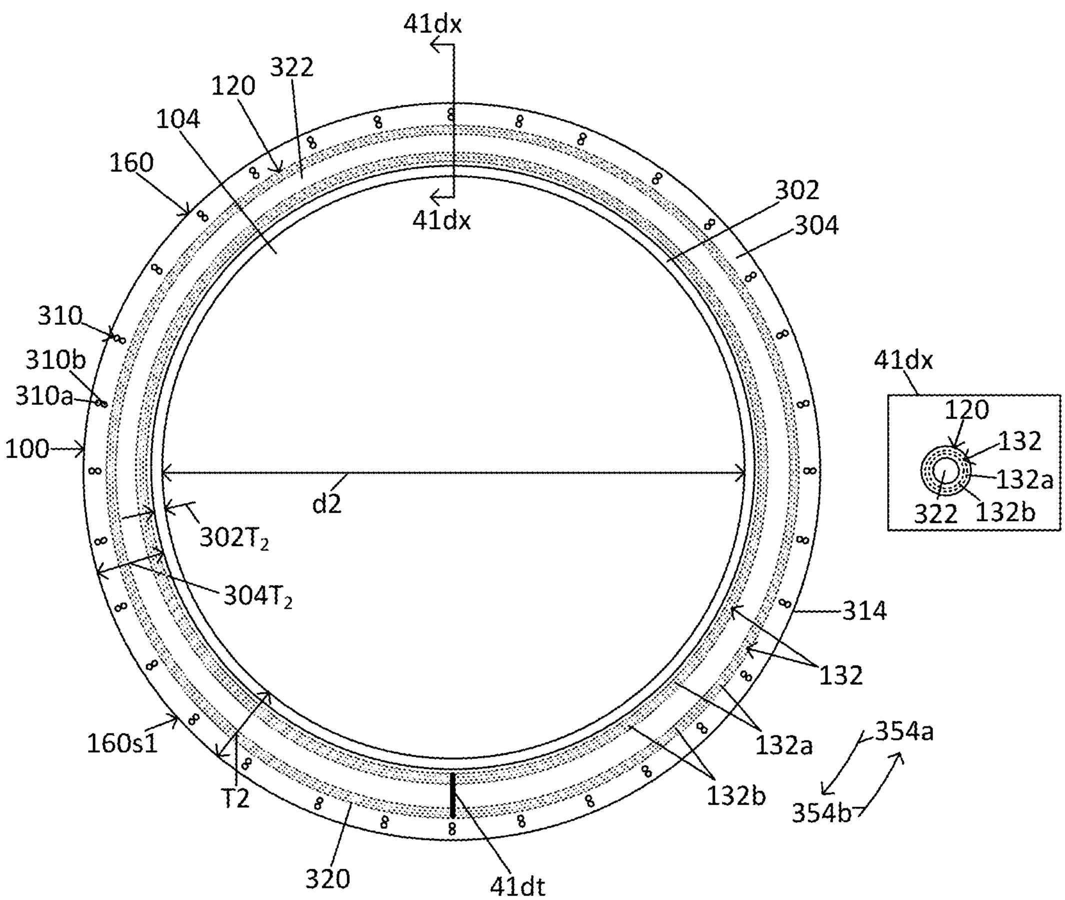

FIG. 41D illustrates a cross-sectional view of the tube of FIG. 41B taken along line 41D-41D.

Figure 42A:
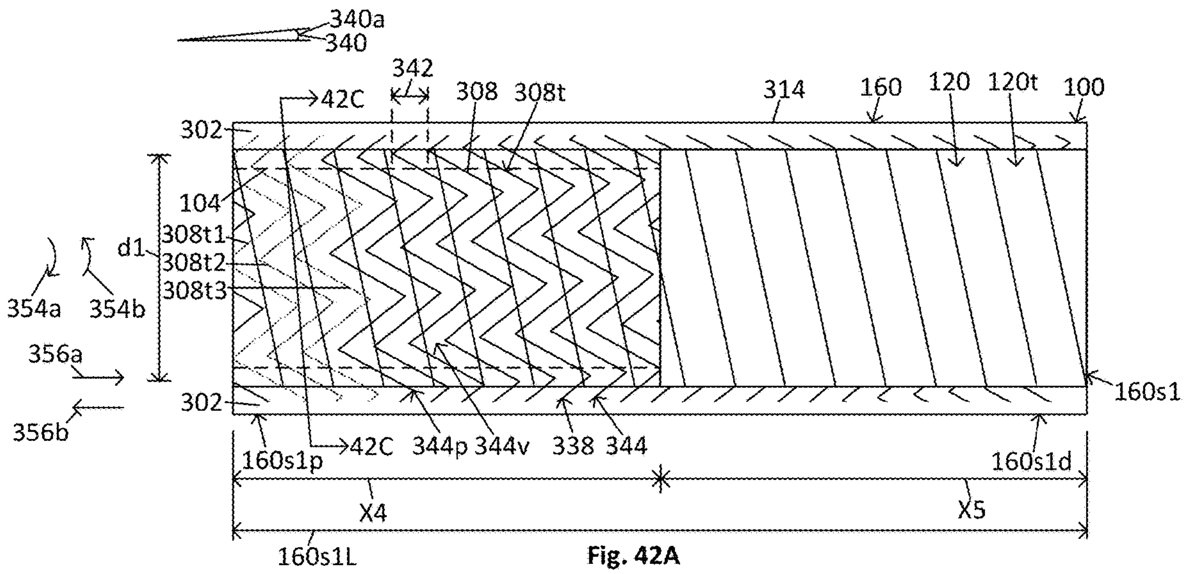

FIG. 42A is a closeup side view of the tube of FIG. 6A at section S1, for example, when the tube is in a non-expanded configuration. FIG. 42A illustrates the tube with an actuator (e.g., an actuator 120) and a reinforcement (e.g., a reinforcement 308 having a nested configuration).

Figure 42B:
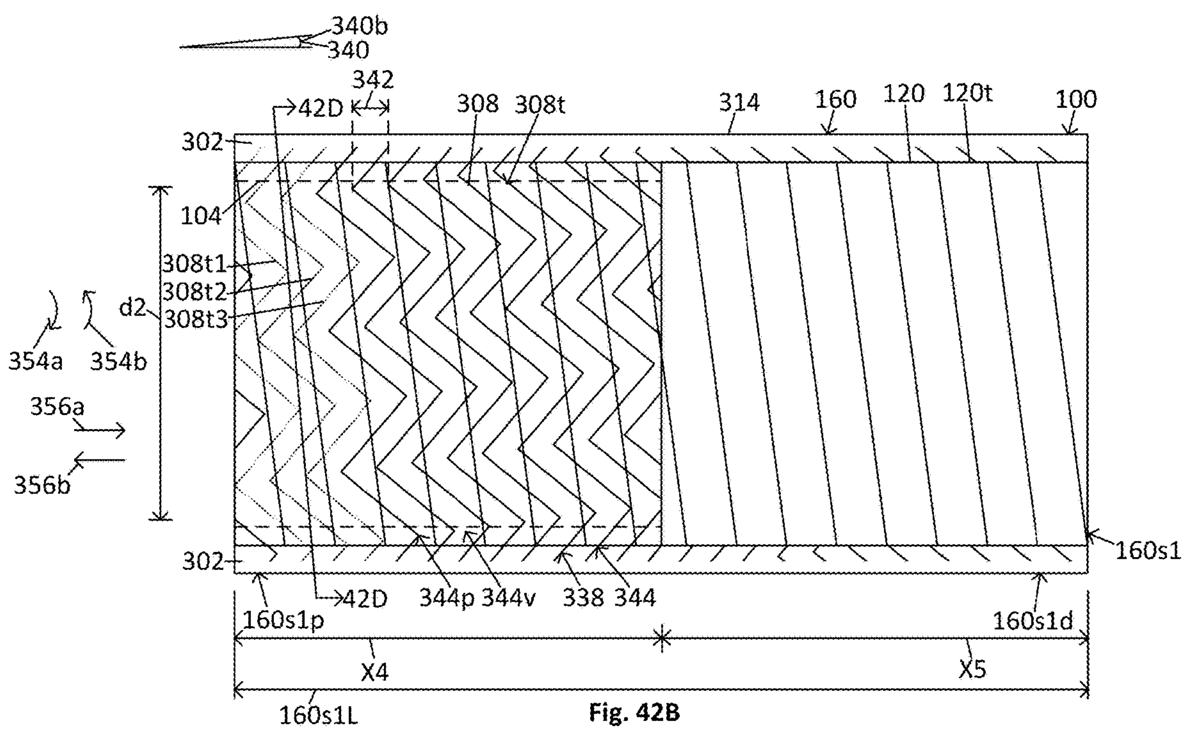

FIG. 42B is a closeup side view of the tube of FIG. 6C at section S2 after the tube is expanded, for example, when the tube is in an expanded configuration. FIG. 42B illustrates the section of the tube in FIG. 42A in an expanded configuration.

Figure 42C:
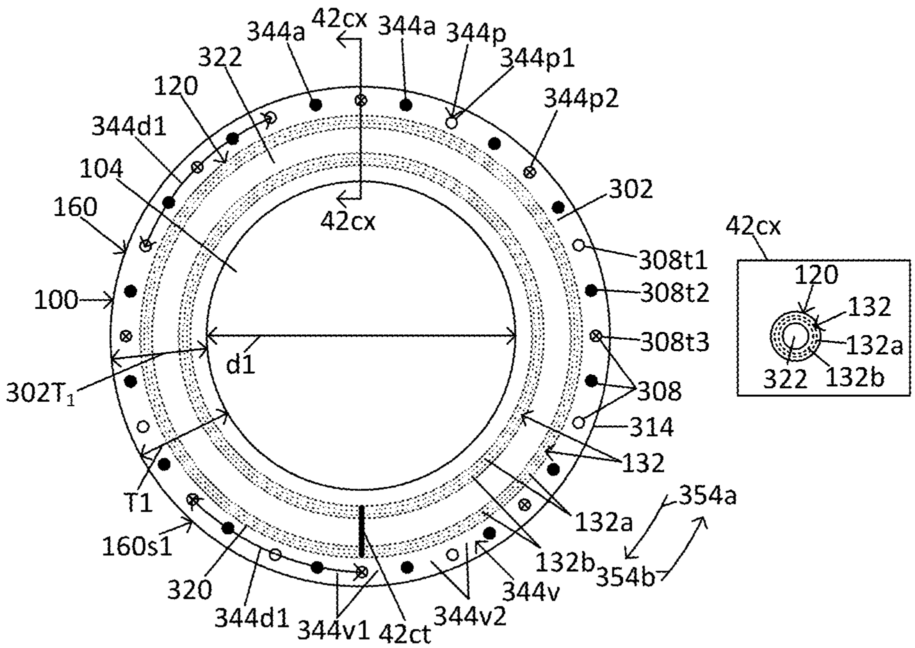

FIG. 42C illustrates a cross-sectional view of the tube of FIG. 42A taken along line 42C-42C.

Figure 42D:
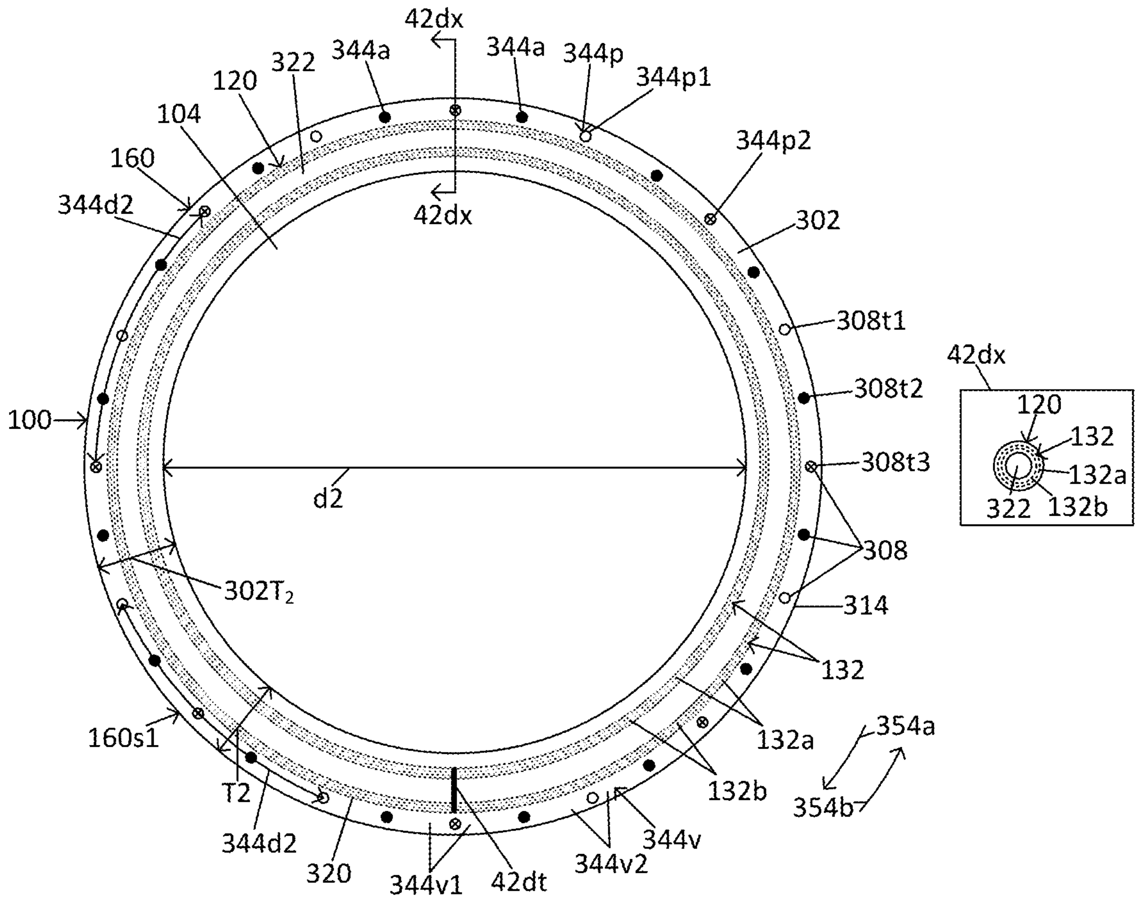

FIG. 42D illustrates a cross-sectional view of the tube of FIG. 42B taken along line 42D-42D.

Figure 43A:
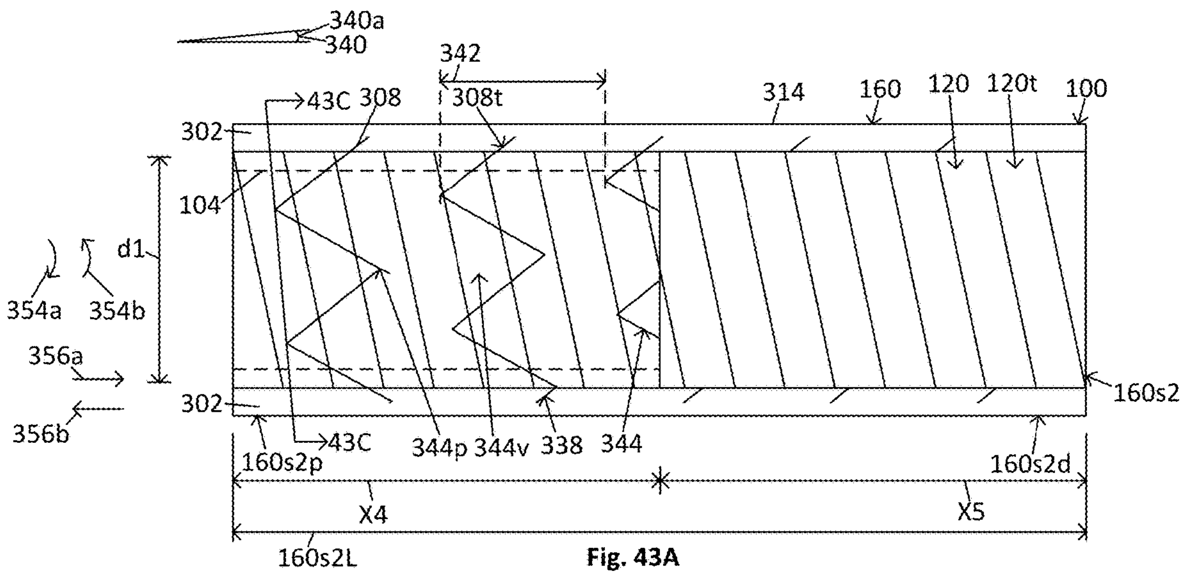

FIG. 43A is a closeup side view of the tube of FIG. 6A at section S5, for example, when the tube is in a non-expanded configuration. FIG. 43A illustrates the tube with an actuator (e.g., an actuator 120) and a reinforcement (e.g., a reinforcement 308 having a separated configuration).

Figure 43B:
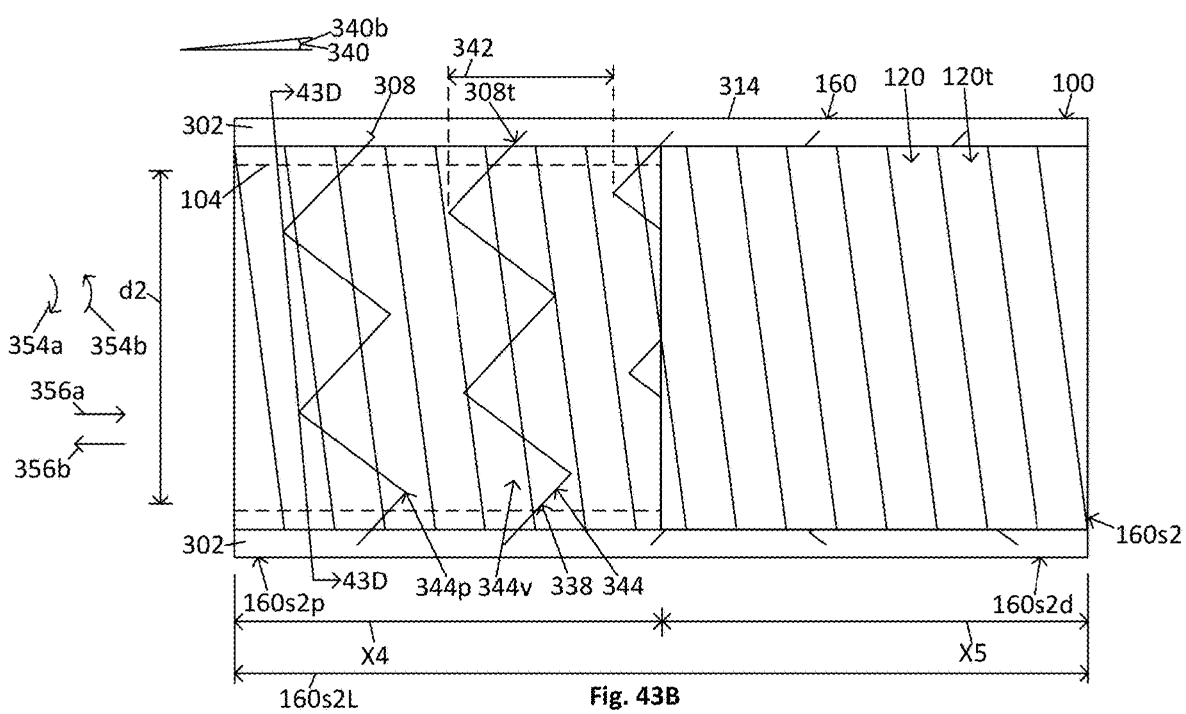

FIG. 43B is a closeup side view of the tube of FIG. 6C at section S6 after the tube is expanded, for example, when the tube is in an expanded configuration. FIG. 43B illustrates the section of the tube in FIG. 43A in an expanded configuration.

Figure 43C:
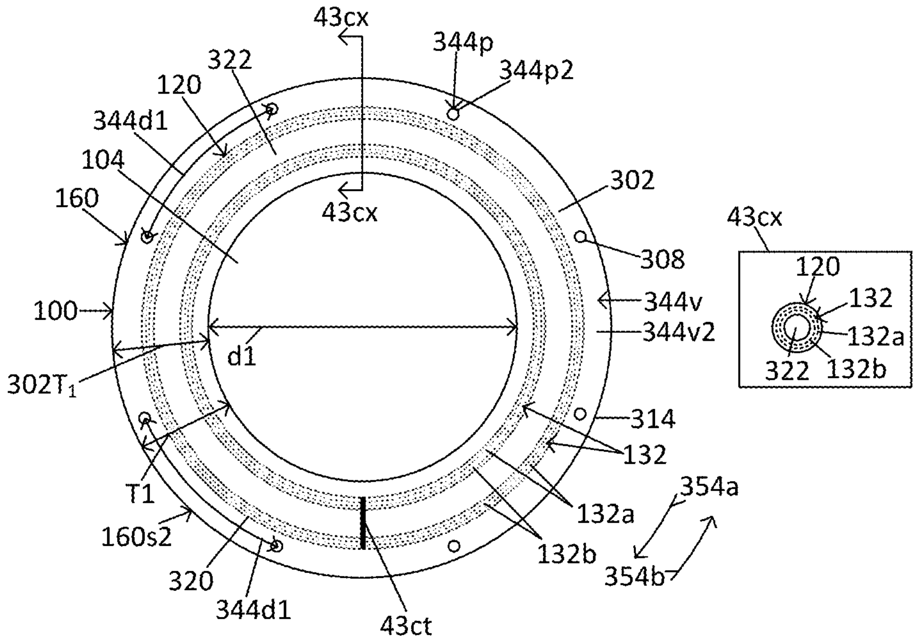

FIG. 43C illustrates a cross-sectional view of the tube of FIG. 43A taken along line 43C-43C.

Figure 43D:
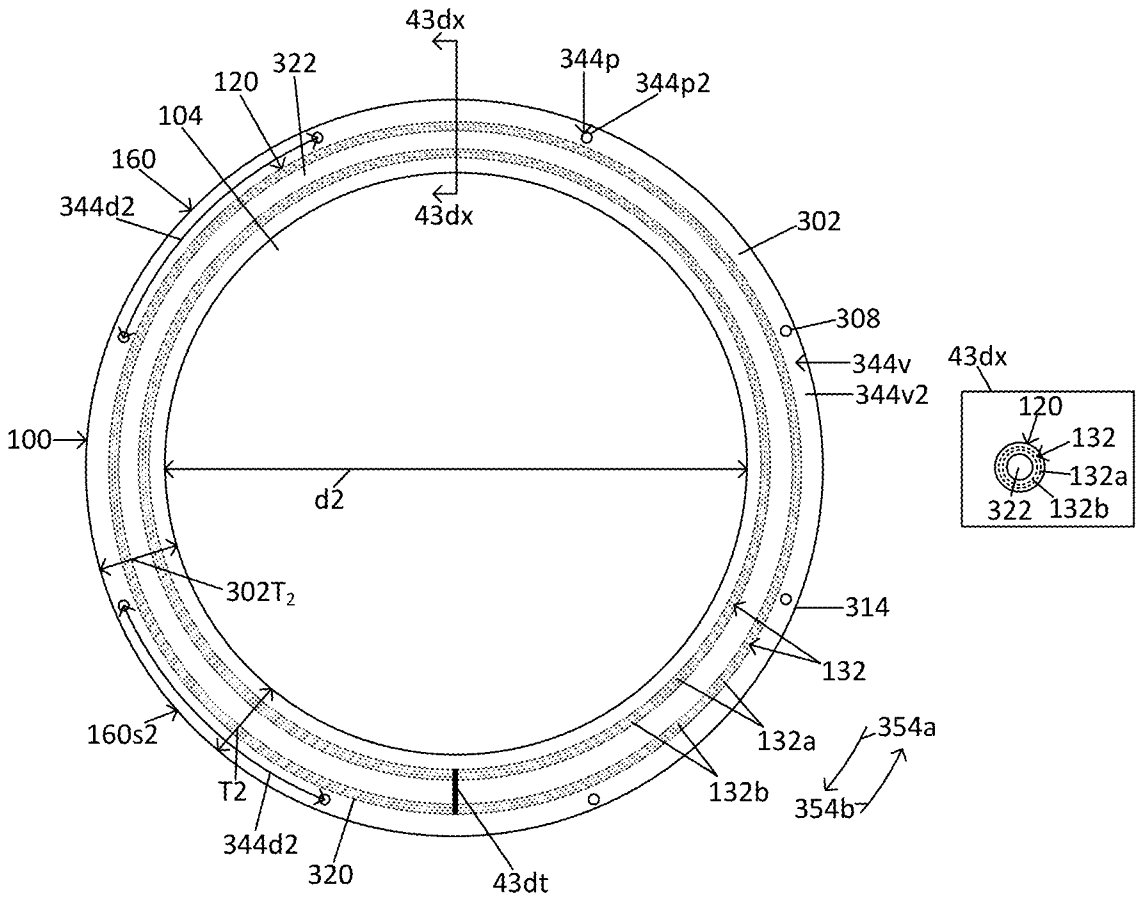

FIG. 43D illustrates a cross-sectional view of the tube of FIG. 43B taken along line 43D-43D.

Figure 44A:
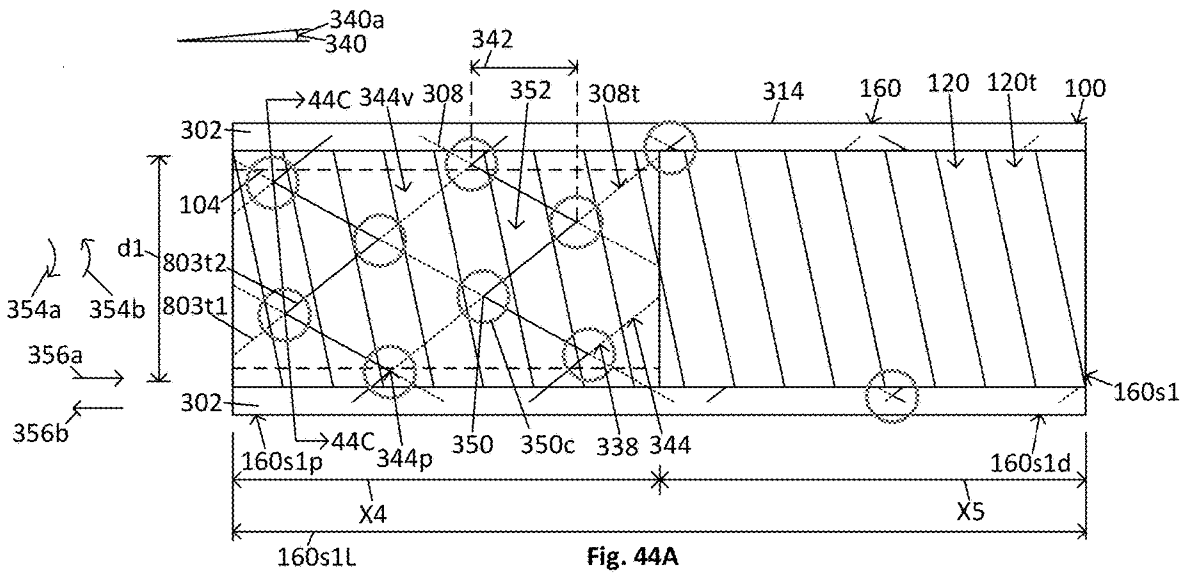

FIG. 44A is a closeup side view of the tube of FIG. 6A at section S1, for example, when the tube is in a non-expanded configuration. FIG. 44A illustrates the tube with an actuator (e.g., an actuator 120) and a reinforcement (e.g., a reinforcement 308 having a peak-to-peak configuration).

Figure 44B:
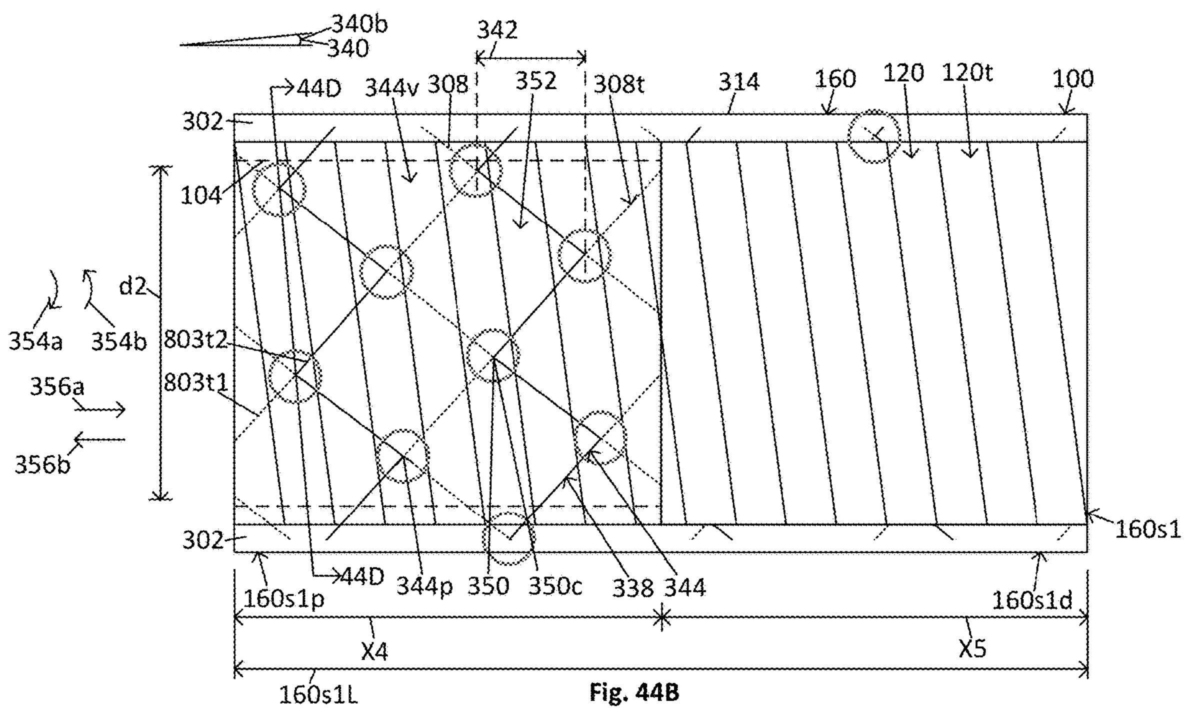

FIG. 44B is a closeup side view of the tube of FIG. 6C at section S2 after the tube is expanded, for example, when the tube is in an expanded configuration. FIG. 44B illustrates the section of the tube in FIG. 44A in an expanded configuration.

Figure 44C:
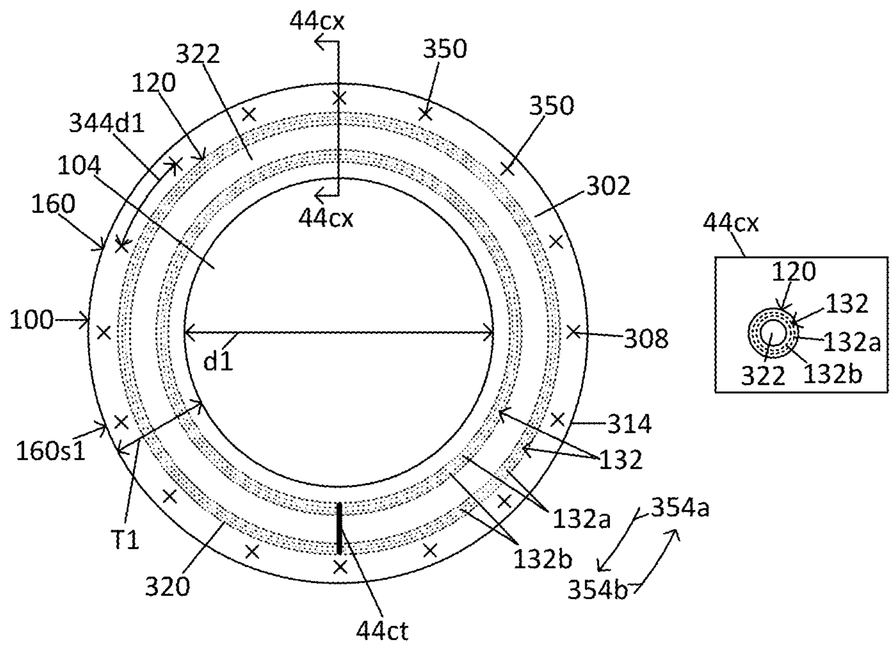

FIG. 44C illustrates a cross-sectional view of the tube of FIG. 44A taken along line 44C-44C.

Figure 44D:
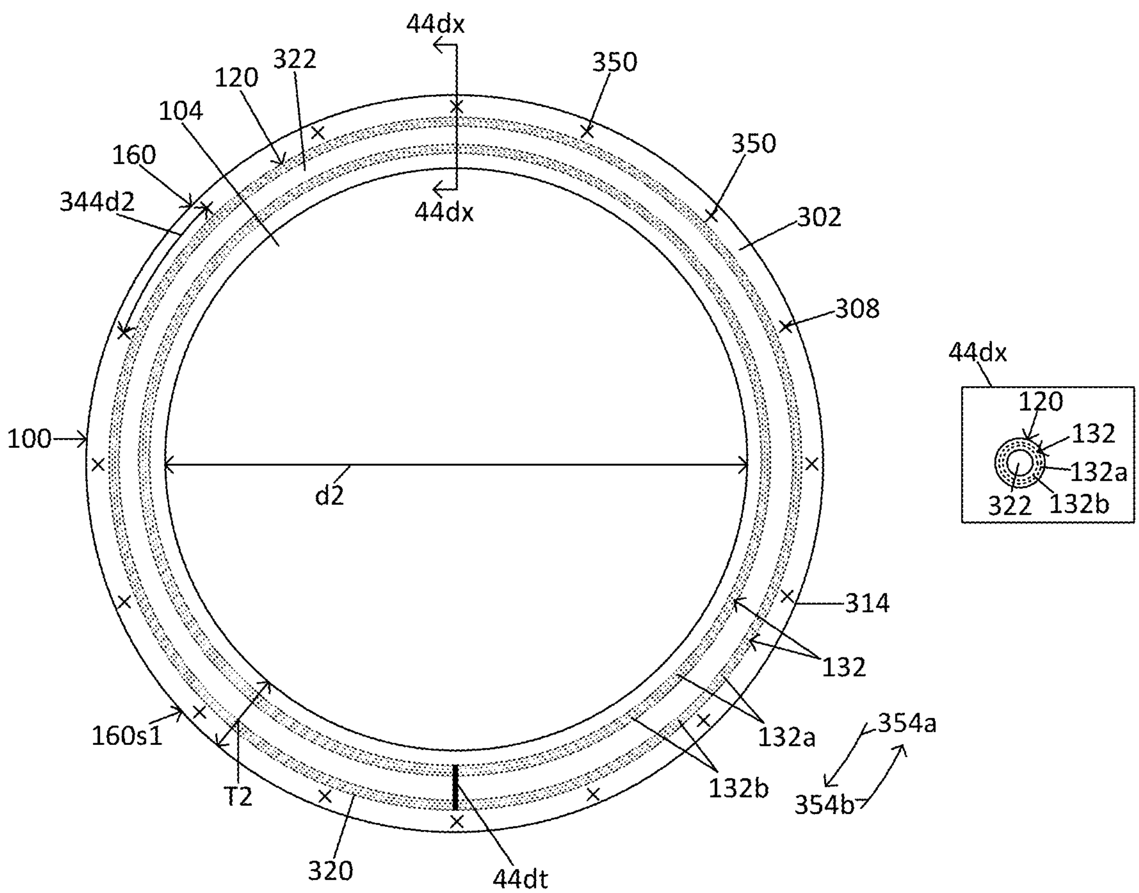

FIG. 44D illustrates a cross-sectional view of the tube of FIG. 44B taken along line 44D-44D.

Figure 45A:
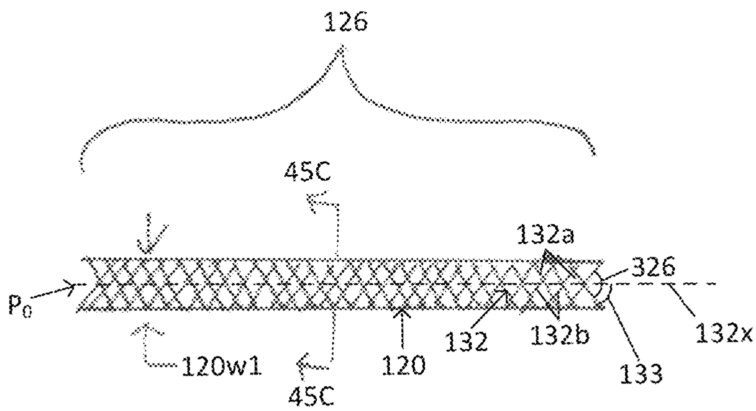

FIG. 45A illustrates a variation of an actuator in a non-expanded configuration.

Figure 45B:
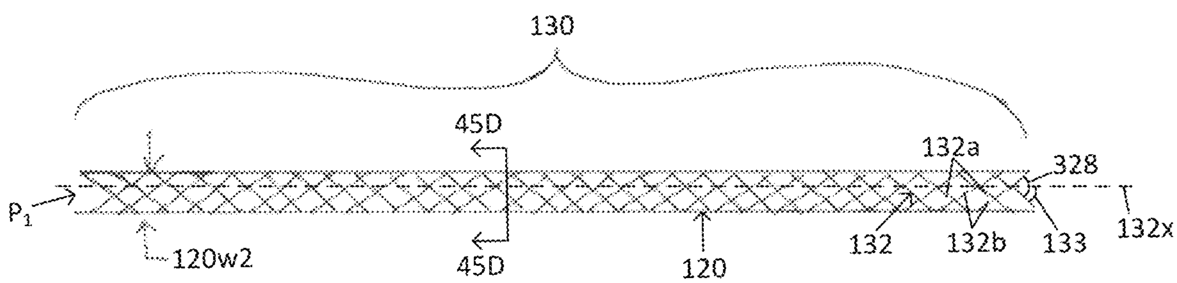

FIG. 45B illustrates a variation of the actuator of FIG. 45A in an expanded configuration.

Figure 45C:
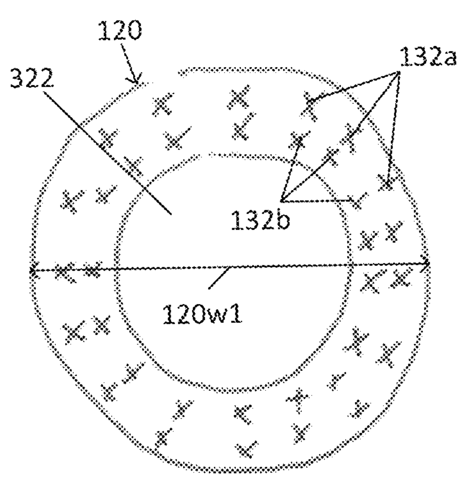

FIG. 45C illustrates a cross-sectional view of the actuator of FIG. 45A taken along line 45C-45C.

Figure 45D:
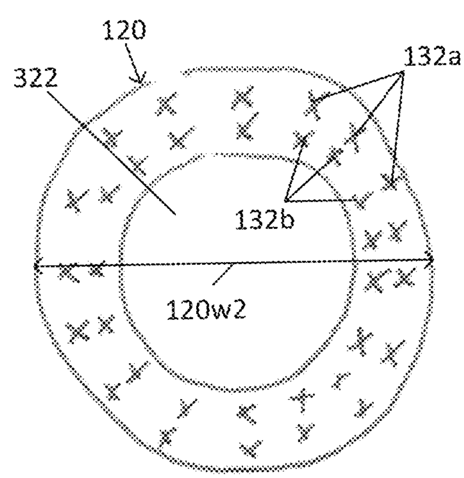

FIG. 45D illustrates a cross-sectional view of the actuator of FIG. 45B taken along line 45D-45D.

Figure 45E:
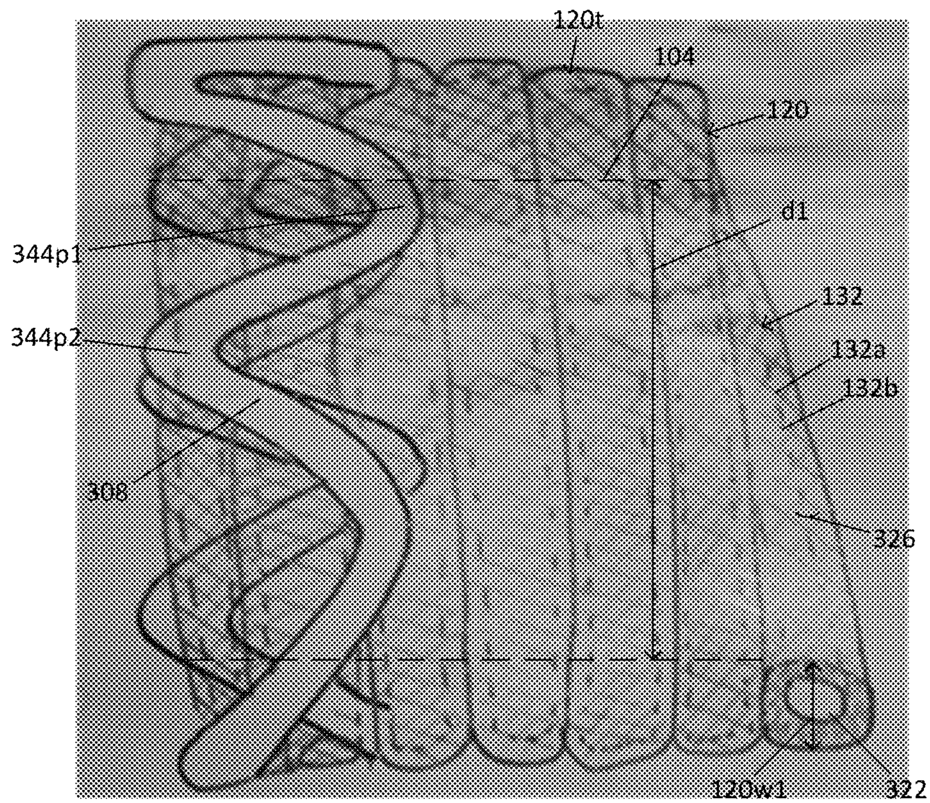

FIG. 45E illustrates a variation of the actuator of FIG. 45A in a helical profile and a variation of a reinforcement (e.g., a reinforcement 308).

Figure 45F:
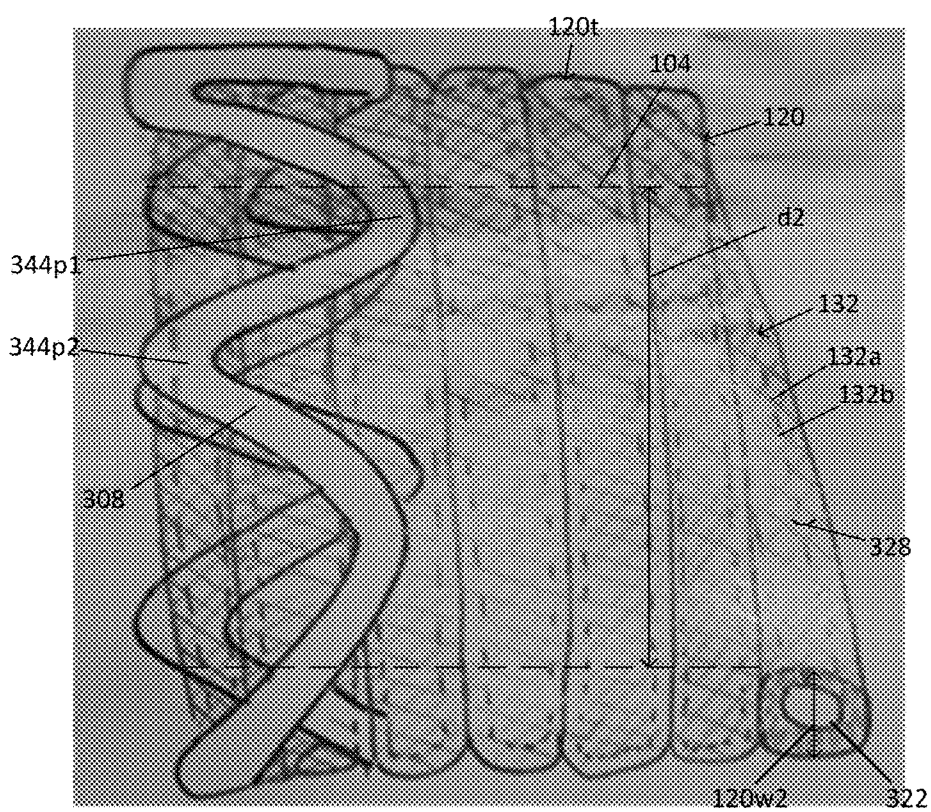

FIG. 45F illustrates a variation of the actuator and the reinforcement of FIG. 45E in an expanded configuration.

Figure 46A:
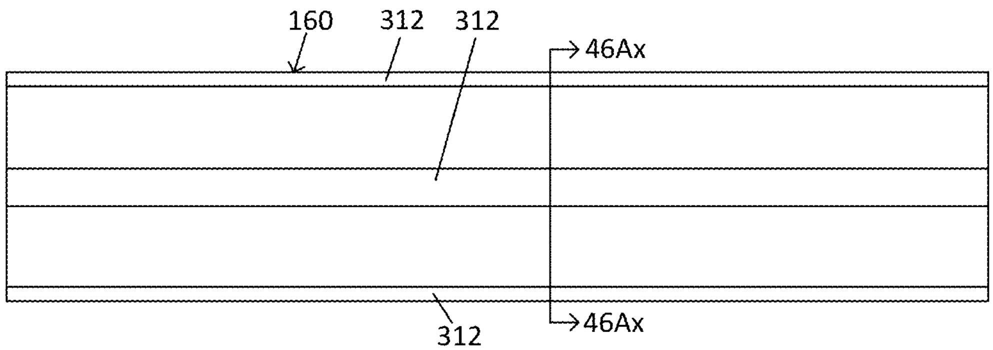
Figure 46B:
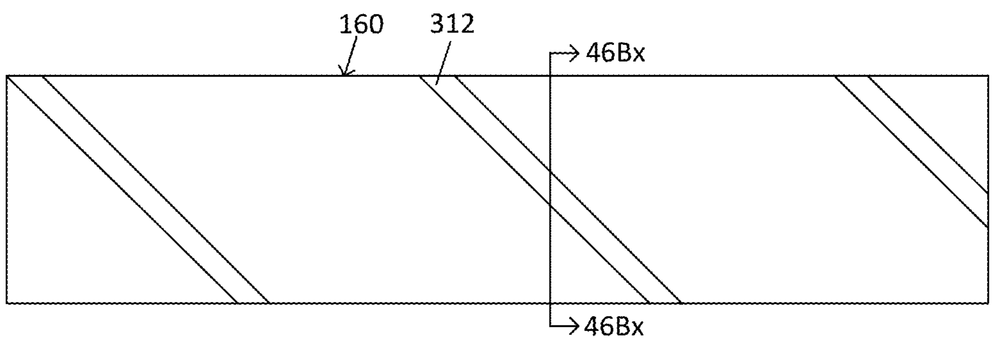
Figure 46C:
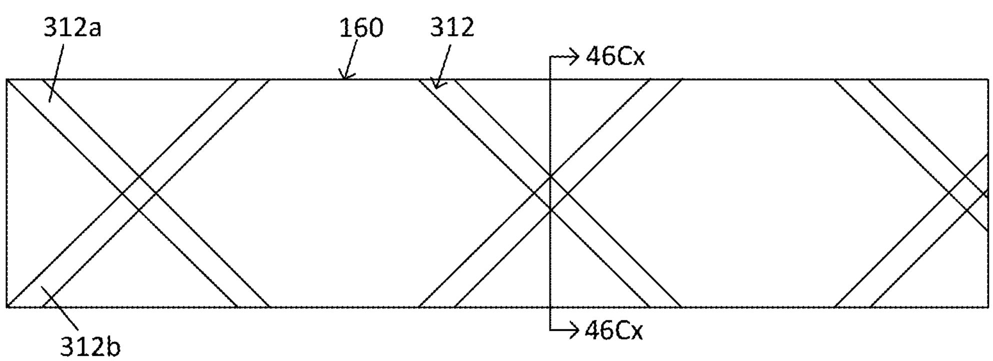

FIGS. 46A-46C illustrate a variation of the tubes in FIGS. 7A-25D, for example, when the tubes have a non-expanded configuration. FIGS. 46A-46C illustrate that the tubes in FIGS. 7A-25D can have a reinforcement (e.g., a reinforcement 312).

Figure 47A:
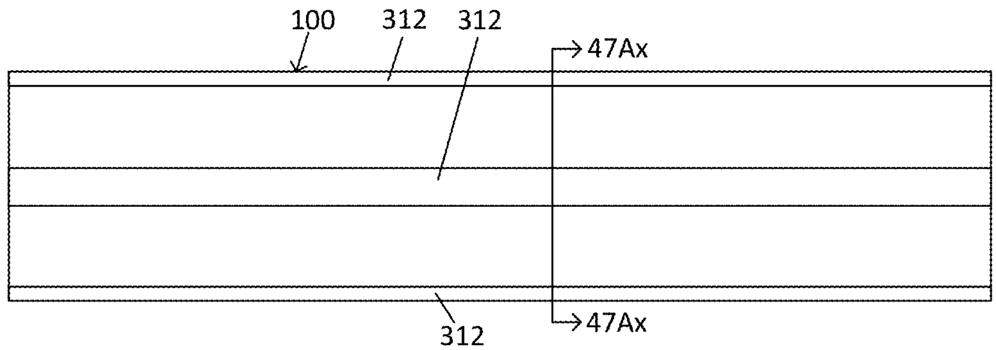
Figure 47B:
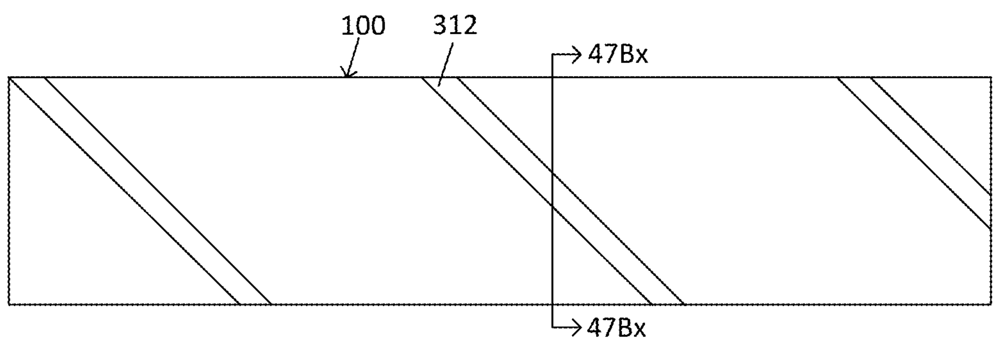
Figure 47C:
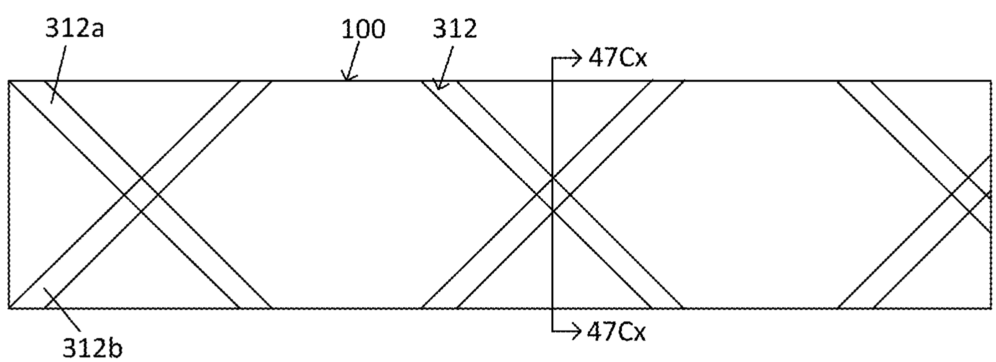

FIGS. 47A-47C illustrate a variation of the tubes in FIGS. 26A-44D, for example, when the tubes have a non-expanded configuration. FIGS. 47A-47C illustrate that the tubes in FIGS. 26A-44D can have a reinforcement (e.g., a reinforcement 312).

Figure 48A:
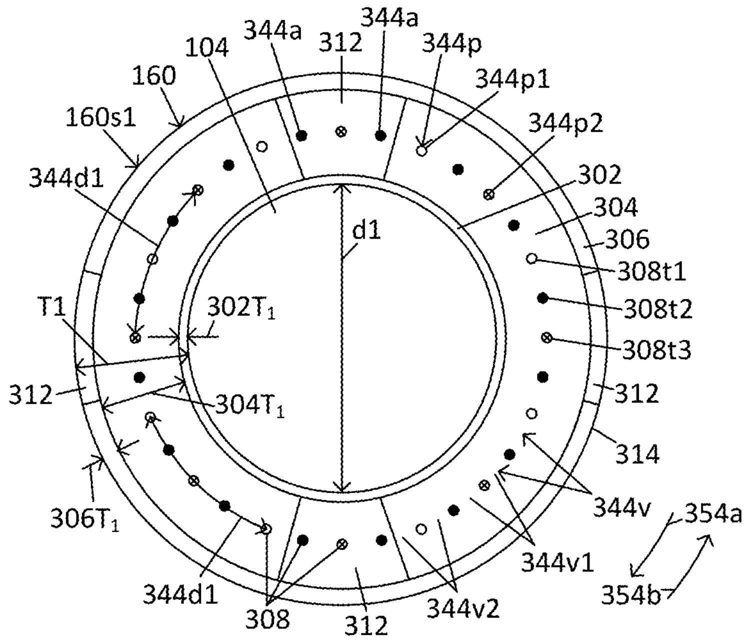

FIG. 48A illustrates a variation of a cross-sectional view of the tube of FIG. 46A taken along line 46Ax-46Ax when the tube is in a non-expanded configuration.

Figure 48B:
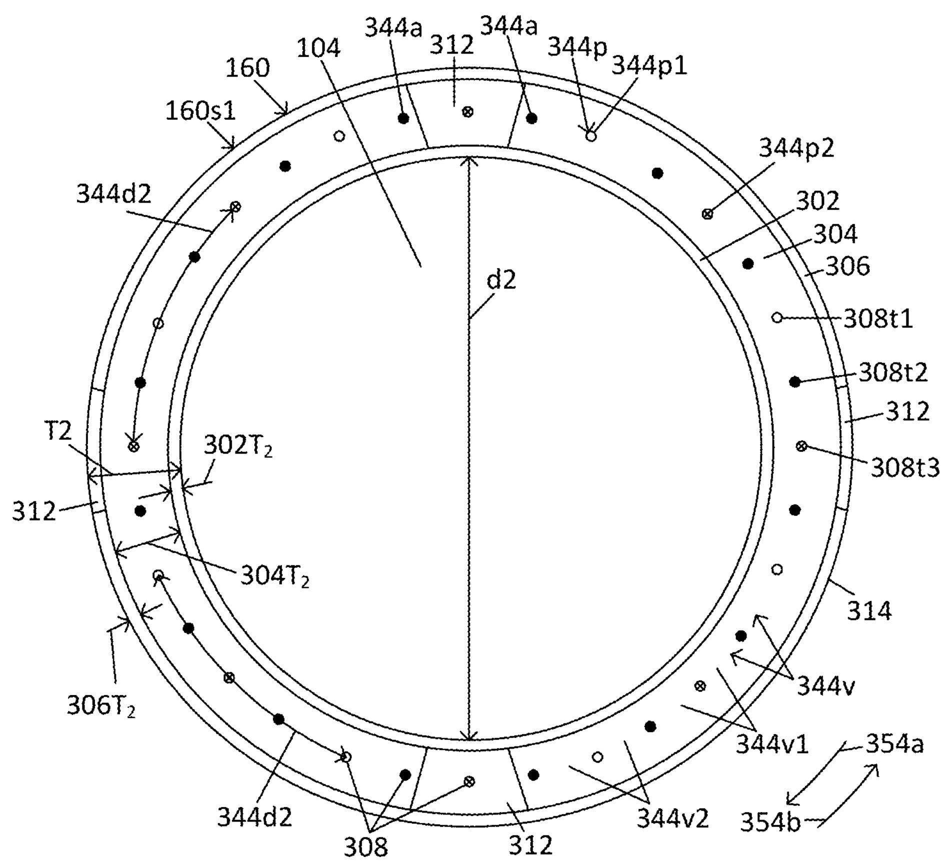

FIG. 48B illustrates a variation of the cross-sectional view of FIG. 48A when the tube is in an expanded configuration.

Figure 49A:
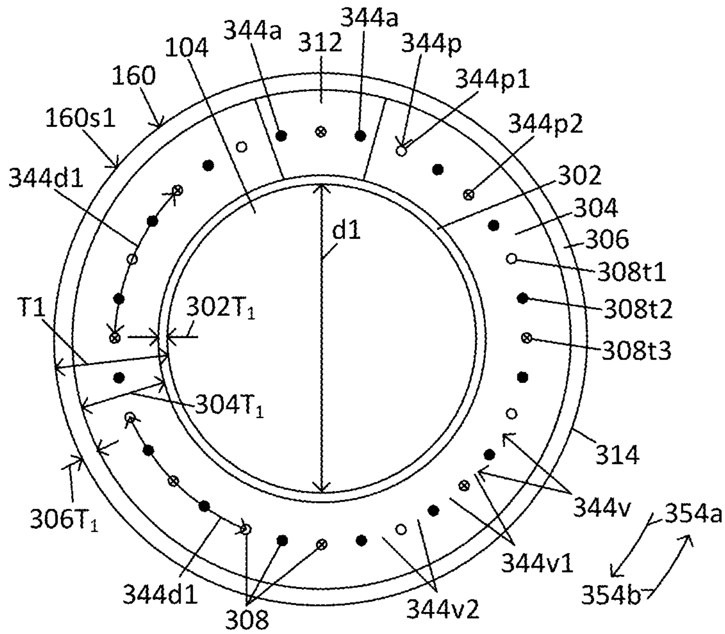

FIG. 49A illustrates a variation of a cross-sectional view of the tube of FIG. 46B taken along line 46Bx-46Bx when the tube is in a non-expanded configuration.

Figure 49B:
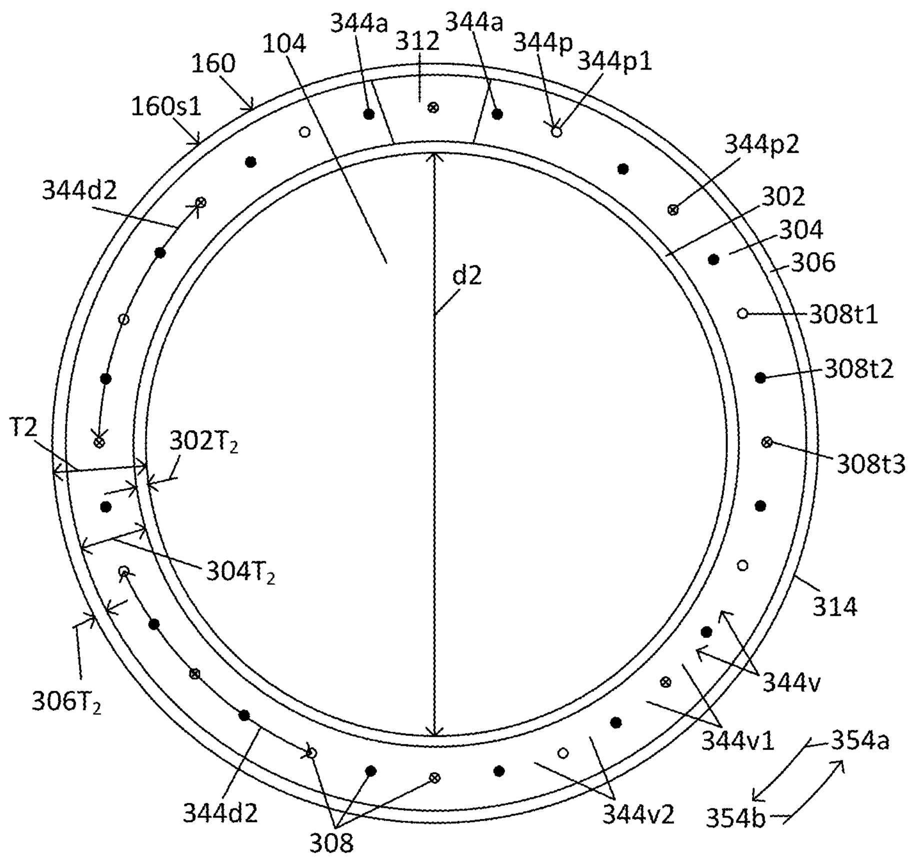

FIG. 49B illustrates a variation of the cross-sectional view of FIG. 49A when the tube is in an expanded configuration.

Figure 50A:
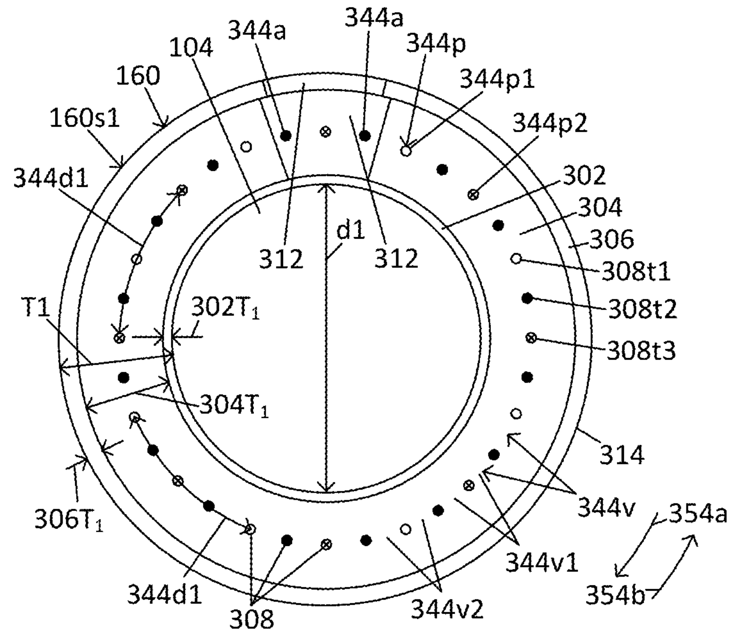

FIG. 50A illustrates a variation of a cross-sectional view of the tube of FIG. 46C taken along line 46Cx-46Cx when the tube is in a non-expanded configuration.

Figure 50B:
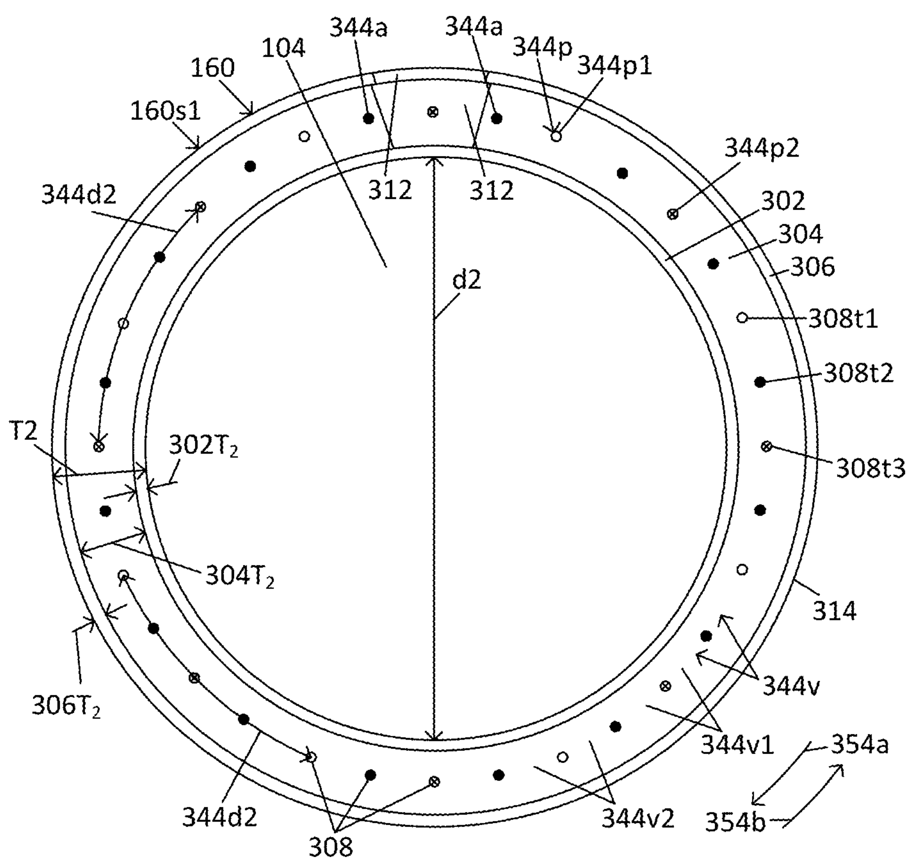

FIG. 50B illustrates a variation of the cross-sectional view of FIG. 50A when the tube is in an expanded configuration.

Figure 51A:
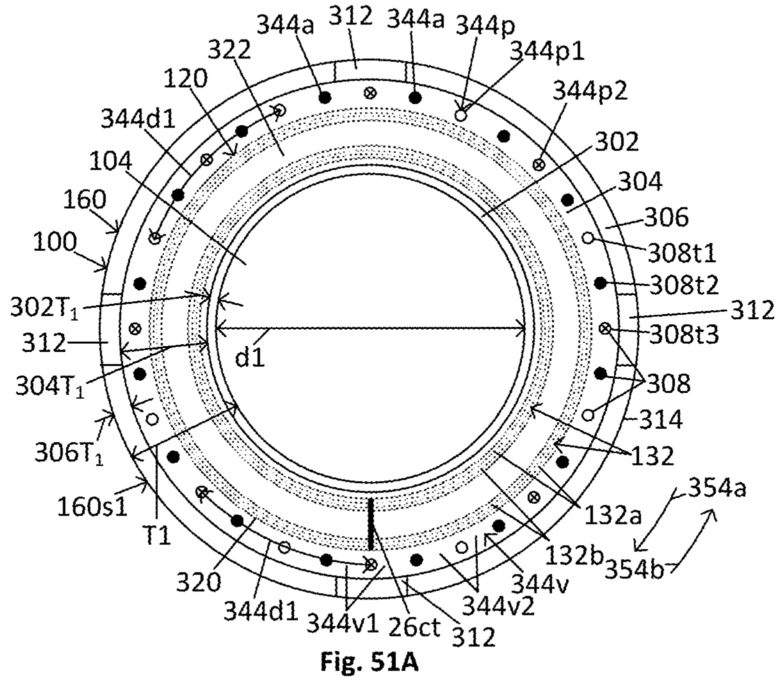

FIG. 51A illustrates a variation of a cross-sectional view of the tube of FIG. 47A taken along line 47Ax-47Ax when the tube is in a non-expanded configuration.

Figure 51B:
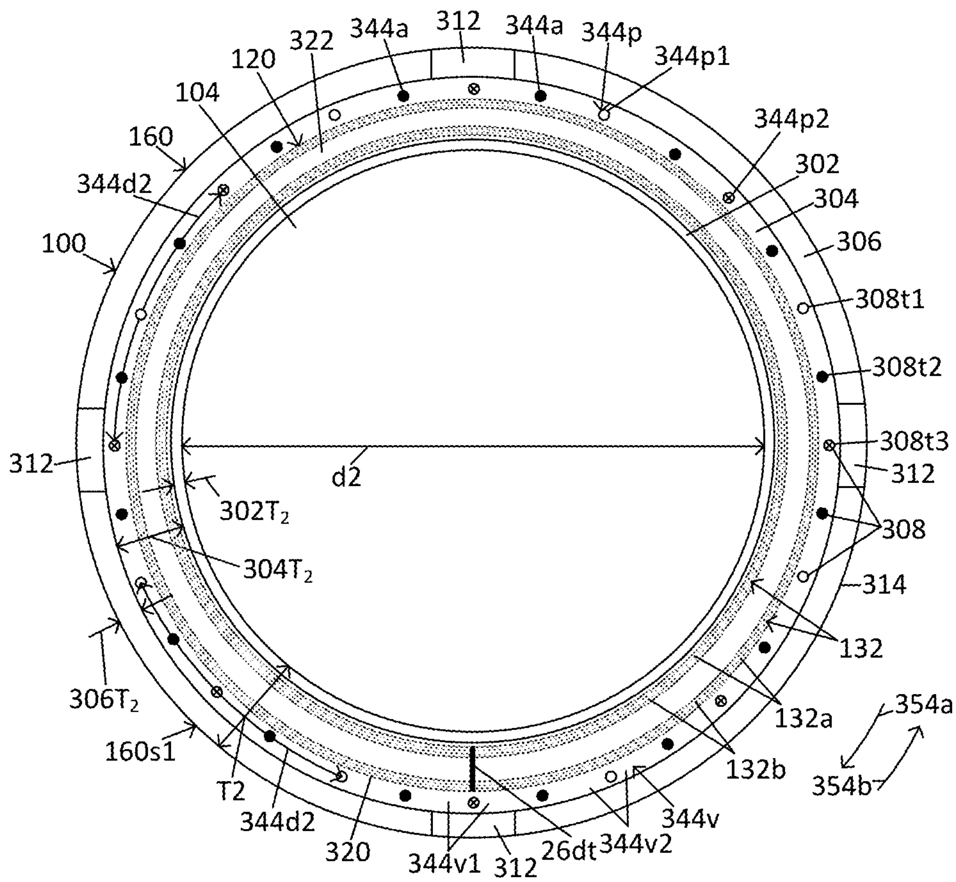

FIG. 51B illustrates a variation of the cross-sectional view of FIG. 51A when the tube is in an expanded configuration.

Figure 52A:
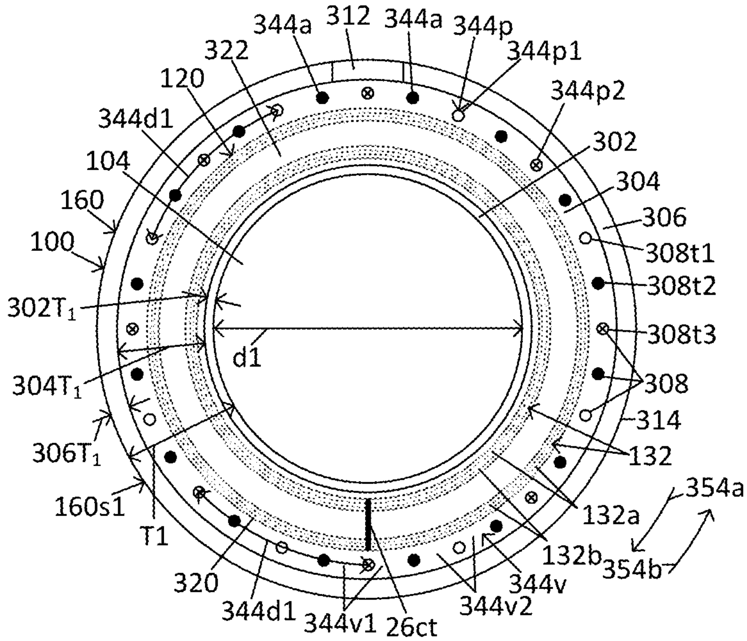

FIG. 52A illustrates a variation of a cross-sectional view of the tube of FIG. 47B taken along line 47Bx-47Bx when the tube is in a non-expanded configuration.

Figure 52B:
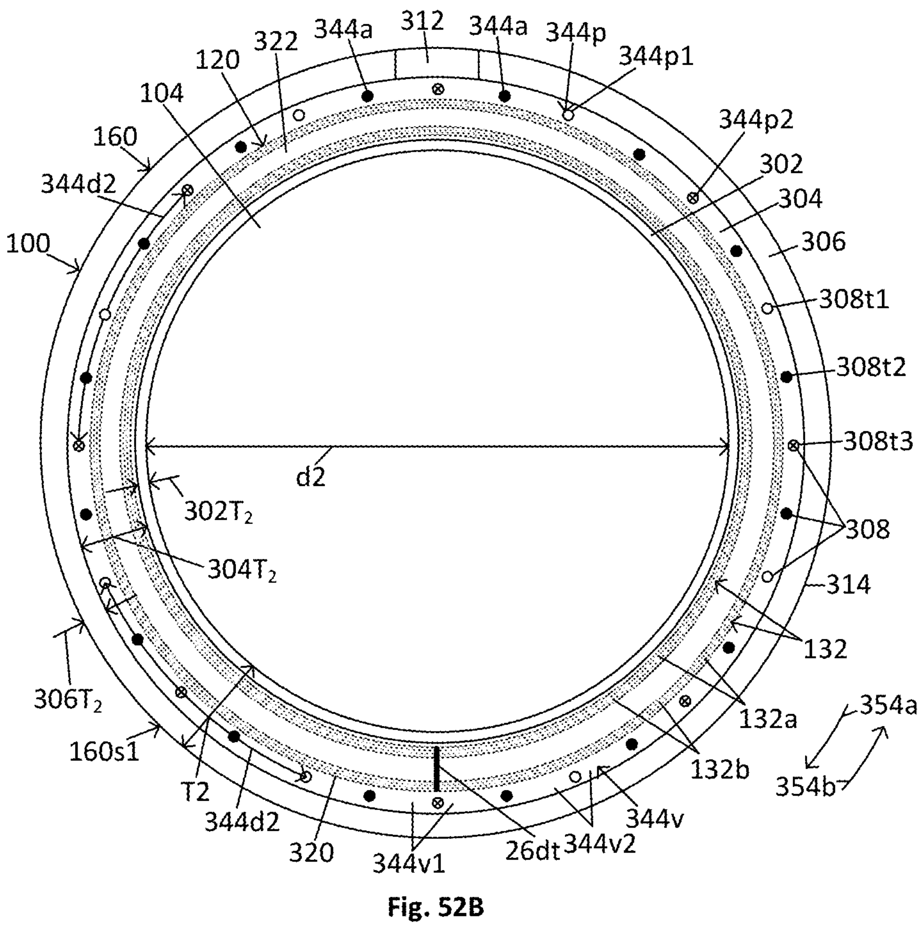

FIG. 52B illustrates a variation of the cross-sectional view of FIG. 52A when the tube is in an expanded configuration.

Figure 53A:
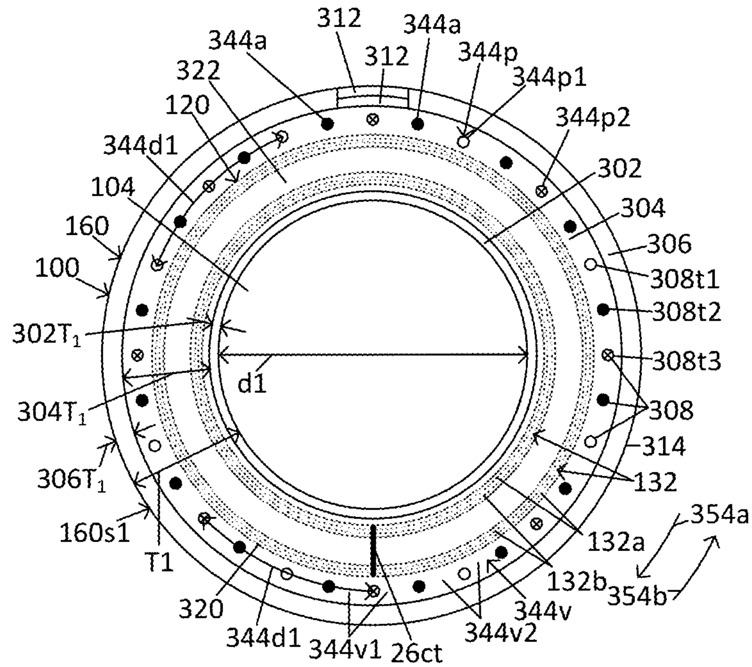

FIG. 53A illustrates a variation of a cross-sectional view of the tube of FIG. 47C taken along line 47Cx-47Cx when the tube is in a non-expanded configuration.

Figure 53B:
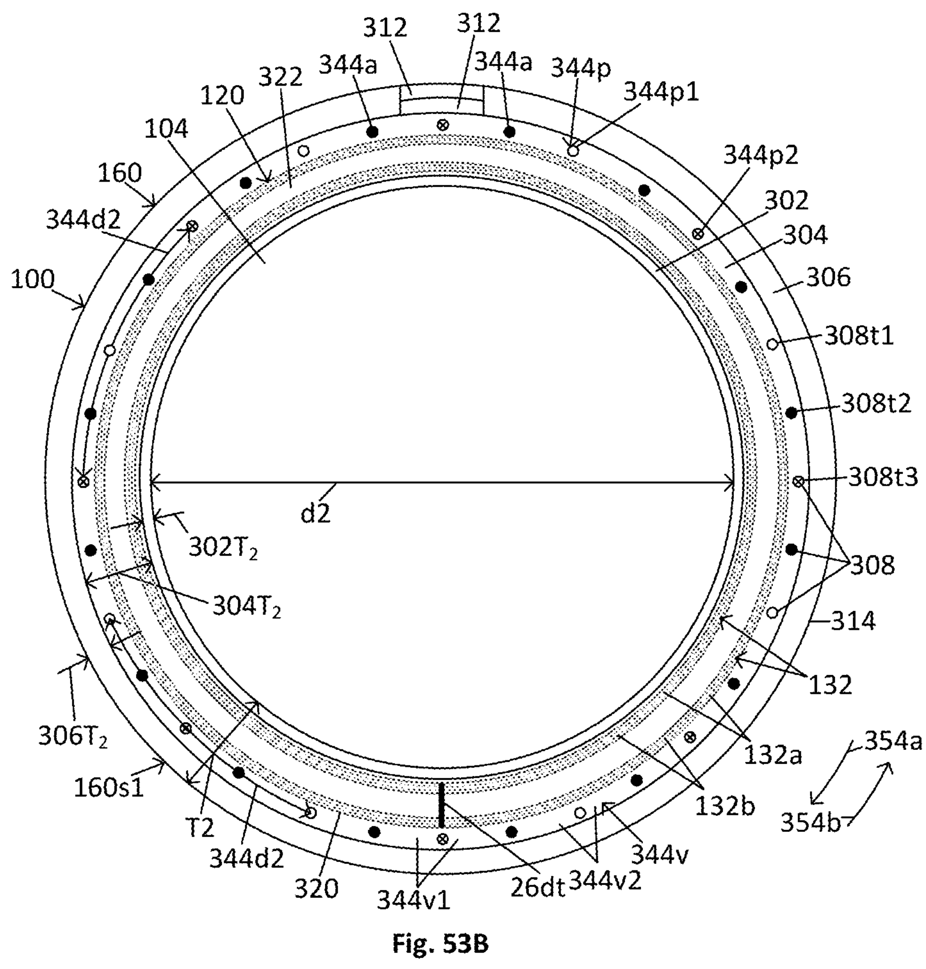

FIG. 53B illustrates a variation of the cross-sectional view of FIG. 53A when the tube is in an expanded configuration.

FIGS. 54A-54F illustrate side views of a variation of a braid.

FIGS. 55A1-55E1 illustrate side views of a variation of a braid.

FIGS. 55A2-55E2 illustrate cross-sectional views of the braid in FIGS. 55A1-55E1, respectively.

FIGS. 56A-56F illustrate side views of a variation of a braid.

FIGS. 57A1-57E1 illustrate side views of a variation of a braid.

FIGS. 57A2-57E2 illustrate cross-sectional views of the braid in FIGS. 55A1-55E1, respectively.

Figure 58A:
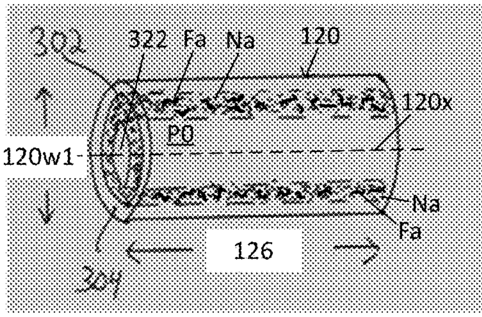
Figure 58B:
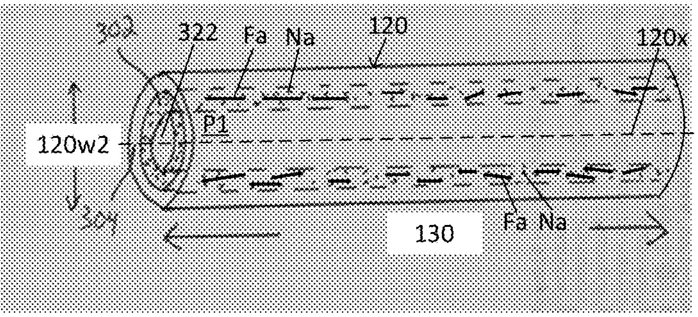

FIGS. 58A and 58B illustrate a perspective view of a variation of an actuator.

FIGS. 59A-59D illustrate perspective cutaway views of variation of a tube.

Figure 60A:
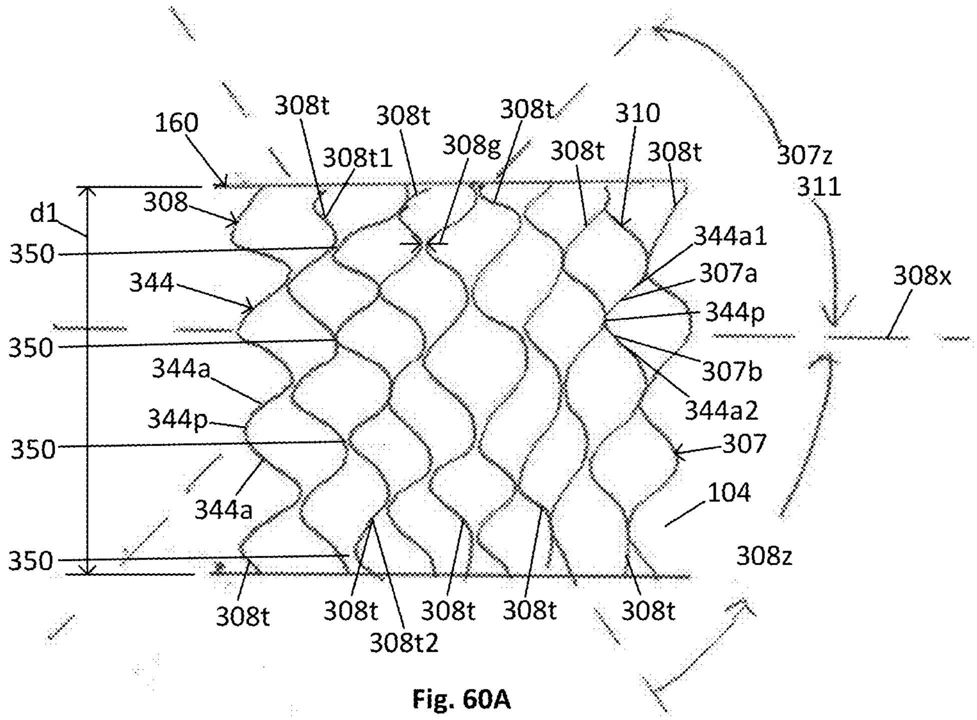

FIG. 60A illustrates a side view of a variation of a reinforcement.

Figure 60B:
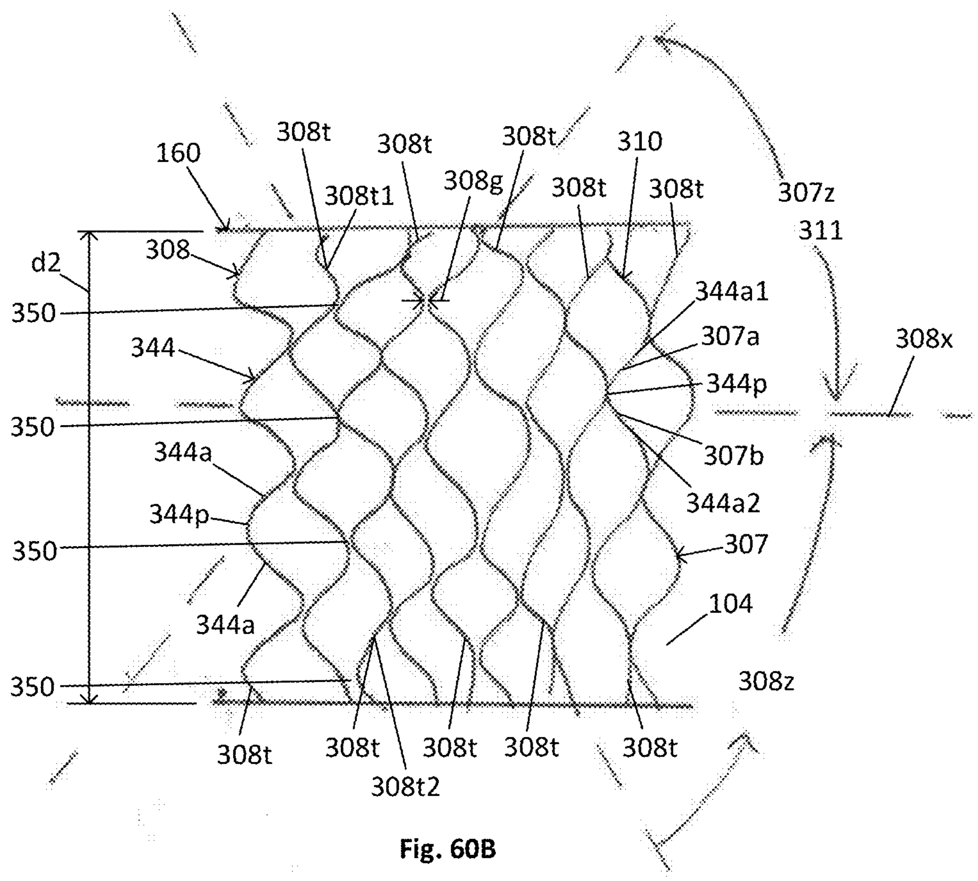

FIG. 60B illustrates a side view of the reinforcement of FIG. 60A in a radially expanded configuration.

Figure 60C:
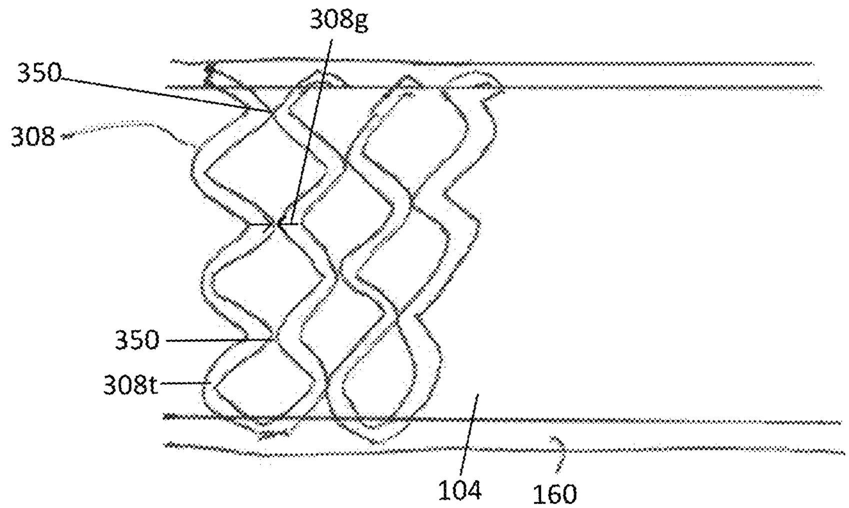

FIG. 60C illustrates a side view of a variation of a reinforcement.

Figure 60D:
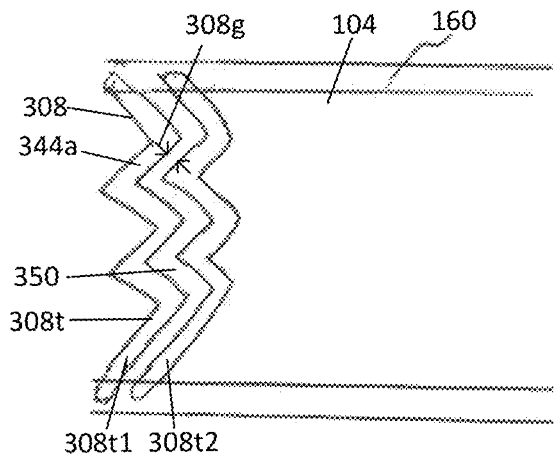

FIG. 60D illustrates a side view of a variation of a reinforcement.

Figure 61:
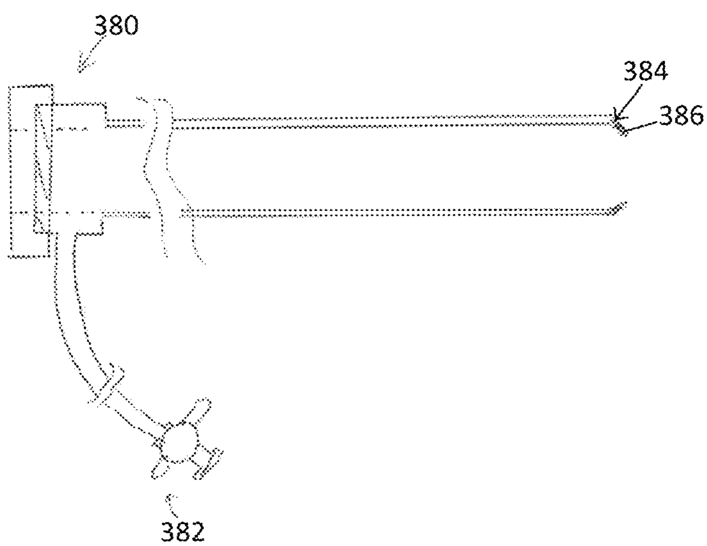

FIG. 61 illustrates a variation of a tube.

Figure 8A:
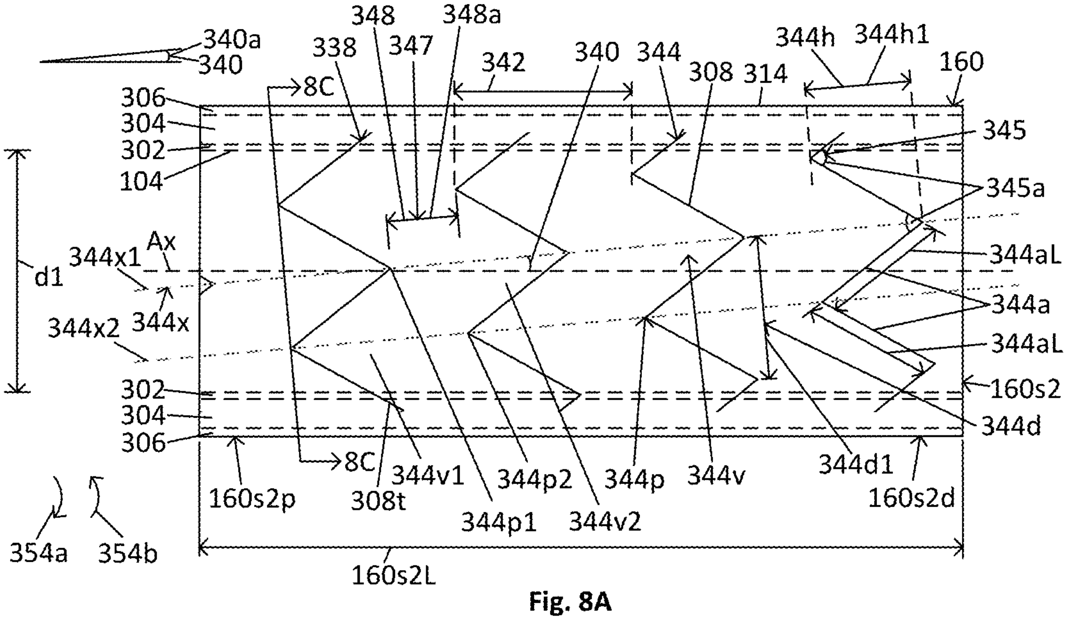
FIG. 8A is a closeup side view of the tube of FIG. 6A at section S5, for example, when the tube is in a non-expanded configuration.
Figure 62:
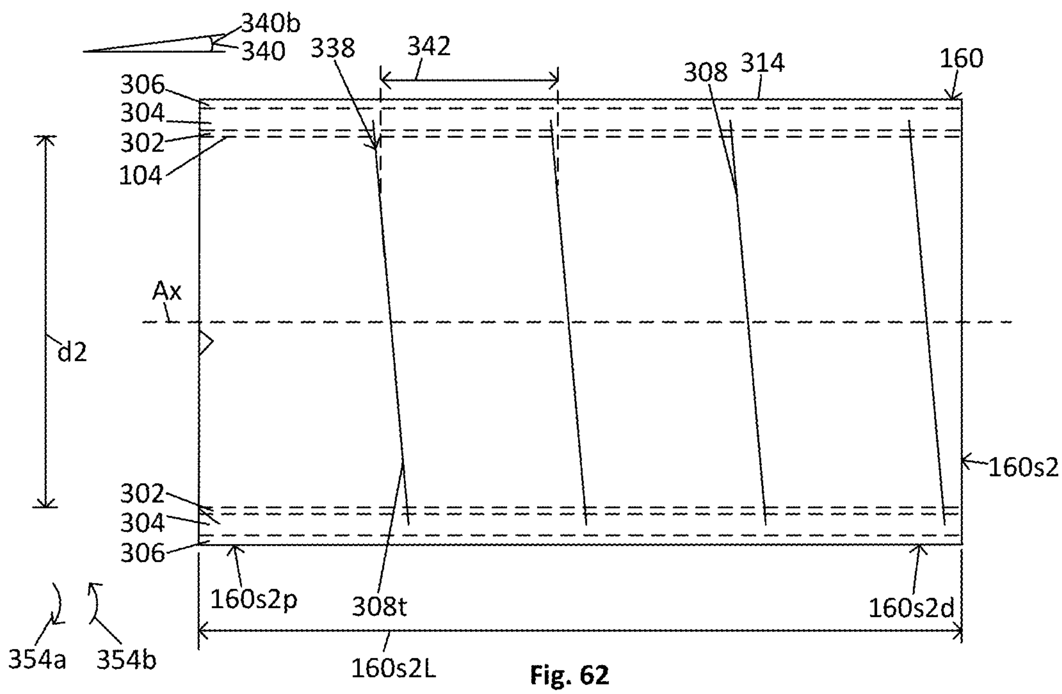

FIG. 62 is a side view of the section of the tube in FIG. 8A in a fully expanded configuration.

Figure 8B:
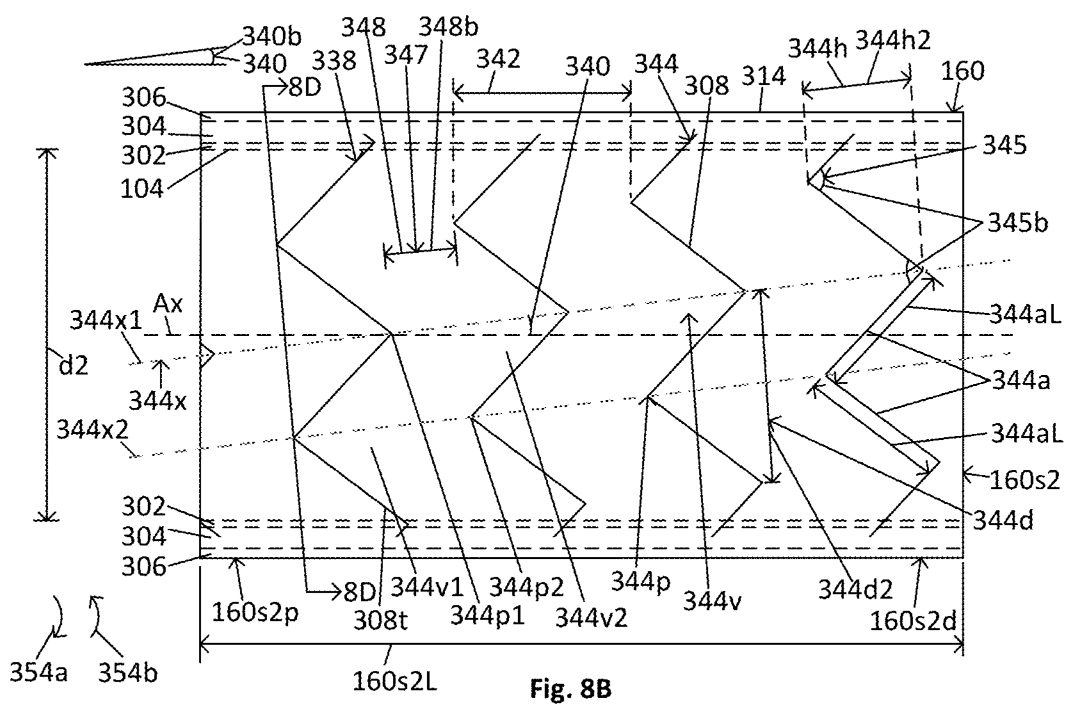
FIG. 8B is a closeup side view of the tube of FIG. 6C at section S6 after the tube is expanded, for example, when the tube is in an expanded configuration.

FIG. 62 is a the closeup side view of FIG. 8B but in a fully expanded configuration.

DETAILED DESCRIPTION

Figure 1A:
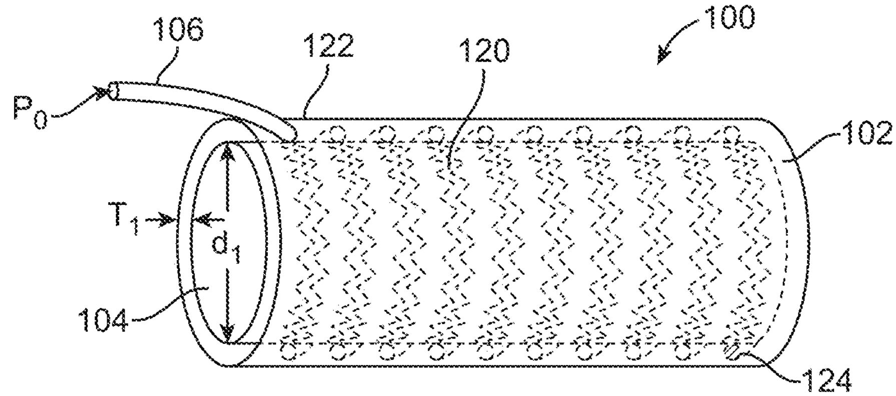
FIG. 1A illustrates one example of an expandable tube configuration.

The features in FIGS. 1A-62 can be combined with each other in any combination.

The following illustrations demonstrate various embodiments and examples of the devices and methods according to the present disclosure. Combinations of aspects of the various devices and methods or combinations of the devices and methods themselves are considered to be within the scope of this disclosure.

FIG. 1A illustrates one example of an expandable tube configuration 100 having an outer tube body 102 having a wall of thickness T1 and a lumen 104 with diameter d1. The tube body 102 is fabricated from an expandable polymer material with a structural element 120 located therein. The structural element 120 functions to assist the outer tube body 102 in expanding when an oversized device (not shown) is passed through the lumen. The structural element can be embedded within the wall of the tube body 102 such as through an extrusion or molding process. Alternatively, the structural element 20 can be positioned within a channel extending through the wall of the tube body 102.

Figure 1B:
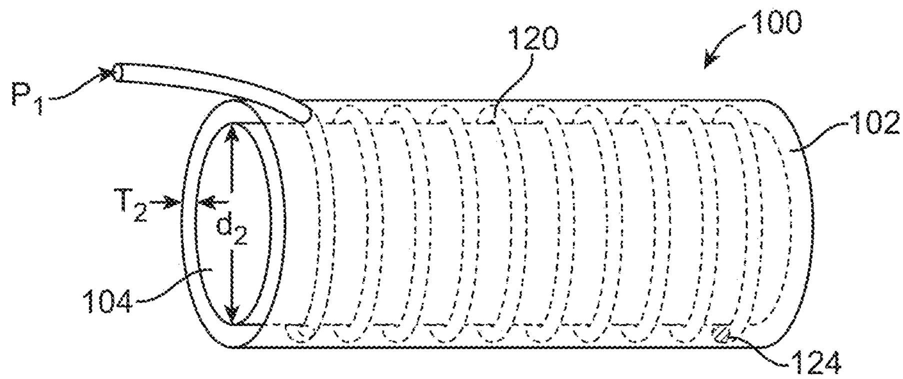
FIG. 1B shows the expansion of the structural element allows the expandable tube when located within the tube body.
Figure 1C:
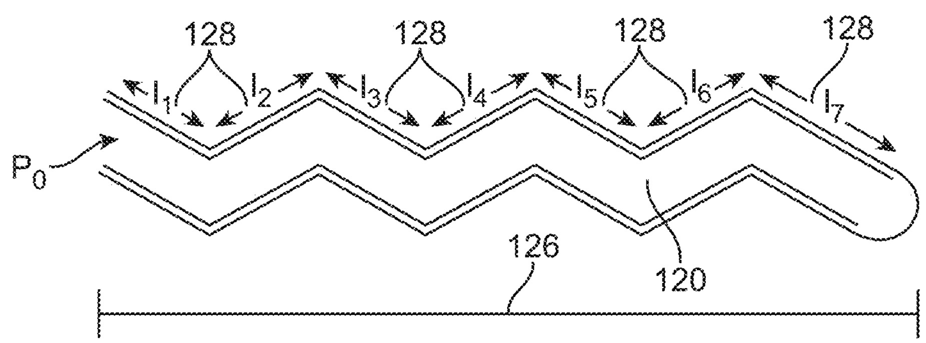
FIG. 1C illustrates a structural element prior to expansion.
Figure 1D:
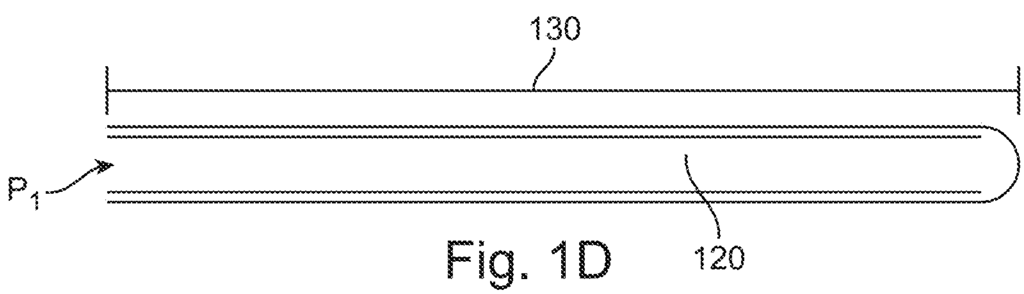
FIG. 1D illustrates a structural element after expansion.

In the variation illustrated in FIG. 1A, the structural element 120 comprises a wavy, zig-zag, or oscillating shape, as shown in FIG. 1C. Where the function of the shape is such that the total length 126 of the element 120 is reduced and can be expanded, as shown in FIG. 1D to an increased length 130 upon actuation of the structural element 120. In certain variations, the length of each segmented section 128 comprises the elongated length 130. In additional variations, the structural element 120 can be elastically expandable along length 126 to achieve increased length 130. In the illustrated variation, the structural element 120 can comprise an elastic structure that can be pressurized from a baseline pressure P0 to an increased pressure P1 where the increased pressure straightens the structural element from length 126 to 130. Clearly, alternate modes of expanding the length are within the scope of variations of this disclosure. For example, the structural element can comprise a shape memory alloy that is heat or energy activated to expand from its natural length 126 to its expanded length 130. Furthermore, the structural element 120 can include any number of shaped configurations apart from a zig-zag, wavy, or oscillating shape as long as the length can increase as desired.

FIG. 1A illustrates a state of the expandable tube 100 when the structural element 120 is in a natural or unextended state. The illustrated variation shows an inflation tube 106 coupled to the structural element 122. Any number of valves and/or plugs 124 can be used on either end of the structural element 122.

Alternate variations of the device include an inflation tube being a part of the structural element 122. In the initial condition, the pressure P0 allows the structural element 122 to remain in a relaxed condition where the diameter of the lumen 104 remains at d1. When desired, pressure is increased within the inflation tube 106 and/or structural element 120 as represented by P1. This increase in pressure permits the structural element 120 to extend from its initial state (as shown in FIG. 1C) to its elongated or extended state (as shown in FIG. 1D). The corresponding change of the length of the structural element 120 from 126 to 130 acts upon the tube body 120 to increase a diameter of the lumen 104 to D2. In certain variations the thickness T1 of the wall of the tube body 102 in the natural state remains the same or approximately the same as a thickness T2 of the wall in the expanded state. Alternate variations include devices where the thickness of the device varies between expanded and unexpanded states.

FIG. 1B shows how expansion of the structural element 122, drives expansion of the expandable tube 102. As noted above, this variation can be considered to be an actively expandable tube 100 where the stress inducing compressed zig zag structural element 120 can be actuated to expand a diameter of the tube body 102 to allow passage of an oversized device into the lumen. When pressurized, the structural element 120 straightens and adds length to the circumference via an expanding diameter while allowing the wall thickness T2 to remain the same or nearly the same as the unexpanded wall thickness T1 of the unexpanded tube 100.

Additional variations of the device 100 can include multiple structural elements 120 positioned within the wall of the expandable tube 102. In addition, one or more structural elements 120 can be positioned within or about the tube 102 if desired.

Figure 2A:
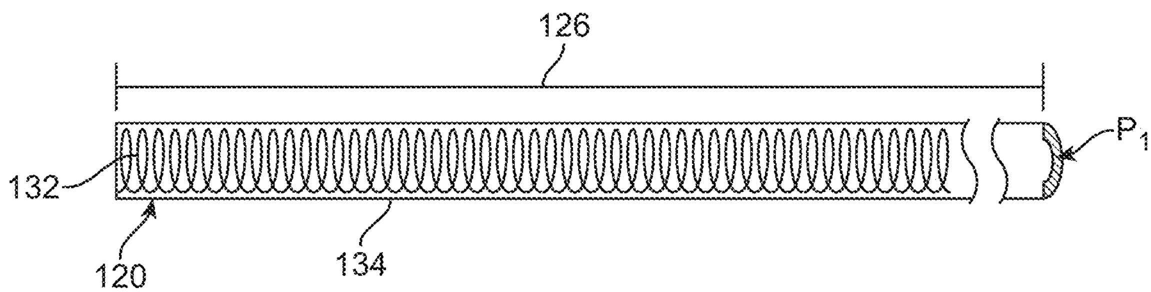
FIG. 2A illustrates another variation of a structural element prior to expansion but in a linear configuration.
Figure 2B:
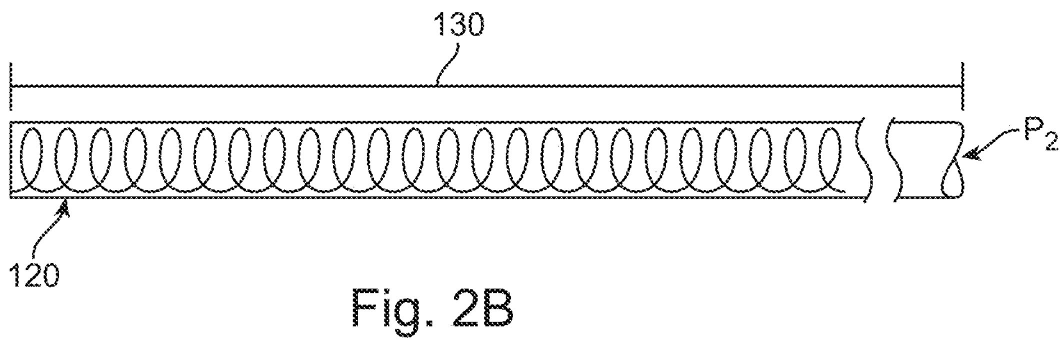
FIG. 2B illustrates the variation of the structural element in FIG. 2A after expansion.
Figure 2C:
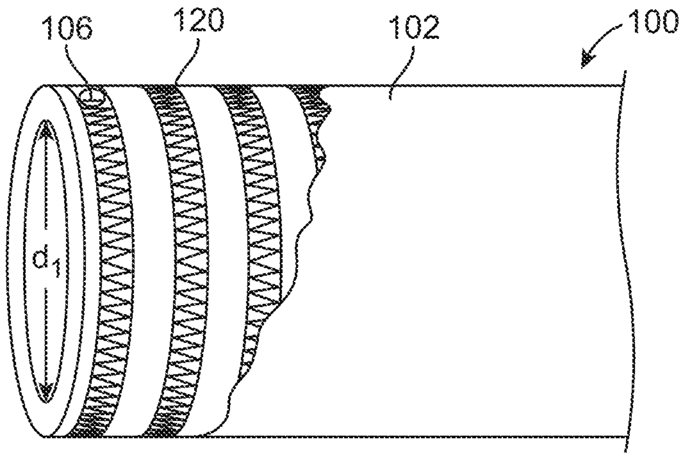
FIG. 2C shows a partial cut-away portion of a dynamic walled tubing with the structural element in a non-extended or non-expanded configuration.
Figure 2D:
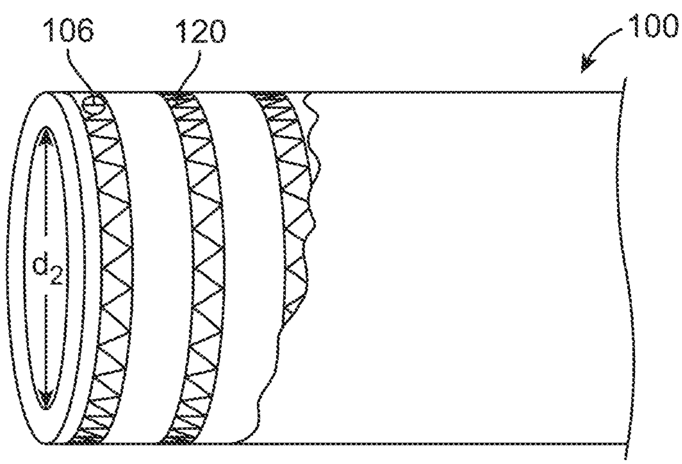
FIG. 2D shows a partial cut-away portion of the dynamic walled tubing with the structural element in an extended or expanded configuration.

FIG. 2A-2C illustrate another variation of a structural element 120 for use in a device 100 having dynamic walled tubing. In this variation, as shown in FIG. 2A, the structural element 120 is linear and comprises a reinforcement 132 (e.g., a coil or braid) located within an expandable liner 134. In the natural state, as shown by FIG. 2A, the liner 134 is at a first pressure P1 which corresponds to a first length 126. Upon pressurization, to P2, the liner and coil expand to length 130. Once pressure returns to P1, the coil 132 and the liner 134 return to the state as shown by FIG. 2A.

FIG. 2C shows a cut-away portion of a dynamic walled tubing 100. As illustrated, the structural element of FIG. 2A is helically positioned within a wall of a tube body 102. As the structural element is pressurized via a port 106, the structural element 120 expands in length (as shown in FIG. 2B) such that the dynamic walled tubing 100 expands to the configuration shown in FIG. 2C. Again, the diameter of a lumen 104 in the tubing 100 can increase from d1 to d2 or any range therebetween. When pressure within the structural element 120 is reduced, the dynamic walled tubing 100 can return to the state depicted in FIG. 2C.

Figure 3A:
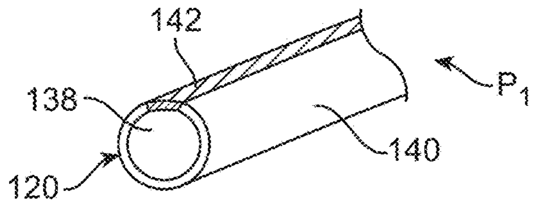
FIGS. 3A-3G illustrate another variation of a structural element 120 for use with a dynamic walled tubing.
Figure 3B:
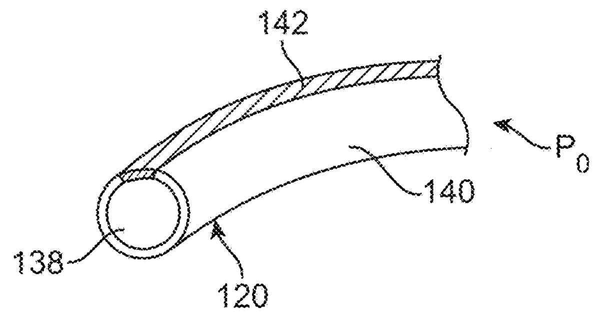
Figure 3C:
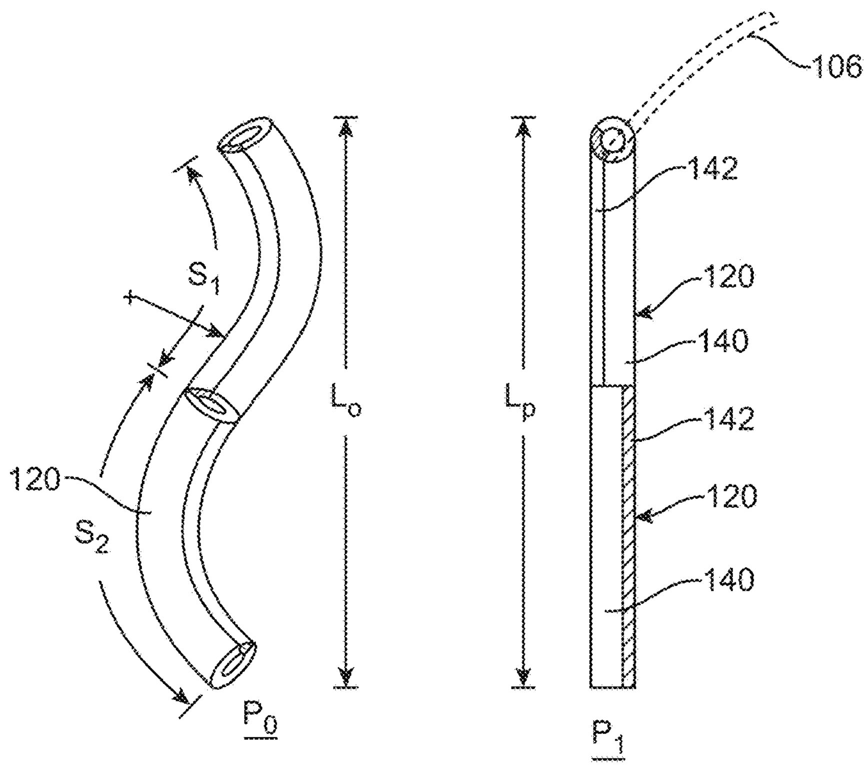

FIGS. 3A-3G illustrate another variation of a structural element 120 for use with a dynamic walled tubing 100. FIGS. 3A and 3B show a structural element comprising a first polymer 140 and a second polymer 142 where the first and second polymers 140 142 have differing structural properties such as durometer, elasticity, etc. In the illustrated example, and as shown with alternate configurations of the structural elements described herein, the structural element 120 can be configured to be pressurized, e.g., by sealing one or both ends of the lumen 138 and using an inflation member 106 (shown in FIG. 3C). With such a configuration, at a standard pressure P0, the structural element is in the configuration of FIG. 3B, e.g. a curved configuration, due to the differing structural properties of the first and second polymers 140 142. Upon pressurization of the element 120 to P1 the structural element straightens as shown in FIG. 3A. FIG. 3C shows the configuration of P0 on the left and P1 on the right where the structural element 120 goes from a shortened length L0 to an extended length L1.

As shown in FIG. 3C the second polymer 142 can be intermittent along the length of the structural element 120. In the illustrated variation, the second polymer 142 is located on opposite circumferential sides of the structural element 120. However, alternate variations are within the scope of this disclosure such as opposing helical winds, multiple strips along the structural element, etc. The variation shown in FIG. 3C illustrates the second polymer 142 forming two arcuate shapes that form a completed wave structure at P0.

In FIGS. 3A to 3C, the second polymer 142 comprises a lower modulus elastic strip where each opposing strip is aligned to be on a concave part of the waveform (inner part of the curve). When the structural element 120 is pressurized the stripe elongates and straightens the waveform by the anisotropic elastic modulus property of the intermittently stripped dual material tubing. One end of the helically wrapped intermittently striped waveform tubing is sealed. The other end has an extension line 106 with a port for attaching to a pressure source. For medical applications the port could be a luer fitting and the pressure source a syringe or other inflation device.

Figure 3D:
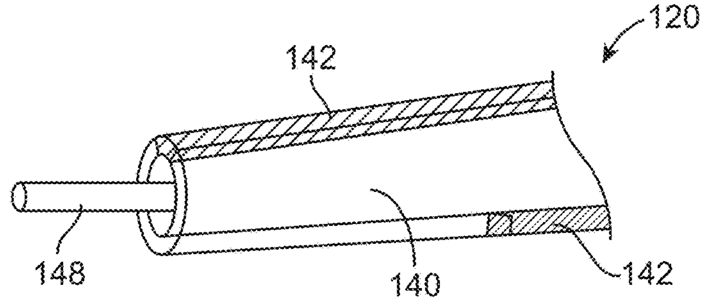

FIG. 3D illustrates the structural element 120 to have a reinforcing element 148 coupled to the structural element 120 (in this variation the reinforcing element 148 is inside the structural element 120. Such a configuration increases a kink resistance, hoop strength, buckling strength, crush resistance, torque transmission, burst strength, and pushability of the structural element 120. The reinforcing element 148 can be metal or polymer, single solid form or multi stranded cable or fiber bundle, stainless steel or nitinol, shape set or superelastic.

Figure 3E:
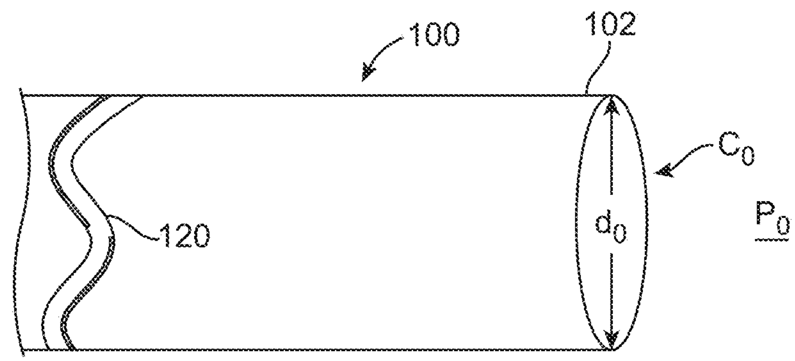

FIG. 3E illustrates the structural element 120 coupled to a tube body 102 where the structural element 120 is wrapped in a wave pattern and wound continuously in a helical pattern about a circumference C0 of the tube body 102 such that the internal diameter of the expandable tube 100 is d0.

In an additional variation, the striped structural element described above can be crosslinked so that it doesn't melt during a thermal fusing process used to create the structure. The amount of crosslinking can be controlled in a subsequent crosslinking initiation process such as exposure to UV energy, electron beam, gamma, x-ray, microwave, or other radiation source. The tubing resins can be compounded with a crosslinking inducing agent prior to the coextrusion process used to produce the dual durometer tubing. The amount or type of crosslinking initiator can be varied in the compounding step to achieve varying degrees of crosslinking upon exposure to crosslinking energy.

The crosslinking of the structure is not a necessary requirement for thermally fusing the wrapped tubing because the intermittent striped tubing material can be composed of a higher melting point than the materials used in the liner and jacket of the resultant structure. The jacket material is not required to chemically bond to the intermittent striped structural element so for example the jacket and/or liner may be composed of a polyurethane, silicone, or other elastomer and the striped tubing composed of PEBA resin, polyethylene, PET, or other thermoplastic.

Figure 3F:
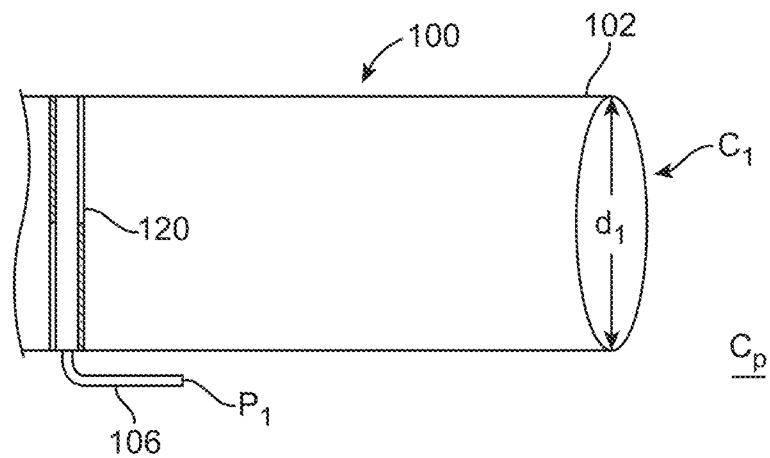

FIG. 3F illustrates increasing pressure to P1 within structural element 120 to increase the diameter of the expandable tube 100 to d1. As noted herein the internal diameter d1 of the resultant structure 100 expands upon the application of pressure to the wrapped stripped tubing resulting in a larger pressurized circumference C1. While there is only one structural element 120 shown in FIG. 3F any number of structural elements 120 can be used along the axis of the tube 102. In certain variations multiple structural elements can be wrapped about the tube 102. In certain variations, the outer diameter of the structural element being wrapped and the number of structural elements being wrapped determines the helix angle. Moreover, a continuous structural element 120 can be wrapped along an axis of the tube 102.

Figure 3G:
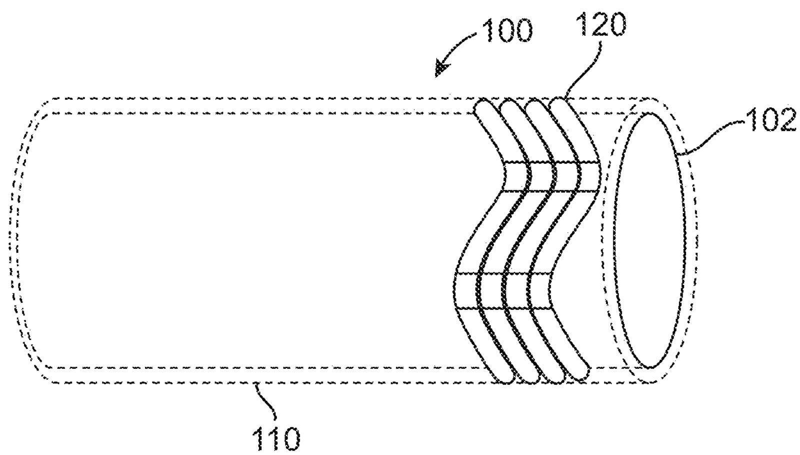

FIG. 3G shows a variation of an expandable tubing 100 as described herein being constructed. FIG. 3G shows a structural element 120 (or plurality of structural elements) being wrapped about a tube 102. The wrapped tube can then be jacketed with a polymer layer or liner 110 to hold the structure together. Alternatively or in combination, the structural element 120 and inner tubing 102 can be bonded to each other along the surfaces of contact. The tubing 100 may have a square or rectangular cross section rather than the round cross section as illustrated. There may also be a liner on the internal surface of the structure that will stretch to increase in diameter when the structure is pressurized. This liner may be made of a thin lubricious material such as PTFE or other more elastic polymers with or without coating applied to the inner surface. The fusing of the wrapped tubing with a liner and jacket can be a thermal process such as lamination, lasering, ultrasonic, electromagnetic induction or radiofrequency bonding. The fusing may be done with or without the use of external processing aids such as removable heat shrink tubing or internal processing aids such as removable mandrels.

In another variation, fusing of the wrapped structural element 120 about the tubing 102 and liner 110 can be accomplished by a liquid dispersion process such as dipping in a solution of solvated polymer and allowing the solvent to evaporate. The resultant tubing structure 100 could be configured with a tapered tip for insertion into blood vessels or mating with dilators or obturators, or it may have a balloon mounted to the tip on the outer surface to provide retention force to resist tensile loads or to provide a seal for either vacuum, pressure, or fluid or gas transfer. In addition to a balloon on the outer surface, or independently, a balloon may mounted to the internal surface over a portion of the length of one end of the structure to provide a seal either for vacuum, pressure, or fluid or gas transfer.

Figure 4A:
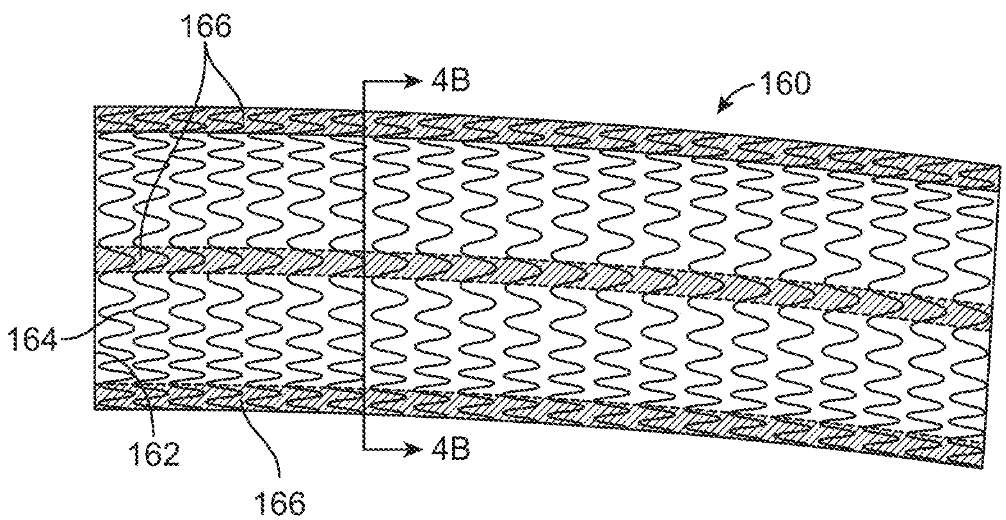
FIG. 4A illustrates another variation of a passive dynamic walled tube.

FIG. 4A illustrates another variation of a passive dynamic walled tube 160. As shown, the dynamic walled tube 160 includes a series of spring material 164, such as a wire. In this variation, the spring material 164 comprises a nested wire wound in a zig-zag manner within a body of the tubing 160. The properties of the spring material 164 can be consistent or vary through the tubing. Furthermore, the amplitude of the spring material 164, the pitch of the wire, the number of turns, as well as other material parameters can be adjusted as needed through the length of the tubing 160. The dynamic tubing also includes one or more regions of a secondary material 166 extending through the tubing that comprises structural properties different than a remainder of the tubing material 162. For example, the tubing material 162 can comprise a HDPE/LDPE or a blend thereof. While the strip material 166 can comprise a low flexural modulus material, such as a PolyBlend 45A material.

Figure 4B:
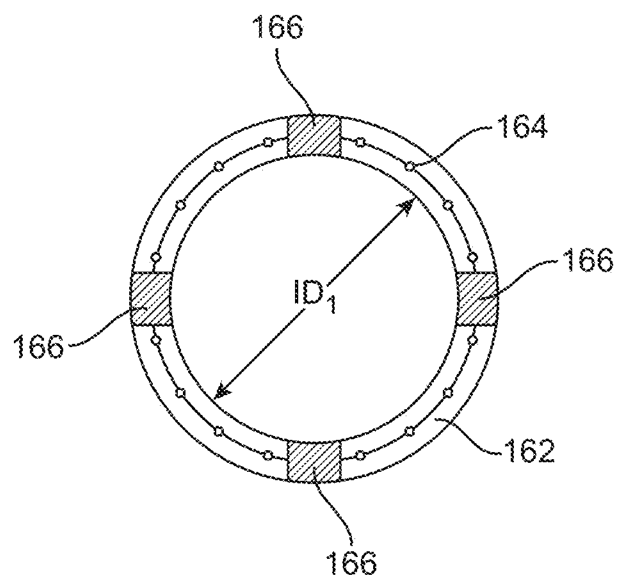
FIG. 4B illustrates a cross sectional view of the tube of FIG. 4A taken along line 4B-4B.

FIG. 4B illustrates a cross sectional view taken along the lines 4B-4B of FIG. 4A. As shown, the tubing material 162 and secondary material 166 can be co-extruded around or on the reinforcing spring material 164. The spring material 164 is constrained from an expanded state when extruded or formed into the tubing material 162 and secondary material 166. Because the tubing material 162 and secondary material 166 constrains the spring material 164, the spring material 164 will reduce the force required to expand the dynamic walled tube 160 when a device is placed therethrough. In other words, as the dynamic walled tubing expands due to passage of a device therein, the spring material 164 attempts to revert to its expanded state thereby lessening the force required to expand the dynamic walled tubing and reducing the force required to advance the device through the dynamic walled tubing. However, upon removal of the device within the dynamic wall tubing 160 allows the tubing material 162 and secondary material 166 to again constrain the spring material 164 and revert to the natural state shown in FIG. 4A.

Figure 4C:
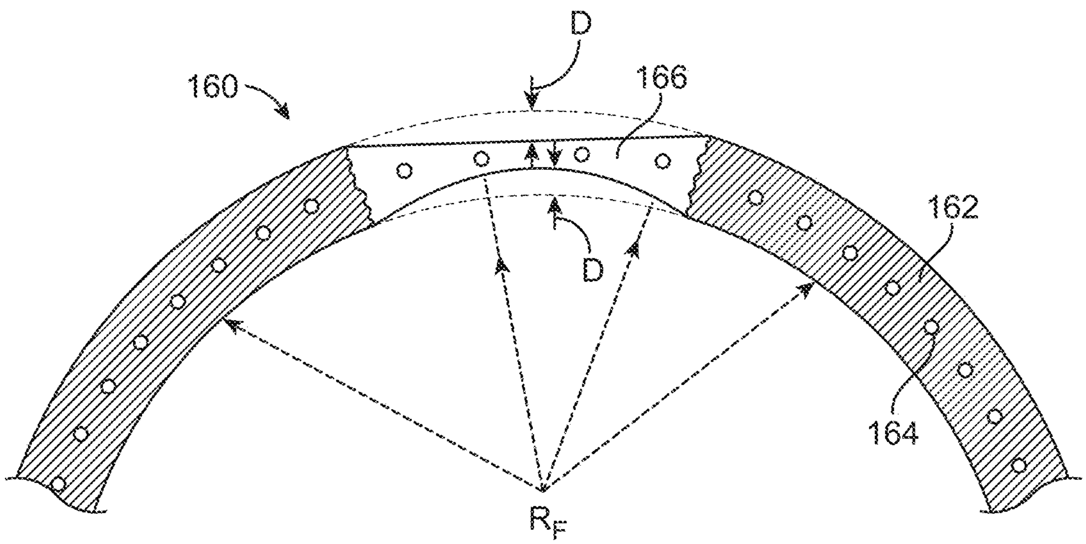
FIG. 4C illustrates the dynamic walled tubing of FIGS. 4A and 4B to illustrate a radial force that represents passage of a device through the lumen of the dynamic walled tubing.

FIG. 4C illustrates the dynamic walled tubing 160 of FIGS. 4A and 4B to illustrate a radial force RF that represents passage of a device through the lumen of the dynamic walled tubing 160. The radial force RF causes stretching of the secondary material 166, which in certain variations, is more elastic than the tubing material 162. As illustrated, the stretching of the secondary material 166 causes deflection of the wall thickness of the secondary material 166 by an amount D while the wall tubing 162 thickness remains substantially unchanged. As noted above, the stored energy of the nested coil 164 functions to reduce the amount of radial force RF required to expand the dynamic walled tubing 160 at the region of the secondary material 166. The stretching and deflection of the secondary material 166 also serves to reduce a contact surface area between the dynamic walled tubing and the device advanced therethrough and further reduces the amount of force required to advance the device through the dynamic walled tubing 260.

Figure 4D:
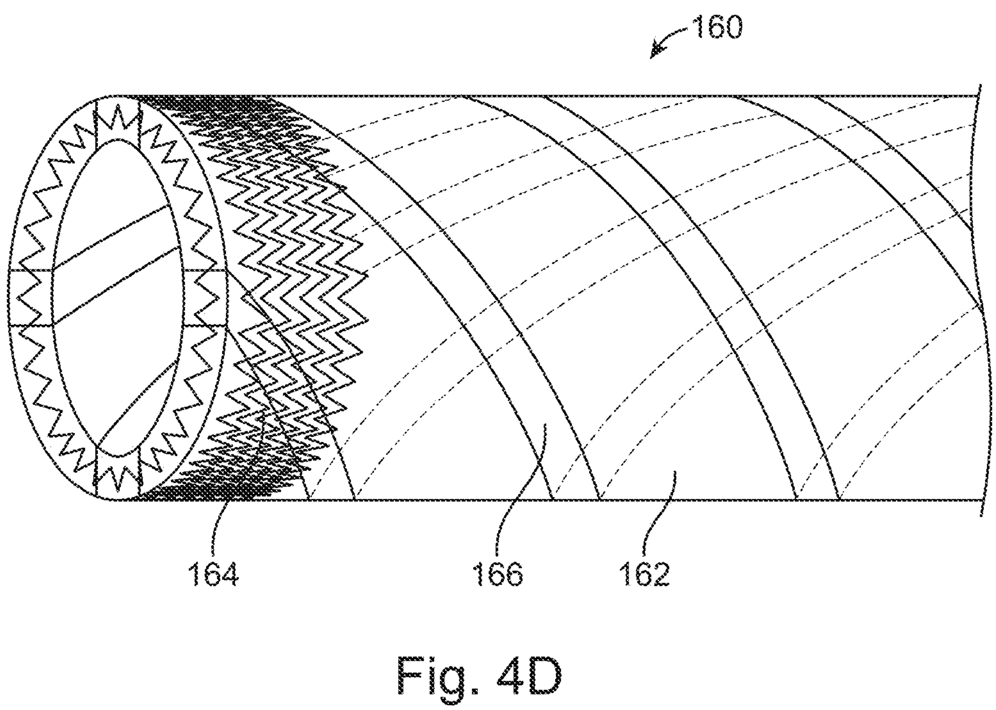
FIG. 4D illustrates another variation of a dynamic walled tubing with a secondary material that extends in a helical configuration about the tubing.

FIG. 4D illustrates another variation of a dynamic walled tubing 160. In this variation, the secondary material 166 extends in a helical configuration about the tubing 160.

Figure 5A:
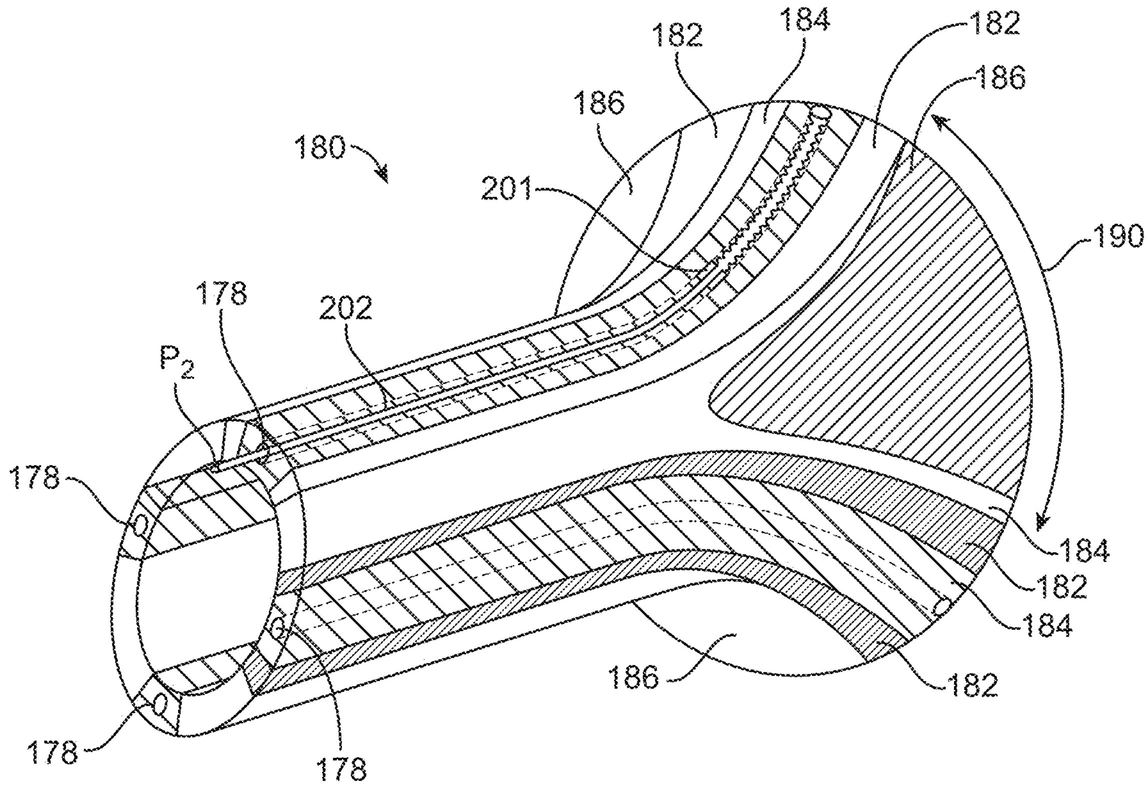
FIG. 5A illustrates another variation of a dynamic walled tube configured to have an expandable tip.

FIG. 5A illustrates another variation of a dynamic walled tube configured to have an expandable tip. As shown, the tip of the tube 180 comprises a first material 184, typically a lower durometer material (e.g., 40A), containing a lumen 178 extending therethrough and terminating at the tip. A second material 182 higher durometer material (e.g., greater than 80A) is located adjacent to the first material 184. Next, a highly elastic material 186 is located adjacent to the second material 182. To expand the tip, a mechanism 202 causes elongation of the first material 184. Because the second 182 material is difficult to elongate, the highly elastic material 186 stretches allowing materials 184 and 182 to expand outwards causing the tip to expand as shown by arrow 190.

Figure 5B:
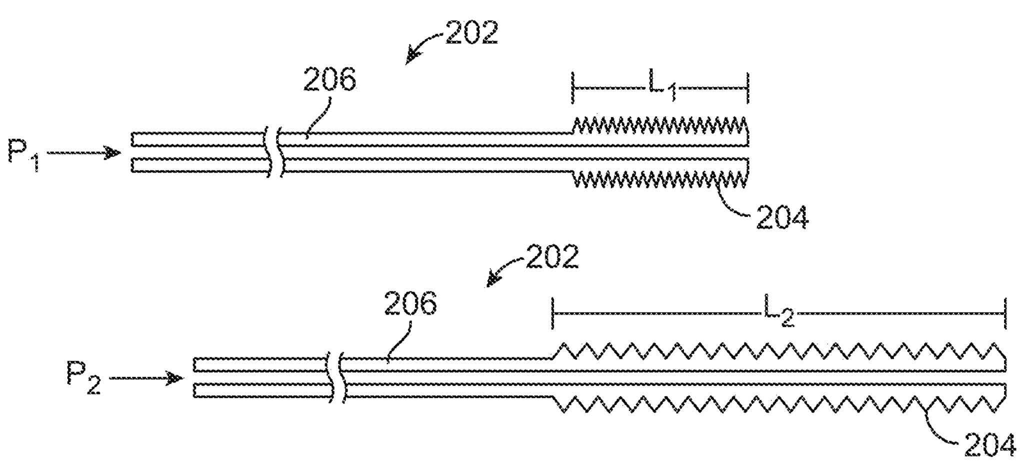
FIG. 5B shows an extension mechanism to expand the tip of the device of FIG. 5A.
Figure 5C:
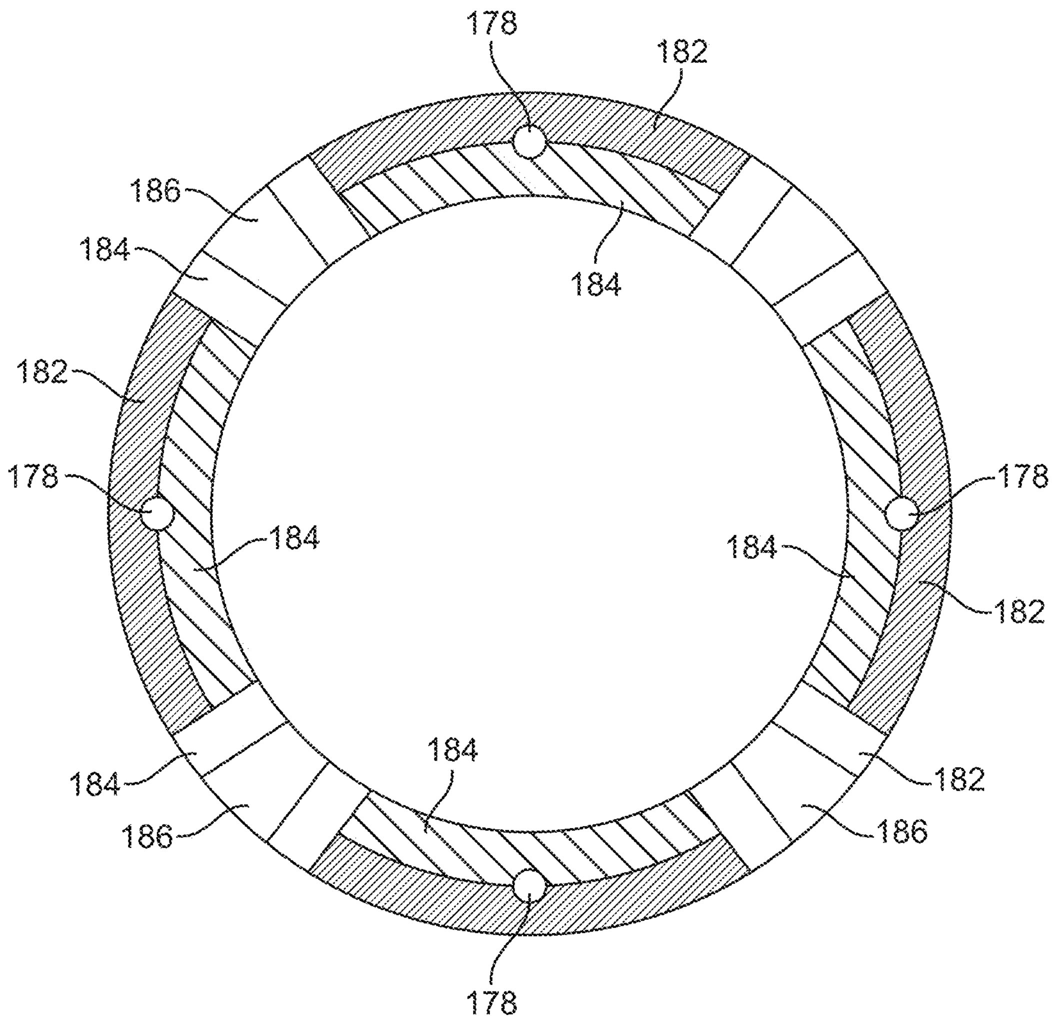
FIG. 5C shows a cross sectional view of the tip of the expandable tip catheter when in a non-expanded configuration.

FIG. 5B illustrates one example of mechanism for expanding the expandable tip catheter shown in FIG. 5A. In this example, the mechanism 202 comprises a thin walled longitudinally expandable pressure tubing. In additional variations, the tubing is not limited to longitudinal expansion but effectively expands to cause a distal force on the tip of the catheter 180 when located in the lumen 178, which results in expansion of the tip of the catheter 180. As shown, tubing comprises a non-expandable section 205 adjacent to an expandable section 204. For example, the expandable section 204 can comprise convoluted folds of the wall of the tubing, such that when the tubing 202 is pressurized from P1 to P2 the expandable section 204 increases in length from L1 to L2. In one variation, the non-expandable section 206 of the tubing 202 is affixed within the lumen 178 in the first material 184 such that elongation of the expandable section 204 causes outward movement of the tip.

FIGS. 6A-62 illustrate various tubes (e.g., tubes 100 and tubes 160) with various combinations and arrangements of various layers, materials, coatings, and/or reinforcements. The features shown FIGS. 6A-62 can be combined in any combination with each other, and can be combined in any combination with the features shown in FIGS. 1A-5C. For example, a tube (e.g., a tube 100, a tube 160) can have any combination of features shown in FIGS. 6A-62. As another example, a tube (e.g., a tube 100, a tube 160) can have any combination of features shown in FIGS. 1A-62.

Layers

The tube 160 can have one or multiple layers (e.g., 1 layer, 2 layers, 3 layers, 4 layers, 5 layers, 6 layers, or more than 6 layers, for example, 7-12 layers, including every 1 layer increment within this range). FIGS. 6A-25D illustrate that the tube 160 can have various layers, for example, layer 302, layer 304, layer 306, or any combination thereof, for example, in the arrangements shown. Layer 302 can be a first layer, a second layer, and/or a third layer. Layer 304 can be a first layer, a second layer, and/or a third layer. Layer 306 can be a first layer, a second layer, and/or a third layer. Layer 302 can be an innermost layer, a middle layer, or an outermost layer. Layer 304 can be an innermost layer, a middle layer, or an outermost layer. Layer 306 can be an innermost layer, a middle layer, or an outmost layer. For example, FIGS. 6A-25D illustrate that the tube 160 can have the layers in the arrangements shown.

For example, for tubes 160 comprising three layers, the tube 160 can have any combination of three layers, including, for example, (1) layer 302, layer 304, and layer 306, (2) two layers 302 and a layer 304, (3) two layers 302 and a layer 306, (4) two layers 304 and a layer 302, (5) two layers 304 and a layer 306, (6) two layers 306 and a layer 302, (7) two layers 306 and a layer 304, (8) three layers 302, (9) three layers 304, (10) three layers 306, or any other combination of three layers. Any one of the layers can be the first layer, any one of the layers can be the second layer, and any one of the layers can be the third layer. Any one of the layers can be the inner layer, any one of the layers can be the middle layer, and any one of the layers can be the outer layer. For example, for tubes 160 comprising layer 302, layer 304, and 306, layer 302 can be a first layer (e.g., an innermost layer or an outermost layer), layer 304 can be a second layer (e.g., a middle layer), and layer 306 can be a third layer (e.g., an outermost layer or an innermost layer). For example, FIGS. 6A-15H illustrate that the tube 160 can comprise three or more layers (e.g., three layers) in the arrangements shown.

As another example, for tubes comprising two layers, the tube 160 can have any combination of two layers, including, for example, (1) layer 302 and layer 304, (2) layer 304 and layer 306, (3) layer 302 and layer 306, (4) two layers 302, (5) two layers 304, (6) two layers 306, or any other combination of two layers. Any one of the layers can be the first layer, any one of the layers can be the second layer, and any one of the layers can be the third layer. Any one of the layers can be the inner layer, any one of the layers can be the middle layer, and any one of the layers can be the outer layer. For example, for tubes 160 comprising layer 302 and layer 304, layer 302 can be a first layer (e.g., an innermost layer) and layer 304 can be a second layer (e.g., an outermost layer). For example, for tubes 160 comprising layer 304 and layer 306, layer 304 can be a first layer (e.g., an innermost layer) and layer 306 can be a second layer (e.g., an outermost layer). For example, for tubes 160 comprising layer 302 and layer 306, layer 302 can be a first layer (e.g., an innermost layer) and layer 306 can be a second layer (e.g., an outermost layer). For example, FIGS. 16A-21H illustrate that the tube 160 can comprise two or more layers (e.g., two layers) in the arrangements shown.

As yet another example, for tubes comprising one layer, the tube 160 can have any layer, including, for example, (1) layer 302, (2) layer 304, or (3) layer 306. For example, FIGS. 22A-25D illustrate that the tube 160 can comprise one or more layers (e.g., one layer) in the arrangement shown.

FIGS. 6A-25D illustrate, for example, that for tubes 160 with 1, 2, or more layers (e.g., 3 or more layers), the tube 160 can have, for example, layer 302, layer 304, layer 306, or any combination thereof. For example, FIGS. 22A-25D illustrate that the tube 160 can have one layer (e.g., layer 302), FIGS. 16A-21H illustrate that the tube 160 can have two layers (e.g., layer 302 and layer 304), and FIGS. 6A-15H illustrate that the tube 160 can have three layers (e.g., layer 302, layer 304, and layer 306). The layers can be tubes. The layers can be, for example, cylindrical tubes or any other shaped tubes. The layers can be concentric with each other. For example, the layers can be concentric tubes.

The tube 160 can have a liner and/or a jacket. For example, for tubes 160 that have multiple layers, the innermost layer can be a liner and the one or multiple outer layers can form a jacket (e.g., an elastomeric jacket). For example, for tubes 160 that have two layers, the liner can comprise layer 302 and the jacket can comprise layer 304 or layer 306. As another example, for tubes 160 that have three layers, the liner can comprise layer 302 and the jacket can comprise layers 304 and 306. The liner can be thinner than the jacket or vice versa. The liner can be closer to a center of the lumen 104 than the elastomeric jacket. For example, the liner (or a coating on the liner) can form the inner surface of the tubing 160, and the jacket (or a coating on the jacket) can form the outer surface of the tubing 160. For example, FIGS. 7A-15H illustrate that the liner can comprise layer 302 and that the jacket can comprise layers 304 and 306. As another example, FIGS. 16A-21H illustrate that the liner can comprise layer 302 and that the jacket can comprise layer 304. The functions of the liner and the jacket can depend on the layers, materials, coatings, and/or reinforcements that the tube 160 has. The wall of the tube 160 can comprise the one or multiple layers. The tube 160 can have a wall (e.g., a circumferential wall), whereby the wall can comprise the one or multiple layers (e.g., layers 302, 304, and/or 306). As another example, the liner can be a coating applied to the innermost layer, and/or the jacket can be a coating applied to the outermost layer.

Materials

The tube 160 can be made of one or multiple materials (e.g., 1 material, 2 materials, 3 materials, 4 materials, 5 materials, or more than 5 materials, for example, 6-12 layers, including every 1 material increment within this range). FIGS. 6A-25D illustrate, for example, that the layers of the tube 160 (e.g., layers 302, 304, and/or 306) can comprise various combinations of polytetrafluoroethylene (PTFE), expanded polytetrafluoroethylene (ePTFE), a fluoroelastomer, a fluoroelastomer and ePTFE composite material (e.g., FLUOROSLIX), or any combination thereof. Other materials are also appreciated, including, for example, any combination of materials disclosed or contemplated in this application. As explained further below, the ePTFE can be, for example, ePTFE, axial ePTFE, radial ePTFE, or a hybrid ePTFE comprising axial ePTFE and radial ePTFE. The fluoroelastomer and ePTFE composite material is further described, for example, in U.S. patent application Ser. No. 15/891,024 filed Feb. 7, 2018 (now U.S. Publication No. 2018/0344981) and is herein incorporated by reference in its entirety for all purposes. Any layer of the tube 160 (e.g., layer 302, 304, and/or 306) can be made from any material disclosed in this application, including, for example, the fluoroelastomer and ePTFE composite material disclosed in U.S. patent application Ser. No. 15/891,024.

Generally, ePTFE is PTFE that has been stretched during sintering or the crystallization formation phase. Typically, ePTFE is made by mechanically stretching an extruded profile of PTFE in a single axial direction or in two axial directions, whereby the mechanical expansion is followed by amorphic locking—also referred to as sintering—of the axially expanded structure. For example, where the extruded PTFE profile is an extruded tube (e.g., a tube such as layer 302, layer 304, and/or layer 306), the extruded tube can be axially stretched in a single axial direction or in two axial directions, for example, from a first length L1 to a second length L2 to create an axial ePTFE tube (e.g., to create layer 302, 304, and/or 306). By fibrillating the PTFE in an axial direction during sintering, the tube 160 can have the property of reversable length change which can reduce the force required to axially expand or lengthen the tube 160. Axially stretching PTFE (e.g., in a longitudinal direction parallel to the longitudinal axis of the extruded PTFE profile, i.e., in a direction perpendicular to the radial axis of the extruded PTFE profile) results in ePTFE that can axially elongate when the ePTFE is subject to an axial tensile load and that can axially compress when the ePTFE is subject to an axial compressive load by creating microscopic fibrils which are spaced out like little tendons that can be slacked or be put in tension depending on the macroscopic forces being applied to the material. In this application, such ePTFE that was axially stretched during formation is referred to as axial ePTFE.

This application discloses a new type of ePTFE for use with the tubes (e.g., tubes 100 and 160) to provide different benefits than axial ePTFE. The new type of ePTFE can be made, for example, by mechanically stretching an extruded profile of PTFE in a radial direction (e.g., instead of or in addition to an axial direction), whereby the mechanical expansion is followed by amorphic locking—also referred to as sintering—of the radially expanded structure. For example, where the extruded PTFE profile is an extruded tube (e.g., a tube such as layer 302, layer 304, and/or layer 306), the extruded tube can be radially stretched (e.g., in 1, 2, 3, 4 or more radial directions, including all radial directions) away from the center longitudinal axis of the extruded tube, for example, from a first radius R1 to a second radius R2 (e.g., via an expandable and/or stretchable mandrel) to create a radial ePTFE tube (e.g., to create layer 302, 304, and/or 306). By fibrillating the PTFE in a radial direction during sintering, the tube 160 can have the property of reversable diameter change which can reduce the force required to expand the tube 160, which can in turn reduce the force required to advance a device through the lumen 104 of the tube 160 and which can, for example, reduce the risk of a device (e.g., a device 329) from causing one or more layers of the tube 160 from tearing or rupturing as the device advanced in the lumen 104. Radially stretching the PTFE (e.g., in a radial or transverse direction perpendicular to the longitudinal axis of the extruded PTFE profile, i.e., in a direction parallel to the radial direction of the extruded PTFE profile) can, for example, result in ePTFE that can radially expand when the ePTFE is subject to a radially outward load and that can radially compress when the ePTFE is subject to a radially compressive load by creating microscopic fibrils which are spaced out like little tendons that can be slacked or be put in tension depending on the macroscopic forces being applied to the material. In this application, such ePTFE that was radially stretched during formation is referred to as radial ePTFE.

The microscopic fibrils of an axial ePTFE profile (e.g., of a layer and/or tube made of axial ePTFE) and the microscopic fibrils of a radial ePTFE profile (e.g., of a layer and/or tube made of radial ePTFE) having the same shape and dimensions as the axial ePTFE profile have microscopic fibrils in different orientations relative to the longitudinal axis of their respective profiles which provide different benefits. For an axial ePTFE profile, the microscopic fibrils are aligned along the longitudinal axis of the axial ePTFE profile (e.g., along the longitudinal axis of a tube made of axial ePTFE). In contrast, for a radial ePTFE profile, the microscopic fibrils are aligned perpendicularly to the longitudinal axis of the radial ePTFE profile (e.g., perpendicularly to the longitudinal axis of the tube made of radial ePTFE). The tube 160 (e.g., layer 302, 304, and/or 306) can comprise, for example, ePTFE (e.g., not axial ePTFE, not radial ePTFE), axial ePTFE, radial ePTFE, a hybrid combination of axial ePTFE and radial ePTFE (e.g., ePTFE that has been stretched both axially and radially), or any combination thereof.

The tube 160 can have axial ePTFE and/or radial ePTFE depending on the expansion and/or compression characteristics desired for the tube 160. In other words, the difference between the orientation of the fibrils of axial ePTFE and the orientation of the fibrils of radial ePTFE can be used to impart different expansion and/or compression characteristics to the tube 160. For example, axial ePTFE can permit axial expansion and axial contraction and can inhibit radial expansion of the tube 160, whereas radial ePTFE can permit radial expansion and can inhibit axial expansion and axial contraction of the tube 160. Relative to axial ePTFE, radial ePTFE can reduce the radial force needed to radially expand the tube 160, which can reduce the force required to advance a device through the lumen 104 of the tube 160. The force needed to radially expand radial ePTFE can thereby be less than the force needed to radially expand axial ePTFE by the same amount. As another example, radial ePTFE can inhibit or prevent wrinkles and/or folds from forming when the tube 160 radially contracts from a radially expanded state (e.g., from an expanded state to a non-expanded state, for example, from diameter d2 to diameter d1), for example, when a device is withdrawn from the lumen 104. For example, relative to axial ePTFE, radial ePTFE can inhibit wrinkles and/or folds from forming when the tube 160 radially contracts from a radially expanded state (e.g., from diameter d2 to diameter d1). As another example, relative to axial ePTFE, radial ePTFE can decrease the size and/or number of wrinkles and/or folds that form when the tube 160 radially contracts from a radially expanded state (e.g., from diameter d2 to diameter d1). As yet another example, relative to axial ePTFE, radial ePTFE can inhibit wrinkles and/or folds from forming and/or can decrease the size and/or number of wrinkles and/or folds that form when the tube 160 radially contracts from a radially expanded state (e.g., from diameter d2 to diameter d1). As another example, axial ePTFE can behave like PTFE in the radial direction but not the axial direction (e.g., axial ePTFE can be more flexible in the axial direction than PTFE), whereas radial ePTFE can behave like PTFE in the axial direction but not in the radial direction (e.g., radial ePTFE can be more flexible in the radial direction than PTFE).

Axial ePTFE can allow axial expansion of the tube 160. For example, axial ePTFE can allow axial expansion of the tube 160 up to an axial expansion limit and then inhibit or prevent further axial expansion of the tube 160 once the axial expansion limit is reached. The axial expansion limit for axial ePTFE can be, for example, a 5% to 200% increase in the length (e.g., length 160L or any portion thereof) of the tube 160, including every 1% increment within this range (e.g., 5%, 50%, 100%, 200%) from a first length to a second length. The first length can be, for example, a non-expanded or a neutral length of the tube 160. The second length can be, for example, an expanded length of the tube 160. For example, for a tube 160 that is expandable from a first length to a second length in which the first length is 10 cm and in which the axial expansion limit of the axial ePTFE is 100%, once the second length of the tube 160 reaches 20 cm, the axial ePTFE (e.g., the fibrils of the axial ePTFE) can be fully axially stretched (e.g., can be in full tension) such that the axial ePTFE can inhibit or prevent further axial expansion of the tube 160. In other words, once the slack that is present in the microscopic fibrils when the tube 160 is in the non-expanded state (e.g., when the tube 160 has the first length) is completely removed (e.g., when the tube 160 has the second length), the fibrils that are aligned along the longitudinal axis of the tube 160 can resist further axial expansion of the tube 160 by virtue of the axial ePTFE fibrils being in a full state of tension. Once the axial expansion limit is reached, the axial ePTFE can thereby inhibit or prevent further axial expansion of the axially stretched portion of the tube 160. For example, axial ePTFE can allow axial expansion of the tube 160 as the tube 160 axially expands (e.g., from the first length to the second length) as a device (e.g., device 329) is advanced along the lumen 104 but can limit the amount by which the tube 160 can axially expand to the axial expansion limit. Axial ePTFE can inhibit or prevent axial expansion of the tube 160 beyond the axial expansion limit. Permitting but limiting such axial expansion can reduce the risk of over expanding the tube 160 in the axial direction, can reduce the risk of layer 302, layer 304, and/or layer 306 being torn or punctured by a device (e.g., device 329) as it is axially advanced in the lumen 104, or both.

Axial ePTFE can inhibit and/or prevent radial expansion of the tube 160. For example, axial ePTFE can prevent radial expansion of the tube 160. As another example, axial ePTFE can allow radial expansion of the tube 160 up to a radial expansion limit and then inhibit or prevent further radial expansion of the tube 160 once the radial expansion limit is reached. The radial expansion limit for axial ePTFE can be, for example, a 0% to 4% increase in the diameter (e.g., the inner diameter) of the tube 160, or more narrowly, a 0% to 2% increase in the diameter (e.g., the inner diameter) of the tube 160 including every 1% increment within these ranges (e.g., 0%, 1%, 2%, 4%) from a first diameter (e.g., diameter d1) to a second diameter (e.g., diameter d2). The first diameter d1 can be, for example, a non-expanded or a neutral diameter of the tube 160. The second diameter d2 can be, for example, an expanded diameter of the tube 160. For example, for a tube 160 that is expandable from a first diameter (e.g., diameter d1) to a second diameter (e.g., diameter d2) in which the first diameter (e.g., diameter d1) is 10.0 mm and in which the radial expansion limit of the axial ePTFE is 1%, once the second diameter (e.g., diameter d2) of the tube 160 reaches 10.1 mm, the axial ePTFE can be fully radially stretched such that the axial ePTFE can inhibit or prevent further radial expansion of the tube 160. Once the radial expansion limit is reached, the axial ePTFE can inhibit or prevent further radial expansion of the radially stretched portion of the tube 160. For example, axial ePTFE can allow a small amount of radial expansion of the tube 160 (e.g., up to the radial expansion limit) as the tube 160 axially expands (e.g., from a first length to a second length) as a device is advanced along the lumen 104 but can limit the amount by which the tube 160 can radially expand to the radial expansion limit. Permitting but limiting such radial expansion via axial ePTFE can reduce the risk of layer 302, layer 304, and/or layer 306 being torn or punctured by a device (e.g., device 329) as it is axially advanced in the lumen 104.

Radial ePTFE can allow radial expansion of the tube 160. For example, radial ePTFE can allow radial expansion of the tube 160 up to a radial expansion limit and then inhibit or prevent further radial expansion of the tube 160 once the radial expansion limit is reached. The radial expansion limit for radial ePTFE can be, for example, a 5% to 200% increase in the diameter (e.g., the inner diameter) of the tube 160, including every 1% increment within this range (e.g., 5%, 50%, 100%, 200%) from a first diameter (e.g., diameter d1) to a second diameter (e.g., diameter d2). The first diameter d1 can be, for example, a non-expanded or a neutral diameter of the tube 160. The second diameter d2 can be, for example, an expanded diameter of the tube 160. For example, for a tube 160 that is expandable from a first diameter (e.g., diameter d1) to a second diameter (e.g., diameter d2) in which the first diameter (e.g., diameter d1) is 2 mm and in which the radial expansion limit of the radial ePTFE is 100%, once the second diameter (e.g., diameter d2) of the tube 160 reaches 4 mm, the radial ePTFE (e.g., the fibrils of the radial ePTFE) can be fully radially stretched (e.g., can be in full tension) such that the radial ePTFE can inhibit or prevent further radial expansion of the tube 160. In other words, once the slack that is present in the microscopic fibrils when the tube 160 is in the non-expanded state (e.g., when the tube 160 has diameter d1) is completely removed (e.g., when the tube 160 has diameter d2), the fibrils that are aligned perpendicularly to the longitudinal axis of the tube 160 can resist further radial expansion of the tube 160 by virtue of the radial ePTFE fibrils being in a full state of tension. Once the radial expansion limit is reached, the radial ePTFE can thereby inhibit or prevent further radial expansion of the radially stretched portion of the tube 160. For example, radial ePTFE can allow radial expansion of the tube 160 as the tube 160 radially expands (e.g., from diameter d1 to diameter d2) as a device (e.g., device 329) is advanced along the lumen 104 but can limit the amount by which the tube 160 can radially expand to the radial expansion limit. Radial ePTFE can inhibit or prevent radial expansion of the tube 160 beyond the radial expansion limit.

Permitting but limiting such radial expansion can reduce the risk of over expanding the tube 160 in the radial direction, can reduce the risk of layer 302, layer 304, and/or layer 306 being torn or punctured by a device (e.g., device 329) as it is axially advanced in the lumen 104, or both. Limiting radial expansion can be important when the tube 160 is inserted into blood vessels, for example, to limit the outward radial force exerted against blood vessels as the tube 160 is radially expanded. For example, limiting radial expansion of the tube 160 to the radial expansion limit can help prevent the tube 160 from tearing or rupturing blood vessels as a device (e.g., device 329) is advanced along the lumen 104. The radial expansion limit can be chosen, for example, based on the one or more blood vessels that the tube 160 is going to be navigated through. For example, the radial expansion limit can be equal to or less than the maximum dilated diameter of a blood vessel that that the tube 160 is going to be placed in. The radial expansion limit can be constant along the length of the tube 160 or can vary along the length of the tube.

Radial ePTFE can inhibit and/or prevent axial expansion of the tube 160. For example, radial ePTFE can prevent axial expansion of the tube 160. As another example, radial ePTFE can allow axial expansion of the tube 160 up to an axial expansion limit and then inhibit or prevent further axial expansion of the tube 160 once the axial expansion limit is reached. The axial expansion limit for radial ePTFE can be, for example, a 0% to 4% increase in the length (e.g., length 160L or any portion thereof) of the tube 160, or more narrowly, a 0% to 2% increase in the length (e.g., length 160L or any portion thereof) of the tube 160 including every 1% increment within these ranges (e.g., 0%, 1%, 2%, 4%) from a first length to a second length. The first length can be, for example, a non-expanded or a neutral length of the tube 160. The second length can be, for example, an expanded length of the tube 160. For example, for a tube 160 that is expandable from a first length to a second length in which the first length is 10.0 cm and in which the axial expansion limit of the radial ePTFE is 1%, once the second length of the tube 160 reaches 10.1 cm, the radial ePTFE can be fully axially stretched (e.g., can be in full tension) such that the radial ePTFE can inhibit or prevent further axial expansion of the tube 160. Once the axial expansion limit is reached, the radial ePTFE can inhibit or prevent further axial expansion of the axially stretched portion of the tube 160. For example, radial ePTFE can allow a small amount of axial expansion of the tube 160 (e.g., up to the axial expansion limit) as the tube 160 radially expands (e.g., from diameter d1 to diameter d2) as a device is advanced along the lumen 104 but can limit the amount by which the tube 160 can axially expand to the axial expansion limit. Permitting but limiting such axial expansion via radial ePTFE can reduce the risk of layer 302, layer 304, and/or layer 306 being torn or punctured by a device (e.g., device 329) as it is axially advanced in the lumen 104.

Compared to a tube 160 made of axial ePTFE having the same shape and dimensions as a tube 160 made from radial ePTFE (e.g., for this comparison, the percentage of axial ePTFE in the tube 160 made of axial ePTFE is the same as the percentage of radial ePTFE in the tube made of radial ePTFE), the radial ePTFE can allow less axial expansion of the tube 160 than the axial ePTFE. For example, the axial expansion limit for axial ePTFE can be greater than the axial expansion limit for radial ePTFE. For example, the axial expansion limit for axial ePTFE can be 5% to 200% and the axial expansion limit for radial ePTFE can be 0% to 4%, or more narrowly, 0% to 2% (e.g., where 0% can indicate that the radial ePTFE is not stretchable in the axial direction) As a result, the tube 160 having the axial ePTFE can require less force (e.g., 0.10N to 5.00N less force) to axially expand than the tube 160 having the radially ePTFE.

Compared to a tube 160 made of axial ePTFE having the same shape and dimensions as a tube 160 made from radial ePTFE (e.g., for this comparison, the percentage of axial ePTFE in the tube 160 made of axial ePTFE is the same as the percentage of radial ePTFE in the tube made of radial ePTFE), the axial ePTFE can allow less radial expansion of the tube 160 than the radial ePTFE. For example, the radial expansion limit for radial ePTFE can be greater than the radial expansion limit for axial ePTFE. For example, the radial expansion limit for radial ePTFE can be 5% to 200% and the radial expansion limit for axial ePTFE can be 0% to 4%, or more narrowly, 0% to 2% (e.g., where 0% can indicate that the radial ePTFE is not stretchable in the axial direction). As a result, the tube 160 having the radial ePTFE can require less force (e.g., 0.10N to 5.00N less force) to radially expand than the tube 160 having the axial ePTFE.

These properties of axial ePTFE and/or radial ePTFE can be incorporated into the tube 160 by forming one or more of the layers of the tube 160 of axial ePTFE, by forming one or more of the layers of the tube 160 of radial ePTFE, or by having both of these materials in the tube 160, for example, in the same layer or in two different layers.

PTFE, ePTFE, fluoroelastomers, and composite materials of a fluoroelastomer and ePTFE and have different material properties that can be beneficial in various combinations in the tube 160. In this patent application, ePTFE without the "axial" or "radial" prefix can be, for example, ePTFE (e.g., not axial ePTFE, not radial ePTFE). In this patent application, ePTFE without the "axial" or "radial" prefix can be axial ePTFE and/or radial ePTFE, for example, only axial ePTFE, only radial ePTFE, or both axial ePTFE and radial ePTFE. For ePTFE having both axial ePTFE and radial ePTFE, the ePTFE can be programmed with a percentage of stretch in the axial and radial directions during sintering as described above for axial and radial ePTFE. For example, ePTFE comprising axial ePTFE and radial ePTFE can have a 1% to 100% axial programmed stretch and a 1% to 100% radial programmed stretch, including every 1% increment in each of these ranges (e.g., a 50% axial and a 50% radial programmed stretch, a 25% axial and a 75% radial programmed stretch, a 75% axial and a 25% radial programmed stretch, a 75% axial and a 100% radial programmed stretch, a 25% axial and a 100% radial programmed stretch).

PTFE can be a hard (e.g., harder than ePTFE), low friction, and high tensile strength material having a low flexural modulus in the axial and radial direction of the tube 160. The PTFE can be harder than the ePTFE and can be more puncture and tear resistant than ePTFE. PTFE can have a hardness, for example, of 50-67 Shore D, and ePTFE can have a hardness for example, 27 Shore D. The PTFE in the tube 160 can thereby inhibit or prevent expansion of the tube 160 in the axial and radial directions.

The fluoroelastomer can have a high flexural modulus so that it can be stretchy and can have a higher coefficient of friction than PTFE and ePTFE. The fluoroelastomer can be fused to lower friction materials such as PTFE and ePTFE.

The ePTFE can be a soft (e.g., softer than PTFE), low friction, and high tensile strength material having a high flexural modulus in the axial direction (e.g., axial ePTFE) and/or in the radial direction (e.g., radial ePTFE) of the tube 160. For example, axial ePTFE can have a higher flexural modulus in the axial direction than radial ePTFE, and radial ePTFE can have a higher flexural modulus in the radial direction than the axial ePTFE. The ePTFE can be softer than the PTFE. ePTFE can take less force to expand than PTFE. As another example, PTFE may not be axially or radially expandable. Axial ePTFE in the tube 160 can facilitate expansion of the tube 160 in the axial direction but inhibit or prevent expansion of the tube 160 in the radial direction. For example, axial ePTFE can function as ePTFE in the axial direction and as PTFE in the radial direction. In contrast, radial ePTFE in the tube 160 can facilitate expansion of the tube 160 in the radial direction but inhibit or prevent expansion of the tube 160 in the axial direction. For example, radial ePTFE can function as ePTFE in the radial direction and as PTFE in the axial direction.

The functions of different layers (e.g., the liner and the jacket) can, for example, depend on the materials of the layers 302, 304, and 306. As the figures in this patent application show, layers having various materials can be combined with each other to form the tube 160 to form tubes 160 having myriad complementary properties.

Coatings

The tube 160 can have an inner coating, an outer coating, an inner coating and an outer coating, or neither an inner coating nor an outer coating. The inner coating can be, for example, applied to the inner surface of the inner most layer. For example, the inner coating can be applied to the inner surface of layer 302, layer 304, or layer 306. The inner coating can be, for example, a hydrophilic coating such as Biocoat's, Hydak, T-70 hydrophilic coating formula. The outer coating can be, for example, applied to the outer surface of the outermost layer. For example, the outer coating can be applied to the outer surface of layer 302, of layer 304, or layer 306. The outer coating can be, for example, a hydrophilic coating such as Biocoat's, Hydak, T-70 hydrophilic coating formula. The outer coating can, for example, reduce the friction between the inner wall of blood vessels (e.g., arteries, veins) during insertion and can inhibit or prevent the tube 160 from sticking to blood vessels (e.g., arteries, veins) during removal. The inner and/or outer surface of the tube 160 may be treated with plasma to enhance the surface energy for bonding to the hydrophilic coating.

Reinforcements

The tube 160 can have zero, one, or multiple reinforcements (e.g., 0 reinforcements, 1 reinforcement, 2 reinforcements, 3 reinforcements, 4 reinforcements, 5 reinforcements, or more than 5 reinforcements, for example, 6-10 reinforcements, including every 1 reinforcement increment within this range). As the figures show, the tube 160 can have, for example, a reinforcement 308, a reinforcement 310, a reinforcement 312, or any combination thereof.

The reinforcement 308 can have a zigzag shape, a wavy shape, or an otherwise oscillating or undulating shape. The reinforcement 308 can be, for example, a wire (e.g., metal such as Nitinol, stainless steel, Titanium, or Elgiloy)), a monofilament (e.g., PEEK, PAEK, PEKK, PET, nylon, PTFE, TFE, polysulfone, Ultem), a multifilament (e.g., Spectra, Dyneema, PET, Kevlar, carbon fiber, fiberglass), or any combination thereof. The reinforcement 308 can, for example, zigzag, undulate, or oscillate circumferentially around the tube 160. The reinforcement 308 can have, for example, a zigzag shape, an undulating shape, or an oscillating shape. The reinforcement 308 can be, for example, round (e.g., a round wire). The reinforcement 308 can be, for example, flat (e.g., a flat wire). A flat reinforcement 308 can provide a lower tubing profile whereas a round reinforcement 308 can provide higher tensile strength. The reinforcement 308 can be embedded within a layer of the tube 160 (e.g., in layer 302, in layer 304, and/or in layer 306), can be between two layers of the tube 160 (e.g., between layers 302 and 304, and/or between layers 304 and 306), can extend along an innermost surface of the tube 160, can extend along an outermost surface of the tube 160, or any combination thereof. For example, the reinforcement 308 can be a nested (e.g., embedded) in the wall of the tube 160 (e.g., in one or more layers of the tube 160). The reinforcement 308 can be wound in a zig-zag manner, in a wave-like manner (e.g., a sine wave, a square wave, a triangle wave, or a sawtooth wave), or in an undulating manner within one or multiple layers of the tube 160. As another example, the reinforcement 308 can be on a layer of the tube 160. The reinforcement 308 can extend around the lumen 104 of the tube 160. For example, the reinforcement 308 can extend helically around the lumen 104 of the tube 160. The reinforcement 308 can, for example, extend helically around the lumen 104 one or multiple turns, for example, 1-1000 turns, including every 1 turn increment within this range (e.g., 1 turn, 10 turns, 50 turns, 100 turns, 200 turns).

The reinforcement 308 can function as a spring or the reinforcement 308 may not have spring-like characteristics. For example, the reinforcement 308 can be a spring. For example, the reinforcement 308 can comprise the spring material 164. As another example, the reinforcement 308 may not be a spring.

The reinforcement 308 can be, for example, a metal, an alloy, or a shape memory alloy.

The reinforcement 308 can have one or multiple functions. For example, the reinforcement 308 can allow radial expansion of the tube 160, can inhibit kinking of the tube 160, can inhibit crushing of the tube 160, can transmit torque along the tube 160, can reduce the force required to expand the tube 160, can reduce the force required to advance a device (e.g., device 329) through the lumen 104 of the tube 160, or any combination thereof. The reinforcement 308 can be, for example, a radial expansion permitter. The reinforcement 308 can be, for example, a kink inhibitor. The reinforcement 308 can be, for example, a crush inhibitor. The reinforcement 308 can be, for example, a torque transmitter. The reinforcement 308 (e.g., zigzag wire, oscillating wire, undulating wire) can, for example, combine the properties of both a coil (which can have poor torquability but good kink and crush resistance) and a braid (which can have good torquability but poor kink resistance). For example, the helical turns of the reinforcement 308 about the lumen 104 can provide the reinforcement 308 with properties of a coil, and the zigzag shape of the reinforcement 308 as it extends helically about the lumen 104 can provide the reinforcement 308 with properties of a braid. The reinforcement 308 can, for example, provide the tube 160 with the ability to transmit torque and can allow the diameter of the tube 160 to increase (e.g., as a device is advanced in the lumen 104). The reinforcement 310 can be, for example, a coil having a zigzag shape. As another example, the reinforcement 308 can be a coil without a zigzag shape.

The reinforcement 308 can reduce the force required to expand the tube 160 and can reduce the force required to advance a device through the lumen 104, for example, when the reinforcement 308 is or comprises a spring or a shape memory alloy.

For example, when the reinforcement 308 comprises a spring, the reinforcement 308 can be attached to or integrated with the tube 160 (e.g., can be formed in or embedded in a layer of the tube 160) when the reinforcement 308 is in a contracted configuration such that the reinforcement 308 can be biased to expand when the tube 160 is in a non-expanded state. When the tube 160 is in the non-expanded state, the tube 160 can constrain the reinforcement 308 such that the reinforcement 308 can be inhibited from expanding toward its neutral configuration. Because the tube 160 can constrain the reinforcement 308 in a contracted configuration, the reinforcement 308 can reduce the force required to expand the tube 160 when a device is advanced through the lumen 104. In other words, as the tube 160 expands due to passage of a device (e.g., device 329) in the lumen 104, the reinforcement 308 attempts to expand to revert to its neutral configuration thereby lessening the force required to expand the tube 160 and reducing the force required to advance the device through the lumen 104. As the device is being withdrawn from the lumen 104, the tube 160 can again constrain the reinforcement 308 such that the reinforcement 308 can revert back to its contracted configuration. The reversion back to the contracted configuration can help prevent the tube 160 from sticking to vessel walls and can thereby assist with removing the tube 160 from the vessel.

As another example, when the reinforcement 308 comprises a shape memory alloy, the reinforcement 308 can be heated or energy activated to expand (e.g., to radially expand). A device (e.g., device 329) in the lumen 104 can transfer heat to the reinforcement 308, for example, through the wall of the tube 160. When thermal energy is transferred to the reinforcement 308, for example, from the device as it is being advanced in the lumen 104, the reinforcement 308 can increase in diameter which can increase the diameter of the tube 160 or the reinforcement 308 can be constrained from expanding by the tube 160 but nevertheless be biased to expand. Once heat is transferred to the reinforcement 308 or once the reinforcement 308 has been otherwise activated (e.g., with an electric current), the reinforcement 308 can expand or can be biased to expand, which can in turn radially expand the tube 160 or lessen the force required to radially expand the tube 160, which can in turn reduce the force required to advance the device through the lumen 104. Upon removal of the heat or energy activation source, the tube 160 can again constrain the reinforcement 308 and revert to a less expanded state (e.g., to a non-expanded state) as the device is being withdrawn from the lumen 104.

The reinforcement 310 can be, for example, a braid or a spiral wrap. As the figures show, the reinforcement 310 (e.g., the braid or the spiral wrap) can have, for example, clockwise elements **310*a* and counterclockwise elements 310*b*. For a braid, the clockwise and counterclockwise elements 310*a*, 310*b* can be interlaced with each other. For example, for a braid, the clockwise elements 310*a* can go over and under the counterclockwise elements 310*b*. For a spiral wrap, instead of the clockwise elements 310*a* being interlaced with the counterclockwise elements 310*b* (e.g., over and under as in a braid), all or substantially all (e.g., 80%-99%) of the clockwise elements 310*a* can go over all or substantially all (e.g., 80%-99%) of the counterclockwise elements 310*b*, or all or substantially all (e.g., 80%-99%) of the clockwise elements 310*a* can go under all or substantially all (e.g., 80%-99%) of the counterclockwise elements 310*b*. The reinforcement 310 can be embedded in a layer of the tube 160 (e.g., in layer 302, in layer 304, or in layer 306), can be between two layers of the tube 160 (e.g., between layers 302 and 304, or between layers 304 and 306), can extend along an innermost surface of the tube 160, can extend along an outermost surface of the tube 160, or any combination thereof. For example, the reinforcement 310 can be a nested (e.g., embedded) braid or spiral wrap in a layer of the tube 160. As another example, the reinforcement 310 can be on a layer of the tube 160. The reinforcement 310 can extend around the lumen 104 of the tube 160. The lumen of the reinforcement can be concentric with the lumen 104**.

The reinforcement 310 can function as a spring or the reinforcement 310 may not have spring-like characteristics.

For example, the reinforcement 310 can be a spring. As another example, the reinforcement 310 may not be a spring.

The reinforcement 310 can be, for example, a metal, an alloy, a shape memory alloy, and/or a polymer, whereby the clockwise and counterclockwise elements 310*a*, 310*b* can be strands or filaments of a metal, an alloy, a shape memory alloy, and/or a polymer. The clockwise elements 310*a* can be made of a different material than the counterclockwise elements 310*b*. As another example, the clockwise and counterclockwise elements 310*a*, 310*b* can be made of the same material. The clockwise and counterclockwise elements 310*a*, 310*b* can be, for example, round or flat. Flat elements can provide a lower tubing profile whereas round elements can provide higher tensile strength.

The reinforcement 310 can axially expand, thereby allowing axial expansion of the tube 160, and/or can radially expand, thereby allowing radial expansion of the tube 160. Whether the reinforcement 310 is axially expandable and/or radially expandable can depend on, for example, the angle 311 between each of the elements 310*a* and 310*b* of the reinforcement 310 and the longitudinal axis 310*x* of the reinforcement 310 (e.g., whether the angle 311 is a low angle or high angle), the dimensions of the elements, the number of elements, and the number of elements in proportion to the diameter of the tube 160. For example, whether the reinforcement 310 is axially expandable and/or radially expandable can depend on the angle 311 between the clockwise and counterclockwise elements 310*a*, 310*b* of the reinforcement 310 and the longitudinal axis 310*x* of the reinforcement 310 (e.g., the angle 311 between the clockwise elements 310*a* and the longitudinal axis 310*x* of the reinforcement 310, and the angle 311 between the counterclockwise elements 310*b* and the longitudinal axis 310*x* of the reinforcement 310). The angle 311 between the clockwise elements 310*a* and the longitudinal axis 310*x* of the actuator 120 and the angle 311 between the counterclockwise elements 310*b* and the longitudinal axis 310*x* of the actuator 120 can be the same. The longitudinal axis 310*x* can be, for example, a center longitudinal axis of the reinforcement 310 (which can, for example, coincide with the longitudinal axis Ax of the tube 160) or an axis parallel to the center longitudinal axis of the reinforcement 310 that intersects the elements 310*a* and/or 310*b*. For example, a reinforcement 310 with a high angle 311 between the clockwise and counterclockwise elements 310*a*, 310*b* and the longitudinal axis 310*x* of the reinforcement 310 can be configured to axially expand more than it radially expands, whereas a reinforcement 310 with a low angle 311 between the clockwise and counterclockwise elements 310*a*, 310*b* and the longitudinal axis 310*x* of the reinforcement 310 can be configured to radially expand more than it axially expands. A high angle 311 between the clockwise and counterclockwise elements 310*a*, 310*b* and the longitudinal axis 310*x* of the reinforcement 310 can be, for example, 46 degrees to 90 degrees, or more narrowly, 46 degrees to 85 degrees, including every 1 degree increment within these ranges (e.g., 46 degrees, 50 degrees, 60 degrees, 85 degrees, 90 degrees). A low angle 311 between the clockwise and counterclockwise elements 310*a*, 310*b* and the longitudinal axis 310*x* of the reinforcement 310 can be, for example, 0 degrees to 45 degrees, or more narrowly, 5 degrees to 45 degrees, including every 1 degree increment within these ranges (e.g., 0 degrees, 5 degrees, 15 degrees, 45 degrees). The angle 311 between the clockwise and counterclockwise elements 310*a*, 310*b* and the longitudinal axis 310*x* of the reinforcement 310 can be measured for example, between the clockwise and counterclockwise elements 310*a*, 310*b* and the center longitudinal axis Ax of the tube 160 or to a longitudinal axis parallel to the center longitudinal axis Ax of the tube 160. The angle between the clockwise and counterclockwise elements 310*a*, 310*b* referred to here can be the angle between the elements when the tube 160 is in a neutral state or a non-expanded state and/or when the tube 160 is in an expanded state. For example, FIGS. 10A-18H illustrate that the clockwise and counterclockwise elements 310*a*, 310*b* can cross each other at an angle 316 when the tube 160 is in the non-expanded state. Half of the angle 316 can be the angle 311 between the clockwise and counterclockwise elements 310*a*, 310*b* and the longitudinal axis 310*x* of the reinforcement 310. For example, the longitudinal axis 310*x* of the reinforcement 310 can be an angle bisector (e.g., the longitudinal axis 310*x*) that divides the angle 316 into two angles with equal measures, with each equal measure being the angle 311 between the clockwise and counterclockwise elements 310*a*, 310*b* and the longitudinal axis 310*x* of the reinforcement 310. As another example, FIGS. 10A-18H illustrate that the clockwise and counterclockwise elements 310*a*, 310*b* can cross each other at an angle 318 when the tube 160 is in an expanded state. Half of the angle 318 can be the angle 311 between the clockwise and counterclockwise elements 310*a*, 310*b* and the longitudinal axis 310*x* of the reinforcement 310. For example, the longitudinal axis 310*x* of the reinforcement 310 can be an angle bisector (e.g., the longitudinal axis 310*x*) that divides the angle 318 into two angles with equal measures, with each equal measure being the angle 311 between the clockwise and counterclockwise elements 310*a*, 310*b* and the longitudinal axis 310*x* of the reinforcement 310. The angle 318 can be the same as or different than the angle 316. The expansion properties reinforcement 310 when the tube 160 is in a non-expanded state can depend on whether half of the angle 316 is a low angle or a high angle. The expansion properties reinforcement 310 when the tube 160 is in an expanded state can depend on whether half of the angle 318 is a low angle or a high angle.

The upper end of the high angle range for the angle 311 can be the maximum angle between the elements of the reinforcement 310 and the longitudinal axis 310*x* of the reinforcement 310 that the elements can have. The maximum high angle 311 between the clockwise and counterclockwise elements 310*a*, 310*b* can be, for example, 75 degrees to 90 degrees, or more narrowly, 75 degrees to 85 degrees, including every 1 degree increment within these ranges (e.g., 75 degrees, 80 degrees, 85 degrees, 90 degrees). The maximum high angle 311 achievable can depend on, for example, the dimensions of the elements, the number of elements, and the number of elements in proportion to the diameter of the tube 160. The greater the dimensions of the elements, the greater the number of elements, and the more elements there are in proportion to the diameter of the tube 160, the lower the maximum angle 311 may be (e.g., closer to or equal to 75 degrees). When the reinforcement 310 has a maximum high angle 311 between the elements (e.g., 75 degrees to 85 degrees), axial expansion of the reinforcement 310 is allowed but radial expansion is prevented. This is because when the reinforcement 310 has a maximum high angle 311 between the elements, the diameter of the reinforcement 310 is at a maximum and the length is at a minimum. In such a case, the reinforcement 310 is axially expandable but not radially expandable.

The lower end of the low angle range for the angle 311 can be the minimum angle between the elements of the reinforcement 310 and the longitudinal axis 310*x* of the reinforcement 310 that the elements can have. The minimum low angle 311 between the clockwise and counterclockwise elements 310*a*, 310*b* can be, for example, 0 degrees to 15 degrees, or more narrowly, 5 degrees to 15 degrees, including every 1 degree increment within these ranges (e.g., 0 degrees, 5 degrees, 10 degrees, 15 degrees). The minimum low angle 311 achievable can depend on, for example, the dimensions of the elements, the number of elements, and the number of elements in proportion to the diameter of the tube 160. The greater the dimensions of the elements, the greater the number of elements, and the more elements there are in proportion to the diameter of the tube 160, the higher the maximum angle 311 may be (e.g., closer to or equal to 15 degrees). When the reinforcement 310 has a minimum low angle 311 between the elements (e.g., 5 degrees to 15 degrees), radial expansion of the reinforcement 310 is allowed but axial expansion is prevented. This is because when the reinforcement 310 has a minimum low angle 311 between the elements, the diameter of the reinforcement 310 is at a minimum and the length is at a maximum. In such a case, the reinforcement 310 is radially expandable but not axially expandable.

For tubes 160 in which axial expansion of the tube 160 is desired, the tube 160 can have a reinforcement 310 with a high angle 311 (e.g., 46 degrees to 85 degrees) between the elements of the reinforcement 310 and the longitudinal axis 310*x* of the reinforcement 310, as measured, for example, when the tube 160 is in a neutral state or a contracted state. For tubes 160 in which radial expansion is undesirable (e.g., in which no radial expansion is desired), the tube 160 can have a reinforcement 310 with a maximum high angle 311 (e.g., 75 degrees to 85 degrees) between the elements of the reinforcement 310 and the longitudinal axis 310*x* of the reinforcement 310, as measured, for example, when the tube 160 is in a neutral state or a contracted state.

For tubes 160 in which radial expansion of the tube 160 is desired, the tube 160 can have a reinforcement 310 with a low angle 311 (e.g., 5 degrees to 45 degrees) between the elements of the reinforcement 310 and the longitudinal axis 310*x* of the reinforcement 310, as measured, for example, when the tube 160 is in a neutral state or a contracted state. For tubes 160 in which axial expansion is undesirable (e.g., in which no axial expansion is desired), the tube 160 can have a reinforcement 310 with a minimum low angle 311 (e.g., 5 degrees to 15 degrees) between the elements of the reinforcement 310 and the longitudinal axis 310*x* of the reinforcement 310, as measured, for example, when the tube 160 is in a neutral state or a contracted state.

The reinforcement 310 can thereby allow radial expansion of the tube 160 and prevent axial expansion of the tube 160 (e.g., when the angle 311 between the elements of the reinforcement 310 and the longitudinal axis 310*x* of the reinforcement 310 is a minimum low angle), allow axial expansion of the tube 160 and prevent radial expansion of the tube 160 (e.g., when the angle 311 between the elements of the reinforcement 310 and the longitudinal axis 310*x* of the reinforcement 310 is a maximum high angle), and/or allow radial expansion and axial expansion of the tube 160 (e.g., when the angle 311 between the elements of the reinforcement 310 and the longitudinal axis 310*x* of the reinforcement 310 is between the minimum low angle and the maximum high angle). The angle 311 between the elements of the reinforcement 310 and the longitudinal axis 310*x* of the reinforcement 310 for the reinforcement 310 in any of the figures shown herein can be a low angle (e.g., a minimum low angle). The angle 311 between the elements of the reinforcement 310 and the longitudinal axis 310*x* of the reinforcement 310 for the reinforcement 310 in any of the figures shown herein can be a high angle (e.g., a maximum high angle). The angle 311 between the elements of the reinforcement 310 and the longitudinal axis 310*x* of the reinforcement 310 for the reinforcement 310 in any of the figures shown herein can be between a minimum low angle and a maximum high angle. Regardless of the angle between the elements of the reinforcement 310, the reinforcement 310 can transmit torque along the tube 160. The reinforcement 310 can be, for example, a torque transmitter. The reinforcement 310 can, for example, provide the tube 160 with the ability to transmit torque along a length of the tube 160. The angle 311 between the clockwise and counterclockwise elements 310*a*, 310*b* of the reinforcement 310 (e.g., of the braid or of the spiral wrap) and the number of clockwise and counterclockwise elements 310*a*, 310*b* can be optimized to control the expansion (axial and/or radial), torque, and stretch resistance of the tube 160 desired for the particular application.

For tubes 160 that have a reinforcement 310, the reinforcement 310 can allow radial expansion of the tube 160 up to a radial expansion limit. For example, the maximum high angle 311 that the reinforcement 310 is capable of can be used to limit the radial expansion of the tube 160. The radial expansion limit for the reinforcement 310 can be the same or different as the radial expansion limit for the radial ePTFE. For example, the radial expansion limit of the reinforcement 310 can be a 5% to 200% increase in the diameter (e.g., the inner diameter) of the tube 160, including every 1% increment within this range (e.g., 5%, 50%, 100%, 200%) from a first diameter (e.g., diameter d1) to a second diameter (e.g., diameter d2). The first diameter d1 can be, for example, a non-expanded or a neutral diameter of the tube 160. When the tube 160 has the first diameter, the angle 311 between the elements of the reinforcement 310 and the longitudinal axis 310*x* of the reinforcement 310 can be less than the maximum high angle. The second diameter d2 can be, for example, an expanded diameter of the tube 160. When the tube 160 has the second diameter, the angle 311 between the elements of the reinforcement 310 and the longitudinal axis 310*x* of the reinforcement 310 can be the maximum high angle. For example, for a tube 160 that is expandable from a first diameter (e.g., diameter d1) to a second diameter (e.g., diameter d2) in which the first diameter (e.g., diameter d1) is 2 mm and in which the radial expansion limit of the reinforcement 310 is 100%, once the second diameter (e.g., diameter d2) of the tube 160 reaches 4 mm, the angle 311 between the elements of the reinforcement 310 and the longitudinal axis 310*x* of the reinforcement 310 can be a maximum high angle such that the reinforcement 310 can inhibit or prevent further radial expansion of the tube 160. Once the radial expansion limit of the reinforcement 310 is reached (e.g., once the angle 311 between the elements of the reinforcement 310 and the longitudinal axis 310*x* of the reinforcement 310 reaches the maximum high angle), the reinforcement 310 can inhibit or prevent further radial expansion of the radially stretched portion of the tube 160. For example, the reinforcement 310 can allow radial expansion of the tube 160 as the tube 160 radially expands (e.g., from diameter d1 to diameter d2) as a device (e.g., device 329) is advanced along the lumen 104 but can limit the amount by which the tube 160 can radially expand to the radial expansion limit of the reinforcement 310. The reinforcement 310 can thereby inhibit or prevent radial expansion beyond the radial expansion limit of the reinforcement 310. The reinforcement 310 can permit radial expansion to reduce the risk of layer 302, layer 304, and/or layer 306 being torn or punctured by the device as the device is axially advanced in the lumen 104. For such variations, radial ePTFE can mimic the properties of the reinforcement 310 such that radial ePTFE in one or multiple layers of the tube 160 can eliminate the need or desire for the reinforcement 310, for example, given that the radial expansion limits of the radial ePTFE and the reinforcement 310 can be the same or approximately the same. As another example, the tube 160 can have radial ePTFE and the reinforcement 310, in which case the radial ePTFE and the reinforcement 310 can work together to inhibit or prevent axial expansion of the tube 160 (e.g., as a device is advanced in the lumen 104).

For tubes 160 that have a reinforcement 310, the reinforcement 310 can allow axial expansion of the tube 160 up to an axial expansion limit. For example, the minimum low angle 311 that the reinforcement 310 is capable of can be used to limit the axial expansion of the tube 160. The axial expansion limit for the reinforcement 310 can be the same or different as the axial expansion limit for the axial ePTFE. For example, the axial expansion limit of the reinforcement 310 can be a 5% to 200% increase in the length (e.g., length 160L or any portion thereof) of the tube 160, including every 1% increment within this range (e.g., 5%, 50%, 100%, 200%) from a first length to a second length. The first length can be, for example, a non-expanded or a neutral length of the tube 160. When the tube 160 has the first length, the angle 311 between the elements of the reinforcement 310 and the longitudinal axis 310*x* of the reinforcement 310 can be greater than the minimum low angle. The second length can be, for example, an expanded length of the tube 160. When the tube 160 has the second length, the angle between the elements of the reinforcement 310 and the longitudinal axis 310*x* of the reinforcement 310 can be the minimum low angle. For example, for a tube 160 that is expandable from a first length to a second length in which the first length is 10 cm and in which the axial expansion limit of the reinforcement 310 is 100%, once the second length of the tube 160 reaches 20 cm, the angle 311 between the elements of the reinforcement 310 and the longitudinal axis 310*x* of the reinforcement 310 can be a minimum low angle such that the reinforcement 310 can inhibit or prevent further axial expansion of the tube 160. Once the axial expansion limit of the reinforcement 310 is reached (e.g., once the angle 311 between the elements of the reinforcement 310 and the longitudinal axis 310*x* of the reinforcement 310 reaches the minimum low angle), the reinforcement 310 can inhibit or prevent further axial expansion of the axially stretched portion of the tube 160. For example, the reinforcement 310 can allow axial expansion of the tube 160 as the tube 160 axially expands (e.g., from the first length to the second length) as a device (e.g., device 329) is advanced along the lumen 104 but can limit the amount by which the tube 160 can axially expand to the axial expansion limit of the reinforcement 310. The reinforcement 310 can thereby inhibit or prevent axial expansion beyond the reinforcement axial expansion limit. The reinforcement 310 can permit axial expansion to reduce the risk of layer 302, layer 304, and/or layer 306 being torn or punctured by the device as the device is axially advanced in the lumen 104. For such variations, axial ePTFE can mimic the properties of the reinforcement 310 such that axial ePTFE in one or multiple layers of the tube 160 can eliminate the need or desire for the reinforcement 310, for example, given that the axial expansion limits of the radial ePTFE and the reinforcement 310 can be the same or approximately the same. As another example, the tube 160 can have axial ePTFE and the reinforcement 310, in which case the axial ePTFE and the reinforcement 310 can work together to inhibit or prevent radial expansion of the tube 160 (e.g., as a device is advanced in the lumen 104).

The reinforcement 308 and/or the reinforcement 310 can be attached to or integrated with the tube 160. For example, the reinforcement 308 can be embedded within a layer of the tube 160 via an extrusion or molding process, the reinforcement 310 can be embedded within a layer of the tube 160 via an extrusion or molding process, or both. For tubes 160 that have both the reinforcement 308 and the reinforcement 310, the reinforcement 308 can be embedded in the same layer as or a different layer than the reinforcement 310. As another example, the reinforcement 308 can be positioned within a channel that extends through a layer of the tube 160, the reinforcement 310 can be positioned within a channel that extends through a layer of the tube 160, or both. For tubes 160 that have both the reinforcement 308 and the reinforcement 310, the reinforcement 308 can be in the same channel as or a different channel than the reinforcement 310. As another example, the reinforcement 308 and/or the reinforcement 310 can be sandwiched between two adjacent layers of the tube 160. The reinforcement 308 can contact the reinforcement 310. As another example, the reinforcement 308 may not contact the reinforcement 310.

The reinforcement 312 can be one or multiple strips of material (also referred to as strips) in one or multiple layers of the tube 160. The strips of material can be harder than the adjacent material in the same layer and/or harder than the material in adjacent layers. The strips of material can be, for example, longitudinal strips or helical strips. As another example, the reinforcement 312 can comprise one or more longitudinal strips (also referred to as axial strips) and one or more curved strips. Longitudinal strips can be straight, whereas curved strips can be curved, e.g., helical. Layer 302, layer 304, and/or layer 306 can have a reinforcement 312. For example, an inner most layer (e.g., layer 302), a middle layer (e.g., the layer 304), and/or an outermost layer (e.g., layer 302, layer 304, or layer 306) can have a reinforcement 312. The strips of material can be for example, the secondary material 166 (also referred to as the strip material 166). The reinforcement 312 can comprise, for example, a low flexural modulus material, such as PolyBlend 1100 45A material, polyurethane, SEBS, and/or Pebax™.

The reinforcement 312 can allow the tube 160 to radially expand but inhibit or prevent the tube 160 from axially expanding as a device is advanced in the lumen 104 of the tube 160.

The functions of different layers (e.g., the liner and the jacket) can, for example, depend on the material the tube 160 comprises and the reinforcements that the tube 160 has.

The one or more reinforcements and the one or more layers can be fused together. A hydrophilic coating can be applied to the inner surface and/or outer surface of the tube 160. As another example, a hydrophilic coating is not applied to the inner surface and/or outer surface of the tube 160.

Actuator

Any of the tubes disclosed herein can have one or multiple actuators 120. Tubes that have an actuator 120 are labeled as tubes 100 in the figures.

The actuator 120 can have any arrangement of features shown and/or described with respect to any combination of FIGS. 1A-4D and/or described elsewhere in the application. This can include, for example, the features shown in and/or described with reference to FIGS. 1A-1D, FIGS. 2A-2D, FIGS. 3A-3G, FIGS. 4A and 4B, FIGS. 4A-4D, and/or FIGS. 26A-62. The actuators 120 are also referred to as various other terms followed by the reference numeral 120, including, for example, element 120 and structural element 120.

The actuator 120 can be a tube, for example, as shown in FIGS. 1A-3G and FIGS. 26A-45F, having a wall (also referred to as the actuator wall) and a lumen 322 (also referred to as the actuator lumen 322). The actuator 120 can be, for example, a cylindrical tube. The actuator wall can circumferentially surround the actuator lumen 322. The actuator wall can enclose the actuator lumen 322. The actuator lumen 322 can extend through the center of the actuator 120. As another example, the actuator 120 may not be a tube and can instead be, for example, a shape memory alloy that is heat or energy activated to expand from its natural length 126 to its expanded length 130. In such cases, the actuator 120 may or may not have a lumen (e.g., the lumen 322).

The actuator 120 can be made of one or multiple materials (e.g., 1 material, 2 materials, 3 materials, 4 materials, 5 materials, or more than 5 materials, for example, 6-10 materials, including every 1 material increment within this range). The actuator 120 can, for example, comprise PTFE, ePTFE, a fluoroelastomer, a fluoroelastomer, a fluoroelastomer and ePTFE composite material (e.g., FLUOROSLIX), or any combination thereof. Other materials are also appreciated, including, for example, any combination of materials disclosed or contemplated in this patent application. The fluoroelastomer and ePTFE composite material is further described in U.S. patent application Ser. No. 15/891,024 filed Feb. 7, 2018 (now U.S. Publication No. 2018/0344981) and is herein incorporated by reference in its entirety for all purposes. For example, the actuator 120 can be made from a fluoroelastomer and ePTFE composite material. The ePTFE can be axial ePTFE and/or radial ePTFE. FIGS. 1A-2D and 26A-45F illustrate, for example, that the actuator 120 can comprise PTFE, ePTFE, or a fluoroelastomer. For example, the actuator 120 can be an extruded tube of PTFE, ePTFE, a fluoroelastomer, or a composite material. FIGS. 3A-3G illustrate, for example, that the actuator 120 can comprise two materials, for example, a first polymer and a second polymer.

The actuator 120 can have one or multiple layers, for example, like the tube 160. For example, the actuator 120 can have 1 layer, 2 layers, 3 layers, or more than 3 layers. For example, FIGS. 26*a*-45F and 51A-62 illustrate that the actuator 120 can have one layer.

The actuator 120 can have a reinforcement 132. The reinforcement 132 can be in (e.g., embedded in) the actuator wall or can extend along an innermost surface or outermost surface of the actuator 120. As another example, the actuator 120 may not have the reinforcement 132.

The reinforcement 132 can be, for example, a coil, an oscillating wire (e.g., a zigzag wire) wrapped helically around the lumen 322 in the wall of the actuator 120, a braid, or a spiral wrap. FIGS. 29A-37D, 41A-41D, and 45A-45F illustrate, for example, that the reinforcement 132 can be a braid or a spiral wrap that can have clockwise elements 132*a* and counterclockwise elements 132*b*. For a braid, the clockwise and counterclockwise elements 132*a*, 132*b* can be interlaced with each other such that the clockwise elements 132*a* can go over and under the counterclockwise elements 132*b*. For a spiral wrap, instead of the clockwise elements 132*a* being interlaced with the counterclockwise elements 132*b* (e.g., over and under as in a braid), all or substantially all (e.g., 80%-99%) of the clockwise elements 132*a* can go over or under all or substantially all (e.g., 80%-99%) of the counterclockwise elements 132*b*, or vice versa. As additional examples, the reinforcement 132 can be a reinforcement 308 positioned in the wall of the actuator 132 that extends helically around the lumen 322 one or multiple turns, can be a reinforcement 310 positioned in the wall of the actuator 120 that extends circumferentially around the lumen 322 one or multiple turns, can be a reinforcement 312 in the wall of the actuator 120, or any combination thereof.

The reinforcement 132 can be in (e.g., embedded in) the actuator wall. The actuator 120 (e.g., the actuator wall and the actuator lumen 322) can be in (e.g., embedded in) a layer of the tube 100 (e.g., in layer 302, in layer 304, or in layer 306), can be between two layers of the tube 100 (e.g., between layers 302 and 304, or between layers 304 and 306), can extend along an innermost surface of the tube 100, can extend along an outermost surface of the tube 100, or any combination thereof. For example, the reinforcement 132 can be a nested braid or a spiral wrap in the wall of the actuator 120, and the actuator 120 can be a nested tube wound helically around the lumen 104 of the tube 100, for example, embedded in layer 302, layer 304, or layer 306. For example, the actuator 120 can extend helically around the lumen 104 of the tube 100.

The reinforcement 132 can function as a spring or the reinforcement 132 may not have spring-like characteristics. For example, the reinforcement 132 can be a spring. As another example, the reinforcement 132 may not be a spring.

The reinforcement 132 can be, for example, a metal, an alloy, a shape memory alloy, and/or a polymer, whereby the clockwise and counterclockwise elements 132*a*, 132*b* can be strands or filaments of a metal, an alloy, a shape memory alloy, and/or a polymer. The clockwise elements 132*a* can be made of a different material than the counterclockwise elements 132*b*. As another example, the clockwise and counterclockwise elements 132*a*, 132*b* can be made of the same material. The clockwise and counterclockwise elements 132*a*, 132*b* can be, for example, round or flat. Flat elements can provide a lower tubing profile whereas round elements can provide higher tensile strength.

For variations in which the reinforcement 132 comprises a braid or a spiral wrap, the reinforcement 132 can axially expand, thereby allowing axial expansion of the actuator 120, and/or can radially expand, thereby allowing radial expansion of the actuator 120. Whether the reinforcement 132 is axially expandable and/or radially expandable can depend on, for example, the angle 133 between each of the elements 132*a* and 132*b* of the reinforcement 132 and the longitudinal axis 132*x* of the reinforcement 132 (e.g., whether the angle 133 is a low angle or high angle), the dimensions of the elements, the number of elements, and the number of elements in proportion to the diameter of the actuator 120. For example, whether the reinforcement 132 is axially expandable and/or radially expandable can depend on the angle 133 between the clockwise and counterclockwise elements 132*a*, 132*b* of the reinforcement 132 and the longitudinal axis 132*x* of the reinforcement 132 (e.g., the angle 133 between the clockwise elements 132*a* and the longitudinal axis 132*x* of the reinforcement 132, and the angle 133 between the counterclockwise elements 132*b* and the longitudinal axis 132*x* of the reinforcement 132). The angle 133 between the clockwise elements 132*a* and the longitudinal axis 132*x* of the actuator 120 and the angle 133 between the counterclockwise elements 132*b* and the longitudinal axis 132*x* of the actuator 120 can be the same. The longitudinal axis 132*x* can be, for example, a center longitudinal axis of the reinforcement 310 or an axis parallel to the center longitudinal axis of the reinforcement 310 that intersects the elements 132*a* and/or 132*b*. For example, a reinforcement 132 with a high angle 133 between the clockwise and counterclockwise elements 132*a*, 132*b* and the longitudinal axis 132*x* of the reinforcement 132 can be configured to axially expand more than it radially expands, whereas a reinforcement 132 with a low angle 133 between the clockwise and counterclockwise elements 132*a*, 132*b* and the longitudinal axis 132*x* of the reinforcement 132 can be configured to radially expand more than it axially expands. A high angle 133 between the clockwise and counterclockwise elements 132*a*, 132 and the longitudinal axis 132*x* of the reinforcement 132 can be, for example, 46 degrees to 90 degrees, or more narrowly, 46 degrees to 85 degrees, including every 1 degree increment within these ranges (e.g., 46 degrees, 50 degrees, 60 degrees, 85 degrees 90 degrees). A low angle 133 between the clockwise and counterclockwise elements 132*a*, 132 and the longitudinal axis 132*x* of the reinforcement 132 can be, for example, 0 degrees to 45 degrees, or more narrowly, 5 degrees to 45 degrees, including every 1 degree increment within these ranges (e.g., 0 degrees, 5 degrees, 15 degrees, 45 degrees). When the actuator 120 is in a non-actuated state, the angle 133 can be a low angle or a high angle. For example, FIGS. 26A-45F illustrate that the angle 133 can be a high angle when the actuator 120 is in a non-actuated state. For example, the angle 133 between the clockwise and counterclockwise elements 132*a*, 132*b* can be the angle between the elements when the actuator 120 is not pressurized or otherwise at a baseline pressure (e.g., pressure P0). When the actuator 120 is in an actuated state, the angle 133 can be a low angle or a high angle. The angle 133 can be greater when the actuator 120 is in the actuator 120 is in an actuated state than a non-actuated state. The angle 133 can be less when the actuator 120 is in the actuator 120 is in an actuated state than a non-actuated state. For example, FIGS. 26A-45F illustrate that angle 133 can be less when the actuator 120 is in the actuator 120 is in an actuated state than a non-actuated state. The angle between the clockwise and counterclockwise elements 132*a*, 132*b* referred to here can be the angle between the elements when the tube 100 is in a neutral state or a non-expanded state and/or when the tube 100 is in an expanded state. For example, FIGS. 26A-45F illustrate that the clockwise and counterclockwise elements 132*a*, 132*b* can cross each other at an angle 326 when the tube 100 is in the non-expanded state (e.g., when the actuator 120 is in a non-actuated state). Half of the angle 326 can be the angle 133 between the clockwise and counterclockwise elements 132*a*, 132*b* and the longitudinal axis 132*x* of the reinforcement 132. For example, the longitudinal axis 132*x* of the reinforcement 132 can be an angle bisector (e.g., the longitudinal axis 132*x*) that divides the angle 326 into two angles with equal measures, with each equal measure being the angle 133 between the clockwise and counterclockwise elements 132*a*, 132*b* and the longitudinal axis 132*x* of the reinforcement 132. As another example, FIGS. 26A-45F illustrate that the clockwise and counterclockwise elements 132*a*, 132*b* can cross each other at an angle 328 when the tube 100 is in an expanded state (e.g., when the actuator 120 is in an actuated state). Half of the angle 328 can be the angle 133 between the clockwise and counterclockwise elements 132*a*, 132*b* and the longitudinal axis 132*x* of the reinforcement 132. For example, the longitudinal axis 132*x* of the reinforcement 132 can be an angle bisector (e.g., the longitudinal axis 132*x*) that divides the angle 328 into two angles with equal measures, with each equal measure being the angle 133 between the clockwise and counterclockwise elements 132*a*, 132*b* and the longitudinal axis 132*x* of the reinforcement 132. The angle 328 can be the same as or different than the angle 326. The expansion properties reinforcement 132 when the tube 100 is in a non-expanded state can depend on whether half of the angle 326 is a low angle or a high angle. The expansion properties reinforcement 132 when the tube 100 is in an expanded state can depend on whether half of the angle 328 is a low angle or a high angle.

The upper end of the high angle range for the angle 133 can be the maximum angle between the elements of the reinforcement 132 and the longitudinal axis 132*x* of the reinforcement 132 that the elements can have. The maximum high angle 133 between the clockwise and counterclockwise elements 132*a*, 132*b* can be, for example, 75 degrees to 90 degrees, or more narrowly, 75 degrees to 85 degrees, including every 1 degree increment within these ranges (e.g., 75 degrees, 80 degrees, 85 degrees, 90 degrees). The maximum high angle 133 achievable can depend on, for example, the dimensions of the elements, the number of elements, and the number of elements in proportion to the diameter of the actuator 120. The greater the dimensions of the elements, the greater the number of elements, and the more elements there are in proportion to the diameter of the actuator 120, the lower the maximum angle 133 may be (e.g., closer to or equal to 75 degrees). When the reinforcement 132 has a maximum high angle 133 between the elements (e.g., 75 degrees to 85 degrees), axial expansion of the reinforcement 132 is allowed but radial expansion is prevented. This is because when the reinforcement 132 has a maximum high angle 133 between the elements, the diameter of the reinforcement 132 can be at a maximum and the length can be at a minimum. In such a case, the reinforcement 132 can be axially expandable but not radially expandable.

The lower end of the low angle range for the angle 133 can be the minimum angle between the elements of the reinforcement 132 and the longitudinal axis 132*x* of the reinforcement 132 that the elements can have. The minimum low angle 133 between the clockwise and counterclockwise elements 132*a*, 132*b* can be, for example, 0 degrees to 15 degrees, or more narrowly, 5 degrees to 15 degrees, including every 1 degree increment within these ranges (e.g., 0 degrees, 5 degrees, 10 degrees, 15 degrees). The minimum low angle 133 achievable can depend on, for example, the dimensions of the elements, the number of elements, and the number of elements in proportion to the diameter of the actuator 120. The greater the dimensions of the elements, the greater the number of elements, and the more elements there are in proportion to the diameter of the actuator 120, the higher the minimum angle 133 may be (e.g., closer to or equal to 15 degrees). When the reinforcement 132 has a minimum low angle 133 between the elements (e.g., 5 degrees to 15 degrees), radial expansion of the reinforcement 132 is allowed but axial expansion is prevented. This is because when the reinforcement 132 has a minimum low angle 133 between the elements, the diameter of the reinforcement 132 can be at a minimum and the length can be at a maximum. In such a case, the reinforcement 132 can be radially expandable but not axially expandable.

For tubes 100 in which axial expansion of the actuator 120 is desired, the actuator 120 can have a reinforcement 132 with a high angle 133 (e.g., 46 degrees to 85 degrees) between the elements of the reinforcement 132 and the longitudinal axis 132*x* of the reinforcement 132, as measured, for example, when the actuator 120 is in a non-actuated state. For tubes 100 in which radial expansion is undesirable (e.g., in which no radial expansion is desired), the actuator 120 can have a reinforcement 132 with a maximum high angle 133 (e.g., 75 degrees to 85 degrees) between the elements of the reinforcement 132 and the longitudinal axis 132*x* of the reinforcement 132, as measured, for example, when the actuator 120 is in a non-actuated state.

For tubes 100 in which radial expansion of the actuator 120 is desired, the actuator 120 can have a reinforcement 132 with a low angle 133 (e.g., 5 degrees to 45 degrees) between the elements of the reinforcement 132 and the longitudinal axis 132*x* of the reinforcement 132, as measured, for example, when the actuator 120 is in a non-actuated state. For tubes 100 in which axial expansion is undesirable (e.g., in which no axial expansion is desired), the actuator 120 can have a reinforcement 132 with a minimum low angle 133 (e.g., 5 degrees to 15 degrees) between the elements of the reinforcement 132 and the longitudinal axis 132*x* of the reinforcement 132, as measured, for example, when the actuator 120 is in a non-actuated state.

The reinforcement 132 can thereby allow radial expansion of the actuator 120 and prevent axial expansion of the actuator 120 (e.g., when the angle 133 between the elements of the reinforcement 132 and the longitudinal axis 132*x* of the reinforcement 132 is a minimum low angle), allow axial expansion of the actuator 120 and prevent radial expansion of the actuator 120 (e.g., when the angle 133 between the elements of the reinforcement 132 and the longitudinal axis 132*x* of the reinforcement 132 is a maximum high angle), and/or allow radial expansion and axial expansion of the actuator 120 (e.g., when the angle 133 between the elements of the reinforcement 132 and the longitudinal axis 132*x* of the reinforcement 132 is between the minimum low angle and the maximum high angle). The angle 133 between the elements of the reinforcement 132 and the longitudinal axis 132*x* of the reinforcement 132 for the reinforcement 132 in any of the figures shown herein can be a low angle (e.g., a minimum low angle). The angle 133 between the elements of the reinforcement 132 and the longitudinal axis 132*x* of the reinforcement 132 for the reinforcement 132 in any of the figures shown herein can be a high angle (e.g., a maximum high angle). The angle 133 between the elements of the reinforcement 132 and the longitudinal axis 132*x* of the reinforcement 132 for the reinforcement 132 in any of the figures shown herein can be between a minimum low angle and a maximum high angle. Regardless of the angle between the elements of the reinforcement 132, the reinforcement 132 can transmit torque along the actuator 120. The reinforcement 132 can be, for example, a torque transmitter. The reinforcement 132 can, for example, provide the tube 100 with the ability to transmit torque along a length of the tube 100. The reinforcement 132 can thereby function as a reinforcement 310. As such, for variations in which the reinforcement 132 comprises a braid or a spiral wrap, the reinforcement 132 in the actuator 120 can eliminate the need or desire for the reinforcement 310 in the tube 100. The angle 133 between the clockwise and counterclockwise elements 132*a*, 132*b* of the reinforcement 132 (e.g., of the braid or of the spiral wrap) and the number of clockwise and counterclockwise elements 132*a*, 132*b* can be optimized to control the expansion (e.g., axial and/or radial), torque, and stretch resistance of the actuator 120 desired for the particular application.

For variations in which the reinforcement 132 comprises a braid or a spiral wrap, the reinforcement 132 can allow radial expansion of the actuator 120 up to a radial expansion limit. For example, the maximum high angle 133 that the reinforcement 132 is capable of can be used to limit the radial expansion of the actuator 120. The radial expansion limit of the reinforcement 132 can be, for example, a 5% to 200% increase in the diameter (e.g., the inner diameter) of the actuator 120, including every 1% increment within this range (e.g., 5%, 50%, 100%, 200%) from a first diameter (e.g., the first width 120*w*1) to a second diameter (e.g., the second width 120*w*2). The first diameter can be, for example, a non-expanded or a neutral diameter of the actuator 120. When the actuator 120 has the first diameter, the angle 133 between the elements of the reinforcement 132 and the longitudinal axis 132*x* of the reinforcement 132 can be less than the maximum high angle. The second diameter can be, for example, an expanded diameter of the actuator 120. When the actuator 120 has the second diameter, the angle 133 between the elements of the reinforcement 132 and the longitudinal axis 132*x* of the reinforcement 132 can be the maximum high angle. For example, for an actuator 120 that is expandable from a first diameter to a second diameter in which the first diameter is 2 mm and in which the radial expansion limit of the reinforcement 132 is 100%, once the second diameter of the actuator 120 reaches 4 mm, the angle 133 between the elements of the reinforcement 132 and the longitudinal axis 132*x* of the reinforcement 132 can be a maximum high angle such that the reinforcement 132 can inhibit or prevent further radial expansion of the actuator 120. Once the radial expansion limit of the reinforcement 132 is reached (e.g., once the angle 133 between the elements of the reinforcement 132 and the longitudinal axis 132*x* of the reinforcement 132 reaches the maximum high angle), the reinforcement 132 can inhibit or prevent further radial expansion of the radially stretched portion of the actuator 120. For example, the reinforcement 132 can allow radial expansion of the actuator 120 as the actuator 120 radially expands from the first diameter to the second diameter as a device (e.g., device 329) is advanced along the lumen 104 but can limit the amount by which the actuator 120 can radially expand to the radial expansion limit of the reinforcement 132. The reinforcement 132 can thereby inhibit or prevent radial expansion beyond the radial expansion limit of the reinforcement 132. For example, the reinforcement 132 can allow radial expansion of the actuator 120 as the actuator 120 radially expands as the pressure is increased in the actuator 120 (e.g., from pressure P0 to pressure P1) but can limit the amount by which the actuator 120 can radially expand to the radial expansion limit of the reinforcement 132. Permitting such radial expansion can, for example, reduce the risk of the pressure in the actuator 120 from rupturing the actuator 120. Radial ePTFE can mimic the properties of the reinforcement 132 when a maximum high angle 133 between the elements of the reinforcement 132 and the longitudinal axis 132*x* of the reinforcement 132 is used to limit radial expansion of the actuator 120 such that radial ePTFE in one or multiple layers of the actuator 120 (e.g., an actuator 120 comprising a tube of radial ePTFE) can eliminate the need or desire for the reinforcement 132 in the actuator 120, for example, given that the radial ePTFE can likewise allow radial expansion of the actuator 120 up to a radial expansion limit when the actuator 120 comprises radial ePTFE. For example, the actuator 120 (e.g., the actuator wall) can have radial ePTFE but not the reinforcement 132. As another example, the actuator 120 can have radial ePTFE and the reinforcement 132, in which case the radial ePTFE and the reinforcement 132 can work together to inhibit or prevent axial expansion of the actuator 120 as pressure is increased in the actuator 120 (e.g., from pressure P0 to pressure P1). In such cases the reinforcement 132 can be, for example, embedded in the radial ePTFE. As another example, the reinforcement 132 can be in ePTFE (e.g., not radial ePTFE). When the actuator 120 is depressurized (e.g., from pressure P1 to pressure P0), the reinforcement 132 and/or the radial ePTFE can assist in decreasing the diameter of the actuator 120 (e.g., from an inflated diameter to a deflated diameter).

For variations in which the reinforcement 132 comprises a braid or a spiral wrap, the reinforcement 132 can allow axial expansion of the actuator 120 up to an axial expansion limit. For example, the minimum low angle 133 that the reinforcement 132 is capable of can be used to limit the axial expansion of the actuator 120. The axial expansion limit of the reinforcement 132 can be, for example, a 5% to 200% increase in a length of the actuator 120 (e.g., a full length of the actuator 120), including every 1% increment within this range (e.g., 5%, 50%, 100%, 200%) from a first length (e.g., length 126) to a second length (e.g., length 130). The first length can be, for example, a non-expanded or a neutral length of the actuator 120. When the actuator 120 has the first length, the angle 133 between the elements of the reinforcement 132 and the longitudinal axis 132*x* of the reinforcement 132 can be greater than the minimum low angle. The second length can be, for example, an expanded length of the actuator 120. When the actuator 120 has the second length, the angle 133 between the elements of the reinforcement 132 and the longitudinal axis 132*x* of the reinforcement 132 can be the minimum low angle. For example, for an actuator 120 that is expandable from a first length to a second length in which the first length is 10 cm and in which the axial expansion limit of the reinforcement 132 is 100%, once the second length of the actuator 120 reaches 20 cm, the angle 133 between the elements of the reinforcement 132 and the longitudinal axis 132*x* of the reinforcement 132 can be a minimum low angle such that the reinforcement 132 can inhibit or prevent further axial expansion of the actuator 120. Once the axial expansion limit of the reinforcement 132 is reached (e.g., once the angle 133 between the elements of the reinforcement 132 and the longitudinal axis 132*x* of the reinforcement 132 reaches the minimum low angle), the reinforcement 132 can inhibit or prevent further axial expansion of the axially stretched portion of the actuator 120. For example, the reinforcement 132 can allow axial expansion of the actuator 120 as the actuator 120 axially expands from the first length to the second length as a device (e.g., device 329) is advanced along the lumen 104 but can limit the amount by which the actuator 120 can axially expand to the axial expansion limit of the reinforcement 132. The reinforcement 132 can thereby inhibit or prevent axial expansion beyond the reinforcement axial expansion limit. For example, the reinforcement 132 can allow axial expansion of the actuator 120 as the actuator 120 radially expands as the pressure is increased in the actuator 120 (e.g., from pressure P0 to pressure P1) but can limit the amount by which the actuator 120 can axially expand to the axial expansion limit of the reinforcement 132. Permitting such axial expansion can, for example, reduce the risk of the pressure in the actuator 120 from rupturing the actuator 120. Axial ePTFE can mimic the properties of the reinforcement 132 when a minimum low angle 133 between the elements of the reinforcement 132 and the longitudinal axis 132*x* of the reinforcement 132 is used to limit axial expansion of the actuator 120 such that axial ePTFE in one or multiple layers of the actuator 120 (e.g., an actuator 120 comprising a tube of axial ePTFE) can eliminate the need or desire for the reinforcement 132 in the actuator 120, for example, given that the axial ePTFE can likewise allow axial expansion of the actuator 120 up to an axial expansion limit when the actuator 120 comprises axial ePTFE. For example, the actuator 120 (e.g., the actuator wall) can have axial ePTFE but not the reinforcement 132. As another example, the actuator 120 can have axial ePTFE and the reinforcement 132, in which case the axial ePTFE and the reinforcement 132 can work together to inhibit or prevent radial expansion of the actuator 120 as pressure is increased in the actuator 120 (e.g., from pressure P0 to pressure P1). In such cases the reinforcement 132 can be, for example, embedded in the axial ePTFE. As another example, the reinforcement 132 can be in ePTFE (e.g., not axial ePTFE). When the actuator 120 is depressurized (e.g., from pressure P1 to pressure P0), the reinforcement 132 and/or the axial ePTFE can assist in decreasing the length of the actuator 120 (e.g., from length 130 to length 126).

The reinforcement 132 can have one or multiple functions. For example, for variations in which the reinforcement 132 comprises a braid or a spiral wrap, the reinforcement 132 can transmit torque along the tube 100, can allow the actuator 120 to hold an amount of pressure (e.g., pressure P1) such that the reinforcement 132 can prevent the diameter of the actuator 120 from growing larger while allowing the actuator 120 to grow in length when pressure is applied to the actuator 120 (e.g., when pressure in the lumen 322 of the actuator 120 is increased from pressure P0 to pressure P1), or both. The reinforcement 132 can be, for example, a torque transmitter. The reinforcement 132 can, for example, allow the actuator 120 to increase from length 126 to length 130 while not allowing the radius of the actuator 120 to increase. The angle 133 between the clockwise and counterclockwise elements 132*a*, 132*b* of the reinforcement 132 (e.g., of the braid or of the spiral wrap) and the number of clockwise and counterclockwise elements 132*a*, 132*b* can be optimized to control the expansion, torque, and stretch resistance of the actuator 120 desired for the particular application.

The actuator 120 can have one or multiple functions. For example, the actuator 120 can allow radial expansion of the tube 100, can inhibit or prevent axial expansion of the tube 100, can inhibit kinking of the tube 100, can inhibit crushing of the tube 100, can transmit torque along the tube 100, can reduce the force required to expand the tube 100, can reduce the force required to advance a device (e.g., device 329) through the lumen 104 of the tube 100, or any combination thereof.

The actuator 120 can be a reinforcement in the wall of the tube 100. The actuator 120 can function as a reinforcement in the wall of the tube 100. For example, the actuator 120 can function as a reinforcement in the wall of the tube 100 when the actuator 120 is in an activated state (e.g., inflated state) and/or when the actuator 120 is in a non-activated state (e.g., uninflated state or deflated state). For example, when the actuator 120 is in an activated state, the actuator 120 can inhibit kinking of the tube 160 and/or can inhibit crushing of the tube 100 by becoming rigid (e.g., when pressurized at pressure P1). The actuator 120 can, for example, be more rigid when in an activated state than when in a non-activated state. As another example, when the actuator 120 is in an activated state (e.g., inflated state), the actuator 120 can inhibit or prevent axial expansion of the tube 100. The actuator 120 can, for example, thereby function as an inflatable reinforcement 308 that has a helical shape (e.g., with or without an oscillating pattern such as the oscillating pattern of the actuator 120 shown in FIGS. 1A, 3C, 3E, and 3G) such that the actuator 120, when activated, can inhibit kinking of the tube 100, can inhibit crushing of the tube 100, or both. As another example, the reinforcement 308 can be the actuator 120. As another example, the tube 100 can have two reinforcements 308, one of which can be a wire, and another of which can be the actuator 120.

For example, FIGS. 29A-37D, 41A-41D, and 45A-45F illustrate that the reinforcement 132 can form a hollow coil that can extend helically around the lumen 104. The reinforcement 132 can, for example, form a coil having the lumen 322. For example, FIGS. 29A-37D, 41A-41D, and 45A-45F illustrate that that the reinforcement 132 can be a braid or a spiral wrap, whereby the braid or the spiral wrap can form a coil that extends around the lumen 104. In this way, the reinforcement 132 can function as both a braid and a coil or can function as both a spiral wrap and a coil. The reinforcement 132 can thereby have the properties of a coil, whereby the reinforcement 132 can inhibit or prevent the tube 100 from kinking and/or can inhibit or prevent the tube 100 from crushing. Although coils typically have poor torquability, a coil formed by a braid or spiral wrap such as shown in FIGS. 29A-37D, 41A-41D, and 45A-45F can transmit torque along the length of the tube. The reinforcement 132 can thereby be, for example, a coil having a lumen 322 that extends around the lumen 104.

Any of the tubes (e.g., tubes 160, tubes 100, actuators 120) disclosed herein can have any of the features disclosed herein (e.g., disclosed above), in any combination. For example, the tubes 100 (e.g., active tubes) and the tubes 160 (e.g., passive tubes) can have any combination of the features disclosed herein (e.g., any combination of the foregoing features). The foregoing features can be, for example, arranged in any combination to create active tubes 100 and passive tubes 160 that can expand and contract, for example, as shown in the figures.

Passive Tubes

FIGS. 6A-25D illustrate exemplary combinations and arrangements of the foregoing features. All combinations and sub-combinations of the features shown and/or described with reference to FIGS. 6A-25D are also possible.

FIGS. 6A-25D illustrate, for example, various passive tubes 160 (also referred to as various other terms followed by the reference numeral 160, including, for example, tube 160, tubing 160, dynamic walled tube 160, passive dynamic walled tube 160) that have various benefits. Each tube 160 can expand and contract to accommodate passage of devices (e.g., device 329) through the tube 160. For example, each tube 160 can passively expand as a device is advanced along in the lumen 104, and each tube 160 can passively contract as the device is retracted from the lumen 104. The tube 160 can be passively expandable and contractible. The tube 160 can have a non-expanded state (also referred to as an unexpanded state, a non-expanded state, or other similar terms, including, for example, a natural state or a neutral state) and an expanded state. The non-expanded state can be a relaxed or natural state of the tube 160. The non-expanded state can be a contracted (e.g., fully contracted) state of the tube 160. As a device (e.g., device 329) is advanced in the lumen 104, the tube 160 can passively change from the non-expanded state to the expanded state via the device (e.g., device 329) pushing the wall of the tube 160 radially outward. As the device is withdrawn from the lumen 104, the tube 160 can passively change from the expanded state to the non-expanded state.

Figure 6D:
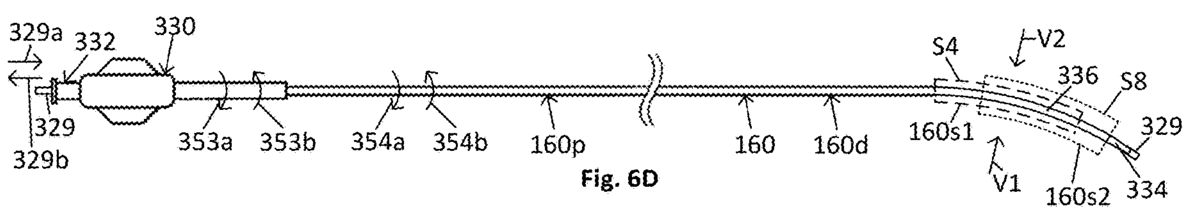
FIG. 6D illustrates the side view of the tube of FIG. 6A when the tube is in a curved, expanded configuration.

FIGS. 6A-6D illustrate a variation of a tube 160. The tube 160 can be, for example, a catheter. The tube 160 can be, for example, an introducer. The tube 160 can have a proximal end 160*p* and a distal end 160*d* (also referred to as a tube proximal end 160*p* and a tube distal end 160*d*, respectively). The proximal end 160*p* can have a handle 330 and a valve 332 (e.g., a hemostasis valve). The distal end 160*d* can have a tip 334. The tip 334 can be, for example, an atraumatic tip. The tip 334 can be passively expandable. The tip 334 can be actively expandable. For example, the tip 334 can comprise the expandable tip shown in FIGS. 5A-5C. The tube 160 can comprise the tip 334 or the tip 334 can be attached to or integrated with the distal end 160*d* of the tube 160. The tip 334 can be fixedly attached to the distal end 160*d*. The tip 334 can be removably attached to the distal end 160*d*, for example, via a friction fit, a magnetic fit, a snap fit, and/or a clip fit (e.g., using one or more clips). The tube 160 can have a length 160L. The length 160L can be, for example, 10 cm to 200 cm, including every 1 cm increment within this range (e.g., 10 cm, 20 cm, 50 cm, 100 cm, 150 cm, 200 cm). The tube 160 can be insertable in a blood vessel. The tube 160 can expand and contract when in a blood vessel, for example, by advancing and withdrawing a device (e.g., device 329) in the lumen 104 of the tube 160. For example, FIGS. 6C and 6D illustrate that the device 329 can be advanced in direction 329*a* and withdrawn in direction 329*b* and that directions 329*a* and 329*b* can be opposite each other.

FIGS. 6A-6D illustrate that the tube 160 can be bendable, expandable, and contractible. FIG. 6A illustrates the tube 160 in a straight, unexpanded configuration. FIG. 6B illustrates the tube 160 in a curved, unexpanded configuration. FIG. 6C illustrates the tube 160 in a straight, expanded configuration. FIG. 6D illustrates the tube 160 in a curved, expanded configuration. FIGS. 6A-6D illustrate that the tube 160 can bend and straighten as it is navigated through a blood vessel and that the tube 160 can expand and contract, for example, as a device (e.g., device 329) is advanced and withdrawn from a lumen (e.g., the lumen 104) in the tube 160. The device 329 can be, for example, an oversized device or oversized instrument. For example, the device 329 can have a width (e.g., a diameter) that is greater than the diameter lumen 104 when the tube 160 is in an unexpanded configuration. For example, the width (e.g., diameter) of the device 329 can be greater than diameter d1, for example, by 1 mm to 30 mm or more, or more narrowly, by 1 mm to 20 mm, or more narrowly still, by 1 mm to 15 mm, including every 1 mm increment within these ranges (e.g., 1 mm, 5 mm, 10 mm, 15 mm, 20 mm, 30 mm). For example, FIGS. 6A and 6B illustrate the tube 160 before a device (e.g., a device 329) is advanced in the tube 160, FIGS. 6A and 6B illustrate the tube 160 after a device (e.g., device 329) is withdrawn from the tube 160, and FIGS. 6C and 6D illustrate the tube 160 after a device (e.g., device 329) has been advanced through the lumen 104 of the tube 160. FIGS. 6B and 6D illustrate that when the tube 160 is in a curved configuration, the tube 160 can have a curve 336.

Sections S1, S2, S3, and S4 in FIGS. 6A-6D each mark the same section of the tube 160. For example, sections S1, S2, S3, and S4 in FIGS. 6A-6D each mark a section 160*s*1 (also referred to as tube section 160*s*1 and a first tube section 160*s*1) of the tube 160. In other words, sections S1, S2, S3, and S4 in FIGS. 6A-6D each mark the boundaries of the same section of the tube 160, i.e., of section 160*s*1. Sections S1, S2, S3, and S4 are used for reference in describing the figures below. The portion of the tube 160 proximal and distal the tube section 160*s*1 can be the same as the tube section 160*s*1 or can be different than the tube section 160*s*1. The section 160*s*1 can have a proximal end 160*s*1*p* and a distal end 160*s*1*d* (also referred to as section proximal end 160*s*1*p* and section distal end 160*s*1*d*, respectively). The section 160*s*1 can have a length 160*s*1L. The length 160*s*1L can be less than the length 160L. For example, the length 160*s*1L can be, 1 cm to 199 cm, or more narrowly, 1 cm to 100 cm, including every 1 cm increment within these ranges (e.g., 1 cm, 5 cm, 10 cm, 20 cm, 30 cm, 40 cm, 50 cm, 100 cm, 150 cm, 199 cm).

Sections S5, S6, S7, and S8 in FIGS. 6A-6D each mark the same section of the tube 160. For example, sections S5, S6, S7, and S8 in FIGS. 6A-6D each mark a section 160*s*2 (also referred to as tube section 160*s*2 and a second tube section 160*s*2). In other words, sections S5, S6, S7, and S8 in FIGS. 6A-6D each mark the boundaries of the same section of the tube 160, i.e., of section 160*s*2. Sections S5, S6, S7, and S8 are used for reference in describing the figures below. The portion of the tube 160 proximal the tube section 160*s*2 can be the same as the tube section 160*s*2 or can be different than the tube section 160*s*2. The section 160*s*2 can have a proximal end 160*s*2*p* and a distal end 160*s*2*d* (also referred to as section proximal end 160*s*2*p* and section distal end 160*s*2*d*, respectively). The section 160*s*2 can have a length 160*s*2L. The length 160*s*2L can be equal to or less than the length 160L. For example, the length 160*s*2L can be 1 cm to 200 cm, or more narrowly, 1 cm-100 cm, including every 1 cm increment within these ranges (e.g., 1 cm, 5 cm, 10 cm, 20 cm, 50 cm, 100 cm, 150 cm, 200 cm). The length 160*s*2L can be the same as or different than the length 160*s*1. The section distal end 160*s*2*d* can be, for example, the distal terminal end of the tube 160. As another example, as shown in FIGS. 6A and 6C, the tip 334 can extend from the section 160*s*2 (e.g., from the section distal end 160*s*2*d*).

FIGS. 6A-6D illustrate that torsional loads 354*a* and 354*b* can be placed on the tube 160, for example, by rotating the handle 330 in direction 353*a* (e.g., torsional load 354*a*) or by rotating the handle 330 in direction 353*b* (e.g., torsional load 354*b*). Direction 353*a* can be clockwise and direction 353*b* can be counterclockwise, or vice versa.

Figure 7A:
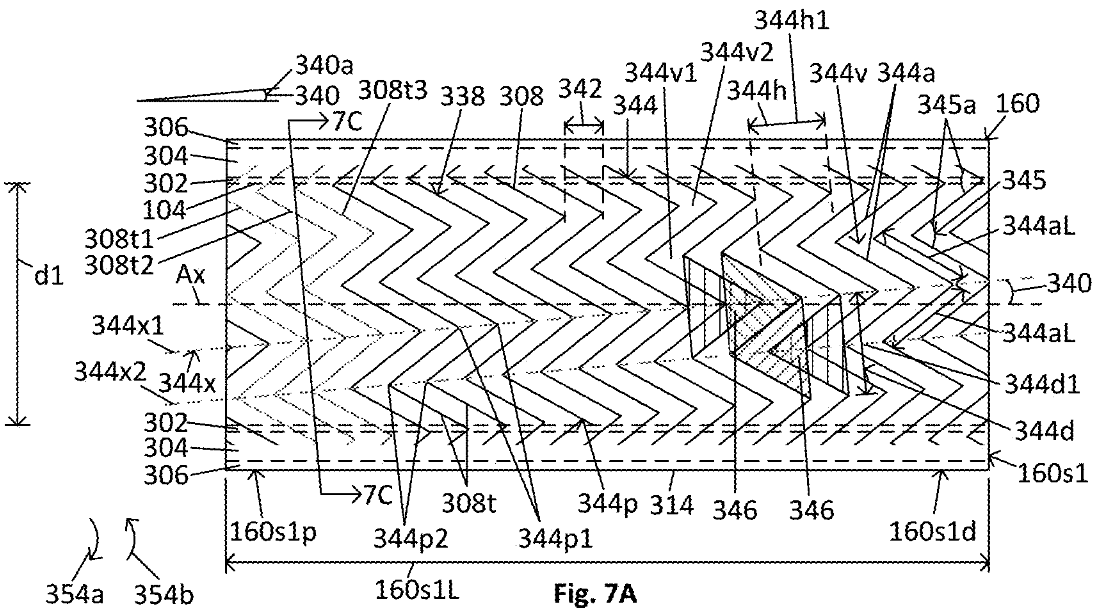
FIG. 7A is a closeup side view of the tube of FIG. 6A at section S1, for example, when the tube is in a non-expanded configuration.
Figure 7B:
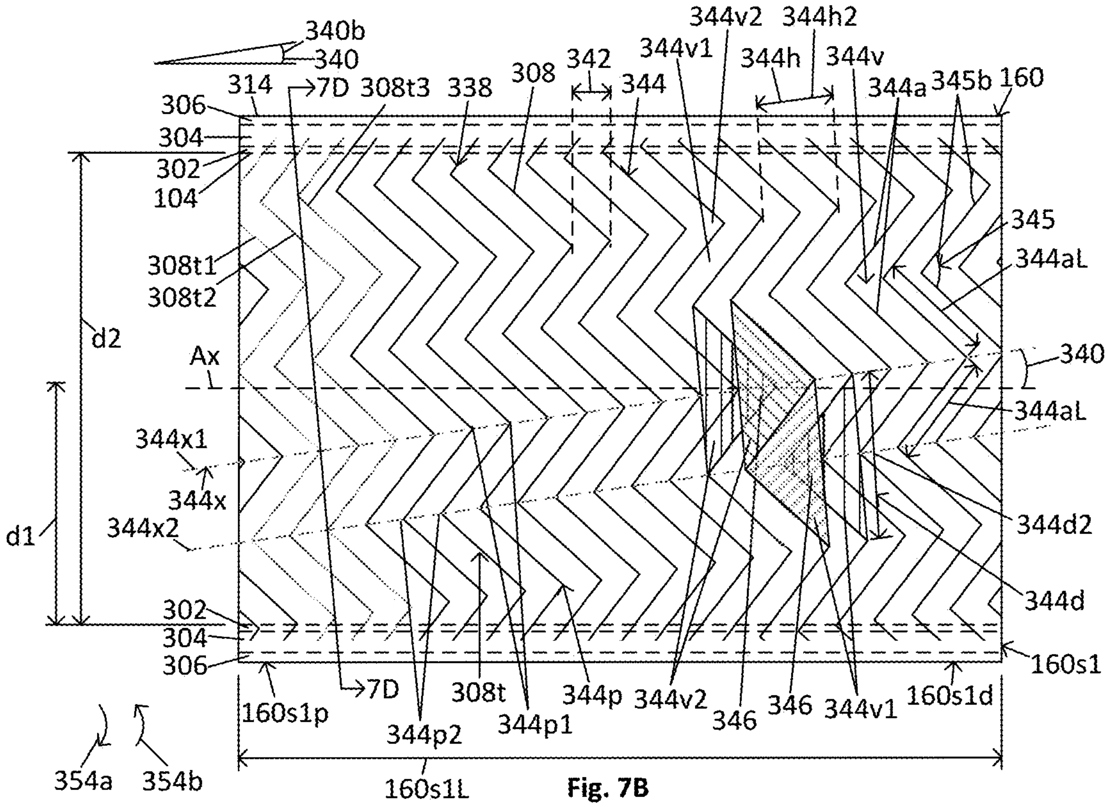
FIG. 7B is a closeup side view of the tube of FIG. 6C at section S2 after the tube is expanded, for example, when the tube is in an expanded configuration.

FIGS. 7A-7D illustrate a variation of the tube 160 in FIGS. 6A-6D. For example, FIG. 7A illustrates a closeup of section S1 of the tube 160 in FIG. 6A, and FIG. 7B illustrates a closeup of section S2 of the tube 160 in FIG. 6C.

FIGS. 7A-7D illustrate that the tube 160 can comprise three layers, for example, a first layer (e.g., the layer 302), a second layer (e.g., the layer 304), and a third layer (e.g., the layer 306). The first layer can be an inner layer, the second layer can be a middle layer, and the third layer can be an outer layer. For example, the second layer can be between an outer surface of the first layer and an inner surface of the third layer along a length of the tube 160.

FIGS. 7A-7D illustrate that the layer 302 can be a first tube, the layer 304 can be a second tube, and the layer 306 can be a third tube. The first tube can be an inner tube, the second tube can be a middle tube, and the third tube can be an outer tube. A lumen (e.g., the lumen 104) can extend through the first, second, and third tubes. The first, second, and third tubes can share a common lumen (e.g., the lumen 104). For example, FIGS. 7A-7D illustrate that the lumen 104 can extend through a longitudinal center of all three tubes. The first, second, and third tubes can have the same lengths as each other or different lengths from one another. For example, FIGS. 7A-7D illustrate that the first, second, and third tubes can each have the same length (e.g., the length 160L) but different diameters (e.g., the first tube can have a smaller diameter than the second tube, and the second tube can have a smaller diameter than the third tube).

The reinforcement 308 can be in (e.g., embedded in) in the tube 160. For example, FIGS. 7A-7D illustrate that the reinforcement 308 can be in (e.g., embedded in) layer 304 (e.g., in the second tube).

The reinforcement 308 can extend around the lumen 104 one or multiple turns 308*t* (also referred to as a turn 308*t*, the turn 308*t*, and the turns 308*t*), for example, 1 to 1000 turns 308*t*, including every 1 turn increment within this range (e.g., 1 turn, 2 turns, 10 turns, 100 turns, 200 turns, 300 turns, 400 turns, 500 turns, 1000 turns) and/or any partial turn (e.g., one quarter of a full turn, one half of a full turn, or three quarters of a full turn, for example, for the first turn and/or the last turn of the reinforcement 308). For example, FIGS. 7A-7D illustrate that the reinforcement 308 can extend helically around the lumen 104 one or multiple turns 308*t*.

FIGS. 7A-7D illustrate that reinforcement 308 can have a profile 338. The profile 338 can comprise the turns 308*t*. The profile 338 can be a non-helical profile, a helical profile, or can be a profile having one or multiple non-helical sections and one or multiple helical sections. For example, For example, FIGS. 7A-7D illustrate that the profile 338 can be a helical profile having a helix angle 340 and a pitch 342. The helix angle 340 can be the angle between a center longitudinal axis Ax of the tube 160 (e.g., of the lumen 104) and a center longitudinal axis of the profile 338. The helix angle 340 can be, for example, 1 degree to 30 degrees, or more narrowly, 1 degree to 10 degrees, including every 1 degree increment within these ranges (e.g., 1 degree, 5 degrees, 10 degrees, 15 degrees, 20 degrees, 30 degrees). The pitch 342 can be the distance between adjacent turns 308*t* of the reinforcement 308. The pitch 342 can be, for example, 0.0 mm to 15.0 mm, or more narrowly, 0.0 mm to 10.0 mm, or more narrowly still, 0.0 mm to 5.0 mm, including every 0.1 mm increment within these ranges (e.g., 0.0 mm, 1.0 mm, 2.5 mm, 5.0 mm, 7.5 mm, 10.0 mm, 12.5 mm, 15.0 mm). When the pitch 342 is 0.00 mm, adjacent turns 308*t* of the reinforcement 308 can be in contact with each other. The helix angle 340 and/or the pitch 342 can vary along the turns 308*t* or can be constant along a length of the reinforcement 308 (e.g., along a length of the profile 338). FIGS. 7A-7D illustrate that the profile 338 can comprise at least one full turn 308*t*, that the profile 338 can comprise a diameter, that the turns 308*t* can be contiguous (e.g., uninterrupted) with each other along a length of the profile 338, and that adjacent turns 308*t* can be spaced and not touch along a length of the profile 338. As another example, adjacent turns 308*t* can contact each other along a length of the profile 338.

FIGS. 7A-7D illustrate that the reinforcement 308 can have an oscillating shape 344. As another example, the reinforcement 308 may not have an oscillating shape 344 such that the reinforcement 308 can be a coil without any undulations, either along the entire length of reinforcement 308 or along a portion thereof. FIGS. 7A-7D illustrate, for example, that the oscillating shape 344 can be, for example, a zigzag shape but any oscillating shape is appreciated, including, for example, the shape of any waveform (e.g., a sine wave, a square wave, a triangle wave, or a sawtooth wave). The oscillating shape 344 can be consistent or can vary along the length of the reinforcement 308. For example, FIGS. 7A-7D illustrate that the oscillating shape 344 can be consistent (e.g., have the same wave pattern) along the length of the reinforcement, for example, along the turns 308*t*. The oscillating shape 344 can be, for example, a periodic waveform.

FIGS. 7A-7D illustrate that the reinforcement 308 can comprise arms 344*a* which intersect or merge to form peaks 344*p* (also referred to as crowns) and valleys 344*v*. The arms 344*a* can be integral with each other such that the reinforcement 308 can be, for example, a continuous strand of material (e.g., a continuous strand of a metal wire). The arms 344*a*, peaks 344*p*, and/or valleys 344*v* can define the oscillating shape 344.

FIGS. 7A-7D illustrate that each of the peaks 344*p* can be a point where two adjacent arms 344*a* merge with or intersect each other, and that each of the valleys 344*v* can be the space or gap between two adjacent arms 344*a*. For example, FIGS. 7A-7D illustrate that the peaks 344*p* (e.g., the apex of the peaks 344*p*) can be opposite the valleys 344*v* (e.g., the base of the valleys 344*v*). In other words, opposite each peak 344*p* can be the base of one of the valleys 344*v*. For example, FIGS. 7A-7D illustrate that two arms 344*a* that intersect each other can define both a peak 344*p* and a valley 344*v*, whereby the apex of the peak 344*p* can be opposite the base of the valley 344*v*. The peaks 344*p* can be angular, rounded, and/or flat. For example, FIGS. 7A-7D illustrate that the peaks 344*p* can be angular such the peaks 344*p* can define corners (e.g., pointed corners, sharp corners). As another example, the peaks 344*p* can be rounded such that the peaks 344*p* can define rounded corners or crests that are curved. The base of valleys 344*v* can be straight or curved. For example, FIGS. 7A-7D illustrate that the base of the valleys 344*v* can be straight such the valleys 344*v* can define spaces having a triangle shape. The shape of the valley can depend, for example, on the wave form of the reinforcement 308. For example, for a zigzag shape (e.g., the zigzag shape shown in FIGS. 7A-7D), the peaks 344*p* can define corners where two arms 344*a* intersect, and the valleys 344*v* can be the space between two adjacent arms 344*a*. The reinforcement 308 can be single structure (e.g., a single wire, a single unitary wire) comprising the arms 344*a* which define the peaks 344*p* and the valleys 344*v*. For example, the reinforcement 308 can be a wire (e.g., a single wire) that has the oscillating shape 344 shown in FIGS. 7A-7D.

The peaks 344*p* can comprise first peaks 344*p*1 and second peaks 344*p*2. The first peaks 344*p*1 can be the crests of the oscillating shape 344 and the second peaks 344*p*2 can be the troughs of the oscillating shape 344, or vice versa. The first and second peaks 344*p*1, 344*p*2 can point in opposite directions. For example, FIGS. 7A-7D illustrate that the first peaks 344*p*1 can point distally, for example, toward the distal end 160*d* (e.g., toward the section distal end 160*s*1*d*), and that the second peaks 344*p*2 can point proximally, for example, toward the proximal end 160*p* (e.g., toward the section proximal end 160*s*1*p*), or vice versa.

The valleys 344*v* can comprise first valleys 344*v*1 and second valleys 344*v*2. The first valleys 344*v*1 can be the spaces between two adjacent first peaks 344*p*1 and the second valleys 344*v*2 can be the spaces between two adjacent second peaks 344*p*2, or vice versa. The first and second valleys 344*v*1, 344*v*2 can open in opposite directions. For example, FIGS. 7A-7D illustrate that the first valleys 344*v*1 can open distally, for example, toward the distal end 160*d* (e.g., toward the section distal end 160*s*1*d*), and that the second valleys 344*v*2 can open proximally, for example, toward the proximal end 160*p* (e.g., toward the section proximal end 160*s*1*p*), or vice versa.

FIGS. 7A-7D illustrate that the first peaks 344*p*1 can be opposite (e.g., diametrically opposite) the second valleys 344*v*2, and that the second peaks 344*p*2 can be opposite (e.g., diametrically opposite) the first valleys 344*v*1.

FIGS. 7A-7D illustrate that the peaks and valleys 344*p*, 344*v* can be aligned (e.g., longitudinally and circumferentially aligned) along axes 344*x*. The axes 344*x* can, for example, bisect the peaks and valleys 344*p*, 344*v*. The axes 344*x* can extend around (e.g., helically around) the lumen 104. For example, FIGS. 7A and 7B illustrate that the axes 344*x* can extend helically around the center longitudinal axis Ax of the tube 160 (e.g., of the lumen 104) such that the peaks and valleys 344*p*, 344*v* of adjacent turns 308*t* can extend helically around the center longitudinal axis Ax. FIGS. 7A and 7B illustrate, for example, that the axes 344*x* can comprise first axes 344*x*1 and second axes 344*x*2. The first axes 344*x*1 can extend through the first peaks 344*p*1 and the second valleys 344*v*2 of adjacent turns 308*t* along a first set of peaks and valleys 344*p*, 344*v*, and the second axes 344*x*2 can extend through the second peaks 344*p*2 and the first valleys 344*v*1 of adjacent turns 308*t* along a second set of peaks and valleys 344*p*, 344*v*. For example, FIGS. 7A and 7B illustrate that first peaks 344*p*1 and second valleys 344*v*2 of adjacent turns 308*t* can be aligned along the first axis 344*x*1, and that second peaks 344*p*2 and first valleys 344*v*1 of adjacent turns 308*t* can be aligned along the second axis 344*x*2. FIGS. 7A and 7B illustrate, for example, that the first axis 344*x*1 can bisect the first peaks 344*p*1 and the second valleys 344*v*2, and that the second axis 344*x*2 can bisect the second peaks 344*p*2 and the first valleys 344*v*1. The axes 344*x* can be parallel to each other. For example, FIGS. 7A and 7B illustrate that the axes 344*x*1 and 344*x*2 can be parallel with each other. As another example, the axes 344*x* that extend through the first peaks 344*p*1 and the second valleys 344*v*2 can be angled relative to (e.g., non-parallel to) the axes 344*x* that extend through the second peaks 34402 and the first valleys 344*v*1.

The arms 344*a*, peaks 344*p*, and valleys 344*v* of the reinforcement 308 can be spaced apart from each at regular or irregular intervals. FIGS. 7A and 7B illustrate an exemplary variation of a reinforcement 308 having arms 344*a*, peaks 344*p*, and valleys 344*v* spaced apart at regular intervals. The oscillating shape 344 can have any arrangement of features, for example, the arrangement of features shown in FIGS. 7A-7D. FIGS. 7A-7D illustrate that the characteristics or parameters of the oscillating shape 344 can include a distance 344*d* (e.g., a wavelength), a height 344*h* (e.g., a peak-to-peak height), an arm length 344*a*L, an angle 345 between adjacent arms 344*a*, the number of turns 308*t*, and/or the relative positions and arrangement of the peaks and valleys 344*p*, 344*v*.

FIGS. 7A and 7B illustrate that the arms 344*a* can each have an arm length 344*a*L. The arm length 344*a*L can be, for example, from about 2 mm to about 15 mm, including every 1 mm increment within this range (e.g., 2 mm, 5 mm, 10 mm, 15 mm). The arms 344*a* can have a uniform length or a non-uniform length. For example, FIGS. 7A and 7B illustrate that the arms can have a uniform length, for example, the arm length 344*a*L. Adjacent arms 344*a* can have the same length or a different length relative to each other. For example, FIGS. 7A and 7B illustrate that the arms 344*a* can have the same length as each other, for example, the arm length 344*a*L. As another example, the arm length 344*a*L can be non-uniform (e.g., it can be variable, for example, some arms 344*a* can be 2 mm long and some arms 344*a* can be 4 mm long, or any other length or combination of lengths).

FIGS. 7A and 7B illustrate that the oscillating shape 344 can define a distance 344*d* between two adjacent first peaks 344*p*1 and/or between two adjacent second peaks 344*p*2. The distance 344*d* between two adjacent first peaks 344*p*1 can be the same as the distance between two adjacent second peaks 344*p*2. The distance 344*d* can be, for example, the wavelength of the oscillating shape 344. The wavelength can be measured between two adjacent crests (e.g., between first peaks 344*p*1) or between two adjacent troughs (e.g., between second peaks 344*p*2). The distance 344*d* can be, for example, from about 2 mm to about 20 mm, including every 1 mm increment within this range (e.g., 2 mm, 5 mm, 10 mm, 15 mm, 20 mm).

FIGS. 7A and 7B illustrate that the oscillating shape 344 can define a height 344*h*. The height 344*h* can be the peak-to-peak distance between a first peak 344*p*1 and a second peak 344*p*2. The height 344*h* can be, for example, from about 2 mm to about 10 mm, including every 1 mm increment within this range (e.g., 2 mm, 5 mm, 10 mm). Half of the height 344*h* can be the amplitude of the oscillating shape 344.

FIGS. 7A and 7B illustrate that an angle 345 can be between adjacent arms 344*a*. The angle 345 can be, for example, 1 degrees to 180 degrees, or more narrowly, 5 degrees to 175 degrees, or more narrowly, 30 degrees to 120 degrees, including every 1 degree increment within these ranges (e.g., 1 degree, 10 degrees, 20 degrees, 30 degrees, 45 degrees, 60 degrees, 75 degrees, 90 degrees, 120 degrees, 170 degrees, 179 degrees).

The peaks 344*p* can move relative to each other as the tube 160 expands, contracts, bends, straightens, or any combination thereof. For example, the peaks 344*p* (e.g., adjacent peaks 344*p*) of the reinforcement 308 can move away from each other and toward each other during radial expansion and radial contraction of the tube 160, respectively. For example, FIGS. 7A and 7B illustrate that the peaks 344*p* (e.g., adjacent corners) can be closer to each other when the tube 160 is in a non-expanded state (e.g., FIG. 7A) than when the tube 160 is in an expanded state (e.g., FIG. 7B). FIG. 7A illustrates that the non-expanded state can be the natural state of the tube 160 or a contracted state of the tube 160. FIG. 7B illustrates that the expanded state can be a partially expanded state or a fully expanded state of the tube 160. FIGS. 7A and 7B illustrate, for example, that the distance 344*d* can increase from a first distance 344*d*1 to a second distance 344*d*2 when the tube 160 is expanded from a non-expanded state to an expanded state, and that the distance 344*d* can decrease from the second distance 344*d*2 to the first distance 344*d*1 when the tube 160 is contracted from the expanded state to the non-expanded state.

When the tube 160 is in the non-expanded state (e.g., FIG. 7A), the first distance 344*d*1 (e.g., the wavelength, the linear distance or circumferential distance) between adjacent peaks 344*p* can be, for example, 2 mm to 20 mm, including every 1 mm increment within this range (e.g., 2 mm, 3 mm, 5 mm, 7 mm, 10 mm, 20 mm).

When the tube 160 is in the expanded state (e.g., FIG. 7B), the second distance 344*d*2 (e.g., the wavelength, the linear distance or circumferential distance) between adjacent peaks 344*p* can be, for example, 1 mm to 30 mm greater than the first distance 344*d*1, including every 1 mm increment within this range (e.g., 3 mm, 4 mm, 7 mm, 9 mm, 15 mm, 30 mm). The maximum 30 mm amount assumes, for example, that the arm length 344*a*L is 15 mm and that the reinforcement 308 completely straightens or almost completely straightens (95% to 99% straight) when the tube 160 is in an expanded configuration. In cases in which the reinforcement 308 completely straightens when the tube 160 is expanded, the peaks and valleys 344*p*, 344*v* can completely flatten, whereby the reinforcement 308 can have the shape of a helical coil without a zigzag shape.

The difference in the distance 344*d* between adjacent peaks 344*p* when the tube 160 is in the expanded state (e.g., FIG. 7B) compared to when the tube 160 is in the non-expanded state (e.g., FIG. 7C) can be, for example, 1 mm to 30 mm, including every 1 mm increment within this range (e.g., 1 mm, 2 mm, 4 mm, 8 mm, 30 mm). For example, FIGS. 7A and 7B illustrate that the difference in distance between adjacent corners when the when the tube 160 is in the expanded state (e.g., FIG. 7B) compared to when the tube 160 is in the non-expanded state (e.g., FIG. 7C) can be 5 mm. As another example, the reinforcement 308 can completely straighten such that the reinforcement 308 does not have any peaks 344*p* when the tube 160 is in the expanded configuration. In such cases, there may be no distance 344*d* when the tube 160 is in the expanded configuration. In such a case, when the tube 160 is in the non-expanded state (e.g., FIG. 7A), the reinforcement 308 can have the oscillating shape 344, and when the tube 160 is in the non-expanded state (e.g., FIG. 7B), the reinforcement 308 may not have any undulations such that the reinforcement 308 can look like a coil.

Similarly, FIGS. 7A and 7B illustrate, for example, that the height 344*h* can decrease from a first height 344*h*1 to a second height 344*h*2 when the tube 160 is expanded from a non-expanded state to an expanded state, and that the height 344*h* can increase from the second height 344*h*2 to the first height 344*h*1 when the tube 160 is contracted from the expanded state to the non-expanded state. When the tube 160 is in the non-expanded state (e.g., FIG. 7A), the first height 344*h*1 can be, for example, 1.5 mm to 15.0 mm, including every 0.1 mm increment within this range (e.g., 1.5 mm, 2.0 mm, 2.5 mm, 5.0 mm, 10.0 mm, 15.0 mm). When the tube 160 is in the expanded state (e.g., FIG. 7B), the second height 344*h*2 can be, for example, 0.0 mm to 15.0 mm, including every 0.1 mm increment within this range (e.g., 0.0 mm, 0.1 mm, 1.0 mm, 1.2 mm, 1.7 mm, 2.2 mm, 4.7 mm, 9.7 mm, 14.0 mm, 15.0 mm). The difference between the second height 344*h*2 when the tube 160 is in the expanded state (e.g., FIG. 7B) compared to the first height 344*h*1 when the tube 160 is in the non-expanded state (e.g., FIG. 7C) can be, for example, 0.0 mm to 15.0 mm, including every 0.1 mm increment within this range (e.g., 0.0 mm, 0.1 mm, 2.0 mm, 15.0 mm). For example, FIGS. 7A and 7B illustrate that the difference between the first and second heights 344*h*1, 344*h*2 can be 2.0 mm. When the difference between the first and second heights 344*h*1, 344*h*2 is 0.0 mm, the height 344*h* does not change when the tube 160 expands and contracts. In other words, the first height 344*hl* can be the same as the second height 344*h*2. When the difference between the first and second heights 344*h*1, 344*h*2 equals the first height 344*h*1, the undulations (e.g., the peaks 344*p*) of the reinforcement 308 can completely straighten during expansion such that the reinforcement 308 can extend helically around the lumen 104 without any peaks 344*p* when the tube 160 is in the expanded state (e.g., the state shown in FIG. 7B). In such a case, when the tube 160 is in the non-expanded state (e.g., FIG. 7A), the reinforcement 308 can have the oscillating shape 344, and when the tube 160 is in the non-expanded state (e.g., FIG. 7B), the reinforcement 308 may not have any undulations such that the reinforcement 308 can look like a coil.

Similarly, FIGS. 7A and 7B illustrate, for example, that the angle 345 can increase from a first angle 345*a* to a second angle 345*b* when the tube 160 is expanded from a non-expanded state to an expanded state, and that the angle 345 can decrease from the second angle 345*b* to the first angle 345*a* when the tube 160 is contracted from the expanded state to the non-expanded state. When the tube 160 is in the non-expanded state (e.g., FIG. 7A), the first angle 345*a* can be, for example, 10 degrees to 170 degrees, or more narrowly, 30 degrees to 120 degrees, including every 1 degree increment within these ranges (e.g., 10 degrees, 20 degrees, 30 degrees, 45 degrees, 60 degrees, 75 degrees, 90 degrees, 120 degrees, 170 degrees). When the tube 160 is in the expanded state (e.g., FIG. 7B), the second angle 345*b* can be, for example, 10 degrees to 180 degrees, or more narrowly, 10 degrees to 150 degrees, including every 1 degree increment within these ranges (e.g., 10 degrees, 11 degrees, 20 degrees, 31 degrees, 45 degrees, 60 degrees, 75 degrees, 90 degrees, 120 degrees, 180 degrees). The difference between the first and second angles 345*a*, 345*b* can be, for example, 0 degrees to 120 degrees, including every 1 degree increment within this range. For example, FIGS. 7A and 7B illustrate that the difference between the first and second angles 345*a*, 345*b* can be 30 degrees. When the difference between the first and second angles 345*a*, 345*b* is 0 degrees, the angle 345 does not change when the tube 160 expands and contracts. In other words, the first angle 345*a* can be the same as the second angle 345*b*. When the difference between the first and second angles 345*a*, 345*b* equals the first angle 345*a*, the undulations (e.g., the peaks 344*p*) of the reinforcement 308 can completely straighten during expansion such that the reinforcement 308 can extend helically around the lumen 104 without any peaks 344*p* when the tube 160 is in the expanded state (e.g., the state shown in FIG. 7B). When the angle 345 (e.g., the first angle 345*a*, the second angle 345*b*) is 90 degrees to 180 degrees, including every 1 degree increment within this range (e.g., 90 degrees, 170 degrees, 180 degrees), the reinforcement 308 can be in a fully expanded state (e.g., a fully radially expanded state). When the angle 345 is 180 degrees, the reinforcement 308 can have completely straightened such that the reinforcement 308 comprises a helical coil without a zigzag.

Still similarly, FIGS. 7A and 7B illustrate, for example, that the helix angle 340 can increase from a first helix angle 340*a* to a second helix angle 340*b* when the tube 160 is expanded from a non-expanded state to an expanded state, and that the helix angle 340 can decrease from the second helix angle 340*b* to the first helix angle 340*a* when the tube 160 is contracted from the expanded state to the non-expanded state. The difference between the first and second angles 345*a*, 345*b* can be, for example, 0.0 degrees to 10.0 degrees, including every 0.1 degree increment within this range (e.g., 0.0 degrees, 0.1 degrees, 2.5 degrees, 10.0 degrees). When the difference between the first and second helix angles 340*a*, 340*b* is 0.0 degrees, the helix angle 340 does not change when the tube 160 expands and contracts. In other words, the first helix angle 340*a* can be the same as the second helix angle 340*b*.

FIGS. 7A and 7B illustrate that the peaks 344*p* can be in the valleys 344*v*. A peak 344*p* can be considered in a valley 344*v*, for example, when the peak 344*p* is between the arms 344*a* that define the valley 344*v*. For example, FIGS. 7A and 7B illustrate that the first peaks 344*p*1 can be in the second valleys 344*v*2, and that the second peaks 344*p*2 can be in the first valleys 344*v*1. For example, FIGS. 7A and 7B illustrate that the first peaks 344*p*1 can be in the second valleys 344*v*2 defined by an adjacent turn of the reinforcement 308, and that the second peaks 344*p*2 can be in the first valleys 344*v*1 defined by an adjacent turn of the reinforcement 308. When a peak 344*p* is in a valley 344*v*, the peak 344*p* can be considered nested in the valley 344*v*. When a peak 344*p* is outside a valley 344*v*, the peak 344*p* can be considered separated from (also referred to as non-nested with) the valley 344*v*. FIGS. 7A and 7B illustrate, for example, that the peaks 344*p* can be nested in the valleys 344*v*. The peaks 344*p* can be in the valleys 344*v* before and/or after expansion of the tube 160. For example, FIG. 7A illustrates that the peaks 344*p* can be in the valleys 344*v* when the tube 160 is in a non-expanded state and/or when the tube 160 is in a contracted state, and FIG. 7B illustrates that the peaks 344*p* can be in the valleys 344*v* when the tube 160 is in an expanded state. The reinforcement 308 can be considered to have a nested configuration, for example, when the peaks 344*p* are nested in the valleys 344*v*, and the reinforcement 308 can be considered to have a separated configuration (also referred to as a non-nested configuration), for example, when the peaks 344*p* are outside of the valleys 344*v*. For example, FIGS. 7A-7D illustrate that the reinforcement 308 can have a nested configuration.

FIGS. 7A and 7B illustrate that valleys 344*v* can overlap with each other. For example, FIGS. 7A and 7B illustrate hash lines in two of the first valleys 344*v*1 and in two of the second valleys 344*v*2 to show that a portion of the valleys 344*v* (e.g., the bases of the valleys 344*v*) can overlap with the adjacent valley 344*v* in an overlap region 346. Other overlap regions between adjacent valleys are shown in FIGS. 7A and 7B but not labeled or shown with overlapping hash lines.

The reinforcement 308 can inhibit kinking of the tube 160, can inhibit crushing of the tube 160, can transmit torque along the tube 160, or any combination thereof. As another example, where the reinforcement 308 (e.g., the zigzag wire) comprises a spring or a shape memory alloy, the reinforcement 308 can inhibit kinking of the tube 160, can inhibit crushing of the tube 160, can transmit torque along the tube 160, can reduce the force required to expand the tube 160, can reduce the force required to advance a device through the lumen 104 of the tube 160, or any combination thereof.

FIGS. 7A and 7B illustrate that the reinforcement 308 can transmit the torsional loads 354*a* and 354*b* exerted on the tube 160 (e.g., at the tube proximal end 160*p*) down the length of the tube 160, for example, along the arms 344*a* of the reinforcement 308 and across the valleys 344*v* as the force from the torsional loads 354*a* and 354*b* propagate along the reinforcement 308 and the tube 160 from the proximal end 160*p* to the distal end 160*d*.

FIGS. 7A-7D illustrate that the reinforcement 308 can be in (e.g., embedded in) layer 304 (e.g., in the second tube). The reinforcement 308 can, for example, extend through layer 304 (e.g., the second tube) between an inner surface and an outer surface of layer 304 along a length of the tube 160 (e.g., along the entire length 160L or along any length of the tube 160 less than the length 160L, including, for example, 1% to 99% of the length 160L, including every 1% increment within this range).

The layers of the tube 160 in FIGS. 7A-7D can be made of various materials. For example, in a first variation of materials, one of the layers can comprise PTFE, one of the layers can comprise a fluoroelastomer, and one of the layers can comprise ePTFE, whereby the ePTFE can be ePTFE, axial ePTFE, radial ePTFE, or any combination thereof. For example, FIGS. 7A-7D illustrate that layer 302 can comprise PTFE, layer 304 can comprise a fluoroelastomer, and layer 306 can comprise ePTFE. The ePTFE can be radial ePTFE or axial ePTFE. A tube 160 with this combination of material layers can provide unique advantages over the existing state of the art for passively expandable tubes. For example, with the combination of materials in this exemplary first variation of materials, layer 302 can be harder than layer 306, layer 306 can be more elastic than layer 302, and layer 304 can inhibit or prevent the reinforcement 308 from delaminating and slipping between layers 302 and 306.

The PTFE layer (e.g., layer 302) can, for example, inhibit or prevent a device (e.g., device 329) in the lumen 104 from puncturing and/or tearing layer 302 as the device is advanced in the lumen 104. The PTFE layer can thereby allow sharp devices or devices without an atraumatic tip to be advanced along the lumen 104 without puncturing or tearing the tube 160. As another example, the PTFE in layer 302 can inhibit or prevent axial elongation of the tube 160 as a device (e.g., device 329) is advanced along the lumen 104, which can eliminate the need or desire for a reinforcement (e.g., the reinforcement 310) that inhibits or prevents axial stretching of the tube 160 as a device is passed through the tube 160 in lumen 104. This can allow devices that have diameters larger than the tube 160 to be advanced along the lumen 104 without the need for a reinforcement 310 in the wall of the tube 160 to prevent axial expansion. For example, as a device is advanced along the lumen 104, the PTFE can allow the device (e.g., device 329) to radially expand the tube 160 but can inhibit the device from axially expanding the tube 160. Since the PTFE can inhibit axial expansion but allow radial expansion of the tube 160, the PTFE can eliminate the need or desire for the reinforcement 310 (e.g., braid or spiral wrap) in the layers of the tube 160 (e.g., in layer 302, 304, and/or 306). In other words, the PTFE in layer 302 can inhibit or prevent the device being advanced in the lumen 104 from pushing the portion of the tube 160 that is distal the tip of the device away from the portion of the tube 160 that is proximal the tip of the device, which can thereby limit or prevent axial elongation of the tube 160 as the tube 160 radially expands. The PTFE layer in the first variation of materials (e.g., layer 302) can thereby resist axial tension as the tube 160 radially expands from the radial force RF exerted by the device, for example, as a device is advanced longitudinally in the lumen 104. Although the PTFE can eliminate the need or desire for the reinforcement 310, as another example, the reinforcement 310 (e.g., a braid or spiral wrap) can be embedded in one of the layers (e.g., in layer 302, 304, or 306). In such cases, the reinforcement 310 can, for example, transmit torque and can reduce or prevent the axial expansion of the tube 160 that may otherwise be allowed by the PTFE in layer 302. The reinforcement 310 can thereby reduce or eliminate the axial stretchability of the tube 160. FIGS. 10A-12H illustrate an exemplary variation in which the tube 160 has the reinforcement 310, for example, in layer 306.

The fluoroelastomer layer (e.g., layer 304) can be more flexible and have a higher coefficient of friction than PTFE and ePTFE such that the fluoroelastomer can better protect against the reinforcement 308 from delaminating from itself than from PTFE or ePTFE. In other words, it can require a greater force for the reinforcement 308 to delaminate from layer 304 when layer 304 comprises fluoroelastomer than when layer 304 comprises PTFE or ePTFE. The stretchability and stickier fluoroelastomer can, for example, inhibit the reinforcement 308 from slipping between layer 302 and layer 306 so that radial and/or axial expansion and contraction of the tube 160 does not delaminate the reinforcement 308 from the material in layer 304. The fluoroelastomer can, for example, inhibit or prevent the reinforcement 308 from delaminating from between layers 302 and 306 better when layer 304 comprises fluoroelastomer than when layer 304 comprises PTFE or ePTFE. As additional examples, however, layer 304 can comprise PTFE or ePTFE instead of a fluoroelastomer.

In the first variation of materials, the ePTFE layer (e.g., layer 306) can provide elasticity to the tube 160, for example, with axial ePTFE and/or with radial ePTFE depending on the direction of elasticity desired. When layer 306 comprises axial ePTFE, the tube 160 can have the benefits associated with axial ePTFE (e.g., described above), with axial expansion being permitted and radial expansion being inhibited or prevented. When layer 306 comprises radial ePTFE, the tube 160 can have the benefits associated radial ePTFE (e.g., described above), with radial expansion being permitted and axial expansion being inhibited or prevented. Radial ePTFE in layer 306 (or in any other layer) can reduce the force need to radially expand the tube 160, for example, compared to axial ePTFE or PTFE in the layer (e.g., in layer 306). Axial ePTFE in layer 306 (or in any other layer) can reduce the force need to axially expand the tube 160, for example, compared to radial ePTFE or PTFE in the layer (e.g., in layer 306).

In the first variation of materials, the ePTFE in layer 306 can be radial ePTFE (e.g., without axial ePTFE). For tubes 160 with radial ePTFE instead of axial ePTFE (e.g., in layer 306), the radial ePTFE can combine the elastic benefits of ePTFE redirected in a transverse direction (e.g., given that radial ePTFE is conditioned to stretch radially rather than axially) with properties that mimic the benefits of the reinforcement the reinforcement 310 (e.g., given that the radial ePTFE can allow radial expansion but limit or prevent axial expansion). The radial ePTFE can, for example, improve upon the elasticity provided by axial ePTFE by being more conducive to stretching in the radial direction than in the axial direction, and can function as a reinforcement 310 (e.g., braid or spiral wrap) in the tube 160, for example, along with the PTFE in layer 302, by inhibiting axial expansion of the tube 160 as a device (e.g., device 329) is advanced longitudinally along the lumen 104. Radial ePTFE can thereby solve the problem of both providing elasticity in the radial direction and simultaneously limiting elasticity in the axial direction. In other words, radial ePTFE in one or multiple layers of the tube 160 (e.g., in layer 306 in FIGS. 7A-7D) can have the combined effect of ePTFE and a reinforcement 310 in the tube 160.

Since radial ePTFE is radially expandable in the radial direction, radial ePTFE in the tube 160 (e.g., in layer 306) can reduce the force required to expand the tube 160 as a device (e.g., device 329) is advanced through the tube 160 as compared to the same tube 160 with axial ePTFE in the tube 160 (e.g., in layer 306) instead of radial ePTFE. This can in turn reduce the force required to advance a device along the lumen 104 of the tube 160. The resistance of radial ePTFE to elongating in the axial direction can also assist the PTFE in layer 302 in eliminating the need or desire for a reinforcement 310 in the tube 160, thereby further eliminating the need or desire for a reinforcement 310 in the tube 160. In the first variation of materials, layers 302 and 306 of PTFE and radial ePTFE, respectively, can thereby inhibit or prevent axial expansion of the tube 160 and layer 306 can reduce the force needed to radially expand the tube, which can in turn reduce the amount of force needed to push the device along the lumen 104.

As another example, in the first variation of materials, the ePTFE in layer 306 can comprise axial ePTFE (e.g., without radial ePTFE). For tubes 160 with axial ePTFE (e.g., in layer 306) instead of radial ePTFE, the axial ePTFE can allow the tube 160 to axially stretch as a device is advanced along the lumen 104, for example, if the PTFE in layer 302, a reinforcement (e.g., reinforcement 310), or a material in another layer does not prevent it.

The ePTFE in layer 306 (e.g., axial ePTFE or radial ePTFE) can strengthen the tube 160 by adding to its overall thickness (e.g., thicknesses T1 and T2), for example, as opposed to having only layers 302 and 304 in FIGS. 7A-7D without layer 306. As another example, the ePTFE in layer 306 can provide the tube 160 with a low friction outer surface such that the ePTFE can eliminate the need or desire for a hydrophilic coating on the outer surface of the tube 160. For example, the ePTFE can have a lower coefficient of friction than the coefficient of friction of the fluoroelastomer in layer 304. Although the ePTFE can eliminate the need or desire for a hydrophilic outer coating, as another example, layer 306 can have a hydrophilic outer coating to further reduce the friction on the outer surface of the tube 160.

In a second variation of materials, for example, for the tube 160 in FIGS. 7A-7D, one of the layers can comprise a fluoroelastomer, one of the layers can comprise ePTFE, and one of the layers can comprises ePTFE (i.e., two of the layers of the tube 160 can comprise ePTFE). The type of ePTFE in the two ePTFE layers can be the same or different from each other, for example, axial ePTFE and/or radial ePTFE. For example, FIGS. 7A-7D illustrate that layer 302 can comprise ePTFE, layer 304 can comprise a fluoroelastomer, and layer 306 can comprise ePTFE such that the fluoroelastomer is sandwiched (e.g., circumferentially sandwiched) between two ePTFE layers. The ePTFE in layer 302 can be radial ePTFE or axial ePTFE, and the ePTFE in layer 306 can be radial ePTFE or axial ePTFE. A tube 160 with this combination of material layers can provide unique advantages. For example, with the combination of materials in this exemplary second variation of materials, layer 302 can be softer than layer 302 in the first variation of materials, which can reduce the force needed to radially expand the tube 160 for the second variation of materials as compared to the first variation of materials, layer 304 can inhibit or prevent the reinforcement 308 from delaminating and slipping between layers 302 and 306, and layer 306 can be the same or different material as layer 302. Layer 302 can be an inner ePTFE layer and layer 306 can be an outer ePTFE layer. ePTFE is a softer material than, for example, the PTFE in the first variation of materials. The ePTFE in the second variation of materials (e.g., in layer 302) can thereby take less force to expand than the PTFE in the first variation of materials (e.g., in layer 302). The use of ePTFE in layer 302 in the second variation of materials can thereby provide a lower insertion force for an oversized instrument being slid through the tube 160 than the PTFE in layer 302 in the first variation of materials. The device being advanced through the lumen 104 can be, for example, an oversized device or oversized instrument (e.g., such as another catheter, an endoscope, a sensor, an implant). Thus, while the PTFE layer in the first variation of materials (e.g., layer 302) provides advantages, the ePTFE layer in the second variation of materials (e.g., layer 302) also provides advantages.

The inner ePTFE layer (e.g., the layer 302) can comprise axial ePTFE and/or radial ePTFE. Radial ePTFE can reduce the force needed to radially expand the tube 160 and the force needed to push the device along the lumen 104, for example, relative to arrangements in which the layer 302 comprises PTFE or any other material harder than ePTFE. Axial ePTFE can reduce the force needed to axially expand the tube 160 and the force needed to push the device along the lumen 104, for example, relative to arrangements in which the layer 302 comprises PTFE or any other material harder than ePTFE. Moreover, a layer (e.g., an inner layer) of radial ePTFE can reduce the force needed to radially expand the tube 160, for example, compared to a layer (e.g., an inner layer) of axial ePTFE, and a layer (e.g., an inner layer) of axial ePTFE can reduce the force needed to axially expand the tube 160, for example, compared to a layer (e.g., an inner layer) of radial ePTFE.

The fluoroelastomer layer (e.g., layer 304) in the second variation of materials can provide the same benefits as described in relation to the fluoroelastomer layer (e.g., layer 304) in the first variation of materials.

The outer ePTFE layer (e.g., the layer 306) can comprise axial ePTFE or radial ePTFE. In both cases, this layer can strengthen the tube 160 by adding to its overall thickness (e.g., thicknesses T1 and T2), for example, as opposed to having only layers 302 and 304 in FIGS. 7A-7D without layer 306, and can provide the tube 160 with a low friction outer surface such that the ePTFE can eliminate the need or desire for a hydrophilic coating on the outer surface of the tube 160. As another example, as described above, the outer surface of layer 306 can be coated with a hydrophilic material to further reduce the friction on the outer surface of the tube 160.

For tubes 160 having an axial ePTFE layer and a radial ePTFE layer, for example, axial ePTFE in layer 302 and radial ePTFE in layer 306, or vice versa, as shown in FIGS. 7A-7D, or in any two other layers (e.g., in layers 302 and 304, respectively, or in layers 304 and 306, respectively), the radial ePTFE can reduce the force needed to radially expand the tube and the axial ePTFE can reduce the force need to axially expand the tube, whereby the radial ePTFE can resist axial expansion of the tube 160 as a device (e.g., 329) is advanced along the lumen 104, and whereby the axial ePTFE can resist radial expansion of the tube 160 as a device (e.g., device 329) is advanced along the lumen 104. For tubes 160 with both an axial ePTFE layer and a radial ePTFE layer, for example, axial ePTFE in layer 302 and radial ePTFE in layer 306, or vice versa, the tube 160 can thereby be easier to radially expand than if both layers 302 and 306 comprise axial ePTFE, and the tube 160 can thereby be easier to axially expand than if both layers 302 and 306 comprise radial ePTFE.

For tubes 160 having a radial ePTFE layer and for tubes 160 having an axial ePTFE layer and a radial ePTFE layer, for example, axial ePTFE in layer 302 and radial ePTFE in layer 306, or vice versa, or in any two other layers (e.g., in layers 302 and 304, respectively, or in layers 304 and 306, respectively), the radial ePTFE can inhibit or prevent axial elongation of the tube 160 as a device (e.g., device 329) is advanced along the lumen 104, which can eliminate the need or desire for a reinforcement (e.g., the reinforcement 310) that inhibits or prevents axial stretching of the tube 160 as a device (e.g., device 329) is passed through the tube 160 in the lumen 104. This can allow devices that have diameters larger than the tube 160 to be advanced along the lumen 104 without a reinforcement 310 in the wall of the tube 160. As a device is advanced along the lumen 104, the radial ePTFE can allow the device to cause radial expansion of the tube 160 but can inhibit or prevent the device from axially expanding the tube 160. Since the radial ePTFE can inhibit axial expansion but allow radial expansion of the tube 160, the radial ePTFE can eliminate the need or desire for the reinforcement 310 (e.g., braid or spiral wrap) in one of the layers (e.g., layer 302, 304, or 306). In other words, the radial ePTFE in the tube 160 (e.g., in layer 302 and/or in layer 306 as shown in FIGS. 7A-7D), can inhibit or prevent the device being advanced in the lumen 104 from pushing the portion of the tube 160 that is distal the tip of the device away from the portion of the tube 160 that is proximal the tip of the device, which can thereby limit or prevent axial elongation of the tube 160 as the tube 160 radially expands. Radial ePTFE in the tube 160 can thereby reduce the axial forces exerted by the tube 160 against a blood vessel during insertion and withdrawal of a device (e.g., device 329) from the lumen 104, for example, by reducing or eliminating axial expansion and axial contraction of the tube 160 as the device is advanced and withdrawn from the tube 160. This can in turn reduce or eliminate axial tension and/or axial compression of the blood vessel caused by the tube 160. Reducing or eliminating axial tension and/or axial compression of the blood vessel can reduce the risk of the tube 160 causing an embolism as a device (e.g., device 329) is advanced and withdrawn from the lumen 104.

The radial ePTFE layer (e.g., layer 302, layer 304, and/or layer 306), for example, in the first and second variations of materials can thereby resist axial tension as the tube 160 radially expands as a device is advanced longitudinally in the lumen 104. For example, the radial ePTFE can limit axial expansion of the tube 160 as the tube 160 radially expands (e.g., from diameter d1 to diameter d2) as a device is advanced along the lumen 104. The radial ePTFE can, for example, allow the tube 160 to axially expand as the device is advanced along the lumen 104 up to the axial expansion limit of the radial ePTFE but can inhibit or prevent further axial expansion beyond the axial expansion limit. The axial expansion limit of radial ePTFE can be less than the axial expansion limit of axial ePTFE. In other words, radial ePTFE can limit axial expansion more than axial ePTFE. Permitting such axial expansion of radial ePTFE, for example, up to the axial expansion limit, as opposed to completely preventing axial expansion of radial ePTFE, can reduce the risk of the inner layer (e.g., layer 302) being torn or punctured by the device as the device is axially advanced in the lumen 104 and can eliminate the need or desire for the reinforcement 310. As another example, the radial ePTFE layer (e.g., layer 302 and/or the layer 306) can prevent axial expansion of the tube 160 as the tube 160 is radially expanded by the device. Although the radial ePTFE can eliminate the need or desire for the reinforcement 310, as another example, the reinforcement 310 (e.g., a braid or spiral wrap) can be embedded in one of the layers (e.g., in layer 302, 304, or 306). In such cases, the reinforcement 310 can transmit torque, can reduce or prevent the axial expansion of the tube 160 that may otherwise be allowed by radial ePTFE and/or axial ePTFE in the tube 160, and can reduce the load placed on radial ePTFE and/or axial ePTFE in the tube 160. The reinforcement 310 can thereby reduce or eliminate the axial stretchability of the tube 160, or can assist the radial ePTFE in reducing or eliminating the axial stretchability of the tube 160.

For tubes 160 with radial ePTFE in layer 302, the radial ePTFE can inhibit or prevent wrinkles and/or folds from forming when the tube 160 radially contracts from a radially expanded state (e.g., FIG. 7B) to a non-expanded state (e.g., FIG. 7A), for example, from diameter d2 to diameter d1, when a device is withdrawn from the lumen 104. For example, relative to axial ePTFE in layer 302, radial ePTFE in layer 302 can inhibit wrinkles and/or folds from forming or can decrease the size and/or number of wrinkles and/or folds that form when the tube 160 radially contracts from a radially expanded state (e.g., from diameter d2 to diameter d1).

For tubes 160 with axial ePTFE in both layer 302 and layer 306, the tube 160 can axially expand as a device is advanced along the lumen 104, for example, if the tube 160 does not have the reinforcement 310. As another example, FIGS. 10A-12H illustrate that the tube 160 can have the reinforcement 310 that can prevent axial expansion and/or that can limit axial expansion of the tube 160 to the axial expansion limit of the reinforcement 310).

For tubes 160 with radial ePTFE in both layer 302 and layer 306, the tube 160 can be can radially expand as a device is advanced along the lumen 104 but the radial ePTFE can inhibit or prevent the tube 160 from axially expanding. As another example, the radial ePTFE in layers 302 and 306 can limit axial expansion of the tube 160 to the axial expansion limit of the reinforcement 310.

The ePTFE in layer 302 and/or layer 306 (e.g., axial ePTFE or radial ePTFE) can strengthen the tube 160 by adding to its overall thickness (e.g., thickness T1), for example, as opposed to having only layers 302 and 304 or only layers 304 and 306 in FIGS. 7A-7D, and which can be other variations of the tube 160. The ePTFE in layer 302 can provide the tube 160 with a low friction inner surface such that the ePTFE can eliminate the need or desire for a hydrophilic coating on the inner surface of the tube 160. For example, the ePTFE can have a lower coefficient of friction than the coefficient of friction of the fluoroelastomer in layer 304. While the ePTFE can eliminate the need or desire for a hydrophilic inner coating, as another example, layer 302 can have a hydrophilic inner coating to further reduce the friction on the inner surface of the tube 160.

The ePTFE in layer 306 can provide the tube 160 with a low friction outer surface such that the ePTFE can eliminate the need or desire for a hydrophilic coating on the outer surface of the tube 160. For example, the ePTFE can have a lower coefficient of friction than the coefficient of friction of the fluoroelastomer in layer 304. While the ePTFE can eliminate the need or desire for a hydrophilic outer coating, as another example, layer 306 can have a hydrophilic outer coating to further reduce the friction on the outer surface of the tube 160.

In a third variation of materials for the tube 160 in FIGS. 7A-7D, one of the layers can comprise ePTFE and two of the layers can comprise a fluoroelastomer. For example, FIGS. 7A-7D illustrate that the layer 302 can comprise ePTFE, the layer 304 can comprise a fluoroelastomer, and the layer 306 can comprise a fluoroelastomer. The ePTFE in layer 302 can be radial ePTFE and/or axial ePTFE depending on the direction of stretch that is desired (e.g., radial ePTFE when a tube expandable in the radial direction is desired, and axial ePTFE when a tube expandable in the axial direction is desired). The fluoroelastomer in layer 304 can be the same or different as the fluoroelastomer in layer 306. The fluoroelastomer can have a higher coefficient of friction than the ePTFE in layer 302 such the coating 314 shown in FIGS. 7A-7D can be beneficial on the outer surface of the fluoroelastomer in layer 306 to reduce the coefficient of friction on the outer surface of the tube 160. The coating 314 can be, for example, a hydrophilic coating. As another example, the tube 160 may not have the coating 314.

FIGS. 7A-7D illustrate that the liner can comprise layer 302, and that the jacket can comprise layers 304 and/or 306. The thickness and functions of the liner and the jacket can depend on the materials in the wall of the tube 160. For example, for the first material variation of materials in which layer 302 comprises PTFE, since the PTFE is less elastic than the ePTFE, layer 302 can be less thick than layer 306 so that layer 302 can provide lubricity while not overly restricting the elastic properties of the ePTFE in layer 306. The PTFE layer can thereby provide lubricity and also resist tearing or being punctured from an oversized device as a device is advanced in the lumen 104.

FIG. 7A illustrates the tube 160 in a non-expanded state before expansion. For example, FIG. 7A illustrates the reinforcement 308 in a non-expanded state. The non-expanded state can be a neutral state or a contracted state.

FIG. 7B illustrates the tube 160 in an expanded state after expansion. The expanded state in FIG. 7B can be a partially expanded state or a fully expanded state. For example, FIG. 7B illustrates the reinforcement 308 in an expanded state. In a first example, FIG. 7B illustrates the reinforcement 308 in a partially expanded state. The reinforcement 308 can be considered to be in a fully expanded state, for example, when the angle 345 between adjacent arms 344*a* is closer to 180 degrees, for example, 170 degrees to 180 degrees. In a second example, FIG. 7B illustrates the reinforcement 308 in a fully expanded state.

FIGS. 7A and 7B illustrate a portion of the tube 160 transparent for illustrative purposes, for example, so that the layered arrangement of the tube 160 can be more easily visualized, and so that the reinforcement 308 in the tube 160 can be more easily visualized. For example, FIGS. 7A and 7B illustrate layer 304 and layer 306 transparent. FIGS. 7B and 7D illustrate the device 329 transparent for illustrative purposes so that the tube 160 and its various features can be more easily seen.

FIGS. 7A and 7B illustrate that the reinforcement 308 can extend helically around the lumen 104 when the tube 160 is in the non-expanded state (e.g., FIG. 7A) and when the tube 160 is in the expanded state (e.g., FIG. 7B).

Figure 7C:
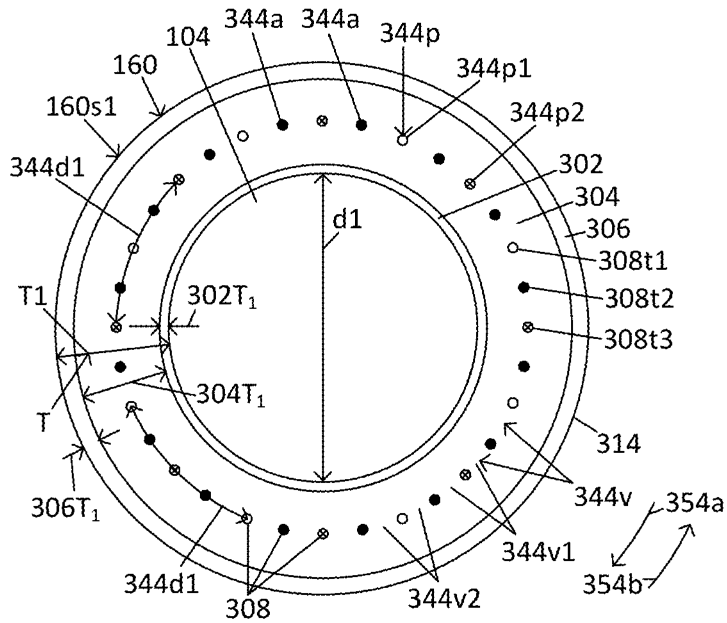
FIG. 7C illustrates a cross-sectional view of the tube of FIG. 7A taken along line 7C-7C.
Figure 7D:
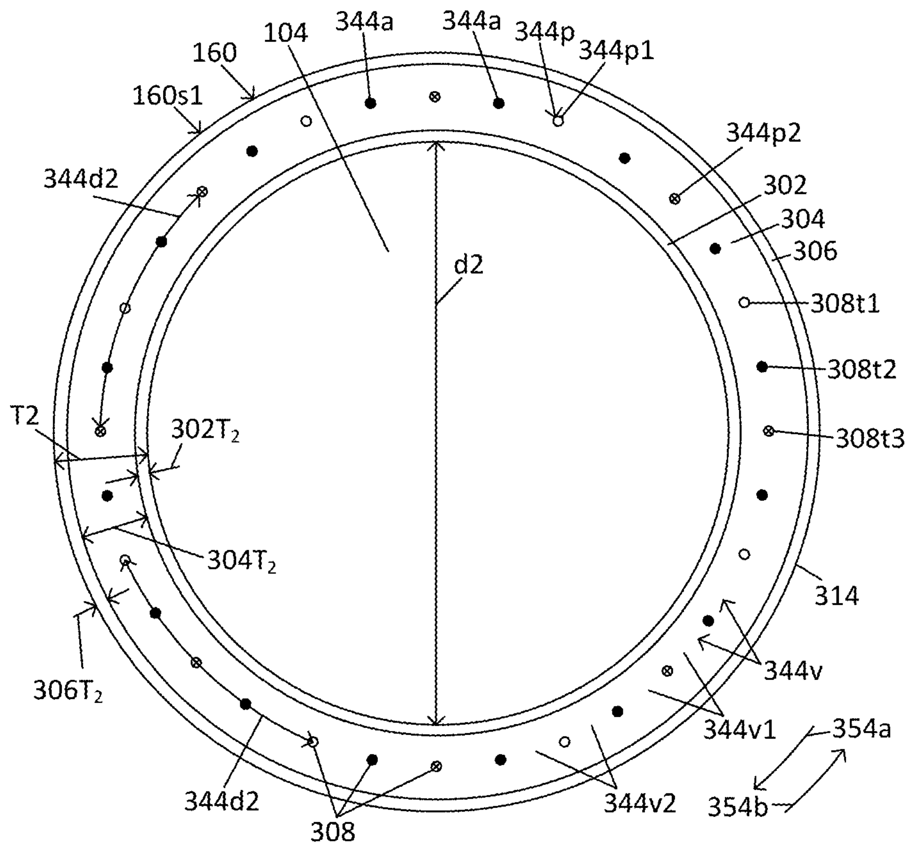
FIG. 7D illustrates a cross-sectional view of the tube of FIG. 7B taken along line 7D-7D.

FIGS. 7C and 7D illustrate exemplary cross-sections of the tube 160. FIGS. 7C and 7D illustrate that cross-sections of the tube 160 can pass through multiple turns 308*t*, for example, when the peaks 344*p* are in the valleys 344*v*. For example, the cross-sections shown in FIGS. 7C and 7D taken along lines 7C-7C and 7D-7D in FIGS. 7A and 7B, respectively, show that lines 7C-7C and 7D-7D can pass through multiple turns 308*t*, for example, a first turn 308*t*1, a second turn 308*t*2, and a third turn 308*t*. The first turn 308*t* can be adjacent the second turn 308*t*2, the second turn 308*t*2 can be adjacent the third turn 308*t*3, and the second turn 308*t*2 can be between the first and second turns 308*t*1, 308*t*2. The first, second, and third turns 308*t*1, 308*t*2, 308*t*3 can be three consecutive turns 308*t* of the reinforcement 308. FIGS. 7A-7D illustrate that lines 7C-7C and 7D-7D can pass through the peaks 344*p* (e.g., the first peaks 344*p*1) of the first turn 308*t*1, that lines 7C-7C and 7D-7D can pass through the arms 344*a* of the second turn 308*t*2, and that lines 7C-7C and 7D-7D can pass through the peaks 344*p* (e.g., the second peaks 344*p*2) of the third turn 308*t*3. In FIGS. 7C and 7D, the hollow circles in layer 304 can be the peaks 344*p* (e.g., the first peaks 344*p*1) of the first turn 308*t*1, the solid circles in layer 304 can be the arms 344*a* of the second turn 308*t*2, and the circles with cross-hatching, or X's, can be the peaks 344*p* (e.g., the second peaks 344*p*2) of the third turn 308*t*3. In FIGS. 7C and 7D, the spaces between the circles (i.e., between the reinforcement 308) in layer 304 can be valleys 344*v*, for example, the first and second valleys 3441, 344*v*2 that lines 7C-7C and 7D-7D pass through in FIGS. 7A and 7B, respectively. For example, the spaces that are shown adjacent the hollow circles in layer 304 in FIGS. 7C and 7D can be second valleys 344*v*2, and the spaces that are shown adjacent the circles having cross-hatching in layer 304 in FIGS. 7C and 7D can be first valleys 344*v*1.

FIGS. 7A and 7C illustrate that the tube 160 can have the arrangement of features shown when the tube 160 is in the non-expanded state. For example, FIGS. 7A and 7C illustrate that the lumen 104, the layer 302, the layer 304, the layer 306, and the reinforcement 308 can have the arrangement shown, including the relative positions between these features, when the tube 160 is in the non-expanded state.

FIGS. 7B and 7D illustrate that the tube 160 can have the arrangement of features shown when the tube 160 is in the expanded state. For example, FIGS. 7B and 7D illustrate that the lumen 104, the layer 302, the layer 304, the layer 306, and the reinforcement 308 can have the arrangement shown, including the relative positions between these features, when the tube 160 is in the expanded state.

FIGS. 7C and 7D illustrate that the tube 160 can have a circular cross-section when the tube 160 is in the non-expanded state (e.g., FIG. 7C) and when the tube 160 is in the expanded state (e.g., FIG. 7D). FIGS. 7C and 7D illustrate that the layers 302, 304, and 306 can have circular cross-sections when the tube 160 is in the non-expanded state (e.g., FIG. 7C) and when the tube 160 is in the expanded state (e.g., FIG. 7D).

FIGS. 7C and 7D illustrate that the reinforcement 308 can be between the inner and outer surface of the middle layer (e.g., layer 304) when the tube 160 is in the non-expanded state (e.g., FIG. 7C) and when the tube 160 is in the expanded state (e.g., FIG. 7D).

FIGS. 7C and 7D illustrate that the reinforcement 308 can be between the outer surface of the inner layer (e.g., layer 302) and the inner surface of the outer layer (e.g., layer 306) when the tube 160 is in the non-expanded state (e.g., FIG. 7C) and when the tube 160 is in the expanded state (e.g., FIG. 7D).

FIGS. 7C and 7D illustrate that layer 302, layer 304, reinforcement 308, and layer 306 can have the concentric arrangement shown in FIGS. 7C and 7D when the tube 160 is in the non-expanded state (e.g., FIG. 7C) and when the tube 160 is in the expanded state (e.g., FIG. 7D).

FIGS. 7C and 7D illustrate that the reinforcement 308 can be a uniform distance from the lumen 104 when the tube 160 is in the non-expanded state (e.g., FIG. 7C) and when the tube 160 is in the expanded state (e.g., FIG. 7D).

FIGS. 7A-7D illustrate that layer 302 may not have any folds when the tube 160 is in the non-expanded state (e.g., FIG. 7C) and when the tube 160 is in the expanded state (e.g., FIG. 7D). This can reduce the friction against the device in the lumen 104, and can reduce the friction between the tube 160 and a blood vessel wall. As another example, layer 302 can have folds when the tube 160 is in the non-expanded state (e.g., FIGS. 7A and 7C) and/or when the tube 160 is in the expanded state (e.g., FIGS. 7B and 7D).

FIGS. 7A-7D illustrate that the wall of the tube 160 can have thickness T, for example, a thickness T1 and a thickness T2. FIG. 7C illustrates that the tube 160 can have a thickness T1 (also referred to as a first thickness T1) when the tube 160 is in an unexpanded configuration, and FIG. 7D illustrates that the tube 160 can have a thickness T2 (also referred to as a second thickness T2) when the tube 160 is in an expanded configuration. The first thickness T1 can be equal to or less than the second thickness T2. The one or multiple layers of the tube 160 can have various thicknesses, for example, as measured along a straight axis, for example, a radial axis, that perpendicularly extends from a longitudinal axis of the tube 160 (e.g., the center longitudinal axis Ax of the tube 160). The layers can have the same or different thicknesses as each other. For example, layer 302 can be 0.001 to 0.005 inches thick, layer 304 can be 0.004 to 0.020 inches thick, and layer 306 can be 0.004 to 0.020 inches thick such that the thickness T1 of the wall of the tube 160 can have a total thickness of 0.009-0.045 inches when the tube 160 is in the non-expanded state, excluding the thickness of the inner and/or outer coating. The thickness of each layer can depend on the material combination in in the wall of the tube 160. The thickness T2 can be the same as or substantially the same as the thickness T1. The thickness T2 can be considered substantially the same as the thickness T1, for example, if the thickness T2 is within 0.005 inches of the thickness T1. For example, FIGS. 7A-7D illustrate that the thickness T1 can be 0.040 to 0.050 inches and that the thickness T2 can be 0.040 to 0.050 inches (e.g., the same as the thickness T1) or can be 0.035 to 0.055 inches (e.g., substantially the same as the thickness T1). As another example, the thickness T2 can be 0.005 inches to 0.100 inches less than the thickness T1, including every 0.001 inch increment within this range (e.g., 0.005 inches, 0.040 inches, 0.080 inches, 0.100 inches).

FIGS. 7A and 7C illustrate that the tube 160 can have diameter d1 (also referred to as a first diameter d1) when the tube 160 is in a relaxed, or unexpanded configuration, and FIGS. 7B and 7D illustrate that the tube 160 can have diameter d2 (also referred to as a second diameter d2) when the tube 160 is in an expanded configuration (e.g., a partially expanded configuration or a fully expanded configuration). FIGS. 7A and 7C illustrate that the first diameter d1 can be, for example, from about 5 mm to about 30 mm, including every 1 mm increment within this range, and FIGS. 7B and 7D illustrate that the second diameter d2 can be, for example, from about 5 mm to about 35 mm, including every 1 mm increment within this range. The difference between the first and second diameters d1, d2 can be the width (e.g., the diameter) of the device (e.g., device 329) being inserted into and withdrawn from the lumen 104. The difference between the first and second diameters d1, d2 can be, for example, 0 mm to 30 mm, including every 1 mm increment within this range (e.g., 0 mm, 10 mm, 20 mm, 30 mm). For example, FIGS. 7A-7D illustrate that the second diameter d2 can be double or about double the first diameter d1 (e.g., such that the second diameter d2 is 100% larger than the first diameter d1). The difference between the first and second diameters d1, d2 can be 0.00 mm for example, if the device advanced in the lumen 104 is less than the diameter d1.

FIGS. 7B and 7D illustrate for example, that the thickness of the reinforcement 308 can be less than half of the thickness T1 and less than half of the thickness T2.

Layers 302, 304, and 306 can be rearranged in any order. For example, the positions of layers 302 and 306 can be swapped with each other such that layer 306 can be the innermost layer and layer 302 can be the outer most layer. As another example, layers 304 and 306 can be swapped with each other such that layer 304 can be the outermost layer. As yet another example, layers 302 and 304 can be swapped with each other such that layer 304 can be the innermost layer. For variations in which layer 304 is the innermost layer, the fluoroelastomer can have a higher coefficient of friction than the PTFE or ePTFE in layer 302 such an inner coating (e.g., an inner hydrophilic coating) can be beneficial on the inner layer of fluoroelastomer in layer 304. As yet additional examples, layer 302 can be omitted from the tube 160, layer 304 can be omitted from the tube 160, and/or layer 306 can be omitted from the tube 160 such that the tube 160 can have any one or two of the layers shown in FIGS. 7A-7D.

The design shown in FIGS. 7A-7D can extend along any length of the tube 160. For example, the design shown in FIGS. 7A-7D can extend along the entire length 160L (e.g., 100% of the length 160L) or along any length of the tube 160 less than the full length 160L, including, for example, 1% to 99% of the length 160L, including every 1% increment within this range (1%, 10%, 25%, 50%, 75%, 99%). For example, the features shown in section **160*s*1 in FIGS. 7A-7D can continue from the proximal end 160*p* of the tube 160 (e.g., from a proximal terminal end of the tube 160) to the distal end 160*d* of the tube 160 (e.g., to a distal terminal end of the tube 160). In other words, the tube 160 proximal and distal the section 160*s*1 can have the features shown in FIGS. 7A-7D. As another example, the proximal end 160*p* of the tube 160 can be the proximal 50% of the tube 160, the distal end 160*d* of the tube 160 can be the distal 50% of the tube 160, the distal end 160*d* of the tube 160 can have the design in FIGS. 7A-7D, and the proximal end 160*p* can have a different design with or without the same or different reinforcement 308**.

FIGS. 8A-8D illustrate a variation of the tube 160. For example, FIGS. 8A-8D illustrate the tube 160 in FIGS. 7A-7D with a different reinforcement 308 than the reinforcement 308 shown in FIGS. 7A-7D. For example, whereas FIGS. 7A-7D illustrate that the reinforcement 308 can have a nested configuration (e.g., when the tube 160 is in a non-expanded state and when the tube 160 is in an expanded state), FIGS. 8A-8D illustrate that the reinforcement 308 can have a non-nested configuration (e.g., when the tube 160 is in a non-expanded state and when the tube 160 is in an expanded state). FIG. 8A illustrates a closeup of the tube 160 at section S5 in FIG. 6A, and FIG. 8B illustrates a closeup of the tube 160 at section S6 in FIG. 6C. The reinforcement 308 can be considered to have a nested configuration when a peak **344*p* is inside a valley 344*v*, and the reinforcement 308 can be considered to have a non-nested configuration when a peak 344*p* is outside a valley 344*v***.

FIGS. 8A-8D illustrate that the profile 338 of the reinforcement 308 can define a gap 347 between peaks and valleys **344*p*, 344*v* of adjacent turns 308*t*. The gap 347 can define a distance 348 between the peaks and valleys 344*p*, 344*v*, for example, between the peaks and valleys 344*p*, 344*v* of adjacent turns 308*t*. The distance 348 can be the length of the gap 347, for example, along an axis parallel to the axis 344*x*. The gap 347 can, for example, extend helically around the lumen 104. The distance 348 can be, for example, the perpendicular distance or the distance along the axis 344*x* between adjacent peaks and valleys 344*p*, 344*v***.

FIGS. 8A and 8B illustrate that the distance 348 can increase from a first distance **348*a* to a second distance 348*b* when the tube 160 is expanded from a non-expanded state to an expanded state, and that the distance 348 can decrease from the second distance 348*b* to the first distance 348*a* when the tube 160 is contracted from the expanded state to the non-expanded state. When the tube 160 is in the non-expanded state (e.g., FIG. 8A), the first distance 348*a* can be, for example, 1 mm to 15 mm, including every 1 mm increment within this range (e.g., 1 mm, 2 mm, 5 mm, 10 mm, 15 mm). When the tube 160 is in the expanded state (e.g., FIG. 8B), the second distance 348*b* can be, for example, 1 mm to 20 mm, including every 1 mm increment within this range (e.g., 1 mm, 2 mm, 5 mm, 10 mm, 15 mm, 20 mm). The difference between the second distance 348*b* when the tube 160 is in the expanded state (e.g., FIG. 8B) compared to the first distance 348*a* when the tube 160 is in the non-expanded state (e.g., FIG. 8A) can be, for example, 1 mm to 15 mm, including every 1 mm increment within this range (e.g., 1 mm, 5 mm, 10 mm, 15 mm). For example, FIGS. 8A and 8B illustrate that the difference between the first and second distances 348*a*, 348*b* can be 2 mm. When the difference between the first and second distances 348*a*, 348*b* is 0 mm, the distance 348 does not change when the tube 160 expands and contracts. In other words, the distance 348 may not increase when the tube 160 is expanded. The second distance 348*b* can be, for example, the same as the first distance 348*a***.

FIGS. 7A-8D illustrate that adjacent turns 308t of the reinforcement 308 may not contact each other, for example, when the tube 160 is in a straight (e.g., non-curved), unexpanded configuration and when the tube 160 is in a straight (e.g., non-curved), expanded configuration.

FIGS. 7A-8D illustrate variations of the reinforcement 308 having, for example, peak-to-valley configurations, where FIGS. 7A-7D illustrate a nested peak-to-valley configuration and where FIGS. 8A-8D illustrate a non-nested peak-to-valley configuration. For peak-to-valley configurations, the peaks 344p can be aligned with the valleys 344v. FIGS. 7A-8D illustrate, for example, that the reinforcement 308 can have a profile 338 (e.g., helical profile) which wraps around the lumen 104 such that there can be a valley 344v between two adjacent peaks 344p. The adjacent peaks 344p can be on adjacent turns 308t. For example, one of the peaks 344p can be on a first turn 308t (e.g., the first turn 308t1 in FIGS. 7A and 7B) and one of the peaks 344p can be on a second turn 308t (e.g., the second turn 308t2 in FIGS. 7A and 7B), whereby a valley 344v can be between these two adjacent peaks 344p. For example, FIGS. 7A-8D illustrate that adjacent peaks 344p can lie along the axes 344x such that a valley 344v can be between adjacent peaks 344p along the axes 344x (e.g., FIGS. 7A and 7B) or such that a valley 344 and a gap 347 can be between adjacent peaks 344p along the axes 344x (e.g., FIGS. 8A and 8B). For example, FIGS. 7A-8D illustrate first peaks 344p1 can be aligned along the first axis 344x1 such that second valleys 344v2 can be between adjacent first peaks 344p1 along the first axis 344x1 (e.g., FIGS. 7A and 7B) or such that second valleys 344v2 and gaps 347 can be between adjacent first peaks 344p1 along the first axis 344x1 (e.g., FIGS. 8A and 8B). As another example, FIGS. 7A-8D illustrate that second peaks 344p2 can be aligned along the second axis 344x2 such that a first valley 344v1 can be between adjacent second peaks 344p2 along the second axis 344x2 (e.g., FIGS. 7A and 7B) or such that a first valley 344v1 and a gap 347 can be between adjacent second peaks 344p2 along the second axis 344x2 (e.g., FIGS. 8A and 8B). The peak-to-valley arrangements in FIGS. 7A-8D can make bending the tube 160 easier than, for example, peak-to-peak arrangements in which adjacent peaks 344p are in contact with each other or are otherwise aligned with each other such that there are no valleys 344v between adjacent peaks 344p.

FIG. 8A illustrates the tube 160 in a non-expanded state before expansion. For example, FIG. 8A illustrates the reinforcement 308 in a non-expanded state. The non-expanded state can be a neutral state or a contracted state.

FIG. 8B illustrates the tube 160 in an expanded state after expansion. The expanded state in FIG. 8B can be a partially expanded state or a fully expanded state. For example, FIG. 8B illustrates the reinforcement 308 in an expanded state.

FIGS. 8A and 8B illustrate a portion of the tube 160 transparent for illustrative purposes, for example, so that the layered arrangement of the tube 160 can be more easily visualized, and so that the reinforcement 308 in the tube 160 can be more easily visualized. For example, FIGS. 8A and 8B illustrate layer 304 and layer 306 transparent. FIGS. 7B and 7D illustrate the device 329 transparent for illustrative purposes so that the tube 160 and its various features can be more easily seen.

Figure 8C:
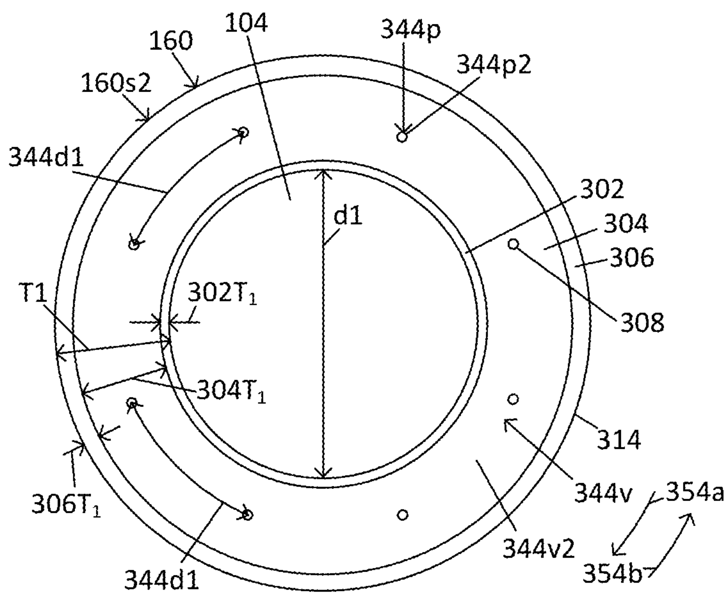
FIG. 8C illustrates a cross-sectional view of the tube of FIG. 8A taken along line 8C-8C.
Figure 8D:
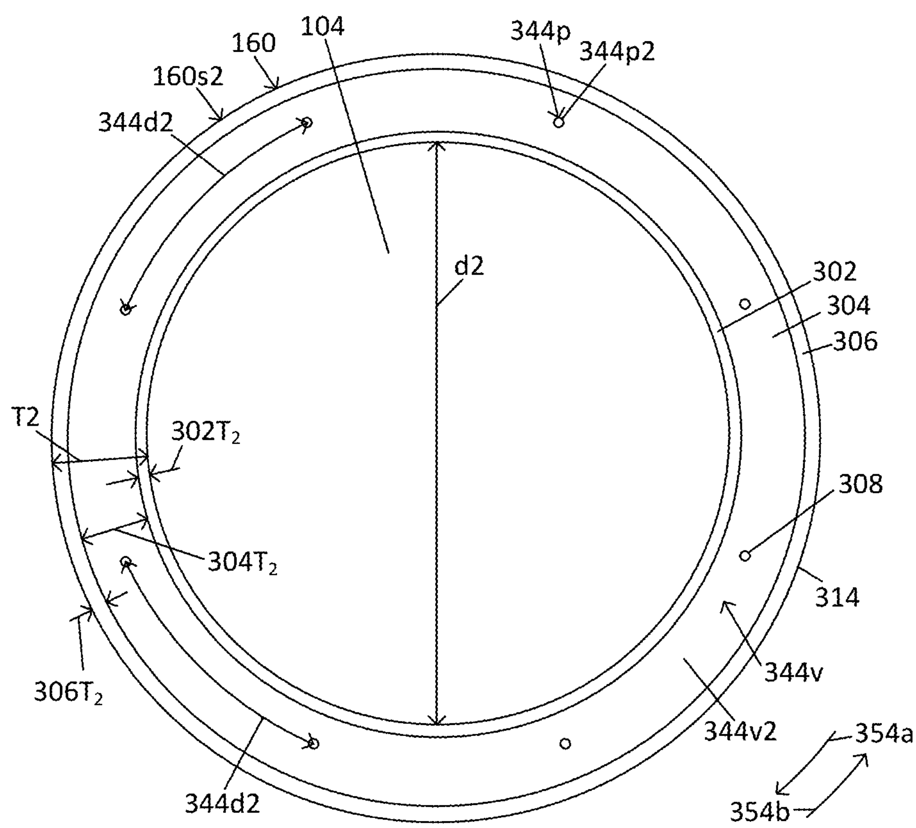
FIG. 8D illustrates a cross-sectional view of the tube of FIG. 8B taken along line 8D-8D.

FIGS. 8A and 8B illustrate that the reinforcement 308 can extend helically around the lumen 104 when the tube 160 is in the non-expanded state (e.g., FIGS. 8A & 8C) and when the tube 160 is in the expanded state (e.g., FIGS. 8B & 8D).

FIGS. 8A and 8C illustrate that the tube 160 can have the arrangement of features shown when the tube 160 is in the non-expanded state. For example, FIGS. 8A and 8C illustrate that the lumen 104, the layer 302, the layer 304, the layer 306, and the reinforcement 308 can have the arrangement shown, including the relative positions between these features, when the tube 160 is in the non-expanded state.

FIGS. 8B and 8D illustrate that the tube 160 can have the arrangement of features shown when the tube 160 is in the expanded state. For example, FIGS. 8B and 8D illustrate that the lumen 104, the layer 302, the layer 304, the layer 306, and the reinforcement 308 can have the arrangement shown, including the relative positions between these features, when the tube 160 is in the expanded state.

Figure 9A:
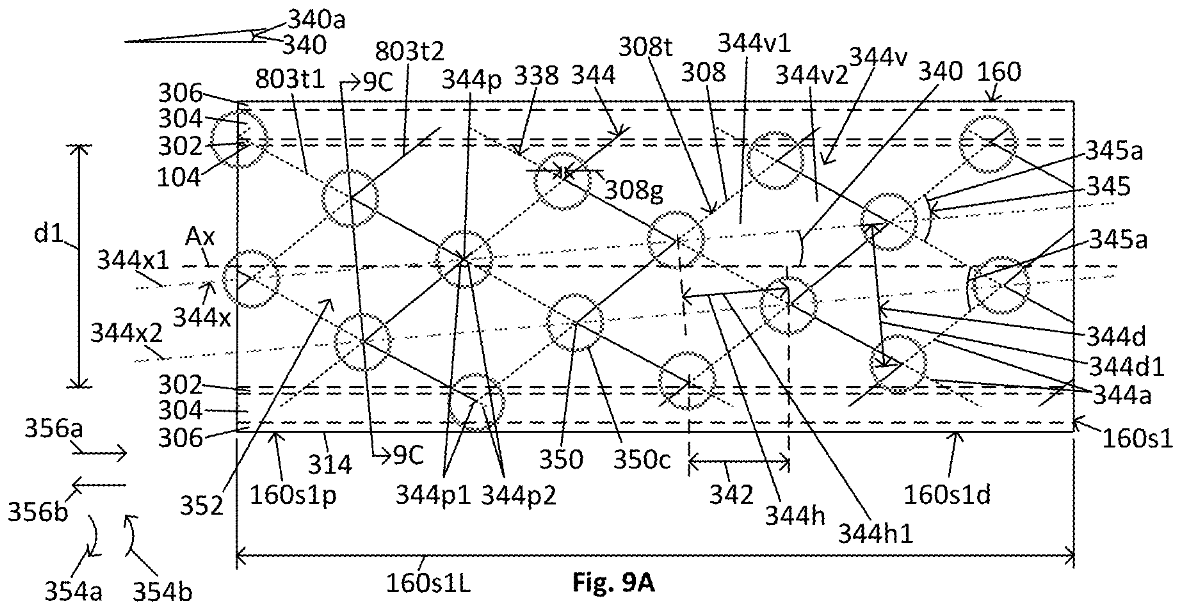
FIG. 9A is a closeup side view of the tube of FIG. 6A at section S1, for example, when the tube is in a non-expanded configuration.
Figure 9B:
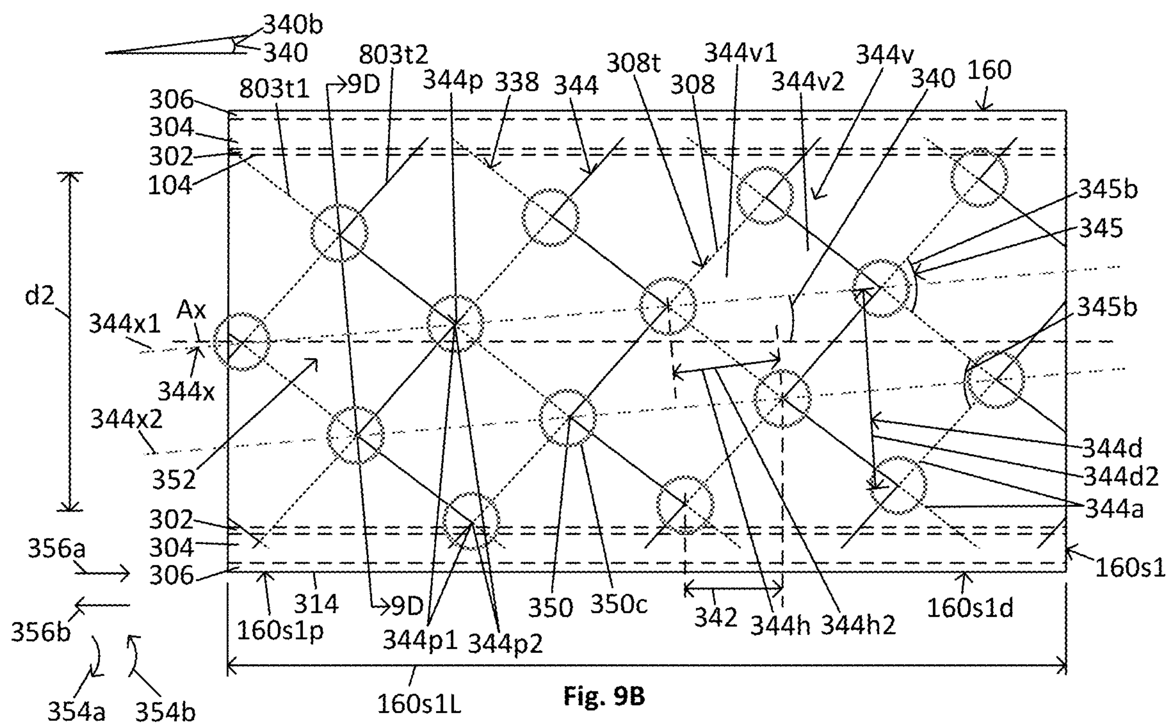
FIG. 9B is a closeup side view of the tube of FIG. 6C at section S2 after the tube is expanded, for example, when the tube is in an expanded configuration.
Figure 9C:
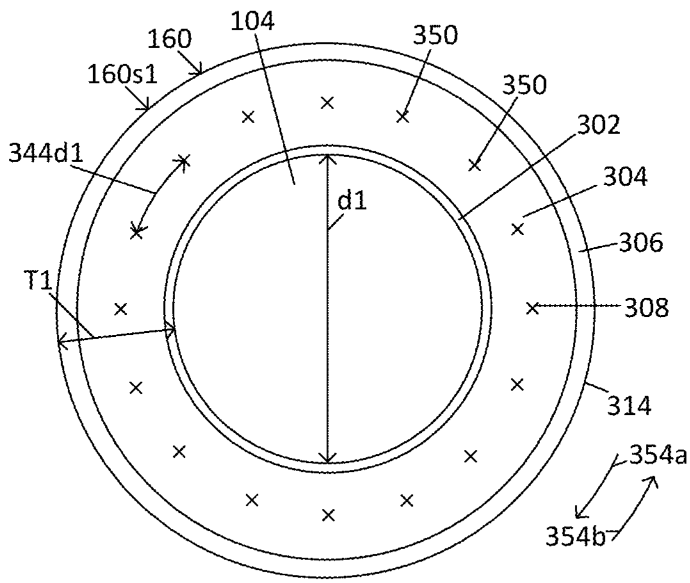
FIG. 9C illustrates a cross-sectional view of the tube of FIG. 9A taken along line 9C-9C.
Figure 9D:
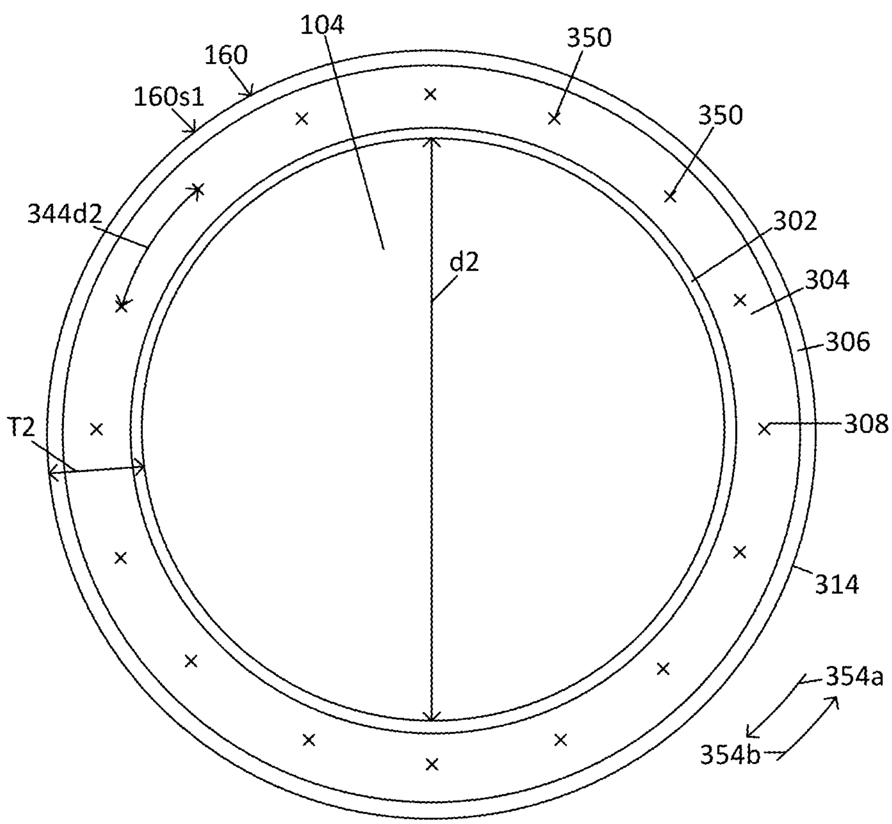
FIG. 9D illustrates a cross-sectional view of the tube of FIG. 9B taken along line 9D-9D.
Figure 9E:
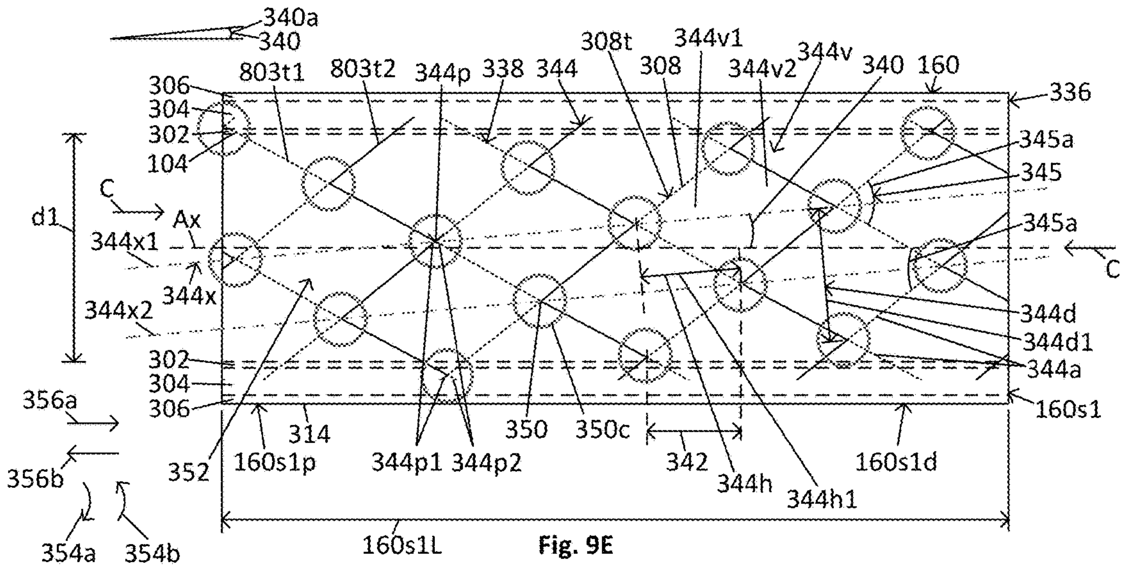
FIG. 9E is a closeup view of a compressed side of the tube of FIG. 6B at section S3. The vantage point for FIG. 9E is indicated by the view arrow V1 in FIG. 6B such that FIG. 9E illustrates the radial inside of the curve in section S3.
Figure 9F:
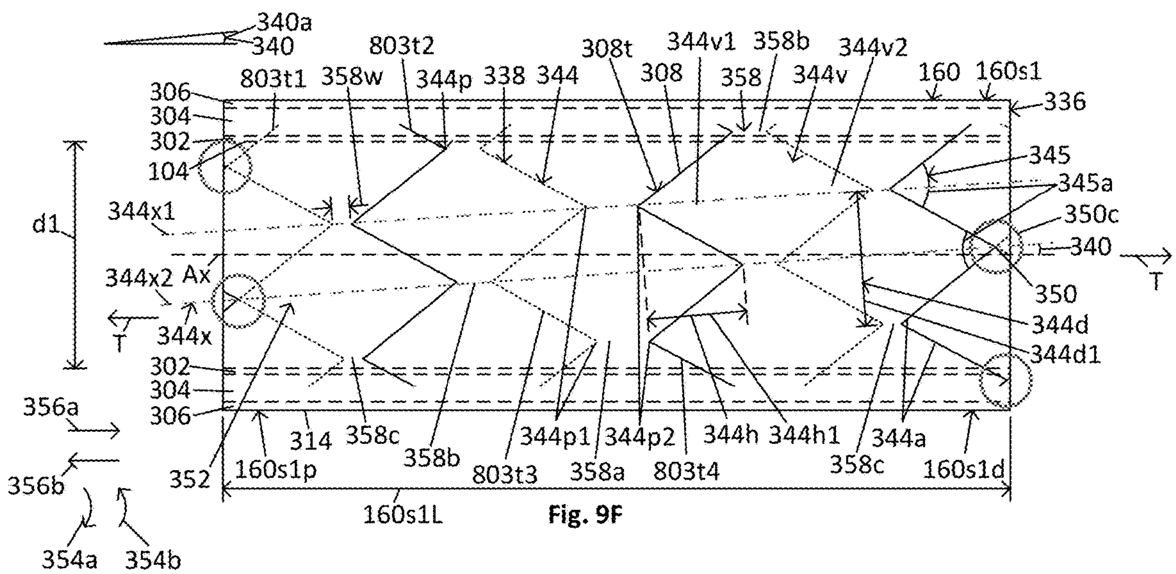
FIG. 9F is a closeup view of a tensioned side of the tube of FIG. 6B at section S3. The vantage point for FIG. 9F is indicated by the view arrow V2 in FIG. 6B such that FIG. 9F illustrates the radial outside of the curve in section S3.
Figure 9G:
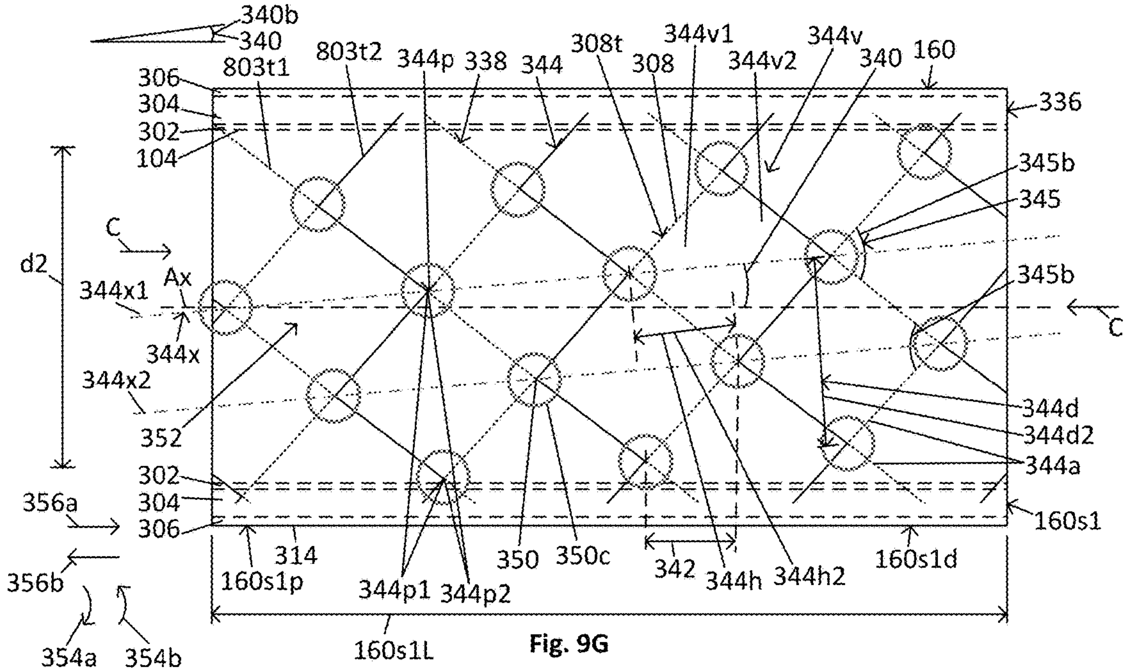
FIG. 9G is a closeup view of a compressed side of the tube of FIG. 6D at section S4. The vantage point for FIG. 9G is indicated by the view arrow V1 in FIG. 6D such that FIG. 9G illustrates the radial inside of the curve in section S4.
Figure 9H:
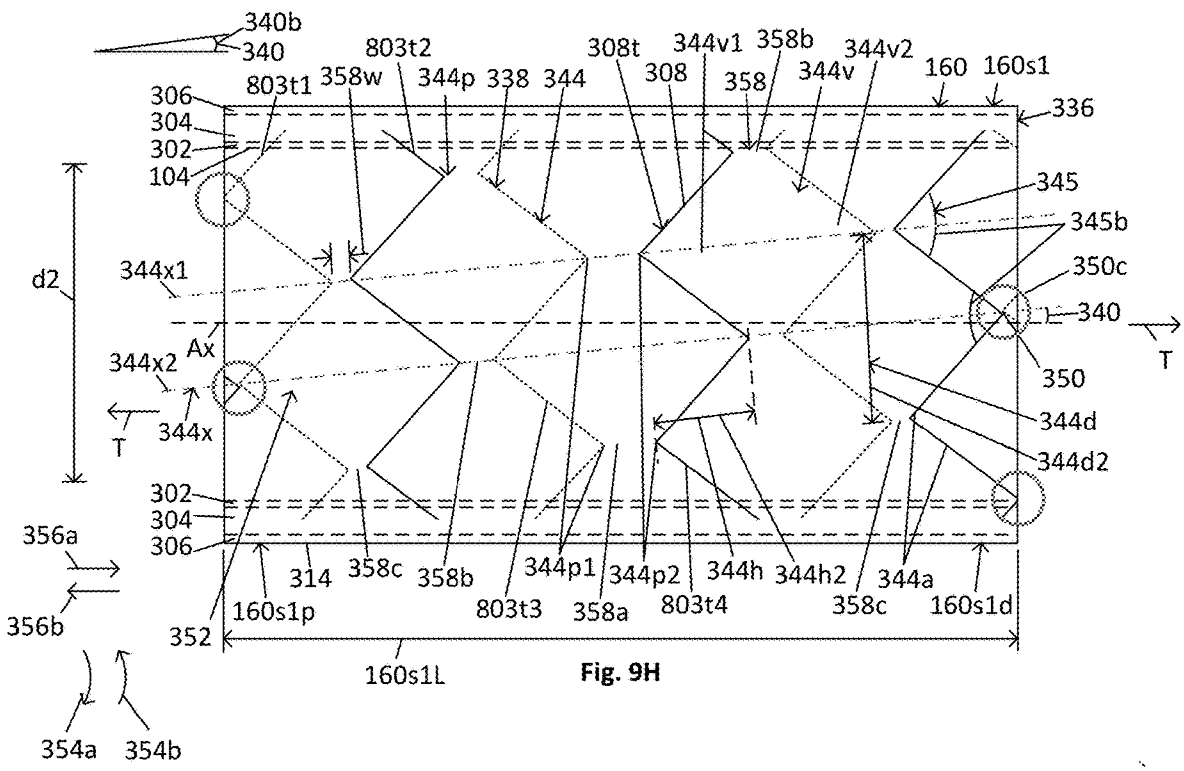
FIG. 9H is a closeup view of a tensioned side of the tube of FIG. 6D at section S4. The vantage point for FIG. 9H is indicated by the view arrow V2 in FIG. 6D such that FIG. 9H illustrates the radial outside of the curve in section S4.
Figure 10A:
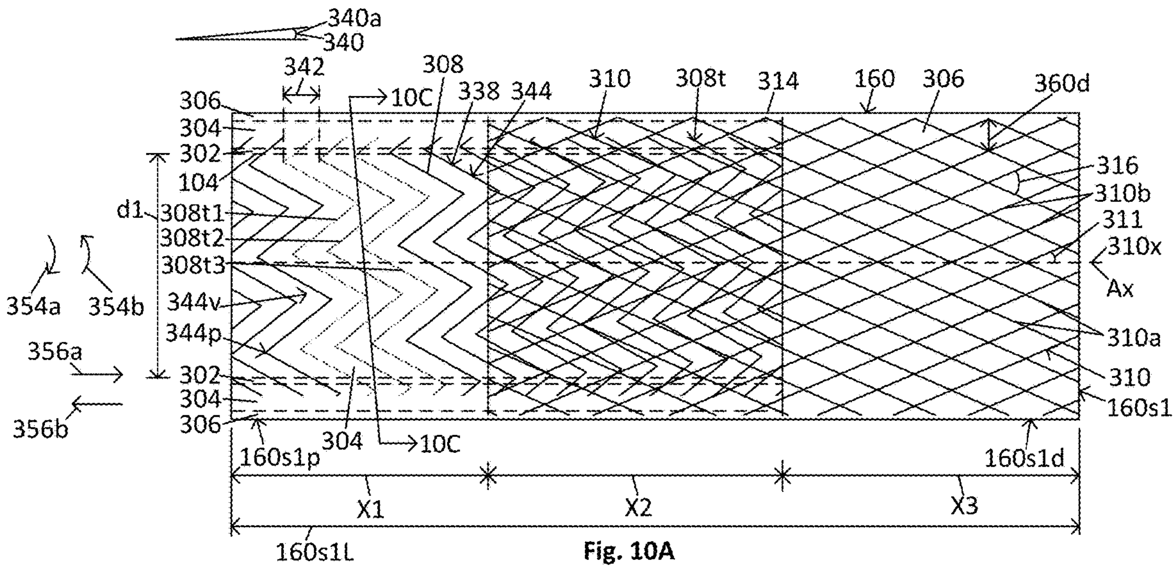
FIG. 10A is a closeup side view of the tube of FIG. 6A at section S1, for example, when the tube is in a non-expanded configuration.
Figure 10B:
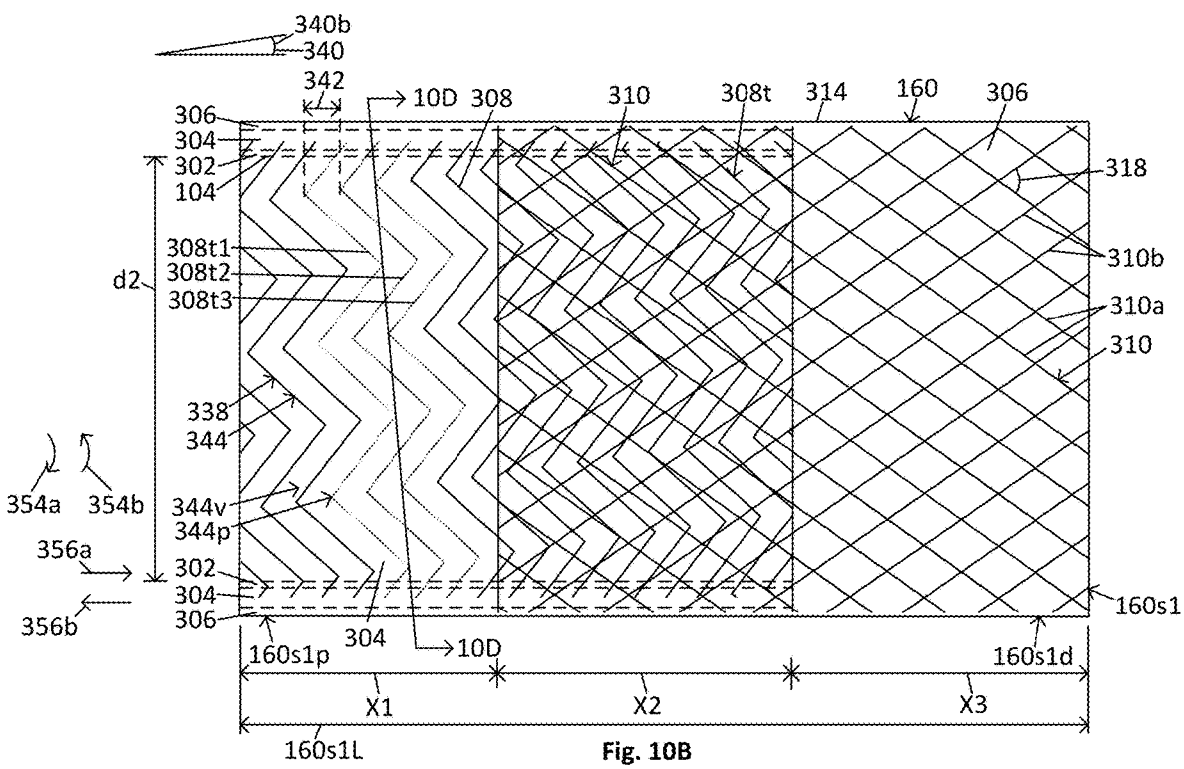
FIG. 10B is a closeup side view of the tube of FIG. 6C at section S2 after the tube is expanded, for example, when the tube is in an expanded configuration.
Figure 10C:
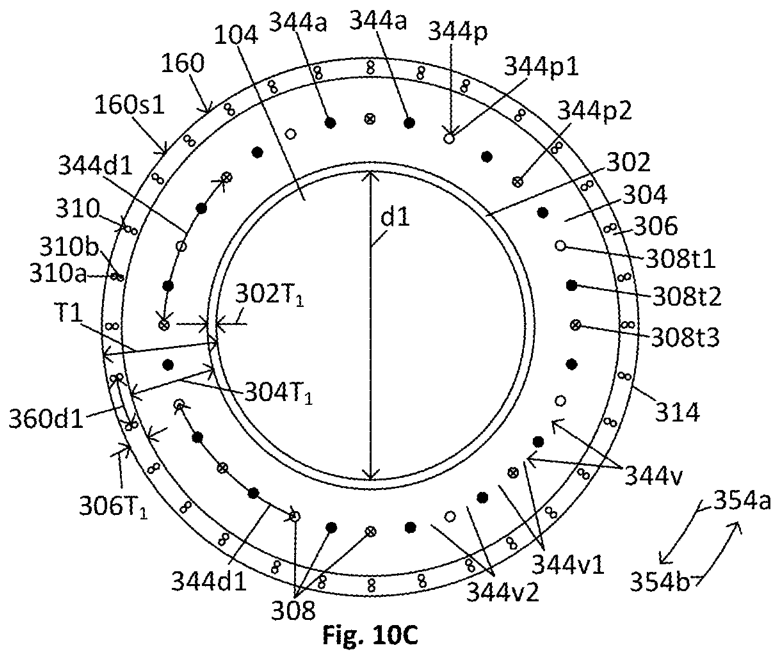
FIG. 10C illustrates a cross-sectional view of the tube of FIG. 10A taken along line 10C-10C.
Figure 10D:
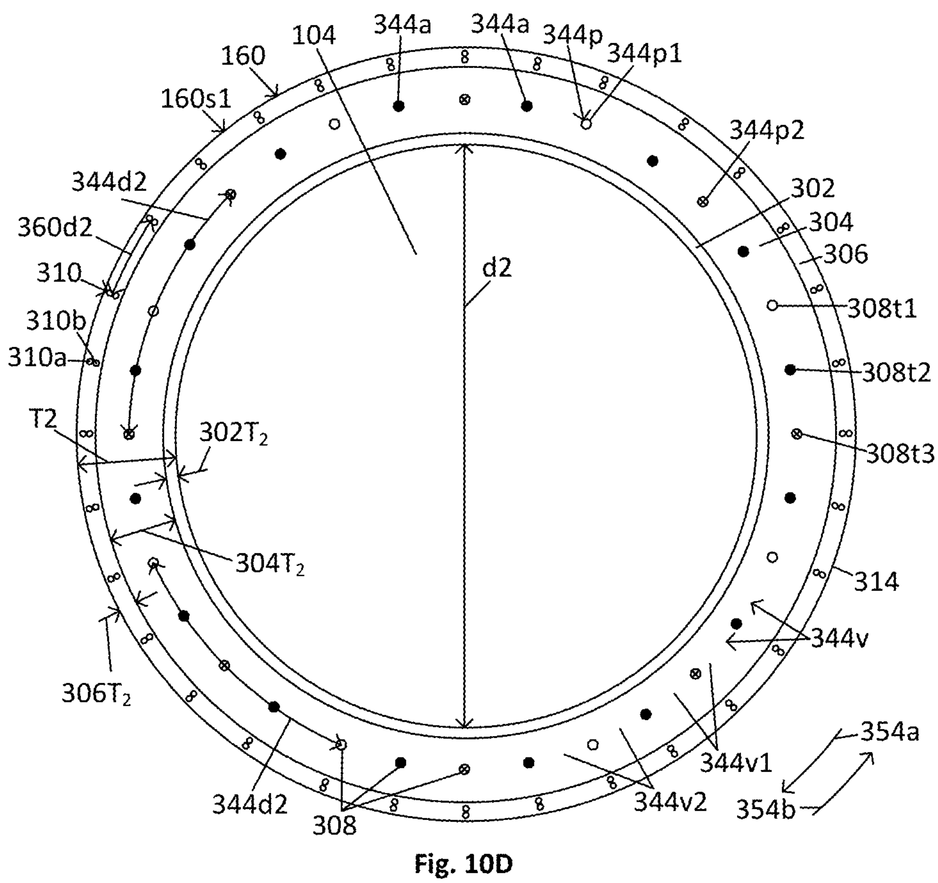
FIG. 10D illustrates a cross-sectional view of the tube of FIG. 10B taken along line 10D-10D.
Figure 11A:
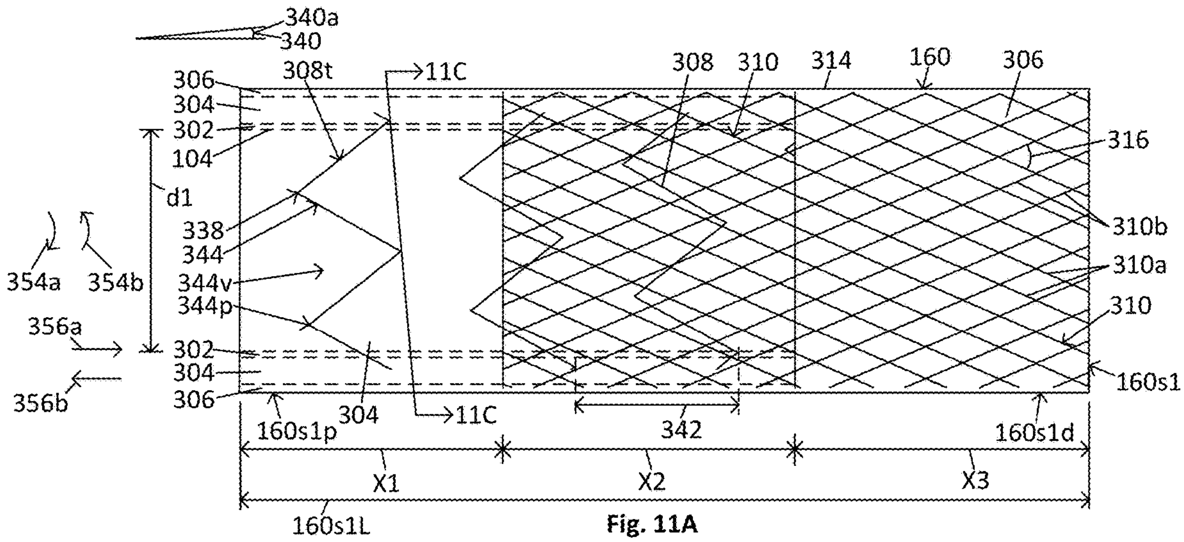
FIG. 11A is a closeup side view of the tube of FIG. 6A at section S1, for example, when the tube is in a non-expanded configuration.
Figure 11B:
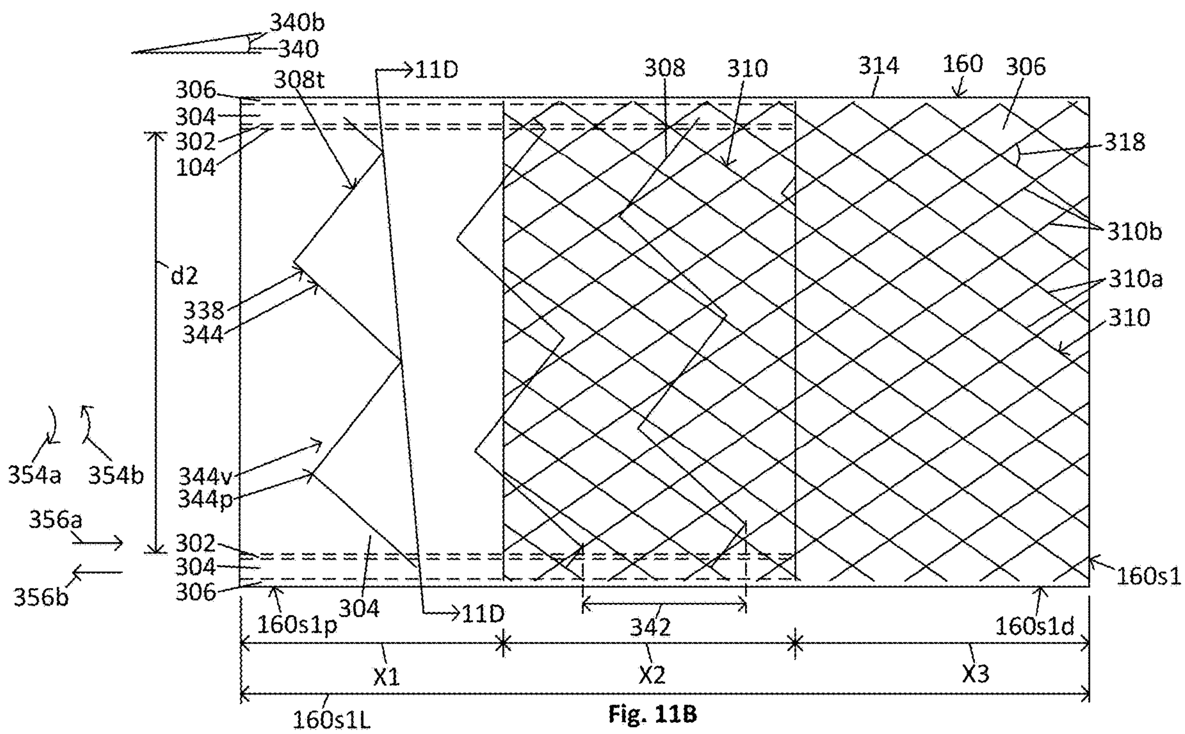
FIG. 11B is a closeup side view of the tube of FIG. 6C at section S2 after the tube is expanded, for example, when the tube is in an expanded configuration.
Figure 11C:
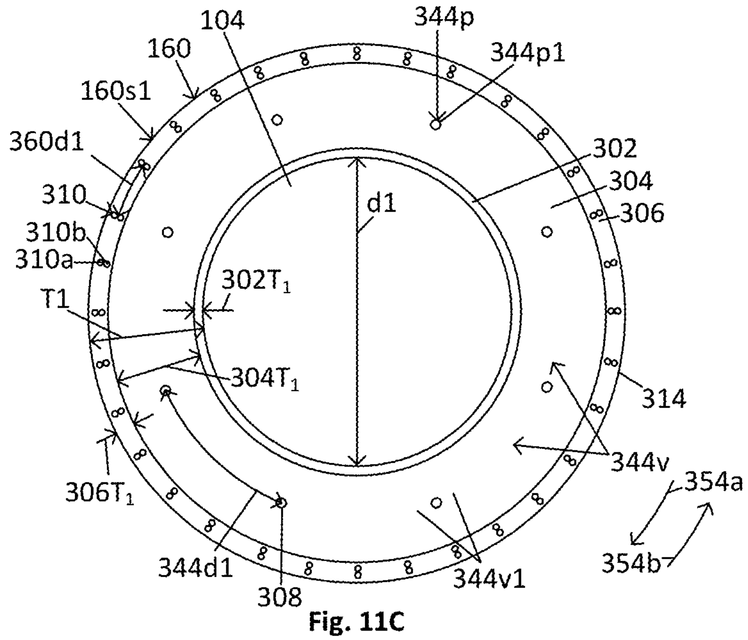
FIG. 11C illustrates a cross-sectional view of the tube of FIG. 11A taken along line 11C-11C.
Figure 11D:
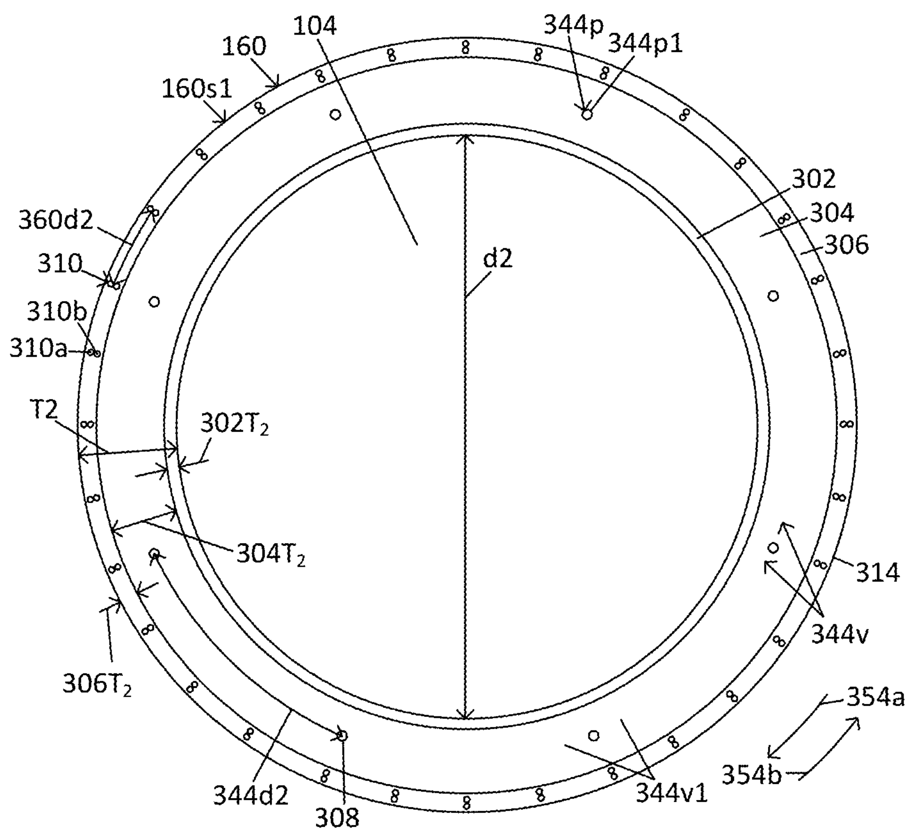
FIG. 11D illustrates a cross-sectional view of the tube of FIG. 11B taken along line 11D-11D.
Figure 12A:
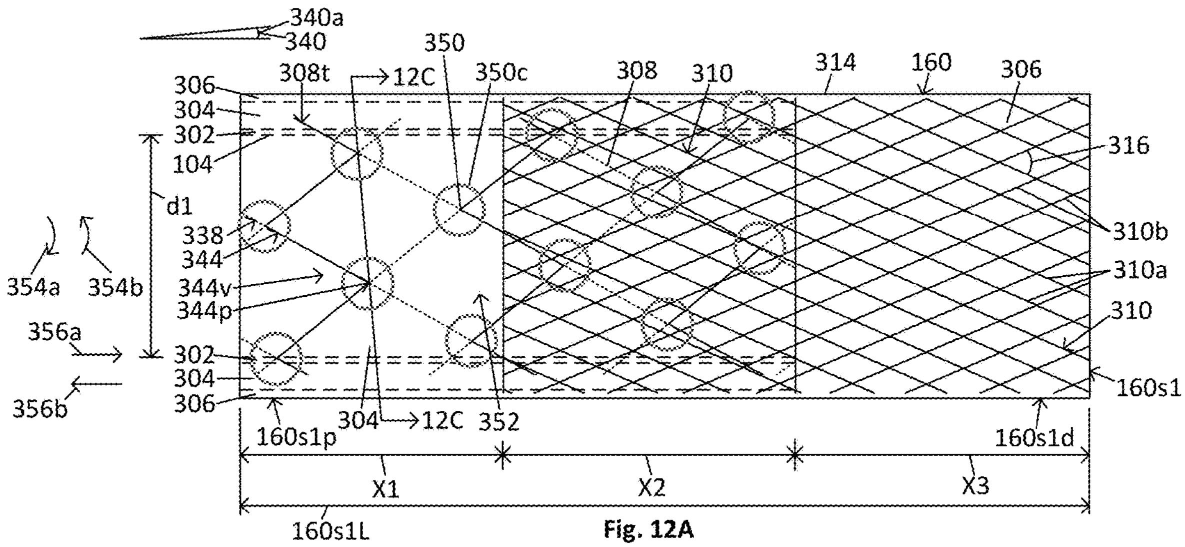
FIG. 12A is a closeup side view of the tube of FIG. 6A at section S1, for example, when the tube is in a non-expanded configuration.
Figure 12B:
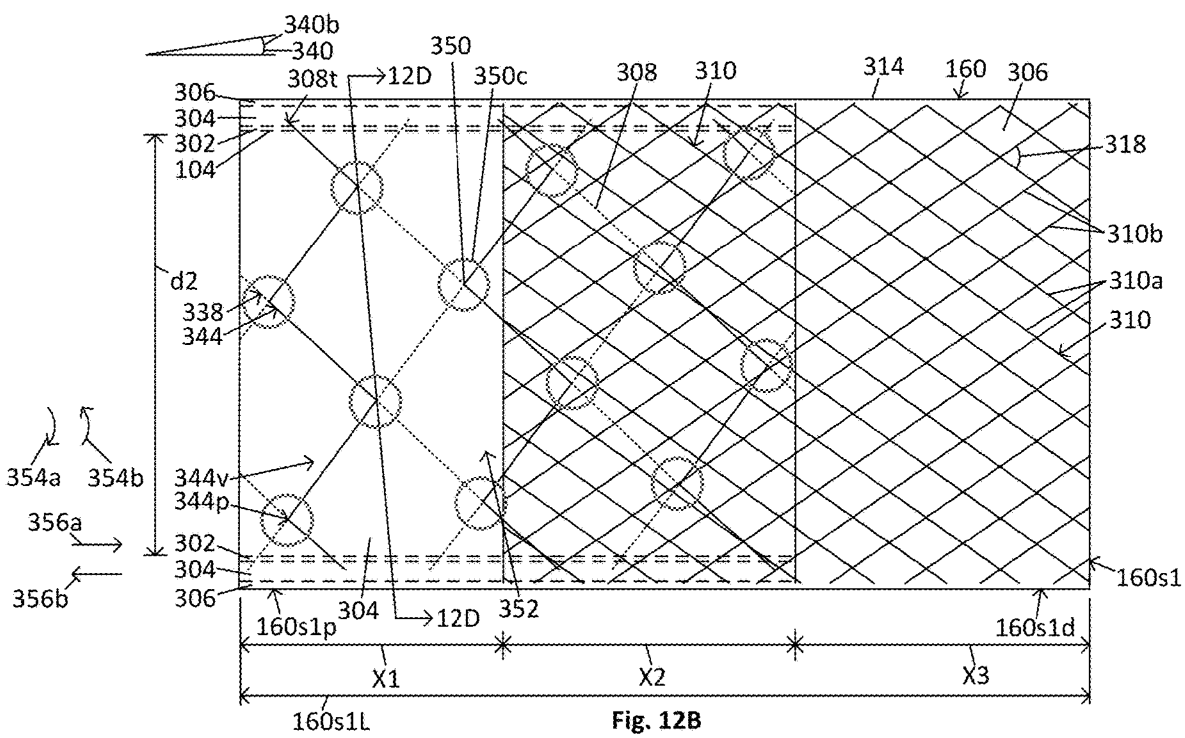
FIG. 12B is a closeup side view of the tube of FIG. 6C at section S2 after the tube is expanded, for example, when the tube is in an expanded configuration.
Figure 12C:
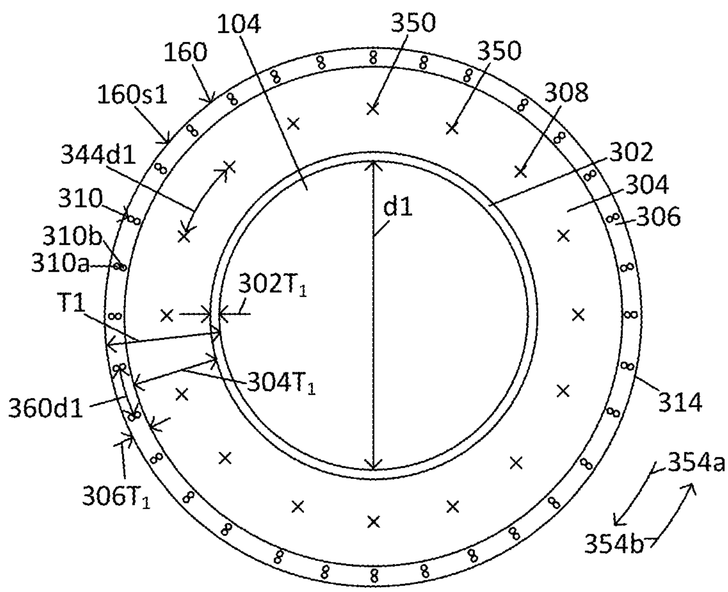
FIG. 12C illustrates a cross-sectional view of the tube of FIG. 12A taken along line 12C-12C.
Figure 12D:
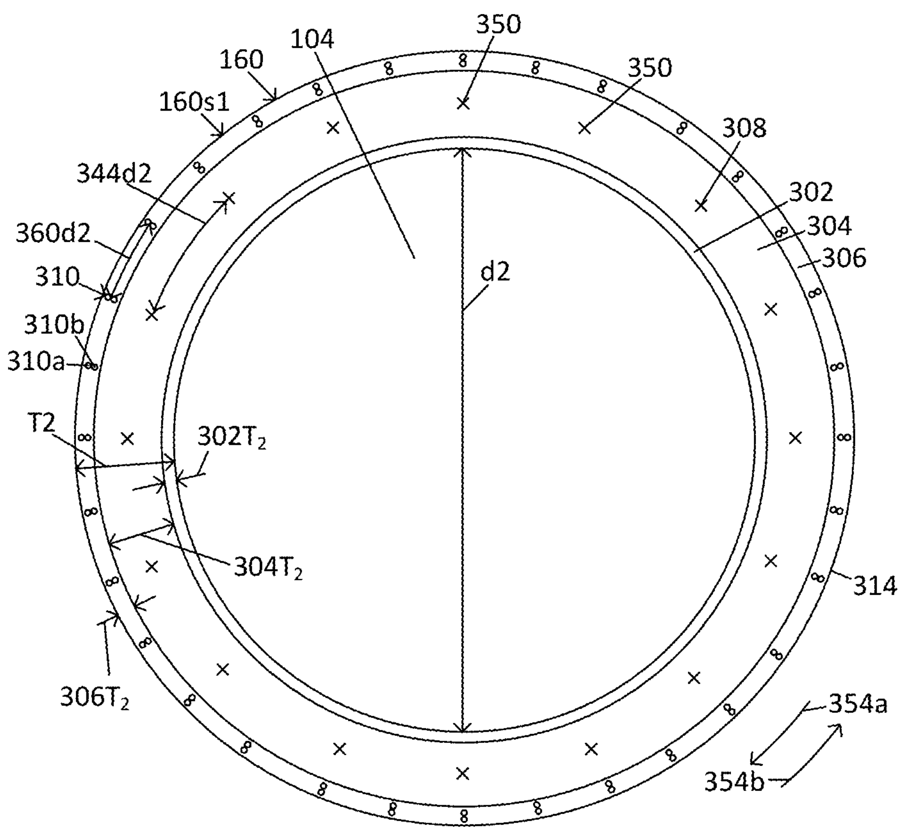
FIG. 12D illustrates a cross-sectional view of the tube of FIG. 12B taken along line 12D-12D.
Figure 12E:
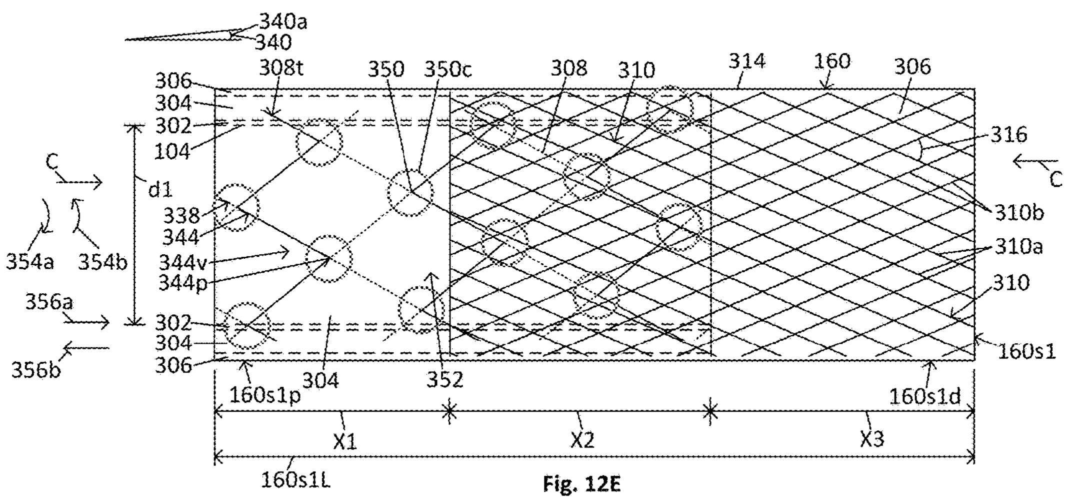
FIG. 12E is a closeup view of a compressed side of the tube of FIG. 6B at section S3. The vantage point for FIG. 12E is indicated by the view arrow V1 in FIG. 6B such that FIG. 12E illustrates the radial inside of the curve in section S3.
Figure 12F:
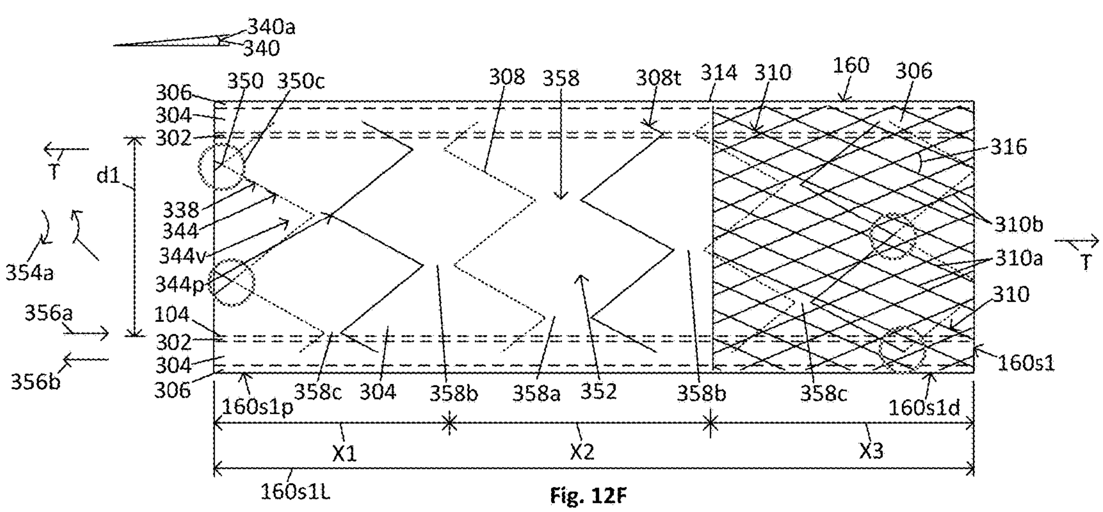
FIG. 12F is a closeup view of a tensioned side of the tube of FIG. 6B at section S3. The vantage point for FIG. 12F is indicated by the view arrow V2 in FIG. 6B such that FIG. 12F illustrates the radial outside of the curve in section S3.
Figure 12G:
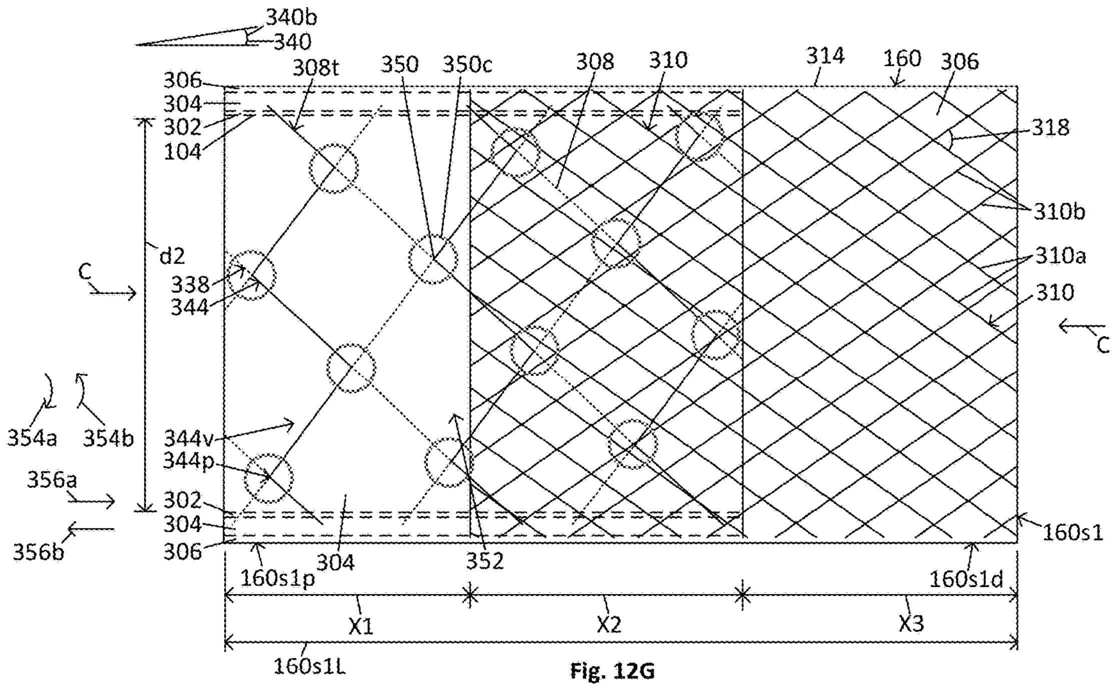
FIG. 12G is a closeup view of a compressed side of the tube of FIG. 6D at section S4. The vantage point for FIG. 12G is indicated by the view arrow V1 in FIG. 6D such that FIG. 12G illustrates the radial inside of the curve in section S4.
Figure 12H:
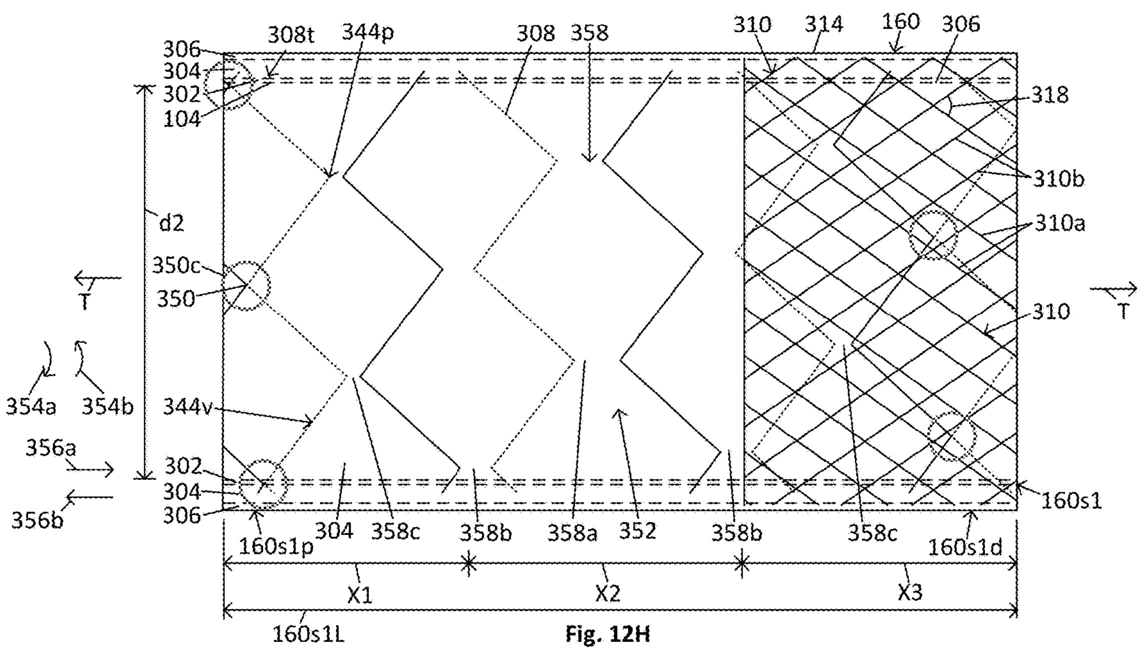
FIG. 12H is a closeup view of a tensioned side of the tube of FIG. 6D at section S4. The vantage point for FIG. 12H is indicated by the view arrow V2 in FIG. 6D such that FIG. 12H illustrates the radial outside of the curve in section S4.
Figure 13A:
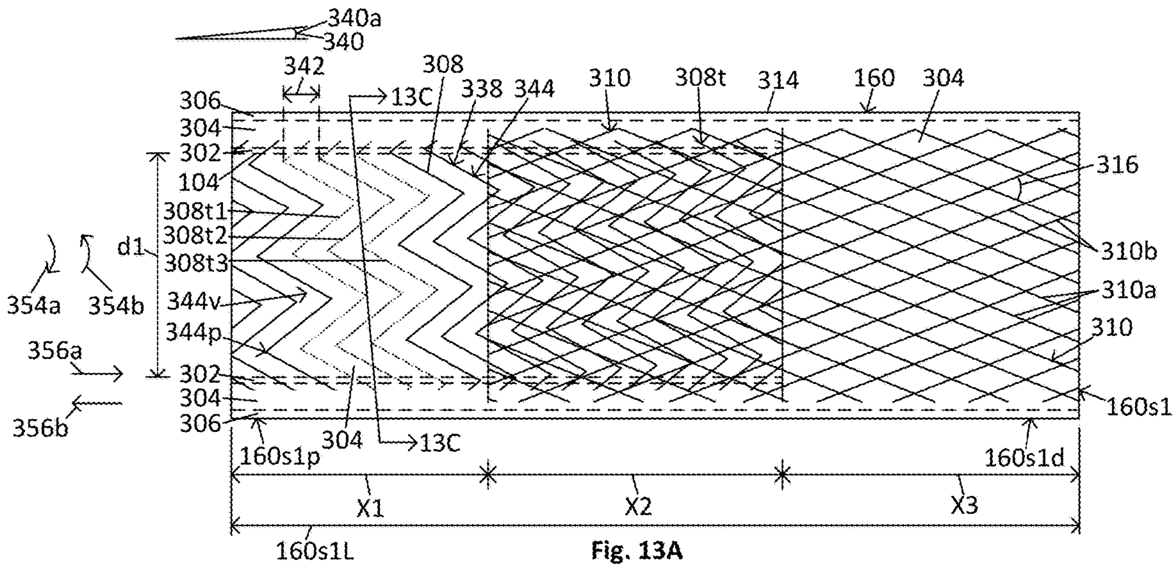
FIG. 13A is a closeup side view of the tube of FIG. 6A at section S1, for example, when the tube is in a non-expanded configuration.
Figure 13B:
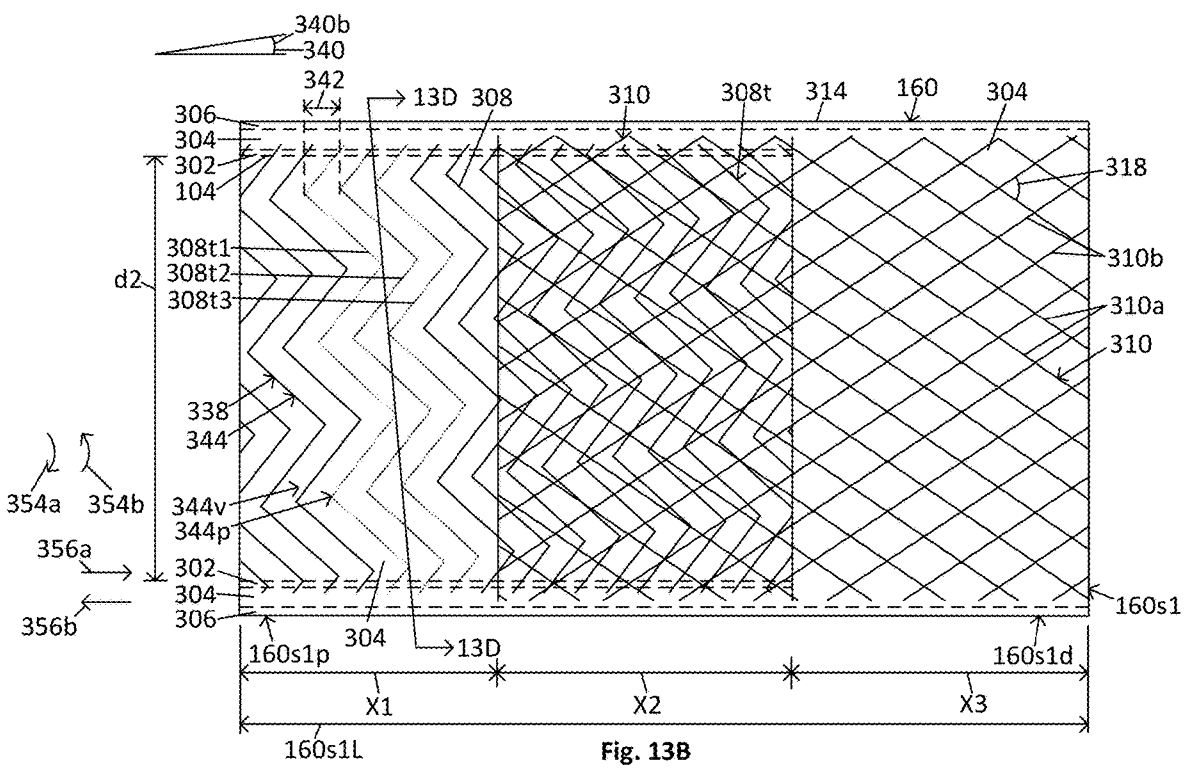
FIG. 13B is a closeup side view of the tube of FIG. 6C at section S2 after the tube is expanded, for example, when the tube is in an expanded configuration.
Figure 13C:
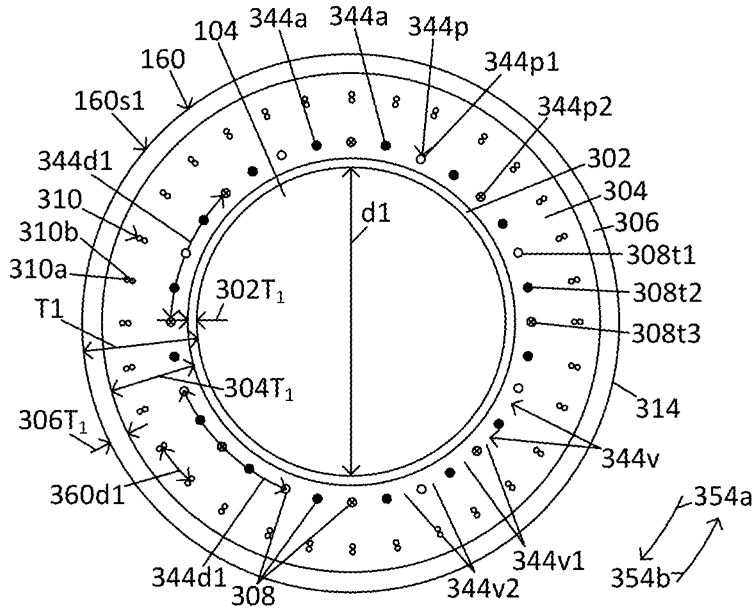
FIG. 13C illustrates a cross-sectional view of the tube of FIG. 13A taken along line 13C-13C.
Figure 13D:
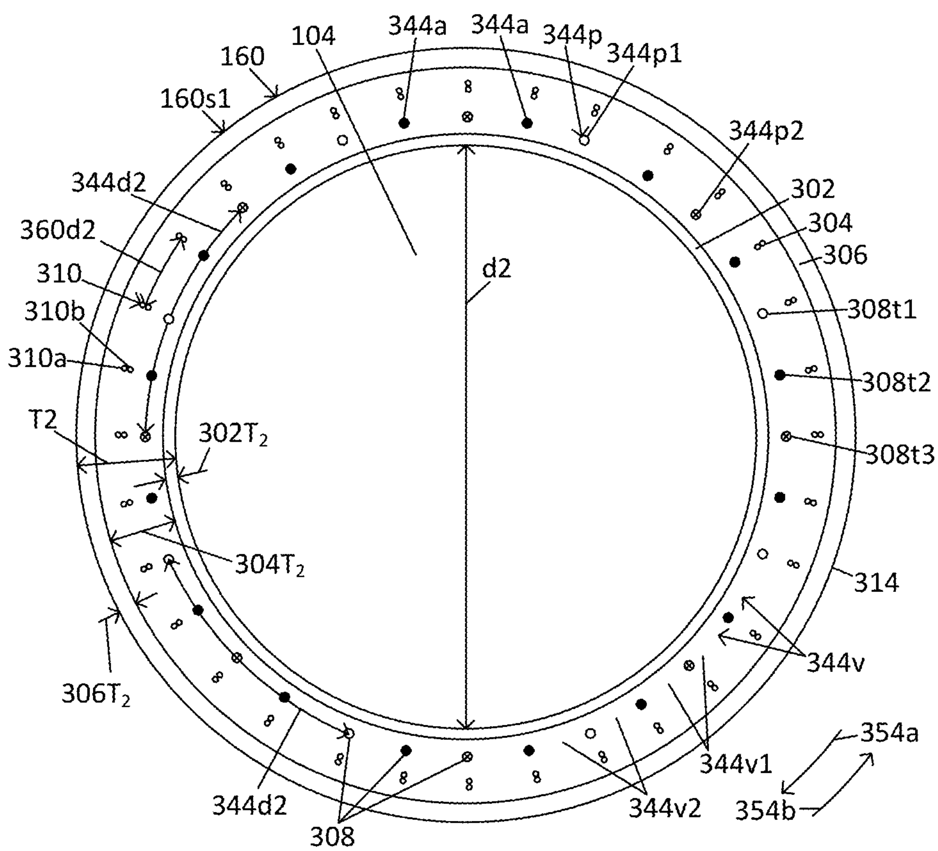
FIG. 13D illustrates a cross-sectional view of the tube of FIG. 13B taken along line 13D-13D.
Figure 14A:
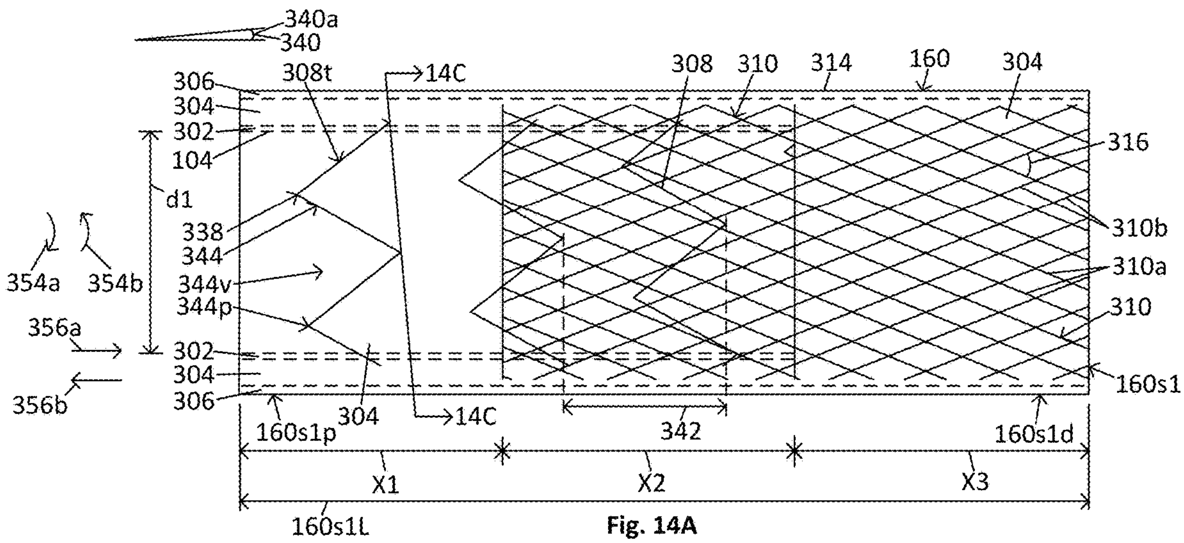
FIG. 14A is a closeup side view of the tube of FIG. 6A at section S1, for example, when the tube is in a non-expanded configuration.
Figure 14B:
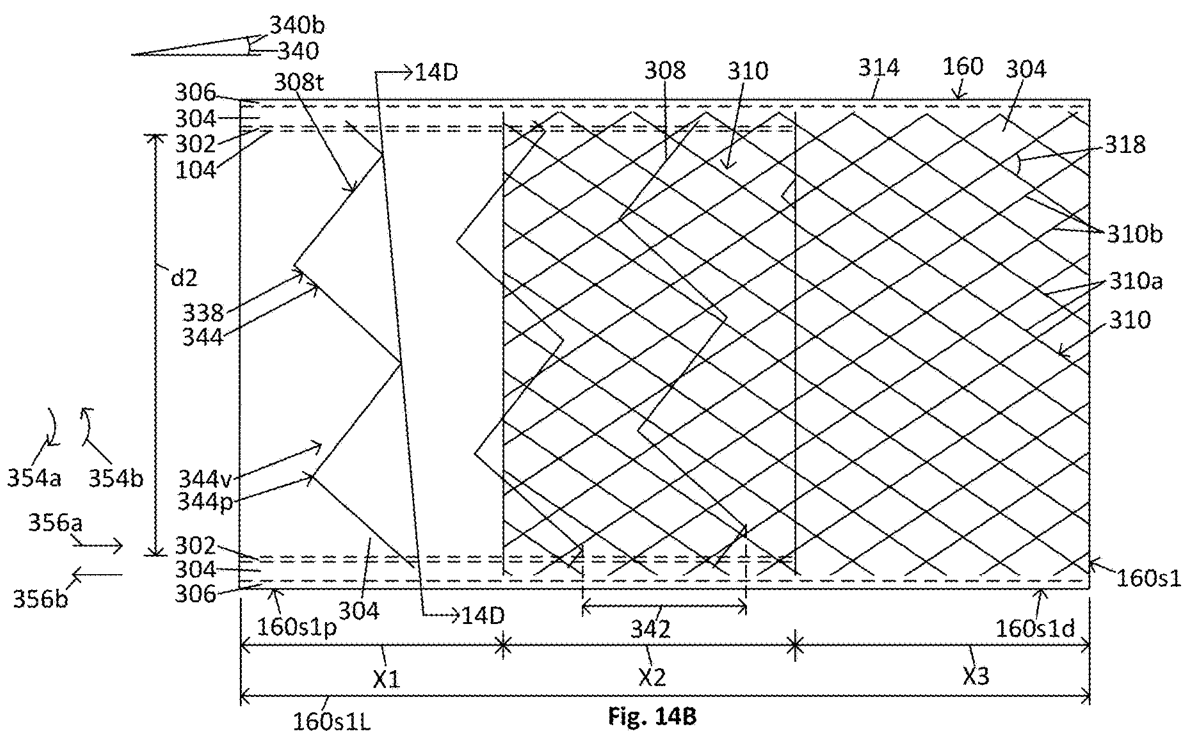
FIG. 14B is a closeup side view of the tube of FIG. 6C at section S2 after the tube is expanded, for example, when the tube is in an expanded configuration.
Figure 14C:
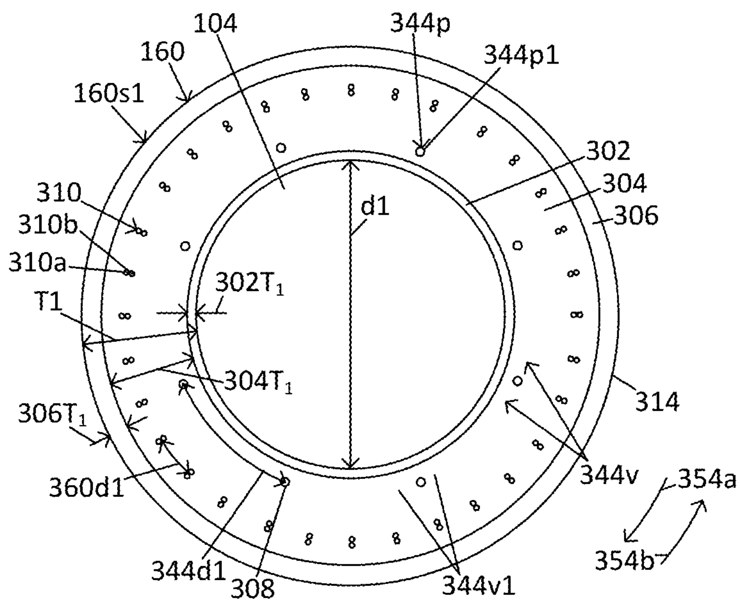
FIG. 14C illustrates a cross-sectional view of the tube of FIG. 14A taken along line 14C-14C.
Figure 14D:
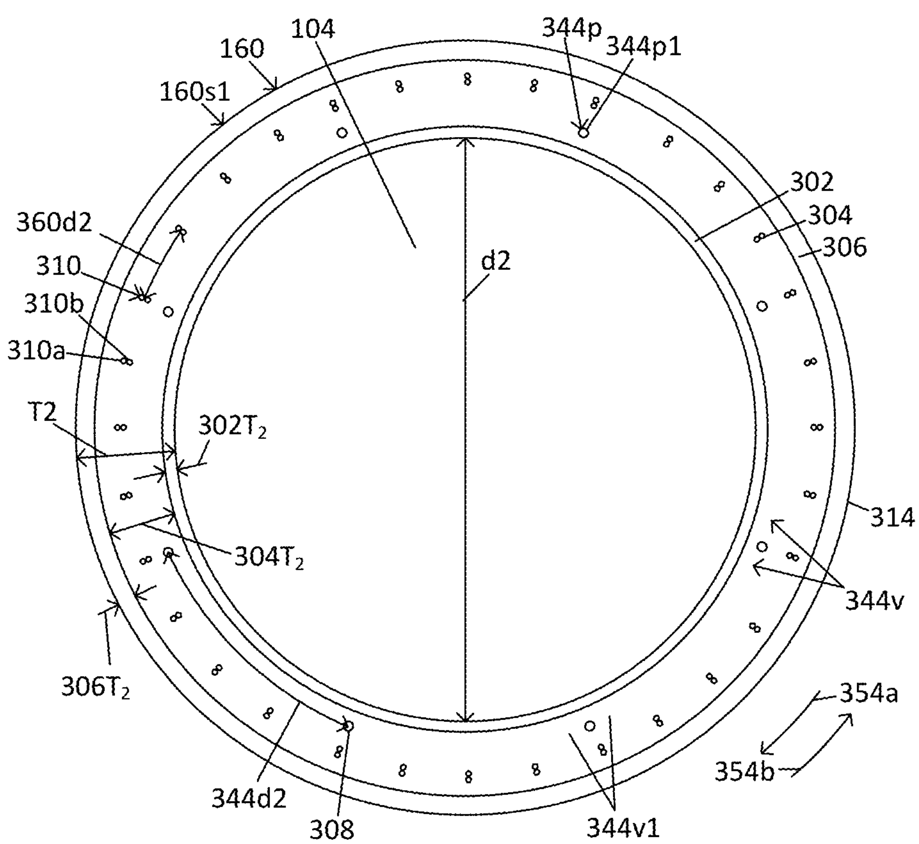
FIG. 14D illustrates a cross-sectional view of the tube of FIG. 14B taken along line 14D-14D.
Figure 15A:
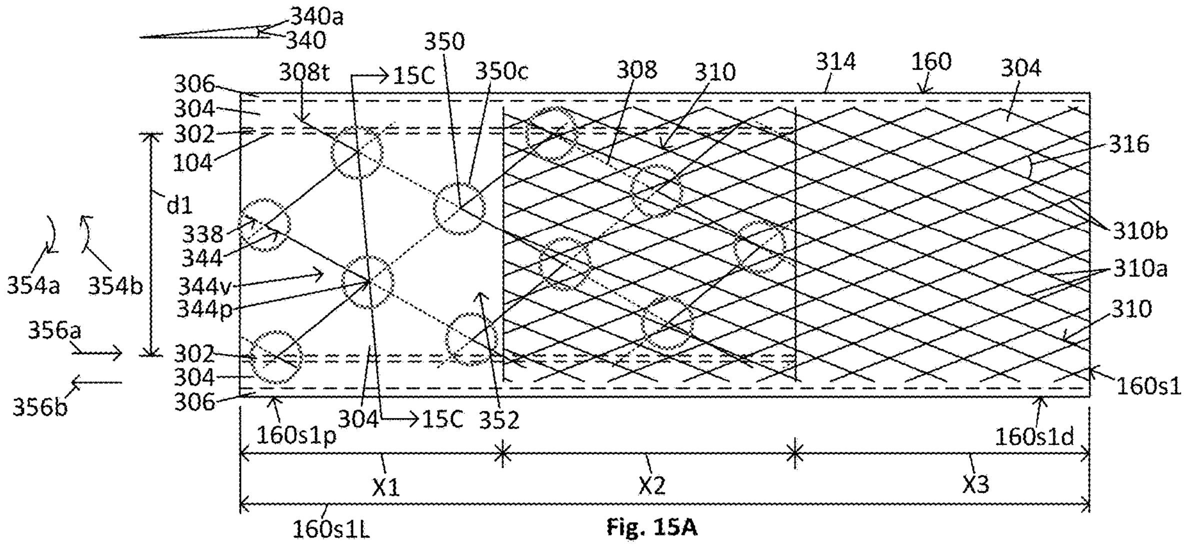
FIG. 15A is a closeup side view of the tube of FIG. 6A at section S1, for example, when the tube is in a non-expanded configuration.
Figure 15B:
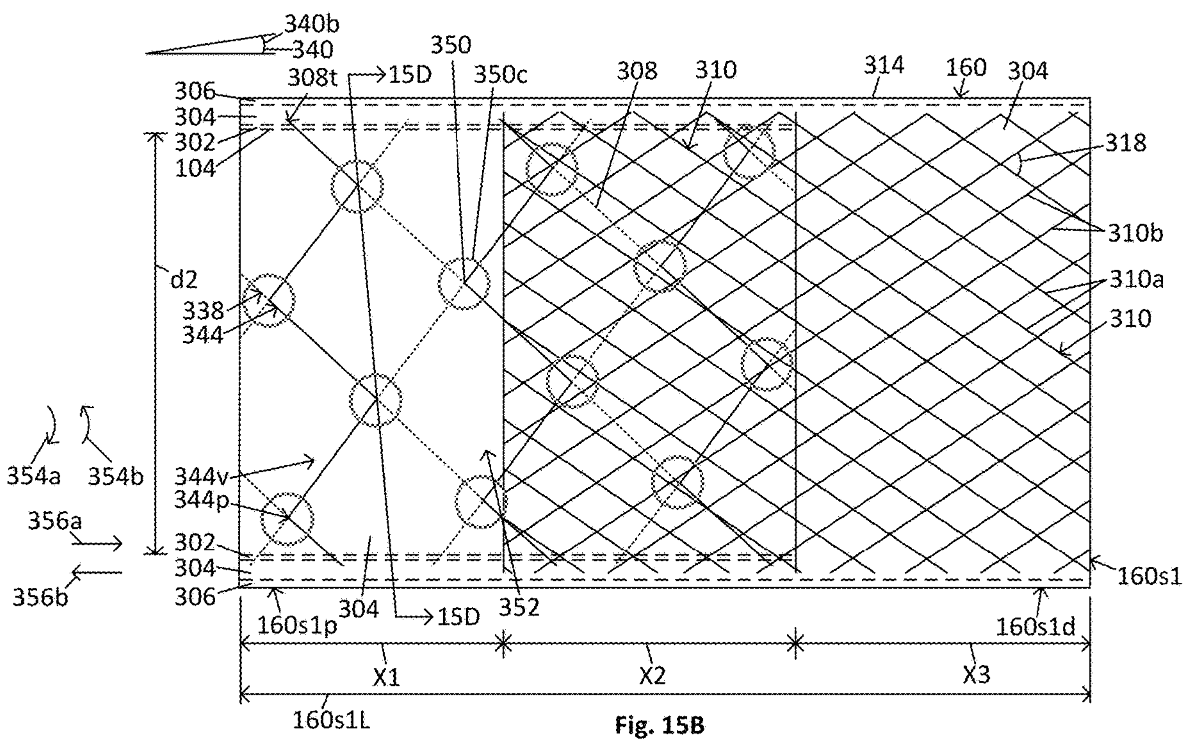
FIG. 15B is a closeup side view of the tube of FIG. 6C at section S2 after the tube is expanded, for example, when the tube is in an expanded configuration.
Figure 15C:
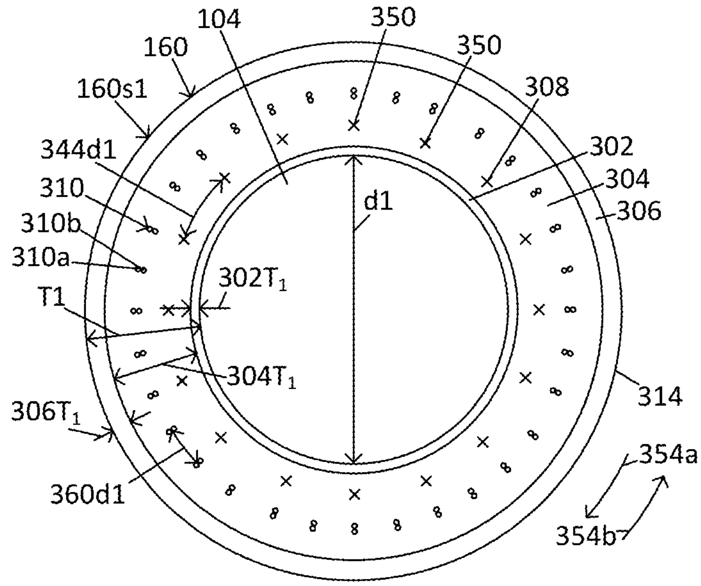
FIG. 15C illustrates a cross-sectional view of the tube of FIG. 15A taken along line 15C-15C.
Figure 15D:
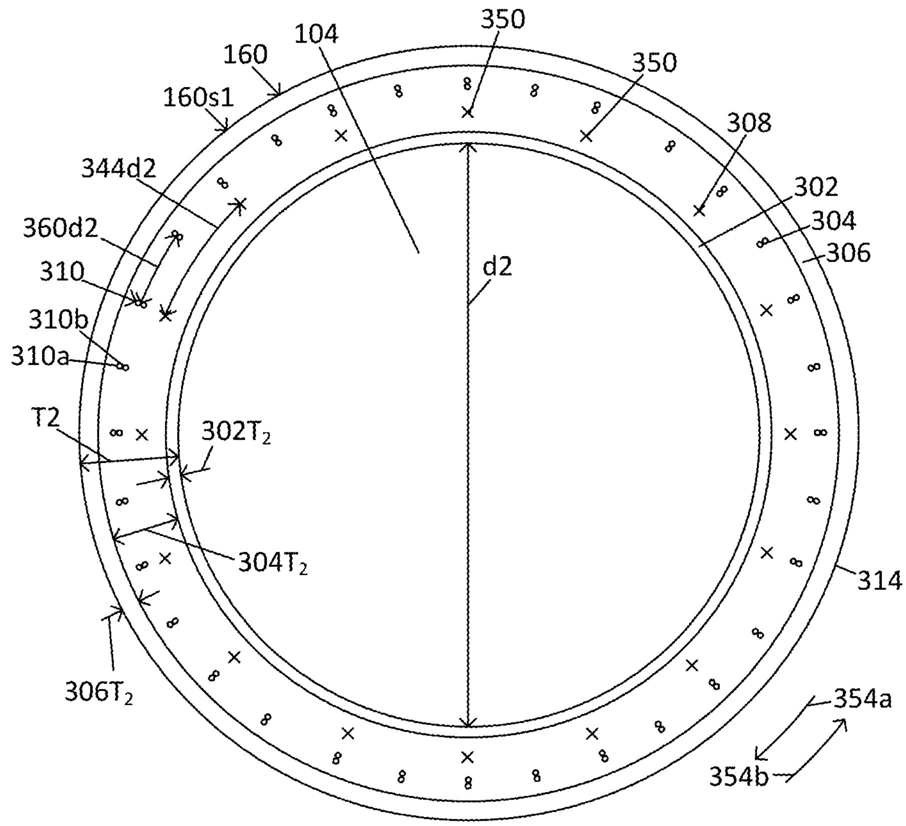
FIG. 15D illustrates a cross-sectional view of the tube of FIG. 15B taken along line 15D-15D.
Figure 15E:
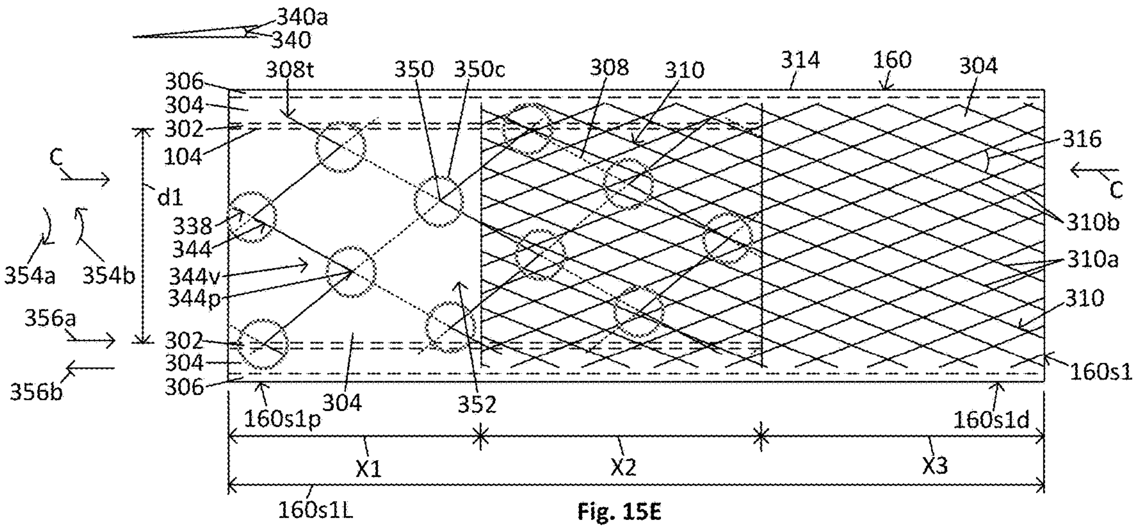
FIG. 15E is a closeup view of a compressed side of the tube of FIG. 6B at section S3. The vantage point for FIG. 15E is indicated by the view arrow V1 in FIG. 6B such that FIG. 15E illustrates the radial inside of the curve in section S3.
Figure 15F:
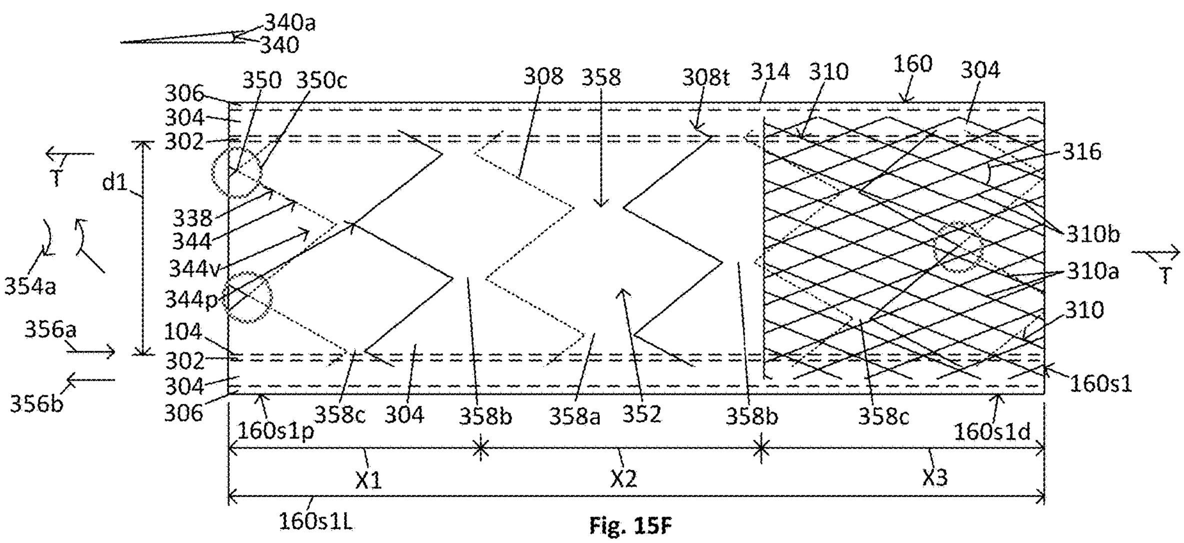
FIG. 15F is a closeup view of a tensioned side of the tube of FIG. 6B at section S3. The vantage point for FIG. 15F is indicated by the view arrow V2 in FIG. 6B such that FIG. 15F illustrates the radial outside of the curve in section S3.
Figure 15G:
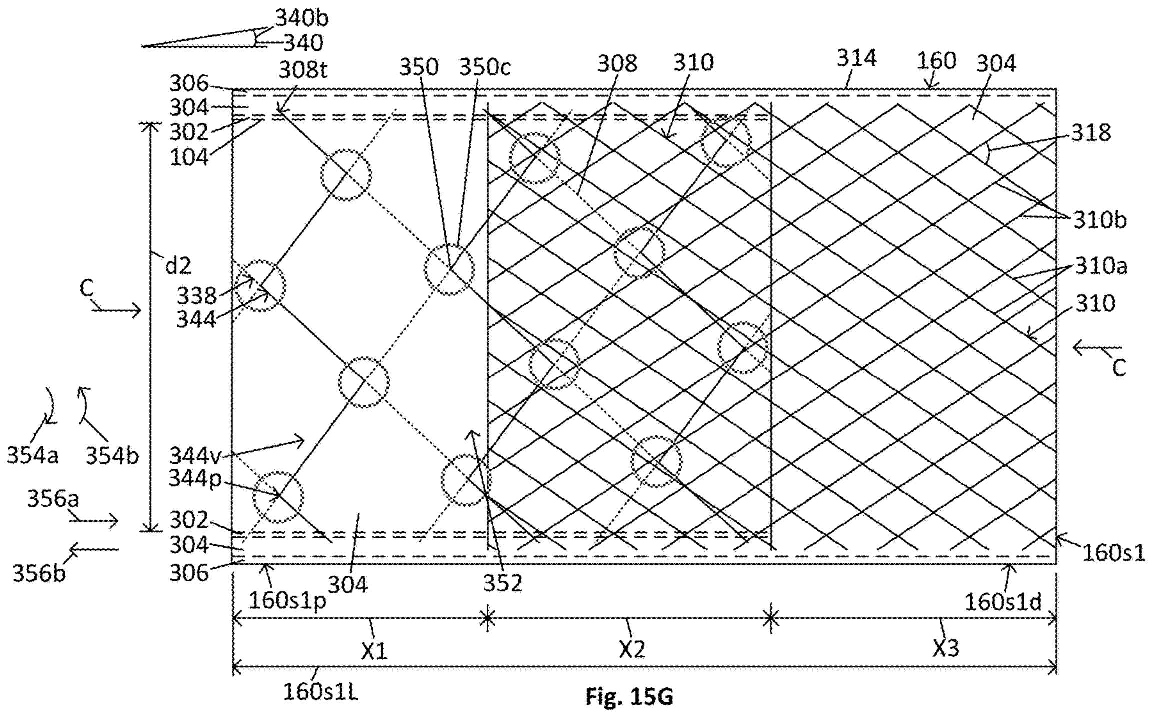
FIG. 15G is a closeup view of a compressed side of the tube of FIG. 6D at section S4. The vantage point for FIG. 15G is indicated by the view arrow V1 in FIG. 6D such that FIG. 15G illustrates the radial inside of the curve in section S4.
Figure 15H:
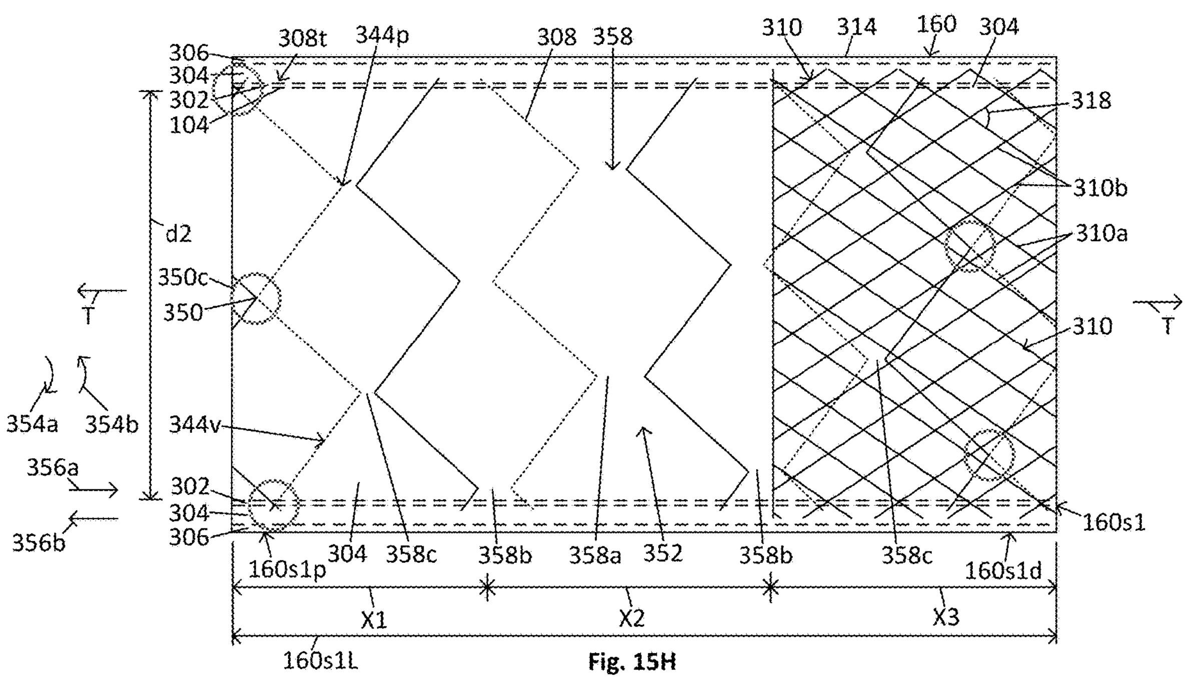
FIG. 15H is a closeup view of a tensioned side of the tube of FIG. 6D at section S4. The vantage point for FIG. 15H is indicated by the view arrow V2 in FIG. 6D such that FIG. 15H illustrates the radial outside of the curve in section S4.
Figure 16A:
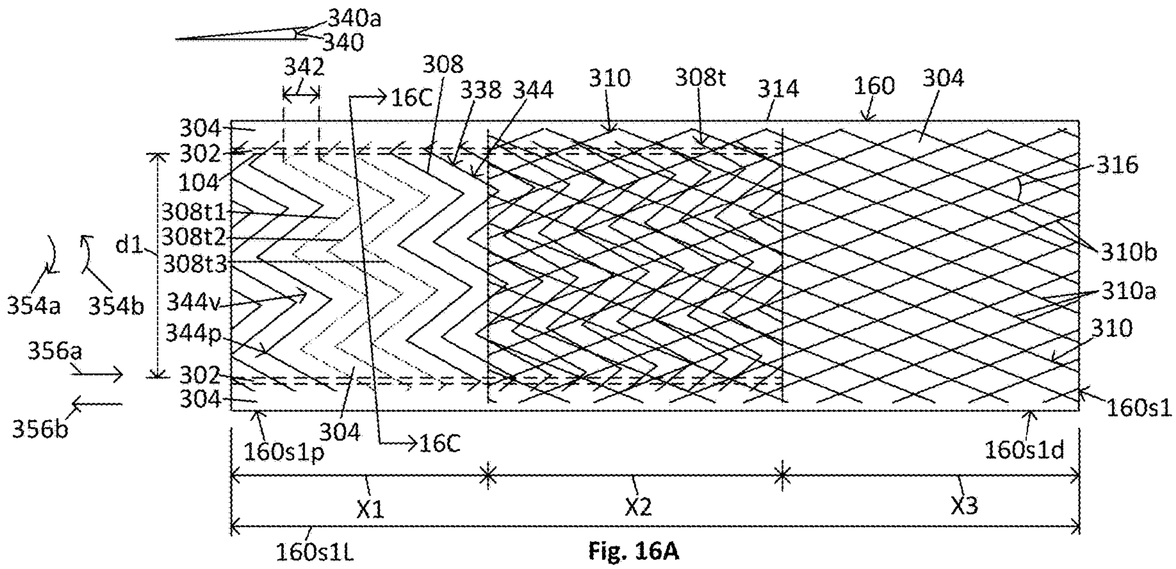
FIG. 16A is a closeup side view of the tube of FIG. 6A at section S1, for example, when the tube is in a non-expanded configuration.
Figure 16B:
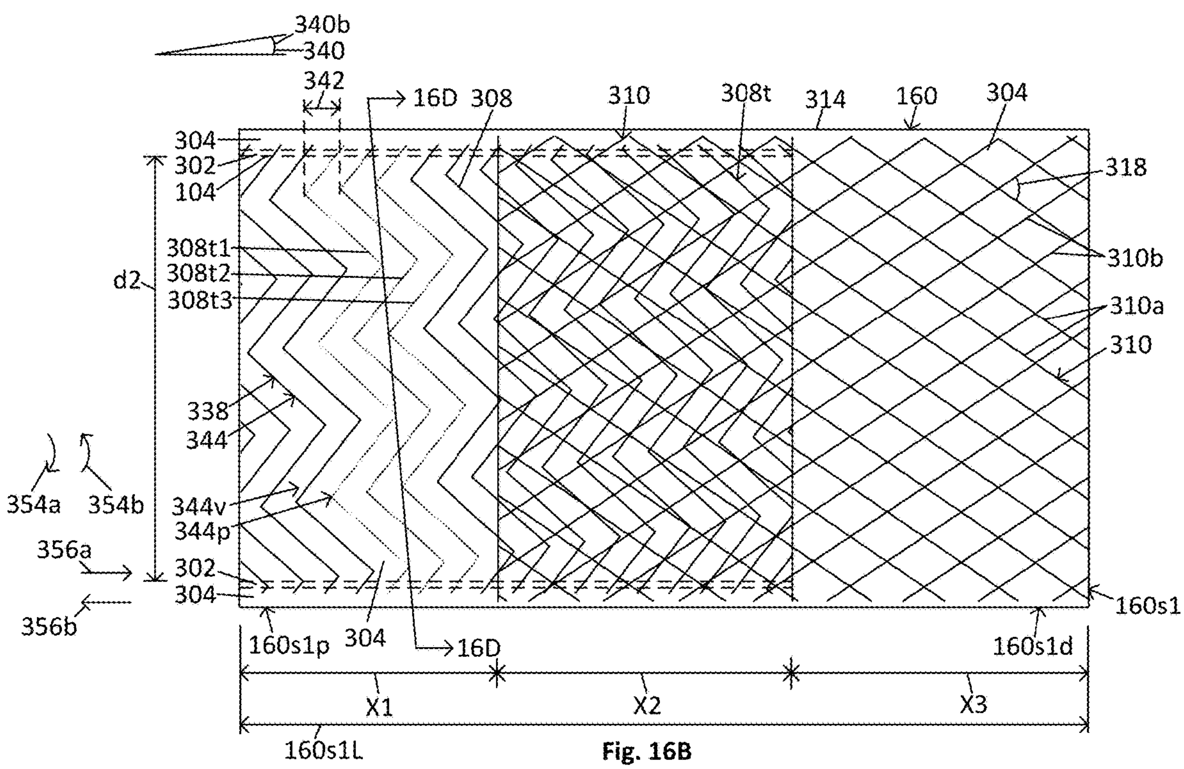
FIG. 16B is a closeup side view of the tube of FIG. 6C at section S2 after the tube is expanded, for example, when the tube is in an expanded configuration.
Figure 16C:
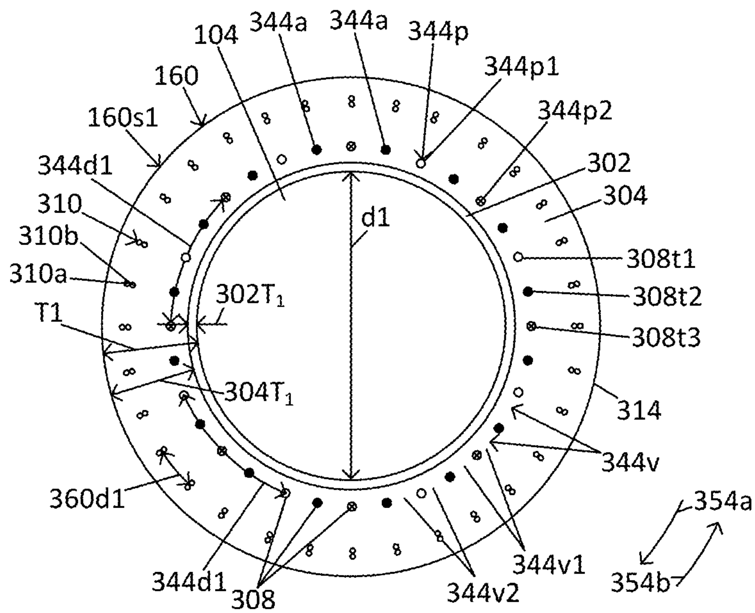
FIG. 16C illustrates a cross-sectional view of the tube of FIG. 16A taken along line 16C-16C.
Figure 16D:
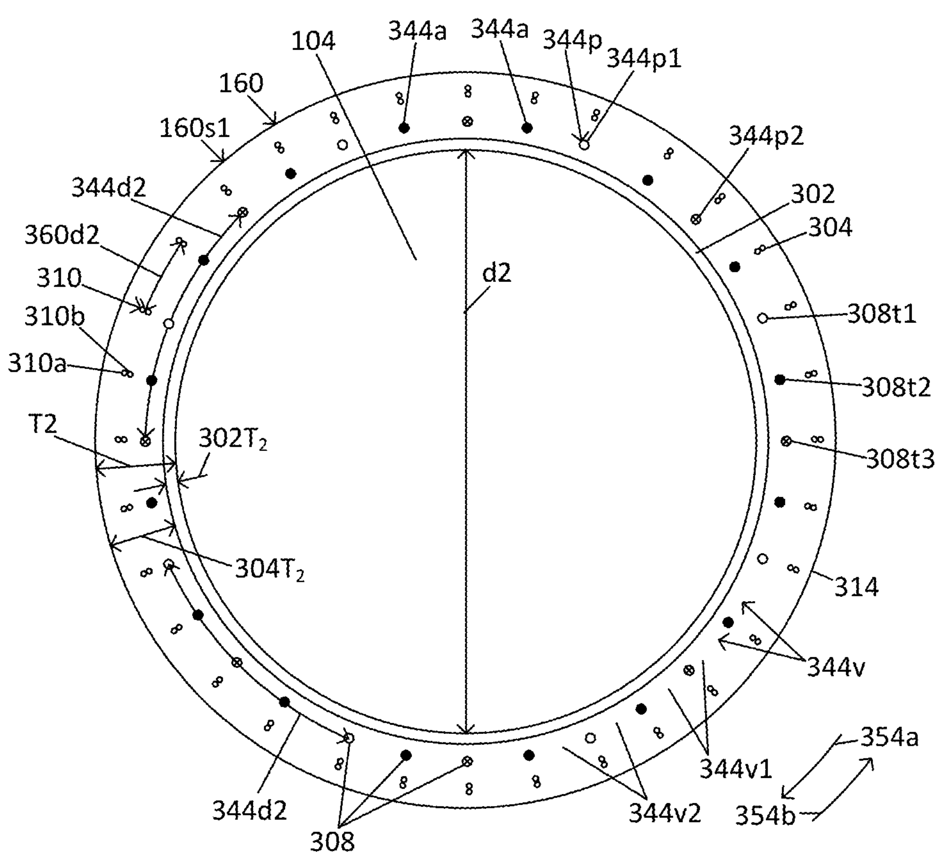
FIG. 16D illustrates a cross-sectional view of the tube of FIG. 16B taken along line 16D-16D.
Figure 17A:
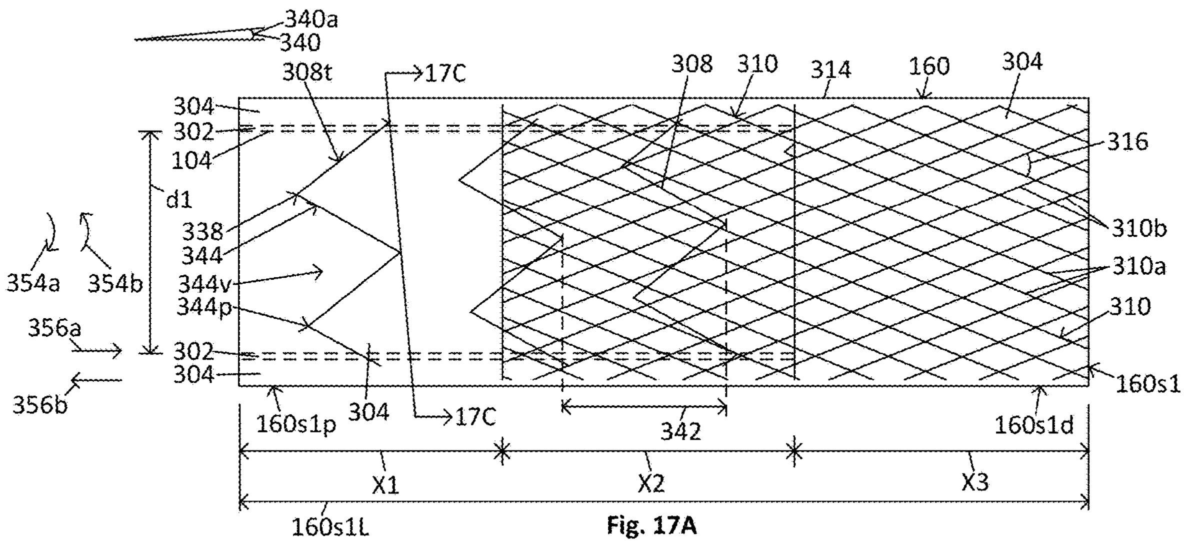
FIG. 17A is a closeup side view of the tube of FIG. 6A at section S1, for example, when the tube is in a non-expanded configuration.
Figure 17B:
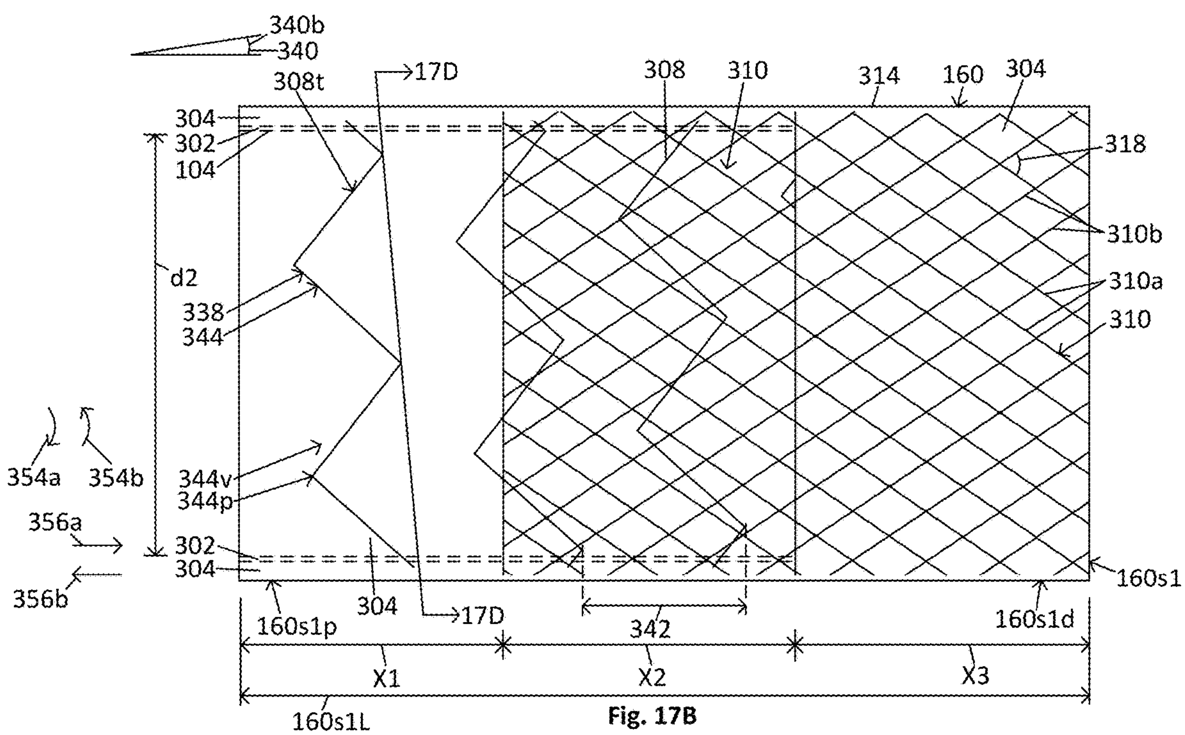
FIG. 17B is a closeup side view of the tube of FIG. 6C at section S2 after the tube is expanded, for example, when the tube is in an expanded configuration.
Figure 17C:
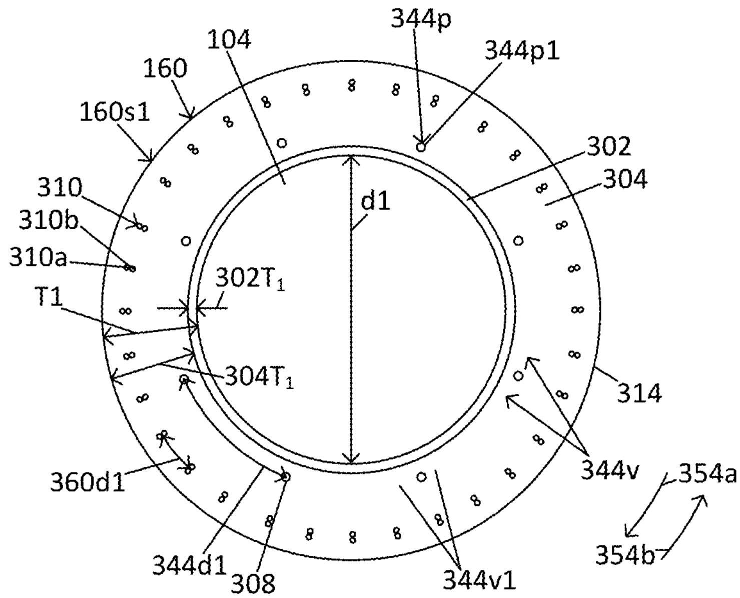
FIG. 17C illustrates a cross-sectional view of the tube of FIG. 17A taken along line 17C-17C.
Figure 17D:
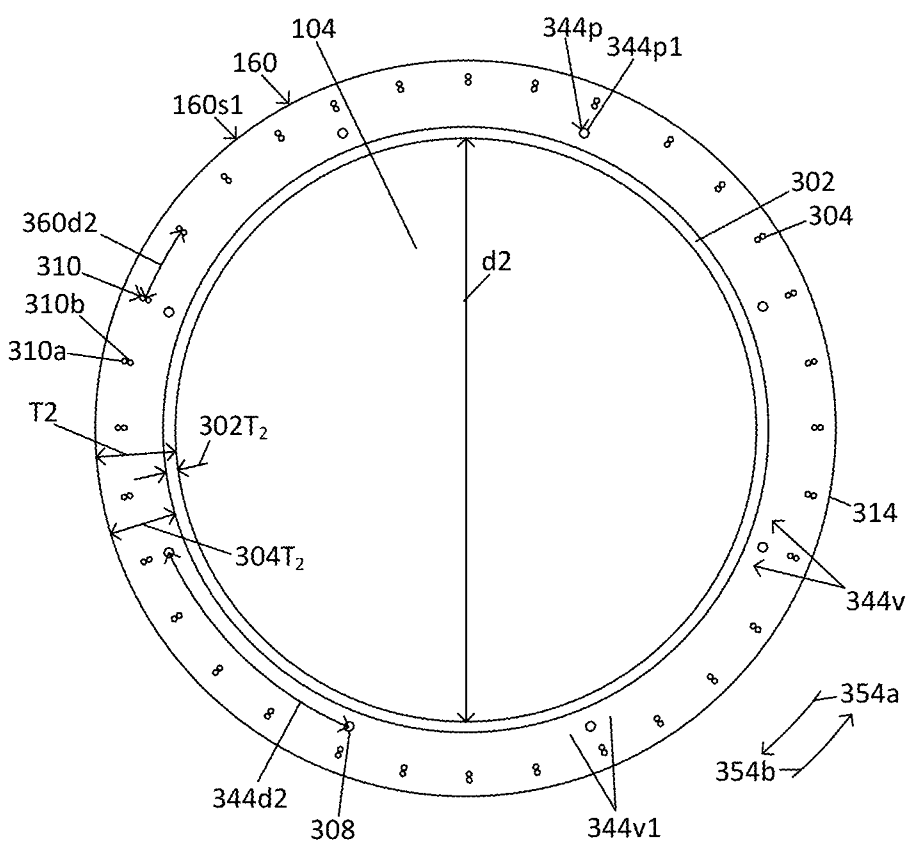
FIG. 17D illustrates a cross-sectional view of the tube of FIG. 17B taken along line 17D-17D.
Figure 18A:
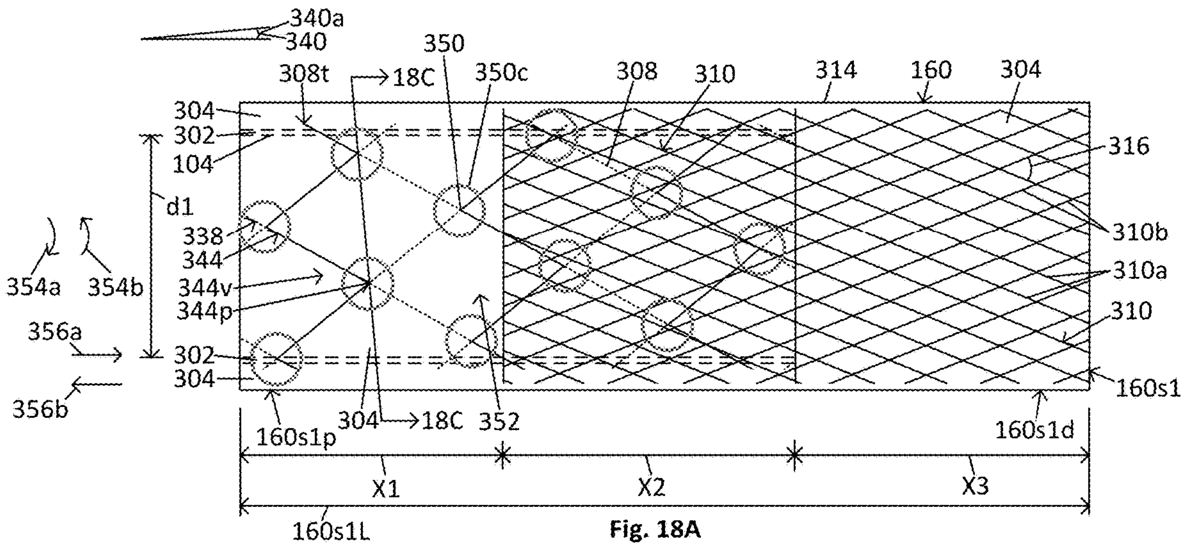
FIG. 18A is a closeup side view of the tube of FIG. 6A at section S1, for example, when the tube is in a non-expanded configuration.
Figure 18B:
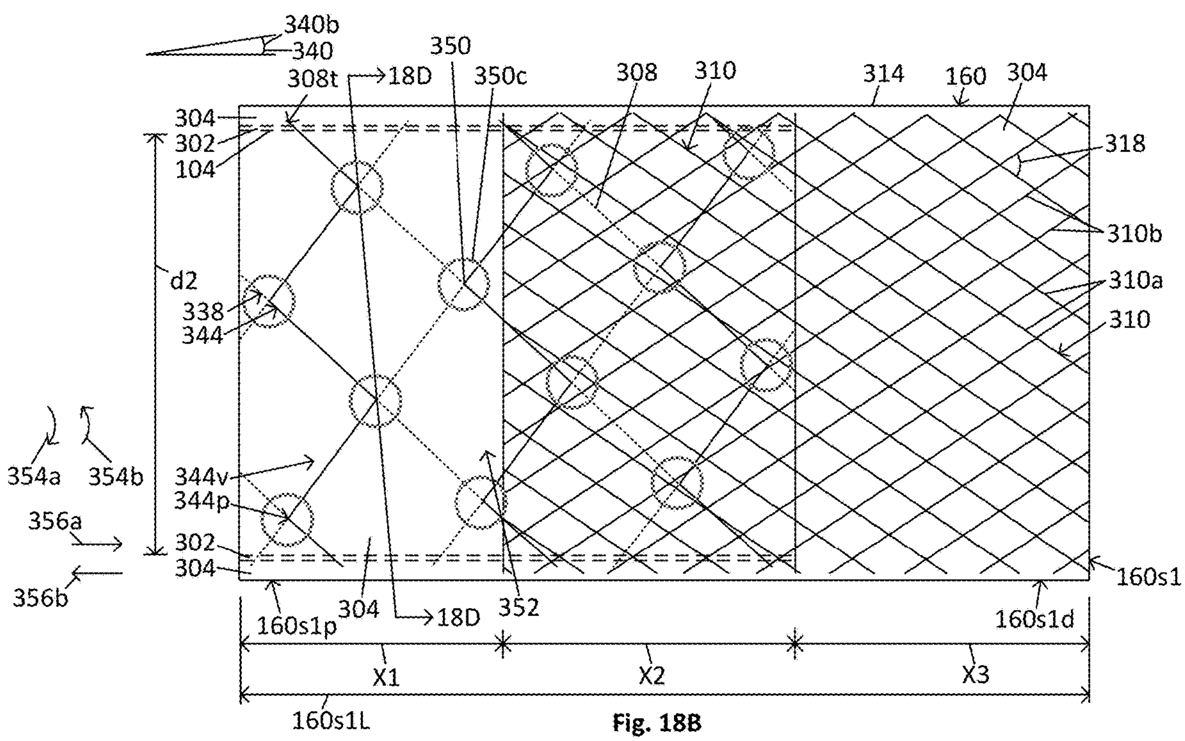
FIG. 18B is a closeup side view of the tube of FIG. 6C at section S2 after the tube is expanded, for example, when the tube is in an expanded configuration.
Figure 18C:
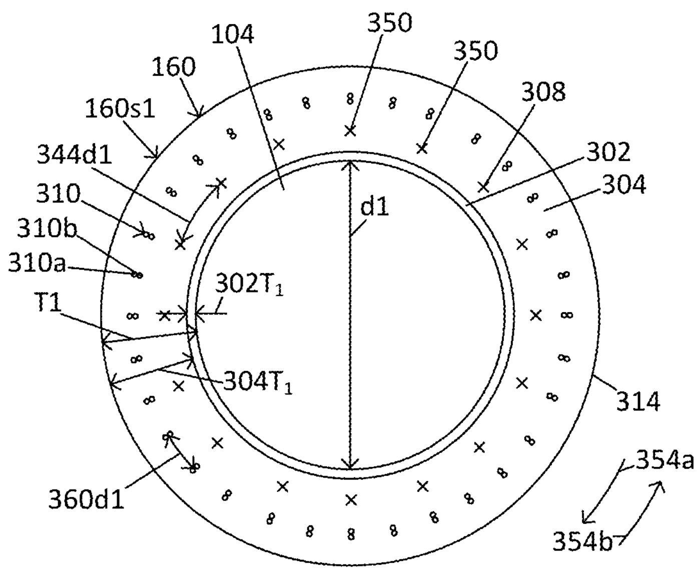
FIG. 18C illustrates a cross-sectional view of the tube of FIG. 18A taken along line 18C-18C.
Figure 18D:
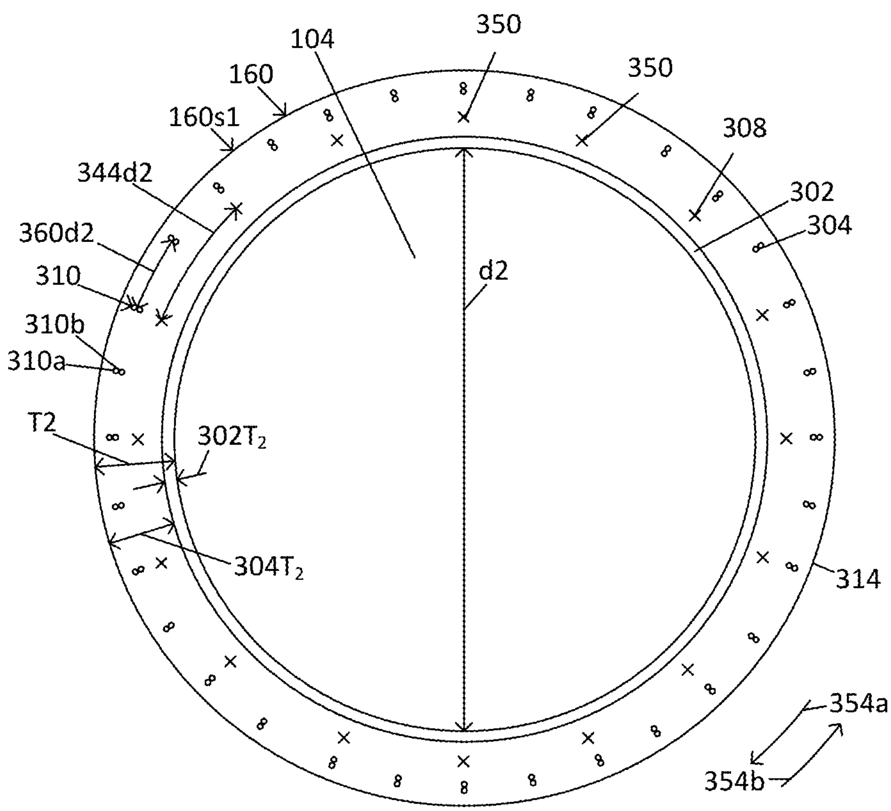
FIG. 18D illustrates a cross-sectional view of the tube of FIG. 18B taken along line 18D-18D.
Figure 18E:
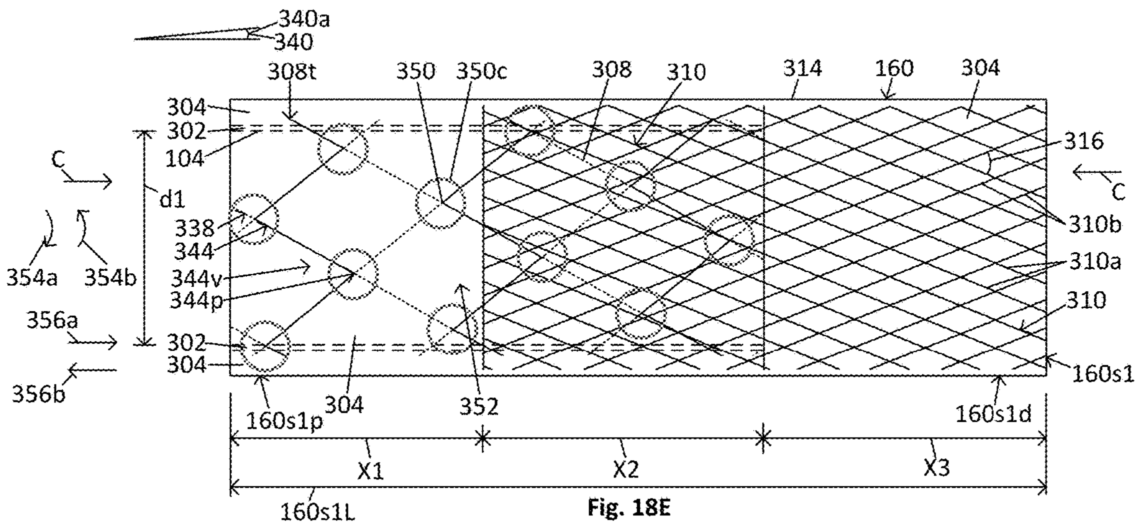
FIG. 18E is a closeup view of a compressed side of the tube of FIG. 6B at section S3. The vantage point for FIG. 18E is indicated by the view arrow V1 in FIG. 6B such that FIG. 18E illustrates the radial inside of the curve in section S3.
Figure 18F:
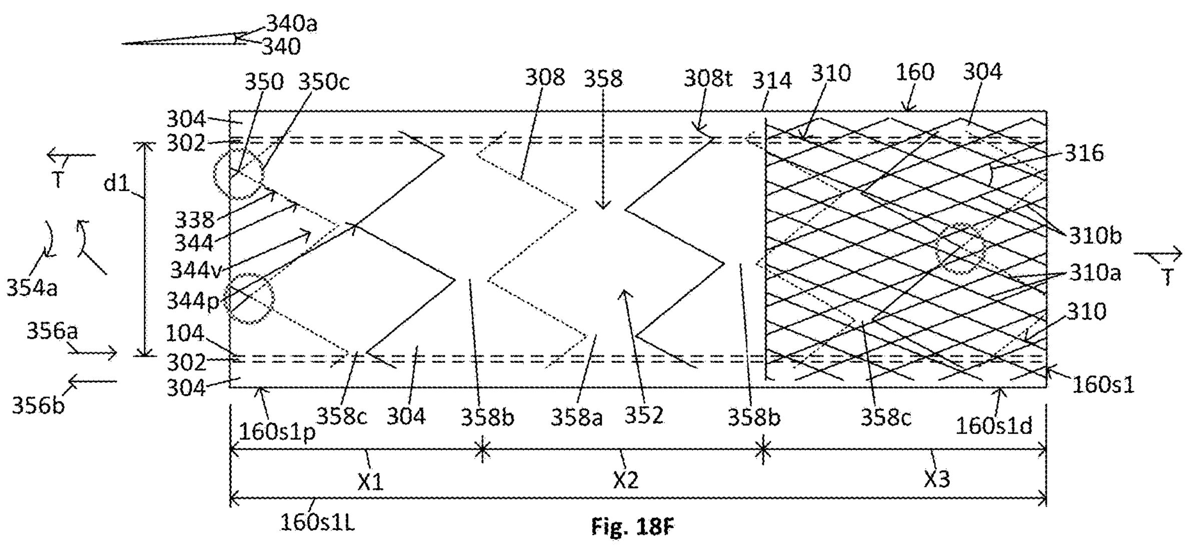
FIG. 18F is a closeup view of a tensioned side of the tube of FIG. 6B at section S3. The vantage point for FIG. 18F is indicated by the view arrow V2 in FIG. 6B such that FIG. 18F illustrates the radial outside of the curve in section S3.
Figure 18G:
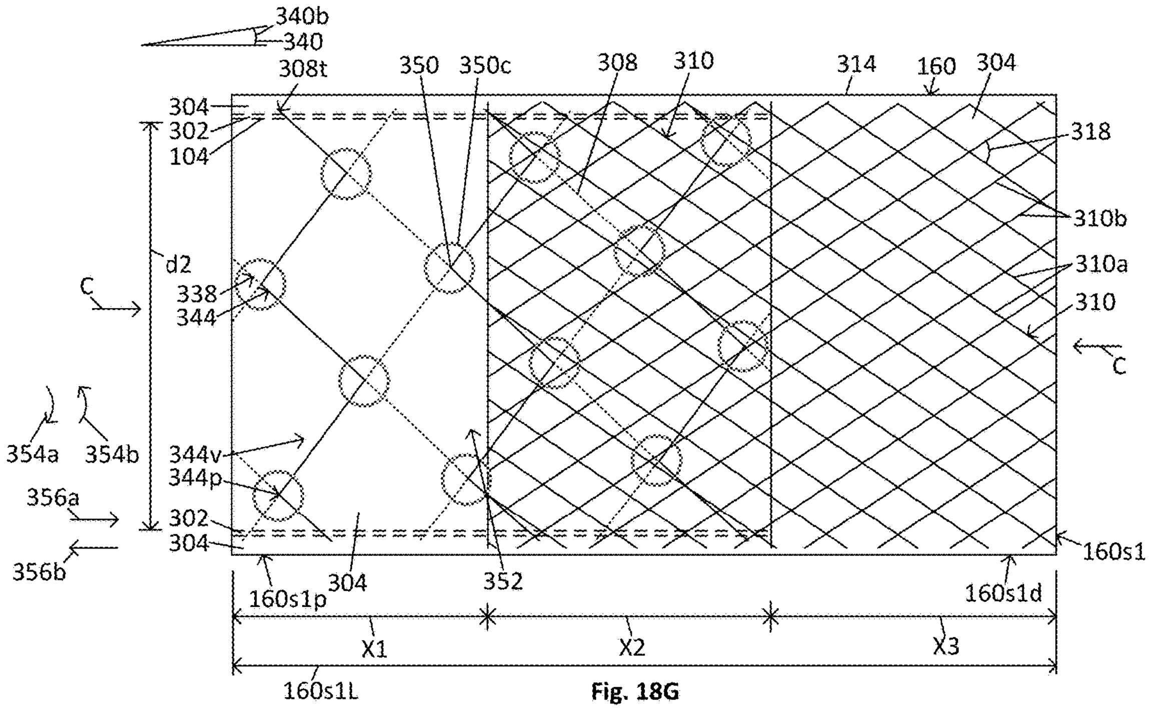
FIG. 18G is a closeup view of a compressed side of the tube of FIG. 6D at section S4. The vantage point for FIG. 18G is indicated by the view arrow V1 in FIG. 6D such that FIG. 18G illustrates the radial inside of the curve in section S4.
Figure 18H:
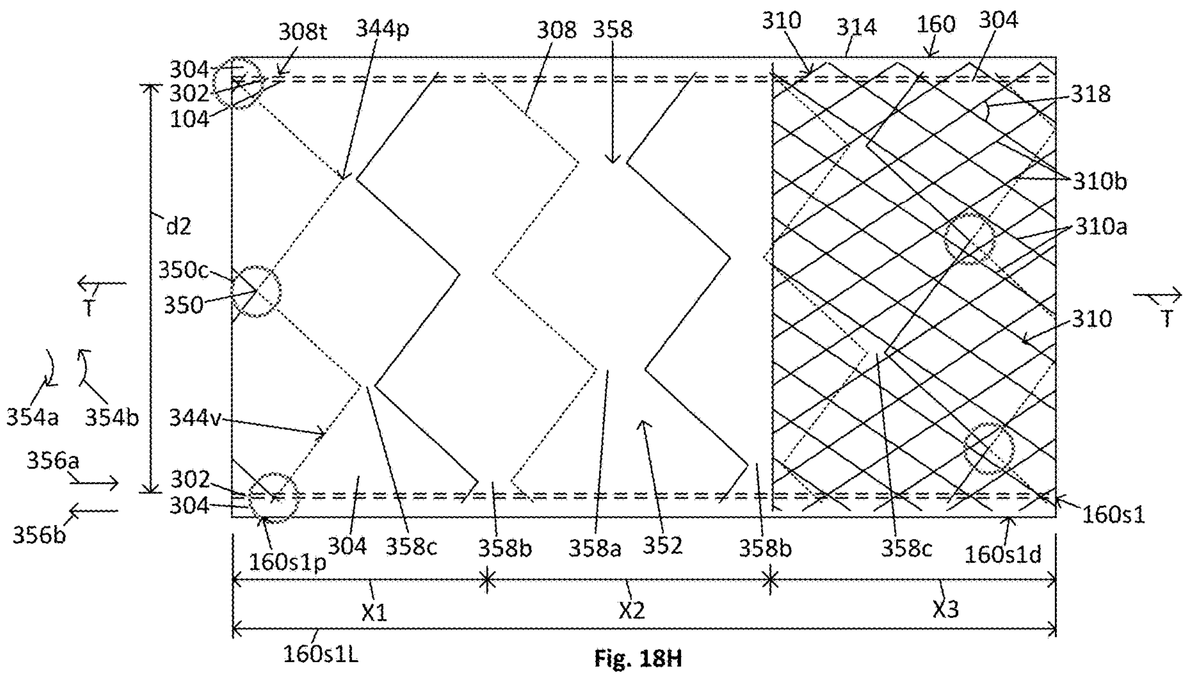
FIG. 18H is a closeup view of a tensioned side of the tube of FIG. 6D at section S4. The vantage point for FIG. 18H is indicated by the view arrow V2 in FIG. 6D such that FIG. 18H illustrates the radial outside of the curve in section S4.
Figure 19A:
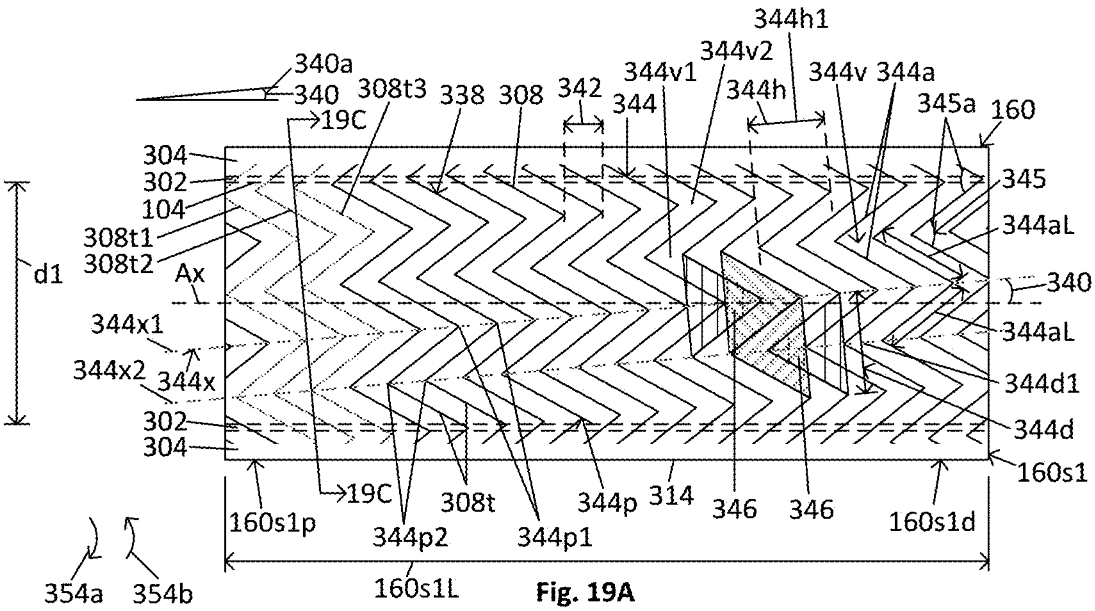
FIG. 19A is a closeup side view of the tube of FIG. 6A at section S1, for example, when the tube is in a non-expanded configuration.
Figure 19B:
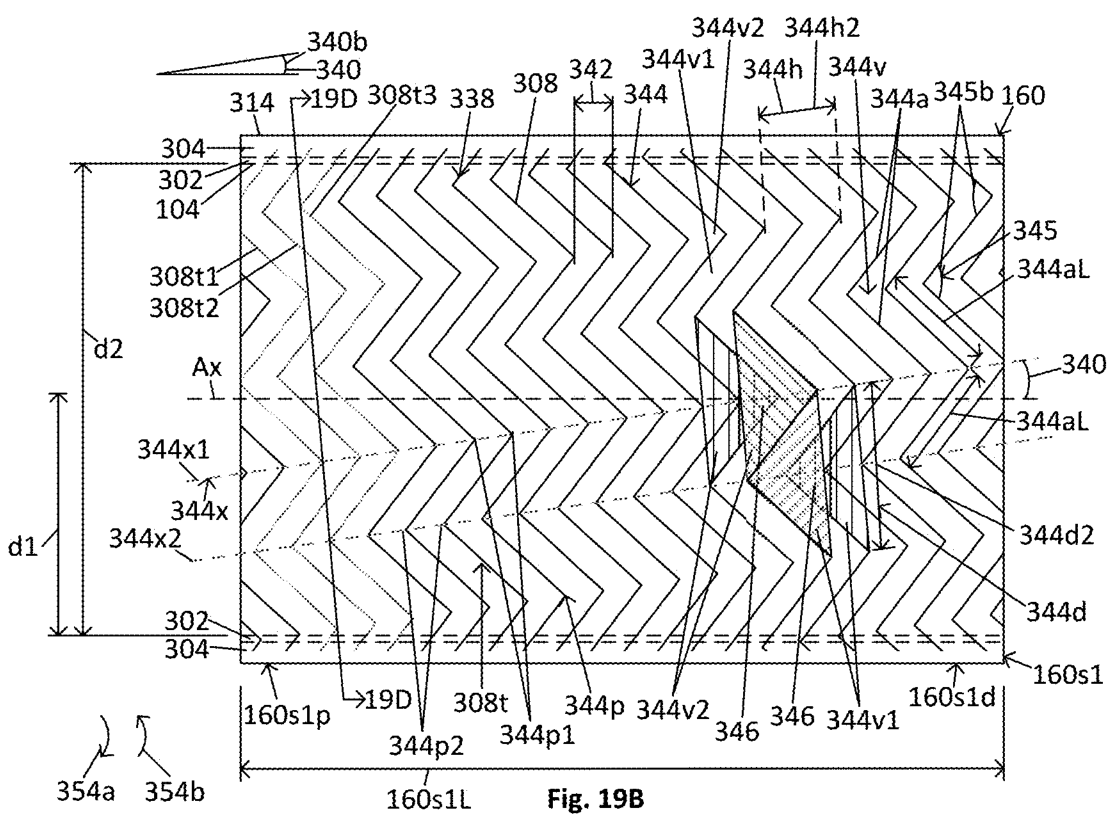
FIG. 19B is a closeup side view of the tube of FIG. 6C at section S2 after the tube is expanded, for example, when the tube is in an expanded configuration.
Figure 19C:
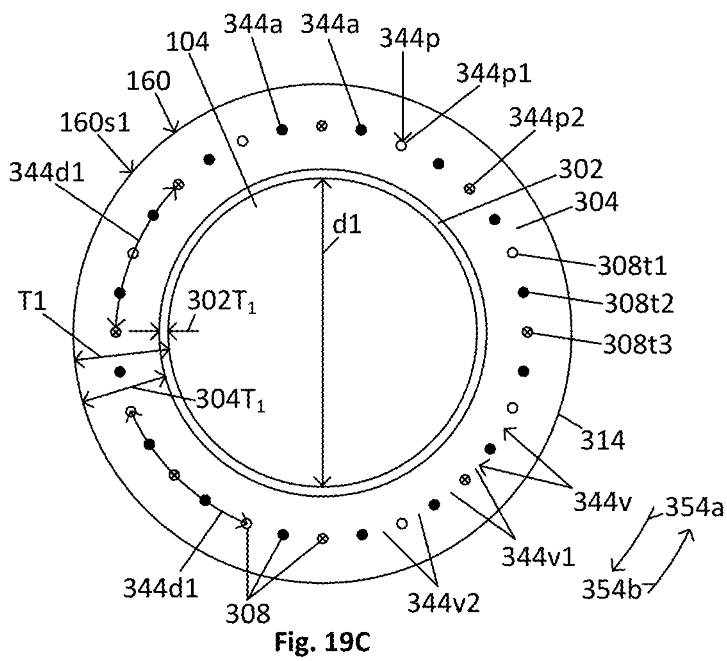
FIG. 19C illustrates a cross-sectional view of the tube of FIG. 19A taken along line 19C-19C.
Figure 19D:
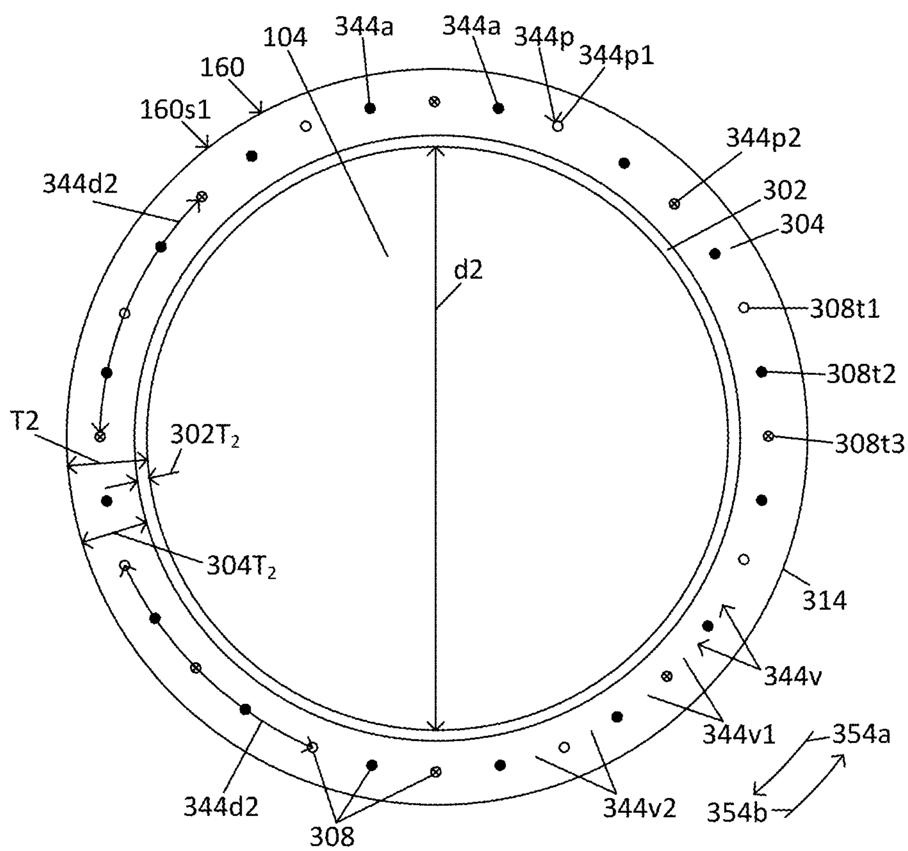
FIG. 19D illustrates a cross-sectional view of the tube of FIG. 19B taken along line 19D-19D.
Figure 20A:
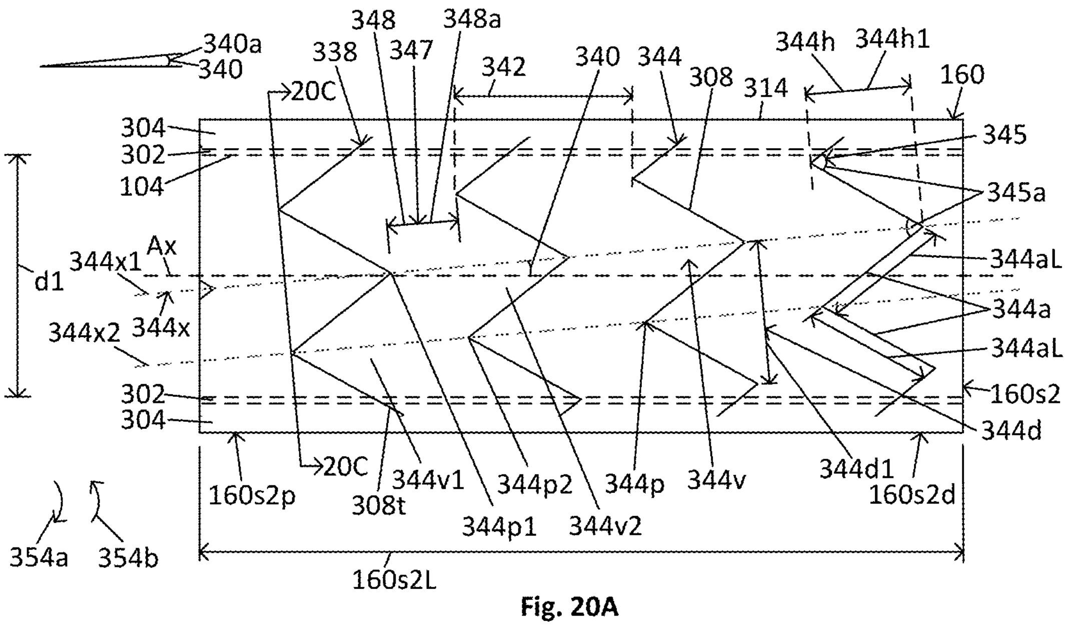
FIG. 20A is a closeup side view of the tube of FIG. 6A at section S5, for example, when the tube is in a non-expanded configuration.
Figure 20B:
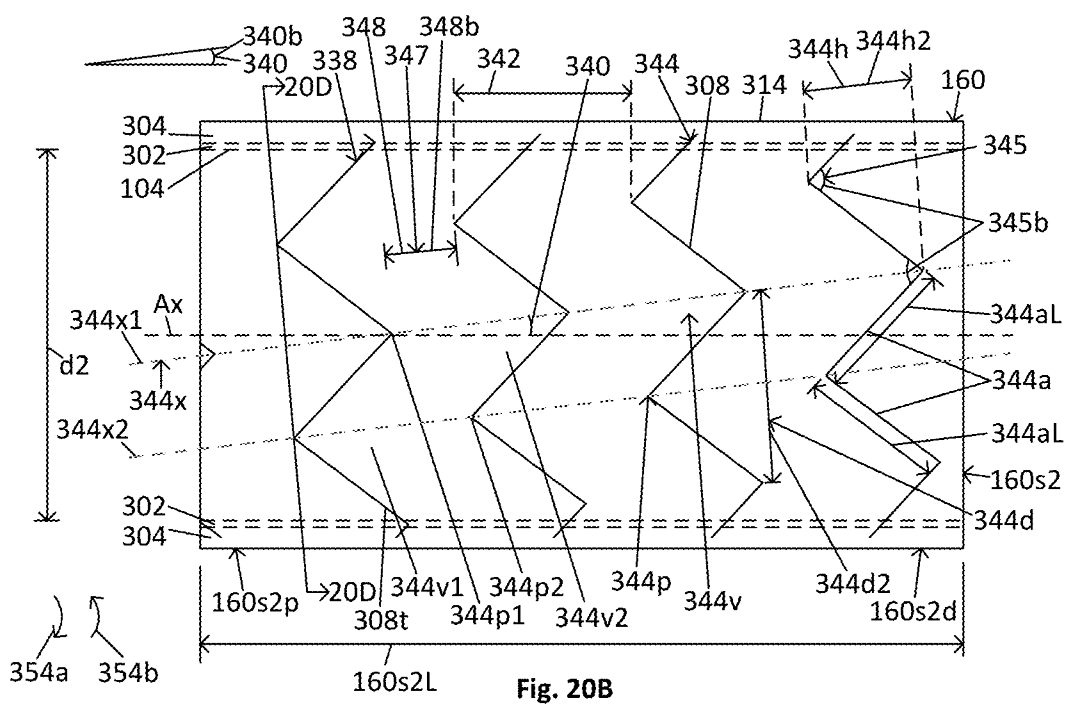
FIG. 20B is a closeup side view of the tube of FIG. 6C at section S6 after the tube is expanded, for example, when the tube is in an expanded configuration.
Figure 20C:
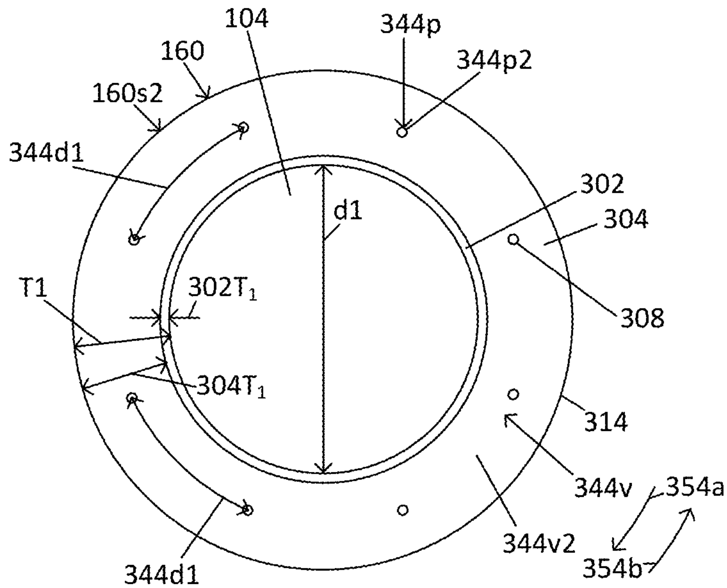
FIG. 20C illustrates a cross-sectional view of the tube of FIG. 20A taken along line 20C-20C.
Figure 20D:
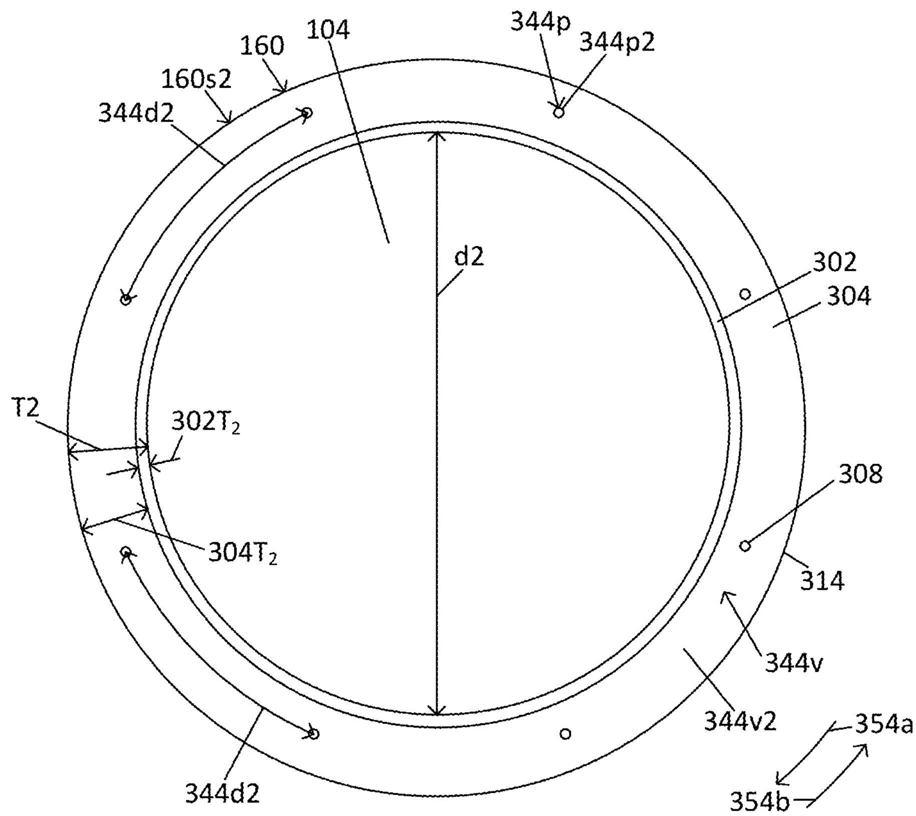
FIG. 20D illustrates a cross-sectional view of the tube of FIG. 20B taken along line 20D-20D.
Figure 21A:
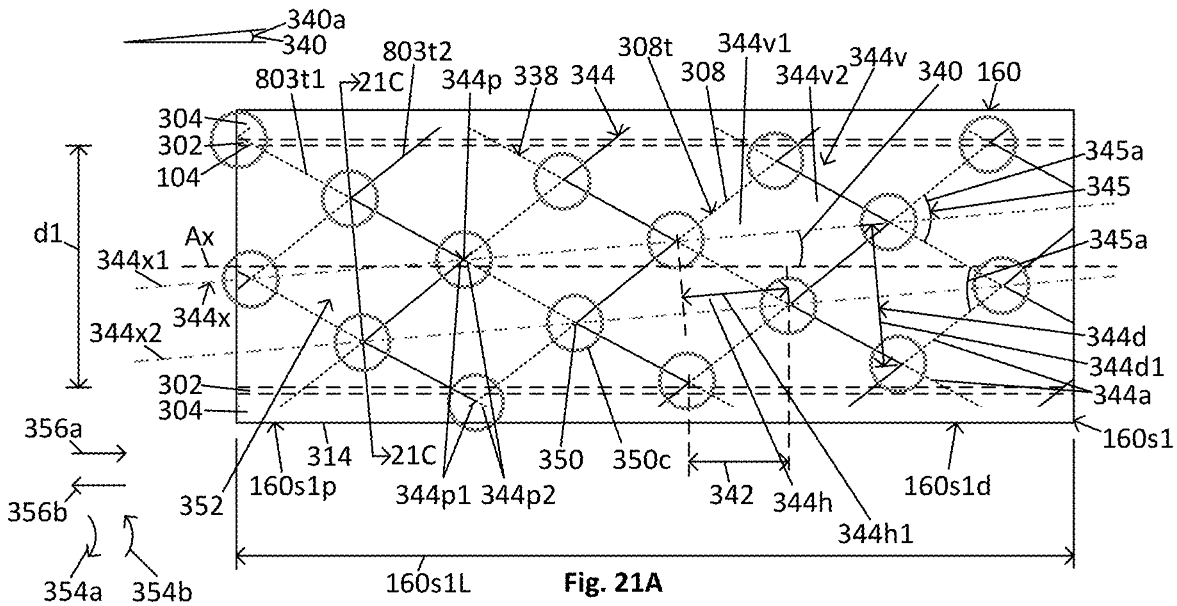
FIG. 21A is a closeup side view of the tube of FIG. 6A at section S1, for example, when the tube is in a non-expanded configuration.
Figure 21B:
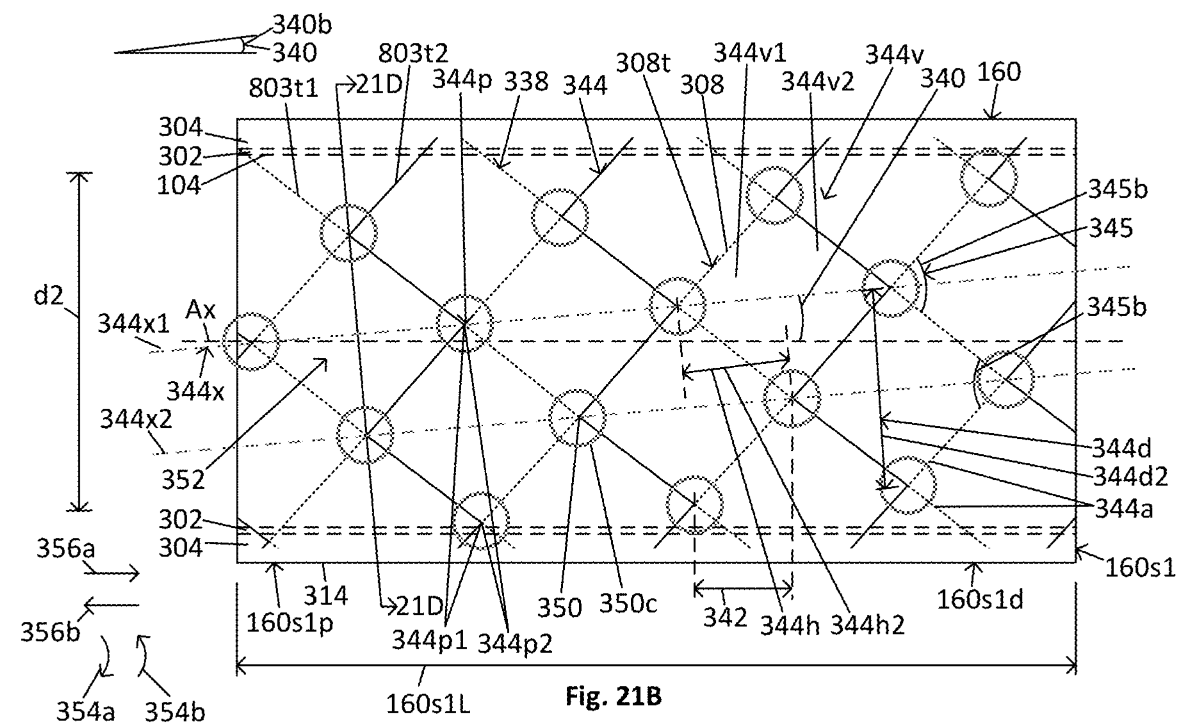
FIG. 21B is a closeup side view of the tube of FIG. 6C at section S2 after the tube is expanded, for example, when the tube is in an expanded configuration.
Figure 21C:
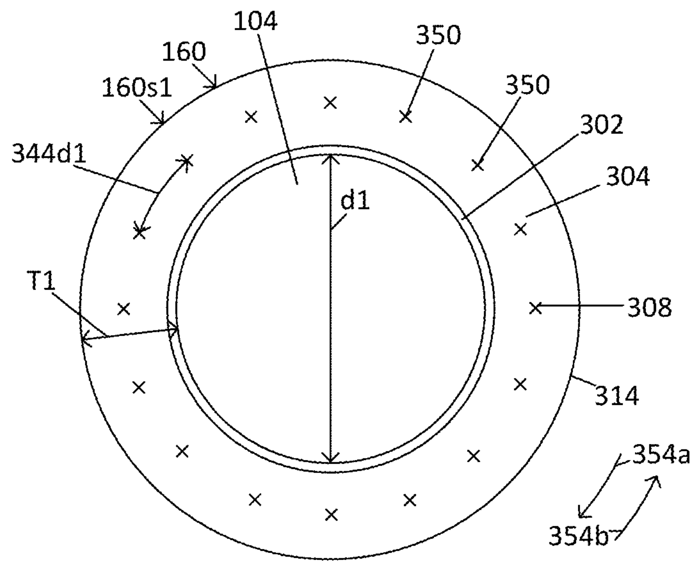
FIG. 21C illustrates a cross-sectional view of the tube of FIG. 21A taken along line 21C-21C.
Figure 21D:
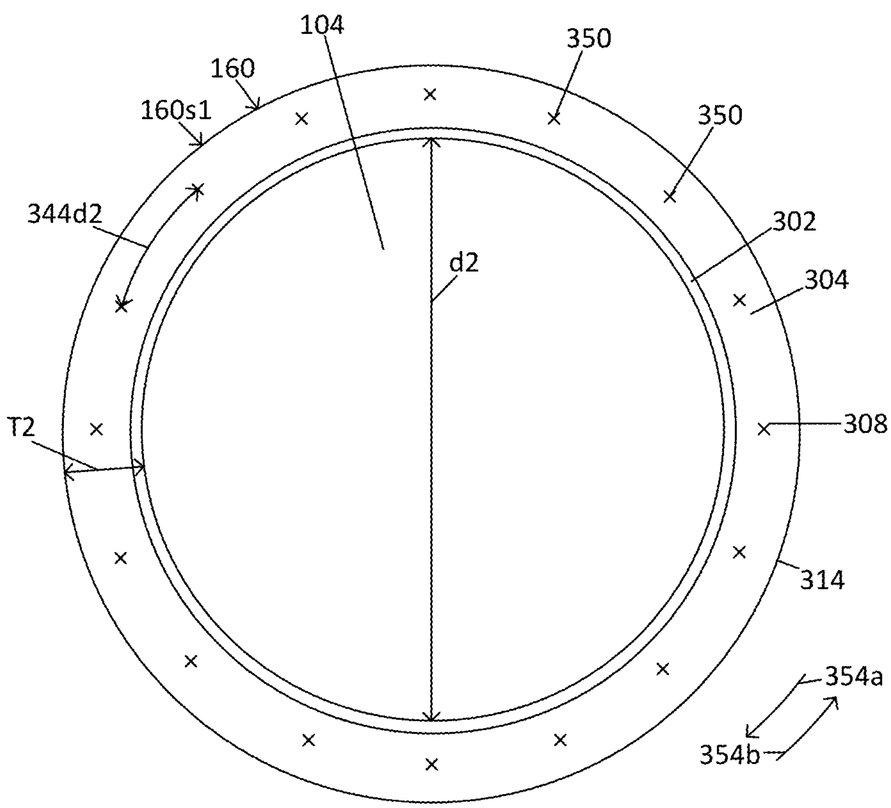
FIG. 21D illustrates a cross-sectional view of the tube of FIG. 21B taken along line 21D-21D.
Figure 21E:
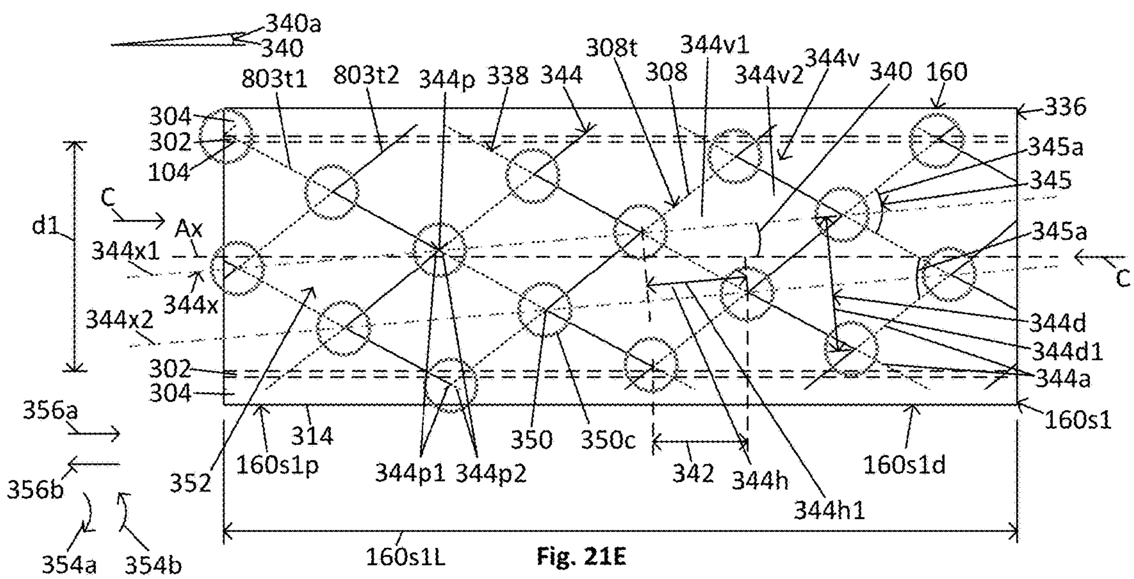
FIG. 21E is a closeup view of a compressed side of the tube of FIG. 6B at section S3. The vantage point for FIG. 21E is indicated by the view arrow V1 in FIG. 6B such that FIG. 21E illustrates the radial inside of the curve in section S3.
Figure 21F:
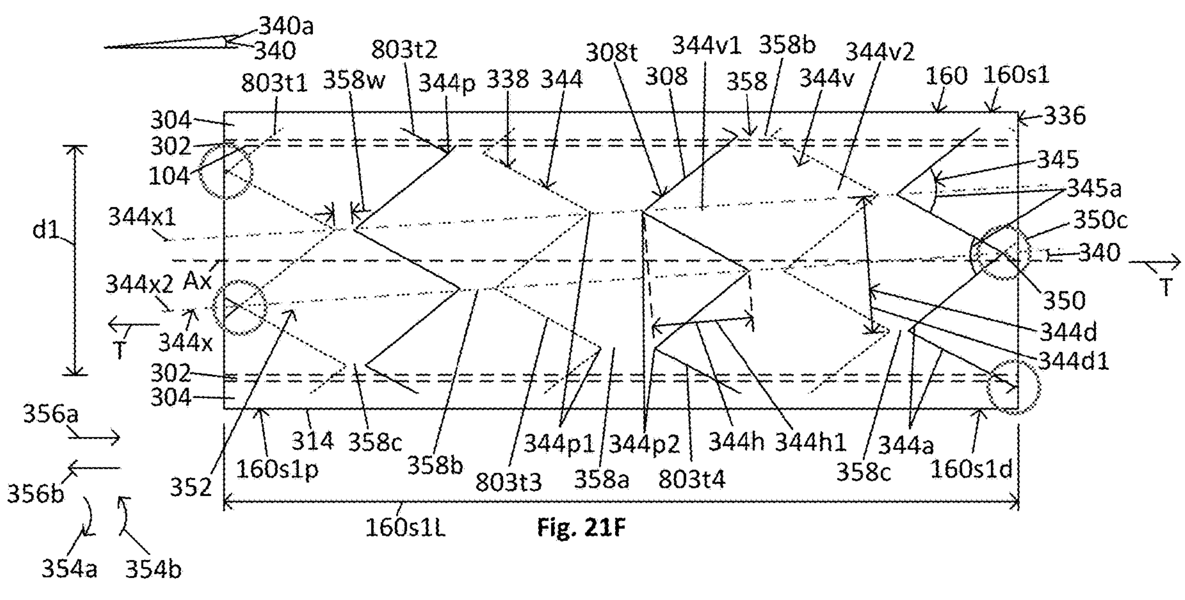
FIG. 21F is a closeup view of a tensioned side of the tube of FIG. 6B at section S3. The vantage point for FIG. 21F is indicated by the view arrow V2 in FIG. 6B such that FIG. 21F illustrates the radial outside of the curve in section S3.
Figure 21G:
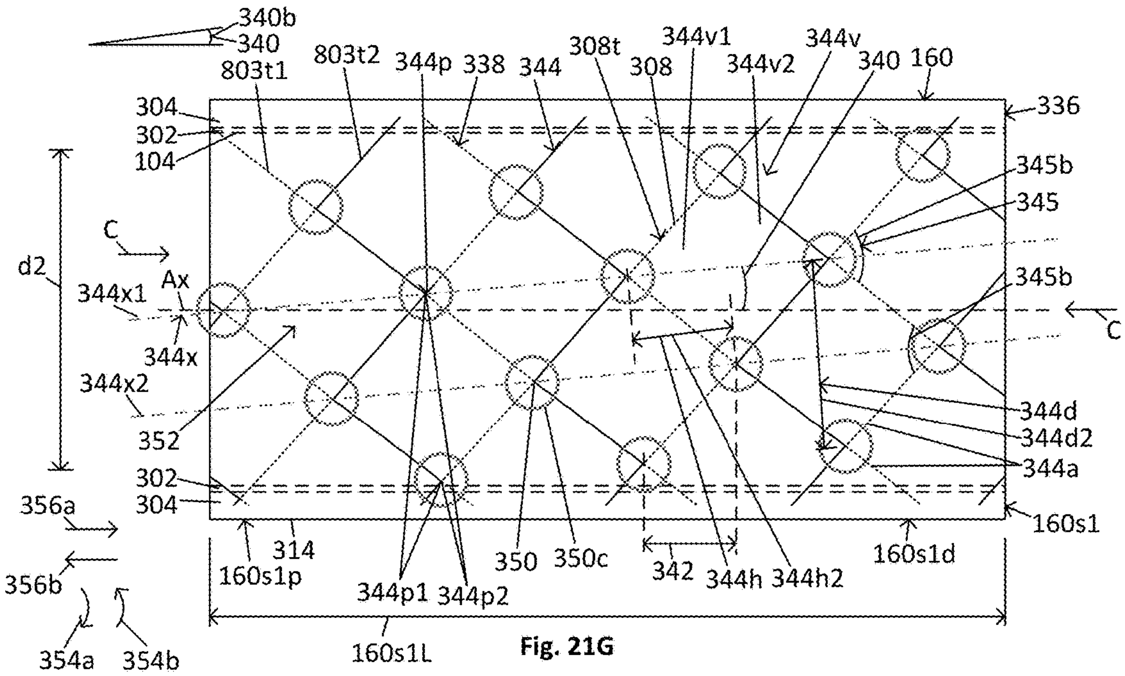
FIG. 21G is a closeup view of a compressed side of the tube of FIG. 6D at section S4. The vantage point for FIG. 21G is indicated by the view arrow V1 in FIG. 6D such that FIG. 21G illustrates the radial inside of the curve in section S4.
Figure 21H:
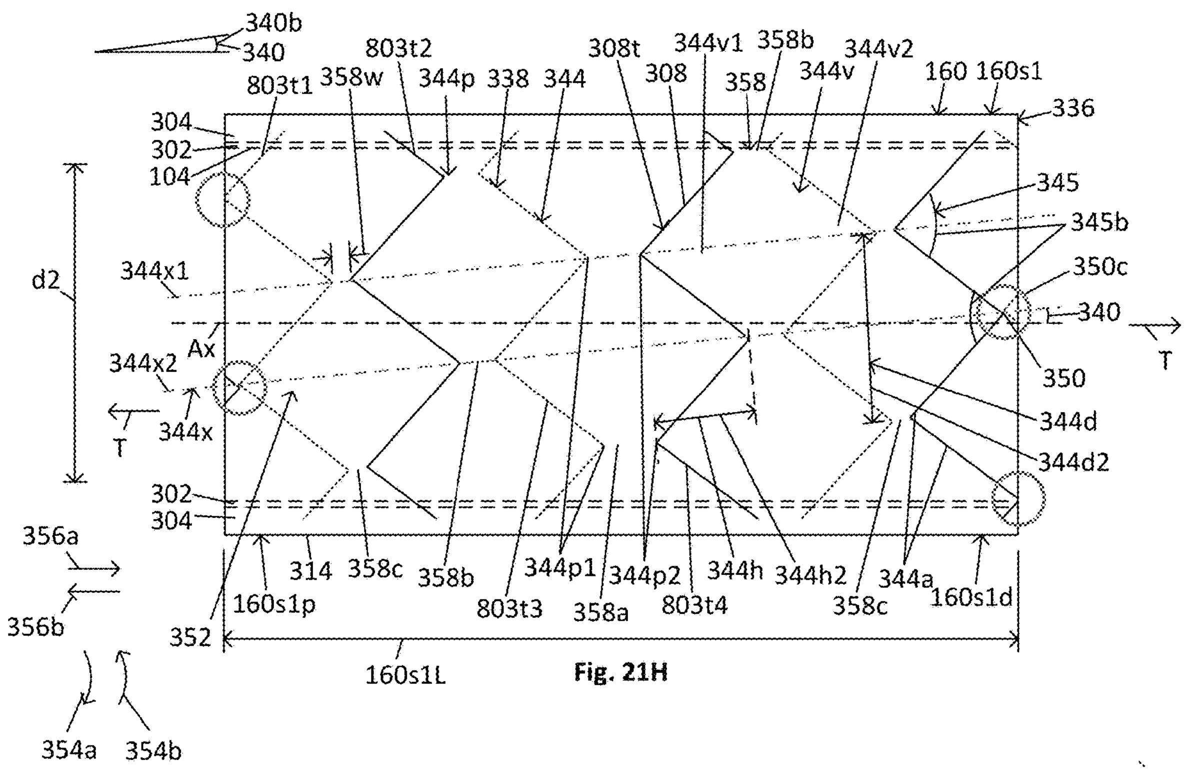
FIG. 21H is a closeup view of a tensioned side of the tube of FIG. 6D at section S4. The vantage point for FIG. 21H is indicated by the view arrow V2 in FIG. 6D such that FIG. 21H illustrates the radial outside of the curve in section S4.
Figure 22A:
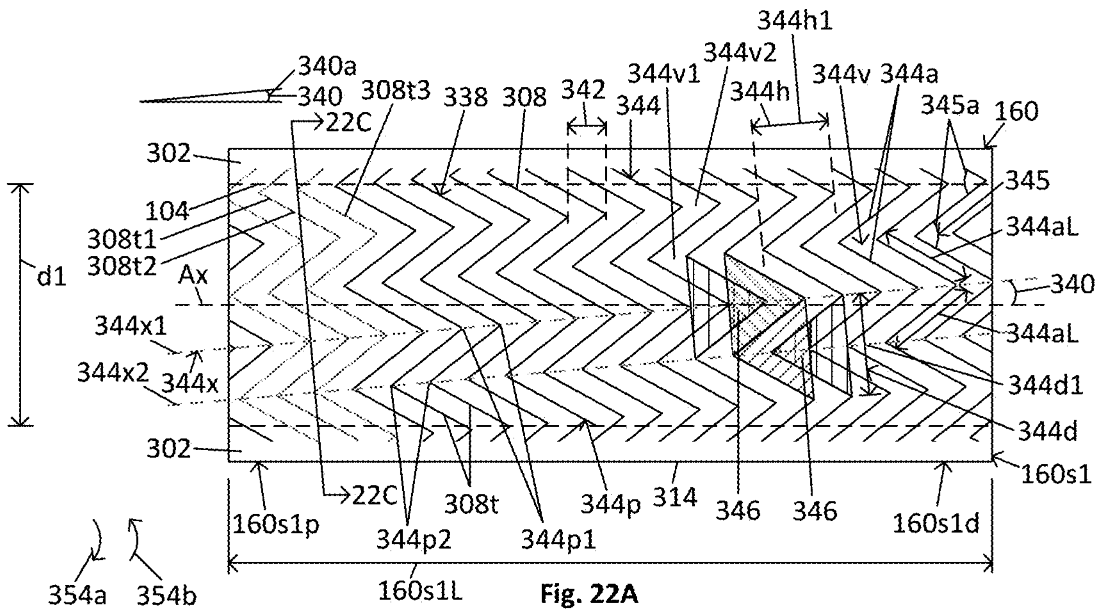
FIG. 22A is a closeup side view of the tube of FIG. 6A at section S1, for example, when the tube is in a non-expanded configuration.
Figure 22B:
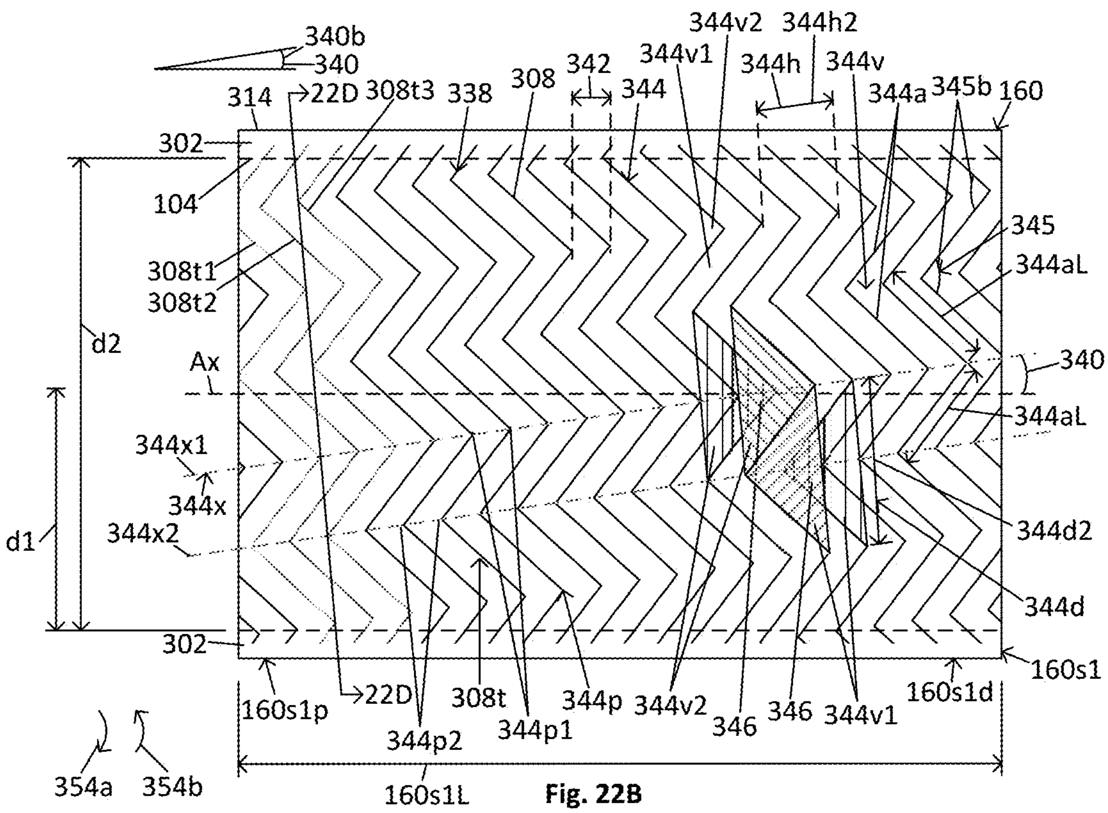
FIG. 22B is a closeup side view of the tube of FIG. 6C at section S2 after the tube is expanded, for example, when the tube is in an expanded configuration.
Figure 22C:
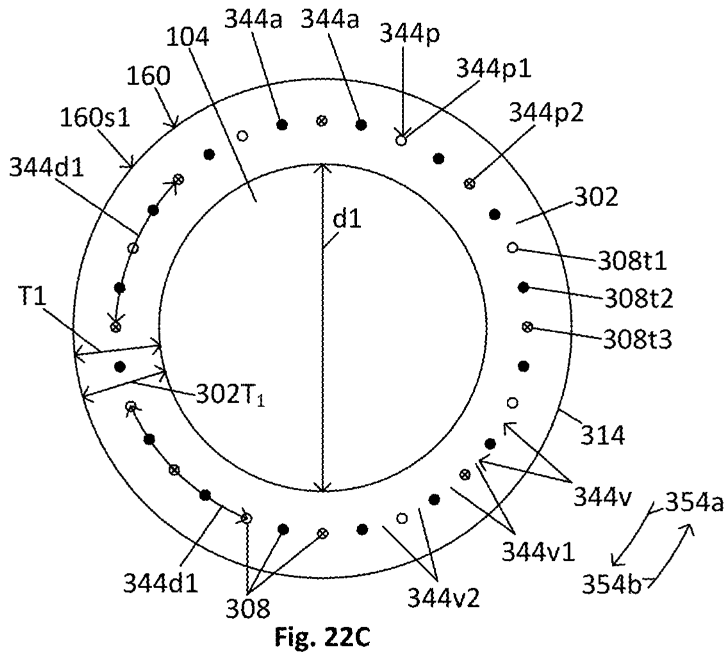
FIG. 22C illustrates a cross-sectional view of the tube of FIG. 22A taken along line 22C-22C.
Figure 22D:
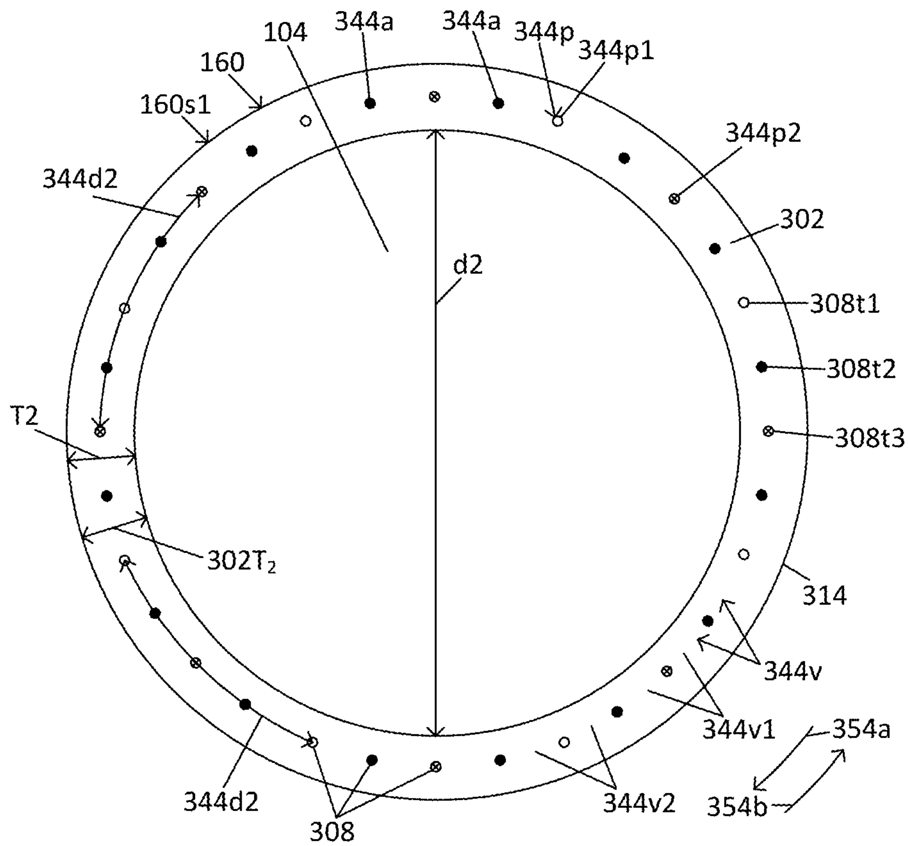
FIG. 22D illustrates a cross-sectional view of the tube of FIG. 22B taken along line 22D-22D.
Figure 23A:
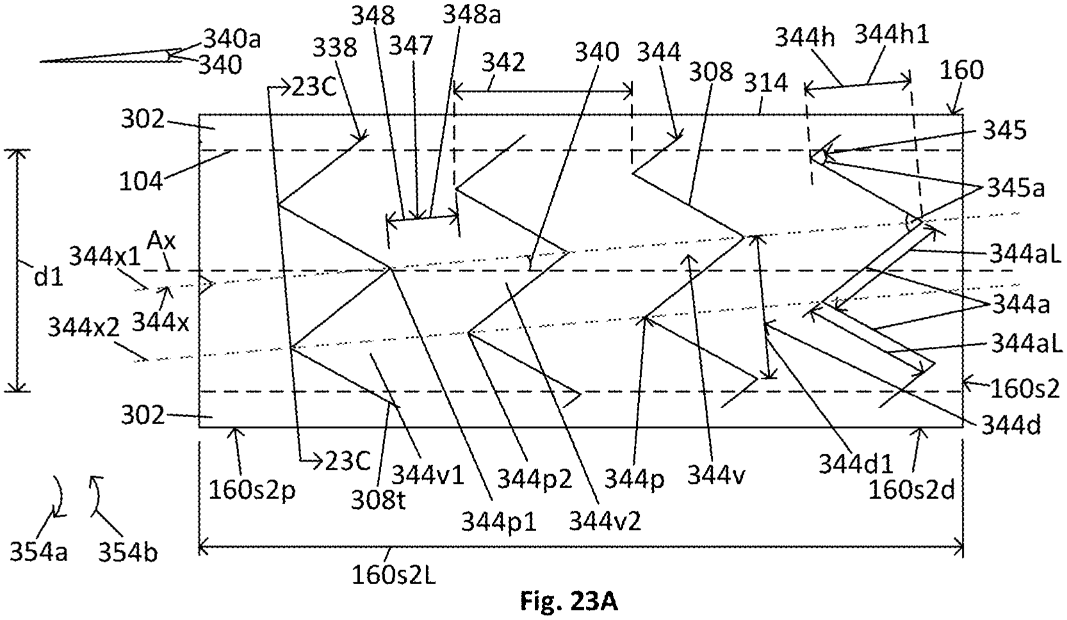
FIG. 23A is a closeup side view of the tube of FIG. 6A at section S5, for example, when the tube is in a non-expanded configuration.
Figure 23B:
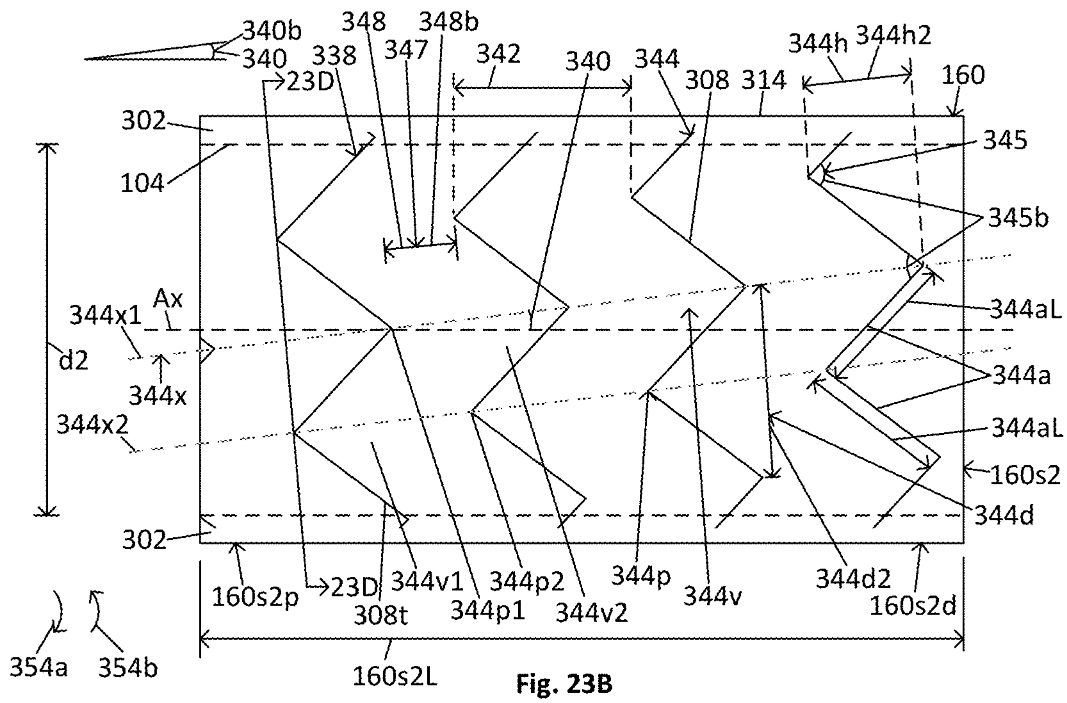
FIG. 23B is a closeup side view of the tube of FIG. 6C at section S6 after the tube is expanded, for example, when the tube is in an expanded configuration.
Figure 23C:
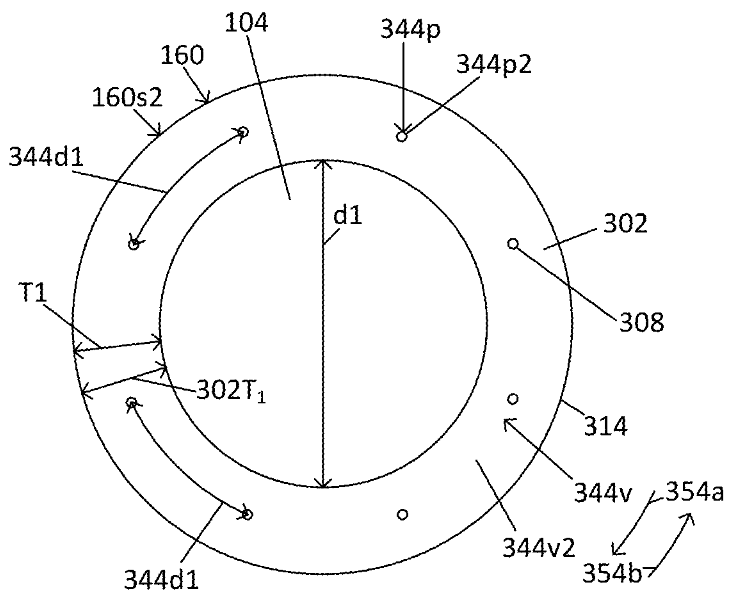
FIG. 23C illustrates a cross-sectional view of the tube of FIG. 23A taken along line 23C-23C.
Figure 23D:
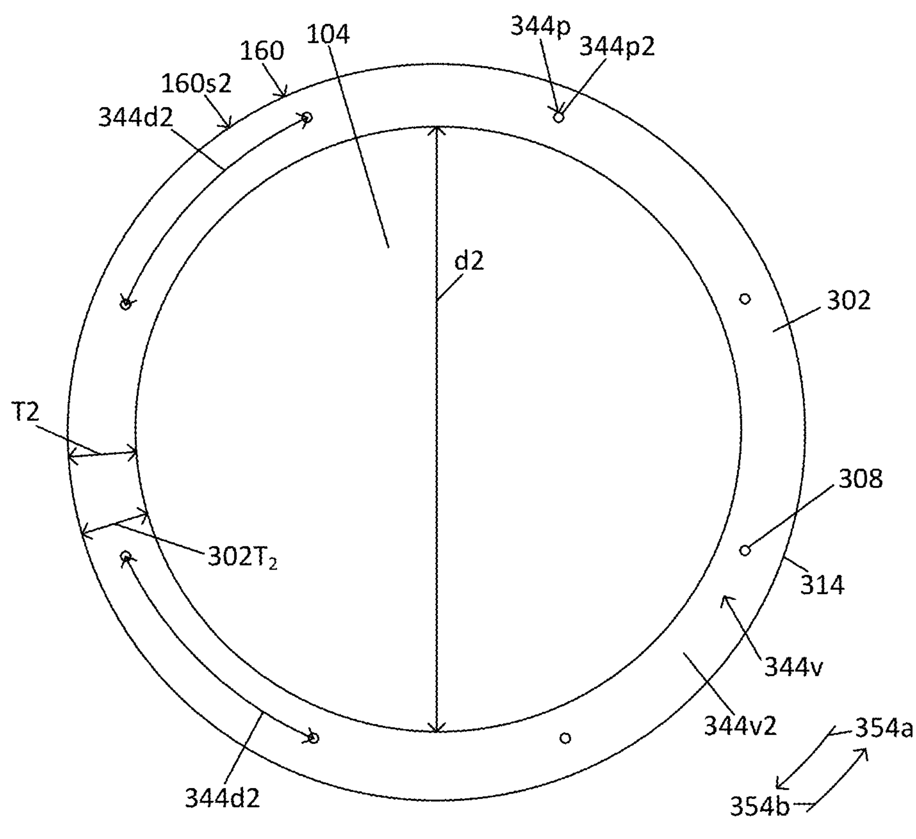
FIG. 23D illustrates a cross-sectional view of the tube of FIG. 23B taken along line 23D-23D.
Figure 24A:
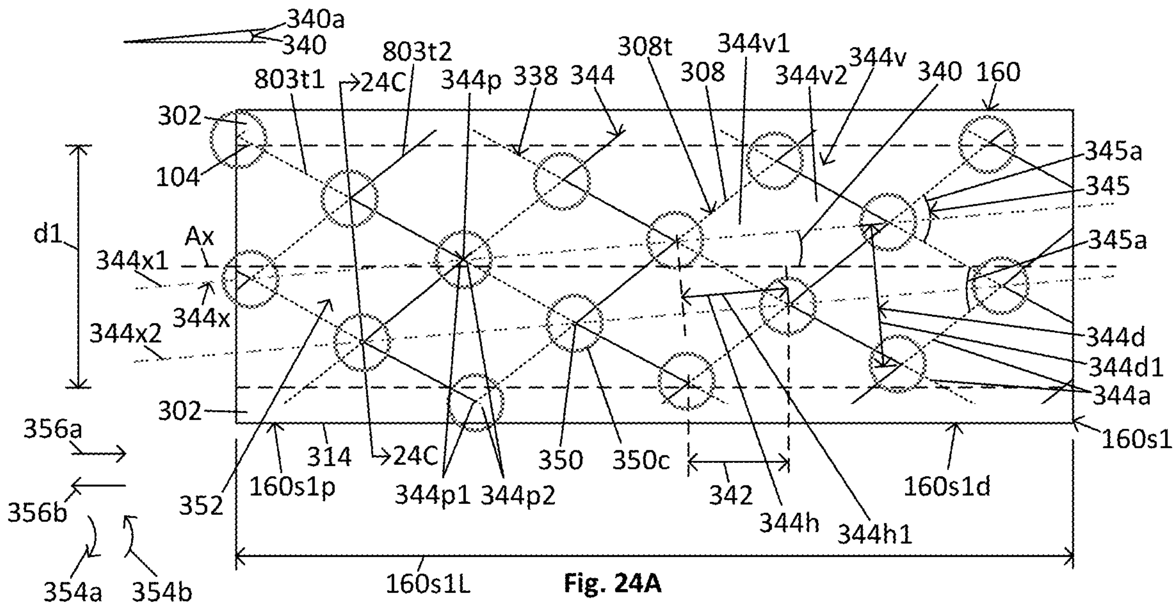
FIG. 24A is a closeup side view of the tube of FIG. 6A at section S1, for example, when the tube is in a non-expanded configuration.
Figure 24B:
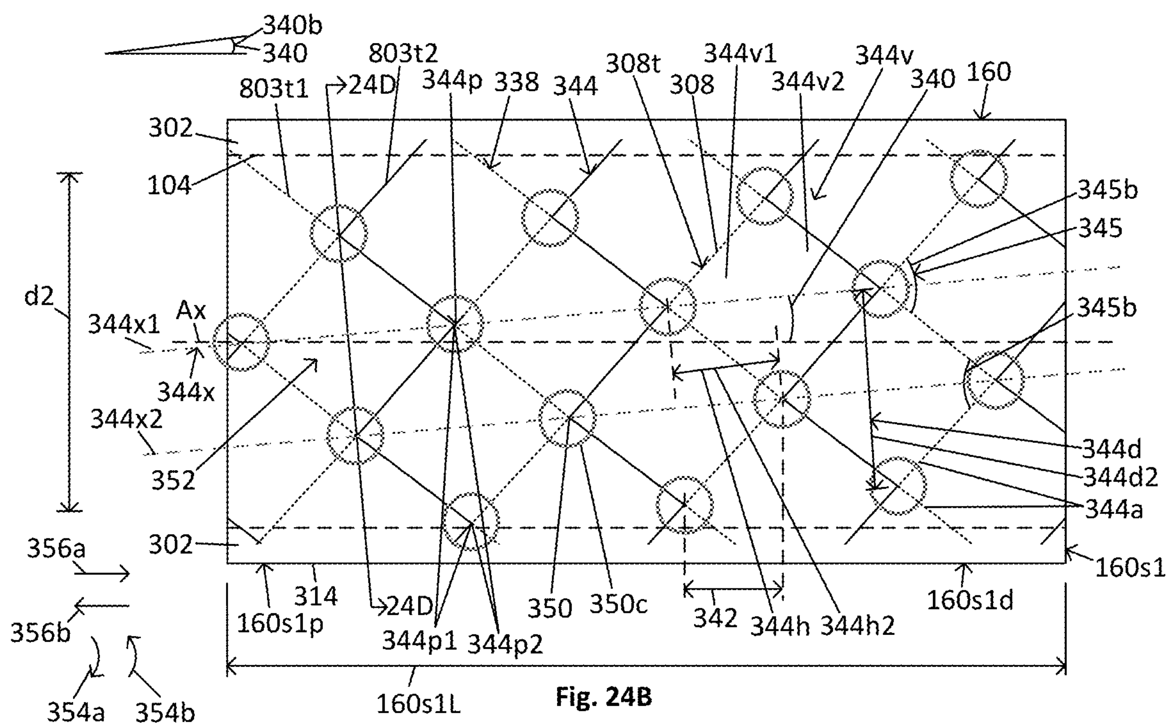
FIG. 24B is a closeup side view of the tube of FIG. 6C at section S2 after the tube is expanded, for example, when the tube is in an expanded configuration.
Figure 24C:
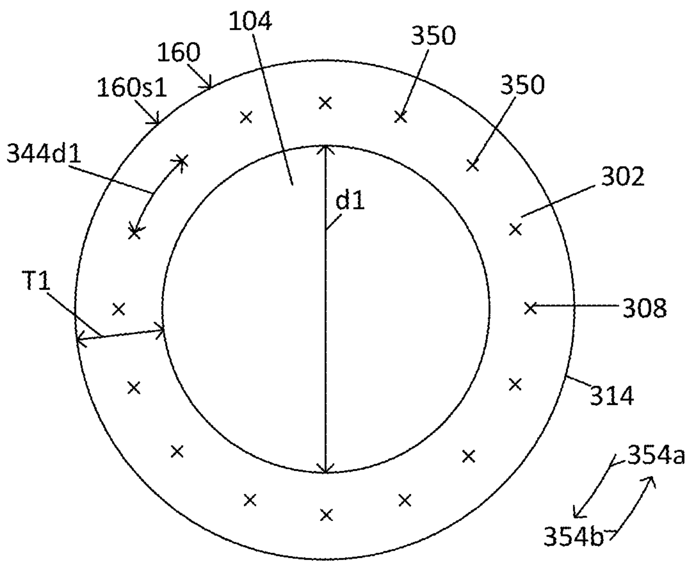
FIG. 24C illustrates a cross-sectional view of the tube of FIG. 24A taken along line 24C-24C.
Figure 24D:
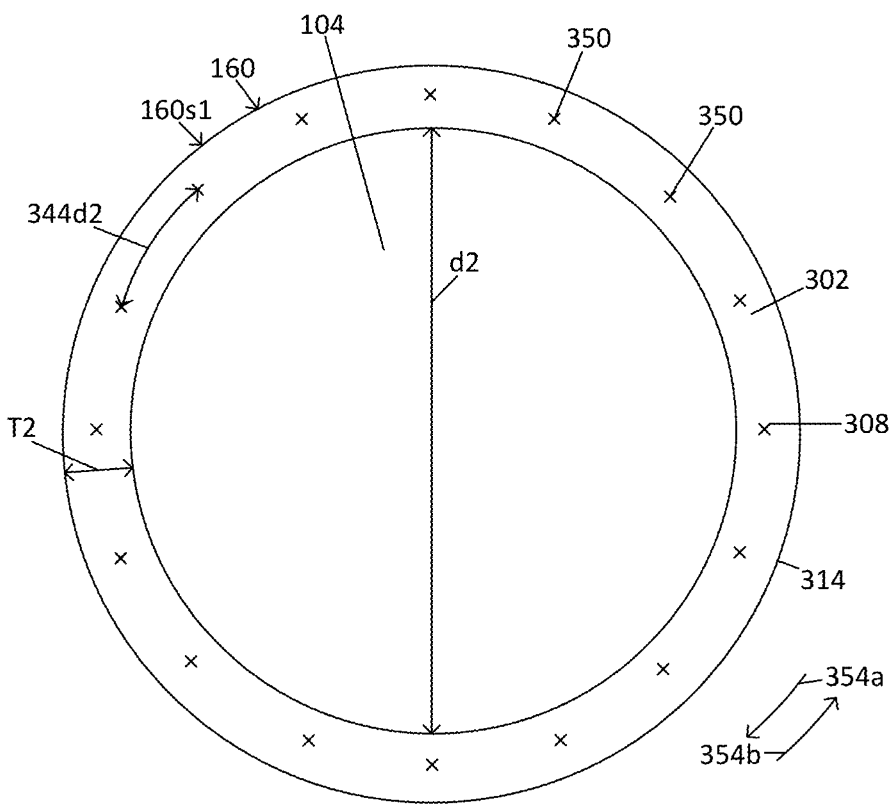
FIG. 24D illustrates a cross-sectional view of the tube of FIG. 24B taken along line 24D-24D.
Figure 24E:
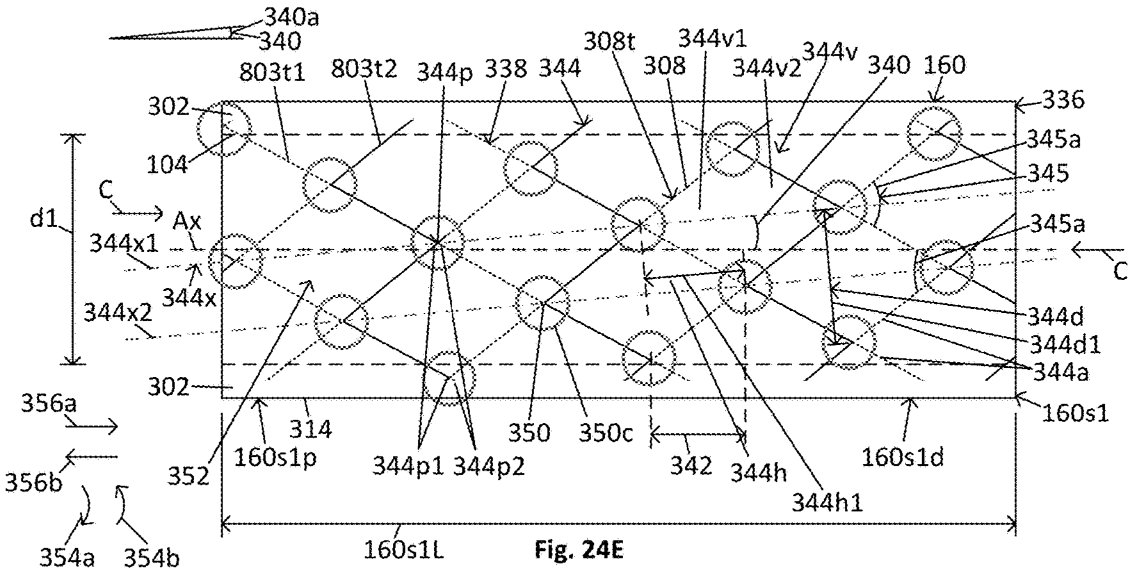
FIG. 24E is a closeup view of a compressed side of the tube of FIG. 6B at section S3. The vantage point for FIG. 24E is indicated by the view arrow V1 in FIG. 6B such that FIG. 24E illustrates the radial inside of the curve in section S3.
Figure 24F:
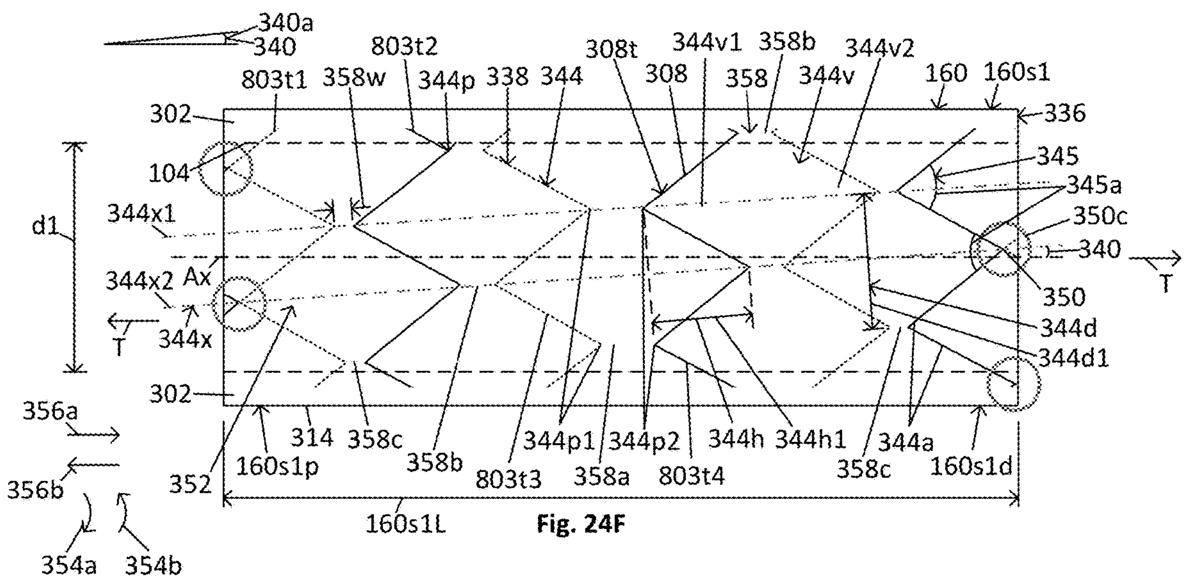
FIG. 24F is a closeup view of a tensioned side of the tube of FIG. 6B at section S3. The vantage point for FIG. 24F is indicated by the view arrow V2 in FIG. 6B such that FIG. 24F illustrates the radial outside of the curve in section S3.
Figure 24G:
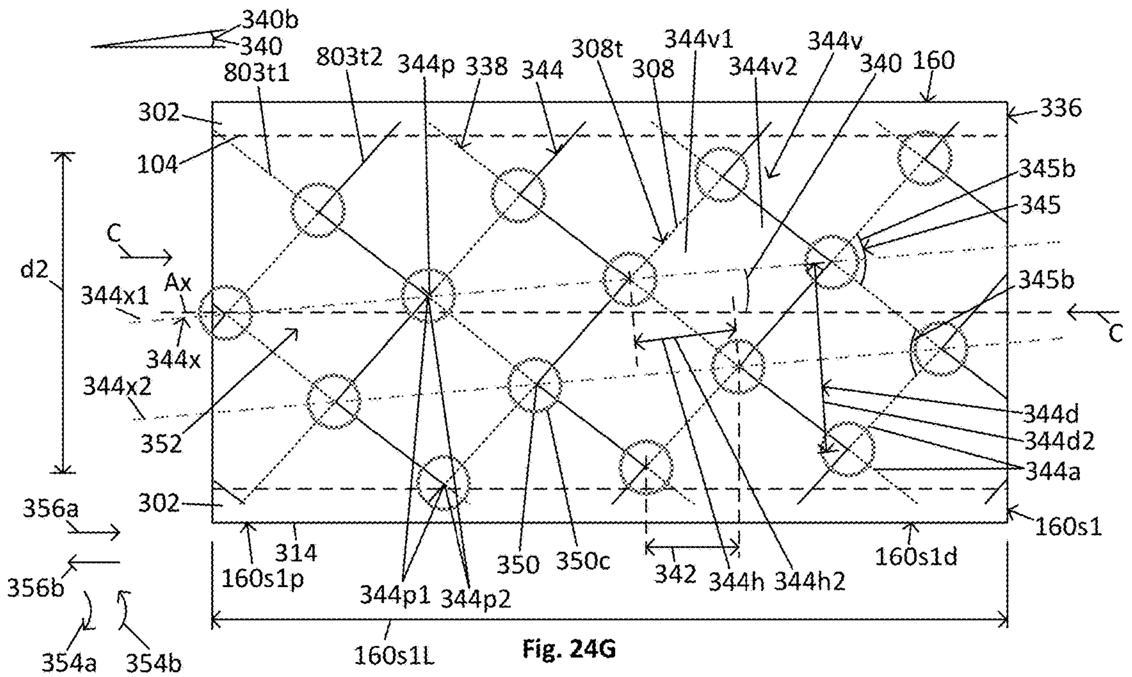
FIG. 24G is a closeup view of a compressed side of the tube of FIG. 6D at section S4. The vantage point for FIG. 24G is indicated by the view arrow V1 in FIG. 6D such that FIG. 24G illustrates the radial inside of the curve in section S4.
Figure 24H:
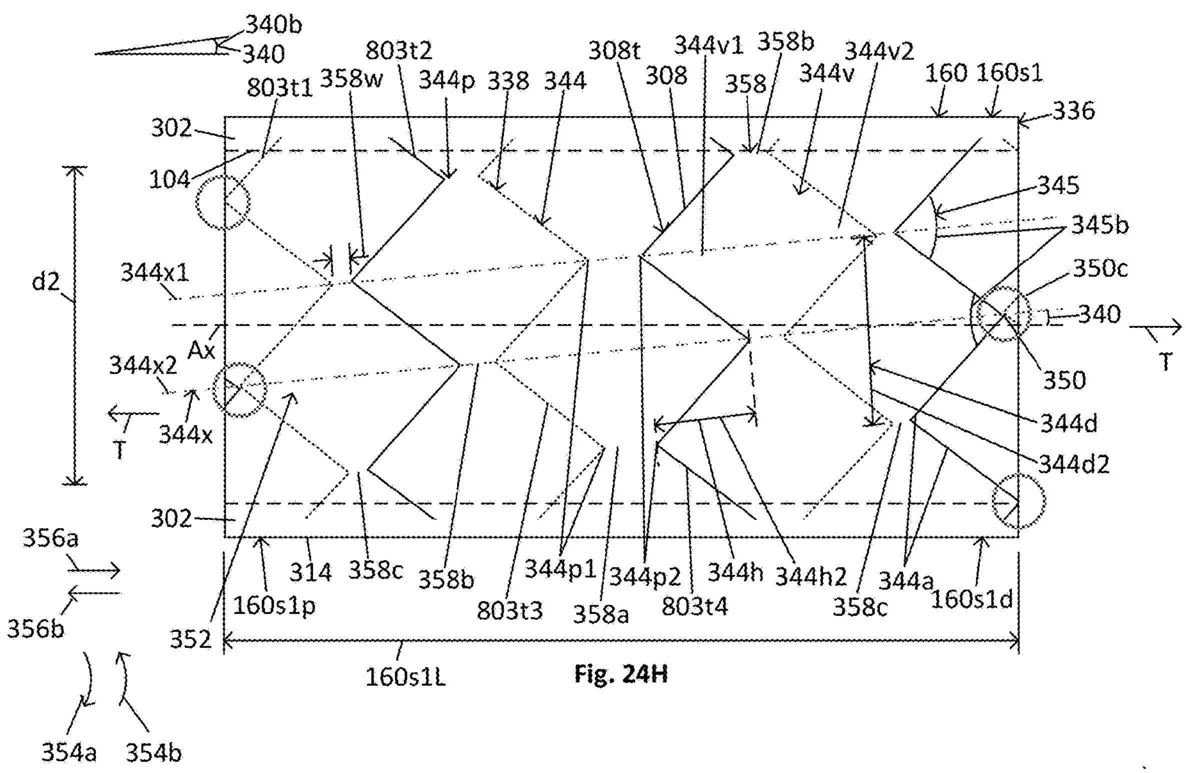
FIG. 24H is a closeup view of a tensioned side of the tube of FIG. 6D at section S4. The vantage point for FIG. 24H is indicated by the view arrow V2 in FIG. 6D such that FIG. 24H illustrates the radial outside of the curve in section S4.

FIGS. 9A-9H illustrate a variation of the tube 160. For example, FIGS. 9A-9H illustrate the tube 160 in FIGS. 7A-7D with a different reinforcement 308 than the reinforcement 308 shown in FIGS. 7A-7D. For example, whereas FIGS. 7A-7D illustrate that the reinforcement 308 can have a nested peak-to-valley configuration, FIGS. 9A-9H illustrate that the reinforcement 308 can have a peak-to-peak configuration. FIGS. 9A-9H illustrate that the peak-to-peak configuration of the reinforcement 308 can be a non-nested configuration in which peaks 344p (e.g., apexes of peaks 344p) of adjacent turns 308t can contact each other. As another example, FIGS. 9A-9H illustrate that the peak-to-peak configuration of the reinforcement 308 can be a non-nested configuration, for example, a separated configuration in which peaks 344p (e.g., apexes of peaks 344p) of adjacent turns 308t can contact each other. For example, FIG. 9A illustrates a closeup of the tube 160 at section S1 in FIG. 6A, FIG. 9B illustrates a closeup of the tube 160 at section S2 in FIG. 6C, FIGS. 9E and 9F illustrate closeups of the tube 160 at section S3 in FIG. 6B, and FIGS. 9G and 9H illustrate closeups of the tube 160 at section S4 in FIG. 6D.

FIGS. 9A-9H illustrate, for example, that the peaks 344p (e.g., the oppositely facing peaks 344p) of adjacent turns 308t can be adjacent each other. For example, FIGS. 9A-9H illustrate that the first and second peaks 344p1, 344p2 can be adjacent to each other on adjacent turns 308t.

The peaks 344p can contact each other in a peak-to-peak configuration. For example, FIGS. 9A-9D illustrate that the peaks 344p can contact each other and/or be in proximity (e.g., close proximity) to each other at points 350, for example, when the tube 160 is in a straight, unexpanded configuration (e.g., FIGS. 9A & 9C) and when the tube 160 is in a straight, expanded configuration (e.g., FIGS. 9B & 9D). Two peaks 344p (e.g., two adjacent peaks 344p) can be considered to be in proximity to each other at points 350 when the distance across a gap 308g between the two peaks 344p and/or between two turns 803t (e.g., the distance between the apex of two adjacent peaks 344p) is 0.0 mm to 1.5 mm, or more narrowly, 0.0 mm to 0.5 mm, including every 0.1 mm increment within these ranges (e.g., (0.0 mm, 0.1 mm, 0.2 mm, 0.5 mm, 1.0 mm, 1.5 mm). A distance of 0.0 mm between two adjacent peaks can indicate that the adjacent peaks 344p are in contact with each other. A distance of 0.0 mm between two adjacent peaks can indicate that the adjacent peaks 344p are in direct contact with each other. A distance of 0.1 mm to 1.5 mm, or more narrowly, 0.1 mm to 0.5 mm, can indicate that a material (e.g., the material of layer 302, layer 304, or layer 306) is between the two adjacent peaks but that the two adjacent peaks are close enough together to be considered in contact with each other or are close enough together such that a force and/or a torque is transferrable across the point 350. The points 350 can be, for example, force transfer points and/or torque transfer points. FIGS. 9A-9D illustrate that the peaks 344p can contact each other. For example, FIGS. 9A-9D illustrate that the distance between adjacent peaks 344*p* can be 0.0 mm. As another example, the peaks 344*p* may not contact each other when the tube 160 is in a straight, unexpanded configuration and/or when the tube 160 is in a straight, expanded configuration.

The peaks 344*p* can be releasably engageable with each other. For example, FIGS. 9A-9H illustrate that the peaks 344*p* (e.g., the oppositely facing peaks 344*p*) can move into and out of contact with each other, for example, as the tube 160 bends and straightens during navigation to and/or from a target site (e.g., a location in a blood vessel). For example, FIGS. 9A-9H illustrate that the first and second peaks 344*p*1, 344*p*2 can be releasably engageable with each other (e.g., releasably contact each other) on adjacent turns 308*t* of the reinforcement 308. For example, FIGS. 9A-9H illustrate that the first peaks 344*p*1 can move into and out of contact with the second peaks 344*p*2 on an adjacent turn 308*t* as the tube 160 bends and straightens during navigation to and/or from a target site.

FIGS. 9A-9H illustrate that the reinforcement 308 can have a profile 338 (e.g., a helical profile) which wraps around the lumen 104 such that adjacent peaks 344*p* (e.g., adjacent first and second peaks 344*p*1, 344*p*2) can move into and out of contact with each other. When peaks 344*p* are in contact with each other, the peaks 344*p* in contact with each other can be considered to be releasably engaged with each other. FIGS. 9A-9H illustrate that the peaks 344*p* of the reinforcement 308 can contact each other, for example, when the tube 160 is in an unexpanded configuration, an expanded configuration, a straight configuration, and/or a curved configuration. FIGS. 9E-9H illustrate that that the peaks 344*p* can move into and out of contact with each other as the tube 160 bends and straightens during navigation to and/or from a target site. For example, FIGS. 9E-9H illustrate that some of the peaks 344*p* can contact each other when the tube 160 has a curved configuration (e.g., the peaks 344*p* on the side of the tube 160 that is in tension), and that some of the peaks 344*p* may not contact each other when the tube 160 has a curved configuration (e.g., the peaks 344*p* on the side of the tube 160 that is in compression).

FIGS. 9A-9H illustrate that the points 350 can be where two peaks 344*p* are in releasable contact with each other. For example, FIGS. 9A-9H illustrate that the points 350 can be where the first peaks 344*p*1 are in contact with the second peaks 344*p*2. The circles 350*c* in FIGS. 9A, 9B, and 9F-9H each mark a point 350 where two adjacent peaks 344*p* (e.g., a first peak 344*p*1 and a second peak 344*p*2) on adjacent turns 308*t* are in contact with each other. The X's in FIGS. 9C and 9D (e.g., in layer 304) each mark a point 350 where two adjacent peaks 344*p* (e.g., a first peak 344*p*1 and a second peak 344*p*2) are in contact with each other. In FIGS. 9A-9H, the turns 308*t* of the reinforcement 308*t* are shown with alternating solid and dashed lines so that the turns 308*t*, the profile 338 (e.g., the helical profile), and the oscillating shape 344 can be more easily seen. In FIGS. 9A-9H, the turns 308*t* shown in solid lines are between the turns 308*t* shown in dashed lines and vice versa. As FIGS. 9A-9H show, when the peaks 344*p* are in releasable contact with each other, the reinforcement 308 can look like a braid.

FIGS. 9A-9D illustrate exemplary cross-sections that can pass through points 350 where adjacent turns 308*t* contact each other, for example, at the peaks 344*p*. For example, the cross-sections shown in FIGS. 9C and 9D taken along lines 9C-9C and 9D-9D in FIGS. 9A and 9B, respectively, show that lines 9C-9C and 9D-9D can pass through the points 350 where a first turn 308*t*1 and a second turn 308*t*2 contact each other. The first turn 308*t* can be adjacent the second turn 308*t*2. The first and second turns 308*t*1, 308*t*2 can be two consecutive turns 308*t* of the reinforcement 308. FIGS. 9A-9D illustrate that lines 9C-9C and 9D-9D can pass through or between the peaks 344*p* (e.g., the first peaks 344*p*1) of the first turn 308*t*1 and through or between the peaks 344*p* (e.g., the second peaks 344*p*2) of the second turn 308*t*2. The X's in FIGS. 9C and 9D (e.g., in layer 304) each mark a point 350 where two adjacent peaks 344*p* (e.g., a first peak 344*p*1 and a second peak 344*p*2) are in contact with each other. The spaces between the X's in layer 304 in FIGS. 9C and 9D can be the openings to the valleys 344*v*, for example, the openings to the first and second valleys 3441, 344*v*2 that lines 9C-9C and 9D-9D pass along in FIGS. 9A and 9B, respectively. For example, FIGS. 9A and 9B illustrate that the valleys 344*v* can be adjacent each other such that the first valleys 344*v*1 can abut the second valleys 344*v*2, such that the first and second valleys 344*v*1, 344*v*2 can open into each other, and/or such that the first and second valleys 344*v*1, 344*v*2 can face each other. FIGS. 9A and 9B illustrate that there may not be a gap between adjacent valleys 344*v* when the peaks 344*p* are in contact with each other. As another example, there may be a gap (e.g., a gap 347) between some of the adjacent valleys 344*v*.

FIGS. 9A-9D illustrate that adjacent peaks 344*p* can lie along the axes 344*x* such that the first peaks 344*p*1 can releasably contact the second peaks 344*p*2. For example, FIGS. 9A-9D illustrate that first and second peaks 344*p*1, 344*p*2 can be aligned along the first axis 344*x*1 such that the points 350 can be aligned along the first axis 344*x*1. As another example, FIGS. 9A-9D illustrate that first and second peaks 344*p*1, 344*p*2 can be aligned along the second axis 344*x*2 such that the points 350 can be aligned along the second axis 344*x*2. The points 350 along the axes 344*x* (e.g., the first and second axes 344*x*1, 344*x*2) can thereby extend around (e.g., helically around) the center longitudinal axis Ax of the tube 160. In other words, FIGS. 9A-9D illustrate that the points 350 can be aligned with the axes 344*x*, for example, with the first and second axes 344*x*1, 344*x*2. FIGS. 9A-9D illustrate that when the peaks 344*p* are in disengageable contact with each other, for example, at the points 350, the valleys 344*v* may not be between the peaks 344*p* along the axes 344*x*.

FIGS. 9A-9H illustrate that the peaks 344*p* can contact each other such that the points 350 can be the points of contact between the ends (e.g., terminal ends such as apexes) of the peaks 344*p*. The peaks 344*p* can be the points where two arms 344*a* intersect each other (e.g., for peaks 344*p* that have angular corners such as in FIGS. 9A-9H). The peaks 344*p* can be the points where two arms 344*a* merge with each other (e.g., for peaks 344*p* that have rounded corners). For example, for peaks 344*p* that have rounded corners in which a point of intersection is less identifiable than for angular corners, the arms 344*a* can be considered to merge at the apex of the peaks 344*p*. For example, for an oscillating shape 344 having a sine pattern with rounded corners, the peaks 344*p* can be the crests and troughs of the sine pattern of the reinforcement 308 such that adjacent arms 344*a* can be considered to merge at the apexes of the crests and troughs of the sine pattern. As another example, the peaks 344*p* can be flat or planar. FIGS. 9A-9H illustrate that when the peaks 344*p* are in contact with each other, the arms 344*a* may not contact each other. As another example, when the peaks 344*p* are in contact with each other, the arms 344*a* may contact each other. As another example, since the peaks 344*p* can be defined by the ends of two arms 344*a*, FIGS. 9A-9H illustrate that when the peaks 344*p* are in contact with each other, the ends of the arms 344*a* can contact the ends of other arms 344*a*. In such cases, the portions of the arms 344*a* between the two ends of the arms 344*a* may not contact each other, for example, as shown in FIGS. 9A-9H.

FIGS. 9A-9H illustrate that the peaks 344*p* can releasably contact each other, for example, at the points 350, but that the peaks 344*p* may not be connected to each other when they are in contact with each other. In other words, the peaks 344*p* can move into and out of contact with each other such that adjacent peaks 344*p* (e.g., adjacent first and second peaks 344*p*1, 344*p*2) can touch each other but not be fixedly connected to each other when the peaks 344*p* are in contact with each other. The peaks 344*p* can thereby move freely into and out of contact with each other.

FIGS. 9A-9H illustrate that the reinforcement 308 can define cells 352. The cells 352 can have any shape. For example, FIGS. 9A and 9B illustrate that the cells 352 can have a diamond-shape when the tube 160 is in a straight, unexpanded configuration and that the cells 352 can have a diamond-shape when the tube is in a straight, expanded configuration.

FIGS. 9A-9H illustrate that the arms and peaks 344*a*, 344*p* can define the boundaries of the cells 352, and that the valleys 344*v* can define the openings in the cells 352. A first end (e.g., a first half) of the cell openings can be the first valleys 344*v*1 and a second end (e.g., a second half) of the cell openings can be the second valleys 344*v*2. For example, the first valleys 344*v*1 can define a first end (e.g., a proximal end) of the cell openings and the second valleys 344*v*2 can define a second end (e.g., a distal end) of the cell openings. For example, FIGS. 9A and 9B illustrate that when the first peaks 344*p*1 of the first turn 308*t*1 are in contact the second peaks 344*p*2 of the second turn 308*t*2, the cells 352 between the first and second turns 308*t*1, 308*t*2 can be defined by the arms and peaks 344*a*, 344*p* of the first and second turns 308*t*1, 308*t*2 and can be defined by the valleys 344*v* between the first and second turns 308*t*1, 308*t*2. For example, FIGS. 9A and 9B illustrate that the first peaks 344*p*1, the second peaks 344*p*2, and the first valleys 344*v*1 of the first turn 308*t*1 can define a first end (e.g., a proximal end) of the cells 352 between the first and second turns 308*t*1, 308*t*2, and that the first peaks 344*p*1, the second peaks 344*p*2, and the second valleys 344*v*2 of the second turn 308*t*2 can define a second end (e.g., a distal end) of the cells 352 between the first and second turns 308*t*1, 308*t*2. FIGS. 9A-9H illustrate, for example, that the cells 352 can have four corners, and that the corners of the cells 352 can be points 350. FIGS. 9A-9H illustrate that the proximal most and distal most corners of the cells 352 can be aligned with an axis 344*x*, and that the two corners between the proximal most and distal most corners of the cells 352 can be aligned with other axes 344*x*.

FIGS. 9A-9H illustrate that the cells 352 can be openable and closeable, for example, as the tube 160 bends and straightens. The cells 352 can open and close, for example, at one or more of the corners of the cells 352. For example, FIGS. 9A-9H illustrate that one or more of the corners (e.g., two corners) of the cells 352 be fixed corners (e.g., closed corners) and that one or more of the corners (e.g., two corners) of the cells 352 can be openable and closeable corners. The fixed corners (e.g., closed corners) can remain closed as the openable and closeable corners open and close.

FIG. 9A illustrates the tube 160 (e.g., the section 160*s*1) in a straight, unexpanded configuration in which the peaks 344*p* are in releasable engagement with each other at points 350.

FIG. 9B illustrates that when the tube 160 (e.g., the section 160*s*1) is expanded, the peaks 344*p* can be in releasable engagement with each other at points 350. For example, FIG. 9B illustrates that when the tube 160 (e.g., the section 160*s*1) is radially expanded, the peaks 344*p* can be in contact with each other at points 350.

FIGS. 9A and 9B illustrate the peaks 344*p* can remain in contact with each other, for example, as a device (e.g., the device 329) is advanced and withdrawn from the lumen 104.

FIGS. 9A and 9B illustrate that torque from the torsional loads 354*a* and 354*b* and/or forces from axial loads 356*a* and 356*b* can be transferred across the points 350 such that the points 350 can be force transfer points and/or torque transfer points. In other words, force and/or torque can be transferred across the turns 308*t* of the reinforcement 308, for example, at the points 350. The reinforcement 308 can thereby function as a braid or a spiral wrap, for example, when adjacent turns 308*t* of the reinforcement 308 contact each other (e.g., at points 350). If the material of the tube 160 (e.g., the matrix) and/or the reinforcement 308 cannot support the load placed on the tube 160, the peaks 344*p* can disengage from each other (e.g., break contact with each other), for example, by moving (e.g., translating) relative to each other.

When peaks 344*p* that are in releasable contact with each other disengage from one another, for example, due to a threshold axial and/or torsional force being exceeded, the peaks 344*p* in contact with each other can move toward or away from each other. For example, at a point 350, the first peak 344*p*1 can move axially away from the second peak 344*p*2, the first peak 344*p*1 can move laterally away from the second peak 344*p*2, the first peak 344*p*1 can slip under the second peak 344*p*2, the first peak 344*p*1 can slip over the first peak 344*p*1, the first peak 344*p*1 can slip to a first side of the second peak 344*p*2, for example, along one of the two arms 344*a* extending from the second peak 344*p*2, the first peak 344*p*1 can slip to a second side of the second speak 344*p*2, for example, along the other of the two arms 344*a* extending from the second peak 344*p*2 and/or vice versa for the second peak 344*p*2 moving relative to the first peak 344*p*1. In other words, the when the peaks 344*p* are in contact with each other, the reinforcement 308 can function as a structure with connections at the points 350 but the points 350 can provide break points, or shear points, such that adjacent peaks 344*p* can move (e.g., translate) relative to each other if the force(s) applied to the tube 160 exceed a threshold force for a point 350. The points 350 can thus be the weakest place to have movement, and therefore provide release point for the reinforcement 308. The reinforcement 308 can thereby function as a braid or a spiral wrap when the peaks 344*p* are in contact with each other (e.g., at the points 350), and can thereby function as a coil with a zigzag shape when the peaks 344*p* are not in contact with each other (e.g., at the points 350).

FIGS. 9A and 9B illustrate that when the peaks 344*p* are in releasable contact with each other (e.g., at the points 350), the reinforcement 308 inhibit or prevent axial expansion of the tube 160. In other words, when the peaks 344*p* are in contact with each other (e.g., at the points 350), the reinforcement 308 can function as a reinforcement 310. For example, as a device (e.g., the device 329) is advanced in the lumen 104, the points 350 can, for example, inhibit or prevent axial expansion of the tube 160 such that the peaks 344*p* can remain in contact with each other at the points 350 as the device is advanced in the lumen. For example, as a device is advanced in the lumen, the distal peaks 344*p* (e.g., the second peaks 344*p*2) can push against or resist distal movement of the proximal peaks 344*p* (e.g., the first peaks

**344*p*1). This can thereby inhibit or prevent the tube 160 from axially expanding as the tube 160 radially expands due to the device being advanced in the lumen 104**.

FIGS. 9A-9H illustrate that the peaks **344*p* can move relative to each other as the tube 160 bends and straightens, for example, as the tube 160 is navigated to a target site (e.g., in a blood vessel, organ, or digestive tract). For example, when the tube 160 is placed in tension, for example, from changing from a straight configuration into a curved configuration (e.g., into the curve 336), the peaks 344*p* can move away from each other. When the tube 160 returns to a straight configuration (e.g., from the curved configuration having the curve 336) or becomes less curved, the peaks 344*p* can move toward each other. As another example, the peaks 344*p* can move relative to each other (e.g., toward and away from each other) as the tube 160 changes position (e.g., bends or is bent), for example, from the curve 336 to another curve having a different shape. The points 350 can inhibit or prevent the tube 160 from kinking as the tube 160 bends. For example, when adjacent peaks 344*p* are in contact with each other (e.g., at the points 350), the contact between the peaks 344*p* can inhibit or prevent the tube 160 from kinking, for example, when the tube 160 is in a curved configuration (e.g., the curve 336) or as the tube 160 takes on a curved configuration (e.g., the curve 336**) from a straight configuration.

FIGS. 9A-9D illustrate relative positions between the peaks **344*p*, for example, when the tube 160 is in a straight configuration. As shown in FIGS. 9A-9D, when the tube 160 is in a straight configuration, adjacent peaks 344*p* can be in releasable contact with each other at the points 350. As another example, when the tube 160 is in a straight configuration, adjacent peaks 344*p* can be separated by a gap (e.g., a 1 mm to 10 mm gap) such that the adjacent peaks 344*p* can move into releasable contact with each other when the tube takes on a curved configuration (e.g., the curved configuration shown in FIGS. 6B and 6D). As yet another example, when the tube 160 is in a straight configuration, adjacent peaks 344*p* can be separated by the gap 347 such that the adjacent peaks 344*p* can move into releasable contact with each other when the tube takes on a curved configuration (e.g., the curved configuration shown in FIGS. 6B and 6D). For example, adjacent turns in a peak-to-peak configuration can be separated by the gaps 347 or by the gap between turns, for example, shown in FIGS. 7A-8**D.

FIGS. 9E and 9F illustrate relative positions that the peaks **344*p* can have when the tube has a non-expanded, curved configuration (e.g., the curve 336). FIG. 9E illustrates a compressed section of the tube 160, for example, the radial inside of the curve 336 in FIG. 6B (e.g., the bottom portion of the curve 336 in FIG. 6B), and FIG. 9F illustrates a tensioned section of the tube 160, for example, the radial outside of the curve 336 in FIG. 6B (e.g., the top portion of the curve 336 in FIG. 6B). In other words, FIGS. 9E and 9F show the compressed and tensioned sides of the curve 336 in FIG. 6**B.

FIGS. 9G and 9H illustrate relative positions that the peaks **344*p* can have when the tube has an expanded, curved configuration (e.g., the curve 336). FIG. 9G illustrates a compressed section of the tube 160, for example, the radial inside of the curve 336 in FIG. 6D (e.g., the bottom portion of the curve 336 in FIG. 6D), and FIG. 9H illustrates a tensioned section of the tube 160, for example, the radial outside of the curve 336 in FIG. 6D (e.g., the top portion of the curve 336 in FIG. 6D). In other words, FIGS. 9G and 9H show the compressed and tensioned sides of the curve 336 in FIG. 6**D.

FIGS. 9E and 9G illustrate that adjacent peaks **344*p* can be in releasable contact with each other in the compressed portion of the tube 160 (e.g., on the radial inside of the curve 336 shown in FIGS. 6B and 6D) at points 350. The points 350 in the compressed portion of the tube 160 (e.g., of the inside portion of the curve 336) can inhibit or prevent the tube 160 from kinking at the curved portion, for example, at the compressed portion of the curve 336. In other words, the peaks 344*p* in contact with each other (e.g., the first and second peaks 344*p*1, 344*p*2 at the points 350) in the compressed portion can inhibit or prevent the tube 160 from kinking, for example, when the tube 160 is in a curved configuration (e.g., the curve 336) or as the tube 160 takes on a curved configuration (e.g., the curve 336). FIGS. 9E and 9G illustrate that the cells 352 can be closed in the compressed section of the tube 160 (e.g., on the radial inside of the curve 336**).

FIGS. 9F and 9H illustrate that adjacent peaks **344*p* can be disengaged from each other in the tensioned portion of the tube 160 (e.g., on the radial outside of the curve 336 shown in FIGS. 6B and 6D). FIGS. 9F and 9H illustrate that when adjacent peaks 344*p* are disengaged from each other, peaks 344*p* in the tensioned portion of the tube 160 that were in releasable contact with each other can be separated from each other by gaps 358. FIGS. 9F and 9H illustrate that the gaps 358 can have different sizes along the length of the tensioned portion of the tube 160. For example, FIGS. 9F and 9H illustrate that the gaps 358 can comprise a first gap 358*a*, a second gap 358*b*, and a third gap 358*c*, or any combination thereof. The first gap 358*a* can be at the apex of the curve 336 and can be the largest gap 358. The third gap 358*c* can be the gap 358 farthest from the apex of the curve 336 can be the smallest gap 358. The second gap 358*b* can be between the first and third gaps 358*a*, 358*c* and can have a size that is between the size of the first and third gaps 358*a*, 358*c*. For example, the gaps 358 can get progressively smaller away from the apex of the curve 336. The gaps 358 can be between adjacent turns 308*t*. For example, first gaps 358*a* are shown between the third turn 308*t*3 and the fourth turn 308*t*4 in FIG. 9F, second gaps 358*b* are shown between the second turn 308*t*2 and the third turn 308*t*3 in FIG. 9F, and third gaps 358*c* are shown between the first turn 308*t*1 and the second turn 308*t*2 in FIG. 9**F.

FIGS. 9F and 9H illustrate that the gaps 358 can have a width **358*w* (also referred to as a gap width 358*w*). The gap width 358*w* can be, for example, the distance between adjacent peaks 344*p*. For example, FIGS. 9F and 9H illustrate that the gap width 358*w* can be measured between the first and second peaks 344*p*1, 344*p*2. The width 358*w* can be less than, equal to, or greater than the arm length 344*a*L, can be less than, equal to, or greater than the distance 344*d*, and/or can be less than, equal to, greater than the diameter of the tube 160 (e.g., diameter of the lumen 104) when the tube is has the curve 336, or any combination thereof. For example, FIGS. 9F and 9H illustrate that the width 358*w* can be less than the arm length 344*a*L, can be less than the distance 344*d*, and can be less than the diameter of the tube 160. As another example, all the gaps 358 can have the same size (e.g., the same width 358*w*). As another example, the width 358*w* can be, for example, 0.1 mm to 10.0 mm, or more narrowly, 0.1 mm to 5.0 mm, including every 0.1 mm increment within these ranges (e.g., 0.1 mm, 5.0 mm, 10.0 mm). For example, the width 358*w* of the first gap 358*a* can be, for example, 6.1 to 8.0 mm, the width 358*w* of the second gap 358*b* can be, for example, 4.1 mm to 6.0 mm, and the width 358*w* of the third gap 358*c* can be, for example, 2.0 mm to 4.0 mm, including every 0.1 mm increment within these ranges. As another example, the width 358***w* of the first gap 358*a* can be, for example, 0.1 mm to 6.0 mm larger than the width 358*w* of the second gap 358*b*, and the width 358*w* of the second gap 358*b* can be, for example, 0.1 mm to 6.0 mm larger than the width 358*w* of the third gap 358*c*, including every 0.1 mm increment within these ranges.

FIGS. 9F and 9H illustrate that the cells 352 can be open in the tensioned section of the tube 160 (e.g., on the radial outside of the curve 336). FIGS. 9A, 9B, 9F, and 9H illustrate that the cells 352 can open when the reinforcement 308 is in a state of tension. The cells 352 can open and close, for example, at one or more of the corners of the cells 352. For example, FIGS. 9F and 9H illustrate that two corners of the cells 352 can open and two of the corners of the cells 352 can be closed when the cells 352 are in a tensioned state. For example, FIGS. 9A-9H illustrate that the cells 352 can split apart (e.g., can split in half) when the open, for example, due to the tube 160 bending, axially expanding, and/or radially expanding.

FIGS. 9A-9E and 9G illustrate that when the cells 352 are in a closed configuration, the cells 352 can be isolated from each other (e.g., adjacent cells 352 may not be interconnected with each other). FIGS. 9F and 9H illustrate that when the cells 352 are in an open configuration, adjacent cells 352 can be connected to each other along one or more cell openings (e.g., open corners of the cells), thereby forming one or more larger cells. For example, as shown in FIGS. 9F and 9H, when the cells 352 are opened, the cells 352 can merge into each other to create a larger cell that can extend partially around (e.g., helically around) the center longitudinal axis Ax, for example, in crescent-shaped or semi-circular rings on the tensioned side of the curve 336. For example, FIGS. 9F and 9H illustrate that the first gaps 358*a* can connect two, three, or more cells 352 at the apex of the curve 336. For example, FIGS. 9F and 9H illustrate that gaps 358 (e.g., two first gaps 358*a*) can connect three cells 352 at the apex of the curve 336. As another example, FIGS. 9F and 9H illustrate that the second gaps 358*b* can connect two, three, or more cells 352 on one or both sides of the apex of the curve 336. For example, FIGS. 9F and 9H illustrate that gaps 358 (e.g., two second gaps 358*b*) can connect three cells 352 proximal the apex of the curve 336 and that gaps 358 (e.g., two second gaps 358*b*) can connect three cells 352 distal the apex of the curve 336. As yet another example, FIGS. 9F and 9H illustrate that the third gaps 358*c* can connect two, three, or more cells 352 on one or both sides of the apex of the curve 336. For example, FIGS. 9F and 9H illustrate that gaps 358 (e.g., two third gaps 358*c*) can connect three cells 352 proximal the apex of the curve 336 and that gaps 358 (e.g., two third gaps 358*c*) can connect three cells 352 distal the apex of the curve 336.

FIGS. 9E-9H illustrate that the cells 352 on the compressed side of the curve 336 can be closed and that the cells on the tensioned side of the curve 336 can be open. The separation between the peaks 344*p* on the tensioned side of the curve 336 can, for example, function like a spring to resist kinking of the tube, for example, by biasing the tube 160 to return to a less curved configuration or to a straight configuration.

The cells 352 can be biased to have a closed configuration. In other words, the peaks 344*p* can be biased to contact each other at the points 350. In such a case, in the event the tube 160 becomes kinked at a point along a curve (e.g., along the curve 336), the peaks 344*p* that are disengaged from each other on the tensioned side of the curve 336 can be biased to reengage with each other (e.g., due to the elasticity and/or spring characteristics of the reinforcement 308) such that the reinforcement 308 on the radial outside of the kinked portion of the tube 160 can return or can assist in returning the tube 160 to a non-kinked configuration or to a less kinked configuration. For example, when the tube 160 is in a kinked configuration, the first and second peaks 344*p*1, 344*p*2 on the tensioned side of the kinked portion can move toward each other or can be configured to move toward each other to de-kink or unkink the tube 160. The reinforcement 308 can thereby be configured to return the tube 160 from a kinked configuration to a non-kinked configuration or to a less kinked configuration. When the tube 160 is in a kinked configuration, for example, the disengaged peaks 344*p* on the radial outside of the kinked portion can be configured to move towards each other such that the reinforcement 308 is configured to pull the portions of the tube 160 that that are proximal and distal the kink toward each other. As another example, the cells 352 may not be biased to have a closed configuration. In other words, the peaks 344*p* may not be biased to contact each other at the points 350.

FIGS. 9A-9H illustrate that the peaks 344*p* can move toward and away from each other as the tube 160 bends and straightens, for example, as the tube 160 is navigated to and from a target site. FIGS. 9A-9H illustrate that the peaks 344*p* can engage and disengage with each other as the tube 160 bends and straightens. For example, the peaks 344*p* can move toward and away from each other as the cells 352 close and open, respectively. The openable and closeable cells 352 can provide the tube 160 with flexibility to bend and straighten as the tube 160 is navigated to a target site while providing the tube 160 the rigidity to inhibit or prevent the tube 160 from kinking (e.g., via the points 350), for example, by limiting the radius of curvature that the curve 336 can reach or by resisting, inhibiting, or preventing the radius of curvature of the curve 336 from exceeding a threshold radius of curvature. The number of peaks 344*p* that can contact each other between adjacent turns 308*t* can be controlled, selected, or otherwise optimized to make bending the tube 160 harder (e.g., by increasing the number of points 350) or to make bending the tube 160 easier (e.g., by decreasing the number of points 350). The number of points 350 can be increased, for example, by shortening the distance 344*d* (e.g., by decreasing the wavelength of the reinforcement 308 relative to the distance 344*d* shown, for example, in FIGS. 9A-9H). The number of points 350 can be decreased, for example, by increasing the distance 344 (e.g., by increasing the wavelength of the reinforcement 308 relative to the distance 344*d* shown, for example, in FIGS. 9A-9H) and/or by having every other peak 344*p* contact each other, every third peak 344*p* contact each other, or every fourth peak 344*p* contact each other, instead of, for example, every peak 344*p* as shown in FIGS. 9A-9D), for example, by having arms 344*a* with multiple lengths 344*a*L.

FIGS. 9A-9H illustrate that when peaks 344*p* are in releasable contact with each other (e.g., at points 350), the points 350 can, for example, function as connections between adjacent turns 308*t* of the reinforcement 308. This can, for example, allow reinforcement 308 to function as a first structure (e.g., a braid or spiral wrap) when the peaks 344*p* are in contact with each other (e.g., when the first and second peaks 344*p*1, 344*p*2 are in contact with each other), and as a second structure (e.g., a coil such as a helical wire having a zigzag shape) when the peaks 344*p* are disengaged from each other (e.g., when the first and second peaks 344*p*1, 344*p*2 are disengaged from each other). As another example, this can allow reinforcement 308 to function as a first structure (e.g., a braid or spiral wrap) and as a second structure (e.g., a coil such as a helical wire having a zigzag shape) when the peaks 344*p* are in contact with each other (e.g., when the first and second peaks 344*p*1, 344*p*2 are in contact with each other), and as the second structure (e.g., a coil such as a helical wire having a zigzag shape) when the peaks 344*p* are disengaged from each other (e.g., when the first and second peaks 344*p*1, 344*p*2 are disengaged from each other). The first structure can comprise the second structure. The first structure of the reinforcement 308 can comprise the second structure of the reinforcement 308. The points 350 can thereby allow the reinforcement 308 to function as an interconnected structure such as a scaffold having cells 352, a mesh having cells 352, a network of struts (e.g., arms 344*a*) and cells (e.g., cells 352), a frame having cells 352, a support having cells 352, an interconnected lattice structure having cells 352, or any combination thereof, whereby the interconnected structure can be and/or can function as a unitary structure such as a braid or a spiral wrap. The first structure can be, for example, the scaffold having cells 352, the mesh having cells 352, the network of struts (e.g., arms 344*a*) and cells (e.g., cells 352), the frame having cells 352, the support having cells 352, then interconnected lattice structure having cells 352, or any combination thereof. The reinforcement 308 can have a primary structure and a second structure. For example, the primary structure can be the first structure of the reinforcement 308, and the secondary structure can be the second structure of the reinforcement 308. As another example, the primary structure can be the second structure of the reinforcement 308, and the secondary structure can be the first structure of the reinforcement 308. The reinforcement 308 can thereby function as a coil and/or a braid. The reinforcement 308 can thereby function as a coil and/or a spiral wrap.

FIGS. 9A-9H illustrate that as the tube 160 is moved from a straight configuration (e.g., the straight configurations in FIGS. 6A and 6C) into a curved configuration (e.g., the curved configurations in FIGS. 6B and 6D), the peaks 344*p* adjacent to each other in the straight portion of the tube 160 can remain in contact with each other. The compression on the radial inside of the curve (e.g., the curve 336) can cause the peaks 344*p* that are in contact with each other in the straight configuration to be further pressed into each as indicated by the compression arrows C in FIGS. 9E and 9G. As FIGS. 9E and 9G show, the contact between the peaks 344*p* can allow but resist bending of the tube such that the peaks 344*p* in contact with each other in the compressed portion of the tube 160 (e.g., the points 350 in FIGS. 9E and 9G) can inhibit or prevent the tube 160 from kinking. The tension on the radial outside of the curve (e.g., the curve 336) can cause the peaks 344*p* that are in contact with each other in the straight configuration to disengage from each other as indicated by the tension arrows T in FIGS. 9F and 9H. FIGS. 9A-9H illustrate, for example, that the reinforcement 308 can function differently when in compression and when in tension. When in tension, the reinforcement 308 can function as the second structure (e.g., a coil such as a zigzag wire extending helically around the lumen 104). When in compression, the reinforcement 308 can function as the first structure (e.g., an interconnected structure comprising, for example, a braid or a spiral wrap). For example, when the tube 160 is in tension on the radial outside of a curve (e.g., the curve 336), the reinforcement 308 can function as an elongated member (e.g., a wire) having the oscillating shape 344, and when the tube 160 is in compression, for example, on the radial inside of a curve (e.g., the curve 336), the reinforcement 308 can function as the interconnected structure (e.g., a braid or a spiral wrap) with points 350. As another example, when in compression, the reinforcement 308 can function as the first structure and the second structure. For example, when the tube 160 is in tension on the radial outside of a curve (e.g., the curve 336), the reinforcement 308 can function as an elongated member (e.g., a wire) having the oscillating shape 344, and when the tube 160 is in compression, for example, on the radial inside of a curve (e.g., the curve 336), the reinforcement 308 can function as an elongated member (e.g., a wire) having the oscillating shape 344 and as the interconnected structure (e.g., a braid or a spiral wrap) with points 350. As described above, the interconnected structure can be, for example, a scaffold having cells 352, the mesh having cells 352, the network of struts (e.g., arms 344*a*) and cells (e.g., cells 352), the frame having cells 352, the support having cells 352, then interconnected lattice structure having cells 352, or any combination thereof, whereby the interconnected structure can be and/or can function as one or multiple structures such as a coil and/or a braid or spiral wrap. A first portion of the reinforcement 308 can function as the first structure (e.g., a coil) while a second portion of the reinforcement 308 can function as the second structure (e.g., a braid or a spiral wrap). For example, the portion reinforcement 308 in a state of tension can function as a coil while the portion of the reinforcement 308 in a state of compression can function as a braid or a spiral wrap. The first structure and the second structure can be formed at different portions of the reinforcement 308 sequentially and/or a simultaneously. For example, FIGS. 9A and 9B illustrate that when the tube 160 is in a straight configuration, the reinforcement 308 can form the first and/or second structures and/or can function as the first and/or second structures, FIGS. 9E and 9G illustrate that in compressed portions of the tube 160, the reinforcement 308 can form the first and/or second structures and/or can function as the first and/or second structures, and FIGS. 9F and 9H illustrate that in tensioned portions of the tube 160, the reinforcement 308 can form the second structure and/or can function as the second structure. The first structure can comprise the second structure. The first structure of the reinforcement 308 can comprise the second structure of the reinforcement 308. As yet another example, the reinforcement 308 can function the same when in compression and when in tension (e.g., when adjacent turns of the reinforcement 308 do not contact each other when the tube 160 is in a straight configuration and when the tube 160 has a curved configuration).

As another example, as the tube 160 is bent into or assumes a curved configuration (e.g., the curve 336), the peaks 344*p* can move into releasable contact with each other from positions not in contact with each other. For example, when the tube 160 is in the straight configuration, for example, shown in FIGS. 9A-9D, the peaks 344*p* on adjacent turns 308*t* may not be in releasable contact with each other but may move into contact with each other as shown in FIGS. 9E and 9G. As another example, the tube 160 can be moved from a first curved configuration to a second curved configuration. The first curved configuration can be, for example, the curve 336 shown in FIGS. 6B and 6D. The second curved configuration can be, for example, a curve having a shape opposite to the curve 336 shown in FIGS. 6B and 6D but with the same radius of curvature (i.e., a curve with the tip bent upwards instead of downwards as shown in FIGS. 6B and 6D). In such a case, the tensioned and compressed portions of the curve of the second curved configuration can be on opposite sides of the tube 160 than what are shown in FIGS. 9E-9H (i.e., instead of the bottom of the curve being in compression and the top of the curve being in tension as shown for the curve 336, the top of the curve can be in compression and the bottom of the curve can be in tension for the curve of the second configuration). In other words, for the first curved configuration, FIG. 9E can show the bottom, compressed section of the curve 336, FIG. 9F can show the top, tensioned section of the curve 336, FIG. 9G can show the bottom, compressed section of the curve 336, and FIG. 9H can show the top, tensioned section of the curve 336, and for the second curved configuration, FIG. 9E can show the top, compressed section of the curve of the second curved configuration, FIG. 9F can show the bottom, tensioned section of the curve of the second curved configuration, FIG. 9G can show the top, compressed section of the curve of the second curved configuration, and FIG. 9H can show the bottom, tensioned section of the curve of the second curved configuration, whereby the peaks 344*p* not in contact with each other in the tensioned portion of the first curved configuration (e.g., the radial outside of the curve 336, or the tensioned top portion of the curve 336, as shown in FIGS. 9F and 9H) can move into contact with each other such that they are in contact with each other at points 350 in the compressed portion of the second curved configuration (e.g., the radial inside of the curve, or the compressed top portion of the curve as shown in FIGS. 9E and 9G for the second curved configuration). As yet another example, for variations in which the peaks 344*p* are not in contact with each other when the tube 160 is in a straight configuration (e.g., for peak-to-peak variations in which the peaks 344 are not in contact each other when the tube 160 is straight), the peaks 344*p* can move into releasable contact with each other in the compressed section of the curve 336 (e.g., the radial inside of the curve) as the tube 160 assumes the shape of the curve 336, and can move farther away from each other in the tensioned section of the curve 336 (e.g., the radial outside of the curve) as the tube 160 assumes the shape of the curve 336. The peaks 344*p* can move into and out of contact with each other as the tube 160 bends and straightens.

FIGS. 9A-9E and 9G illustrate that when the peaks 344*p* are in contact with each other (e.g., at the points 350), that the peaks 344*p* in contact with each other can move away from each other, for example, due to the tube 160 bending, axially expanding, and/or radially expanding. FIGS. 9F and 9H illustrate that when the peaks 344*p* are separated from each other (e.g., disengaged from each other), for example, by the gaps 347 and/or by the gap between the turns 308*t*, for example, shown in FIGS. 7A-8D, the peaks 344*p* that are separated from each other can move toward each other, for example, due to the tube 160 bending, axially contracting, and/or radially contracting. The reinforcement 308 can thereby be an openable and closeable structure. The openable and closeable structure can be, for example, an interconnected structure. The openable and closeable structure can be, for example, a scaffold having cells 352, the mesh having cells 352, the network of struts (e.g., arms 344*a*) and cells (e.g., cells 352), the frame having cells 352, the support having cells 352, then interconnected lattice structure having cells 352, or any combination thereof, whereby the openable and closeable structure can be and/or can function as a first structure (e.g., a braid or spiral wrap) and/or as a second structure (e.g., a coil). For example, the reinforcement 308 can form the first structure or the first structure and the second structure when in a closed configuration, and can form the second structure when in an open configuration. For example, when the peaks 344*p* of adjacent turns 308*t* are in releasable contact at points 350, the reinforcement 308 can function as both a helical structure (e.g., wire) in which adjacent turns 308*t* are in contact with each other and as an interconnected structure (e.g., a braid or a spiral wrap) in which adjacent turns 308*t* are in contact with each other, and whereby when the peaks 344*p* are separated from each other (e.g., from the points 350), the reinforcement 308 can function as a helical structure (e.g., wire) in which adjacent turns 308*t* are not in contact with each other. As another example, when the peaks 344*p* of adjacent turns 308*t* are in releasable contact at points 350, the reinforcement 308 can function as both the first structure (e.g., a braid or a spiral wrap) in which adjacent turns 308*t* are in contact with each other and as a second structure (e.g., a coil) in which adjacent turns 308*t* are in contact with each other, and whereby when the peaks 344*p* are separated from each other (e.g., from the points 350), the reinforcement 308 can function as the second structure (e.g., a coil) in which adjacent turns 308*t* are not in contact with each other. In contrast to a braid or spiral wrap which can have cells that are always closed, FIGS. 9A-9H illustrate that the reinforcement 308 can have cells 352 that are openable and closeable, for example, by bending, axially expanding, axially contracting, radially expanding, and/or radially contracting the tube 160.

FIGS. 9E-9H thereby illustrate that a peak-to-peak arrangement of the reinforcement 308, for example, the peak-to-peak arrangement shown in FIGS. 9A-9H, can inhibit or prevent kinking of the tube 160, for example, as the tube 160 assumes a curved configuration, and/or when the tube is in a curved configuration.

FIGS. 9A, 9C, 9E, and 9F illustrates the tube 160 in a non-expanded state before expansion. For example, FIGS. 9A, 9C, 9E, and 9F illustrate the reinforcement 308 in a non-expanded state. The non-expanded state of the tube 160 and/or the reinforcement 308 can be a neutral state or a contracted state of the tube 160 and/or the reinforcement 308.

FIGS. 9B, 9D, 9G, and 9H illustrates the tube 160 in an expanded state after expansion. The expanded state in FIGS. 9B, 9D, 9G, and 9H can be a partially expanded state or a fully expanded state. For example, FIGS. 9B, 9D, 9G, and 9H illustrate the reinforcement 308 in an expanded state.

FIGS. 9A, 9B, and 9E-9G illustrate portions of the tube 160 transparent for illustrative purposes, for example, so that the layered arrangement of the tube 160 can be more easily visualized, and so that the reinforcement 308 in the tube 160 can be more easily visualized. As a first example, FIGS. 9A, 9B, and 9E-9G illustrate an anterior portion (e.g., an anterior half) of the tube 160 and a posterior portion (e.g., a posterior half) of the reinforcement 308 transparent, whereby the portion of the reinforcement 308 that is visible can be the portion of the reinforcement 308 in the anterior half of the tube 160. As a second example, FIGS. 9A, 9B, and 9E-9G illustrate an anterior portion (e.g., an anterior half) of the tube 160 and an anterior portion (e.g., an anterior half) of the reinforcement 308 transparent, whereby the portion of the reinforcement 308 that is visible is the portion of the reinforcement 308 in the posterior half of the tube 160. FIGS. 9B, 9D, 9F, and 9G illustrate the device 329 transparent for illustrative purposes so that the tube 160 and its various features can be more easily seen. The device 329 can, for example, be in contact the inner wall of layer 302.

FIGS. 9A-9H illustrate that the reinforcement 308 can extend helically around the lumen 104 when the tube 160 is in the non-expanded state (e.g., FIGS. 9A, 9C, 9E, & 9F) and when the tube 160 is in the expanded state (e.g., FIGS. 9B, 9D, 9G, & 9H).

FIGS. 9A, 9C, 9E, and 9F illustrate that the tube 160 can have the arrangement of features shown when the tube 160 is in the non-expanded state. For example, FIGS. 9A, 9C, 9E, and 9F illustrate that the lumen 104, the layer 302, the layer 304, the layer 306, and the reinforcement 308 can have the arrangement shown, including the relative positions between these features, when the tube 160 is in the non-expanded state.

FIGS. 9B, 9D, 9G, and 9H illustrate that the tube 160 can have the arrangement of features shown when the tube 160 is in the expanded state. For example, FIGS. 9B, 9D, 9G, and 9H illustrate that the lumen 104, the layer 302, the layer 304, the layer 306, and the reinforcement 308 can have the arrangement shown, including the relative positions between these features, when the tube 160 is in the expanded state.

The tube 160 can have a reinforcement 310 (e.g., a braid or a spiral wrap). For example, FIGS. 10A-18H illustrate that the tube 160 can have a reinforcement 310.

The reinforcement 310 can provide the benefits described herein. The reinforcement 310 can, for example, allow, limit, inhibit, and/or prevent axial expansion of the tube 160. For example, the reinforcement 310 can allow, limit, inhibit and/or prevent axial expansion of the tube 160 when the tube 160 is subject to a tensile force as a device (e.g., device 329) is advanced in the lumen 104. For example, when the wall of the tube 160 has a layer that is axially stretchable (e.g., a layer that has axial ePTFE), the reinforcement 310 can allow, limit, inhibit, and/or prevent axial expansion of the tube 160 as a device (e.g., device 329) is advanced in the lumen 104. Because axial ePTFE can axially stretch when tensioned, the reinforcement 310 can be used to allow, limit, inhibit, and/or prevent such axial stretching of the tube 160 during the advancement of a device (e.g., the device 329) along the lumen 104 when a layer of the tube 160 (e.g., layer 302, layer 304, and/or layer 306) comprises ePTFE (e.g., axial ePTFE). As another example, the reinforcement 310 can transmit torque, for example, when the tube 160 is rotated in directions 353*a* and 353*b*. FIGS. 10A-18H illustrate, for example, that both the reinforcement 308 and the reinforcement 310 can transmit torque when the tube 160 is rotated in direction 353*a* and/or direction 353*b*.

The reinforcement 310 can be in (e.g., embedded in) layer 302, layer 304, or layer 306. For example, FIGS. 10A-12H illustrate that the reinforcement 310 can be in (e.g., embedded in) layer 306. As additional examples, FIGS. 13A-18H illustrate that the reinforcement 310 can be in (e.g., embedded in) layer 304.

The reinforcement 310 can be in the same layer as or a different layer than the reinforcement 308. For example, FIGS. 10A-12H illustrate that the reinforcement 310 can be in a different layer than the reinforcement 308. For example, FIGS. 10A-12H illustrate that the reinforcement 308 can be in layer 304 and that the reinforcement 310 can be in layer 306, or vice versa (e.g., the reinforcement 310 can be in layer 304 and the reinforcement 308 can be in layer 306). As another example, the reinforcement 310 can be in the same layer as the reinforcement 308. For example, the reinforcement 308 and the reinforcement 310 can both be in layer 302, can both be in layer 304, or can both be in layer 306. When the reinforcement 308 and the reinforcement 310 are in the same layer, the reinforcement 308 can be closer to the lumen 104 than the reinforcement 310 or vice versa. For example, FIGS. 13A-18H illustrate exemplary variations in which the reinforcement 308 and the reinforcement 310 are both in layer 304. FIGS. 13A-18H illustrate, for example, that the reinforcement 308 and the reinforcement 310 can be in a single layer (e.g., layer 304) of the wall of the tube 160.

The reinforcement 310 can extend partially around or completely around the reinforcement 308, or vice versa. For example, FIGS. 10A-18H illustrate that the reinforcement 310 can extend completely around the reinforcement 308. FIGS. 10A-18H illustrate, for example, that the reinforcement 308 can be enclosed by the reinforcement 310, or vice versa.

The reinforcement 308 can be closer to the lumen 104 than the reinforcement 310, or vice versa. For example, FIGS. 10A-18H illustrate that the reinforcement 308 can be closer to the lumen 104 than the reinforcement 310. FIGS. 10A-18H illustrate, for example, that a majority of the reinforcement 308 (e.g., 51% to 100% of the reinforcement 308, or more narrowly, or 90% to 100% of the reinforcement 308, including, for example, 100% of the reinforcement 308) can be closer to the lumen 104 than the reinforcement 310 when the tube 160 is in the non-expanded state (e.g., see FIGS. 10A-18H) and when the tube 160 is in the expanded state (e.g., see FIGS. 10A-18H). As another example, FIGS. 10A-18H illustrate that the reinforcement 310 can extend around (e.g., circumferentially around) the reinforcement 308 when the tube 160 is in the non-expanded state (e.g., see FIGS. 10A-18H) and when the tube 160 is in the expanded state (e.g., see FIGS. 10A-18H).

As additional examples, the positions (e.g., radial positions) of the reinforcement 308 and the reinforcement 310 in FIGS. 10A-18H can be swapped with each other. For example, with respect to FIGS. 10A-12H, the positions of the reinforcements 308 and 310 can be swapped with each other such that the reinforcement 310 can be in (e.g., embedded in) layer 304 and such that the reinforcement 308 can be in (e.g., embedded in) layer 306. In such an arrangement, the reinforcement 310 can be closer to the lumen 104 than the reinforcement 308, whereby the reinforcement 308 can extend around (e.g., helically around) the reinforcement 310 when the tube 160 is in the non-expanded state and when the tube 160 is in the expanded state. As another example, with respect to FIGS. 13A-18H, the positions of the reinforcements 308 and 310 can be swapped with each other such that the reinforcement 310 can be closer to the lumen 104 than the reinforcement 308, whereby the reinforcement 308 can extend around (e.g., helically around) the reinforcement 310 when the tube 160 is in the non-expanded state and when the tube 160 is in the expanded state.

The peaks 344*p* of the reinforcement 308 can releasably engage with one another, for example, at points 350 with a reinforcement 310 in the tube 160. For example, FIGS. 12A-12H, FIGS. 15A-15H, and FIGS. 18A-18H illustrate that the peaks 344*p* of the reinforcement 308 can releasably engage with one another as described with reference to FIGS. 9A-9H. In other words, the reinforcement 308 in FIGS. 12A-12H, FIGS. 15A-15H, and FIGS. 18A-18H can function as described herein, for example, with reference to FIGS. 9A-9H.

The reinforcement 310 can be a braid, in which case the clockwise elements 310*a* can go over and under the counterclockwise elements 310*b*, or the reinforcement 310 can be a spiral wrap, in which case the clockwise elements 310*a* can go over or under the counterclockwise elements 310*b*. FIGS. 10A-18H illustrate, for example, that the reinforcement 310 can be a spiral wrap in which all of the clockwise elements 310*a* can go over all of the counterclockwise elements 310*b*.

FIGS. 10A-18H illustrate that the clockwise elements 310*a* can be farther from the lumen 104 than the counterclockwise elements 310*b* when the tube 160 is in the non-expanded state and when the tube 160 is in the expanded state. For example, FIGS. 10A-18H illustrate that the clockwise elements 310*a* can be farther from the lumen

104 than the counterclockwise elements 310*b* where the clockwise and counterclockwise elements 310*a*, 310*b* cross each other when the tube 160 is in the non-expanded state and when the tube 160 is in the expanded state. As another example, FIGS. 10A-18H illustrate that the reinforcement 310 can be a braid.

FIGS. 10A-18H illustrate that the clockwise and counterclockwise elements 310*a*, 310*b* can cross each other at an angle 316 when the tube 160 is in the non-expanded state. FIGS. 10A-18H illustrate that the angle 316 can be double the angle 311 between the clockwise and counterclockwise elements 310*a*, 310*b* and the longitudinal axis 310*x* of the reinforcement 310. A low angle 311 (e.g., 5 degrees to 45 degrees) between the clockwise and counterclockwise elements 310*a*, 310*b* and the longitudinal axis 310*x* of the reinforcement 310 can correspond to an angle 316 of 10 degrees to 90 degrees (also referred to as a low angle 316), including every 1 degree increment within this range (e.g., 10 degrees, 15 degrees, 30 degrees, 45 degrees, 60 degrees, 75 degrees, 90 degrees). When the reinforcement 310 has a low angle 316 between the clockwise and counterclockwise elements 310*a*, 310*b*, the reinforcement 310 can, for example, resist axial expansion but allow radial expansion. For example, a reinforcement 310 with a low angle 316 between the clockwise and counterclockwise elements 310*a*, 310*b* can allow the diameter of the tube 160 to passively increase (e.g., from diameter d1 to diameter d2) as an oversized device (e.g., device 329) is advanced along the lumen 104 but can inhibit or prevent the length of the tube 160 from increasing as the oversized device (e.g., device 329) is advanced along the lumen 104. The angle 316 can be, for example, a low angle when the tube 160 is in a neutral state (e.g., a non-expanded state) or a contracted state. For example, FIGS. 10A-18H illustrate that the angle 316 can be a low angle when the tube 160 is in a neutral state or a contracted state. A high angle 311 (e.g., 46 degrees to 85 degrees) between the clockwise and counterclockwise elements 310*a*, 310*b* and the longitudinal axis 310*x* of the reinforcement 310 can correspond to an angle 316 of 92 degrees to 170 degrees (also referred to as a high angle 316), including every 1 degree increment within this range (e.g., 92 degrees, 100 degrees, 120 degrees, 150 degrees, 170 degrees). When the reinforcement 310 has a high angle 316 between the clockwise and counterclockwise elements 310*a*, 310*b*, the reinforcement 310 can, for example, resist radial expansion but allow axial expansion. For example, a reinforcement 310 with a high angle 316 between the clockwise and counterclockwise elements 310*a*, 310*b* can allow the length of the tube 160 to passively increase (e.g., from a first length to a second length) as an oversized device (e.g., device 329) is advanced along the lumen 104 but can inhibit or prevent the diameter of the tube 160 from increasing as the oversized device (e.g., device 329) is advanced along the lumen 104. The angle 316 can be, for example, a high angle when the tube 160 is in a neutral state or a contracted state.

FIGS. 10A-18H illustrate that the clockwise and counterclockwise elements 310*a*, 310*b* can cross each other at an angle 318 when the tube 160 is in an expanded state (e.g., a partially expanded state or a fully expanded state). The angle 318 can be less than, equal to, or greater than the angle 316. FIGS. 10A-18H illustrate that the angle 318 can be double the angle 311 between the clockwise and counterclockwise elements 310*a*, 310*b* and the longitudinal axis 310*x* of the reinforcement 310. A low angle 311 (e.g., 5 degrees to 45 degrees) between the clockwise and counterclockwise elements 310*a*, 310*b* and the longitudinal axis 310*x* of the reinforcement 310 can correspond to an angle 318 of 10 degrees to 90 degrees (also referred to as a low angle 318), including every 1 degree increment within this range (e.g., 10 degrees, 15 degrees, 30 degrees, 45 degrees, 60 degrees, 75 degrees, 90 degrees). When the reinforcement 310 has a low angle 318 between the clockwise and counterclockwise elements 310*a*, 310*b*, the reinforcement 310 can, for example, resist axial expansion but allow radial expansion. For example, a reinforcement 310 with a low angle 318 between the clockwise and counterclockwise elements 310*a*, 310*b* can allow the diameter of the tube 160 to passively increase (e.g., from diameter d1 to diameter d2) as an oversized device (e.g., device 329) is advanced along the lumen 104 but can inhibit or prevent the length of the tube 160 from increasing as the oversized device (e.g., device 329) is advanced along the lumen 104. The angle 318 can be, for example, a low angle when the tube 160 is in an expanded state (e.g., a partially expanded state or a fully expanded state). A high angle 311 (e.g., 46 degrees to 85 degrees) between the clockwise and counterclockwise elements 310*a*, 310*b* and the longitudinal axis 310*x* of the reinforcement 310 can correspond to an angle 318 of 92 degrees to 170 degrees (also referred to as a high angle 318), including every 1 degree increment within this range (e.g., 92 degrees, 100 degrees, 120 degrees, 150 degrees, 170 degrees). When the reinforcement 310 has a high angle 318 between the clockwise and counterclockwise elements 310*a*, 310*b*, the reinforcement 310 can, for example, resist radial expansion but allow axial expansion. For example, a reinforcement 310 with a high angle 318 between the clockwise and counterclockwise elements 310*a*, 310*b* can allow the length of the tube 160 to passively increase (e.g., from a first length to a second length) as an oversized device (e.g., device 329) is advanced along the lumen 104 but can inhibit or prevent the diameter of the tube 160 from increasing as the oversized device (e.g., device 329) is advanced along the lumen 104. The angle 318 can be, for example, a high angle when the tube 160 is in an expanded state (e.g., a partially expanded state or a fully expanded state). For example, FIGS. 10A-18H illustrate that the angle 318 can be a high angle when the tube 160 is in an expanded state (e.g., a partially expanded state or a fully expanded state).

The angle 316 can decrease as the tube 160 is axially expanded, for example, to the angle 318. The angle 318 can be less than the angle 316, for example, by 1 degree to 165 degrees, or more narrowly, by 1 degree to 90 degrees, or more narrowly still, by 1 degree to 30 degrees, including every 1 degree increment within these ranges (e.g., 1 degree, 10 degrees, 20 degrees, 30 degrees, 90 degrees, 165 degrees). The reinforcement 310 can, for example, allow the tube 160 to axially expand as the device is advanced along the lumen 104 up to the axial expansion limit but can inhibit or prevent further axial expansion beyond the axial expansion limit. Permitting such axial expansion up to a limit can reduce the risk of the layer 302 being torn or punctured by the device as the device is axially advanced in the lumen 104. As another example, FIGS. 10A-18H illustrate that the angle 316 can increase as the tube 160 is radially expanded, for example, to the angle 318. The angle 318 can be greater than the angle 316, for example, by 1 degree to 165 degrees, or more narrowly, by 1 degree to 90 degrees, or more narrowly still, by 1 degree to 30 degrees, including every 1 degree increment within these ranges (e.g., 1 degree, 10 degrees, 20 degrees, 30 degrees, 90 degrees, 165 degrees). The reinforcement 310 can, for example, allow the tube 160 to radially expand as the device is advanced along the lumen 104 up to the radial expansion limit but can inhibit or prevent further radial expansion beyond the radial expansion limit. Permitting such radial expansion up to a limit can reduce the risk of the layer 302 being torn or punctured by the device as the device is axially advanced in the lumen 104 and can allow devices (e.g., 329) that have a larger diameter than the tube 160 to be inserted into the lumen 104 of the tube 160.

FIGS. 10A-18H illustrate that the characteristics or parameters of the reinforcement 310 can include a distance 360*d* between the points where the clockwise and counterclockwise elements 310*a*, 310*b* cross each other. The distance 360*d* can be, for example, a circumferential distance between two locations (e.g., between two adjacent locations) where the clockwise and counterclockwise elements 310*a*, 310*b* intersect. FIGS. 10C and 10D illustrate, for example, that the distance 360*d* can increase from a first distance 360*d*1 to a second distance 360*d*2 when the tube 160 is expanded from a non-expanded state to an expanded state, and that the distance 360*d* can decrease from the second distance 360*d*2 to the first distance 360*d*1 when the tube 160 is contracted from the expanded state to the non-expanded state.

When the tube 160 is in the non-expanded state (e.g., FIG. 10C), the first distance 360*d*1 (e.g., circumferential distance) between two locations where the clockwise and counterclockwise elements 310*a*, 310*b* intersect can be, for example, 0.5 mm to 10.0 mm, including every 0.1 mm increment within this range (e.g., 0.5 mm, 2.0 mm, 7.0 mm, 10.0 mm).

When the tube 160 is in the expanded state (e.g., FIG. 10D), the second distance 360*d*2 (e.g., circumferential distance) between two locations where the clockwise and counterclockwise elements 310*a*, 310*b* intersect can be, for example, 0.6 mm to 15.0 mm, including every 0.1 mm increment within this range (e.g., 0.6 mm, 2.1 mm, 10.1 mm, 15 mm).

As a device (e.g., the device 329) is advanced in the lumen 104, the tube 160 can axially stretch such that the angle 316 can decrease to the angle 318, and as the device is withdrawn from the lumen 104, the tube 160 can axially contract such that the angle 318 can increase to the angle 316. The device can thereby progressively axially expand and axially contract the tube 160 as the device is advanced and retracted in the lumen 104, respectively. In such cases, the reinforcement 310 can inhibit or prevent the tube 160 from rebounding, or snapping back, to the axially unstretched state too quickly, such that the reinforcement 310 can control the rate at which the axially stretched portion returns to the axially unstretched state. For situations in which the tube 160 is in a vessel and the device is advanced and retracted while the tube 160 is in the vessel, this can inhibit or prevent the tube 160 from shocking (e.g., longitudinally shocking) the wall of the vessel as the device is passed through the lumen 104 in the tube 160, thereby reducing the risk of damaging (e.g., tearing or lacerating) the vessel wall and reducing the risk of dislodging plaque or other buildup (e.g., a clot) from the vessel wall into the bloodstream. As another example, as shown in FIGS. 10A-18H, the reinforcement 310 can prevent the tube 160 from axially expanding and axially contracting as the device is advanced and withdrawn in the lumen 104, respectively, which can likewise inhibit or prevent the tube 160 from damaging the vessel due to axial expansion and axial contraction.

As a device (e.g., the device 329) is advanced in the lumen 104, the tube 160 can radially stretch such that the angle 316 can increase to the angle 318, and as the device is withdrawn from the lumen 104, the tube 160 can radially contract such that the angle 318 can decrease to the angle 316. The device can thereby progressively radially expand and radially contract the tube 160 as the device is advanced and retracted in the lumen 104, respectively. In such cases, the reinforcement 310 can inhibit or prevent the tube 160 from rebounding, or snapping back, to the radially unstretched state too quickly, such that the reinforcement 310 can control the rate at which the radially stretched portion returns to the radially unstretched state. For situations in which the tube 160 is in a vessel and the device is advanced and retracted while the tube 160 is in the vessel, this can inhibit or prevent the tube 160 from shocking (e.g., radially shocking) the wall of the vessel as the device is passed through the lumen 104 in the tube 160, thereby reducing the risk of damaging (e.g., tearing or lacerating) the vessel wall and reducing the risk of dislodging plaque or other buildup (e.g., a clot) from the vessel wall into the bloodstream. As another example, the reinforcement 310 can prevent the tube 160 from radially expanding and radially contracting as the device is advanced and withdrawn in the lumen 104, respectively, which can likewise inhibit or prevent the tube 160 from damaging the vessel due to radial expansion and axial contraction.

As a device (e.g., the device 329) is advanced in the lumen 104, the tube 160 can radially and/or axially expand such that the angle 318 can be less than, equal to, or greater than the angle 316, and as the device is withdrawn from the lumen 104, the tube 160 can radially and/or axially contract such that the angle 318 can return to angle 316 or to a different angle or remain at the angle 318 (for cases in which the angle 318 is equal to the angle 316).

For devices that are inserted into the lumen 104 in which only a portion (e.g., the distal end) of the device is larger than the diameter of the lumen 104 when the tube 160 is in the non-expanded state, the location of the axial and/or radial expansion caused by the device can be localized to the portion of the tube 160 that the oversized portion of the device is in. Once the distal end of the device passes by a portion of the tube 160 that the device has expanded or stretched, also referred to as the axially and/or radially stretched portion, the axially and/or radially stretched portion can axially and/or radially contract and return to an axially and/or radially unstretched state, for example, via the reinforcement 310 axially and/or radially contracting the tube 160. As the axially and/or radially stretched portion returns to an axially and/or radially unstretched state, the angle of the stretched portion (e.g., angle 318) can return to the angle 316. In other words, as the device is passed through the tube 160, the portion of the reinforcement 310 proximal the tip of the device can have the angle 316, the portion of the reinforcement adjacent the reinforcement 310 can have the angle 318 or an angle between the angle 316 and the angle 318, and the portion of the reinforcement 310 distal the tip of the device can have the angle 316. The tube 160 can thereby progressively axially and/or radially expand and axially and/or radially contract along the length of the tube 160 as a device is advanced along the lumen 104.

The layers of the tube 160 in FIGS. 10A-18H can be made of various materials, including any of the materials described herein. For example, the layers of the tube 160 in FIGS. 10A-15H can comprise the first variation of materials described herein, the second variation of materials described herein, the third variation of materials described herein), or any combination of materials contemplated herein, including, for example, the material combinations described with respect to the tube 160 in FIGS. 7A-9H above (e.g., the first, second, or third variations of materials). For example, for variations in which the tube 160 has the second variation of materials, layer 302 can comprise ePTFE, layer 304 can comprise a fluoroelastomer, and layer 306 can comprise ePTFE. With respect to FIGS. 10A-15H, the tube 160 can comprise any three layers of materials disclosed herein. With respect to FIGS. 16A-18H, the tube 160 can comprise any two layers of materials disclosed herein, including, for example, any two of the layers in FIGS. 7A-15H.

The tubes 160 in FIGS. 10A-18H can be variations of the tubes 160 in FIGS. 7A-9H.

FIGS. 10A-12H illustrate, for example, that the tubes 160 in FIGS. 7A-9H can have a reinforcement 310 (e.g., braid or spiral wrap) in a different layer than the reinforcement 308, for example, in layer 306. For example, FIGS. 10A-10D illustrate that the tube 160 in FIGS. 7A-7D can have a reinforcement 310 in layer 306, FIGS. 11A-11D illustrate that the tube 160 in FIGS. 8A-8D can have a reinforcement 310 in layer 306, and FIGS. 12A-12H illustrate that the tube 160 in FIGS. 9A-9H can have a reinforcement 310 in layer 306. For example, the tubes 160 in FIGS. 10A-12H can correspond to the tubes 160 in FIGS. 7A-9H, respectively, with a reinforcement 310 in layer 306, where FIGS. 11A-11D can correspond to section 160*s*1 of the tube 160 in FIGS. 8A-8D.

FIGS. 10A & 10C, FIGS. 11A & 11C, and FIGS. 12A, 12C, 12E, & 12F illustrate the tube 160 in a non-expanded state before and/or after expansion (e.g., before and/or after radial and/or axial expansion), for example, before expansion of the tube 160 and/or after the tube 160 has returned to the non-expanded state after having been expanded. For example, FIGS. 10A & 10C, FIGS. 11A & 11C, and FIGS. 12A, 12C, 12E, & 12F illustrate the tube 160, the reinforcement 308, and the reinforcement 310 in a non-expanded state. The non-expanded state can be a neutral state or a contracted state. FIGS. 10A & 10C, FIGS. 11A & 11C, and FIGS. 12A, 12C, 12E, & 12F illustrate that the tube 160 can have the arrangement of features shown when the tube 160 is in a non-expanded state. For example, FIGS. 10A & 10C, FIGS. 11A & 11C, and FIGS. 12A, 12C, 12E, & 12F illustrate that the lumen 104, layer 302, layer 304, layer 306, the reinforcement 308, and the reinforcement 310 can have the arrangement shown, including the relative positions between these features, when the tube 160 is in a non-expanded state.

FIGS. 10B & 10D, FIGS. 11B & 11D, and FIGS. 12B, 12D, 12G, & 12H illustrate the tube 160 in an expanded state after expansion. The expanded state in FIGS. 10B & 10D, FIGS. 11B & 11D, and FIGS. 12B, 12D, 12G, & 12H can be a partially expanded state or a fully expanded state. For example, FIGS. 10B & 10D, FIGS. 11B & 11D, and FIGS. 12B, 12D, 12G, & 12H illustrate the tube 160, the reinforcement 308, and the reinforcement 310 in a partially expanded state. As another example, FIGS. 10B & 10D, FIGS. 11B & 11D, and FIGS. 12B, 12D, 12G, & 12H illustrate the tube 160, the reinforcement 308, and the reinforcement 310 in a fully expanded state. FIGS. 10B & 10D, FIGS. 11B & 11D, and FIGS. 12B, 12D, 12G, & 12H illustrate that the tube 160 can have the arrangement of features shown when the tube 160 is in an expanded state. For example, FIGS. 10B & 10D, FIGS. 11B & 11D, and FIGS. 12B, 12D, 12G, & 12H illustrate that the lumen 104, layer 302, layer 304, layer 306, the reinforcement 308, and the reinforcement 310 can have the arrangement shown, including the relative positions between these features, when the tube 160 is in an expanded state. The expanded state can be an axially expanded state and/or a radially expanded state. For example, FIGS. 10B & 10D, FIGS. 11B & 11D, and FIGS. 12B, 12D, 12G, & 12H illustrate a radially expanded state.

FIGS. 13A-15H illustrate, for example, that the tubes 160 in FIGS. 7A-9H can have a reinforcement 310 (e.g., braid or spiral wrap) in the same layer as the reinforcement 308, for example, in layer 304. For example, FIGS. 13A-13D illustrate that the tube 160 in FIGS. 7A-7D can have a reinforcement 310 in layer 304, FIGS. 14A-14D illustrate that the tube 160 in FIGS. 8A-8D can have a reinforcement 310 in layer 304, and FIGS. 15A-15H illustrate that the tube 160 in FIGS. 9A-9H can have a reinforcement 310 in layer 304. For example, the tubes 160 in FIGS. 13A-15H can correspond to the tubes 160 in FIGS. 7A-9H, respectively, with a reinforcement 310 in layer 304, where FIGS. 14A-14D can correspond to section 160*s*1 of the tube 160 in FIGS. 8A-8D.

FIGS. 13A & 13C, FIGS. 14A & 14C, and FIGS. 15A, 15C, 15E, & 15F illustrate the tube 160 in a non-expanded state before and/or after expansion (e.g., before and/or after radial and/or axial expansion), for example, before expansion of the tube 160 and/or after the tube 160 has returned to the non-expanded state after having been expanded. For example, FIGS. 13A & 13C, FIGS. 14A & 14C, and FIGS. 15A, 15C, 15E, & 15F illustrate the tube 160, the reinforcement 308, and the reinforcement 310 in a non-expanded state. The non-expanded state can be a neutral state or a contracted state. FIGS. 13A & 13C, FIGS. 14A & 14C, and FIGS. 15A, 15C, 15E, & 15F illustrate that the tube 160 can have the arrangement of features shown when the tube 160 is in a non-expanded state. For example, FIGS. 13A & 13C, FIGS. 14A & 14C, and FIGS. 15A, 15C, 15E, & 15F illustrate that the lumen 104, layer 302, layer 304, layer 306, the reinforcement 308, and the reinforcement 310 can have the arrangement shown, including the relative positions between these features, when the tube 160 is in a non-expanded state.

FIGS. 13B & 13D, FIGS. 14B & 14D, and FIGS. 15B, 15D, 15G, & 15H illustrate the tube 160 in an expanded state after expansion. The expanded state in FIGS. 13B & 13D, FIGS. 14B & 14D, and FIGS. 15B, 15D, 15G, & 15H can be a partially expanded state or a fully expanded state. For example, FIGS. 13B & 13D, FIGS. 14B & 14D, and FIGS. 15B, 15D, 15G, & 15H illustrate the tube 160, the reinforcement 308, and the reinforcement 310 in a partially expanded state. As another example, FIGS. 13B & 13D, FIGS. 14B & 14D, and FIGS. 15B, 15D, 15G, & 15H illustrate the tube 160, the reinforcement 308, and the reinforcement 310 in a fully expanded state. FIGS. 13B & 13D, FIGS. 14B & 14D, and FIGS. 15B, 15D, 15G, & 15H illustrate that the tube 160 can have the arrangement of features shown when the tube 160 is in an expanded state. For example, FIGS. 13B & 13D, FIGS. 14B & 14D, and FIGS. 15B, 15D, 15G, & 15H illustrate that the lumen 104, layer 302, layer 304, layer 306, the reinforcement 308, and the reinforcement 310 can have the arrangement shown, including the relative positions between these features, when the tube 160 is in an expanded state. The expanded state can be an axially expanded state and/or a radially expanded state. For example, FIGS. 13B & 13D, FIGS. 14B & 14D, and FIGS. 15B, 15D, 15G, & 15H illustrate a radially expanded state.

FIGS. 16A-18H illustrate that the tube 160 can comprise two layers, for example, a first layer (e.g., the layer 302) and a second layer (e.g., the layer 304). The first layer can be the inner layer and the second layer can be the outer layer, or vice versa. For example, FIGS. 16A-18H illustrate that the tube 160 can comprise any two of the layers of the tubes 160 in FIGS. 7A-15H. For example, FIGS. 16A-18H illustrate the tubes 160 of FIGS. 13A-15H without layer 306. FIGS. 16A-18H thereby illustrate that the outer layer (e.g., the outermost layer) can have the reinforcement 308 and/or the reinforcement 310 (e.g., the reinforcement 308 and the reinforcement 310). For example, FIGS. 16A-18H illustrate the tube 160 in FIGS. 13A-13D without layer 306, FIGS. 17A-17D illustrate the tube 160 in FIGS. 14A-14D without layer 306, and FIGS. 18A-18H illustrate the tube 160 in FIGS. 15A-15H without layer 306. For example, the tubes 160 FIGS. 16A-18H can correspond to the tubes 160 in FIGS. 13A-15H, respectively, without layer 306. FIGS. 16A-18H illustrate, for example, that the tube 160 may not have layer 306. Having two layers instead of three layers can be important and/or beneficial, for example, to reduce or minimize the thickness T of the wall of the tube 160. Reducing the thickness T of the wall of the tube 160, for example, by having two layers instead of three layers, can allow the lumen 104 of the tube 160 to have a greater diameter (e.g., a greater diameter d2), which can in turn allow the larger devices (e.g., devices 329) to be advanced into the tube 160. For example, for an otherwise identical outer diameter of the tube 160 between the tubes 160 in FIGS. 13A-15H and the tubes 160 in FIGS. 16A-18H, diameter d2 of the lumen 104 of the tubes 160 in FIGS. 16A-18H can be greater than (e.g., 0.1 mm to 10.0 mm greater than) the diameter d2 of the lumen 104 of the tubes 160 in FIGS. 13A-15H, for example.

The layers of the tubes 160 in FIGS. 16A-18H can be made of various materials, including any combination of the materials disclosed herein. The tubes 160 in FIGS. 16A-18H can comprise any two layers of materials disclosed herein, including, for example, any two of the layers in FIGS. 7A-15H. For example, layer 302 can comprise PTFE or ePTFE and layer 304 can comprise PTFE, ePTFE, or a fluoroelastomer. The ePTFE in layer 302 can be axial ePTFE and/or radial ePTFE. The ePTFE in layer 304 can be axial ePTFE and/or radial ePTFE. The ePTFE in layer 302 and/or in layer 304 can be radial ePTFE and/or axial ePTFE depending on the direction of stretch that is desired (e.g., radial ePTFE when a tube expandable in the radial direction is desired, axial ePTFE when a tube expandable in the axial direction is desired, and radial ePTFE and axial ePTFE when a tube expandable in the radial and axial directions is desired). For material combinations in which layer 302 comprises PTFE or ePTFE and layer 304 comprises a fluoroelastomer, the fluoroelastomer can have a higher coefficient of friction than the PTFE or ePTFE in layer 302 such that the coating 314 shown in FIGS. 16A-18H can reduce on the coefficient of friction on the outer surface of the outer layer (e.g., of layer 304). FIGS. 16A-18H illustrate, for example, that layer 302 can comprise radial ePTFE and that layer 304 can comprise radial ePTFE, and that the coating 314 can be on the outer surface of layer 304. As another example, the tube 160 may not have the coating 314.

FIGS. 16A & 16C, FIGS. 17A & 17C, and FIGS. 18A, 18C, 18E, & 18F illustrate the tube 160 in a non-expanded state before and/or after expansion (e.g., before and/or after radial and/or axial expansion), for example, before expansion of the tube 160 and/or after the tube 160 has returned to the non-expanded state after having been expanded. For example, FIGS. 16A & 16C, FIGS. 17A & 17C, and FIGS. 18A, 18C, 18E, & 18F illustrate the tube 160, the reinforcement 308, and the reinforcement 310 in a non-expanded state. The non-expanded state can be a neutral state or a contracted state. FIGS. 16A & 16C, FIGS. 17A & 17C, and FIGS. 18A, 18C, 18E, & 18F illustrate that the tube 160 can have the arrangement of features shown when the tube 160 is in a non-expanded state. For example, FIGS. 16A & 16C, FIGS. 17A & 17C, and FIGS. 18A, 18C, 18E, & 18F illustrate that the lumen 104, layer 302, layer 304, the reinforcement 308, and the reinforcement 310 can have the arrangement shown, including the relative positions between these features, when the tube 160 is in a non-expanded state.

FIGS. 16B & 16D, FIGS. 17B & 17D, and FIGS. 18B, 18D, 18G, & 18H illustrate the tube 160 in an expanded state after expansion. The expanded state in FIGS. 16B & 16D, FIGS. 17B & 17D, and FIGS. 18B, 18D, 18G, & 18H can be a partially expanded state or a fully expanded state. For example, FIGS. 16B & 16D, FIGS. 17B & 17D, and FIGS. 18B, 18D, 18G, & 18H illustrate the tube 160, the reinforcement 308, and the reinforcement 310 in a partially expanded state. As another example, FIGS. 16B & 16D, FIGS. 17B & 17D, and FIGS. 18B, 18D, 18G, & 18H illustrate the tube 160, the reinforcement 308, and the reinforcement 310 in a fully expanded state. FIGS. 16B & 16D, FIGS. 17B & 17D, and FIGS. 18B, 18D, 18G, & 18H illustrate that the tube 160 can have the arrangement of features shown when the tube 160 is in an expanded state. For example, FIGS. 16B & 16D, FIGS. 17B & 17D, and FIGS. 18B, 18D, 18G, & 18H illustrate that the lumen 104, layer 302, layer 304, the reinforcement 308, and the reinforcement 310 can have the arrangement shown, including the relative positions between these features, when the tube 160 is in an expanded state. The expanded state can be an axially expanded state and/or a radially expanded state. For example, FIGS. 16B & 16D, FIGS. 17B & 17D, and FIGS. 18B, 18D, 18G, & 18H illustrate a radially expanded state.

FIGS. 10A-18H illustrate portions of the tube 160, the reinforcement 308, and the reinforcement 310 transparent for illustrative purposes, for example, so that the layered arrangement of the tube 160, the reinforcement 308, and the reinforcement 310 can be more easily visualized, and so that the structure of the reinforcement 308 and the reinforcement 310 can be more easily visualized. With respect to FIGS. 10A, 10B, 11A, 11B, 12A, 12B, 12E, and 12G, for example, section X1 illustrates layer 304, layer 306, and the reinforcement 310 transparent, section X2 illustrates layer 304 and layer 306 transparent, and section X3 illustrates layer 306 and the reinforcement 308 transparent. With respect to FIGS. 12F and 12H, for example, sections X1 and X2 illustrate layer 304, layer 306, and the reinforcement 310 transparent, and section X3 illustrates layer 304 and layer 306 transparent. With respect to FIGS. 13A, 13B, 14A, 14B, 15A, 15B, 15E, and 15G, for example, section X1 illustrates layer 304, layer 306, and the reinforcement 310 transparent, section X2 illustrates layer 304 and layer 306 transparent, and section X3 illustrates layer 304, layer 306, and the reinforcement 308 transparent. With respect to FIGS. 15F and 15H, for example, sections X1 and X2 illustrate layer 304, layer 306, and the reinforcement 310 transparent, and section X3 illustrates layer 304 and layer 306 transparent. With respect to FIGS. 16A, 16B, 17A, 17B, 18A, 18B, 18E, and 18G, for example, section X1 illustrates layer 304 and the reinforcement 310 transparent, section X2 illustrates layer 304 transparent, and section X3 illustrates layer 304 and the reinforcement 308 transparent. With respect to FIGS. 18F and 18H, for example, sections X1 and X2 illustrate layer 304 and the reinforcement 310 transparent, and section X3 illustrates layer 304 transparent. Sections X1, X2, and X3 can each be, for example, be ⅓ of the length of the section 160*s*1 (e.g., ⅓ of the length 160*s*1L).

FIGS. 19A-21H illustrate that the tubes 160 of FIGS. 16A-18H may not have the reinforcement 310. For example, the tubes 160 FIGS. 19A-21H can correspond to the tubes 160 in FIGS. 16A-18H, respectively, without the reinforcement 310. For example, the radial ePTFE in layer 302 and/or in layer 304 can eliminate the need or desire for the reinforcement 310, and the reinforcement 308 (e.g., zigzag wire, oscillating wire, undulating wire) can, for example, combine the properties of both a coil (which can have poor torquability but good kink resistance and good crush resistance) and a braid (which can have good torquability but poor kink resistance). As another example, the tube 160 of FIGS. 19A-21H can have the reinforcement 310 but not the reinforcement 308. In other words, the tube 160 of FIGS. 16A-18H may not have the reinforcement 308. As another example, FIGS. 19A-21H illustrate that the tube 160 of FIGS. 7A-9H may not have layer 306. For example, the tubes 160 FIGS. 19A-21H can correspond to the tubes 160 in FIGS. 7A-9H, respectively, without layer 306.

FIGS. 19A & 19C, FIGS. 20A & 20C, and FIGS. 21A, 21C, 21E, & 21F illustrate the tube 160 in a non-expanded state before and/or after expansion (e.g., before and/or after radial and/or axial expansion), for example, before expansion of the tube 160 and/or after the tube 160 has returned to the non-expanded state after having been expanded. For example, FIGS. 19A & 19C, FIGS. 20A & 20C, and FIGS. 21A, 21C, 21E, & 21F illustrate the tube 160 and the reinforcement 308 in a non-expanded state. The non-expanded state can be a neutral state or a contracted state. FIGS. 19A & 19C, FIGS. 20A & 20C, and FIGS. 21A, 21C, 21E, & 21F illustrate that the tube 160 can have the arrangement of features shown when the tube 160 is in a non-expanded state. For example, FIGS. 19A & 19C, FIGS. 20A & 20C, and FIGS. 21A, 21C, 21E, & 21F illustrate that the lumen 104, layer 302, layer 304, and the reinforcement 308 can have the arrangement shown, including the relative positions between these features, when the tube 160 is in a non-expanded state.

FIGS. 19B & 19D, FIGS. 20B & 20D, and FIGS. 21B, 21D, 21G, & 21H illustrate the tube 160 in an expanded state after expansion. The expanded state in FIGS. 19B & 19D, FIGS. 20B & 20D, and FIGS. 21B, 21D, 21G, & 21H can be a partially expanded state or a fully expanded state. For example, FIGS. 19B & 19D, FIGS. 20B & 20D, and FIGS. 21B, 21D, 21G, & 21H illustrate the tube 160 and the reinforcement 308 in a partially expanded state. As another example, FIGS. 19B & 19D, FIGS. 20B & 20D, and FIGS. 21B, 21D, 21G, & 21H illustrate the tube 160 and the reinforcement 308 in a fully expanded state. FIGS. 19B & 19D, FIGS. 20B & 20D, and FIGS. 21B, 21D, 21G, & 21H illustrate that the tube 160 can have the arrangement of features shown when the tube 160 is in an expanded state. For example, FIGS. 19B & 19D, FIGS. 20B & 20D, and FIGS. 21B, 21D, 21G, & 21H illustrate that the lumen 104, layer 302, layer 304, and the reinforcement 308 can have the arrangement shown, including the relative positions between these features, when the tube 160 is in an expanded state. The expanded state can be an axially expanded state and/or a radially expanded state. For example, FIGS. 19B & 19D, FIGS. 20B & 20D, and FIGS. 21B, 21D, 21G, & 21H illustrate a radially expanded state.

FIGS. 19A-21H illustrate portions of the tube 160 can be transparent for illustrative purposes, for example, so that the layered arrangement of the tube 160 can be more easily visualized, and so that the structure of the reinforcement 308 can be more easily visualized. For example, FIGS. 19A, 19B, 20A, 20B, 21A, 21B, and 21E-21F illustrate layer 304 transparent.

FIGS. 22A-24H illustrate that the tube 160 can comprise one layer, for example, layer 302, layer 304, or layer 306. For example, FIGS. 22A-24H illustrate that the tube 160 can have a single layer (e.g., layer 302). The single layer can be layer 302, layer 304, or layer 306.

A tube 160 with a single layer can comprise any layer of any of the tubes 160 disclosed herein. For example, FIGS. 22A-24H illustrate that the tube 160 can comprise any one of the layers of the tubes 160 in FIGS. 7A-21H (e.g., only layer 302, only layer 304, or only layer 306). The single layer (e.g., layer 302, layer 304, or layer 306) can be, for example, axial ePTFE and/or radial ePTFE depending on the direction of elasticity desired. For example, FIGS. 22A-24H illustrate that when a tube 160 has a single layer (e.g., layer 302, layer 304, or layer 306), the layer of the tube 160 can be radial ePTFE. FIGS. 22A-24H illustrate that the tube 160 can have the reinforcement 308. FIGS. 22A-24H can correspond to any of FIGS. 7A-21H with only one of the layers, with the reinforcement 308 and/or with the reinforcement 310 in the layer. For example, the tubes 160 in FIGS. 22A-24H can be the tubes 160 in FIGS. 7A-9H, respectively, without layer 302 and without layer 306, and/or the tubes 160 in FIGS. 22A-24H can be the tubes 160 of FIGS. 19A-21H, respectively, without layer 302. As another example, the reinforcement 308 can be swapped with the reinforcement 310 in FIGS. 22A-24H such that the tube 160 in FIGS. 22A-24H can have the reinforcement 310 instead of the reinforcement 308. For example, the tubes 160 in FIGS. 22A-24H can be the tubes 160 of FIGS. 10A-12H, respectively, without layer 302 and without layer 304. As yet another example, the tube 160 in FIGS. 22A-24H can have both the reinforcement 308 and the reinforcement 310. For example, the tubes 160 in FIGS. 22A-24H can be the tubes 160 of FIGS. 13A-15H, respectively, without layer 302 and without layer 304, and/or the tubes 160 in FIGS. 22A-24H can be the tubes 160 of FIGS. 16A-18H, respectively, without layer 302. The tubes 160 in FIGS. 22A-24H, including the single layer of any of the variations, can have an outer coating (e.g., coating 314) and/or an inner coating. As another example, the tube 160 in FIGS. 22A-24H or any of the above variations may not have an outer coating and/or may not have an inner coating.

The layers of the tubes 160 in FIGS. 22A-24H can be made of various materials, including any material disclosed herein. The tubes 160 in FIGS. 22A-24H can comprise any layer of material disclosed herein, including, for example, any one of the layers in FIGS. 7A-21H. For example, layer 302 can comprise PTFE, ePTFE, or a fluoroelastomer. The ePTFE in layer 302 can be axial ePTFE and/or radial ePTFE. The ePTFE in layer 302 can be radial ePTFE and/or axial ePTFE depending on the direction of stretch that is desired (e.g., radial ePTFE when a tube expandable in the radial direction is desired, axial ePTFE when a tube expandable in the axial direction is desired, and radial ePTFE and axial ePTFE when a tube expandable in the radial and axial directions is desired). For material combinations in which layer 302 comprises a fluoroelastomer, the coating 314 shown in FIGS. 22A-24H can reduce on the coefficient of friction on the outer surface of the tube 160 (e.g., on the outer surface of layer 302). FIGS. 22A-24H illustrate, for example, that layer 302 can comprise radial ePTFE and that the coating 314 can be on the outer surface of layer 302. As another example, the tube 160 may not have the coating 314.

FIGS. 22A & 22C, FIGS. 23A & 23C, and FIGS. 24A, 24C, 24E, & 24F illustrate the tube 160 in a non-expanded state before and/or after expansion (e.g., before and/or after radial and/or axial expansion), for example, before expansion of the tube 160 and/or after the tube 160 has returned to the non-expanded state after having been expanded. For example, FIGS. 22A & 22C, FIGS. 23A & 23C, and FIGS.

24A, 24C, 24E, & 24F illustrate the tube 160 and the reinforcement 308 in a non-expanded state. The non-expanded state can be a neutral state or a contracted state. FIGS. 22A & 22C, FIGS. 23A & 23C, and FIGS. 24A, 24C, 24E, & 24F illustrate that the tube 160 can have the arrangement of features shown when the tube 160 is in a non-expanded state. For example, FIGS. 22A & 22C, FIGS. 23A & 23C, and FIGS. 24A, 24C, 24E, & 24F illustrate that the lumen 104, layer 302, and the reinforcement 308 can have the arrangement shown, including the relative positions between these features, when the tube 160 is in a non-expanded state.

FIGS. 22B & 22D, FIGS. 23B & 23D, and FIGS. 24B, 24D, 24G, & 24H illustrate the tube 160 in an expanded state after expansion. The expanded state in FIGS. 22B & 22D, FIGS. 23B & 23D, and FIGS. 24B, 24D, 24G, & 24H can be a partially expanded state or a fully expanded state. For example, FIGS. 22B & 22D, FIGS. 23B & 23D, and FIGS. 24B, 24D, 24G, & 24H illustrate the tube 160 and the reinforcement 308 in a partially expanded state. As another example, FIGS. 22B & 22D, FIGS. 23B & 23D, and FIGS. 24B, 24D, 24G, & 24H illustrate the tube 160 and the reinforcement 308 in a fully expanded state. FIGS. 22B & 22D, FIGS. 23B & 23D, and FIGS. 24B, 24D, 24G, & 24H illustrate that the tube 160 can have the arrangement of features shown when the tube 160 is in an expanded state. For example, FIGS. 22B & 22D, FIGS. 23B & 23D, and FIGS. 24B, 24D, 24G, & 24H illustrate that the lumen 104, layer 302, and the reinforcement 308 can have the arrangement shown, including the relative positions between these features, when the tube 160 is in an expanded state. The expanded state can be an axially expanded state and/or a radially expanded state. For example, FIGS. 22B & 22D, FIGS. 23B & 23D, and FIGS. 24B, 24D, 24G, & 24H illustrate a radially expanded state.

FIGS. 22A-24H illustrate portions of the tube 160 can be transparent for illustrative purposes, for example, so that the layered arrangement of the tube 160 can be more easily visualized, and so that the structure of the reinforcement 308 can be more easily visualized. For example, FIGS. 22A, 22B, 23A, 23B, 24A, 24B, and 24E-24F illustrate layer 302 transparent.

FIGS. 25A-25D illustrate that a tube 160 with a single layer (e.g., only layer 302, only layer 304, or only layer 306) can have two reinforcements, for example, a reinforcement 308 and a reinforcement 310. A tube 160 with a single layer can have any reinforcement 308 disclosed herein and/or can have any reinforcement 310 disclosed herein. As another example, a tube 160 with a single layer can have two reinforcements, for example, two reinforcements 308 or two reinforcements 310, where the each of the reinforcements 308 can be any of the reinforcements 308 disclosed. For example, the first reinforcement 308 can be any of the reinforcements 308 shown in FIGS. 7A-24H having a nested configuration, having a non-nested configuration, or having a peak-to-peak variation, and the second reinforcement 308 can be any of the reinforcements 308 shown in FIGS. 7A-24H having a nested configuration, having a non-nested configuration, or having a peak-to-peak variation. As another example, for variations in which the tube 160 has two reinforcements 310, each of the reinforcements 310 can be any of the reinforcements 310 disclosed.

Figure 25A:
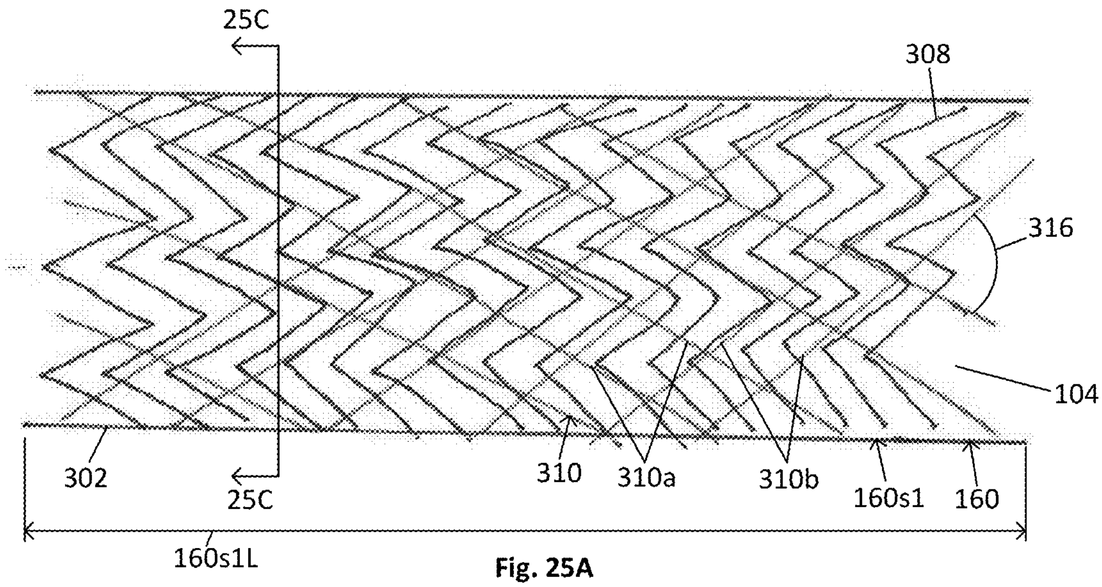
FIG. 25A is a closeup side view of the tube of FIG. 6A at section S1, for example, when the tube is in a non-expanded configuration.

FIG. 25A illustrates the tube 160 in a non-expanded state before expansion. For example, FIG. 25A illustrates the reinforcement 308 and the reinforcement 310 in a non-expanded state. The non-expanded state can be a neutral state or a contracted state.

Figure 25B:
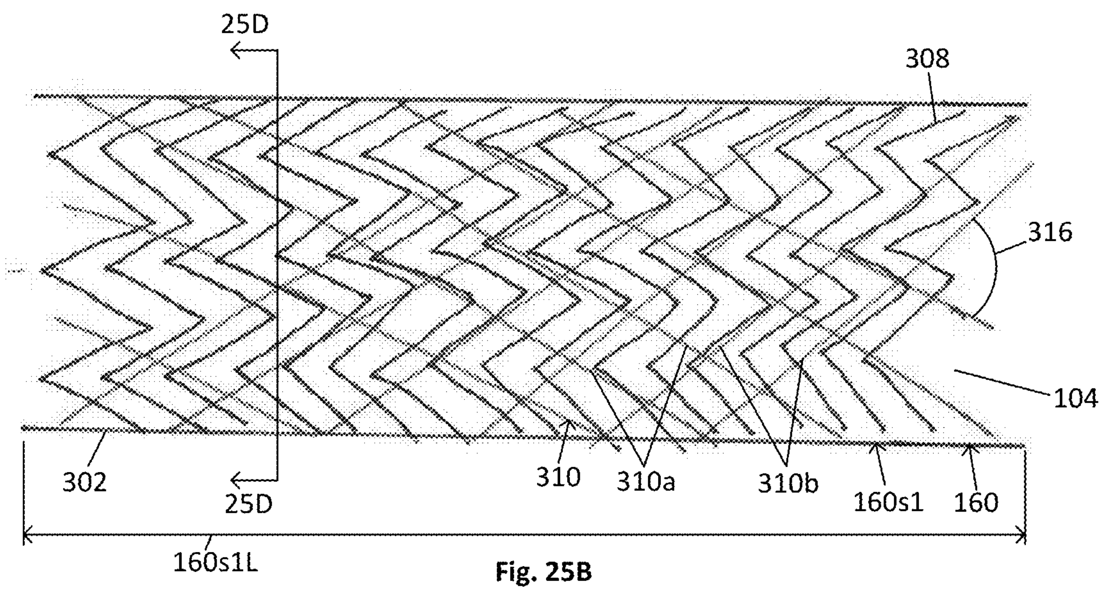
FIG. 25B is a closeup side view of the tube of FIG. 6C at section S2 after the tube is expanded, for example, when the tube is in an expanded configuration.

FIG. 25B illustrates the tube 160 in an expanded state after expansion. The expanded state in FIG. 25B can be a partially expanded state or a fully expanded state. For example, FIG. 25B illustrates the reinforcement 308 and the reinforcement 310 in a radially expanded state.

FIGS. 25A and 25B illustrate a portion of the tube 160 transparent for illustrative purposes, for example, so that the layered arrangement of the tube 160 can be more easily visualized, and so that the reinforcement 308 in the tube 160 can be more easily visualized. For example, FIGS. 25A and 25B illustrate layer 302 transparent.

Figure 25C:
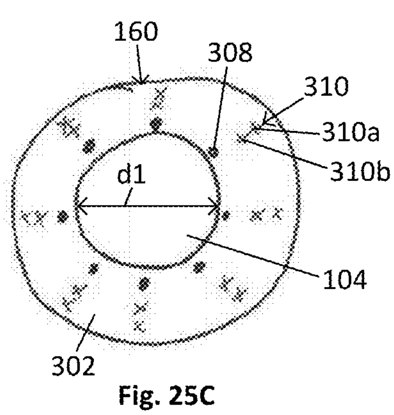

FIGS. 25A and 25C illustrate that the tube 160 can have the arrangement of features shown when the tube 160 is in the non-expanded state. For example, FIGS. 25A and 25C illustrate that the lumen 104, the layer 302, the reinforcement 308, and the reinforcement 310 can have the arrangement shown, including the relative positions between these features, when the tube 160 is in the non-expanded state.

Figure 25D:
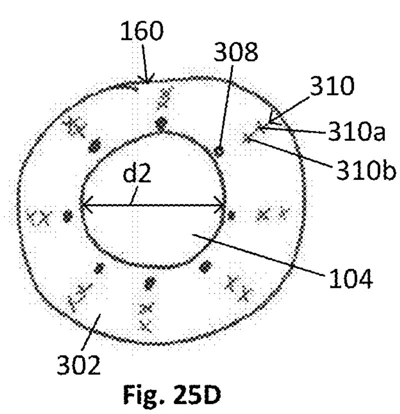

FIGS. 25B and 25D illustrate that the tube 160 can have the arrangement of features shown when the tube 160 is in the radially expanded state (e.g., when a device is in the lumen 104). For example, FIGS. 25B and 25D illustrate that the lumen 104, the layer 302, the reinforcement 308, and the reinforcement 310 can have the arrangement shown, including the relative positions between these features, when the tube 160 is in the expanded state.

The tube 160 can have 0, 1, 2, or 3 reinforcements, or more broadly, can have 0-5 reinforcements, including every 1 reinforcement increment within this range (e.g., 0 reinforcements, 1 reinforcement, two reinforcements, 5 reinforcements). For example, FIGS. 7A-9H and 19A-24H illustrate that the tube 160 can comprise one reinforcement (e.g., the reinforcement 308). As another example, FIGS. 10A-18H illustrate that the tube 160 can comprise two reinforcements, for example, a first reinforcement and a second reinforcement (e.g., the reinforcement 308 and the reinforcement 310). The first reinforcement can be the reinforcement 308 and the second reinforcement can be the reinforcement 310, or vice versa. The first and second reinforcements can be in the same layer or in different layers of the tube 160. For example, FIGS. 10A-12H illustrate that the first reinforcement (e.g., reinforcement 308) can be in layer 304 and that the second reinforcement (e.g., reinforcement 310) can be in layer 306. As another example, FIGS. 13A-18H illustrate that a first reinforcement (e.g., the reinforcement 308) and a second reinforcement (e.g., the reinforcement 310) can be in the same layer of the tube 160 (e.g., in layer 304).

For tubes 160 having a first reinforcement and a second reinforcement (e.g., FIGS. 10A-18H), the first reinforcement can be a different type of reinforcement than the second reinforcement. For example, FIGS. 10A-18H illustrate that the first reinforcement can be a reinforcement 308 (e.g., an elongate member such as a wire having an oscillating shape 344) and that the second reinforcement can be a reinforcement 310 (e.g., a braid, a spiral wrap), or vice versa.

For tubes 160 having a first reinforcement and a second reinforcement (e.g., FIGS. 10A-18H), the first reinforcement can be the same type of reinforcement as the second reinforcement. For example, the tube 160 can have two reinforcements 308 (e.g., a first reinforcement 308 and a second reinforcement 308). The first and second reinforcements 308 can have the same or different oscillating shape 344 as each other. For example, in FIGS. 10A-18H, the reinforcement 310 can be replaced with a reinforcement 308 that has the same or different oscillating shape 344 as the reinforcement 308 shown in FIGS. 10A-18H. As another example, another reinforcement 308 (e.g., a second reinforcement 308 in addition to the reinforcement 308 shown in FIGS. 7A-24H) can be added to any layer in FIGS. 7A-24H. The second reinforcement 308 can have the same or different oscillating shape 344 as the reinforcement 308 as the first reinforcement 308 (e.g., as the reinforcement 308 shown in FIGS. 7A-24H). The second reinforcement 308 can have a nested configuration (e.g., the peaks 344*p* can be nested in the valleys 344*v* of the second reinforcement 308 such as for the reinforcement 308 shown in FIGS. 7A-7D, 10A-10D, 13A-13D, 16A-16D, 19A-19D, or 22A-22D), can have a non-nested configuration (e.g., as shown for the reinforcement 308 in FIGS. 8A-8D, 11A-11D, 14A-14D, 17A-17D, 20A-20D, or 23A-23D), or can have a peak-to-peak variation (e.g., as shown for the reinforcement 308 in FIGS. 9A-9H, 12A-12H, 15A-15H, 18A-18H, 21A-21H, or 24A-24H). As yet another example, in FIGS. 10A-18H, the reinforcement 308 can be replaced with a reinforcement 310 such that the tube 160 can have, for example, two braids, two spiral wraps, or a braid and a spiral wrap. The tube 160 can have, for example, two reinforcements 310 (e.g., a first reinforcement 310 and a second reinforcements 310). The angle between the elements of the first reinforcement 310 and the longitudinal axis 310*x* of the reinforcement 310 can be a low angle or a high angle (e.g., when the tube 160 is in a neutral state or a contracted configuration), and the angle between the elements of the second reinforcement 310 and the longitudinal axis 310*x* of the reinforcement 310 can be a low angle or a high angle (e.g., when the tube 160 is in a neutral state or a contracted configuration). For example, the angle between the elements of the first reinforcement 310 and the longitudinal axis 310*x* of the reinforcement 310 can be a low angle (e.g., when the tube 160 is in a neutral state or a contracted configuration), and the angle between the elements of the second reinforcement 310 and the longitudinal axis 310*x* of the reinforcement 310 can be a high angle (e.g., when the tube 160 is in a neutral state or a contracted configuration).

Tubes 160 with zero reinforcements can correspond to tubes 160 that do not have a reinforcement 308 and/or a reinforcement 310. Tubes 160 with zero reinforcements can correspond to tubes 160 that are free of a reinforcement. For example, tubes 160 with zero reinforcements can correspond to tubes 160 that are free of a reinforcement 308 and/or are free of a reinforcement 310. For example, radial ePTFE can combine the properties of the reinforcement 308 and the reinforcement 310 such that a tube 160 having a layer with radial ePTFE can be free of both a reinforcement 308 and a reinforcement 310, whereby such a tube 160 can allow radial expansion and inhibit or prevent axial expansion. Tubes 160 with zero reinforcements can correspond to a tube 160 having one or more layers (e.g., layer 302, layer 304, and/or layer 306) with any of the material combinations disclosed herein, where the one or more layers (e.g., layer 302, layer 304, and/or layer 306) are free of a reinforcement 308 and are free of a reinforcement 310. For example, tubes 160 with zero reinforcements can correspond to any of the tubes 160 illustrated in FIGS. 7A-24H without any of the reinforcements shown. In such variations, one or more of the layers of the tube 160 can comprise axial ePTFE and/or one or more of the layers of the tube 160 can comprise radial ePTFE to control the expansion properties and expansion resistance properties of the tube 160.

As yet additional examples of tubes 160, any of the tubes 160 disclosed herein can be a layer (e.g., layer 302, layer 304, or layer 306) of a tube 160. For example, the tubes 160 in FIGS. 22A-24H can be layer 302 in FIGS. 7A-9H, can be layer 304 in FIGS. 10A-12H, or can be layer 304 in FIGS. 19A-21H. As another example, if layer 302, layer 304, and layer 306 of the tubes 160 in FIGS. 7A-9H instead each comprise the tube 160 shown in FIGS. 22A-24H, respectively, the tubes 160 in FIGS. 7A-9H can comprise tubes 160 having three reinforcements 308, a reinforcement 308 in each of the three layers. As yet another example, the tube 160 in FIGS. 25A-25D can be layer 304 in FIGS. 13A-18H.

Active Tubes and/or Passive Tubes

Any of the tubes disclosed herein can have one or multiple actuators 120. For example, any of the tubes 160 can have an actuator 120. The actuator 120 can be in (e.g., embedded in) any layer of a tube 160 (e.g., layer 302, layer 304, and/or layer 304), for example, of the tubes 160 shown in FIGS. 7A-25D. As another example, the actuator 120 can be between any two layers of a tube 160 (e.g., between layer 302 and layer 304, between layer 304 and 306), for example, of the tubes 160 shown in FIGS. 7A-21H. As yet another example, the actuator 120 can extend along an inner surface or an outer surface of the tube 160, for example, along an innermost surface or an outermost surface of the tube 160.

The tubes that have an actuator 120 are labeled as tubes 100 in the figures. For example, FIGS. 1A-3G illustrate various tubes 100 that have an actuator 120. The tubes 100 can have any of the features described with reference to the tubes 160. For example, the tubes 100 can be tubes 160 that have one or multiple actuators 120. FIGS. 26A-44D illustrate various tubes 100 with various combinations and arrangements of various layers, materials, coatings, and/or reinforcements described herein, whereby the tubes 100 can have any combination of the layers, materials, coatings, reinforcements, and/or actuators disclosed herein. A tube 100 can have, for example, any combination of layer 302, layer 304, layer 306, PTFE, axial ePTFE, radial ePTFE, a fluoroelastomer, a reinforcement 308, a reinforcement 310, a reinforcement 312, and an actuator 120. FIGS. 26-44D illustrate various combinations of these features. The tubes 100 are also referred to as various other terms followed by the reference numeral 100, including, for example, tube 100, tubing 100, expandable tube 100, dynamic walled tubing 100, actively expandable tube 100, expandable tube configuration 100.

The tubes 100 in FIGS. 26A-44D can be tubes 160 that have an actuator 120. For example, FIGS. 26A-28D illustrate that the tubes 160 in FIGS. 7A-9H can have an actuator 120, FIGS. 29A-31D illustrate that the tubes 160 in FIGS. 10A-12H can have an actuator, FIGS. 32A-34D illustrate that the tubes 160 in FIGS. 13A-15H can have an actuator 120, FIGS. 35A-37D illustrate that the tubes 160 in FIGS. 16A-18H can have an actuator 120, FIGS. 38A-40D illustrate that the tubes 160 in FIGS. 19A-21H can have an actuator 120, FIGS. 41A-41D illustrate the tubes 100 in FIGS. 35A-37D without the reinforcement 308, and FIGS. 42A-44D illustrate that the tubes 160 in FIGS. 22A-24H can have an actuator 120. Tubes 160 that have an actuator 120 can be actively expanded and/or actively contracted via the actuator 120. Tubes 160 that have an actuator 120 can be passively expanded and/or passively contracted, for example, due to passage of a device (e.g., device 329) in the lumen 104, for example, by passing the device through the lumen 104 without actuating (e.g., inflating) the actuator 120. The tubes in FIGS. 26A-44D are therefore labeled with reference number 100 and reference number 160, for example, to illustrate the dual functionality (e.g., the active functionality and the passive functionality) that the tubes in these figures can have. In other words, reference number 100 in FIGS. 26A-44D can indicate that the tubes 160 in these figures can be actively expanded and/or actively contracted via the actuator 120, and reference number 160 in FIGS. 26A-44D can indicate that the tubes 160 in these figures can be passively expanded and/or passively contracted due to passage of a device (e.g., device 329) in the lumen 104. As another example, the tubes 160 in FIGS. 26A-44D may not be passively expanded and/or passively contracted due to passage of a device (e.g., device 329) in the lumen 104 but can be actively expanded and/or actively contracted via the actuator 120.

The tube 100 can be actively expandable and/or actively contractible, for example, via the actuator 120 to accommodate passage of devices through the tube 100. For example, the actuator 120 can be activated (e.g., energized or inflated) to expand the tube 100 and can be deactivated (e.g., de-energized or deflated) to contract the tube 100. The tube 100 can be expanded via the actuator 120 to accommodate passage of devices through the tube 100, and/or the tube 100 can be contracted via the actuator 120 to accommodate removal of the tube 100 from a vessel.

Active tubes 100 may or may not also be passively expandable and/or passively contractible as a device (e.g., device 329) is advanced and withdrawn from the lumen 104. For example, the tubes 100 may or may not also function as passive tubes when the actuator 120 is in a non-actuated state (e.g., non-inflated state), when the actuator 120 is in a partially actuated state (e.g., partially inflated state), and/or when the actuator 120 is in a fully actuated state (e.g., fully inflated state). For example, the tubes 100 in FIGS. 26A-44D can be passively expandable and passively contractible such that the tubes 100 in FIGS. 26A-44D can passively expand as a device is inserted into the tube 100, and such that each tube 100 can passively contract as a device is withdrawn from the tube 100, for example, when the actuator 120 is in a non-actuated state (e.g., non-inflated state), when the actuator 120 is in a partially actuated state (e.g., partially inflated state), and/or when the actuator 120 is in a fully actuated state (e.g., fully inflated state). The non-actuated state is also referred to as the non-activated state, and actuated states are also referred to as activated states.

The actuator 120 can radially expand and radially contract the tube 100 with or without assistance from the device (e.g., device 329). For example, the tube 100 can be expanded to a partially expanded state by partially or fully activating (e.g., by partially or fully inflating) the actuator 120, and the device can further expand the tube 100, for example, from the partially expanded state to a fully expanded state, as the device is advanced along lumen 104 when the actuator 120 is in the partially or fully activated state. The device can thereby assist with expanding the tube 100 by passively expanding an actively expanded tube. The tube 100 can thereby be both actively expanded (e.g., via the actuator 120) and passively expanded (e.g., via the device). The actuator 120 can be partially or fully activated before advancing the device in the lumen 104. Activating the actuator 120 before advancing the device in along the lumen 104 can, for example, reduce the force required to expand the tube 100, which can reduce the force required to advance the device through the lumen 104 of the tube 100. As another example, when the actuator 120 is in a partially or fully activated state, the diameter of the lumen 104 (e.g., diameter d2) can be larger than the diameter or width of the device such that as the device is advanced along the lumen 104, the device does not further expand the tube 100.

The actuator 120 can be deactivated (e.g., deflated) before or after the device (e.g., device 329) is retracted from the lumen 104. For example, for variations in which the actuator 120 is deactivated after the device is retracted from the lumen 104, the tube 100 can passively radially contract (e.g., progressively passively radially contract) as the device is retracted from the lumen 104 such that the tube 100 can passively return, for example, to the partially expanded state. For example, for variations in which the actuator 120 is deactivated after the device is retracted from the lumen 104, the tube 100 may not passively radially contract (e.g., progressively passively radially contract) as the device is retracted from the lumen 104 in which case the tube 100 can retain its diameter and/or position in the target site (e.g., blood vessel) as the device is retracted, for example, so that another device (e.g., an implant) can be advanced in the lumen 104. As another example, for variations in which the actuator 120 is deactivated before the device is retracted from the lumen 104, the tube 100 can passively radially contract (e.g., progressively passively radially contract) as the device is retracted from the lumen 104 such that the tube 100 can passively return, for example, to a less expanded state than the partially expanded configuration (e.g., such that the tube 100 can passively return to the non-expanded state of the tube 100).

FIGS. 26A-28D illustrate that the tubes 160 in FIGS. 7A-9H can have an actuator 120. The actuator 120 can be in layer 302, layer 304, or layer 306. For example, FIGS. 26A-28D illustrate that the actuator 120 can be in layer 304. As additional examples, the actuator 120 can be in layer 302 or layer 306.

FIGS. 26A-28D illustrate that the tube 100 can have the reinforcement 308 (e.g., zigzag wire). The reinforcement 308 can be in layer 302, layer 304, or layer 306. For example, FIGS. 26A-28D illustrate that the reinforcement 308 can be in in layer 304. As additional examples, the reinforcement 308 can be in layer 302 or layer 306. The reinforcement 308 can provide any of the same benefits, including all of the same benefits, for the tube 100 as for the tube 160. For example, the reinforcement 308 can inhibit kinking of the tube 100, can inhibit crushing of the tube 100, can transmit torque along the tube 100, can reduce the force required to expand the tube 100, can reduce the force required to advance a device through the lumen 104 of the tube 100, or any combination thereof. The reinforcement 308 can be, for example, a kink inhibitor. The reinforcement 308 can be, for example, a crush inhibitor. The reinforcement 308 can be, for example, a torque transmitter. The reinforcement 308 (e.g., zigzag wire, oscillating wire, undulating wire) can, for example, combine the properties of both a coil (which can have poor torquability but good kink and crush resistance) and a braid (which can have good torquability but poor kink resistance).

The actuator 120 can be in the same or different layer as the reinforcement 308. For example, FIGS. 26A-28D illustrate that the actuator 120 and the reinforcement 308 can be in the same layer (e.g., in layer 304). FIGS. 26A-28D illustrate, for example, that layer 304 in FIGS. 7A-9H can be made thicker (e.g., 1 mm to 8 mm thicker, including every 1 mm increment within this range) so that layer 304 can have both the actuator 120 and the reinforcement 308. As additional examples, the actuator 120 and the reinforcement 308 can both be in layer 302 or layer 306.

The tube 100 can be expanded by the actuator 120 with or without assistance from a device (e.g., device 329) as the device is passed through the lumen 104.

FIGS. 26A-28D illustrate that the actuator 120 can have the reinforcement 132. As described above, the reinforcement 132 can be, for example, a coil, an oscillating wire (e.g., a zigzag wire), a braid, or a spiral wrap. For example, FIGS. 26A-28D illustrate that the reinforcement 132 can be a spiral wrap. As another example, FIGS. 26A-28D illustrate that the reinforcement 132 can be a braid. FIGS. 26A-28D illustrate that the reinforcement 132 can be embedded in the wall of the actuator 120, for example, in one of the layers (e.g., layer 304) of the tube 100. As another example, the actuator 120 may not have the reinforcement 132 (e.g., as shown in FIGS. 1A-1D and 3A-3G).

FIGS. 26A-28D illustrate that the actuator 120 can be linear (e.g., can be straight, without an oscillating pattern, as it extends circumferentially around the lumen 104) when in the non-actuated state (e.g., FIGS. 26A & 26C, FIGS. 27A & 27C, and FIGS. 28A & 28C) and when in the actuated state (e.g., FIGS. 26B & 26D, FIGS. 27B & 27D, and FIGS. 28B & 28D).

As another example, the actuator 120 in FIGS. 26A-28D can have an oscillating (e.g., zigzag) shape when in a non-actuated state (e.g., as shown in FIGS. 1A and 1C) and can have less (e.g., 1% to 100% less) of the oscillating (e.g., zigzag) shape when in an actuated state (e.g., as shown in FIGS. 1B and 1D), where 100% less of the oscillating shape can correspond to no oscillating shape when in the actuated state. For example, the actuator 120 can have a helical first oscillating shape (e.g., a first zigzag shape) that extends around the lumen 104 when the actuator 120 is in the non-actuated state (e.g., as shown in FIG. 1A), and the actuator 120 can have a helical second oscillating shape (e.g., a second zigzag shape) that extends around the lumen 104 when the actuator 120 is in the actuated state (e.g., an oscillating shape with an amplitude between the zigzag shapes shown in FIGS. 1A and 1B). As another example, the actuator 120 can straighten when actuated such that when the actuator 120 is in the actuated state, the actuator 120 does not have an oscillating shape. For example, the actuator 120 can have a helical oscillating shape (e.g., helical zigzag shape) that extends around the lumen 104 when the actuator 120 is in the non-actuated state (e.g., as shown in FIG. 1A), and the actuator 120 can have a helical linear shape (e.g., non-oscillating shape) that extends around the lumen 104 when the actuator 120 is in the actuated state (e.g., as shown in FIG. 1B). The actuated state in FIGS. 1B and 1D can be a fully actuated (e.g., fully inflated) state.

The materials of the different layers of the tube 100 in FIGS. 26A-28D can be, for example, the same as with respect to the tube 160 in FIGS. 7A-9H, including, for example, the first, second, and third variations of materials. These materials can provide the tube 100 with the same properties and benefits as for the tube 160.

The actuator 120 can be made of one or multiple materials. For example, the actuator 120 can be made of a single material. As another example, the actuator 120 in FIGS. 14A-14D can comprise multiple materials (e.g., the first polymer 140 and the second polymer 142), for example, as shown in FIGS. 3A-3G.

FIGS. 26A & 26C, FIGS. 27A & 27C, and FIGS. 28A & 28C illustrate the tube 100 in a non-expanded state before and/or after expansion (e.g., before and/or after radial and/or axial expansion), for example, before expansion of the tube 100 and/or after the tube 100 has returned to the non-expanded state after having been expanded. For example, FIGS. 26A & 26C, FIGS. 27A & 27C, and FIGS. 28A & 28C illustrate the tube 100, the actuator 120, and the reinforcement 308 in a non-expanded state. The non-expanded state can be a neutral state or a contracted state of the tube 100. FIGS. 26A & 26C, FIGS. 27A & 27C, and FIGS. 28A & 28C illustrate that the tube 100 can have the arrangement of features shown when the tube 100 is in a non-expanded state. For example, FIGS. 26A & 26C, FIGS. 27A & 27C, and FIGS. 28A & 28C illustrate that the lumen 104, layer 302, layer 304, layer 306, the actuator 120, the reinforcement 132, the actuator lumen 322, and the reinforcement 308 can have the arrangement shown, including the relative positions between these features, when the tube 100 is in a non-expanded state.

FIGS. 26B & 26D, FIGS. 27B & 27D, and FIGS. 28B & 28D illustrate the tube 100 in an expanded state after expansion. The expanded state in FIGS. 26B & 26D, FIGS. 27B & 27D, and FIGS. 28B & 28D can be a partially expanded state or a fully expanded state. For example, FIGS. 26B & 26D, FIGS. 27B & 27D, and FIGS. 28B & 28D illustrates the tube 100, the actuator 120, and the reinforcement 308 in a partially expanded state. As another example, FIGS. 26B & 26D, FIGS. 27B & 27D, and FIGS. 28B & 28D illustrate the tube 100, the actuator 120, and the reinforcement 308 in a fully expanded state. FIGS. 26B & 26D, FIGS. 27B & 27D, and FIGS. 28B & 28D illustrate that the tube 100 can have the arrangement of features shown when the tube 100 is in an expanded state. For example, FIGS. 26B & 26D, FIGS. 27B & 27D, and FIGS. 28B & 28D illustrate that the lumen 104, layer 302, layer 304, layer 306, the actuator 120, the reinforcement 132, the actuator lumen 322, and the reinforcement 308 can have the arrangement shown, including the relative positions between these features, when the tube 100 is in an expanded state. The expanded state can be an axially expanded state and/or a radially expanded state. For example, FIGS. 26B & 26D, FIGS. 27B & 27D, and FIGS. 28B & 28D illustrate a radially expanded state.

Figure 26A:
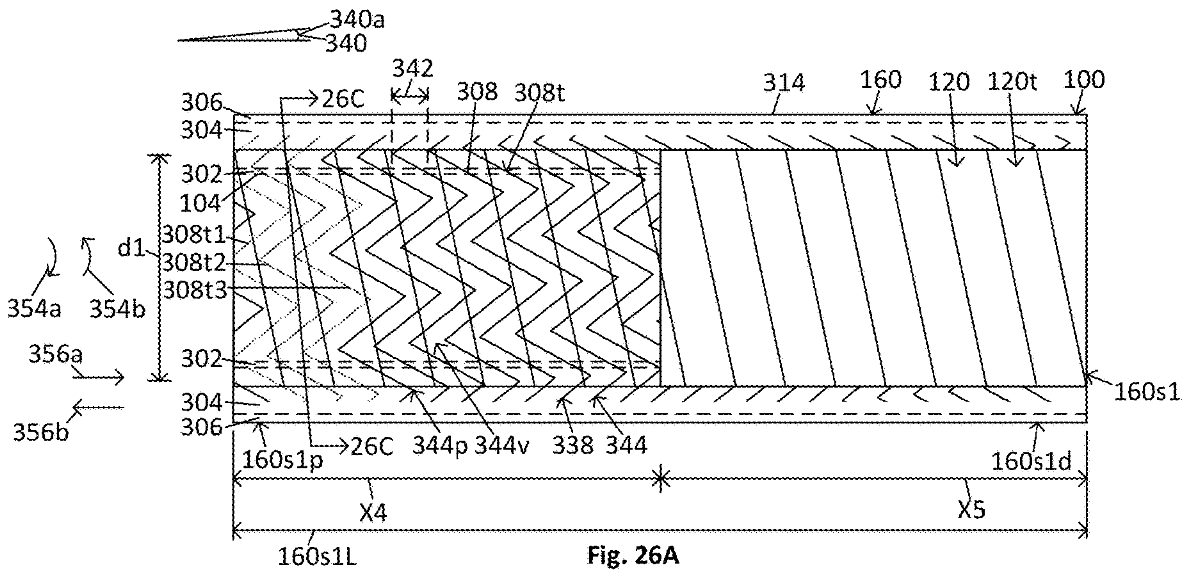
Figure 26B:
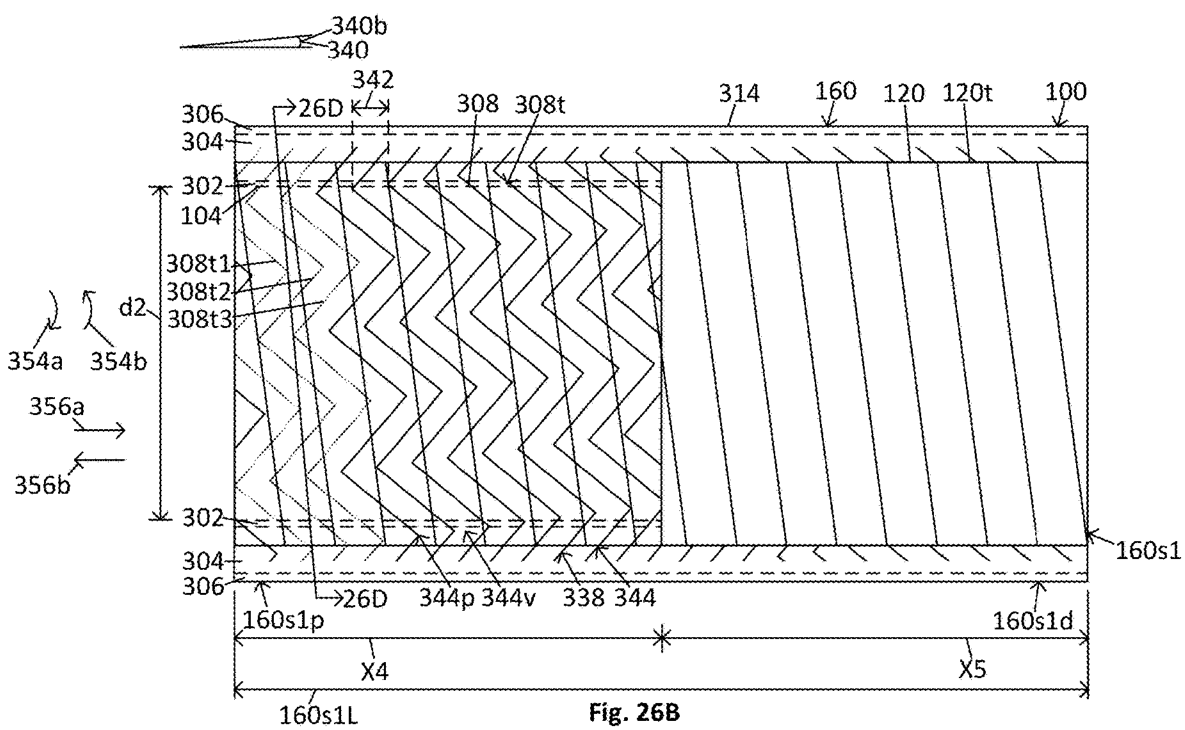
Figure 26C:
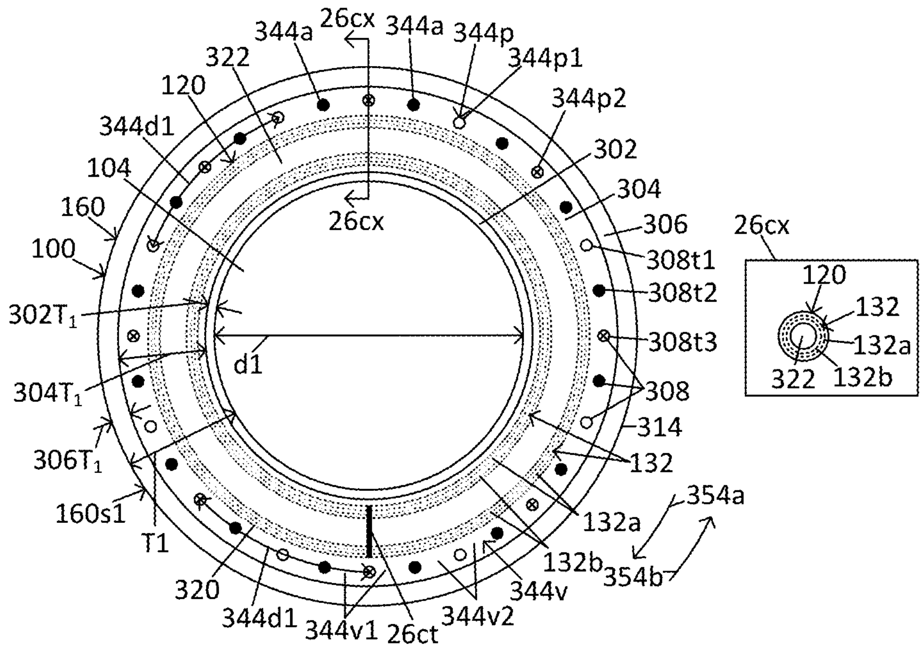
Figure 27A:
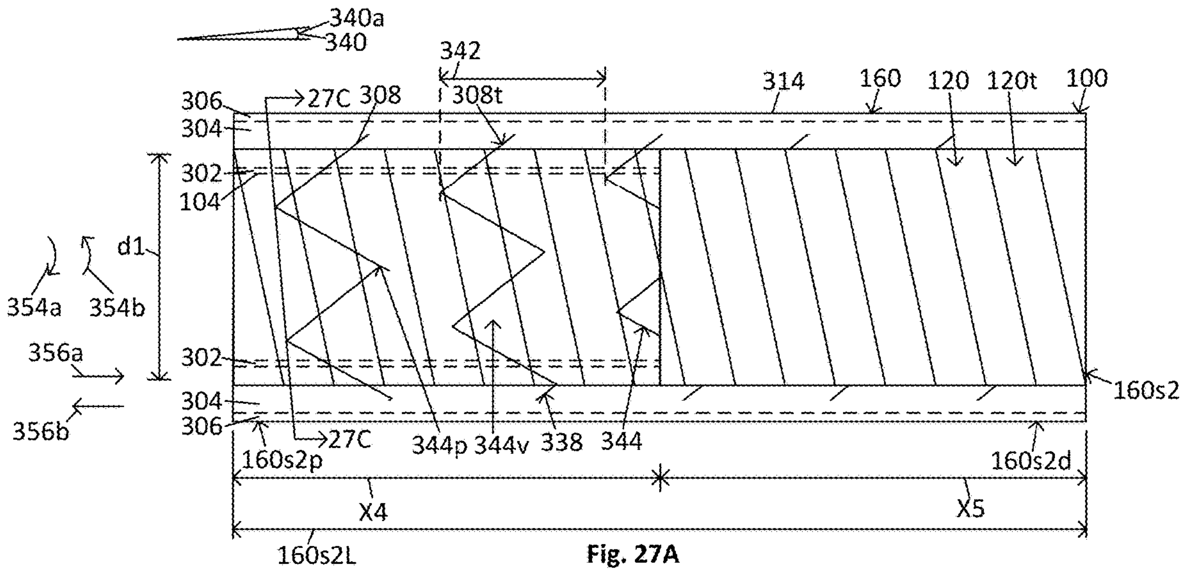
Figure 27B:
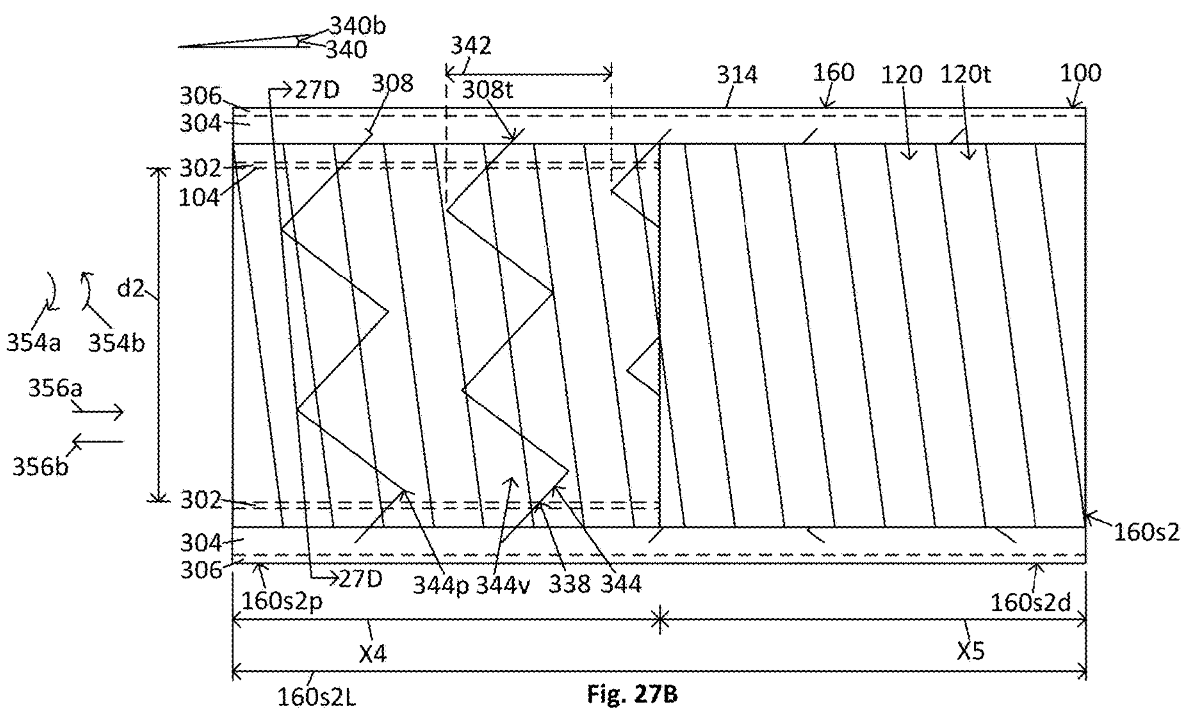
Figure 27C:
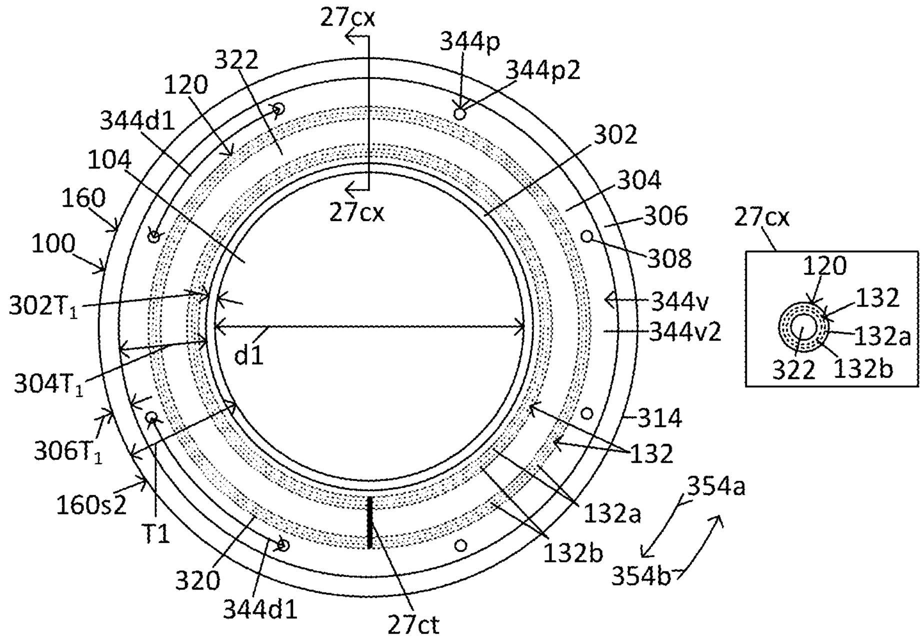

FIGS. 26C, 27C, and 28C illustrates cross-sectional views of the tubes 100 in FIGS. 26A, 27A, and 28A taken along lines 26C-26C, 27C-27C, and 28C-28C, respectively. These cross-sections illustrate that the actuator 120 can extend around (e.g., helically around) the lumen 104. For example, FIGS. 26C, 27C, and 28C shows one turn 120*t* (e.g., helical turn) of the actuator 120 around the lumen 104. For example, FIGS. 26C, 27C, and 28C illustrate lines 26*ct*, 27*ct*, and 28*ct* that represent the start and end of one turn of the helical path of the actuator 120 shown in FIGS. 26A, 27A, and 28A. FIGS. 26C, 27C, and 28C further illustrate transverse cross-sectional views 26*cx*, 27*cx*, and 28*cx* of the actuator 120 taken along the lines 26*cx*-26*cx*, 27*cx*-27*cx*, 28*cx*-28*cx* in FIGS. 26C, 27C, and 28C, for example, so that the thickness of the wall of the actuator 120 and the relative positions of the wall of the actuator 120, the reinforcement 132, and the lumen 322 in relation to the cross-section of the tube 100 can be more easily visualized, and, for example, so that the reinforcement 132 relative to the lumen 322 can be visualized. The lines 26*cx*-26*cx*, 27*cx*-27*cx*, 28*cx*-28*cx* can be, for example, perpendicular to the center longitudinal axis of the actuator 120 (e.g., the center longitudinal axis of the actuator lumen 322).

Figure 26D:
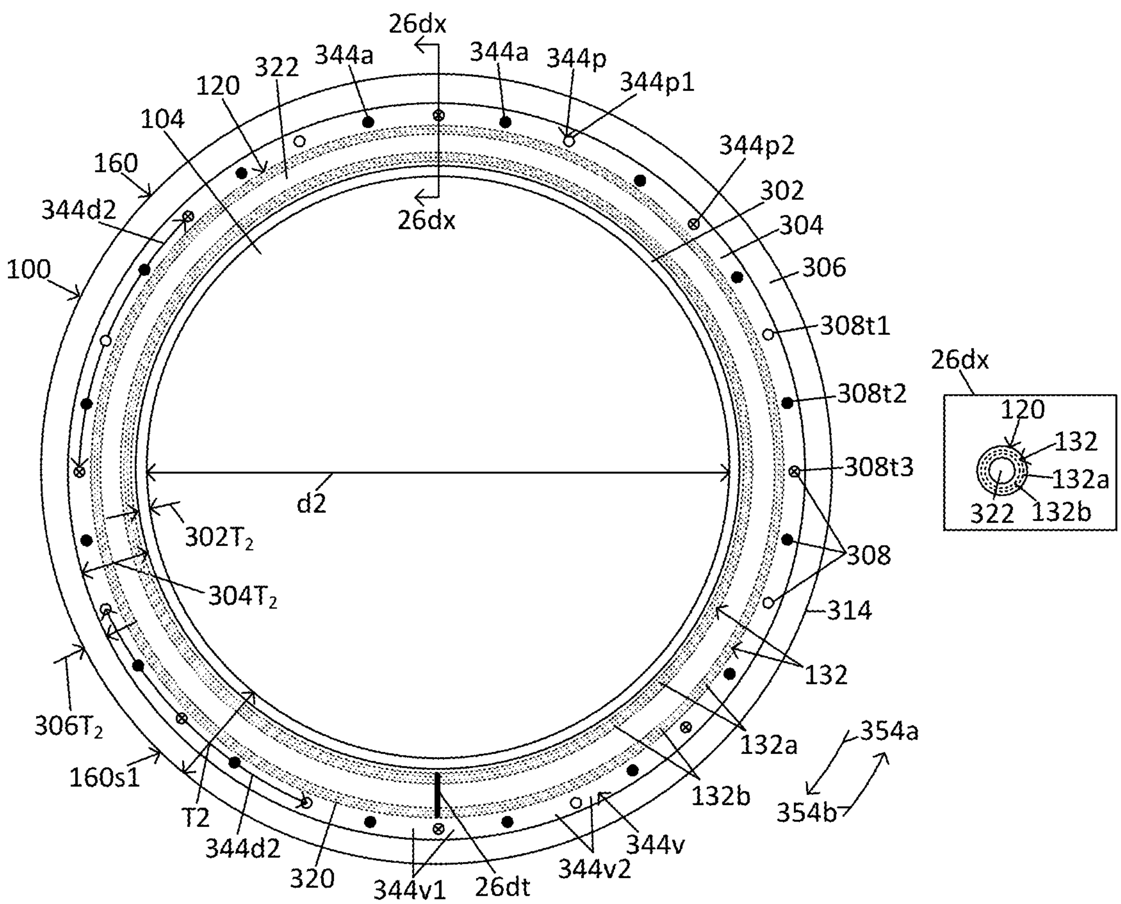
Figure 27D:
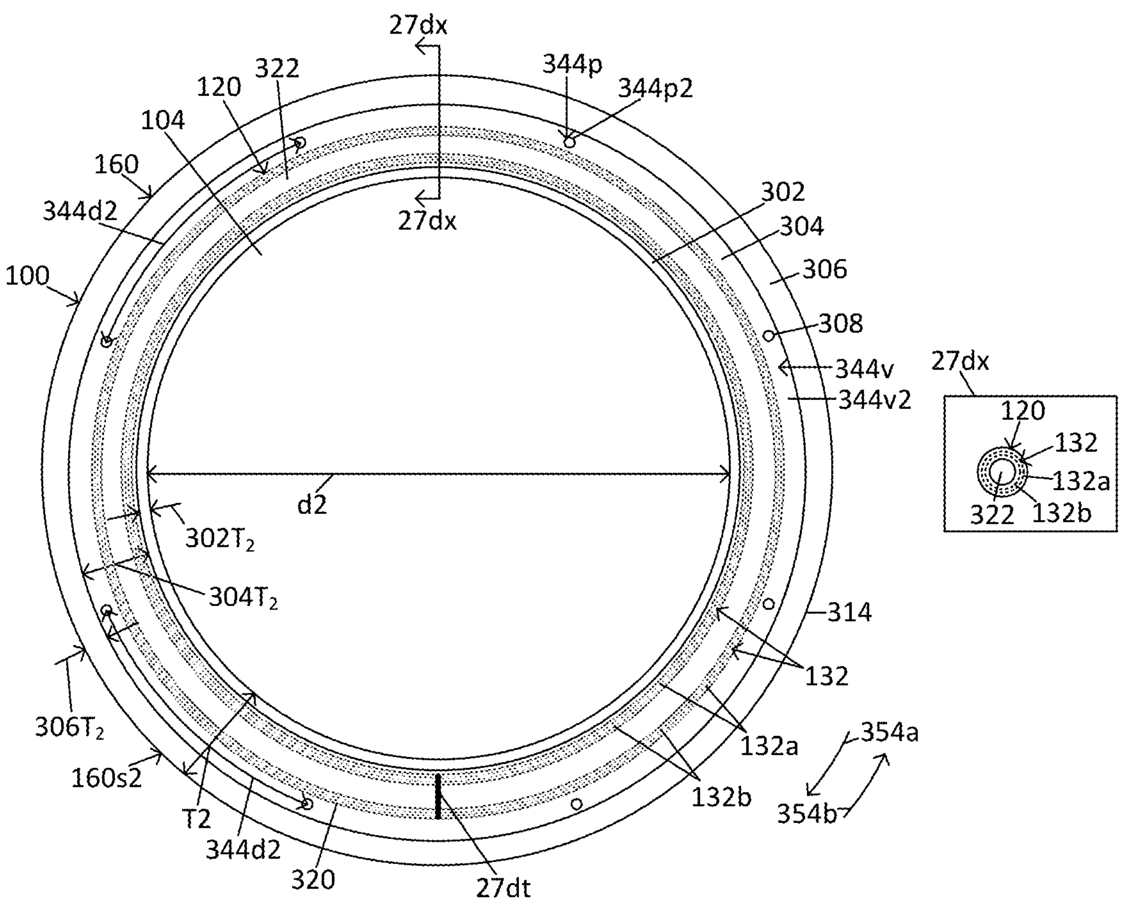

FIGS. 26D, 27D, and 28D illustrates cross-sectional views of the tubes 100 in FIGS. 26B, 27B, and 28B taken along lines 26D-26D, 27D-27D, and 28D-28D, respectively. These cross-sections illustrate that the actuator 120 can extend around (e.g., helically around) the lumen 104. For example, FIGS. 26D, 27D, and 28D shows one turn 120*t* (e.g., helical turn) of the actuator 120 around the lumen 104. For example, FIGS. 26D, 27D, and 28D illustrate lines 26*dt*, 27*dt*, and 28*dt* that represent the start and end of one turn of the helical path of the actuator 120 shown in FIGS. 26B, 27B, and 28B. FIGS. 26D, 27D, and 28D further illustrate transverse cross-sectional views 26*dx*, 27*dx*, and 28*dx* of the actuator 120 taken along the lines 26*dx*-26*dx*, 27*dx*-27*dx*, 28*dx*-28*dx* in FIGS. 26D, 27D, and 28D, for example, so that the thickness of the wall of the actuator 120 and the relative positions of the wall of the actuator 120, the reinforcement 132, and the lumen 322 in relation to the cross-section of the tube 100 can be more easily visualized, and, for example, so that the reinforcement 132 relative to the lumen 322 can be visualized. The lines 26*dx*-26*dx*, 27*dx*-27*dx*, 28*dx*-28*dx* can be, for example, perpendicular to the center longitudinal axis of the actuator 120 (e.g., the center longitudinal axis of the actuator lumen 322).

The materials of the different layers of the tube 100 in FIGS. 26A-28D can be, for example, the same as with respect to the tube 160 in FIGS. 7A-9H, including, for example, the first, second, and third variations of materials. These materials can provide the tube 100 with the same properties and benefits as for the tube 160.

FIGS. 26A & 26C, FIGS. 27A & 27C, and FIGS. 28A & 28C illustrate that when the tube 100 is in the non-expanded state, the actuator 120 can have the pressure P0 and the length 126.

FIGS. 26B & 26D, FIGS. 27B & 27D, and FIGS. 28B & 28D illustrate that when the tube 100 is in the expanded state, the actuator 120 can have the pressure P1 and the length 130.

FIGS. 26A-28D illustrate portions of the tube 100 transparent for illustrative purposes, for example, so that the layered arrangement of the tube 100, the actuator 120, and the reinforcement 308, can be more easily visualized, and so that the structure of the actuator 120 and the reinforcement 308 in the tube 100 can be more easily visualized. For example, in FIGS. 26A-28D, section X4 illustrates layer 304, layer 306, and the actuator 120 transparent, and section X5 illustrates layer 304 and layer 306 transparent and the actuator 120 shown opaque. Sections X4 and X5 can each be, for example, be ½ of the length of the sections 160*s*1 and 160*s*2 shown (e.g., ½ of the length 160*s*1L and ½ of the length 160*s*2L).

FIGS. 26A-28D illustrate that the actuator 120 can extend around the lumen 104 one or multiple turns 120*t* (also referred to as a turn 120*t*, the turn 120*t*, and the turns 120*t*), for example, 1 to 1000 turns 120*t*, including every 1 turn increment within this range (e.g., 1 turn, 2 turns, 10 turns, 100 turns, 200 turns, 300 turns, 400 turns, 500 turns, 1000 turns) and/or any partial turn (e.g., one quarter of a full turn, one half of a full turn, or three quarters of a full turn, for example, for the first turn or the last turn of the actuator 120). For example, FIGS. 26A-28D illustrate that the reinforcement 308 can extend helically around the lumen 104 one or multiple turns 120*t*.

FIGS. 26A-28D illustrate that the reinforcement 308 can extend around (e.g., helically around) the lumen 104 and the actuator 120 when the tube 100 is in the non-expanded state (e.g., FIGS. 26A & 26C, FIGS. 27A & 27C, FIGS. 28A & 28C) and when the tube 100 is in the expanded state (e.g., FIGS. 26B & 26D, FIGS. 27B & 27D, FIGS. 28B & 28D). FIGS. 26A-28D illustrate that the reinforcement 308 can extend around (e.g., helically around) the reinforcement 132 when the tube 100 is in the non-expanded state (e.g., FIGS. 26A & 26C, FIGS. 27A & 27C, FIGS. 28A & 28C) and when the tube 100 is in the expanded state (e.g., FIGS. 26B & 26D, FIGS. 27B & 27D, FIGS. 28B & 28D).

FIGS. 26A-28D illustrate that the actuator 120 can extend around (e.g., helically around) the lumen 104 when the tube 100 is in the non-expanded state and when the tube 100 is in the expanded state. FIGS. 26A-28D illustrate that the actuator 120 can extend around (e.g., helically around) layer 302 when the tube 100 is in the non-expanded state and when the tube 100 is in the expanded state. FIGS. 26A-28D illustrate that the actuator lumen 322 can extend around (e.g., helically around) the lumen 104 when the tube 100 is in the non-expanded state and when the tube 100 is in the expanded state.

FIGS. 26A-28D illustrate that the reinforcement 132 can extend around the lumen 104 and the actuator lumen 322. FIGS. 26A-28D illustrate that the reinforcement 132 can extend completely around the lumen 104 and can extend completely around the actuator lumen 322. FIGS. 26A-28D illustrate, for example, that the clockwise and counterclockwise elements 132*a*, 132*b* of the reinforcement 132 can extend around (e.g., helically around) the lumen 104 when the tube 100 is in the non-expanded state and when the tube 100 is in the expanded state. FIGS. 26A-28D illustrate, for example, that the clockwise and counterclockwise elements 132*a*, 132*b* of the reinforcement 132 can extend around (e.g., helically around) the actuator lumen 322 when the tube 100 is in the non-expanded state and when the tube 100 is in the expanded state.

FIGS. 26A-28D illustrate that the tube 100 can have two reinforcements, for example, a first reinforcement and a second reinforcement. The first reinforcement can be the reinforcement 132 and the second reinforcement can be the reinforcement 308, or vice versa. The first and second reinforcements can be in the same or different layer of the tube 100. For example, FIGS. 26A-28D illustrate that the first reinforcement (e.g., reinforcement 132) and the second reinforcement (e.g., reinforcement 308) can be in layer 304. The first reinforcement (e.g., reinforcement 132) can be in the actuator 120 and the second reinforcement (e.g., reinforcement 308) can be in the tube 100 but outside of the wall of the actuator 120. As another example, the actuator 120 with or without the reinforcement 132 can be a reinforcement in the wall of the tube 100.

FIGS. 26A-28D illustrate that the reinforcement 132 can be in two walls, for example, in the wall of the tube 100 and in the wall of the actuator 120. The reinforcement 132 can thereby extend through or be in (e.g., embedded in) two walls. For example, the reinforcement 132 can be in layer 304 of the wall of the tube 100 and can be in the wall of the actuator 120.

FIGS. 26A-28D illustrate that the tube 100 can have two lumens, for example, a first lumen and a second lumen. The first lumen can be the lumen 104 and the second lumen can be the lumen 322, or vice versa. The second lumen can extend around (e.g., helically around) the first lumen. For example, FIGS. 26A-28D illustrate that the second lumen (e.g., lumen 322) and can extend helically around first lumen (e.g., lumen 104) when the tube 100 is in the non-expanded state and when the tube 100 is in the expanded state.

FIGS. 26A-28D illustrate that the diameter of the lumen 104 can be larger than the diameter of the lumen 322 when the tube 100 is in the non-expanded state and when the tube 100 is in the expanded state.

FIGS. 26A-28D illustrate that the actuator 120 can be closer to the lumen 104 than the reinforcement 308 when the tube 100 is in the non-expanded state and when the tube 100 is in the expanded state. As another example, the positions of the actuator 120 and the reinforcement 308 can be swapped with each other such that the reinforcement 308 can be closer to the lumen 104 when the tube 100 is in the non-expanded state and when the tube 100 is in the expanded state.

FIGS. 26A-28D illustrate that the actuator 120 can be radially inside the reinforcement 308 when the tube 100 is in the non-expanded state and when the tube 100 is in the expanded state. As another example, the positions of the actuator 120 and the reinforcement 308 can be swapped with each other such that the reinforcement 308 can be radially inside the actuator 120.

FIGS. 26A-28D illustrate that the actuator 120 and the reinforcement 308 can be between the inner and outer surface of the middle layer (e.g., layer 304) when the tube 100 is in the non-expanded state and when the tube 100 is in the expanded state.

FIGS. 26A-28D illustrate that the actuator 120 and the reinforcement 308 can be between the outer surface of the inner layer (e.g., layer 302) and the inner surface of the outer layer (e.g., layer 306) when the tube 100 is in the non-expanded state and when the tube 100 is in the expanded state.

FIGS. 26A-28D illustrate that the actuator 120 can be a uniform distance (e.g., a radius) from the lumen 104 when the tube 100 is in the non-expanded state and when the tube 100 is in the expanded state.

FIGS. 26A-28D illustrate that the reinforcement 308 can be a first uniform distance (e.g., a first radius) from the lumen 104 when the tube 100 is in the non-expanded state and can be a second uniform distance (e.g., a second radius larger than the first radius) when the tube 100 is in the expanded state.

FIGS. 26A-28D illustrate that the actuator 120 can be between the lumen 104 and the reinforcement 308 when the tube 100 is in the non-expanded state and when the tube 100 is in the expanded state.

FIGS. 26A-28D illustrate that the actuator 120 can define a path 320 in the wall of the tube 100. The path 320 can extend through multiple layers (e.g., layer 302, layer 304, and/or 306) or can extend through a single layer (e.g., can be confined to a single layer) such as layer 302, layer 304, or layer 306. For example, FIGS. 26A-28D illustrate that the path 320 can be in layer 304. The path 320 can be a lumen in the wall of the tube 100. The path 320 can be, for example, a circumferential channel that the actuator 120 is in. The actuator 120 can be fixed to the radial inner surface of the tube 100 that defines the path 320 (e.g., the surface of layer 304 that faces away from the lumen 104) and/or can be fixed to the radial outer surface of the tube 100 that defines the path 320 (e.g., the surface of layer 304 that faces toward the lumen 104) of the tube 100 defining the path 320. As another example, the actuator 120 can move relative to the tube 100 along the path 320 (e.g., in the lumen defined by the path 320) such that the actuator 120 can float in the lumen defined by the path 320. FIGS. 26A-28D illustrate that the lumen that can be defined by the path 320 can be a circumferential channel. The lumen can be a helical channel. The lumen can have the shape of a closed ring or an open ring. The lumen can, for example, split one of the layers of the tubes 100 shown in FIGS. 26A-28D into two halves, for example, a first half and a second half such that the actuator 120 and the lumen can be sandwiched between a first half and a second half of the layer. In such a case, the first half of the layer can be closer to the lumen 104 than the second half of the layer. As another example, the path 320 may not define a lumen such that the actuator 120 is not in a lumen in the tube 100.

FIGS. 26A-28D illustrate that the clockwise elements 132*a* can go over or under the counterclockwise elements 132*b*. For example, FIGS. 26A-28D illustrate that all of the clockwise elements 132*a* can go over all of the counterclockwise elements 310*b*. For example, FIGS. 26A-28D illustrate that the reinforcement 132 can be a spiral wrap.

FIGS. 26A-28D illustrate that the clockwise elements 132*a* can be farther from and closer to the lumen 104 than the counterclockwise elements 132*b* when the tube 100 is in the non-expanded state and when the tube 100 is in the expanded state. As another example, where the reinforcement 132 is or comprises a braid, the clockwise and counterclockwise elements 132*a*, 132*b* can be the same distance from the lumen 104.

FIGS. 26A-28D illustrate that activating (e.g., inflating) the actuator 120 may not change (e.g., decrease or increase) the thickness of the wall of the tube 100. For example, FIGS. 26C, 27C, and 28C illustrate that the wall of the tube 100 can have the thickness T1 when the tube 100 is in the non-expanded state, and FIGS. 26D, 27D, and 28D illustrate that the wall of the tube 100 can have the thickness T2 when the tube 100 is in the expanded state, whereby the thickness T2 can be the same as or substantially the same as the thickness T1.

FIGS. 26A-28D illustrate that adjacent turns 120*t* of the actuator 120 can contact each other.

FIGS. 29A-31D illustrate that the tubes 160 in FIGS. 10A-12H can have an actuator 120. The actuator 120 can be in layer 302, layer 304, or layer 306. For example, FIGS. 29A-31D illustrate that the actuator 120 can be in layer 304. As additional examples, the actuator 120 can be in layer 302 or layer 306. As another example, FIGS. 29A-31D illustrate that the tubes 100 in FIGS. 26A-28D can have a reinforcement 310. The reinforcement 310 can be in layer 302, layer 304, or layer 306. For example, FIGS. 29A-31D illustrate that the reinforcement 310 can be in layer 306. FIGS. 29A-31D that the reinforcement 310 can be in a different layer of the tube 100 than the actuator 100. As another example, the reinforcement 310 can be in the same layer of the tube 100 as the actuator 120. The reinforcement 310 can provide any of the same benefits, including all of the same benefits, for the tube 100 as for the tube 160. For example, the reinforcement 310 can limit, inhibit, and/or prevent axial expansion of the tube 100 when the wall of the tube 100 has a layer that is axially stretchable (e.g., a layer that has axial ePTFE). The reinforcement 310 can allow, limit, inhibit, and/or prevent the tube 100 from axially expanding when the actuator 120 is activated, for example, as the tube 100 radially expands as the actuator 120 axially expands from being inflated or otherwise energized. This can allow the tube 100 to radially expand while limiting, inhibiting, and/or preventing the tube 100 from axially expanding. In other words, the reinforcement 310 can help confine the expansion of the tube 100 caused by the actuator 120 to the radial direction. For example, the reinforcement 310 can limit axial expansion of the tube 100 to the axial expansion limit of the reinforcement 310. As another example, the reinforcement 310 can prevent axial elongation of the tube 100 as a device is advanced in the lumen 104.

FIGS. 29A & 29C, FIGS. 30A & 30C, and FIGS. 31A & 31C illustrate the tube 100 in a non-expanded state before and/or after expansion (e.g., before and/or after radial and/or axial expansion), for example, before expansion of the tube 100 and/or after the tube 100 has returned to the non-expanded state after having been expanded. For example, FIGS. 29A & 29C, FIGS. 30A & 30C, and FIGS. 31A & 31C illustrate the tube 100, the actuator 120, the reinforcement 308, and the reinforcement 310 in a non-expanded state. The non-expanded state can be a neutral state or a contracted state of the tube 100. FIGS. 29A & 29C, FIGS. 30A & 30C, and FIGS. 31A & 31C illustrate that the tube 100 can have the arrangement of features shown when the tube 100 is in a non-expanded state. For example, FIGS. 29A & 29C, FIGS. 30A & 30C, and FIGS. 31A & 31C illustrate that the lumen 104, layer 302, layer 304, layer 306, the actuator 120, the reinforcement 132, the actuator lumen 322, the reinforcement 308, and the reinforcement 310 can have the arrangement shown, including the relative positions between these features, when the tube 100 is in a non-expanded state.

FIGS. 29B & 29D, FIGS. 30B & 30D, and FIGS. 31B & 31D illustrate the tube 100 in an expanded state after expansion. The expanded state in FIGS. 29B & 29D, FIGS. 30B & 30D, and FIGS. 31B & 31D can be a partially expanded state or a fully expanded state. For example, FIGS. 29B & 29D, FIGS. 30B & 30D, and FIGS. 31B & 31D illustrate the tube 100, the actuator 120, the reinforcement 308, and the reinforcement 310 in a partially expanded state. As another example, FIGS. 29B & 29D, FIGS. 30B & 30D, and FIGS. 31B & 31D illustrate the tube 100, the actuator 120, the reinforcement 308, and the reinforcement 310 in a fully expanded state. FIGS. 29B & 29D, FIGS. 30B & 30D, and FIGS. 31B & 31D illustrate that the tube 100 can have the arrangement of features shown when the tube 100 is in an expanded state. For example, FIGS. 29B & 29D, FIGS. 30B & 30D, and FIGS. 31B & 31D illustrate that the lumen 104, layer 302, layer 304, layer 306, the actuator 120, the reinforcement 132, the actuator lumen 322, the reinforcement 308, and the reinforcement 310 can have the arrangement shown, including the relative positions between these features, when the tube 100 is in an expanded state. The expanded state can be an axially expanded state and/or a radially expanded state. For example, FIGS. 29B & 29D, FIGS. 30B & 30D, and FIGS. 31B & 31D illustrate a radially expanded state.

FIGS. 29C, 30C, and 31C illustrates cross-sectional views of the tubes 100 in FIGS. 29A, 30A, and 31A taken along lines 29C-29C, 30C-30C, and 31C-31C, respectively. These cross-sections illustrate that the actuator 120 can extend around (e.g., helically around) the lumen 104. For example, FIGS. 29C, 30C, and 31C shows one turn 120*t* (e.g., helical turn) of the actuator 120 around the lumen 104. For example, FIGS. 29C, 30C, and 31C illustrate lines 29*ct*, 30*ct*, and 31*ct* that represent the start and end of one turn of the helical path of the actuator 120 shown in FIGS. 29A, 30A, and 31A. FIGS. 29C, 30C, and 31C further illustrate transverse cross-sectional views 29*cx*, 30*cx*, and 31*cx* of the actuator 120 taken along the lines 29*cx*-29*cx*, 30*cx*-30*cx*, 31*cx*-31*cx* in FIGS. 29C, 30C, and 31C, for example, so that the thickness of the wall of the actuator 120 and the relative positions of the wall of the actuator 120, the reinforcement 132, and the lumen 322 in relation to the cross-section of the tube 100 can be more easily visualized, and, for example, so that the reinforcement 132 relative to the lumen 322 can be visualized. The lines 29*cx*-29*cx*, 30*cx*-30*cx*, 31*cx*-31*cx* can be, for example, perpendicular to the center longitudinal axis of the actuator 120 (e.g., the center longitudinal axis of the actuator lumen 322).

FIGS. 29D, 30D, and 31D illustrates cross-sectional views of the tubes 100 in FIGS. 29B, 30B, and 31B taken along lines 29D-29D, 30D-30D, and 31D-31D, respectively. These cross-sections illustrate that the actuator 120 can extend around (e.g., helically around) the lumen 104. For example, FIGS. 29D, 30D, and 31D shows one turn 120*t* (e.g., helical turn) of the actuator 120 around the lumen 104. For example, FIGS. 29D, 30D, and 31D illustrate lines 29*dt*, 30*dt*, and 31*dt* that represent the start and end of one turn of the helical path of the actuator 120 shown in FIGS. 29B, 30B, and 31B. FIGS. 29D, 30D, and 31D further illustrate transverse cross-sectional views 29*dx*, 30*dx*, and 31*dx* of the actuator 120 taken along the lines 29*dx*-29*dx*, 30*dx*-30*dx*, 31*dx*-31*dx* in FIGS. 29D, 30D, and 31D, for example, so that the thickness of the wall of the actuator 120 and the relative positions of the wall of the actuator 120, the reinforcement 132, and the lumen 322 in relation to the cross-section of the tube 100 can be more easily visualized, and, for example, so that the reinforcement 132 relative to the lumen 322 can be visualized. The lines 29*dx*-29*dx*, 30*dx*-30*dx*, 31*dx*-31*dx* can be, for example, perpendicular to the center longitudinal axis of the actuator 120 (e.g., the center longitudinal axis of the actuator lumen 322).

The materials of the different layers of the tube 100 in FIGS. 29A-31D can be, for example, the same as with respect to the tube 160 in FIGS. 10A-12H, including, for example, the first, second, and third variations of materials. These materials can provide the tube 100 with the same properties and benefits as for the tube 160.

FIGS. 29A & 29C, FIGS. 30A & 30C, and FIGS. 31C & 31D illustrate that when the tube 100 is in the non-expanded state, the actuator 120 can have the pressure P0 and the length 126.

FIGS. 29B & 29D, FIGS. 30B & 30D, and FIGS. 31B & 31D illustrate that when the tube 100 is in the expanded state, the actuator 120 can have the pressure P1 and the length 130.

FIGS. 29A-31D illustrate that the tube 100 can have three reinforcements, for example, a first reinforcement, a second reinforcement, and a third reinforcement. The first reinforcement, the second reinforcement, and the third reinforcement can be any combination, for example, of the reinforcement 132, the reinforcement 308, and the reinforcement 310. For example, the first reinforcement can be the reinforcement 132, the second reinforcement can be the reinforcement 308, and the third reinforcement can be the reinforcement 310. The first, second, and third reinforcements can be in the same layer or different layers of the tube 100. For example, FIGS. 29A-31D illustrate that the first reinforcement (e.g., reinforcement 132) and the second reinforcement (e.g., reinforcement 308) can be in layer 304, and that the third reinforcement (e.g., reinforcement 310) can be in layer 304. As another example, FIGS. 32A-34D illustrate that the first, second, and third reinforcements can be in the same layer of the tube 100 (e.g., layer 304). The first reinforcement (e.g., reinforcement 132) can be in the actuator 120 and the second reinforcement (e.g., reinforcement 308) and the third reinforcement (e.g., reinforcement 310) can be in the tube 100 but outside of the wall of the actuator 120. The reinforcement 132 can be a first braid and the reinforcement 310 can be a second braid. The reinforcement 132 can be a braid and the reinforcement 310 can be a spiral wrap. The reinforcement 132 can be a spiral wrap and the reinforcement 310 can be a braid. The reinforcement 132 can be a first spiral wrap and the reinforcement 310 can be a second spiral wrap. As another example, the actuator 120 with or without the reinforcement 132 can be a reinforcement in the wall of the tube 100.

FIGS. 29A-31D illustrate that the actuator 120 can be closer to the lumen 104 than the reinforcement 308 and the reinforcement 310 when the tube 100 is in the non-expanded state and when the tube 100 is in the expanded state. As another example, the positions of the actuator 120 and the reinforcement 310 can be swapped with each other such that the reinforcement 310 can be closer to the lumen 104 when the tube 100 is in the non-expanded state and when the tube 100 is in the expanded state.

FIGS. 29A-31D illustrate that the reinforcement 308 can be between the actuator 120 and the reinforcement 310 when the tube 100 is in the non-expanded state and when the tube 100 is in the expanded state.

FIGS. 32A-34D illustrate that the tubes 160 in FIGS. 13A-15H can have an actuator 120, for example, in layer 304. As another example, FIGS. 32A-34D illustrate the tubes 100 in FIGS. 29A-31D with the reinforcement 310 in layer 304 instead of in layer 306. FIGS. 32A-34D illustrate that the reinforcement 310 can be in the same layer as the actuator 310. FIGS. 32A-34D illustrate, for example, that the actuator 120, the reinforcement 308, and the reinforcement 310 can be in the same layer (e.g., layer 304). As additional examples, the actuator 120 can be in layer 302 or layer 306. FIGS. 32A-34D illustrate that layer 304 in FIGS. 13A-15H can be made thicker (e.g., 1 mm to 8 mm thicker, including every 1 mm increment within this range) so that layer 304 can have the actuator 120, the reinforcement 308, and the reinforcement 310.

FIGS. 32A & 32C, FIGS. 33A & 33C, and FIGS. 34A & 34C illustrate the tube 100 in a non-expanded state before and/or after expansion (e.g., before and/or after radial and/or axial expansion), for example, before expansion of the tube 100 and/or after the tube 100 has returned to the non-expanded state after having been expanded. For example, FIGS. 32A & 32C, FIGS. 33A & 33C, and FIGS. 34A & 34C illustrate the tube 100, the actuator 120, the reinforcement 308, and the reinforcement 310 in a non-expanded state. The non-expanded state can be a neutral state or a contracted state of the tube 100. FIGS. 32A & 32C, FIGS. 33A & 33C, and FIGS. 34A & 34C illustrate that the tube 100 can have the arrangement of features shown when the tube 100 is in a non-expanded state. For example, FIGS. 32A & 32C, FIGS. 33A & 33C, and FIGS. 34A & 34C illustrate that the lumen 104, layer 302, layer 304, layer 306, the actuator 120, the reinforcement 132, the actuator lumen 322, the reinforcement 308, and the reinforcement 310 can have the arrangement shown, including the relative positions between these features, when the tube 100 is in a non-expanded state.

FIGS. 32B & 32D, FIGS. 33B & 33D, and FIGS. 34B & 34D illustrate the tube 100 in an expanded state after expansion. The expanded state in FIGS. 32B & 32D, FIGS. 33B & 33D, and FIGS. 34B & 34D can be a partially expanded state or a fully expanded state. For example, FIGS. 32B & 32D, FIGS. 33B & 33D, and FIGS. 34B & 34D illustrates the tube 100, the actuator 120, the reinforcement 308, and the reinforcement 310 in a partially expanded state. As another example, FIGS. 32B & 32D, FIGS. 33B & 33D, and FIGS. 34B & 34D illustrate the tube 100, the actuator 120, the reinforcement 308, and the reinforcement 310 in a fully expanded state. FIGS. 32B & 32D, FIGS. 33B & 33D, and FIGS. 34B & 34D illustrate that the tube 100 can have the arrangement of features shown when the tube 100 is in an expanded state. For example, FIGS. 32B & 32D, FIGS. 33B & 33D, and FIGS. 34B & 34D illustrate that the lumen 104, layer 302, layer 304, layer 306, the actuator 120, the reinforcement 132, the actuator lumen 322, the reinforcement 308, and the reinforcement 310 can have the arrangement shown, including the relative positions between these features, when the tube 100 is in an expanded state. The expanded state can be an axially expanded state and/or a radially expanded state. For example, FIGS. 32B & 32D, FIGS. 33B & 33D, and FIGS. 34B & 34D illustrate a radially expanded state.

FIGS. 32C, 33C, and 34C illustrates cross-sectional views of the tubes 100 in FIGS. 32A, 33A, and 34A taken along lines 32C-32C, 33C-33C, and 34C-34C, respectively. These cross-sections illustrate that the actuator 120 can extend around (e.g., helically around) the lumen 104. For example, FIGS. 32C, 33C, and 34C shows one turn 120*t* (e.g., helical turn) of the actuator 120 around the lumen 104. For example, FIGS. 32C, 33C, and 34C illustrate lines 32*ct*, 33*ct*, and 34*ct* that represent the start and end of one turn of the helical path of the actuator 120 shown in FIGS. 32A, 33A, and 34A. FIGS. 32C, 33C, and 34C further illustrate transverse cross-sectional views 32*cx*, 33*cx*, and 34*cx* of the actuator 120 taken along the lines 32*cx*-32*cx*, 33*cx*-33*cx*, 34*cx*-34*cx* in FIGS. 32C, 33C, and 34C, for example, so that the thickness of the wall of the actuator 120 and the relative positions of the wall of the actuator 120, the reinforcement 132, and the lumen 322 in relation to the cross-section of the tube 100 can be more easily visualized, and, for example, so that the reinforcement 132 relative to the lumen 322 can be visualized. The lines 32*cx*-32*cx*, 33*cx*-33*cx*, 34*cx*-34*cx* can be, for example, perpendicular to the center longitudinal axis of the actuator 120 (e.g., the center longitudinal axis of the actuator lumen 322).

FIGS. 32D, 33D, and 34D illustrates cross-sectional views of the tubes 100 in FIGS. 32B, 33B, and 34B taken along lines 32D-32D, 33D-33D, and 34D-34D, respectively. These cross-sections illustrate that the actuator 120 can extend around (e.g., helically around) the lumen 104. For example, FIGS. 32D, 33D, and 34D shows one turn 120*t* (e.g., helical turn) of the actuator 120 around the lumen 104. For example, FIGS. 32D, 33D, and 34D illustrate lines 32*dt*, 33*dt*, and 34*dt* that represent the start and end of one turn of the helical path of the actuator 120 shown in FIGS. 32B, 33B, and 34B. FIGS. 32D, 33D, and 34D further illustrate transverse cross-sectional views 32*dx*, 33*dx*, and 34*dx* of the actuator 120 taken along the lines 32*dx*-32*dx*, 33*dx*-33*dx*, 34*dx*-34*dx* in FIGS. 32D, 33D, and 34D, for example, so that the thickness of the wall of the actuator 120 and the relative positions of the wall of the actuator 120, the reinforcement 132, and the lumen 322 in relation to the cross-section of the tube 100 can be more easily visualized, and, for example, so that the reinforcement 132 relative to the lumen 322 can be visualized. The lines 32*dx*-32*dx*, 33*dx*-33*dx*, 34*dx*-34*dx* can be, for example, perpendicular to the center longitudinal axis of the actuator 120 (e.g., the center longitudinal axis of the actuator lumen 322).

The materials of the different layers of the tube 100 in FIGS. 32A-34D can be, for example, the same as with respect to the tube 160 in FIGS. 13A-15H, including, for example, the first, second, and third variations of materials. These materials can provide the tube 100 with the same properties and benefits as for the tube 160.

FIGS. 32A & 32C, FIGS. 33A & 33C, and FIGS. 34C & 34D illustrate that when the tube 100 is in the non-expanded state, the actuator 120 can have the pressure P0 and the length 126.

FIGS. 32B & 32D, FIGS. 33B & 33D, and FIGS. 34B & 34D illustrate that when the tube 100 is in the expanded state, the actuator 120 can have the pressure P1 and the length 130.

FIGS. 35A-37D illustrate that the tubes 160 in FIGS. 16A-18H can have an actuator 120, for example, in layer 304. As another example, FIGS. 35A-37D illustrate the tubes 100 in FIGS. 32A-34D without layer 306. FIGS. 35A-37D illustrate, for example, that the actuator 120, the reinforcement 308, and the reinforcement 310 can be in the same layer (e.g., layer 304). As another example, the actuator 120 can be in layer 302.

FIGS. 35A & 35C, FIGS. 36A & 36C, and FIGS. 37A & 37C illustrate the tube 100 in a non-expanded state before and/or after expansion (e.g., before and/or after radial and/or axial expansion), for example, before expansion of the tube 100 and/or after the tube 100 has returned to the non-expanded state after having been expanded. For example, FIGS. 35A & 35C, FIGS. 36A & 36C, and FIGS. 37A & 37C illustrate the tube 100, the actuator 120, the reinforcement 308, and the reinforcement 310 in a non-expanded state. The non-expanded state can be a neutral state or a contracted state of the tube 100. FIGS. 35A & 35C, FIGS. 36A & 36C, and FIGS. 37A & 37C illustrate that the tube 100 can have the arrangement of features shown when the tube 100 is in a non-expanded state. For example, FIGS. 35A & 35C, FIGS. 36A & 36C, and FIGS. 37A & 37C illustrate that the lumen 104, layer 302, layer 304, the actuator 120, the reinforcement 132, the actuator lumen 322, the reinforcement 308, and the reinforcement 310 can have the arrangement shown, including the relative positions between these features, when the tube 100 is in a non-expanded state.

FIGS. 35B & 35D, FIGS. 36B & 36D, and FIGS. 37B & 37D illustrate the tube 100 in an expanded state after expansion. The expanded state in FIGS. 35B & 35D, FIGS. 36B & 36D, and FIGS. 37B & 37D can be a partially expanded state or a fully expanded state. For example, FIGS. 35B & 35D, FIGS. 36B & 36D, and FIGS. 37B & 37D illustrate the tube 100, the actuator 120, the reinforcement 308, and the reinforcement 310 in a partially expanded state. As another example, FIGS. 35B & 35D, FIGS. 36B & 36D, and FIGS. 37B & 37D illustrate the tube 100, the actuator 120, the reinforcement 308, and the reinforcement 310 in a fully expanded state. FIGS. 35B & 35D, FIGS. 36B & 36D, and FIGS. 37B & 37D illustrate that the tube 100 can have the arrangement of features shown when the tube 100 is in an expanded state. For example, FIGS. 35B & 35D, FIGS. 36B & 36D, and FIGS. 37B & 37D illustrate that the lumen 104, layer 302, layer 304, the actuator 120, the reinforcement 132, the actuator lumen 322, the reinforcement 308, and the reinforcement 310 can have the arrangement shown, including the relative positions between these features, when the tube 100 is in an expanded state. The expanded state can be an axially expanded state and/or a radially expanded state. For example, FIGS. 35B & 35D, FIGS. 36B & 36D, and FIGS. 37B & 37D illustrate a radially expanded state.

FIGS. 35C, 36C, and 37C illustrates cross-sectional views of the tubes 100 in FIGS. 35A, 36A, and 37A taken along lines 35C-35C, 36C-36C, and 37C-37C, respectively. These cross-sections illustrate that the actuator 120 can extend around (e.g., helically around) the lumen 104. For example, FIGS. 35C, 36C, and 37C shows one turn 120*t* (e.g., helical turn) of the actuator 120 around the lumen 104. For example, FIGS. 35C, 36C, and 37C illustrate lines 35*ct*, 36*ct*, and 37*ct* that represent the start and end of one turn of the helical path of the actuator 120 shown in FIGS. 35A, 36A, and 37A. FIGS. 35C, 36C, and 37C further illustrate transverse cross-sectional views 35*cx*, 36*cx*, and 37*cx* of the actuator 120 taken along the lines 35*cx*-35*cx*, 36*cx*-36*cx*, 37*cx*-37*cx* in FIGS. 35C, 36C, and 37C, for example, so that the thickness of the wall of the actuator 120 and the relative positions of the wall of the actuator 120, the reinforcement 132, and the lumen 322 in relation to the cross-section of the tube 100 can be more easily visualized, and, for example, so that the reinforcement 132 relative to the lumen 322 can be visualized. The lines 35*cx*-35*cx*, 36*cx*-36*cx*, 37*cx*-37*cx* can be, for example, perpendicular to the center longitudinal axis of the actuator 120 (e.g., the center longitudinal axis of the actuator lumen 322).

FIGS. 35D, 36D, and 37D illustrates cross-sectional views of the tubes 100 in FIGS. 35B, 36B, and 37B taken along lines 35D-35D, 36D-36D, and 37D-37D, respectively. These cross-sections illustrate that the actuator 120 can extend around (e.g., helically around) the lumen 104. For example, FIGS. 35D, 36D, and 37D shows one turn 120*t* (e.g., helical turn) of the actuator 120 around the lumen 104. For example, FIGS. 35D, 36D, and 37D illustrate lines 35*dt*, 36*dt*, and 37*dt* that represent the start and end of one turn of the helical path of the actuator 120 shown in FIGS. 35B, 36B, and 37B. FIGS. 35D, 36D, and 37D further illustrate transverse cross-sectional views 35*dx*, 36*dx*, and 37*dx* of the actuator 120 taken along the lines 35*dx*-35*dx*, 36*dx*-36*dx*, 37*dx*-37*dx* in FIGS. 35D, 36D, and 37D, for example, so that the thickness of the wall of the actuator 120 and the relative positions of the wall of the actuator 120, the reinforcement 132, and the lumen 322 in relation to the cross-section of the tube 100 can be more easily visualized, and, for example, so that the reinforcement 132 relative to the lumen 322 can be visualized. The lines 35*dx*-35*dx*, 36*dx*-36*dx*, 37*dx*-37*dx* can be, for example, perpendicular to the center longitudinal axis of the actuator 120 (e.g., the center longitudinal axis of the actuator lumen 322).

The materials of the different layers of the tube 100 in FIGS. 35A-37D can be, for example, the same as with respect to the tube 160 in FIGS. 16A-18H, including, for example, the first, second, and third variations of materials. These materials can provide the tube 100 with the same properties and benefits as for the tube 160.

FIGS. 35A & 35C, FIGS. 36A & 36C, and FIGS. 37C & 37D illustrate that when the tube 100 is in the non-expanded state, the actuator 120 can have the pressure P0 and the length 126.

FIGS. 35B & 35D, FIGS. 36B & 36D, and FIGS. 37B & 37D illustrate that when the tube 100 is in the expanded state, the actuator 120 can have the pressure P1 and the length 130.

FIGS. 29A-37D illustrate portions of the tube 100 transparent for illustrative purposes, for example, so that the layered arrangement of the tube 100, the actuator 120, the reinforcement 308, and the reinforcement 310 can be more easily visualized, and so that the structure of the actuator 120, the reinforcement, and the reinforcement 310 in the tube 100 can be more easily visualized. With respect to FIGS. 29A-31D, for example, section X1 illustrates layer 304, layer 306, the actuator 120, and the reinforcement 310 transparent, section X2 layer illustrates layer 304 and layer 306 transparent and the actuator 120 shown opaque, and section X3 illustrates layer 306, the actuator 120, and the reinforcement 308 transparent. With respect to FIGS. 32A-34D, for example, section X1 illustrates layer 304, layer 306, the actuator 120, and the reinforcement 310 transparent, section X2 layer illustrates layer 304 and layer 306 transparent and the actuator 120 shown opaque, and section X3 illustrates layer 306, the actuator 120, and the reinforcement 308 transparent. With respect to FIGS. 35A-37D, for example, section X1 illustrates layer 304, the actuator 120, and the reinforcement 310 transparent, section X2 layer illustrates layer 304 transparent and the actuator 120 shown opaque, and section X3 illustrates the actuator 120 and the reinforcement 308 transparent. Sections X1, X2, and X3 can each be, for example, be ⅓ of the length of the section 160*s*1 (e.g., ⅓ of the length 160*s*1L). Sections X1, X2, and X3 in FIGS. 29A-37D can correspond to sections X1, X2, and X3 in FIGS. 10A-18H with an actuator 120.

FIGS. 38A-40D illustrate that the tubes 160 in FIGS. 19A-21H can have an actuator 120, for example, in layer 304. As another example, FIGS. 38A-40D illustrate the tubes 100 in FIGS. 35A-37D without the reinforcement 310.

FIGS. 38A & 38C, FIGS. 39A & 39C, and FIGS. 40A & 40C illustrate the tube 100 in a non-expanded state before and/or after expansion (e.g., before and/or after radial and/or axial expansion), for example, before expansion of the tube 100 and/or after the tube 100 has returned to the non-expanded state after having been expanded. For example, FIGS. 38A & 38C, FIGS. 39A & 39C, and FIGS. 40A & 40C illustrate the tube 100, the actuator 120, and the reinforcement 308 in a non-expanded state. The non-expanded state can be a neutral state or a contracted state of the tube 100. FIGS. 38A & 38C, FIGS. 39A & 39C, and FIGS. 40A & 40C illustrate that the tube 100 can have the arrangement of features shown when the tube 100 is in a non-expanded state. For example, FIGS. 38A & 38C, FIGS. 39A & 39C, and FIGS. 40A & 40C illustrate that the lumen 104, layer 302, layer 304, the actuator 120, the reinforcement 132, the actuator lumen 322, and the reinforcement 308 can have the arrangement shown, including the relative positions between these features, when the tube 100 is in a non-expanded state.

FIGS. 38B & 38D, FIGS. 39B & 39D, and FIGS. 40B & 40D illustrate the tube 100 in an expanded state after expansion. The expanded state in FIGS. 38B & 38D, FIGS. 39B & 39D, and FIGS. 40B & 40D can be a partially expanded state or a fully expanded state. For example, FIGS. 38B & 38D, FIGS. 39B & 39D, and FIGS. 40B & 40D illustrate the tube 100, the actuator 120, and the reinforcement 308 in a partially expanded state. As another example, FIGS. 38B & 38D, FIGS. 39B & 39D, and FIGS. 40B & 40D illustrate the tube 100, the actuator 120, and the reinforcement 308 in a fully expanded state. FIGS. 38B & 38D, FIGS. 39B & 39D, and FIGS. 40B & 40D illustrate that the tube 100 can have the arrangement of features shown when the tube 100 is in an expanded state. For example, FIGS. 38B & 38D, FIGS. 39B & 39D, and FIGS. 40B & 40D illustrate that the lumen 104, layer 302, layer 304, the actuator 120, the reinforcement 132, the actuator lumen 322, and the reinforcement 308 can have the arrangement shown, including the relative positions between these features, when the tube 100 is in an expanded state. The expanded state can be an axially expanded state and/or a radially expanded state. For example, FIGS. 38B & 38D, FIGS. 39B & 39D, and FIGS. 40B & 40D illustrate a radially expanded state.

FIGS. 38C, 39C, and 40C illustrates cross-sectional views of the tubes 100 in FIGS. 38A, 39A, and 40A taken along lines 38C-38C, 39C-39C, and 40C-40C, respectively. These cross-sections illustrate that the actuator 120 can extend around (e.g., helically around) the lumen 104. For example, FIGS. 38C, 39C, and 40C shows one turn 120*t* (e.g., helical turn) of the actuator 120 around the lumen 104. For example, FIGS. 38C, 39C, and 40C illustrate lines 38*ct*, 39*ct*, and 40*ct* that represent the start and end of one turn of the helical path of the actuator 120 shown in FIGS. 38A, 39A, and 40A. FIGS. 38C, 39C, and 40C further illustrate transverse cross-sectional views 38*cx*, 39*cx*, and 40*cx* of the actuator 120 taken along the lines 38*cx*-38*cx*, 39*cx*-39*cx*, 40*cx*-40*cx* in FIGS. 38C, 39C, and 40C, for example, so that the thickness of the wall of the actuator 120 and the relative positions of the wall of the actuator 120, the reinforcement 132, and the lumen 322 in relation to the cross-section of the tube 100 can be more easily visualized, and, for example, so that the reinforcement 132 relative to the lumen 322 can be visualized. The lines 38*cx*-38*cx*, 39*cx*-39*cx*, 40*cx*-40*cx* can be, for example, perpendicular to the center longitudinal axis of the actuator 120 (e.g., the center longitudinal axis of the actuator lumen 322).

FIGS. 38D, 39D, and 40D illustrates cross-sectional views of the tubes 100 in FIGS. 38B, 39B, and 40B taken along lines 38D-38D, 39D-39D, and 40D-40D, respectively. These cross-sections illustrate that the actuator 120 can extend around (e.g., helically around) the lumen 104. For example, FIGS. 38D, 39D, and 40D shows one turn 120*t* (e.g., helical turn) of the actuator 120 around the lumen 104. For example, FIGS. 38D, 39D, and 40D illustrate lines 38*dt*, 39*dt*, and 40*dt* that represent the start and end of one turn of the helical path of the actuator 120 shown in FIGS. 38B, 39B, and 40B. FIGS. 38D, 39D, and 40D further illustrate transverse cross-sectional views 38*dx*, 39*dx*, and 40*dx* of the actuator 120 taken along the lines 38*dx*-38*dx*, 39*dx*-39*dx*, 40*dx*-40*dx* in FIGS. 38D, 39D, and 40D, for example, so that the thickness of the wall of the actuator 120 and the relative positions of the wall of the actuator 120, the reinforcement 132, and the lumen 322 in relation to the cross-section of the tube 100 can be more easily visualized, and, for example, so that the reinforcement 132 relative to the lumen 322 can be visualized. The lines 38*dx*-38*dx*, 39*dx*-39*dx*, 40*dx*-40*dx* can be, for example, perpendicular to the center longitudinal axis of the actuator 120 (e.g., the center longitudinal axis of the actuator lumen 322).

The materials of the different layers of the tube 100 in FIGS. 38A-40D can be, for example, the same as with respect to the tube 160 in FIGS. 19A-21H, including, for example, the first, second, and third variations of materials. These materials can provide the tube 100 with the same properties and benefits as for the tube 160.

FIGS. 38A & 38C, FIGS. 39A & 39C, and FIGS. 40C & 40D illustrate that when the tube 100 is in the non-expanded state, the actuator 120 can have the pressure P0 and the length 126.

FIGS. 38B & 38D, FIGS. 39B & 39D, and FIGS. 40B & 40D illustrate that when the tube 100 is in the expanded state, the actuator 120 can have the pressure P1 and the length 130.

FIGS. 41A-41D illustrate the tubes 100 in FIGS. 35A-37D without the reinforcement 308. For example, FIGS. 41A-41D illustrate the tubes 100 in FIGS. 35A-37D with a reinforcement 310 instead of the reinforcement 308. The actuator 120 can be in layer 302 and/or the reinforcement 310 can be in layer 302. For example, FIGS. 41A-41D illustrate that the actuator 120 can be in layer 304. The actuator 120 and the reinforcement 310 can, for inhibit or prevent kinking of the tube 100. The reinforcement 310 can transmit torque.

FIGS. 41A & 41C illustrate the tube 100 in a non-expanded state before and/or after expansion (e.g., before and/or after radial and/or axial expansion), for example, before expansion of the tube 100 and/or after the tube 100 has returned to the non-expanded state after having been expanded. For example, FIGS. 41A & 41C illustrate the tube 100, the actuator 120, and the reinforcement 308 in a non-expanded state. The non-expanded state can be a neutral state or a contracted state of the tube 100. FIGS. 41A & 41C illustrate that the tube 100 can have the arrangement of features shown when the tube 100 is in a non-expanded state. For example, FIGS. 41A & 41C illustrate that the lumen 104, layer 302, layer 304, the actuator 120, the reinforcement 132, the actuator lumen 322, and the reinforcement 310 can have the arrangement shown, including the relative positions between these features, when the tube 100 is in a non-expanded state.

FIGS. 41B & 41D illustrate the tube 100 in an expanded state after expansion. The expanded state in FIGS. 41B & 41D can be a partially expanded state or a fully expanded state. For example, FIGS. 41B & 41D illustrate the tube 100, the actuator 120, and the reinforcement 310 in a partially expanded state. As another example, FIGS. 41B & 41D illustrate the tube 100, the actuator 120, and the reinforcement 310 in a fully expanded state. FIGS. 41B & 41D illustrate that the tube 100 can have the arrangement of features shown when the tube 100 is in an expanded state. For example, FIGS. 41B & 41D illustrate that the lumen 104, layer 302, layer 304, the actuator 120, the reinforcement 132, the actuator lumen 322, and the reinforcement 310 can have the arrangement shown, including the relative positions between these features, when the tube 100 is in an expanded state. The expanded state can be an axially expanded state and/or a radially expanded state. For example, FIGS. 41B & 41D illustrate a radially expanded state.

FIG. 41C illustrates a cross-sectional view of the tube 100 in FIG. 41A taken along line 41C-41C. This cross-section illustrates that the actuator 120 can extend around (e.g., helically around) the lumen 104. For example, FIG. 41C shows one turn 120*t* (e.g., helical turn) of the actuator 120 around the lumen 104. For example, FIG. 41C illustrates line 41*ct* that represents the start and end of one turn of the helical path of the actuator 120 shown in FIG. 41A. FIG. 41C further illustrates a transverse cross-sectional view 41*cx* of the actuator 120 taken along the line 41*cx*-41*cx* in FIG. 41C, for example, so that the thickness of the wall of the actuator 120 and the relative positions of the wall of the actuator 120, the reinforcement 132, and the lumen 322 in relation to the cross-section of the tube 100 can be more easily visualized, and, for example, so that the reinforcement 132 relative to the lumen 322 can be visualized. The line 41*cx*-41*cx* can be, for example, perpendicular to the center longitudinal axis of the actuator 120 (e.g., the center longitudinal axis of the actuator lumen 322).

FIG. 41D illustrates a cross-sectional view of the tubes 100 in FIG. 41B taken along line 41D-41D. This cross-section illustrates that the actuator 120 can extend around (e.g., helically around) the lumen 104. For example, FIG. 41D shows one turn 120*t* (e.g., helical turn) of the actuator 120 around the lumen 104. For example, FIG. 41D illustrate line 41*dt* that represents the start and end of one turn of the helical path of the actuator 120 shown in FIG. 41B. FIG. 41D further illustrates a transverse cross-sectional view 41*dx* of the actuator 120 taken along the line 41*dx*-41*dx* in FIG. 41D, for example, so that the thickness of the wall of the actuator 120 and the relative positions of the wall of the actuator 120, the reinforcement 132, and the lumen 322 in relation to the cross-section of the tube 100 can be more easily visualized, and, for example, so that the reinforcement 132 relative to the lumen 322 can be visualized. The line 41*dx*-41*dx* can be, for example, perpendicular to the center longitudinal axis of the actuator 120 (e.g., the center longitudinal axis of the actuator lumen 322).

The materials of the different layers of the tube 100 in FIGS. 38A-40D can be, for example, the same as with respect to the tube 160 in FIGS. 19A-21H, including, for example, the first, second, and third variations of materials. These materials can provide the tube 100 with the same properties and benefits as for the tube 160.

FIGS. 41A & 41C illustrate that when the tube 100 is in the non-expanded state, the actuator 120 can have the pressure P0 and the length 126.

FIGS. 41B & 41D illustrate that when the tube 100 is in the expanded state, the actuator 120 can have the pressure P1 and the length 130.

FIGS. 42A-44D illustrate that the tubes 160 in FIGS. 22A-24H can have an actuator 120, for example, in layer 302. As another example, FIGS. 42A-44D illustrate the tubes 100 in FIGS. 35A-37D without layer 302. FIGS. 42A-44D illustrate that the tube 100 can have one layer (e.g., layer 302, layer 304, or layer 306). The actuator 120 and the reinforcement 308 can, for inhibit or prevent kinking of the tube 100. The reinforcement 308 can transmit torque.

FIGS. 42A & 42C, FIGS. 43A & 43C, and FIGS. 44A & 44C illustrate the tube 100 in a non-expanded state before and/or after expansion (e.g., before and/or after radial and/or axial expansion), for example, before expansion of the tube 100 and/or after the tube 100 has returned to the non-expanded state after having been expanded. For example, FIGS. 42A & 42C, FIGS. 43A & 43C, and FIGS. 44A & 44C illustrate the tube 100, the actuator 120, and the reinforcement 308 in a non-expanded state. The non-expanded state can be a neutral state or a contracted state of the tube 100. FIGS. 42A & 42C, FIGS. 43A & 43C, and FIGS. 44A & 44C illustrate that the tube 100 can have the arrangement of features shown when the tube 100 is in a non-expanded state. For example, FIGS. 42A & 42C, FIGS. 43A & 43C, and FIGS. 44A & 44C illustrate that the lumen 104, layer 302, the actuator 120, the reinforcement 132, the actuator lumen 322, and the reinforcement 308 can have the arrangement shown, including the relative positions between these features, when the tube 100 is in a non-expanded state.

FIGS. 42B & 42D, FIGS. 43B & 43D, and FIGS. 44B & 44D illustrate the tube 100 in an expanded state after expansion. The expanded state in FIGS. 42B & 42D, FIGS. 43B & 43D, and FIGS. 44B & 44D can be a partially expanded state or a fully expanded state. For example, FIGS. 42B & 42D, FIGS. 43B & 43D, and FIGS. 44B & 44D illustrate the tube 100, the actuator 120, and the reinforcement 308 in a partially expanded state. As another example, FIGS. 42B & 42D, FIGS. 43B & 43D, and FIGS. 44B & 44D illustrate the tube 100, the actuator 120, and the reinforcement 308 in a fully expanded state. FIGS. 42B & 42D, FIGS. 43B & 43D, and FIGS. 44B & 44D illustrate that the tube 100 can have the arrangement of features shown when the tube 100 is in an expanded state. For example, FIGS. 42B & 42D, FIGS. 43B & 43D, and FIGS. 44B & 44D illustrate that the lumen 104, layer 302, the actuator 120, the reinforcement 132, the actuator lumen 322, and the reinforcement 308 can have the arrangement shown, including the relative positions between these features, when the tube 100 is in an expanded state. The expanded state can be an axially expanded state and/or a radially expanded state. For example, FIGS. 42B & 42D, FIGS. 43B & 43D, and FIGS. 44B & 44D illustrate a radially expanded state.

FIGS. 42C, 43C, and 44C illustrates cross-sectional views of the tubes 100 in FIGS. 42A, 43A, and 44A taken along lines 42C-42C, 43C-43C, and 44C-44C, respectively. These cross-sections illustrate that the actuator 120 can extend around (e.g., helically around) the lumen 104. For example, FIGS. 42C, 43C, and 44C shows one turn 120*t* (e.g., helical turn) of the actuator 120 around the lumen 104. For example, FIGS. 42C, 43C, and 44C illustrate lines 42*ct*, 43*ct*, and 44*ct* that represent the start and end of one turn of the helical path of the actuator 120 shown in FIGS. 42A, 43A, and 44A. FIGS. 42C, 43C, and 44C further illustrate transverse cross-sectional views 42*cx*, 43*cx*, and 44*cx* of the actuator 120 taken along the lines 42*cx*-42*cx*, 43*cx*-43*cx*, 44*cx*-44*cx* in FIGS. 42C, 43C, and 44C, for example, so that the thickness of the wall of the actuator 120 and the relative positions of the wall of the actuator 120, the reinforcement 132, and the lumen 322 in relation to the cross-section of the tube 100 can be more easily visualized, and, for example, so that the reinforcement 132 relative to the lumen 322 can be visualized. The lines 42*cx*-42*cx*, 43*cx*-43*cx*, 44*cx*-44*cx* can be, for example, perpendicular to the center longitudinal axis of the actuator 120 (e.g., the center longitudinal axis of the actuator lumen 322).

FIGS. 42D, 43D, and 44D illustrates cross-sectional views of the tubes 100 in FIGS. 42B, 43B, and 44B taken along lines 42D-42D, 43D-43D, and 44D-44D, respectively. These cross-sections illustrate that the actuator 120 can extend around (e.g., helically around) the lumen 104. For example, FIGS. 42D, 43D, and 44D shows one turn 120*t* (e.g., helical turn) of the actuator 120 around the lumen 104. For example, FIGS. 42D, 43D, and 44D illustrate lines 42*dt*, 43*dt*, and 44*dt* that represent the start and end of one turn of the helical path of the actuator 120 shown in FIGS. 42B, 43B, and 44B. FIGS. 42D, 43D, and 44D further illustrate transverse cross-sectional views 42*dx*, 43*dx*, and 44*dx* of the actuator 120 taken along the lines 42*dx*-42*dx*, 43*dx*-43*dx*, 44*dx*-44*dx* in FIGS. 42D, 43D, and 44D, for example, so that the thickness of the wall of the actuator 120 and the relative positions of the wall of the actuator 120, the reinforcement 132, and the lumen 322 in relation to the cross-section of the tube 100 can be more easily visualized, and, for example, so that the reinforcement 132 relative to the lumen 322 can be visualized. The lines 42*dx*-42*dx*, 43*dx*-43*dx*, 44*dx*-44*dx* can be, for example, perpendicular to the center longitudinal axis of the actuator 120 (e.g., the center longitudinal axis of the actuator lumen 322).

The materials of the different layers of the tube 100 in FIGS. 42A-44D can be, for example, the same as with respect to the tube 160 in FIGS. 22A-24H, including, for example, the first, second, and third variations of materials. These materials can provide the tube 100 with the same properties and benefits as for the tube 160.

FIGS. 42A & 42C, FIGS. 43A & 43C, and FIGS. 44C & 44D illustrate that when the tube 100 is in the non-expanded state, the actuator 120 can have the pressure P0 and the length 126.

FIGS. 42B & 42D, FIGS. 43B & 43D, and FIGS. 44B & 44D illustrate that when the tube 100 is in the expanded state, the actuator 120 can have the pressure P1 and the length 130.

FIGS. 42A-44D illustrate that the reinforcement 308 can extend around (e.g., helically around) the lumen 104 and the actuator 120 when the tube 100 is in the non-expanded state and when the tube 100 is in the expanded state. FIGS. 42A-44D illustrate that the reinforcement 308 can extend around (e.g., helically around) the reinforcement 132 when the tube 100 is in the non-expanded state and when the tube 100 is in the expanded state.

FIGS. 42A-44D illustrate that the actuator 120 can extend around (e.g., helically around) the lumen 104 when the tube 100 is in the non-expanded state and when the tube 100 is in the expanded state. FIGS. 42A-44D illustrate that the reinforcement 132 can extend around (e.g., helically around) the lumen 104 when the tube 100 is in the non-expanded state and when the tube 100 is in the expanded state. FIGS. 42A-44D illustrate that the actuator lumen 322 can extend around the lumen 104 when the tube 100 is in the non-expanded state and when the tube 100 is in the expanded state.

FIGS. 42A-44D illustrate that the actuator 120 can be closer to the lumen 104 than the reinforcement 308 when the tube 100 is in the non-expanded state and when the tube 100 is in the expanded state. As another example, the positions of the actuator 120 and the reinforcement 308 can be swapped with each other such that the reinforcement 308 can be closer to the lumen 104 when the tube 100 is in the non-expanded state and when the tube 100 is in the expanded state.

FIGS. 42A-44D illustrate that the actuator 120 can be radially inside the reinforcement 308 when the tube 100 is in the non-expanded state and when the tube 100 is in the expanded state. As another example, the positions of the actuator 120 and the reinforcement 308 can be swapped with each other such that the reinforcement 308 can be radially inside the actuator 120.

FIGS. 38A-44D illustrate portions of the tube 100 transparent for illustrative purposes, for example, so that the layered arrangement of the tube 100, the actuator 120, the reinforcement 308, and the reinforcement 310 can be more easily visualized, and so that the structure of the actuator 120, the reinforcement 308, and the reinforcement 310 in the tube 100 can be more easily visualized. With respect to FIGS. 38A-40D, section X4 illustrates layer 304 and the actuator 120 transparent and section X5 illustrates layer 304 transparent and the actuator 120 shown opaque. With respect to FIGS. 41A-41D, section X4 illustrates layer 304 and the actuator 120 transparent and section X5 illustrates layer 304 and the reinforcement 310 transparent and the actuator 120 shown opaque. With respect to FIGS. 42A-44D, section X4 illustrates layer 302 and the actuator 120 transparent and section X5 illustrates layer 302 transparent and the actuator 120 shown opaque.

FIGS. 26A-44D illustrate that the tube 100 can have all the benefits and features associated with a tube 160 (e.g., the tubes 160 shown in FIGS. 7A-25D) with the additional benefit of the actuator 120.

FIGS. 26A-44D illustrate that the actuator 120 can have the reinforcement 132. As additional examples, the actuator 120 (e.g., in FIGS. 26A-44D) may not have the reinforcement 132.

The tubes 100 and 160 can have a radiopaque tip, for example, so that the tip can be visualized under fluoroscopy. For example, the tip 334 can be a radiopaque tip. As another example, one or more of the reinforcements (e.g., reinforcement 308, reinforcement 310, and/or reinforcement 312) or a distal portion thereof can be radiopaque so that the distal tip of the of the tubes 100 and 160 can be visualized under fluoroscopy. The tubes herein (e.g., tubes 100 and/or tubes 160) can have a non-reinforced polymer at the distal end that is radiopaque. The non-reinforced polymer section can have a length, for example, of 0.5 mm-10 mm (e.g., 2.0 mm-4.0 mm). As another example, the tubes 100 and 160 (e.g., the distal ends of the tubes 100 and 160) may not be radiopaque FIGS. 45A-45D illustrate a variation of the actuator 120. FIGS. 26A-44D illustrate, for example, that the tube 100 can have the actuator 120 in FIGS. 45A-45D.

FIG. 45A illustrates that the clockwise and counterclockwise elements 132*a*, 132*b* can have an angle 326 when the actuator 120 is in a non-actuated state (e.g., FIGS. 45A & 45C). FIG. 45A illustrates that the angle 326 can be double the angle 133 between the clockwise and counterclockwise elements 132*a*, 132*b* and the longitudinal axis 132*x* of the reinforcement 132. A high angle 133 (e.g., 46 degrees to 85 degrees) between the clockwise and counterclockwise elements 132*a*, 132*b* and the longitudinal axis 132*x* of the reinforcement 132 can correspond to an angle 326 of 92 degrees to 170 degrees (also referred to as a high angle 326), including every 1 degree increment within this range (e.g., 92 degrees, 100 degrees, 115 degrees, 140 degrees, 150 degrees, 170 degrees). When the reinforcement 132 has a high angle 326 t between the clockwise and counterclockwise elements 132*a*, 132*b*, the reinforcement 132 can, for example, resist radial expansion but allow the length of the actuator 120 to increase (e.g., from length 126 to length 130) and the width of the actuator 120 to decrease (e.g., from width 120*w*1 to width 120*w*2) when the actuator 120 is activated (e.g., inflated from pressure P0 to pressure P1).

The angle 326 can be, for example, a high angle when the actuator 120 is in a non-actuated state (e.g., an uninflated state or a completely deflated state). The angle 326 can be, for example, a high angle when the tube 100 in a neutral state (e.g., a non-expanded state) or a contracted state, for example, when the actuator 120 is in a non-inflated or a deflated state. For example, FIGS. 26A-45F illustrate that the angle 326 can be a high angle when the actuator 120 is in a non-actuated state (e.g., an uninflated state). A low angle 133 (e.g., 5 degrees to 45 degrees) between the clockwise and counterclockwise elements 132*a*, 132*b* and the longitudinal axis 132*x* of the reinforcement 132 can correspond to an angle 326 of 10 degrees to 90 degrees (also referred to as a low angle 326), including every 1 degree increment within this range (e.g., 10 degrees, 15 degrees, 30 degrees, 45 degrees, 60 degrees, 75 degrees, 90 degrees). When the reinforcement 132 has a low angle 326 between the clockwise and counterclockwise elements 132*a*, 132*b*, the reinforcement 132 can, for example, resist axial expansion but allow the length of the actuator 120 to decrease (e.g., from length 130 to length 126) and the width of the actuator 120 to increase (e.g., from width 120*w*2 to width 120*w*1) when the actuator 120 is activated (e.g., inflated from pressure P0 to pressure P1). The angle 326 can be, for example, a low angle when the actuator 120 is in a non-actuated state (e.g., an uninflated state or a completely deflated state). The angle 326 can be, for example, a low angle when the tube 100 in a neutral state (e.g., a non-expanded state) or a contracted state, for example, when the actuator 120 is in a non-inflated or a deflated state.

FIG. 45B illustrates that the clockwise and counterclockwise elements 132*a*, 132*b* can have an angle 328 when the actuator 120 is in an expanded state (e.g., FIGS. 45B & 45D), for example, a partially expanded state or a fully expanded state, which can correspond to a partially actuated (e.g., inflated) state or a fully inflated (e.g., actuated) state, respectively. The angle 328 can be less than, equal to, or greater than the angle 326. FIG. 45B illustrates that the angle 328 can be double the angle 133 between the clockwise and counterclockwise elements 132*a*, 132*b* and the longitudinal axis 132*x* of the reinforcement 132. A low angle 133 (e.g., 5 degrees to 45 degrees) between the clockwise and counterclockwise elements 132*a*, 132*b* and the longitudinal axis 132*x* of the reinforcement 132 can correspond to an angle 328 of 10 degrees to 90 degrees (also referred to as a low angle 328), including every 1 degree increment within this range (e.g., 10 degrees, 15 degrees, 30 degrees, 45 degrees, 60 degrees, 75 degrees, 90 degrees). When the reinforcement 132 has a low angle 328 between the clockwise and counterclockwise elements 132*a*, 132*b*, the reinforcement 132 can, for example, resist axial expansion but allow radial expansion. For example, a reinforcement 132 with a low angle 328 between the clockwise and counterclockwise elements 132*a*, 132*b* can allow the width (e.g., diameter) of the actuator 120 to increase (e.g., from width 120*w*2 to width 120*w*1) and the length of the actuator 120 to decrease (e.g., from length 130 to length 126) as the actuator 120 is deflated (e.g., from pressure P1 to pressure P0). The angle 328 can be, for example, a low angle when the actuator 120 is in an actuated state (e.g., an inflated state), such as when the actuator 120 is pressurized with pressure P1. For example, FIGS. 26A-45F illustrate that the angle 328 can be a low angle when the actuator 120 is in an actuated state (e.g., an inflated state). A high angle 133 (e.g., 46 degrees to 85 degrees) between the clockwise and counterclockwise elements 132*a*, 132*b* and the longitudinal axis 132*x* of the reinforcement 132 can correspond to an angle 328 of 92 degrees to 170 degrees (also referred to as a high angle 328), including every 1 degree increment within this range (e.g., 92 degrees, 100 degrees, 120 degrees, 150 degrees, 170 degrees). When the reinforcement 132 has a high angle 328 between the clockwise and counterclockwise elements 132*a*, 132*b*, the reinforcement 132 can, for example, resist radial expansion but allow axial expansion. For example, a reinforcement 132 with a high angle 328 between the clockwise and counterclockwise elements 132*a*, 132*b* can allow the width (e.g., diameter) of the actuator 120 to decrease (e.g., from width 120*w*1 to width 120*w*2) and the length of the actuator 120 to increase (e.g., from length 126 to length 130) as the actuator 120 is deflated (e.g., from pressure P1 to pressure P0). The angle 328 can be, for example, a high angle when the actuator 120 is in an actuated state (e.g., an inflated state).

The angle 326 can decrease as the actuator 120 is inflated, for example, to the angle 328. For example (e.g., as shown by FIGS. 26A-45F), the reinforcement 132 can prevent the actuator 120 from radially expanding as the actuator 120 axially expands (e.g., from length 126 to length 130) as the actuator is activated (e.g., inflated) such that the angle 328 can be less than the angle 326, for example, by 1 degree to 165 degrees, or more narrowly, by 1 degree to 90 degrees, or more narrowly still, by 1 degree to 30 degrees, including every 1 degree increment within these ranges (e.g., 1 degree, 10 degrees, 20 degrees, 30 degrees, 45 degrees, 90 degrees, 120 degrees, 150 degrees, 165 degrees). The reinforcement 132 can, for example, allow the actuator 120 to axially expand up to an axial expansion limit but can inhibit or prevent further axial expansion beyond the axial expansion limit.

As another example, the angle 326 can increase as the actuator 120 is inflated, for example, to the angle 328. For example, the reinforcement 132 can prevent the actuator 120 from axially expanding as the actuator 120 radially expands as the actuator is activated (e.g., inflated) such that the angle 328 can be more than the angle 326, for example, by 1 degree to 165 degrees, or more narrowly, by 1 degree to 90 degrees, or more narrowly still, by 1 degree to 30 degrees, including every 1 degree increment within these ranges (e.g., 1 degree, 10 degrees, 20 degrees, 30 degrees, 45 degrees, 90 degrees, 120 degrees, 150 degrees, 165 degrees). The reinforcement 132 can, for example, allow the actuator 120 to radially expand up to a radial expansion limit but can inhibit or prevent further radial expansion beyond the radial expansion limit.

As the actuator 120 increases in length, the width (e.g., diameter) of the actuator 120 can remain the same (e.g., for zigzag variations such as in FIGS. 1A-1D), the width (e.g., diameter) of the actuator 120 can decrease, or the width (e.g., diameter) of the actuator 120 can increase. For example, FIGS. 45A and 45C illustrate that the actuator 120 can have the length 126 and a width 120*w*1 when the actuator 120 is in a non-activated state (e.g., non-inflated state with pressure P0), and FIGS. 45B and 45D illustrate that the actuator 120 can have the length 130 and a width 120*w*2 when the actuator 120 is in an activated state (e.g., an inflated state with pressure P1). The width 120*w*1 can be, for example, the diameter of the actuator 120 when the actuator 120 is in a non-activated state. The width 120*w*2 can be, for example, the diameter of the actuator 120 when the actuator 120 is in an activated state. The widths 120*w*1 and 120*w*2 can be, for example, outer diameters of the actuator 120. As another example, the widths 120*w*1 and 120*w*2 can be, for example, a width (e.g., diameter) of the lumen 322. The width 120*w*1 is also referred to as a first width 120*w*1 and a first actuator width 120w1, and the width 120w2 is also referred to as a second width 120w2 and a second actuator width 120w2.

As the actuator 120 is activated (e.g., as the pressure increases in the lumen 322 from P0 to P1), the actuator width can decrease from the first width 120w1 to the second width 120w2, the angle 326 can decrease to angle 328, and the actuator length can increase from the length 126 to the length 130, for example, as diameter of the lumen 104 increases from diameter d1 to diameter d2. The reinforcement 132 can thereby allow the actuator 120 to axially expand but inhibit or prevent the actuator 120 from radially expanding as the actuator 120 is activated (e.g., inflated). When the pressure within the actuator 120 is reduced (e.g., from pressure P1 to pressure P0), the actuator diameter can increase from the second width 120w2 to the first width 120w1, the angle 328 can increase to angle 326, and the actuator length can decrease from the length 130 to the length 126 such that the actuator 120 can axially contract. In this way the actuator 120 can return to the state depicted in FIGS. 45A and 45C from the state depicted in FIGS. 45B and 45D.

FIGS. 45C and 45D illustrate that the outer ring of X's can be the clockwise elements 132a and that the inner ring of X's can be counterclockwise elements 132b.

The actuator 120 can be inflated with a gas or a liquid. The liquid can be incompressible. Inflating the actuator 120 with a liquid can be beneficial for a better translation to output (e.g., axial expansion) for the actuator 120 compared to, for example, inflating the actuator 120 with a gas.

FIGS. 45A-45D illustrate that the reinforcement 132 can be, for example, a braid or a spiral wrap. For example, FIGS. 45A-45D illustrate that the reinforcement 132 can be a spiral wrap. As another example, FIGS. 45A-45D illustrate that the reinforcement 132 can be a braid. The reinforcement 132 can allow the actuator 120 to hold an amount of pressure, whereby the reinforcement 132 can inhibit or prevent the width (e.g., diameter) of the actuator 120 from increasing but allow the actuator 120 to increase in length when pressure is applied to it (e.g., when the pressure in the lumen 322 is increased from P0 to P1).

The reinforcement 132 and the reinforcement 310 can allow and inhibit expansion in different directions, for example, due to the different angle between the elements of these reinforcements. For example, when the tube 160 and/or the tube 100 is in a neutral state or a contracted state, the angle between the clockwise and counterclockwise elements 310a, 310b of the reinforcement 310 and the longitudinal axis 310x of the reinforcement 310 can be a low angle, whereas when the tube 100 is in the neutral state or the contracted state (e.g., when the actuator 120 is in a non-actuated state (e.g., a non-inflated state)), the angle between the clockwise and counterclockwise elements 132a, 132b of the reinforcement 132 and the longitudinal axis 132x of the reinforcement 132 can be a high angle. For example, the angle 326 can be different than (e.g., larger than) angle 316 such that the reinforcement 132 and the reinforcement 310 can have different expansion characteristics. For example, the angle 316 (e.g., low angle) between the clockwise and counterclockwise elements 310a, 310b of the reinforcement 310 can allow radial expansion of the tube 100 but inhibit axial expansion of the tube 100, and the angle 326 (e.g., high angle) between the clockwise and counterclockwise elements 132a, 132b of the reinforcement 132 can allow axial expansion of the actuator 120 but inhibit radial expansion of the actuator 120.

FIGS. 45A-45B illustrate that the density of the elements 132a and 132b can decrease as the actuator 120 axially expands. For example, FIGS. 45A-45B illustrate that the gaps between the elements 132a and 132b can increase as the actuator 120 axially expands.

FIG. 45E illustrates that the actuator 120 of FIGS. 45A and 45C can be wrapped around (e.g., helically around) the lumen 104 and that the reinforcement 308 can be wrapped around (e.g., helically around) the actuator 120 such that both the actuator 120 and the reinforcement 308 extend around (e.g., helically around) the lumen 104 when the actuator 120 is in a non-activated state (e.g., non-inflated state). The layer or layers of the tube 100 in FIG. 45E are shown transparent so that the relationship between the actuator 120 and the reinforcement 308 when the actuator 120 is in a non-activated state (e.g., non-inflated state) can be more easily visualized. Only one helical turn of the reinforcement 308 is shown in FIG. 45E so that the actuator 120 can be more easily visualized, and it is understood that the reinforcement 308 can extend helically around the lumen 104 along the same longitudinal length of the lumen 104 as the actuator 120 (e.g., 1 more turn, 1.5 more turns, or 2 more turns of the reinforcement 308 to the right in FIG. 45E is/are shown transparent).

FIG. 45F illustrates the arrangement of the lumen 104, the actuator 120, and the reinforcement 308 of FIG. 45E when the actuator 120 is in an activated state (e.g., inflated state). For example, FIG. 45F illustrates that the actuator 120 of FIGS. 45B and 45D can be wrapped around (e.g., helically around) the lumen 104 and that the reinforcement 308 can be wrapped around (e.g., helically around) the actuator 120 such that both the actuator 120 and the reinforcement 308 extend around (e.g., helically around) the lumen 104 when the actuator 120 is in an activated state (e.g., inflated state). The layer or layers of the tube 100 in FIG. 45F are shown transparent so that the relationship between the actuator 120 and the reinforcement 308 when the actuator 120 is in an activated state (e.g., inflated state) can be more easily visualized. As for FIG. 45E, only one helical turn of the reinforcement 308 is shown in FIG. 45F so that the actuator 120 can be more easily visualized, and it is understood that the reinforcement 308 can extend helically around the lumen 104 along the same longitudinal length of the lumen 104 as the actuator 120 (e.g., 1 more turn, 1.5 more turns, or 2 more turns of the reinforcement 308 to the right in FIG. 45F is/are shown transparent).

FIGS. 45E and 45F illustrate that the peaks 344 (e.g., the first and second peaks 344p1, 344p2) can have rounded, as opposed to pointed, or sharp, peaks.

Any of the tubes 160 can have the actuator 120 shown in FIGS. 45A-45F. For example, the tubes 160 in FIGS. 7A-25D can have the actuator 120 shown in FIGS. 45A-45F.

Any of the tubes 160 can have the reinforcement 308 shown in FIGS. 45E and 45F. For example, the tubes 160 in FIGS. 7A-25D can have the reinforcement 308 shown in FIGS. 45A-45F.

Any of the tubes 100 can have the actuator 120 shown in FIGS. 45A-45F. For example, the tubes 100 in FIGS. 26A-44D can have the actuator 120 shown in FIGS. 45A-45F. For example, the actuator 120 shown in FIGS. 26A-44D can be the actuator 120 shown in FIGS. 45A-45F. As another example, FIGS. 45A-45F can illustrate the actuator 120 shown in FIGS. 26A-44D.

Any of the tubes 100 can have the reinforcement 308 shown in FIGS. 45E and 45F. For example, the tubes 100 in FIGS. 26A-44D can have the reinforcement 308 shown in FIGS. 45A-45F.

FIGS. 45E and 45F illustrate that actuator 120 and the reinforcement 308 can have the arrangement of features shown when the tube 100 is in the non-expanded state (e.g., FIG. 45E) and when the tube 100 is in the expanded state (e.g., FIG. 45F). The tube 100 an have the arrangement of the actuator 120 and the reinforcement 308 in FIG. 45F, for example, when the actuator 120 is in a non-activated state (e.g., non-inflated state). The tube 100 an have the arrangement of the actuator 120 and the reinforcement 308 in FIG. 45F, for example, when the actuator 120 is in an activated state (e.g., inflated state).

FIGS. 45E and 45F illustrate that adjacent turns 120*t* of the actuator 120 can contact each other.

FIGS. 45E and 45F illustrate that the reinforcement 308 from a first peak 344*p*1 to a second peak 344*p*2 can extend across multiple turns 120*t* (e.g., three turns 120*t*) of the actuator 120.

FIGS. 26A-44D, 45E, and 45F illustrate that adjacent turns 120*t* of the actuator 120 can contact each other when the tube 100 is in a neutral state or a contracted state and when the tube 100 is in an expanded state (e.g., a partially radially expanded state or a fully radially expanded state). This can beneficially inhibit or prevent the actuator 120 from causing ripples or a corrugated effect on the outer surface of the tube 100 when the actuator 120 is in an actuated (e.g., inflated) state.

Any of the tubes disclosed herein can have one or multiple reinforcements 312, for example, 1-10 reinforcements 312, including every 1 reinforcement increment within this range (e.g., 1 reinforcement 312, 2 reinforcements 312, 3 reinforcements 312, 4 reinforcements 312, 10 reinforcements 312). For example, any of the tubes 160 and any of the tubes 100 can have one or multiple reinforcements 312 in one or multiple layers of the tube, for example, in layer 302, in layer 304, or in layer 306.

FIGS. 46A and 47A illustrate that any of the tubes 160 and 100, respectively, can have one or multiple reinforcements 312 that can be longitudinal strips. For example, FIGS. 46A and 47A illustrate that any of the tubes 160 and 100, respectively, can have 4 reinforcements 312, for example, in layer 302, in layer 304, and/or in layer 306 that can be spaced 90 degrees apart from each other.

FIGS. 46B and 47B illustrate that any of the tubes 160 and 100, respectively, can have one or multiple (e.g., 2 to 5) reinforcements 312 that can be helical strips. For example, FIGS. 46B and 47B illustrate that any of the tubes 160 and 100, respectively, can have one reinforcement 312 that can extend helically through layer 302, layer 304, and/or layer 306. FIGS. 46B and 47B illustrate, for example, that the reinforcements 312 can have a helical profile.

FIGS. 46C and 47C illustrate that any of the tubes 160 and 100, respectively, can have multiple reinforcements 312 that can be helical strips. For example, FIGS. 46C and 47C illustrate that any of the tubes 160 and 100, respectively, can have a first reinforcement 312*a* that can extend helically through layer 302, layer 304, and/or layer 306, and can have a second reinforcement 312*b* that can extend helically through layer 302, layer 304, and/or layer 306. The first and second reinforcements 312*a*, 312*b* can rotate around the center longitudinal axis of the tube (e.g., tube 100, tube 160) in the same direction (e.g., both in a clockwise direction or both in a counterclockwise direction) or in a different direction (e.g., FIGS. 46C and 47C illustrate that the first reinforcement 312*a* can rotate around the center longitudinal axis of the tube in a clockwise direction and that the second reinforcement 312*b* can rotate around the center longitudinal axis of the tube in a counterclockwise direction). FIGS. 46C and 47C illustrate that the reinforcements 312 can cross over and/or under each other, for example, in the same or different layers.

The reinforcements 312 in FIGS. 46A-47C can allow the tubes 160, 100 disclosed herein (e.g., the tubes illustrated in FIGS. 1A-44D) to radially expand but can inhibit or prevent the tubes 160, 100 from axially expanding as a device (e.g., device 329) is advanced in the lumen 104 of the tubes 160, 100. FIGS. 46A-47C illustrate the tubes 160, 100 in a non-expanded state before expansion.

FIGS. 48A and 48B illustrate cross-sectional views of the tube 160 in FIG. 46A taken along line 46Ax-46Ax when the tube 160 is in a non-expanded state (e.g., FIG. 48A) and when the tube 160 is in an expanded state such as a partially or fully radially expanded state (e.g., FIG. 48B). The tube 160 in FIG. 46A can correspond to the tube 160 in FIGS. 7A-7D with reinforcements 312 (e.g., 4 reinforcements 312) in one or more layers of the tube 160. For example, FIG. 48A can correspond to FIG. 7C with two reinforcements 312 in layer 304 and two reinforcements 312 in layer 306, and FIG. 48B can correspond to FIG. 7D with two reinforcements 312 in layer 304 and two reinforcements 312 in layer 306.

FIGS. 49A and 49B illustrate cross-sectional views of the tube 160 in FIG. 46B taken along line 46Bx-46Bx when the tube 160 is in a non-expanded state (e.g., FIG. 49A) and when the tube 160 is in an expanded state such as a partially or fully radially expanded state (e.g., FIG. 49B). The tube 160 in FIG. 46B can correspond to the tube 160 in FIGS. 7A-7D with one or more reinforcements 312 (e.g., one reinforcement 312) in one or more layers of the tube 160. For example, FIG. 49A can correspond to FIG. 7C with a reinforcement 312 in layer 304, and FIG. 49B can correspond to FIG. 7D with the reinforcement 312 in layer 304.

FIGS. 50A and 50B illustrate cross-sectional views of the tube 160 in FIG. 46C taken along line 46Cx-46Cx when the tube 160 is in a non-expanded state (e.g., FIG. 50A) and when the tube 160 is in an expanded state such as a partially or fully radially expanded state (e.g., FIG. 50B). The tube 160 in FIG. 46C can correspond to the tube 160 in FIGS. 7A-7D with reinforcements 312 (e.g., 2 reinforcements 312) in one or more layers of the tube 160. For example, FIG. 50A can correspond to FIG. 7C with one reinforcement 312 in layer 304 and one reinforcement 312 in layer 306, and FIG. 50B can correspond to FIG. 7D with one reinforcement 312 in layer 304 and one reinforcement 312 in layer 306.

FIGS. 51A and 51B illustrate cross-sectional views of the tube 100 in FIG. 47A taken along line 47Ax-47Ax when the tube 100 is in a non-expanded state (e.g., FIG. 51A) and when the tube 100 is in an expanded state such as a partially or fully radially expanded state (e.g., FIG. 51B). The tube 100 in FIG. 47A can correspond to the tube 100 in FIGS. 26A-26D with reinforcements 312 (e.g., 4 reinforcements 312) in one or more layers of the tube 100. For example, FIG. 51A can correspond to FIG. 26C with four reinforcements 312 in layer 306, and FIG. 51B can correspond to FIG. 26D with four reinforcements 312 in layer 306.

FIGS. 52A and 52B illustrate cross-sectional views of the tube 100 in FIG. 47B taken along line 47Bx-47Bx when the tube 100 is in a non-expanded state (e.g., FIG. 52A) and when the tube 100 is in an expanded state such as a partially or fully radially expanded state (e.g., FIG. 52B). The tube 100 in FIG. 47B can correspond to the tube 100 in FIGS. 26A-26D with one or more reinforcements 312 (e.g., one reinforcement 312) in one or more layers of the tube 100. For example, FIG. 52A can correspond to FIG. 26C with a reinforcement 312 in layer 304, and FIG. 52B can correspond to FIG. 26D with the reinforcement 312 in layer 304.

FIGS. 53A and 53B illustrate cross-sectional views of the tube 100 in FIG. 47C taken along line 47Cx-47Cx when the tube 100 is in a non-expanded state (e.g., FIG. 53A) and when the tube 100 is in an expanded state such as a partially or fully radially expanded state (e.g., FIG. 53B). The tube 100 in FIG. 47C can correspond to the tube 100 in FIGS. 26A-26D with reinforcements 312 (e.g., two reinforcements 312) in one or more layers of the tube 100. For example, FIG. 53A can correspond to FIG. 26C with two reinforcements 312 in layer 306 that contact each other, share a wall, or are adjacent to one another, and FIG. 53B can correspond to FIG. 26D with two reinforcements 312 in layer 306 that contact each other, share a wall, or are adjacent to one another.

Figure 54A:
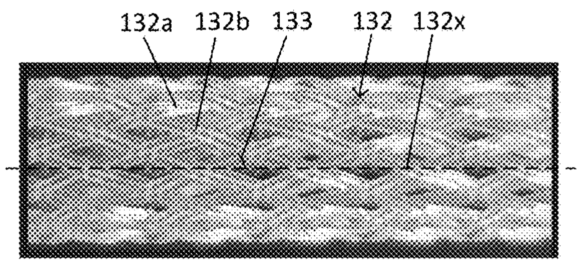
Figure 54D:
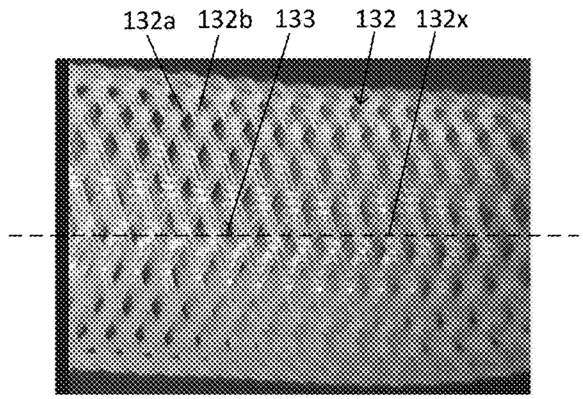
Figure 54B:
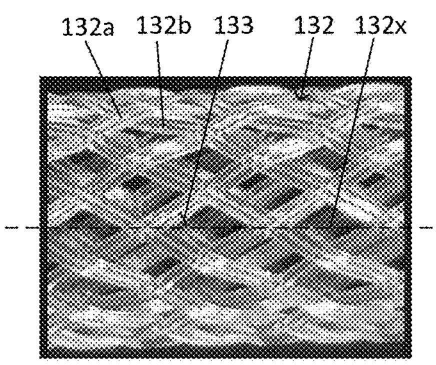
Figure 54E:
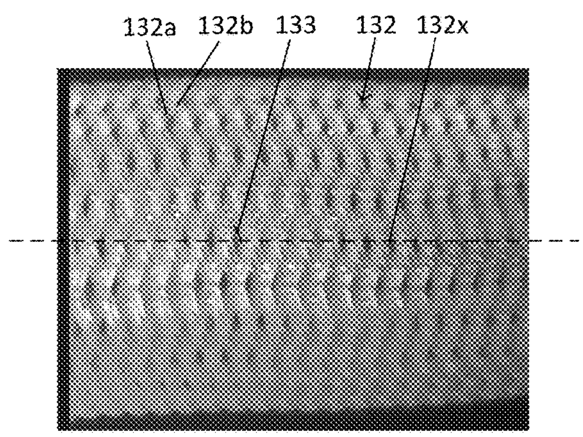
Figure 54C:
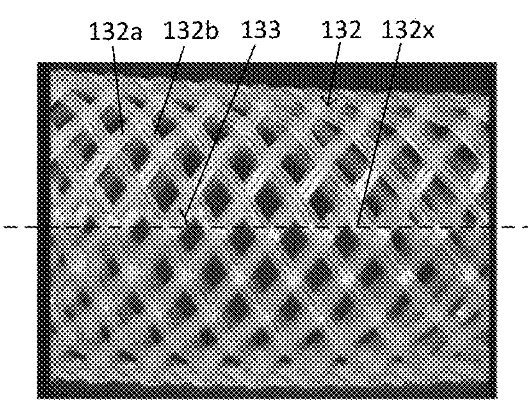
Figure 54F:
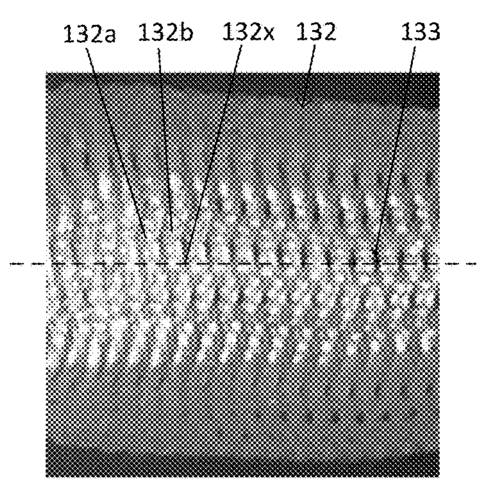

FIGS. 54A-54F illustrate that the angle 133 of the reinforcement 132 can increase as the diameter of the reinforcement 132 increases, for example, as the actuator 120 returns to a non-actuated state (e.g., FIG. 54F) from an actuated state (e.g., FIG. 54A). Similarly, FIGS. 54F-54A illustrate that the angle 133 of the reinforcement 132 can decrease as the diameter of the reinforcement 132 decreases, for example, as the actuator 120 is actuated from a non-actuated state (e.g., FIG. 54F) to an actuated state (e.g., FIG. 54A). FIGS. 54A-54F illustrate that the angle 133 can be, for example, about 19 degrees, about 29 degrees, about 54 degrees, about 65 degrees, about 86 degrees, and about 87 degrees, respectively. FIG. 54A can illustrate, for example, a minimum angle 133. FIG. 54F can illustrate, for example, a maximum angle 133. For example, FIGS. 54A-54F illustrate that as the actuator 120 returns to a non-actuated state (e.g., FIG. 54F) from an actuated state (e.g., FIG. 54A), the angle 133 can change from a minimum low angle 133 to a maximum high angle 133, and FIGS. 54F-54A illustrate that as the actuator 120 is actuated from a non-actuated state (e.g., FIG. 54F) to an actuated state (e.g., FIG. 54A), the angle 133 can change from a maximum high angle 133 to a minimum low angle 133. FIGS. 54A-54F illustrate that the reinforcement 132 can be a braid, for example, a double ended braid such as a two filar carrier braid.

FIGS. 55A1-55E1 illustrate that the angle 133 and the diameter of the reinforcement 132 can increase and the length of the reinforcement 132 can decrease, for example, as the actuator 120 returns to a non-actuated state (e.g., FIG. 55E1) from an actuated state (e.g., FIG. 55A1). Similarly, FIGS. 55E1-55A1 illustrate that the angle 133 and the diameter of the reinforcement 132 can decrease and the length of the reinforcement 132 can increase, for example, as the actuator 120 is actuated from a non-actuated state (e.g., FIG. 54F) to an actuated state (e.g., FIG. 54A). FIGS. 55A1-55E1 illustrate that the angle 133 can be, for example, about 10 degrees, about 37 degrees, about 48 degrees, about 80 degrees, and about 86 degrees, respectively. FIGS. 55A1-55E1 illustrate that the reinforcement 132 can have a first length L1, a second length L2, a third length L3, a fourth length L4, and fifth length L5, respectively. The first length L1 can be, for example, a maximum length. The fifth length L5 can be, for example, a minimum length. FIGS. 55A1-55E1 illustrate that the reinforcement 132 can have a first diameter D1, a second diameter D2, a third diameter D3, a fourth diameter D4, and fifth diameter D5, respectively. The first diameter D1 can be, for example, a minimum diameter. The fifth diameter D5 can be, for example, a maximum diameter. Diameters D1-D5 can be, for example, outer diameters of the reinforcement 132. D1 can be, for example, about 4.5 mm. D5 can be, for example, about 13.0 mm. FIGS. 55A2-55E2 illustrate cross sections of the reinforcement 132 in FIGS. 55A1-55E1, respectively, along a plane perpendicular to the longitudinal axis 132*x*. FIGS. 55A2-55E2 illustrate that a distance (e.g., a circumferential distance) between the elements 132*a* and 132*b* can increase as the diameter of the reinforcement increases (e.g., from FIG. 55A2 to FIG. 55E2), and that the distance (e.g., the circumferential distance) between the elements 132*a* and 132*b* can decrease as the diameter of the reinforcement decreases (e.g., from FIG. 55E2 to FIG. 55A2).

Figure 56A:
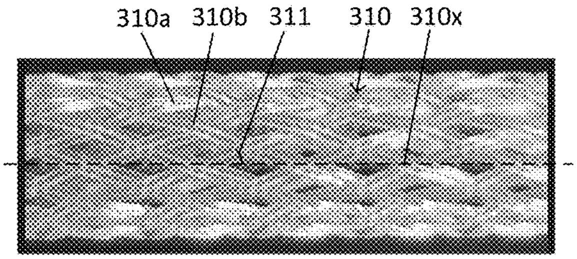
Figure 56D:
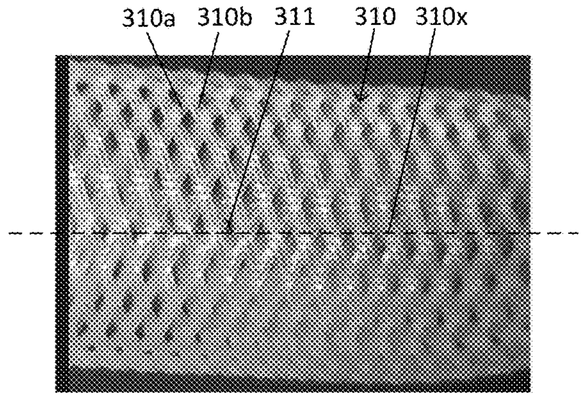
Figure 56B:
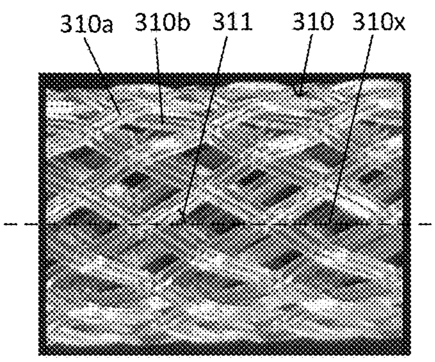
Figure 56E:
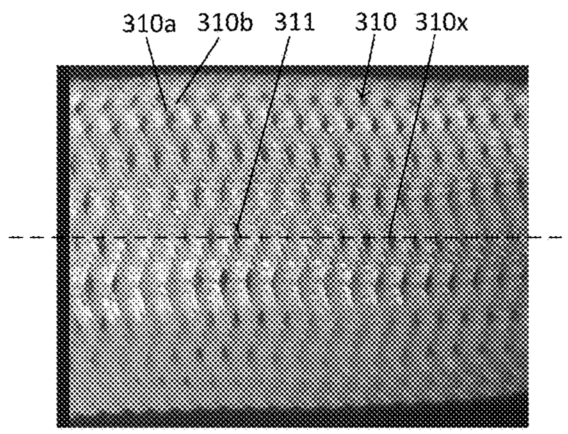
Figure 56C:
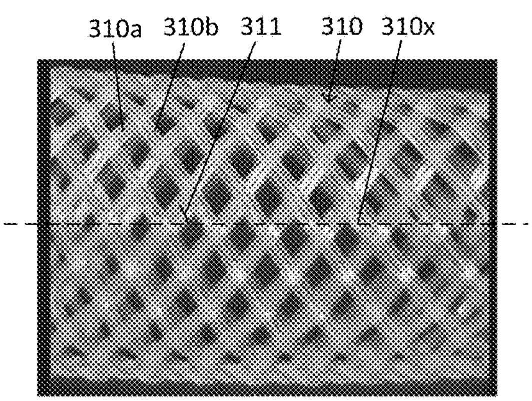
Figure 56F:
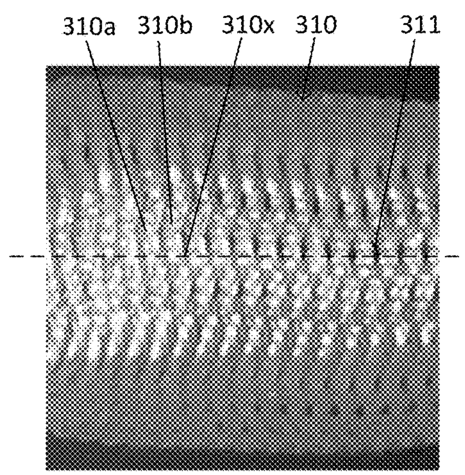

FIGS. 56A-56F illustrate that the angle 311 of the reinforcement 310 can increase as the diameter of the reinforcement 310 increases, for example, as the reinforcement 310 expands from a neutral state (e.g., FIG. 56A) to an expanded state (e.g., FIG. 56F). Similarly, FIGS. 56F-56A illustrate that the angle 311 of the reinforcement 310 can decrease as the diameter of the reinforcement 310 decreases, for example, as the reinforcement 310 returns to a neutral state (e.g., FIG. 56A) from an expanded state (e.g., FIG. 56F). FIGS. 56A-56F illustrate that the angle 311 can be, for example, about 19 degrees, about 29 degrees, about 56 degrees, about 65 degrees, about 86 degrees, and about 87 degrees, respectively. FIG. 56A can illustrate, for example, a minimum angle 311. FIG. 56F can illustrate, for example, a maximum angle 311. For example, FIGS. 56A-56F illustrate that as the reinforcement 310 expands from a neutral state (e.g., FIG. 56A) to an expanded state (e.g., FIG. 56F), the angle 311 can change from a minimum low angle 311 to a maximum high angle 311, and FIGS. 56F-56A illustrate that as the reinforcement 310 returns to a neutral state (e.g., FIG. 56A) from an expanded state (e.g., FIG. 56F), the angle 311 can change from a maximum high angle 311 to a minimum low angle 311. FIGS. 56A-56F illustrate that the reinforcement 310 can be a braid, for example, a double ended braid such as a two filar carrier braid.

FIGS. 57A1-57E1 illustrate that the angle 311 and the diameter of the reinforcement 310 can increase and the length of the reinforcement 310 can decrease, for example, as the reinforcement 310 expands from a neutral state (e.g., FIG. 56A) to an expanded state (e.g., FIG. 56F). Similarly, FIGS. 57E1-57A1 illustrate that the angle 311 and the diameter of the reinforcement 310 can decrease and the length of the reinforcement 310 can increase, for example, as the reinforcement 310 returns to a neutral state (e.g., FIG. 56A) from an expanded state (e.g., FIG. 56F). FIGS. 57A1-57E1 illustrate that the angle 311 can be, for example, about 10 degrees, about 37 degrees, about 48 degrees, about 80 degrees, and about 86 degrees, respectively. FIGS. 57A1-57E1 illustrate that the reinforcement 310 can have a first length L1, a second length L2, a third length L3, a fourth length L4, and fifth length L5, respectively. The first length L1 can be, for example, a maximum length. The fifth length L5 can be, for example, a minimum length. FIGS. 57A1-57E1 illustrate that the reinforcement 310 can have a first diameter D1, a second diameter D2, a third diameter D3, a fourth diameter D4, and fifth diameter D5, respectively. The first diameter D1 can be, for example, a minimum diameter. The fifth diameter D5 can be, for example, a maximum diameter. Diameters D1-D5 can be, for example, outer diameters of the reinforcement 310. D1 can be, for example, about 8.5 mm. D5 can be, for example, about 50.0 mm. As another example, the length of the reinforcement 310 can remain constant, for example, as the reinforcement 310 expands from a neutral state (e.g., FIG. 56A) to an expanded state (e.g., FIG. 56F) and/or as the reinforcement 310 returns to a neutral state (e.g., FIG. 56A) from an expanded state (e.g., FIG. 56F). FIGS. 57A2-57E2 illustrate cross sections of the reinforcement 310 in FIGS. 57A1-57E1, respectively, along a plane perpendicular to the longitudinal axis 310*x*. FIGS. 57A2-57E2 illustrate that a distance (e.g., a circumferential distance) between the elements 310*a* and 310*b* can increase as the diameter of the reinforcement increases (e.g., from FIG. 57A2 to FIG. 57E2), and that the distance (e.g., the circumferential distance) between the elements 310*a* and 310*b* can decrease as the diameter of the reinforcement decreases (e.g., from FIG. 57E2 to FIG. 57A2). Any of the tubes 160 disclosed herein can be used as an actuator 120. For example, FIGS. 58A and 58B illustrate, for example, that a tube 160 having a layer 302 and a layer 304 can be the actuator 120. The layer 302 can be, for example, ePTFE (e.g., axial and/or radial ePTFE), and the layer 304 can be, for example, an elastomer that can extend around a tube 100 (e.g., as shown in FIGS. 1A-3G and 26-45F). FIGS. 58A and 58B illustrate, for example, that the layer 302 can be or can comprise axial ePTFE, whereby the axial ePTFE can function as a reinforcement 132 with a high angle 133 when in a neutral state (e.g., unstretched state). For example, the axial ePTFE in layer 302 can resist radial expansion but allow axial expansion up to an axial expansion limit (e.g., the axial expansion limit for the axial ePTFE). FIGS. 58A and 58B illustrate, for example, that the axial ePTFE can allow the actuator 120 to elongate from the first length 126 to the second length 130, whereby the second length 130 can correspond to the axial expansion limit of the axial ePTFE. FIGS. 58A and 58B illustrate, for example, that the axial ePTFE can have nodes Na and fibrils Fa (also referred to as axial nodes Na and axial fibrils Fa). The fibrils Fa can connect nodes Na to each other, for example, two or more nodes Na to each other. FIG. 58A illustrates that when the actuator 120 is in a neutral state (e.g., a non-actuated state), the fibrils Fa can have slack (e.g., as represented by the curvy lines that represent the fibrils Fa), and can be randomly aligned with respect to a longitudinal axis 120*x* of the actuator 120, which can allow the axial ePTFE (e.g., the nodes and fibrils Na, Fa) to be more densely packed than when the actuator 120 is in an actuated state (e.g., the state shown in FIG. 58B). The nodes Na in FIGS. 58A and 58B are represented as dots. The longitudinal axis 120*x* can be, for example, a center longitudinal axis of the actuator 120. FIG. 58B illustrates that when the actuator 120 is in an actuated state, the fibrils Fa can be in tension (e.g., as represented by the straight lines that represent the fibrils Fa), and can be aligned along the longitudinal axis 120*x* of the actuator 120. For example, FIG. 58B illustrates that when the actuator 120 is in an actuated state, the fibrils Fa can be aligned along the longitudinal axis 120*x* of the actuator 120, whereby the fibrils Fa can have an angle of 0 degrees to 30 degrees relative to the longitudinal axis 120*x*, or more narrowly, 0 degrees to 15 degrees relative to the longitudinal axis 120*x*, or more narrowly still, 0 degrees to 10 degrees relative to the longitudinal axis 120*x*, including every 1 degree increment within these ranges (e.g., 0 degrees, 10 degrees, 15 degrees, 30 degrees, 45 degrees), where an angle of 0 degrees can indicate that the fibrils Fa are parallel to the longitudinal axis 120*x*. Although FIG. 58B represents the fibrils Fa as straight lines, these straight lines can, for example, have a curve as they curve around the lumen 104 when the actuator 120 is in a wall of a tube (e.g., tube 160, tube 100). As another example, the fibrils Fa can be straight as they extend around the lumen 104 when the actuator 120 is in a wall of a tube (e.g., tube 160, tube 100). Relatedly, FIGS. 58A and 58B illustrates that the nodes Na can be more spread out when the actuator 120 is in an actuated state (FIG. 58B) than when the actuator 120 is in a non-actuated state (e.g., FIG. 58A). The nodes Na and fibrils Fa of the axial ePTFE can be microscopic. FIGS. 58A and 58B illustrate, for example, a magnified representation of microscopic nodes Na and fibrils Fa. FIGS. 58A and 58B illustrate that the second length 130 can be 5% to 300% greater than the first length 126, or more narrowly, 5% to 200% greater than the first length 126, or more narrowly still, 5% to 100% greater than the first length 126, including every 1% increment within these ranges (e.g., 5%, 50%, 100%, 200%, 300%). For example, FIGS. 58A and 58B illustrate that the second length 130 can be 100% greater than (e.g., can be double) the second length 126. The second length 130 can be, for example, the maximum length of the actuator 120. The elastomer in layer 304 can, for example, fuse with one or multiple layers of a tube 160 and/or a tube 100. FIG. 58A illustrates that the actuator 120 can have the first length 126 when the actuator 120 has pressure P0 (e.g., a baseline pressure which can be, for example, a completely deflated pressure), and FIG. 58B illustrates that the actuator 120 can have the second length 130 when the actuator 120 has pressure P1. FIGS. 58A and 58B illustrate, for example, that the actuator 120 can have one or multiple layers, for example, 1-3 or more layers, including every one layer increment within this range (e.g., 1 layer, 2 layers, 3 layers). The actuator 120 can have, for example, layer 302, layer 304, layer 306, or any combination thereof. The layers of the actuator 120 can be any material or combination of materials disclosed herein. For example, FIGS. 58A and 58B illustrate that the layer 302 can be axial ePTFE and that layer 304 can be an elastomer (e.g., fluoroelastomer). The actuator 120 can have a hydrophilic outer coating and/or a hydrophilic inner coating. As another example, the actuator 120 may not have a hydrophilic outer coating and/or a hydrophilic inner coating. Any of the tubes 160 and/or the tubes 100 can have the actuator 120 shown in FIGS. 58A and 58B. For example, the actuator 120 in FIGS. 26A-45F can be the actuator 120 shown in FIGS. 58A and 58B. To make the actuator 120 shown in FIGS. 58A and 58B, PTFE can be stretched from a first length (e.g., from the first length 126) to a second length (e.g., to the second length 130) during sintering or the crystallization formation phase, which can cause the nodes Na and the fibrils Fa to form in an axial direction (e.g., along the longitudinal axis 120*x*) during sintering. The actuator 120 can thereby have the property of reversable length change which can reduce the force required to axially expand or lengthen the actuator 120 with a pressure, and/or which can provide the actuator 120 with an axial expansion limit. FIGS. 58A and 58B illustrate a perspective view of the actuator 120 in a linear state in which a portion of the layer 304 is shown transparent along the longitudinal length of the actuator 120 so that the nodes and fibrils Na, Fa in the actuator 120 can be more easily seen.

Figure 59A:
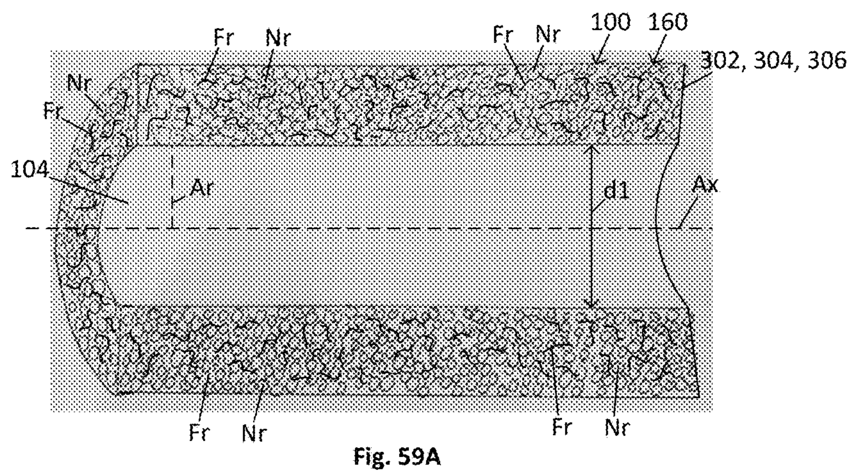
Figure 59B:
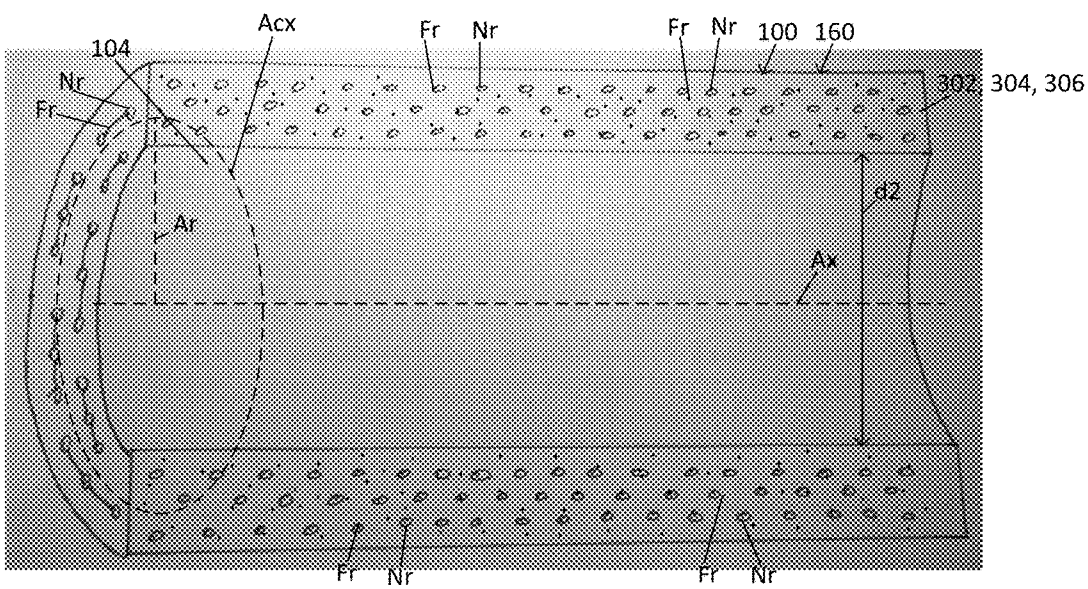

FIGS. 59A and 59B illustrate that the layer 302, the layer 304, and/or the layer 306 (as represented by "302, 304, 306" in these two figures) in any of the tubes 160 and/or tubes 100 disclosed herein can have radial ePTFE. FIGS. 59A and 59B illustrate, for example, that a layer of the tube 160, 100 can be or can comprise radial ePTFE, whereby the radial ePTFE can, for example, simulate or function as a reinforcement 310 with a low angle 311 when in a neutral state (e.g., unstretched state). For example, as discussed above, the radial ePTFE in the tube 160, 100 can resist or prevent axial expansion but allow radial expansion up to a radial expansion limit (e.g., the radial expansion limit for the radial ePTFE). FIGS. 59A and 59B illustrate, for example, that the radial ePTFE can allow the tube 160, 100 to expand from the first diameter d1 to the second diameter d2, whereby the second diameter d2 can correspond to the radial expansion limit of the radial ePTFE (e.g., the maximum diameter that the tube 160 can be expanded to). FIGS. 59A and 59B illustrate, for example, that the radial ePTFE can have nodes Nr and fibrils Fr (also referred to as radial nodes Nr and radial fibrils Fr). The fibrils Fr can connect nodes Nr to each other, for example, two or more nodes Nr to each other. FIG. 59A illustrates that when the tube 160, 100 is in a neutral state or a contracted state (e.g., a non-stretched state), the fibrils Fr can have slack (e.g., as represented by the curvy lines that indicating the fibrils Fr), and can be randomly aligned with respect to the longitudinal axis Ax, radial axes Ar, and circumferential axes Acx of the tube 160, 100 (an exemplary radial axis Ar is illustrated in FIGS. 59A and 59B), which can allow the radial ePTFE (e.g., the nodes and fibrils Nr, Fr) to be more densely packed when the tube 160, 100 is in the neutral state than when the tube 160, 100 is in an expanded state (e.g., the radially expanded state shown in FIG. 59B). The longitudinal axis Ax can be, for example, a center longitudinal axis of the tube 160, 100. The radial axes Ar can be, for example, perpendicular to the longitudinal axis Ax and extend radially outward from the longitudinal axis Ax. The circumferential axes Acx can be, for example, the axes that are traced out by the end of the radial axes Ar as the radial axes Ar are rotated about the longitudinal axis Ax. FIG. 59B illustrates that when the tube 160, 100 is in an expanded state, the fibrils Fr can be in tension (e.g., as represented by the lines in the cut at the end of the tube indicated by Fr and by the black dots in the two lengthwise cuts indicated by Fr), and can be aligned circumferentially along the circumferential axis Acx of the tube 160, 100, for example, such that when the fibrils Fr are in tension, the fibrils Fr are aligned perpendicularly to the radial axes Ar. For example, FIG. 59B illustrates that when the tube 160, 100 is in an expanded state, the fibrils Fr can be aligned along circumferential axes Acx, whereby each fibril Fr can have an angle of 0 degrees to 30 degrees relative to a circumferential axis Acx, or more narrowly, 0 degrees to 15 degrees relative to a circumferential axis Acx, or more narrowly still, 0 degrees to 10 degrees relative to a circumferential axis Acx, including every 1 degree increment within these ranges (e.g., 0 degrees, 10 degrees, 15 degrees, 30 degrees), where an angle of 0 degrees can indicate that the fibrils Fr are parallel to the circumferential axis Acx. FIG. 59B illustrates that when the lines and black dots that represent the fibrils Fr are in a fully tensioned state, the tube 160, 100 can be in a fully expanded state (e.g., a fully radially expanded state). The fibrils Fr in the two lengthwise cuts are represented as dots because the fibrils Fr are extending perpendicularly into and out of the page given that they are aligned with circumferential axes Acx along the length of the tube 160, 100. Relatedly, FIGS. 59A and 59B illustrates that the nodes Nr can be more spread out when the tube 160, 100 is in an expanded state (FIG. 59B) than when the tube 160, 100 is in a neutral state or a contracted state (e.g., FIG. 59A). The nodes Nr and fibrils Fr of the radial ePTFE can be microscopic. FIGS. 59A and 59B illustrate, for example, a magnified representation of microscopic nodes Nr and fibrils Fr. FIGS. 59A and 59B illustrate that the diameter d2 can be 5% to 300% greater than the first diameter d1, or more narrowly, 5% to 200% greater than the first diameter d1, or more narrowly still, 5% to 100% greater than the first diameter d1, including every 1% increment within these ranges (e.g., 5%, 50%, 100%, 200%, 300%). For example, FIGS. 59A and 59B illustrate that the second diameter d2 can be 100% greater than (e.g., can be double) the first diameter d1. The second diameter d2 can be, for example, the maximum diameter of the tube 160, 100. FIGS. 59A and 59B illustrate that the first diameter d1 can be an inner diameter of the tube 160, 100 (e.g., a first diameter of the lumen 104), and that the second diameter d2 can be an inner diameter of the tube 160, 100 (e.g., a second diameter of the lumen 104). Any of the tubes 160 and/or the tubes 100 can have the layer shown in FIGS. 59A and 59B. To make the layer shown in FIGS. 59A and 59B, PTFE can be stretched from a first diameter (e.g., from the first diameter d1) to a second diameter (e.g., to the second diameter d2) during sintering or the crystallization formation phase, which can cause the nodes Nr and the fibrils Fr to form in a circumferential direction (e.g., along a circumferential axis Acx and perpendicular to a radial axis Ar) during sintering. A tube 160, 100 having a layer with radial ePTFE can thereby have the property of reversable diameter change which can reduce the force required to radially expand the tube 160, 100 by advancing a device (e.g., device 329), and/or which can provide the tube 160, 100 with a radial expansion limit (e.g., a maximum diameter) without a reinforcement (e.g., reinforcement 308 or reinforcement 310) in the wall of the tube 100, 160.

Figure 59C:
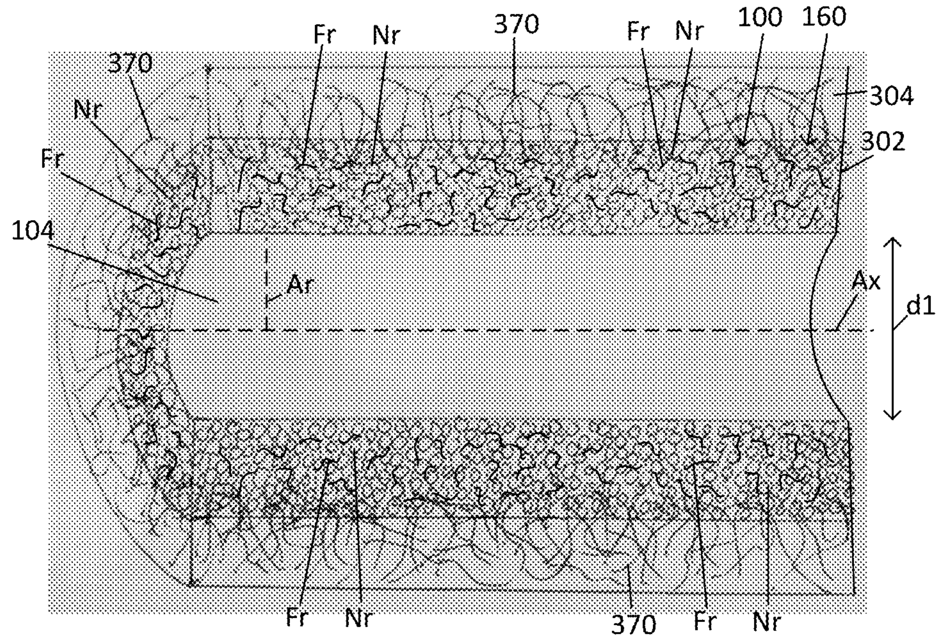

FIG. 59C illustrates the layer of FIG. 59A (e.g., layer 302, layer 304, or layer 306) with an outer elastomer layer attached, whereby the inner radial ePTFE layer is labeled as layer 302 and the outer elastomer layer is labeled as layer 304, although any two layers are appreciated, including, for example, layers 304 and 306 instead of layers 302 and 304. The lines 370 show that the material of layer 304 (e.g., an elastomer such as fluoroelastomer) has been fused to and has infiltrated into the material of layer 302 (e.g., radial ePTFE). Like FIG. 59A, FIG. 59C illustrates the tube 160, 100 in a neutral state, for example, before expansion or in a recovered resting position.

Figure 59D:
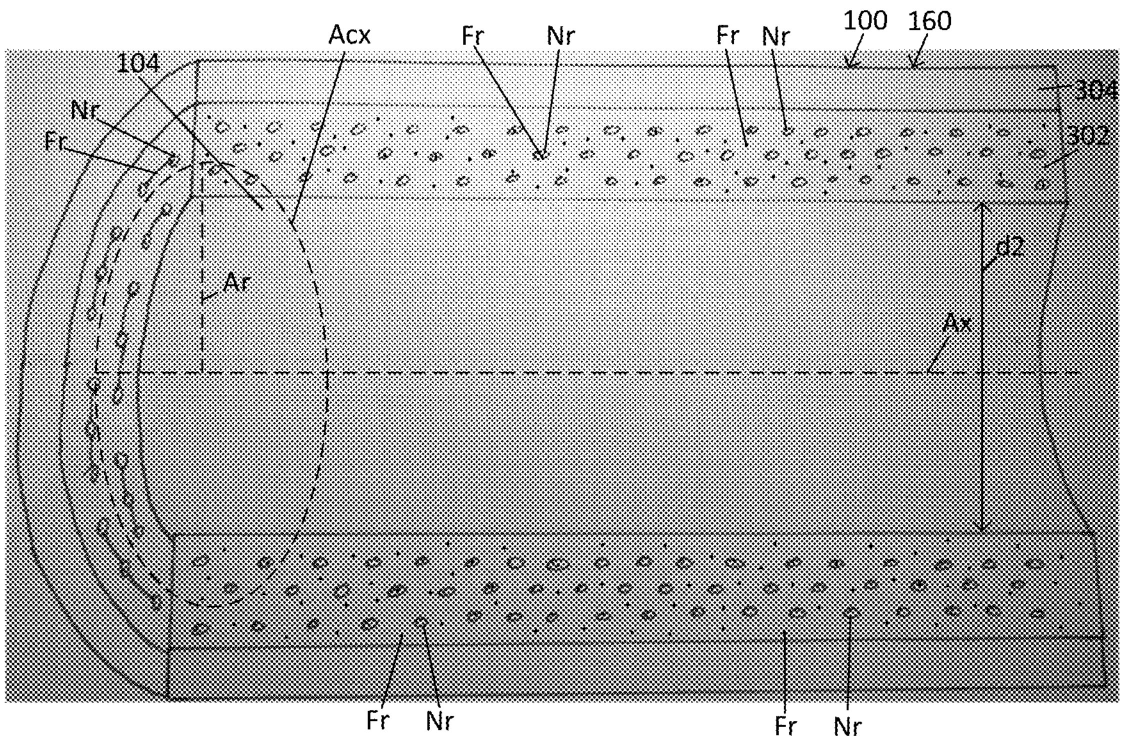

FIG. 59D illustrates the layers 302 and 304 of FIG. 59C is an expanded state (e.g., the same expanded state as shown in FIG. 59B) before the layer 304 is fused to the layer 302, for example, with a heat treatment.

FIGS. 59A-59D illustrate cutaway side views of the tube 160, 100 so that the nodes and fibrils Nr, Fr in the tube 160, 100 can be more easily seen.

FIG. 60A illustrates a variation of the reinforcement 308 in a peak-to-peak configuration. FIG. 60A illustrates that the reinforcement 308 can be, for example, a single wire wrapped helically around the lumen 104. FIG. 60A illustrates that the reinforcement 308 can be twice as thick as a braid wire to optimize the kink resistance within the wall thickness (e.g., small wall thickness) of the tube 160. For example, FIG. 60A illustrates that the reinforcement 308 can be a wire (e.g., a single wire) that can simulate a braid 307 having clockwise and counterclockwise elements 307*a*, 307*b* having an angle 307*z* with a longitudinal axis 308*x* of the reinforcement 308. The longitudinal axis 308*x* can be, for example, a center longitudinal axis of the reinforcement 308. The longitudinal axis 308*x* can be, for example, parallel to the longitudinal axis Ax of the tube 160. The longitudinal axis 308*x* can be, for example, colinear with the longitudinal axis Ax of the tube 160. The clockwise and counterclockwise elements 307*a*, 307*b* of the simulated braid 307 that the reinforcement 308 forms can be formed by, for example, the arms 344*a* of the oscillating shape 344 of the reinforcement 308. For example, FIG. 60A illustrates that each of the peaks 344*p* can be formed by where a first arm 344*al* and a second arm 344*a*2 come together (e.g., where a first arm 344*a*1 and a second arm 344*a*2 intersect or merge). FIG. 60A illustrates that the first arms 344*a*1 can be, for example, the arms 344*a* that have a left to right upward slant (e.g., similar to the slant of the first arm **344*a*1 that is labeled in FIG. 60A), and that the second arms 344*a*2 can be, for example, the arms 344*a* that have a left to right downward slant (e.g., similar to the slant of the second arm 344*a*2 that is labeled in FIG. 60A). FIG. 60A illustrates that the clockwise elements 307*a* can be formed by, or can be simulated by, multiple first arms 344*al* across multiple turns 308*t* of the reinforcement 308, and FIG. 60A illustrates that the counterclockwise elements 307*b* can be formed by, or can be simulated by, multiple second arms 344*a*2 across multiple turns 308*t* of the reinforcement 308. For example, FIG. 60A illustrates that the clockwise elements 307*a* can be simulated by a series of first arms 344*a*1 across adjacent turns 308*t* of the reinforcement 308 such that the clockwise elements 307*a* can comprises multiple first arms 344*al* arranged end to end around (e.g., helically around) the lumen 104, and FIG. 60A illustrates that the counterclockwise elements 307*b* can be simulated by a series of second arms 344*a*2 across adjacent turns 308*t* of the reinforcement 308 such that the counterclockwise elements 307*b* can comprises multiple second arms 344*a*2 arranged end to end around (e.g., helically around) the lumen 104. FIG. 60A illustrates that a torque can be transmitted along the angle 307*z* and can be transferred to the reinforcement 308 (e.g., metal) by a material (e.g., a polymer matrix) that the reinforcement 308 is attached to and/or embedded in. FIG. 60A illustrates that a torque can be transmitted along the angle 307*z* and can be transferred to the metal (e.g., of the reinforcement 308) by a material (e.g., a polymer matrix) that the reinforcement 308 is attached to and/or embedded in. FIG. 60A illustrates that the arms 344*a* (e.g., the first and second arms 344*a*1, 344*a*2) can form an angle 308*z* with the longitudinal axis 308*x* of the reinforcement 308. FIG. 60A illustrates, for example, that a force (e.g., a compressive force) and/or a torque can be transmitted across adjacent turns 308*t* by being transmitted along the first arms 344*a*1, along the second arms 344*a*2, across the material that the reinforcement 308 is attached to and/or embedded within, or any combination thereof. FIG. 60A illustrates, for example, that a force and/or a torque can be transmitted across adjacent turns 308*t* by being transmitted along the first arms 344*a*1, along the second arms 344*a*2, across the material comprising the layer (e.g., layer 302, layer 304, or layer 306) that the reinforcement 308 is attached to and/or embedded within, or any combination thereof. For example, FIG. 60A illustrates that a force can be transmitted from the first arms 344*al* of the first turn 308*t*1 to the adjacent second arms 344*a*2 of the second turn 308*t* across the force transfer points 350 and vice versa (e.g., from the second arms 344*a*2 to the first arms 344*a*1). For example, FIG. 60A illustrates that a torque can be transmitted from the first arms 344*a*1 of the first turn 308*t*1 to the adjacent second arms 344*a*2 of the second turn 308*t* across the force transfer points 350 and vice versa (e.g., from the second arms 344*a*2 to the first arms 344*a*1). For example, FIG. 60A illustrates that force can be transmitted from the first arms 344*a*1, across the material in the valleys 344*v*, and to the second arms 344*a*2 of the second turn 308*t* opposite the first arms 344*a*1 of the first turn 308*t*1 and vice versa. FIG. 60A illustrates, for example, that torques from the torsional loads 354*a* and 354*b* and/or forces from axial loads 356*a* and 356*b* can be transferred across the points 350 such that the points 350 can be force transfer points and/or torque transfer points. In other words, force and/or torque can be transferred across the turns 308*t* of the reinforcement 308, for example, at the points 350. The force can be, for example, a compressive axial force directed from the left to the right in FIG. 60A that is generated from someone pushing the tube 160** (e.g., from the left to the right) into an access site such as a blood vessel.

FIG. 60A illustrates that the peaks **344*p* can contact each other and/or be in proximity to each other when a gap 308*g* between two peaks 344*p* (e.g., two adjacent peaks 344*p*) has a distance of 0.0 mm to 1.5 mm, or more narrowly, 0.0 mm to 0.5 mm, including every 0.1 mm increment within these ranges (e.g., (0.0 mm, 0.1 mm, 0.2 mm, 0.5 mm, 1.0 mm, 1.5 mm). A distance of 0.0 mm between two adjacent peaks can indicate that the adjacent peaks 344*p* are in contact with each other. A distance of 0.0 mm between two adjacent peaks can indicate that the adjacent peaks 344*p* are in direct contact with each other. A distance of 0.1 mm to 1.5 mm, or more narrowly, 0.1 mm to 0.5 mm, can indicate that a material (e.g., the material of layer 302, layer 304, or layer 306) is between the two adjacent peaks but that the two adjacent peaks are close enough together to be considered in contact with each other or are close enough together such that a force and/or a torque is transferrable across the point 350. The points 350 can be, for example, force transfer points and/or torque transfer points. FIG. 60A illustrate that in a peak-to-peak arrangement, some of the adjacent peaks 344*p* can contact each other at points 350 (e.g., where the gap 308*g* has distance of 0.0 mm) and that some of the peaks 350 may not contact each other at points 350 (where the gap 308*g* has a distance of 0.1 mm to 1.5 mm, or more narrowly, 0.1 mm to 0.5 mm). FIG. 60A illustrates that the length of the gap 308*g* can be measured, for example, along an axis parallel to the longitudinal axis 308*x* of the reinforcement 308**.

FIG. 60A illustrates that the angle **307*z* can equal the angle 308*z* if the arm length 344*a*L of the first arms 344*a*1 is equal to the arm length 344*a*L of the second arms 344*a*2. As another example, the angle 307*z* may not be equal to the angle 308*z* if the arm length 344*a*L of the first arms 344*a*1 is not equal to the arm length 344*a*L of the second arms 344*a*2. The range of the angle 307*z* and/or the range of the angle 308*z* can be equal to any range of the angle 311. The value of the angle 307*z* and/or the value of the angle 308*z* can be equal to any value of the angle 311. FIG. 60A illustrates, for example, that the braid 307 that the reinforcement 308 can simulate can be the reinforcement 310 (e.g., when the reinforcement 310 comprises a braid). In such cases, for example, the angle 307*z* can be equal to the angle 311, and the clockwise and counterclockwise elements 307*a*, 307*b* can correspond to the clockwise and counterclockwise elements 310*a*, 310*b***.

FIG. 60A illustrates the tube 160 and the reinforcement 308 in neutral state or a contracted state in which the lumen 104 has a first diameter (e.g., diameter d1).

FIG. 60B illustrates the tube 160 and the reinforcement 308 of FIG. 60A in an expanded state (e.g., a radially expanded state) in which the lumen 104 has a second diameter (e.g., diameter d2).

FIGS. 60A and 60B illustrate that the simulated braid 307 can transmit torque along the tube 160, and that the reinforcement 308 can inhibit or prevent the tube 160 from kinking.

FIGS. 60A and 60B illustrate that the simulated braid 307 can transmit an axial force (e.g., a compressive axial force) along the length of the tube 160.

FIGS. 60A and 60B illustrate that the tube 160 can have the same length in the neutral state and in the expanded state.

FIGS. 60A and 60B illustrate that the tube 160 can have the arrangement of features shown, including the relative positions between these features, when the tube 160 is in the non-expanded state (e.g., neutral state) and expanded state, respectively.

Any layer (e.g., layer 302, 304, or 306) can have the reinforcement 308 and arrangement of features illustrated in FIGS. 60A and 60B.

Any tube 160 and/or 100 disclosed and/or illustrated herein can have the arrangement of features shown in FIGS. 60A and 60B. For example, any of the tubes 160 and/or tubes 100 that have a peak-to-peak arrangement for the reinforcement 308 can have the features and properties of the peak-to-peak arrangement illustrated and described with respect to FIGS. 60A and 60B.

FIGS. 60A and 60B illustrate, for example, a single wire with an angle 307z. FIGS. 60A and 60B illustrate that the reinforcement 308 can simulate a braid 307 having the angle 307z, whereby the angle 307z can be the simulated braid angle. FIGS. 60A and 60B illustrate, for example, a simulated braid 307 with a braid angle 307z but with a wire that is twice as thick as a braid wire to optimize the kink resistance within the smallest wall thickness. The torque can be transmitted along the angle 307z and can be transferred to the metal of the wire by the material (e.g., polymer matrix) of the layer that the reinforcement 308 is in.

FIGS. 60A and 60B illustrate that when the reinforcement 308 has a peak-to-peak configuration (also referred to as a crown-to-crown arrangement), the reinforcement 308 can provide column strength to the tube 160 which can, for example, allow the tube 160 to be pushed without the tube 160 kinking or buckling. FIGS. 60A and 60B illustrate that when the reinforcement 308 has a peak-to-peak configuration, the tube 160 can act as a rigid rod, for example, because force and/or torque can be transferred across the points 350. FIGS. 60A and 60B illustrate, for example, that the points 350 can function as the nodes of a braid (e.g., the braid 307 and/or the braid 310), whereby the nodes of a braid can be, for example, where a clockwise element crosses over a counterclockwise element.

FIGS. 60A and 60B illustrate that the nested configurations of the reinforcement 308 disclosed herein can likewise simulate or otherwise function as a braid like the reinforcement 308 in FIGS. 60A and 60B, for example, when adjacent turns 308t of the nested configuration are in contact with each other and/or where the gap 308g between adjacent turns 308t is 0.0 mm to 1.5 mm, or more narrowly, 0.0 mm to 0.5 mm, including every 0.1 mm increment within these ranges (e.g., (0.0 mm, 0.1 mm, 0.2 mm, 0.5 mm, 1.0 mm, 1.5 mm).

FIG. 60C illustrates that the reinforcement 308 in a crown-to-crown configuration can be in (e.g., embedded in) a material of the tube 160. FIG. 60C illustrates that the material that the reinforcement 308 is in can be a rigid material such as a rigid polymer matrix (e.g., Nylon, polyurethane, PBAX, PEEK, polyethylene, or any combination thereof). FIG. 60C illustrates that the reinforcement 308 in a crown-to-crown configuration can be in (e.g., embedded in) a layer (e.g., layer 302, layer 304, and/or layer 306) of the tube 160. FIG. 60C illustrates that the layer that the reinforcement 308 is in can comprise a rigid material such as rigid polymer matrix (e.g., Nylon, polyurethane, PBAX, PEEK, polyethylene, or any combination thereof). The benefit of positioning the reinforcement 308 in a rigid material is that the rigid material can prevent the tube 160 from axially and radially expanding, while the reinforcement 308 can provide the tube 160 with torque and/or force transmission like a braid. FIG. 60C illustrates, for example, that the tube 160 can be a non-expandable tube such as a guide catheter. FIG. 60C illustrates that the reinforcement 308 can simulate a braid (e.g., the braid 307 or 310) when the tube 160 is a non-expandable tube 160.

FIG. 60D illustrates that the reinforcement 308 in a nested configuration can be in (e.g., embedded in) a material of the tube 160. FIG. 60D illustrates that the material that the reinforcement 308 is in can be a rigid material such as a rigid polymer matrix (e.g., Nylon, polyurethane, PBAX, PEEK, polyethylene, or any combination thereof). FIG. 60D illustrates that the reinforcement 308 in a nested configuration can be in (e.g., embedded in) a layer (e.g., layer 302, layer 304, and/or layer 306) of the tube 160. FIG. 60D illustrates that the layer that the reinforcement 308 is in can comprise a rigid material such as rigid polymer matrix (e.g., Nylon, polyurethane, PBAX, PEEK, polyethylene, or any combination thereof). The benefit of positioning the reinforcement 308 in a rigid material is that the rigid material can prevent the tube 160 from axially and radially expanding, while the reinforcement 308 can provide the tube 160 with torque and/or force transmission like a braid. FIG. 60D illustrates, for example, that the tube 160 can be a non-expandable tube such as a guide catheter. FIG. 60D illustrates that the reinforcement 308 can simulate a braid (e.g., the braid 307 or 310) when the tube 160 is a non-expandable tube 160.

FIG. 60D illustrates that the nested configurations of the reinforcement 308 disclosed herein can simulate or otherwise function as a braid like the reinforcement 308 in FIGS. 60A-60C, for example, when adjacent turns 308t of the nested configuration are in contact with each other and/or where the gap 308g between adjacent turns 308t is 0.0 mm to 1.5 mm, or more narrowly, 0.0 mm to 0.5 mm, including every 0.1 mm increment within these ranges (e.g., (0.0 mm, 0.1 mm, 0.2 mm, 0.5 mm, 1.0 mm, 1.5 mm). FIG. 60D illustrates that for nested configurations, the gap 308g can be constant between adjacent turns 308t. FIG. 60D illustrates that the length of the gap 308g can be measured, for example, along an axis perpendicular to an arm 344a of the reinforcement 308. FIG. 60D illustrates that for nested configurations, the point 350 can be a region 350 having a constant width (e.g., the length of the gap 308g). Such properties of a nest configuration can provide the tube 160 more rigidity and/or more column strength, for example, compared tubes 160 having a peak-to-peak configuration.

FIGS. 60A-60D illustrate that the reinforcement 308 (e.g., the zigzag wire) can provide the tube 160 with kink resistance.

FIG. 61 illustrates that the tube 160 can be a kink resistant torque catheter with a reinforcement 308 comprising a zigzag wire. FIG. 61D illustrates that the tube 160 can have a touhy borst valve 380 for hemostasis, a stopcock 382 for a flush line, a tapered inner diameter tip 384, a tapered inner diameter radiopaque marker 386 at a distal tip, or any combination thereof.

FIG. 62 illustrates that when the tube 160 and/or the tube 100 is in a fully expanded state (e.g., a fully radially expanded state), the reinforcement 308 can have a straight shape that extends around (e.g., helically around) the lumen 104. FIG. 62 illustrates that when the tube 160 and/or the tube 100 is in a fully radially expanded state, the reinforcement 308 may not have a zigzag pattern. FIG. 62 illustrates that as the tube 160 and/or the tube 100 is expanded to the fully radially expanded state, the undulations (e.g., the arms 344a) in the reinforcement 308 can straighten. When the reinforcement 308 does not have any zigzag pattern left, for example, when the reinforcement 308 has a straight coil shape, the reinforcement 308 can prevent the tube 160 from radially expanding any further. The reinforcement 308 can thereby limit the radial expansion of the tube 160. FIG. 62 illustrates, for example, that the diameter d2 can be a maximum diameter. FIG. 62 illustrates, for example, that when the diameter d2 is a maximum diameter, the reinforcement 308 can be straight (e.g., without a zigzag shape). The reinforcements 308 shown in all the other figures can be expanded in the same way as shown in FIG. 62 such that the undulations in the reinforcement 308 straighten, whereby the reinforcement 308 can limit the radial expansion of the tube (e.g., the tubes 160, the tubes 100).

The tube 160 can be a tube body. The tube 160 can be an outer tube body. The tube 160 can be for example, an outer tube body 102 (also referred to as a tube body 102).

The tube 100 can be a tube body. The tube 100 can be an outer tube body. The tube 100 can be for example, an outer tube body 102 (also referred to as a tube body 102).

As another example, any of the actuators 120 disclosed herein can have one or multiple reinforcements 312, for example, in the arrangement shown for the tubes 160 and 100 in FIGS. 46A-62.

The thickness 302$T_1$ shown in the figures can be the thickness of layer 302 when the tube is in a non-expanded configuration. The thickness 302$T_2$ shown in the figures can be the thickness of layer 302 when the tube is in an expanded configuration (e.g., a partially expanded configuration or a fully expanded configuration), such as a radially expanded configuration.

The thickness 304$T_1$ shown in the figures can be the thickness of layer 304 when the tube is in a non-expanded configuration. The thickness 304$T_2$ shown in the figures can be the thickness of layer 304 when the tube is in an expanded configuration (e.g., a partially expanded configuration or a fully expanded configuration), such as a radially expanded configuration.

The thickness 306$T_1$ shown in the figures can be the thickness of layer 306 when the tube is in a non-expanded configuration. The thickness 306$T_2$ shown in the figures can be the thickness of layer 306 when the tube is in an expanded configuration (e.g., a partially expanded configuration or a fully expanded configuration), such as a radially expanded configuration.

The first thickness T1 can be, for example, the combination of thickness 302$T_1$, thickness 304$T_1$, and thickness 306$T_1$.

The second thickness T2 can be, for example, the combination of thickness 302$T_2$, thickness 304$T_2$, and thickness 306$T_2$.

Any of the layers in FIGS. 7A-53B (e.g., layer 302, layer 304, and/or layer 306) can be the tube 102 (also referred to as various other terms followed by the reference numeral 102, including, for example, the tube body 102, the outer tube body 102, the expandable tube 102) having the actuator 120, whereby the tube 102 can be made from, for example, PTFE, axial ePTFE, radial ePTFE, a fluoroelastomer, a combination thereof, or any other material disclosed herein. For example, layer 302, layer 304, or layer 306 can comprise the tube 102 having the actuator 120 in FIGS. 1A-1D, the tube 102 having the actuator 120 in FIGS. 2A-2D, or the tube 102 having the actuator 120 in FIGS. 3A-3G. The tube 102 in FIGS. 1A-1D can be, for example, layer 302, layer 304, or layer 306. The tube 102 in FIGS. 2A-2D can be, for example, layer 302, layer 304, or layer 306. The tube 102 in FIGS. 3A-3G can be, for example, layer 302, layer 304, or layer 306. The reinforcement 308, the reinforcement 310, and/or the reinforcement 312 can be added to the tube 102. The tube 102 can have the reinforcement 308, the reinforcement 310, and/or the reinforcement 312. For example, the reinforcement 308 can be added to the tube 102 in FIGS. 1A-3G such that the reinforcement 308 is in (e.g., embedded in) the tube 102 and radially closer to the lumen 104 or radially farther from the lumen 104 than the actuator 120. As another example, the reinforcement 310 can be added to the tube 102 in FIGS. 1A-3G such that the reinforcement 310 is embedded in the tube 102 and radially closer to the lumen 104 or radially farther from the lumen 104 than the actuator 120. As another example, any of the layers in FIGS. 7A-44D (e.g., layer 302, layer 304, and/or layer 306) can be the tube 160 in FIGS. 4A and 4B or in FIGS. 4A-4D. The actuator 120 and/or the reinforcement 310 can be added to the tube 160 in FIGS. 4A and 4B or in FIGS. 4A-4D.

The distal tip of the tubes 100 and 160 (e.g., in FIGS. 1A-4D, 6A-44D, and 46A-62) can have an atraumatic tip. The distal tip of the tubes 100 and 160 (e.g., FIGS. 1A-4D, 6A-44D, and 46A-62) can have the distal tips shown in the figures. As another example, any of the tubes in FIGS. 1A-4D, 6A-44D, and 46A-62 can comprise the tip of the tube 180 (also referred to as the tip of the catheter 180) in FIGS. 5A-5D. In any of the variations, the tube 160 can have an expandable tip configuration (e.g., the configuration shown in FIGS. 5A-5D). In any of the variations, the tube 100 can have an expandable tip configuration (e.g., the configuration shown in FIGS. 5A-5D).

The tube 160 can be, for example, a catheter. The tube 160 can be insertable in a blood vessel, an organ, the digestive tract (e.g., the mouth, esophagus, stomach, small intestine, and/or large intestine), or any combination thereof. The tube 160 can expand and contract when in a blood vessel, an organ, and/or the digestive tract (e.g., the mouth, esophagus, stomach, small intestine, and/or large intestine), for example, by advancing and withdrawing a device in the lumen 104.

The tube 100 can be, for example, a catheter. The tube 100 can be insertable in a blood vessel, an organ, the digestive tract (e.g., the mouth, esophagus, stomach, small intestine, and/or large intestine), or any combination thereof. The tube 100 can expand and contract when in a blood vessel, an organ, and/or the digestive tract (e.g., the mouth, esophagus, stomach, small intestine, and/or large intestine), for example, by activating and deactivating the actuator 120 (e.g., by expanding and contracting the actuator 120 by inflating and deflating the actuator 120), by advancing and withdrawing a device in the lumen 104, or by both activating and deactivating the actuator 120 and by advancing and withdrawing a device in the lumen 104.

The features disclosed herein can be combined with each other in any manner. For example, any feature described with respect to any figure herein can be combined with any feature of any of the other figures herein. For example, one or more features described with respect to any figure herein can be combined with one or more features of one or more other figures herein. As one example, the tube 100 can include the passive tube 160 shown in FIGS. 7A-7D and the actuator 120 shown in FIGS. 1A-1D. As another example, the tube 100 can include the passive tube 160 shown in FIGS. 7A-7D and the actuator 120 shown in FIGS. 2A-2D. As another example, the tube 100 can include the passive tube 160 shown in FIGS. 7A-7D and the actuator 120 shown in FIGS. 3A-3D. As another example, the tube 100 can include the passive tube 160 shown in FIGS. 7A-7D and the actuator 120 shown in FIGS. 45A-45F. In other words, the tubes 100 and 160 in FIGS. 6A-44D and 46A-62 can have the actuator shown 120 shown in shown in FIGS. 1A-1D, can have the actuator 120 shown in FIGS. 2A-2D, can have the actuator 120 shown in FIGS. 3A-3D, or can have the actuator 120 shown in FIGS. 53A-53F. Relatedly, and as yet another example, one or more features from any of the figures or any of the variations disclosed can be omitted. For example, the reinforcement 308 can be omitted from any of the figures having the reinforcement 308 in FIGS. 6A-44D, for example, if the reinforcement 308 is not necessary and/or if a layer of ePTFE (e.g., radial ePTFE) of a tube 100 or 160 makes the reinforcement 308 not necessary or otherwise redundant. As another example, the reinforcement 310 can be omitted from any of the figures having the reinforcement 310 in FIGS. 6A-44D, for example, if the reinforcement 310 is not necessary and/or if a layer of ePTFE (e.g., axial ePTFE) of a tube 100 or 160 makes the reinforcement 310 not necessary or otherwise redundant. As these examples show, any of the tubes disclosed herein can have any of the features disclosed herein, in any combination. For example, the tubes 100 (e.g., active tubes and/or passive tubes) and the tubes 160 (e.g., passive tubes) can have any combination of features disclosed herein, including, for example, any combination of the features described in the specification and/or any combination of the features illustrated in the drawings. The features disclosed herein can be, for example, arranged in any combination to create active tubes 100 and/or passive tubes 160 that can expand and contract, for example, as shown in the figures.

The systems, methods, and/or devices can have any combination of features, for example, in FIGS. 1A-62.

The tubes 160 and 100 can have any combination of features in FIGS. 1A-62.

The figures illustrate, for example, an expandable tubing having a tube body (e.g., tube 160, tube 100, layer 302, layer 304, layer 306). The expandable tubing can have a reinforcement (e.g., reinforcement 308 and/or reinforcement 310) positioned on and/or within a wall of the tube body. The reinforcement and the tube body can be expandable from a neutral state to an expanded state. The reinforcement can be configured to inhibit or prevent the tube body from kinking. The reinforcement can be configured to transmit an axial force along a length of the tube body. The reinforcement can be configured to transmit a torque along the tube body. The reinforcement can have an undulating pattern. The reinforcement can be a coil having a zigzag pattern. The reinforcement can be a zigzag wire that extends helically around a lumen of the tube body multiple turns. The tube body and the reinforcement can be bendable into a curve having a radius of 8.0 mm to 15.0 mm without kinking. The tube body and the reinforcement can be bendable into a curve having a radius of 12.7 mm or less without kinking.

The figures illustrate, for example, an expandable tubing having a tube body (e.g., tube 160, tube 100, layer 302, layer 304, layer 306). The expandable tubing can have a reinforcement (e.g., reinforcement 308 and/or reinforcement 310) positioned on and/or within a wall of the tube body. The reinforcement and the tube body can be expandable from a neutral state to an expanded state. The reinforcement can be configured to transmit a compressive force along a length of the tube body and/or can be configured to transmit a torque along the tube body. The reinforcement can have an undulating pattern. The reinforcement can have a zigzag wire that extends helically around a lumen of the tube body multiple turns. The reinforcement can have an undulating pattern configured to transmit a torque along the tube body. The reinforcement can have a peak-to-peak configuration configured to provide the tube body with column strength such that an axial force can be transmittable along the length of the tube body. The reinforcement can have a nested configuration configured to provide the tube body with column strength such that an axial force can be transmittable along the length of the tube body. A ratio of a wall thickness of the tube body to a diameter of a lumen of the tube body can be 0.05 to 0.10. The tube body and the reinforcement can be bendable into a curve having a radius of 12.7 mm or less without kinking.

The figures illustrate, for example, an expandable tubing having a tube body (e.g., tube 160, tube 100, layer 302, layer 304, layer 306). The tube body can be radially expandable from a neutral state to an expanded state such that a diameter of the tube body can be larger when the tube body is in the expanded state than when the tube body is in the neutral state. Axial expansion of the tube body can be inhibited or prevented. The tube body can be the same length when the tube body is in the neutral state and when the tube body is in the expanded state. The tube body can have a wall having a wall thickness. The wall thickness can be the same when the tube body is in the neutral state and when the tube body is in the expanded state. The wall thickness can be greater or smaller when the tube body is in the neutral state than when the tube body is in the expanded state. The axial expansion of the tube body can be inhibited or prevented via a braid or a spiral wrap. The tube body can comprise radial ePTFE. The axial expansion of the tube body can be inhibited or prevented via the radial ePTFE. The radial ePTFE can have nodes and fibrils, where more slack can be in the fibrils when the tube body is in the neutral state than when the tube body is in the expanded state. The fibrils can be in tension when the tube body is in the expanded state. The fibrils can extend circumferentially around the tube body when the tube body is in the expanded state.

The figures illustrate, for example, an expandable tubing having a tube body (e.g., tube 160, tube 100, layer 302, layer 304, layer 306). The tube body can comprise radial ePTFE having nodes and fibrils. The radial ePTFE can be configured to allow radial expansion but prevent axial expansion of the tube body, where more tension can be in the fibrils when the tube body is in an expanded state than when the tube body is in a neutral state. The nodes can be denser when the tube body is in the neutral state than when the tube body is in the expanded state. The fibrils can be more aligned when the tube body is in the expanded state than when the tube body is in the neutral state. The expandable tubing can have a zigzag wire and/or a braid. The zigzag wire can be configured to transmit a compressive axial force along a length of the tube body and/or can be configured to transmit a torque along the tube body. The braid can be configured to transmit the torque along the tube body.

The figures illustrate, for example, an actively expandable tubing. The actively expandable tubing can have a tube body (e.g., tube 160, tube 100, layer 302, layer 304, layer 306). The actively expandable tubing can have an actuator positioned on and/or within a wall of the tube body. The actuator can be configured to axially expand to radially expand the tube body. Axial expansion of the tube body can be inhibited or prevented. The tube body can have the same length when the tube body is in a neutral state and when the tube body is in an expanded state. The tube body can have a wall having a wall thickness. The wall thickness can be the same when the tube body is in a neutral state and when the tube body is in an expanded state. The wall thickness can be greater or smaller when the tube body is in a neutral state than when the tube body is in an expanded state. The axial expansion of the tube body can be inhibited or prevented via a braid or a spiral wrap. The tube body can comprise radial ePTFE. The axial expansion of the tube body can be inhibited or prevented via the radial ePTFE. The radial ePTFE can have nodes and fibrils, where more slack can be in the fibrils when the tube body is in a neutral state than when the tube body is in an expanded state. The fibrils can be in tension when the tube body is in the expanded state. The fibrils can extend circumferentially around (e.g., partially circumferentially around) the tube body when the tube body is in an expanded state.

The figures illustrate, for example, an actively expandable tubing. The actively expandable tubing can have a tube body (e.g., tube 160, tube 100, layer 302, layer 304, layer 306) comprising radial ePTFE. The actively expandable tubing can have an actuator comprising axial ePTFE. The radial ePTFE can be configured to allow radial expansion but prevent axial expansion of the tube body. The axial ePTFE can be configured to allow axial expansion but prevent radial expansion of the actuator. The actuator can be configured to axially expand to radially expand the tube body from a neutral state to an expanded state. When the tube body is in the neutral configuration, the radial ePTFE can be configured to allow radial expansion but prevent axial expansion of the tube body, and where when the tube body is in the neutral configuration, the axial ePTFE can be configured to allow axial expansion but prevent radial expansion of the actuator. The radial ePTFE can have nodes and fibrils, where more tension can be in the fibrils when the tube body is in an expanded state than when the tube body is in a neutral state. The axial ePTFE can have nodes and fibrils, where more tension can be in the fibrils of the axial ePTFE when the actuator is in an actuated state than when the actuator is in a non-actuated state. The tube body can have a zigzag wire and/or a braid. The zigzag wire can be configured to transmit a compressive axial force along a length of the tube body and/or can be configured to transmit a torque along the tube body. The braid can be configured to transmit the torque along the tube body. The actuator can have a braid. The braid can be configured to transmit the torque along the tube body.

The figures illustrate, for example, a non-expandable tubing having a tube body (e.g., tube 160, tube 100, layer 302, layer 304, layer 306) having a reinforcement (e.g., reinforcement 308 and/or reinforcement 310) wrapped helically around a lumen of the tube body. Kinking of the tube body can be preventable via the reinforcement. The reinforcement can be configured to transmit a compressive force along a length of the tube body and/or can be configured to transmit a torque along the tube body. The reinforcement can be a zigzag wire. The reinforcement can be an undulating pattern configured to transmit a torque along the tube body. The reinforcement can have a peak-to-peak configuration configured to provide the tube body with column strength such that an axial force can be transmittable along a length of the tube body. The reinforcement can have a nested configuration configured to provide the tube body with column strength such that an axial force can be transmittable along a length of the tube body. A ratio of a wall thickness of the tube body to a diameter of the lumen of the tube body can be 0.05 to 0.10. The tube body and the reinforcement can be bendable into a curve having a radius of 12.7 mm or less without kinking.

The figures illustrate, for example, a tube having a tube body (e.g., tube 160, tube 100, layer 302, layer 304, layer 306) having a lumen (e.g., lumen 104), a first reinforcement in and/or on a wall of the tube body, an actuator, and a second reinforcement in and/or on a wall of the actuator. The first reinforcement can be configured to limit or prevent axial expansion of the tube body. The second reinforcement can be configured to limit or prevent radial expansion of the actuator. The first reinforcement can have first clockwise and counterclockwise elements. When the tube is in a neutral state, an angle between the first clockwise and counterclockwise elements and a longitudinal axis of the first reinforcement can be a low angle. The low angle can be an angle of 5 degrees to 45 degrees. When the tube is in a neutral state, an angle between the first clockwise and counterclockwise elements and a longitudinal axis of the first reinforcement can be a minimum low angle. The minimum low angle can be an angle of 5 degrees to 15 degrees. The second reinforcement can have second clockwise and counterclockwise elements. When the tube is in a neutral state, an angle between the second clockwise and counterclockwise elements and a longitudinal axis of the second reinforcement can be a high angle. The high angle can be an angle of 46 degrees to 85 degrees. When the tube is in a neutral state, an angle between second clockwise and counterclockwise elements and a longitudinal axis of the first reinforcement can be a maximum high angle. The maximum high angle can be an angle of 75 degrees to 85 degrees. The actuator can extend around the lumen. The actuator and the second reinforcement extend helically around the lumen. The actuator can have layers. The second reinforcement can have a second reinforcement lumen. The second reinforcement lumen can extend helically around the lumen. The first reinforcement can extend around the lumen. The second reinforcement can extend around the lumen and the first reinforcement. The tube can have a third reinforcement. The third reinforcement can be a coil having an undulating pattern. The third reinforcement can be a coil having zigzag shape. The third reinforcement can be a zigzag wire wrapped helically around the lumen. The first reinforcement can be configured to transmit a torque along the tube body. the reinforcement is configured to inhibit or prevent the tube body from kinking, where the reinforcement is configured to transmit an axial force along a length of the tube body, and/or where the reinforcement is configured to transmit a torque along the tube body. The third reinforcement can be configured to inhibit or prevent the tube body from kinking, can be configured to transmit an axial force along a length of the tube body, and/or can be configured to transmit a torque along the tube body. The third reinforcement can be a zigzag wire wrapped around (e.g., helically around) the lumen.

The figures illustrate, for example, a tube having a tube body (e.g., tube 160, tube 100, layer 302, layer 304, layer 306) having a lumen (e.g., lumen 104) and a reinforcement (e.g., reinforcement 308 and/or reinforcement 310) in and/or on a wall of the tube body. The reinforcement can have a first turn and a second turn that extend around the lumen. The reinforcement can have a first configuration and a second configuration. When the reinforcement has the first configuration, the first turn and the second turn can be separated by a gap greater than 1.5 mm. When the reinforcement has the second configuration, the first turn and the second turn can be in contact with each other or can be separated by a gap less than 1.5 mm. The tube body can be stiffer when the reinforcement has the second configuration than when the reinforcement has the first configuration. The tube body can have a radius of curvature limit, and where when the first turn and the second turn are in contact with each other or are separated by the gap less than 1.5 mm. The tube body can be inhibited or prevented from becoming less than the radius of curvature limit. The radius of curvature limit can be 8.0 mm to 20.0 mm. The radius of curvature limit can be 12.7 mm. The tube body can be bendable from a first curve to a second curve. The first curve can have a first radius of curvature. The second curve can have a second radius of curvature. The first radius of curvature can be greater than the second radius of curvature. When the tube body has the first curve, the first turn and the second turn can be separated by the gap greater than 1.5 mm in the first curve. When the tube body has the second curve, the first turn and the second turn can be in contact with each other or can be separated by the gap less than 1.5 mm in the second curve. The second radius of curvature can be 8.0 mm to 20.0 mm. The first radius of curvature can be 1.0 mm to 7.0 mm or 1.0 mm to 19.0 mm greater than the second radius of curvature. The second radius of curvature can be 12.7 mm. The first radius of curvature can be 0.1 mm to 12.6 mm greater than the second radius of curvature. When the tube body has a straight configuration, the reinforcement can have the first configuration. When the tube body has a curved configuration, the reinforcement can have the second configuration. When the first turn and the second turn are in contact with each other or are separated by the gap less than 1.5 mm, kinking of the tube body can be inhibited or prevented via the reinforcement. When the first turn and the second turn are in contact with each other or are separated by the gap less than 1.5 mm, the proximity between the first turn and the second turn can inhibit or prevent kinking of the tube body. When the first turn and the second turn are separated by the gap greater than 1.5 mm, the reinforcement can permit bending of the tube in a first direction. When the first turn and the second turn are in contact with each other or are separated by the gap less than 1.5 mm, the reinforcement can inhibit or prevent bending of the tube in the first direction. When the first turn and the second turn are in contact with each other or are separated by the gap less than 1.5 mm, the reinforcement can permit bending of the tube in a second direction opposite the first direction. When the first turn and the second turn are separated by the gap greater than 1.5 mm, the tube can be bendable in a first direction. When the first turn and the second turn are in contact with each other or are separated by the gap less than 1.5 mm, bending of the tube in the first direction can be inhibited or prevented via the contact or proximity between the first turn and the second turn. When the first turn and the second turn are in contact with each other or are separated by the gap less than 1.5 mm, the tube can be bendable in a second direction opposite the first direction. The tube body can have a radius of curvature limit. When the first turn and the second turn are in contact with each other or are separated by the gap less than 1.5 mm, the proximity between the first turn and the second turn can inhibit or prevent the tube body from exceeding (e.g., from going below) the radius of curvature limit. The radius of curvature limit can be 8.0 mm to 20.0 mm. The radius of curvature limit can be 12.7 mm. The first turn and the second turn can be movable into and out of contact with each other. The first turn and the second turn can be movable into and out of proximity with each other. The first turn and the second turn can be movable into and out of contact with each other, and/or the first turn and the second turn can be movable into and out of proximity with each other. The reinforcement can have a structure having an undulating pattern. The reinforcement can be a zigzag wire. When the tube body has a straight configuration, the first turn can be nested in the second turn. When the tube body has a curved configuration, the first turn can be nested in the second turn. When the tube body has a straight configuration, the first turn can have in a non-nested position adjacent the second turn. When the tube body has a curved configuration, the first turn can be nested with the second turn. When the tube body has a straight configuration, the first turn may not be nested with the second turn. When the tube body has a curved configuration, the first turn can be nested with the second turn. When the first turn and the second turn are in contact with each other or are separated by the gap less than 1.5 mm, a peak of the first turn can be in contact with a portion of the second turn or can be separated by the gap less than 1.5 mm from the portion of the second turn. The portion of the second turn can be a peak of the second turn. When the first turn and the second turn are separated by the gap, the peak of the first turn and the portion of the second turn can be separated by the gap. The portion of the second turn can be a peak of the second turn. When the first turn and the second turn are in contact with each other or are separated by the gap less than 1.5 mm, a peak of the first turn can be in contact with a peak of the second turn or can be separated by the gap less than 1.5 mm from the peak of the second turn. The reinforcement can have arms. When the first turn and the second turn are in contact with each other, an arm of the first turn can be in contact with and/or in proximity with an arm of the second turn. When the first turn and the second turn are separated by the gap, the arm of the first turn and the arm of the second turn can be separated by the gap. The tube can be a catheter. The reinforcement can extend helically around the lumen. The first turn and the second turn can extend helically around the lumen.

The figures illustrate, for example, a tube having a tube body (e.g., tube 160, tube 100, layer 302, layer 304, layer 306) having a lumen (e.g., lumen 104) and a reinforcement (e.g., reinforcement 308 and/or reinforcement 310) in and/or on a wall of the tube body. The reinforcement can have a first turn and a second turn around the lumen. The first turn and the second turn can be movable into and out of proximity with each other. The tube body can have a radius of curvature limit. When the first turn and the second turn are in contact with each other and/or in proximity with each other, the tube body can be inhibited or prevented from exceeding (e.g., going below) the radius of curvature limit.

The figures illustrate, for example, a tube having a tube body (e.g., tube 160, tube 100, layer 302, layer 304, layer 306) having a lumen (e.g., lumen 104) and a reinforcement (e.g., reinforcement 308 and/or reinforcement 310) in and/or on a wall of the tube body. The reinforcement can have a first configuration and a second configuration. When the reinforcement has the first configuration, the reinforcement can comprise a first structure and a second structure. When the reinforcement has the second configuration, the reinforcement can comprise the second structure. The first structure can comprise a braid or a spiral wrap. The second structure can comprise a coil. The coil can have an undulating pattern. The undulating pattern can have a zigzag shape. The coil can be a zigzag wire. The braid or the spiral wrap can comprise the coil. The coil can define the braid or the spiral wrap. The braid or the spiral wrap can be formed by the coil. The braid or the spiral wrap can have nodes. The nodes can be formed by points where two adjacent turns of the coil are 0.0 mm to 1.5 mm apart. The points can be force and/or torque transfer points between adjacent turns of the coil. The points between adjacent turns of the coil can simulate nodes of the braid or the spiral wrap. The points between adjacent turns of the coil can simulate nodes of the braid or the spiral wrap. When the tube is in a straight configuration, the reinforcement can have the first configuration. When the tube is in a curved configuration, the reinforcement can have the second configuration. When the reinforcement has the second configuration, the reinforcement can comprise the first structure. When the reinforcement has the second configuration, the reinforcement can comprise the first structure at a first location along the reinforcement and the second structure at a second location along the reinforcement. The straight configuration of the tube can comprise the first location along the reinforcement. The curved configuration can comprise the second location along the reinforcement. The first structure can comprise a braid or a spiral wrap. The second structure can comprise a coil. When the reinforcement has the second configuration, the reinforcement can comprise the first structure. When the reinforcement has the second configuration, the reinforcement can comprise the first structure at a first location along the reinforcement and the second structure at a second location along the reinforcement. The first structure can comprise properties of a braid or a spiral wrap. The second structure can comprise properties of a coil. The coil can have an undulating pattern. The undulating pattern can have a zigzag shape. The first structure can have openable and closable cells. When the reinforcement has the first configuration, the cells can be openable. When the reinforcement has the second configuration, the cells can be closable. The reinforcement can have a first turn and a second turn that extend around (e.g., helically around) the lumen. The first turn and the second turn can extend helically around the lumen. The first structure can be in and/or on a wall of the tube body. The second structure can be in and/or on a wall of the tube body.

The figures illustrate, for example, a tube having a tube body (e.g., tube 160, tube 100, layer 302, layer 304, layer 306) having a lumen (e.g., lumen 104) and a scaffold (e.g., reinforcement 308 and/or reinforcement 310). The scaffold can have openable and closable cells in and/or on a wall of the tube body. The scaffold can have a first configuration and a second configuration. When the scaffold has the first configuration, a first cell of the openable and closable cells can be openable. When the scaffold has the second configuration, the first cell can be closable. When the scaffold has the first configuration, the first cell can be openable from a closed configuration to an open configuration. When the scaffold has the second configuration, the first cell can be closable from the open configuration to the closed configuration. When the scaffold has the first configuration, the first cell can be in a closed configuration. When the scaffold has the second configuration, the first cell can be in an open configuration. When the tube is in a straight configuration, the scaffold can have the first cell in the closed configuration. When the tube is in a curved configuration, the scaffold can have the first cell in the open configuration. A straight portion of the tube body having the straight configuration can comprise the first cell in the closed configuration. A curved portion of the tube body having the curved configuration can comprise the first cell in the open configuration. When the first cell is in the closed configuration, the first cell can be completely closed. When the first cell is in the closed configuration, the first cell can have a first side, a second side, a third side, and fourth side. When the first cell is in the closed configuration, the first cell can have a diamond-shape. When the first cell is in the closed configuration, the first cell can be defined by first turn and a second turn of the scaffold. The first turn and the second turn of the scaffold can extend helically around the lumen. The scaffold can have an undulating pattern defined by arms comprising a first arm, a second arm, a third arm, and fourth arm. When the first cell is in the closed configuration, the first arm, the second arm, the third arm, and the fourth arm can define a perimeter of the first cell. The scaffold can comprise a coil having a zigzag shape that extends helically around the lumen. The scaffold can comprise a braid and a coil when the first cell is in the closed configuration. The scaffold can comprise the coil when the first cell is in the open configuration. The scaffold can comprise properties a braid and a coil when the first cell is in the closed configuration. The scaffold can comprise the properties of the coil when the first cell is in the open configuration.

The figures illustrate, for example, a tube having a tube body (e.g., tube 160, tube 100, layer 302, layer 304, layer 306) having a lumen (e.g., lumen 104) and a reinforcement (e.g., reinforcement 308 and/or reinforcement 310) in and/or on a wall of the tube body. The reinforcement can comprise openable and closable nodes. When the reinforcement has a first configuration, a first node of the openable and closable nodes can be in closed configuration. When the reinforcement has the second configuration, the first node can be in an open configuration. When the first node is in the closed configuration, force can be transferrable across the first node. When the first node is in the open configuration, less force can be transferrable across the first node. When the first node is in the open configuration, zero force can transferrable across the first node. When the first node is in the closed configuration, a first portion of the first node and a second portion of the first node can be 0.0 mm to 1.5 mm apart. When the first node is in the open configuration, the first portion of the first node and the second portion of the first node can be separated from each other by a gap. A material can be in the gap. The reinforcement can have a first turn and a second turn. The first turn can comprise the first portion of the first node. The second turn can comprise the second portion of the first node. The first turn and the second turn can be adjacent to each other. The first turn can be adjacent to the second turn. The first turn and the second turn can extend helically around the lumen. When the first node is in the closed configuration, force can be transferrable across from the first turn to the second turn across the first node. When the first node is in the open configuration, force can be transferrable along the first turn and the second turn. When the first node is in the closed configuration, force can be transferable along the first turn and the second turn and across the first node from the first turn to the second turn. When the first node is in the open configuration, a torque can be transferrable along the first turn and the second turn. When the first node is in the closed configuration, the torque can be transferable along the first turn and the second turn and an axial force is transferrable across the first node from the first turn to the second turn. When the first node is in the open configuration, the reinforcement can comprise a coil. When the first node is in the closed configuration, the reinforcement can comprise the coil and a braid. When the first node is in the open configuration, the reinforcement can comprise a coil. When the first node is in the closed configuration, the reinforcement can comprise the coil and a spiral wrap. When the first node is in the open configuration, the reinforcement can comprise properties of a coil. When the first node is in the closed configuration, the reinforcement can comprise the properties of the coil and properties of a braid. When the first node is in the open configuration, the reinforcement can comprises properties of a coil. When the first node is in the closed configuration, the reinforcement can comprise the properties of the coil and properties of a spiral wrap. When the first node is in the open configuration, the reinforcement can comprise a first reinforcement. When the first node is in the closed configuration, the reinforcement can comprise a second reinforcement. The openable and closable nodes can comprise the openable and closable force and/or torque transfer points.

The figures illustrate, for example, an expandable tube having an outer tube body (e.g., tube 160, tube 100, layer 302, layer 304, layer 306) having a lumen (e.g., lumen 104)

and a reinforcement (e.g., reinforcement 308 and/or reinforcement 310) within the outer tube body. The reinforcement can extend helically around the lumen at least one full turn in a continuous undulating manner within the outer tube body. An entire turn of the at least one full turn of the reinforcement can be expandable and contractible. The reinforcement can be configured to assist the outer tube body in expanding when a device is passed through the lumen of the outer tube body. The reinforcement can be expandable and contractible such that expansion of the reinforcement can expand a diameter of the outer tube body. The outer tube body can be expandable by advancing a device into the lumen. The outer tube body can be contractible by withdrawing the device from the lumen. The outer tube body can have a natural state and an expanded state. When the outer tube body is in the natural state, the reinforcement can be biased to expand a diameter of the outer tube body. When the outer tube body is in the expanded state, the outer tube body can be biased to contract the diameter of the outer tube body. The outer tube body can be expandable from the natural state to the expanded state by advancing a device in the lumen. The outer tube body can be contractible from the expanded state to the natural state by withdrawing the device from the lumen. The reinforcement can have a first shape when the outer tube body is in the natural state. The reinforcement can have a second shape different than the first shape when the outer tube body is in the expanded state. The reinforcement can be configured to reduce a force required to expand a diameter of the outer tube body via a device by naturally reverting to a more expanded configuration as the device is advanced in the lumen. The outer tube body can have a natural state and an expanded state. The outer tube body can be expandable from the natural state to the expanded state due to a device in the lumen such that when the device is advanced in the lumen the reinforcement can be configured to reduce a force required to expand a diameter of the outer tube body via the device by naturally reverting to a more expanded configuration as the device is advanced in the lumen. The outer tube body can be contractible from the expanded state to the natural state due to the device in the lumen such that when the device is retracted from the lumen the outer tube body can be configured to contract the diameter of the outer tube body. The outer tube body can have a natural state and an expanded state. When the outer tube body is in the natural state, the reinforcement can be biased to expand a diameter of the outer tube body. When the outer tube body is in the expanded state, the outer tube body can be biased to contract the diameter of the outer tube body. The outer tube body can be expandable from the natural state to the expanded state due to a device in the lumen such that when the device is advanced in the lumen the reinforcement can be configured to reduce a force required to expand the diameter of the outer tube body via the device by naturally reverting to a more expanded configuration as the device is advanced in the lumen. The outer tube body can be contractible from the expanded state to the natural state due to the device in the lumen such that when the device is retracted from the lumen the outer tube body is configured to contract the diameter of the outer tube body. The reinforcement can have a first shape when the outer tube body is in the natural state. The reinforcement can have a second shape different than the first shape when the outer tube body is in the expanded state. The expandable tubing can comprise a coil or a braid in the outer tube body. The continuous undulating manner can comprise a zig-zag manner. The reinforcement can be a zig-zag wire. The reinforcement can comprise peaks and valleys. Adjacent peaks can be in adjacent valleys. The reinforcement has a zig-zag pattern comprising peaks and valleys. Adjacent peaks can be separated from adjacent valleys by a gap. The expandable tubing can comprise a coil or a braid in the outer tube body.

The figures illustrate, for example, an expandable tube having an outer tube body (e.g., tube 160, tube 100, layer 302, layer 304, layer 306) having a lumen (e.g., lumen 104), a coil or a braid in the outer tube body, and a reinforcement wound in an undulating manner within the outer tube body. The reinforcement can extend around the lumen. The outer tube body can be expandable via the reinforcement. The reinforcement can be contractible via the outer tube body. The coil or the braid can extend around the lumen on a radial inside or on a radial outside of the reinforcement. Adjacent turns of the reinforcement can be separated by a gap. The gap can be less than a peak-to-peak amplitude of the continuous undulating manner in a turn of the reinforcement. The continuous undulating manner of the reinforcement can have peaks and valleys. The peaks of adjacent turns of the reinforcement can be separated by a gap. The gap can be less than a peak-to-peak amplitude of two adjacent peaks in a single turn of the reinforcement. The reinforcement can extend helically around the lumen at least a first full turn and a second full turn in the continuous undulating manner within the outer tube body. The continuous undulating manner of the reinforcement can comprise peaks and valleys. A gap between the first full turn and the second full turn can be less than a peak-to-peak amplitude between a first peak of the first full turn and a second peak of the first full turn. The reinforcement can extend helically around the lumen multiple turns in the continuous undulating manner within the outer tube body. The continuous undulating manner of the reinforcement can comprise peaks and valleys. Peaks of adjacent turns can be aligned with each other longitudinally along a length of the outer tube. A material can extend helically around the lumen. The material can be on a radial inside of the reinforcement or on a radial outside of the reinforcement. The coil or the braid can extend helically around the lumen on the radial inside or on the radial outside of the reinforcement.

The figures illustrate, for example, an expandable tube having an outer tube body (e.g., tube 160, tube 100, layer 302, layer 304, layer 306) having a lumen (e.g., lumen 104) and a reinforcement within the outer tube body. The reinforcement can extend around the lumen. The reinforcement can be expandable and contractible. The reinforcement can extend helically around the lumen a first full turn and a second full turn in a continuous undulating manner within the outer tube body. The first full turn can be adjacent the second full turn. The continuous undulating manner of the reinforcement can comprise peaks and valleys. A peak of the first full turn can be in a valley of the second full turn. The reinforcement can comprise a spring material. The reinforcement can be a spring material. The reinforcement can comprise a spring. The reinforcement can be a spring.

The figures illustrate, for example, any combination of features disclosed herein.

The specific variations described herein are offered by way of example only. The above-described variations, configurations, features, elements, methods and variations of these aspects can be combined and modified with each other in any combination. The claims are not limited to the exemplary variations shown in the drawings, but instead may claim any feature disclosed or contemplated in the disclosure as a whole. Any elements described herein as singular can be pluralized (i.e., anything described as “one” can be more than one). Any species element of a genus element can have the characteristics or elements of any other species element of that genus. Some elements may be absent from individual figures for reasons of illustrative clarity. The above-described configurations, elements or complete assemblies and methods and their elements for carrying out the disclosure, and variations of aspects of the disclosure can be combined and modified with each other in any combination, and each combination is hereby explicitly disclosed. All devices, apparatuses, systems, and methods described herein can be used for medical (e.g., diagnostic, therapeutic or rehabilitative) or non-medical purposes. The words "may" and "can" are interchangeable (e.g., "may" can be replaced with "can" and "can" can be replaced with "may"). Any range disclosed can include any subrange of the range disclosed, for example, a range of 1-10 units can include 2-10 units, 8-10 units, or any other subrange. Any phrase involving an "A and/or B" construction can mean (1) A alone, (2) B alone, (3) A and B together, or any combination of (1), (2), and (3), for example, (1) and (2), (1) and (3), (2) and (3), and (1), (2), and (3). The terms about and approximate can include any tolerance that would be understood by one or ordinary skill in the art, for example, plus or minus 5% of the stated value.

I claim:

1. An expandable tubing comprising:

a tube body, where the tube body is radially expandable from a neutral state to an expanded state such that a diameter of the tube body is larger when the tube body is in the expanded state than when the tube body is in the neutral state, and where axial expansion of the tube body is inhibited or prevented; and a reinforcement positioned on and/or within a wall of the tube body, where the reinforcement is expandable, where the reinforcement is configured to inhibit or prevent the tube body from kinking, and where the reinforcement is configured to transmit an axial force along a length of the tube body and/or is configured to transmit a torque along the tube body.

2. An expandable tubing comprising:

a tube body, where the tube body is radially expandable from a neutral state to an expanded state such that a diameter of the tube body is larger when the tube body is in the expanded state than when the tube body is in the neutral state, and where axial expansion of the tube body is inhibited or prevented; and a reinforcement positioned on and/or within a wall of the tube body, where the reinforcement is expandable, where the reinforcement is configured to inhibit or prevent the tube body from kinking, and where the reinforcement comprises an undulating pattern.

3. An expandable tubing comprising:

a tube body, where the tube body is radially expandable from a neutral state to an expanded state such that a diameter of the tube body is larger when the tube body is in the expanded state than when the tube body is in the neutral state, and where axial expansion of the tube body is inhibited or prevented; and a reinforcement positioned on and/or within a wall of the tube body, where the reinforcement is expandable, where the reinforcement is configured to inhibit or prevent the tube body from kinking, and where the reinforcement comprises a coil having a zigzag pattern.

4. An expandable tubing comprising:

a tube body, where the tube body is radially expandable from a neutral state to an expanded state such that a diameter of the tube body is larger when the tube body is in the expanded state than when the tube body is in the neutral state, and where axial expansion of the tube body is inhibited or prevented; and a reinforcement positioned on and/or within a wall of the tube body, where the reinforcement is expandable, where the reinforcement is configured to inhibit or prevent the tube body from kinking, and where the reinforcement comprises a zigzag wire that extends helically around a lumen of the tube body multiple turns.

5. The expandable tubing of claim 1, where the tube body and the reinforcement are bendable into a curve having a radius of 8.0 mm to 15.0 mm without kinking.

6. The expandable tubing of claim 1, where the tube body and the reinforcement are bendable into a curve having a radius of 12.7 mm or less without kinking.

7. An expandable tubing comprising:

a tube body, where the tube body is radially expandable from a neutral state to an expanded state such that a diameter of the tube body is larger when the tube body is in the expanded state than when the tube body is in the neutral state, and where axial expansion of the tube body is inhibited or prevented; and a reinforcement positioned on and/or within a wall of the tube body, where the reinforcement is expandable, and where the reinforcement is configured to transmit a compressive force along a length of the tube body and/or is configured to transmit a torque along the tube body.

8. The expandable tubing of claim 7, where the reinforcement comprises an undulating pattern.

9. The expandable tubing of claim 7, where the reinforcement comprises a zigzag wire that extends helically around a lumen of the tube body multiple turns.

10. The expandable tubing of claim 7, where the reinforcement comprises an undulating pattern configured to transmit the torque along the tube body.

11. The expandable tubing of claim 7, where the reinforcement comprises a peak-to-peak configuration configured to provide the tube body with column strength such that an axial force is transmittable along the length of the tube body.

12. The expandable tubing of claim 7, where the reinforcement comprises a nested configuration configured to provide the tube body with column strength such that an axial force is transmittable along the length of the tube body.

13. The expandable tubing of claim 7, where a ratio of a wall thickness of the tube body to a diameter of a lumen of the tube body comprises 0.05 to 0.10.

14. The expandable tubing of claim 7, where the tube body and the reinforcement are bendable into a curve having a radius of 12.7 mm or less without kinking.

15. An expandable tubing comprising:

a tube body, where the tube body is radially expandable from a neutral state to an expanded state such that a diameter of the tube body is larger when the tube body is in the expanded state than when the tube body is in the neutral state, where axial expansion of the tube body is inhibited or prevented, where the tube body has a wall having a wall thickness, and where the wall thickness is greater or smaller when the tube body is in the neutral state than when the tube body is in the expanded state.

16. The expandable tubing of claim 15, where the tube body has the same length when the tube body is in the neutral state and when the tube body is in the expanded state.

17. The expandable tubing of claim 15, where the axial expansion of the tube body is inhibited or prevented via a braid or a spiral wrap.

18. An expandable tubing comprising:

a tube body, where the tube body is radially expandable from a neutral state to an expanded state such that a diameter of the tube body is larger when the tube body is in the expanded state than when the tube body is in the neutral state, where axial expansion of the tube body is inhibited or prevented, and where the tube body comprises radial ePTFE.

19. The expandable tubing of claim 18, where the tube body has a wall having a wall thickness, and where the wall thickness is the same when the tube body is in the neutral state and when the tube body is in the expanded state.

20. The expandable tubing of claim 18, where the axial expansion of the tube body is inhibited or prevented via the radial ePTFE.

21. The expandable tubing of claim 18, where the radial ePTFE comprises nodes and fibrils, and where more slack is in the fibrils when the tube body is in the neutral state than when the tube body is in the expanded state.

22. The expandable tubing of claim 21, where the fibrils are in tension when the tube body is in the expanded state.

23. The expandable tubing of claim 22, where the fibrils extend circumferentially around the tube body when the tube body is in the expanded state.

24. An expandable tubing comprising:

a tube body comprising radial ePTFE having nodes and fibrils, where the radial ePTFE is configured to allow radial expansion but inhibit or prevent axial expansion of the tube body.

25. The expandable tubing of claim 24, where more tension is in the fibrils when the tube body is in an expanded state than when the tube body is in a neutral state.

26. The expandable tubing of claim 25, where the nodes are denser when the tube body is in the neutral state than when the tube body is in the expanded state.

27. The expandable tubing of claim 25, where the fibrils are more aligned when the tube body is in the expanded state than when the tube body is in the neutral state.

28. The expandable tubing of claim 24, further comprising a zigzag wire and/or a braid, where the zigzag wire is configured to transmit a compressive axial force along a length of the tube body and/or is configured to transmit a torque along the tube body, and where the braid is configured to transmit the torque along the tube body.

29. The expandable tubing of claim 1, where the reinforcement comprises an undulating pattern.

30. The expandable tubing of claim 1, where the reinforcement comprises a coil having a zigzag pattern.

31. The expandable tubing of claim 1, where the reinforcement comprises a zigzag wire that extends helically around a lumen of the tube body multiple turns.

32. The expandable tubing of claim 2, where the reinforcement comprises a coil having a zigzag pattern.

33. The expandable tubing of claim 2, where the reinforcement comprises a zigzag wire that extends helically around a lumen of the tube body multiple turns.

34. The expandable tubing of claim 2, where the tube body and the reinforcement are bendable into a curve having a radius of 8.0 mm to 15.0 mm without kinking.

35. The expandable tubing of claim 2, where the tube body and the reinforcement are bendable into a curve having a radius of 12.7 mm or less without kinking.

36. The expandable tubing of claim 3, where the reinforcement comprises a zigzag wire that extends helically around a lumen of the tube body multiple turns.

37. The expandable tubing of claim 3, where the tube body and the reinforcement are bendable into a curve having a radius of 8.0 mm to 15.0 mm without kinking.

38. The expandable tubing of claim 3, where the tube body and the reinforcement are bendable into a curve having a radius of 12.7 mm or less without kinking.

39. The expandable tubing of claim 4, where the tube body and the reinforcement are bendable into a curve having a radius of 8.0 mm to 15.0 mm without kinking.

40. The expandable tubing of claim 4, where the tube body and the reinforcement are bendable into a curve having a radius of 12.7 mm or less without kinking.

41. The expandable tubing of claim 15, where the tube body comprises radial ePTFE.

42. The expandable tubing of claim 18, where the tube body has the same length when the tube body is in the neutral state and when the tube body is in the expanded state.

43. The expandable tubing of claim 18, where the tube body has a wall having a wall thickness, and where the wall thickness is greater or smaller when the tube body is in the neutral state than when the tube body is in the expanded state.

44. The expandable tubing of claim 18, where the axial expansion of the tube body is inhibited or prevented via a braid or a spiral wrap.

* * * * *